United States Patent
Zakrzewski et al.

(10) Patent No.: US 7,505,604 B2
(45) Date of Patent: Mar. 17, 2009

(54) METHOD FOR DETECTION AND RECOGNITION OF FOG PRESENCE WITHIN AN AIRCRAFT COMPARTMENT USING VIDEO IMAGES

(75) Inventors: Radoslaw Romuald Zakrzewski, South Burlington, VT (US); Mokhtar Sadok, Williston, VT (US); Jeffrey James Shirer, Ferrisburg, VT (US); Robert Lowell Zeliff, Bridport, VT (US)

(73) Assignee: Simmonds Precision Prodcuts, Inc., Vergennes, VT (US)

( * ) Notice: Subject to any disclaimer, the term of this patent is extended or adjusted under 35 U.S.C. 154(b) by 1179 days.

(21) Appl. No.: 10/702,070

(22) Filed: Nov. 5, 2003

(65) Prior Publication Data

US 2005/0069207 A1    Mar. 31, 2005

Related U.S. Application Data

(63) Continuation-in-part of application No. 10/152,148, filed on May 20, 2002, now Pat. No. 7,280,696.

(60) Provisional application No. 60/502,099, filed on Sep. 11, 2003, provisional application No. 60/424,287, filed on Nov. 6, 2002.

(51) Int. Cl.
*G06K 9/00* (2006.01)

(52) U.S. Cl. ..................... 382/100; 382/286

(58) Field of Classification Search .......... 382/100, 382/195, 206, 286; 356/436, 437; 250/564; 340/945, 601, 602

See application file for complete search history.

(56) References Cited

U.S. PATENT DOCUMENTS

| | | | |
|---|---|---|---|
| 4,647,785 A | 3/1987 | Morita | 250/574 |
| 5,530,433 A | 6/1996 | Morita | 340/630 |
| 5,673,027 A | 9/1997 | Morita | 340/630 |
| 6,061,471 A * | 5/2000 | Coleman, Jr. | 382/173 |
| 6,696,958 B2 | 2/2004 | Anderson | 340/578 |
| 6,853,453 B2 * | 2/2005 | Kwon | 356/437 |
| 2002/0181739 A1 * | 12/2002 | Hallowell et al. | 382/100 |

FOREIGN PATENT DOCUMENTS

| | | |
|---|---|---|
| EP | 0 231 390 B1 | 10/1992 |
| EP | 0 618 555 B1 | 7/1999 |
| EP | 0 658 865 B1 | 1/2003 |
| JP | 11-139262 A * | 5/1999 |
| JP | 2003099876 | 4/2003 |

OTHER PUBLICATIONS

Abstract of JP2003099876, published on Apr. 4, 2003, by Yoshiaki Okayama, Inoue Masao and Yamagishi Takatoshi.

* cited by examiner

*Primary Examiner*—Andrew W Johns
(74) *Attorney, Agent, or Firm*—Muirhead and Saturnelli, LLC

(57) ABSTRACT

Detecting video phenomena, such as fire in an aircraft cargo bay, includes receiving a plurality of video images from a plurality of sources, compensating the images to provide enhanced images, extracting features from the enhanced images, and combining the features from the plurality of sources to detect the video phenomena. Extracting features may include determining an energy indicator for each of a subset of the plurality of frames. Detecting video phenomena may also include comparing energy indicators for each of the subset of the plurality of frames to a reference frame. The reference frame corresponds to a video frame taken when no fire is present, video frame immediately preceding each of the subset of the plurality of frames, or a video frame immediately preceding a frame that is immediately preceding each of the subset of the plurality of frames. Image-based and non-image based techniques are described herein in connection with fire detection and/or verification and other applications.

138 Claims, 113 Drawing Sheets

4620

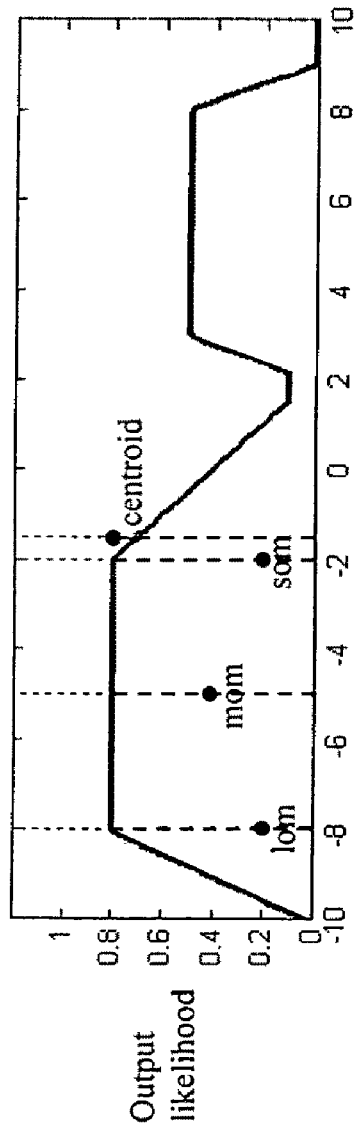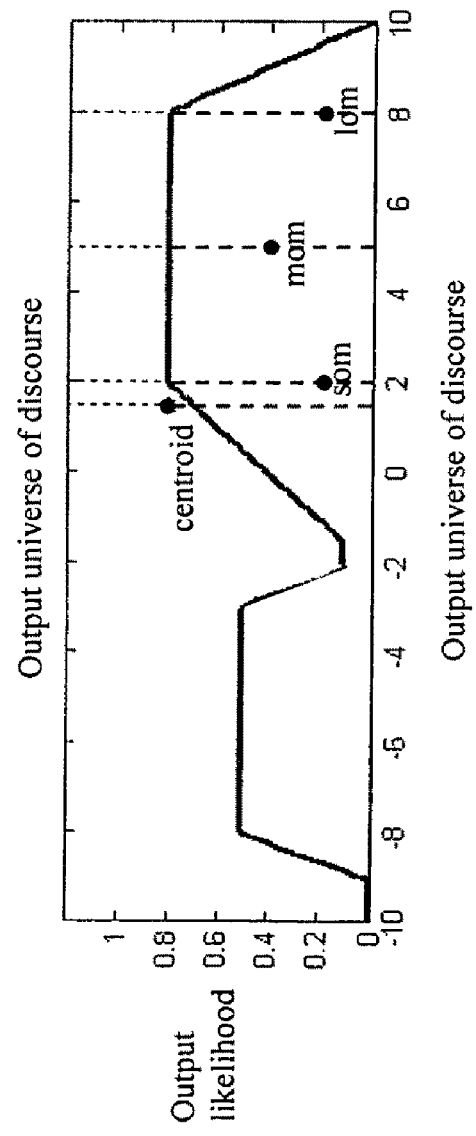
FIGURE 75

8010

Background image (i.e. time zero) with 2-inch gap simulation of a cargo bay filled with containers Edge map of the background image

6020

METHOD FOR DETECTION AND RECOGNITION OF FOG PRESENCE WITHIN AN AIRCRAFT COMPARTMENT USING VIDEO IMAGES

CROSS-REFERENCE TO RELATED APPLICATIONS

This application is a continuation-in-part of U.S. patent application Ser. No. 10/152,148, filed on May 20, 2002, now U.S. Pat. No. 7,280,696, which is incorporated by reference herein, and claims priority to U.S. Provisional Patent Application No. 60/502,099, filed on Sep. 11, 2003, which is incorporated by reference herein, and U.S. Provisional Patent Application No. 60/424,287 filed on Nov. 6, 2002, which is also incorporated by reference herein.

BACKGROUND OF THE INVENTION

1. Technical Field

This application relates to the detection, isolation, verification and alarming of certain conditions, and more particularly to the detection, isolation, verification and alarming of certain conditions using video images.

2. Description of Related Art

Conventional fire and smoke detection systems, such as may be installed aboard aircraft, often suffer from high rates of false alarms. Currently, once an alarm has been initiated, such as by a smoke detection system, the pilot is obligated to suppress the fire and divert the aircraft to the nearest emergency airfield. In case of extended range operations, such as, for example, with large jetliners over polar regions, the act of diverting to the nearest airfield may itself be dangerous as well as inconvenient. Additionally, false alarms may increase costs and expend resources unnecessarily. Reducing false smoke alarm rate may therefore beneficial both for both safety and economic reasons.

One cause of false alarms is caused by the formation of fog. Conventional systems may have false alarms due to the inability of a fire and smoke detection system to distinguish between fog and smoke. Accordingly, it may be desirable to reduce the incidence rate of false alarms issued by conventional smoke detection system, such as those installed in aircraft, by detecting and distinguishing between fog and smoke conditions.

SUMMARY OF THE INVENTION

In accordance with one aspect of the invention is a method for detecting fog comprising: determining at least one visual characteristic of image data for a portion of an image including at least one of: a change in overall image intensity for said portion, a change in image contrast for said portion, and a change in image sharpness for said portion; and determining using said at least one visual characteristic whether said change associated with said at least one visual characteristic is approximately uniform with respect to said portion. An amount of said change may be within a predetermined threshold. The method may also include determining that at least one of the following conditions is present for said portion: an increase in overall image intensity, a decrease in image sharpness, and a decrease in image contrast; and determining a positive indicator for fog presence if it is determined that said at least one of the following conditions is present, and it is determined using said at least one visual characteristic that said change associated with said at least one visual characteristic is approximately uniform with respect to the portion. The method may also include detecting that said change occurs rapidly within a predetermined time period. The time period may be a few seconds. The method may further comprise: detecting that fog droplets form throughout a predetermined area at a same point in time. An initial value may be associated with said at least one visual characteristic prior to fog formation and a second value is associated with said at least one visual characteristic during fog formation, and the method may further comprise: detecting that a value associated with said at least visual characteristic returns from said second value toward said initial value indicating fog dispersal. The value may return to said initial value from said second value in approximately linear time. The value returning to said initial value from said second value may be approximately uniform across said portion of the image. The method may include: extracting at least one feature of said image data. The at least one feature may include an average image intensity of said portion of said image indicating image brightness, the average intensity m of said portion X of an image at a time "t" being represented as:

$$m(t) = \frac{1}{N} \sum_{j=1}^{N} Xj(t)$$

where N represents the total number of pixels in the portion X of the image at a time "t". The method may include: determining an average image intensity for a plurality of portions for each of a plurality of images over a period of time to detect a trend in image brightness; and determining, using said average image intensity for each of said plurality of portions for each of said plurality of images, if overall brightness of a region defined by said plurality of portions increases over a predetermined time period above a predetermined threshold. The at least one feature may include intensity of a change image with respect to said portion X of said image, $D(t,\delta)=X(t)-X(t-\delta)$, which is a difference between time instances t and $t-\delta$ of said portion, represented as:

$$m_D(t, \delta) = \frac{1}{N} \sum_{j=1}^{N} Dj(t, \delta)$$

where N represents a total number of pixels being analyzed of said portion X. The method may further comprise: determining creation of fog when there are one or more positive values of $m_D(t,\delta)$; and determining dispersion of fog when there are one or more negative values of $m_D(t,\delta)$. The time interval $\delta$ between two compared frames may be fixed. The time interval $\delta$ may be adjusted in accordance with at least one system condition or parameter. A reference frame of the portion, $X(t-\delta)$, may represent an initial view of a portion of a cargo bay $X(0)$ such that $\delta$ is a current time t since the start of a flight from a time of the initial view and wherein the difference image with respect to the portion, $D(t,\delta)$, represents a cumulative change of view of the portion since beginning of the flight. A portion of reference image $X(t-\delta)$ may be reset periodically to accommodate changes of background. A portion of a reference frame $X(t-\delta)$ may be set to a frame immediately preceding a current frame such that $\delta=1$, and wherein the difference image with respect to said portion $D(t,\delta)$ represents the instantaneous rate of change of a view of said portion. The at least one feature may include a standard deviation of the image intensity of said portion represented as:

$$s(t) = \sqrt{\frac{1}{N}\sum_{j=1}^{N}(Xj(t)-m(t))^2}.$$

Large values of s(t) may indicate high variability of intensity and may be related to high contrast, low values of s(t) may indicate lower contrast, and the method may include: detecting creation of fog when there is a rapid decrease of s(t) within a predetermined threshold; and detecting fog dispersal when there is an increase in s(t). The at least one feature may include a mean absolute difference from the mean represented as:

$$d(t) = \frac{1}{N}\sum_{j=1}^{N}|Xj(t)-m(t)|$$

Creation of fog may be associated with a rapid drop of d(t) above a predetermined threshold and an increase in d(t) may be associated with fog dispersal. The at least one feature may include an absolute value of the average intensity change represented as:

$$d_a(t,\delta) = \frac{1}{N}|\sum_{j=1}^{N}(Xj(t)-Xj(t-\delta))|$$

in which t and t−δ represent points in time and X(t) and X(t−δ) are portions of images taken, respectively, at these two points in time. The at least one feature may include a correlation measurement based on the t-Student distribution represented as:

$$d_s(t,\delta) = \frac{\sum_{j=1}^{N}(Xj(t)-m(t-\delta))}{\sqrt{\sum_{j=1}^{N}(Xj(t)-m(t-\delta))^2}}$$

in which t and t−δ represent points in time and X(t) and X(t−δ) are portions of images taken, respectively, at these two points in time. The correlation measurement may be used in tracking a statistical evolution of a portion of a video stream as compared to a portion of the reference image at time t−δ, and wherein values of said correlation measurement larger than a predetermined threshold indicate fog. The at least one feature may include a correlation based on a likelihood ratio distribution represented as:

$$d_1(t) = 1 - \min_{j=all\ pixels}\left(LR_j, \frac{1}{LR_j}\right) \text{ where}$$

-continued $$LR_j = \frac{\left[\frac{(s(t))^2+(s(t-\delta))^2}{2}+\frac{(X_j(t)-m(t-\delta))^2}{2}\right]^2}{(s(t))^2(s(t-\delta))^2}.$$

The at least one feature may include an intensity range r(t) at a time t represented as: $r(t)=\chi_{max}(t)-\chi_{min}(t)$ where a maximum (Xmax) and a minimum (Xmin) intensity of a portion X of an image at a time t are used to provide an indication of reduced image contrast for the portion X and are represented as:

$$\chi_{max}(t) = \max_{j=all\ pixels} X_j(t),\ \chi_{min}(t) = \min_{j=all\ pixels} X_j(t).$$

Creation of fog may be indicated by a rapid drop of r(t), and an increase in r(t) may indicate fog dispersal, and r(t) decreasing below a threshold amount may indicate that fog is present. The at least one feature may include characterizing image sharpness of a portion X of an image using an intensity gradient. X and y gradient components G at pixel i,j of a portion X of an image at a time t may be defined as a left difference represented as: $G_{i,j}^x(t)=X_{i,j}(t)-X_{i-1,j}^y(t)\ G_{i,j}^y(t)=X_{i,j}(t)-X_{i-j,1}(t)$. X and y gradient components G at pixel i,j of a portion X of an image at a time t may be defined as a right difference represented as: $G_{i,j}^x(t)=X_{i+1,j}(t)\ G_{i,j}^y(t)=X_{i,j+1}(t)-X_{i,j}(t)$. X and y gradient components G at pixel i,j may be defined as a double-sided difference represented as:

$$G_{i,j}^x(t) = \frac{X_{i+1,j}(t)-X_{i-1,j}(t)}{2}\quad G_{i,j}^y(t) = \frac{X_{i,j+1}(t)-X_{i,j-1}(t)}{2}.$$

The intensity gradient may define a gradient in terms of differences between pixel locations with time as a constant. The intensity gradient may define a gradient in terms of pixel values between portions of images taken at different points in time. The at least one feature may include characterizing image sharpness using an intensity gradient, and wherein said intensity gradient may be determined using a portion of a change image. A large value of said intensity gradient may indicate sharp edges within a portion of an image. The at least one feature may include a mean absolute gradient value represented as:

$$g_a^x(t) = \frac{1}{N}\sum_{i,j=all\ pixels}|G_{i,j}^x(t)|,\ g_a^y(t) = \frac{1}{N}\sum_{i,j=all\ pixels}|G_{i,j}^y(t)|$$

such that creation of fog is signified by a rapid drop in at least one of: $g_\alpha^x(t)$ and $g_\alpha^y(t)$. The at least one feature may include an overall average gradient characteristic represented as: $g_\alpha(t)=g_\alpha^x(t)+g_\alpha^y(t)$. The at least one feature may include an average gradient norm, wherein a gradient norm G at pixel i,j is represented as: $G_{i,j}^n(t)=\sqrt{G_{i,j}^x(t)^2+G_{i,j}^y(t)^2}$ for all "N" pixels within a portion of an image, and the average gradient norm may be represented as:

$$g_n(t) = \frac{1}{N} \sum_{i,j=all\ pixels} G_{i,j}^n(t).$$

Creation of fog may be related to a rapid drop in $g_n(t)$ below a predetermined threshold value, and an increase in $g_n(t)$ may indicate fog dispersal. The at least one feature may include maximum and minimum values of x and y components of a gradient norm G represented as:

$$g_{max}(t) = \max_{i,j=all\ pixels} G_{i,j}^n(t),\ g_{min}(t) = \min_{i,j=all\ pixels} G_{i,j}^n(t),$$

$$g_{max}^x(t) = \max_{i,j=all\ pixels} |G_{i,j}^x(t)|,\ g_{min}^x(t) = \min_{i,j=all\ pixels} |G_{i,j}^n(t)|,$$

and $$g_{max}^y(t) = \max_{i,j=all\ pixels} |G_{i,j}^y(t)|,\ g_{min}^y(t) = \min_{i,j=all\ pixels} |G_{i,j}^y(t)|.$$

The at least one feature may include a dynamic range of intensity change including a standard deviation $s_d(t,\delta)$ of intensity change over some predefined time interval, $\delta$, defined as:

$$s_d(t,\delta) = \sqrt{\frac{1}{N} \sum_{j=all\ pixels} (D_j(t,\delta) - m_d(t,\delta))^2}$$

and wherein a value of the standard deviation $s_d(t,\delta)$ is close to zero within some predetermined threshold if there is fog. The at least one feature may include a mean absolute deviation of a portion from the mean value of a portion of the change image represented as:

$$d_d(t) = \frac{1}{N} \sum_{j=all\ pixels} |D_j(t,\delta) - m_d(t,\delta)|$$

and wherein a value of the mean absolute deviation is close to zero within some predetermined threshold if there is fog. The at least one feature may include a spatial moment of a portion of the change image, and wherein coordinates of a center of mass a portion of the change image $D(t,\delta)$ are represented as:

$$i_c(t,\delta) = \frac{\sum_{i,j=all\ pixels} i D_{i,j}(t,\delta)}{\sum_{i,j=all\ pixels} D_{i,j}(t,\delta)}\quad j_c(t,\delta) = \frac{\sum_{i,j=all\ pixels} j D_{i,j}(t,\delta)}{\sum_{i,j=all\ pixels} D_{i,j}(t,\delta)}$$

and wherein, if the image change for a portion is uniform across the portion of the image, the coordinates are close to the geometric center of the portion of the image indicating presence of fog. The at least one feature may include higher order moments of a portion of a change image represented as:

$$M_{2,0}(t,\delta) = \sum_{i,j=all\ pixels} (i - i_c(t,\delta))^2 D_{i,j}(t,\delta)\ \text{and}$$

$$M_{0,2}(t,\delta) = \sum_{i,j=all\ pixels} (j - j_c(t,\delta))^2 D_{i,j}(t,\delta).$$

The at least one feature may include a moment of inertia of a portion of the change image represented as:

$$M_i(t,\delta) = \sum_{i,j=all\ pixels} ((i - i_c(t,\delta))^2 + (j - j_c(t,\delta))^2) D_{i,j}(t,\delta).$$

The at least one feature may include moments defined using average absolute values of pixels represented as:

$$M_{1,0}^a(t,\delta) = \sum_{i,j=all\ pixels} |i - i_c(t,\delta)| D_{i,j}(t,\delta)$$

$$M_{0,1}^a(t,\delta) = \sum_{i,j=all\ pixels} |i - j_c(t,\delta)| D_{i,j}(t,\delta)$$

$$M_i^a(t,\delta) = \sum_{i,j=all\ pixels} (|i - i_c(t,\delta)| + |j - j_c(t,\delta)|) D_{i,j}(t,\delta)$$

and wherein, if a portion of the change image is uniform, values for these moments are larger than a predetermined threshold indicating a presence of fog. The method may also include: determining that at least one of the following conditions is present for said portion of said image: an increase in overall image intensity, a decrease in image sharpness, and a decrease in image contrast; determining an intermediate positive indicator for fog presence if it is determined that said at least one of the following conditions is present, and it is determined using said at least one visual characteristic that said change associated with said at least one visual characteristic is approximately uniform with respect to the portion of the image; and determining a final positive indicator for fog presence if said intermediate positive indicator indicates that there is fog which is confirmed by at least one other feature. The at least one other feature may be a non-image feature. The at least one other feature may include at least one of temperature, humidity and pressure. A plurality of intermediate positive indicators may be used in determining said final positive indicator. The method may further include: distinguishing fog from one of a plurality of other conditions, wherein said plurality of other conditions includes smoke and an aerosol dispersion. The portion may be an entire image. The portion may include a plurality of regions of said image. Each of the plurality of regions may be a predefined shape in accordance with lighting and camera view. The at least one visual characteristic may be a frequency-based feature. The frequency-based feature may estimate motion of an element of said portion. The method may also include: receiving an image from a CCD camera. The CCD camera may have an operational wavelength sensitivity between approximately 770 and 1200 nanometers blocking visible light. The CCD camera may be a conventional CCD camera with an operational wavelength sensitivity between approximately 400 and 1200 nanometers. The CCD camera may be used when it is determined that a view area is completely obscured except for a predetermined space within which said CCD camera is included. The operational wavelength sensitivity of said CCD camera may exclude a portion of the range between approximately 400 and 1200 nanometers. The at least one excluded portion may have a range corresponding to one of: a light source and a device that emits within said at least one excluded portion to filter out wavelengths within said at least one excluded portion. The method may include: receiving an image from a camera with an associated light source wherein said camera is mounted opposite said associated light source within a viewing area. The viewing area may be an aircraft cargo bay, and said camera and said associated light source may be mounted within a predetermined distance from a ceiling of said aircraft cargo bay. The said camera and said associated light source may be positioned at a same vertical and horizontal location on walls of said cargo bay area. The CCD camera may have an operational wavelength sensitivity approximating that of visible light. The frequency-based feature may be used to monitor an area within a camera view for at least one other condition unrelated to fire. A cargo bay area may be monitored during cargo loading using said frequency-base feature.

In accordance with another aspect of the invention is a computer program product that detects fog comprising executable code that: determines at least one visual characteristic of image data for a portion of an image including at least one of: a change in overall image intensity for said portion, a change in image contrast for said portion, and a change in image sharpness for said portion; and determines, using said at least one visual characteristic, whether said change associated with said at least one visual characteristic is approximately uniform with respect to said portion. An amount of said change may be within a predetermined threshold. The computer program product may include executable code that: determines at least one of the following conditions is present for said portion: an increase in overall image intensity, a decrease in image sharpness, and a decrease in image contrast; and determines a positive indicator for fog presence if it is determined that said at least one of the following conditions is present, and it is determined using said at least one visual characteristic that said change associated with said at least one visual characteristic is approximately uniform with respect to the portion. The computer program product may include: executable code that detects that said change occurs rapidly within a predetermined time period. The time period may be a few seconds. The computer program product may also include: executable code that detects that fog droplets form throughout a predetermined area at a same point in time. An initial value may be associated with said at least one visual characteristic prior to fog formation and a second value may be associated with said at least one visual characteristic during fog formation, and the computer program product may also include executable code that detects that a value associated with said at least visual characteristic returns from said second value toward said initial value indicating fog dispersal. The value may return to said initial value from said second value in approximately linearly time. The value returning to said initial value from said second value may be approximately uniform across said portion of the image. The computer program product may include: executable code that extracts at least one feature of said image data. The at least one feature may include an average image intensity of said portion of said image indicating image brightness, the average intensity m of said portion X of an image at a time "t" being represented as:

$$m(t) = \frac{1}{N} \sum_{j=1}^{N} Xj(t)$$

where N represents the total number of pixels in the portion X of the image at a time "t". The computer program product may include executable code that: determines an average image intensity for a plurality of portions for each of a plurality of images over a period of time to detect a trend in image brightness; and determines, using said average image intensity for each of said plurality of portions for each of said plurality of images, if overall brightness of a region defined by said plurality of portions increases over a predetermined time period above a predetermined threshold. The at least one feature may include intensity of a change image with respect to said portion X of said image, $D(t,\delta)=X(t)-X(t-\delta)$, which is a difference between time instances t and $t-\delta$ of said portion, represented as:

$$m_D(t, \delta) = \frac{1}{N} \sum_{j=1}^{N} Dj(t, \delta)$$

where N represents a total number of pixels being analyzed of said portion X. The computer program product may include executable code that: determines creation of fog when there are one or more positive values of $m_D(t,\delta)$; and determines dispersion of fog when there are one or more negative values of $m_D(t,\delta)$. The time interval $\delta$ between two compared frames may be fixed. The time interval $\delta$ may be adjusted in accordance with at least one system condition or parameter. A reference frame of the portion, $X(t-\delta)$, may represent an initial view of a portion of a cargo bay $X(0)$ such that $\delta$ is a current time t since the start of a flight from a time of the initial view and wherein the difference image with respect to the portion, $D(t,\delta)$, may represent a cumulative change of view of the portion since beginning of the flight. A portion of reference image $X(t-\delta)$ may be reset periodically to accommodate changes of background. A portion of a reference frame $X(t-\delta)$ may be set to a frame immediately preceding a current frame such that $\delta=1$, and wherein the difference image with respect to said portion $D(t,\delta)$ may represent the instantaneous rate of change of a view of said portion. The at least one feature may include a standard deviation of the image intensity of said portion represented as:

$$s(t) = \sqrt{\frac{1}{N} \sum_{j=1}^{N} (Xj(t) - m(t))^2} .$$

Large values of s(t) may indicate high variability of intensity and may be related to high contrast, low values of s(t) may indicate lower contrast, and the computer program product may include executable code that: detects creation of fog when there is a rapid decrease of s(t) within a predetermined threshold; and detects fog dispersal when there is an increase in s(t). The at least one feature includes a mean absolute difference from the mean represented as:

$$d(t) = \frac{1}{N}\sum_{j=1}^{N} |Xj(t) - m(t)|.$$

Creation of fog may be associated with a rapid drop of d(t) above a predetermined threshold and wherein an increase in d(t) may be associated with fog dispersal. The at least one feature may include an absolute value of the average intensity change represented as:

$$d_a(t, \delta) = \left| \frac{1}{N}\sum_{j=1}^{N} (Xj(t) - Xj(t - \delta)) \right|$$

in which t and t−δ represent points in time and X(t) and X(t−δ) are portions of images taken, respectively, at these two points in time. The at least one feature may include a correlation measurement based on the t-Student distribution represented as:

$$d_s(t, \delta) = \frac{\sum_{j=1}^{N}(Xj(t) - m(t-\delta))}{\sqrt{\sum_{j=1}^{N}(Xj(t) - m(t-\delta))^2}}$$

in which t and t−δ represent points in time and X(t) and X(t−δ) are portions of images taken, respectively, at these two points in time. The correlation measurement may be used in tracking a statistical evolution of a portion of a video stream as compared to a portion of the reference image at time t−δ, and wherein values of said correlation measurement larger than a predetermined threshold indicate fog. The at least one feature may include a correlation based on a likelihood ratio distribution represented as:

$$d_1(t) = 1 - \min_{i,j=all\ pixels}\left(LR_j, \frac{1}{LR_j}\right)$$

where $$LR_j = \frac{\left[\frac{(s(t))^2 + (s(t-\delta))^2}{2} + \frac{(X_j(t) - m(t-\delta))^2}{2}\right]^2}{(s(t))^2(s(t-\delta))^2}.$$

The at least one feature may include an intensity range r(t) at a time t represented as:

$$r(t) = \chi_{max}(t) - \chi_{min}(t)$$

where a maximum (Xmax) and a minimum (Xmin) intensity of a portion X of an image at a time t are used to provide an indication of reduced image contrast for the portion X and may be represented as:

$$\chi_{max}(t) = \max_{j=all\ pixels} X_j(t), \quad \chi_{min}(t) = \min_{j=all\ pixels} X_j(t)$$

Creation of fog may be indicated by a rapid drop of r(t), and an increase in r(t) may indicate fog dispersal, and wherein, r(t) decreasing below a threshold amount may indicate that fog is present. The at least one feature may include characterizing image sharpness of a portion X of an image using an intensity gradient. X and y gradient components G at pixel i,j of a portion X of an image at a time t may be defined as a left difference represented as: $G_{i,j}^x(t) = X_{i,j}(t) - X_{i-1,j}(t)$  $G_{i,j}^y(t) = X_{i,j}(t) - X_{i,j-1}(t)$. X and y gradient components G at pixel ij of a portion X of an image at a time t may be defined as a right difference represented as:

$G_{i,j}^x(t) = X_{i+1,j}(t) - X_{i,j}(t)$ $G_{i,j}^y(t) = X_{i,j+1}(t) - X_{i,j}(t)$. X and y gradient components G at pixel i,j may be defined as a double-sided difference represented as:

$$G_{i,j}^x(t) = \frac{X_{i+1,j}(t) - X_{i-1,j}(t)}{2} \quad G_{i,j}^y(t) = \frac{X_{i,j+1}(t) - X_{i,j-1}(t)}{2}.$$

The intensity gradient may define a gradient in terms of differences between pixel locations with time as a constant. The intensity gradient may define a gradient in terms of pixel values between portions of images taken at different points in time. The at least one feature includes characterizing image sharpness using an intensity gradient, and wherein said intensity gradient is determined using a portion of a change image. A large value of said intensity gradient may indicate sharp edges within a portion of an image. The at least one feature may include a mean absolute gradient value represented as:

$$g_a^x(t) = \frac{1}{N}\sum_{i,j=all\ pixels} |G_{i,j}^x(t)|, \quad g_a^y(t) = \frac{1}{N}\sum_{i,j=all\ pixels} |G_{i,j}^y(t)|$$

such that creation of fog is signified by a rapid drop in at least one of: $g_a^x(t)$ and $g_a^y(t)$.

The at least one feature may an overall average gradient characteristic represented as: $g_a(t) = g_a^x(t) + g_a^y(t)$. The at least one feature may an average gradient norm, wherein a gradient norm G at pixel i,j may be represented as: $G_{i,j}^n(t) = \sqrt{G_{i,j}^x(t)^2 + G_{i,j}^y(t)^2}$ for all "N" pixels within a portion of an image, and the average gradient norm may be represented as:

$$g_n(t) = \frac{1}{N}\sum_{i,j=all\ pixels} G_{i,j}^n(t).$$

Creation of fog may be related to a rapid drop in $g_n(t)$ below a predetermined threshold value, and an increase in $g_n(t)$ may indicate fog dispersal. The at least one feature may include maximum and minimum values of x and y components of a gradient norm G represented as: $g_{max}(t) = \max\limits_{i,j=all\ pixels} G^n_{i,j}(t)$, $g_{min}(t) = \min\limits_{i,j=all\ pixels} G^n_{i,j}(t)$ $g^x_{max}(t) = \max\limits_{i,j=all\ pixels} |G^x_{i,j}(t)|$, $g^x_{min}(t) = \min\limits_{i,j=all\ pixels} |G^x_{i,j}(t)|$ $g^y_{max}(t) = \max\limits_{i,j=all\ pixels} |G^y_{i,j}(t)|$, $g^y_{min}(t) = \min\limits_{i,j=all\ pixels} |G^y_{i,j}(t)|$.

The at least one feature may include a dynamic range of intensity change including a standard deviation $s_d(t,\delta)$ of intensity change over some predefined time interval, $\delta$, defined as:

$$s_d(t, \delta) = \sqrt{\frac{1}{N} \sum_{j=all\ pixels} (D_j(t, \delta) - m_d(t, \delta))^2}$$

and wherein a value of the standard deviation $s_d(t,\delta)$ is close to zero within some predetermined threshold if there is fog. The at least one feature may include a mean absolute deviation of a portion from the mean value of a portion of the change image represented as:

$$d_d(t) = \frac{1}{N} \sum_{j=all\ pixels} |D_j(t, \delta) - m_d(t, \delta)|$$

and wherein a value of the mean absolute deviation is close to zero within some predetermined threshold if there is fog. The at least one feature may include a spatial moment of a portion of the change image, and wherein coordinates of a center of mass a portion of the change image $D(t,\delta)$ may be represented as:

$$i_c(t, \delta) = \frac{\sum\limits_{i,j=all\ pixels} iD_{i,j}(t, \delta)}{\sum\limits_{i,j=all\ pixels} D_{i,j}(t, \delta)} \quad j_c(t, \delta) = \frac{\sum\limits_{i,j=all\ pixels} jD_{i,j}(t, \delta)}{\sum\limits_{i,j=all\ pixels} D_{i,j}(t, \delta)}$$

and wherein, if the image change for a portion is uniform across the portion of the image, the coordinates are close to the geometric center of the portion of the image indicating presence of fog. The at least one feature may include higher order moments of a portion of a change image represented as:

$$M_{2,0}(t, \delta) = \sum_{i,j=all\ pixels} (i - i_c(t, \delta))^2 D_{i,j}(t, \delta)$$

$$M_{0,2}(t, \delta) = \sum_{i,j=all\ pixels} (j - j_c(t, \delta))^2 D_{i,j}(t, \delta)$$

The at least one feature may include a moment of inertia of a portion of the change image represented as:

$$M_i(t, \delta) = \sum_{i,j=all\ pixels} ((i - i_c(t, \delta))^2 + (j - j_c(t, \delta))^2) D_{i,j}(t, \delta).$$

The at least one feature may include moments defined using average absolute values of pixels represented as:

$$M^a_{1,0}(t, \delta) = \sum_{i,j=all\ pixels} |i - i_c(t, \delta)| D_{i,j}(t, \delta)$$

$$M^a_{0,1}(t, \delta) = \sum_{i,j=all\ pixels} |j - j_c(t, \delta)| D_{i,j}(t, \delta)$$

$$M^a_i(t, \delta) = \sum_{i,j=all\ pixels} (|i - i_c(t, \delta)| + |j - j_c(t, \delta)|) D_{i,j}(t, \delta)$$

and wherein, if a portion of the change image is uniform, values for these moments are larger than a predetermined threshold indicating a presence of fog. The computer program product may include executable code that: determines that at least one of the following conditions is present for said portion of said image: an increase in overall image intensity, a decrease in image sharpness, and a decrease in image contrast; determines an intermediate positive indicator for fog presence if it is determined that said at least one of the following conditions is present, and it is determined using said at least one visual characteristic that said change associated with said at least one visual characteristic is approximately uniform with respect to the portion of the image; and determines a final positive indicator for fog presence if said intermediate positive indicator indicates that there is fog which is confirmed by at least one other feature. The at least one other feature is a non-image feature. The at least one other feature may include at least one of temperature, humidity and pressure. A plurality of intermediate positive indicators may be used in determining said final positive indicator. The computer program product may include executable code that: distinguishes fog from one of a plurality of other conditions, wherein said plurality of other conditions includes smoke and an aerosol dispersion. The portion may be an entire image. The portion may include a plurality of regions of said image. Each of the plurality of regions may be a predefined shape in accordance with lighting and camera view. The at least one visual characteristic may be a frequency-based feature. The frequency-based feature may estimate motion of an element of said portion. The computer program product may include executable code that receives an image from a CCD camera. The CCD camera may have an operational wavelength sensitivity between approximately 770 and 1200 nanometers blocking visible light. The CCD camera may be a conventional CCD camera with an operational wavelength sensitivity between approximately 400 and 1200 nanometers. The CCD camera may be used when it is determined that a view area is completely obscured except for a predetermined space within which said CCD camera is included. The operational wavelength sensitivity of said CCD camera may exclude a portion of the range between approximately 400 and 1200 nanometers. The at least one excluded portion may have a range corresponding to one of: a light source and a device that emits within said at least one excluded portion to filter out wavelengths within said at least one excluded portion. The computer program product may include: executable code that receives an image from a camera with an associated light source wherein said camera is mounted opposite said associated light source within a viewing area. The viewing area may be an aircraft cargo bay, and said camera and said associated light source may be mounted within a predetermined distance from a ceiling of said aircraft cargo bay. The camera and said associated light source may be positioned at a same vertical and horizontal location on walls of said cargo bay area. The CCD camera may have an operational wavelength sensitivity approximating that of visible light.

In accordance with one aspect of the invention is a method for detecting smoke comprising: determining portions of a plurality of images obtained at different times; determining a region for each of the portions in accordance with a predetermined pixel intensity, a minimum number of neighboring pixels having said intensity which are connected to a pixel of interest, and a predetermined connectivity, said predetermined connectivity indicating particular pixel positions adjacent to a pixel of interest; and determining, using regions for said corresponding portions, whether the portions indicate a smoke condition. The method may be executed in a computer system. The portions of said images may include a view of a ceiling gap of a cargo bay area in an aircraft. The method may also include: determining whether the portions indicate a non-smoke condition. The portions may indicate a smoke condition if the portions include a shrinking region of brightness with respect to a change in time. The portion may be entire frames. The portions may be determined in accordance with an image projection of a lighting source for an opposite lighting view wherein a camera obtains an image using only a light source located opposite said camera. The plurality of images may be obtained using at least one camera receiving near infrared light. The camera may be a CCD camera. The lighting may be used to produce said opposite lighting view using a lighting source controlled by a system control unit. The determining whether the portions indicate a smoke condition may set an indicator to indicate one of a smoke and a non-smoke condition. The method may also include: using said indicator as one of a plurality of inputs to determine whether a fire condition is present. The predetermined connectivity may be one of 4 and 8 indicating a number of adjacent pixel positions used to evaluate a pixel of interest, and the method may also include: determining whether said pixel of interest meets said predetermined connectivity by determining if said pixel of interest has said minimum number of neighboring pixels above said predetermined pixel intensity, and whether said pixel of interest meets said predetermined pixel intensity. The pixel and all connected neighboring pixels located in said portion may be included in said region if said pixel of interest meets said predetermined connectivity and said predetermined pixel intensity. The minimum number of neighboring pixels may be less than or equal to said predetermined connectivity. The method may also include: determining, for each of said portions, if said region is shrinking. The method may also include: determining a feature for each of said portions, said feature using a count of bright and connected pixels included in said region for each of said portions. The method may also include: determining for each pixel in a reference frame whether said each pixel meets specified criteria, said specified criteria including whether said each pixel meets said predetermined pixel intensity and has said minimum number of neighboring pixels meeting said predetermined pixel intensity in accordance with neighboring pixel positions indicated by said predetermined connectivity; determining for each pixel in a subsequent frame whether said each pixel meets said specified criteria; determining for each pixel in said subsequent frame whether there has been a state change of said each pixel wherein it is determined that there has been a state change for said each pixel if said each pixel has changed from one of: meeting said criteria in said reference frame to not meeting said criteria in said subsequent frame, and not meeting said criteria in said reference frame to meeting said criteria in said subsequent frame; determining a feature for said subsequent frame using a total number of pixels determined as having a state change; and using said feature in determining whether a smoke condition is present. The total number of pixels having a state change may be compared to a threshold, and a smoke condition may be determined as being present when said total number exceeds said threshold. The feature may be a difference in said total number of pixels determined for two subsequent frames obtained at two points in time. The feature may be a ratio of said total number to a number of bright and connected pixels included in said region associated with said reference frame. The method may also include: determining a first quantity of pixels in a portion of a reference frame meeting specified criteria, said specified criteria including whether each pixel in said portion meets said predetermined pixel intensity and has said minimum number of neighboring pixels meeting said predetermined pixel intensity in accordance with neighboring pixel positions indicated by said predetermined connectivity; determining a second quantity of pixels in a portion of a first subsequent frame meeting said specified criteria; and using said first and second quantities in determining whether a smoke condition is present. The method may also include: determining a third quantity of pixels in a portion of a second subsequent frame meeting said specified criteria; determining a first feature value for said first subsequent frame that is a ratio using said first and second quantities and a second feature value for said second subsequent frame that is a ratio using said first and third quantities; and using said feature values in determining whether a smoke condition is present. The reference frame may be determined using an opposite camera lighting view and determining a projection of a light source of a recorded image. The method may also include: determining said region by using a starting pixel candidate in accordance with said light source. The method may also include: determining said region for each of said portions using a starting pixel candidate located in a first row and column position of said each portion, and wherein each pixel in each of said portions are examined in accordance with specified criteria, said specified criteria including whether each pixel in said each portion meets said predetermined pixel intensity and has said minimum number of neighboring pixels meeting said predetermined pixel intensity in accordance with neighboring pixel positions indicated by said predetermined connectivity. The method may also include: determining region shrinkage of said region of a first frame as compared to a second frame. The region shrinkage may be determined using only pixels initially indicated as meeting said specified criteria in a reference frame. The method may also include: determining said predetermined pixel intensity in accordance with a distribution of pixel intensity values of an opposing camera lighting view of an image. At least the minimum number of neighboring pixels, said predetermined connectivity, and a smoke detection threshold may be selected in accordance with selection criteria including a first criteria that all fire conditions are properly classified. The selection criteria may include a second criteria that smoke detection occurs before at least one conventional fire detection unit. The selection criteria may include a third criteria that minimizes a number of non-fire conditions properly classified. The method may include: determining a third quantity of pixels in a portion of a second subsequent frame meeting said specified criteria; determining a first feature value for said first subsequent frame that is one of: an absolute value of a difference between said first quantity and said second quantity, and an absolute value of a difference between said second quantity and another quantity associated with a frame preceding said first subsequent frame in time; determining a second feature value for said subsequent frame that is one of: an absolute value of a difference between said first quantity and said third quantity, and an absolute value of a difference between said second quantity and said third quantity; and using said first and second feature values in determining whether a smoke condition is present. The predetermined connectivity may include two layers of pixels surrounding a pixel of interest, and the method may further comprise: determining whether said pixel of interest meets said predetermined connectivity by determining if said pixel of interest has said minimum number of neighboring pixels above said predetermined pixel intensity in said two layers, and whether said pixel of interest meets said predetermined pixel intensity. The predetermined connectivity may be a predefined shape with respect to said pixel of interest, and the method may further comprise: determining whether said pixel of interest meets said predetermined connectivity by determining if said pixel of interest has said minimum number of neighboring pixels above said predetermined pixel intensity in said predefined shape, and whether said pixel of interest meets said predetermined pixel intensity. The predefined shape may be one of: a rectangle, a square, at least one horizontal row, and at least one vertical row. The predefined shape may be selected in accordance with a property of data being analyzed. The feature may be a ratio of a feature value associated with a current frame, FeatureValue(t), with respect to a feature value associated with a reference frame, FeatureValue (O), represented as:

$$\frac{|FeatureValue(t) - FeatureValue(0)|}{FeatureValue(0)}.$$

The feature value may be a value of one of the following features: number of bright and connected pixels in a connected bright region, mean pixel intensity, pixel intensity standard deviation, gradient mean, and gradient mean standard deviation. The feature may represent a relative comparison of a feature value at a first point in time with respect to a feature values of the feature associated with a reference frame. The region may be determined in accordance with a time connectivity K, K being greater than or equal to zero, K representing whether a pixel has been included in at least K previous regions associated with K other frames at different points in time.

In accordance with another aspect of the invention is a computer program product that detects detecting smoke comprising executable code that: determines portions of a plurality of images obtained at different times; determines a region for each of the portions in accordance with a predetermined pixel intensity, a minimum number of neighboring pixels having said intensity which are connected to a pixel of interest, and a predetermined connectivity, said predetermined connectivity indicating particular pixel positions adjacent to a pixel of interest; and determines, using regions for said corresponding portions, whether the portions indicate a smoke condition. The portions of said images may include a view of a ceiling gap of a cargo bay area in an aircraft. The computer program product may include: executable code that determines whether the portions indicate a non-smoke condition. The portions may indicate a smoke condition if the portions include a shrinking region of brightness with respect to a change in time. The portions may be entire frames. The portions may be determined in accordance with an image projection of a lighting source for an opposite lighting view wherein a camera obtains an image using only a light source located opposite said camera. The plurality of images may be obtained using at least one camera receiving near infrared light. The camera may be a CCD camera. The lighting used to produce said opposite lighting view may use a lighting source controlled by a system control unit. The executable code that determines may also include executable code that determines whether the portions indicate a smoke condition further comprises executable code that sets an indicator to indicate one of a smoke and a non-smoke condition. The computer program product may also include: executable code that uses said indicator as one of a plurality of inputs to determine whether a fire condition is present. The predetermined connectivity may be one of 4 and 8 indicating a number of adjacent pixel positions used to evaluate a pixel of interest, and the computer program product may also include: executable code that determines whether said pixel of interest meets said predetermined connectivity by determining if said pixel of interest has said minimum number of neighboring pixels above said predetermined pixel intensity, and whether said pixel of interest meets said predetermined pixel intensity. The pixel and all connected neighboring pixels located in said portion may be included in said region if said pixel of interest meets said predetermined connectivity and said predetermined pixel intensity. The minimum number of neighboring pixels may be less than or equal to said predetermined connectivity. The computer program product may also include executable code that determines, for each of said portions, if said region is shrinking. The computer program product may also include: executable code that determines a feature for each of said portions, said feature using a count of bright and connected pixels included in said region for each of said portions. The computer program product may further comprise executable code that: determines for each pixel in a reference frame whether said each pixel meets specified criteria, said specified criteria including whether said each pixel meets said predetermined pixel intensity and has said minimum number of neighboring pixels meeting said predetermined pixel intensity in accordance with neighboring pixel positions indicated by said predetermined connectivity; determines for each pixel in a subsequent frame whether said each pixel meets said specified criteria; determines for each pixel in said subsequent frame whether there has been a state change of said each pixel wherein it is determined that there has been a state change for said each pixel if said each pixel has changed from one of: meeting said criteria in said reference frame to not meeting said criteria in said subsequent frame, and not meeting said criteria in said reference frame to meeting said criteria in said subsequent frame; determines a feature for said subsequent frame using a total number of pixels determined as having a state change; and uses said feature in determining whether a smoke condition is present. The computer program product may also comprise: executable code that compares said total number of pixels having a state change to a threshold; and executable code that determines a smoke condition as being present when said total number exceeds said threshold. The feature may be a difference in said total number of pixels determined for two subsequent frames obtained at two points in time. The feature may be a ratio of said total number to a number of bright and connected pixels included in said region associated with said reference frame. The computer program product may further comprise: executable code that: determines a first quantity of pixels in a portion of a reference frame meeting specified criteria, said specified criteria including whether each pixel in said portion meets said predetermined pixel intensity and has said minimum number of neighboring pixels meeting said predetermined pixel intensity in accordance with neighboring pixel positions indicated by said predetermined connectivity; determines a second quantity of pixels in a portion of a first subsequent frame meeting said specified criteria; and uses said first and second quantities in determining whether a smoke condition is present. The computer program product may further comprise executable code that: determines a third quantity of pixels in a portion of a second subsequent frame meeting said specified criteria; determines a first feature value for said first subsequent frame that is a ratio using said first and second quantities and a second feature value for said second subsequent frame that is a ratio using said first and third quantities; and uses said feature values in determining whether a smoke condition is present. The reference frame may be determined using an opposite camera lighting view and determining a projection of a light source of a recorded image. The computer program product may further comprise: executable code that determines said region by using a starting pixel candidate in accordance with said light source. The computer program product may also include: executable code that determines said region for each of said portions using a starting pixel candidate located in a first row and column position of said each portion, and wherein each pixel in each of said portions are examined in accordance with specified criteria, said specified criteria including whether each pixel in said each portion meets said predetermined pixel intensity and has said minimum number of neighboring pixels meeting said predetermined pixel intensity in accordance with neighboring pixel positions indicated by said predetermined connectivity. The computer program product may also include: executable code that determines region shrinkage of said region of a first frame as compared to a second frame. The region shrinkage may be determined using only pixels initially indicated as meeting said specified criteria in a reference frame. The computer program product may also include: executable code that determines said predetermined pixel intensity in accordance with a distribution of pixel intensity values of an opposing camera lighting view of an image. At least the minimum number of neighboring pixels, said predetermined connectivity and a smoke detection threshold may be selected in accordance with selection criteria including a first criteria that all fire conditions are properly classified. The selection criteria may include a second criteria that smoke detection occurs before at least one conventional fire detection unit. The selection criteria may include a third criteria that minimizes a number of non-fire conditions properly classified. The computer program product may further comprise executable code that: determines a third quantity of pixels in a portion of a second subsequent frame meeting said specified criteria; determines a first feature value for said first subsequent frame that is one of: an absolute value of a difference between said first quantity and said second quantity, and an absolute value of a difference between said second quantity and another quantity associated with a frame preceding said first subsequent frame in time; determines a second feature value for said subsequent frame that is one of: an absolute value of a difference between said first quantity and said third quantity, and an absolute value of a difference between said second quantity and said third quantity; and uses said first and second feature values in determining whether a smoke condition is present. The predetermined connectivity may include two layers of pixels surrounding a pixel of interest, and the computer program product may further comprise: executable code that determines whether said pixel of interest meets said predetermined connectivity by determining if said pixel of interest has said minimum number of neighboring pixels above said predetermined pixel intensity in said two layers, and whether said pixel of interest meets said predetermined pixel intensity. The predetermined connectivity may be a predefined shape with respect to said pixel of interest, and the computer program product may further comprise: executable code that determines whether said pixel of interest meets said predetermined connectivity by determining if said pixel of interest has said minimum number of neighboring pixels above said predetermined pixel intensity in said predefined shape, and whether said pixel of interest meets said predetermined pixel intensity. The predefined shape may be one of: a rectangle, a square, at least one horizontal row, and at least one vertical row. The predefined shape may be selected in accordance with a property of data being analyzed. The feature may be a ratio of a feature value associated with a current frame, FeatureValue(t), with respect to a feature value associated with a reference frame, FeatureValue (0), represented as:

$$\frac{|FeatureValue(t) - FeatureValue(0)|}{FeatureValue(0)}.$$

The feature value may be a value of one of the following features: number of bright and connected pixels in a connected bright region, mean pixel intensity, pixel intensity standard deviation, gradient mean, and gradient mean standard deviation. The feature may represent a relative comparison of a feature value at a first point in time with respect to a feature values of the feature associated with a reference frame. The region may be determined in accordance with a time connectivity K, K being greater than or equal to zero, K representing whether a pixel has been included in at least K previous regions associated with K other frames at different points in time.

In accordance with one aspect of the invention is a method for detection of hotspots comprising: determining a connected bright region for a portion of a frame, said connected bright region including each pixel of said portion which exceed a first predetermined threshold and has a minimum number of neighboring pixels exceeding said first predetermined threshold and being connected to said each pixel; and determining, using a feature based on said connected bright region, whether a hotspot exists in accordance with a detection threshold. The minimum number of neighboring pixels may be determined in accordance with a connectivity configuration indicating particular pixel positions adjacent to said each pixel. The connectivity configuration may specify one of 4 and 8 pixel positions adjacent to a pixel of interest. The method may further comprise: determining a first metric for a first portion of a first frame using a first connected bright region associated with said first frame at a first point in time; determining a second metric for a second portion of a second frame using a second connected bright region associated with said second frame at a second point in time; and determining whether a hotspot exists using said first and said second metrics. The method may also include: performing a trend analysis using said first and said second metrics to determine whether a hotspot exists. The feature may use the number of pixels included in said connected bright region. The portion may be one of: said entire frame and pixels selected from said frame in accordance with a predetermined pattern. The portion may include every other pixel in a designated area of said frame. The frame may be obtained using a thermal lighting view in which no controlled light is switched on. The frame may be obtained using a camera that receives near infrared light. The first predetermined threshold may be determined offline in accordance with an image histogram of gray level distribution obtained using a thermal lighting view with all controlled lighting switch off with a fire condition. The first threshold distribution may be determined in accordance with predetermined criteria including at least one of: minimizing false positives, limitations of a camera used to obtain said frame, image noise, and detection prior to a conventional fire detection system. A reference frame may be subtracted from said frame. The reference frame may be used to filter out light sources. A pixel in said connected bright region may meet a time connectivity parameter K, K being greater than or equal to zero, K representing whether a pixel has been included in at least K previous connected bright regions associated with K other frames determined at different points in time. The method may also include: determining a ratio of a number of pixels included in said connected bright region to a total number of pixels in said portion; and determining if a hotspot exists in said frame if said ratio exceeds a hotspot detection threshold. The ratio may be represented as:

$$HotSpot\ Coverage(t_k) = \frac{100}{\left(\left(\frac{M}{2}-1\right) \times \left(\frac{N}{2}-1\right)\right)} \times \sum_{m=1}^{\left(\frac{M}{2}-1\right)} \sum_{n=1}^{\left(\frac{N}{2}-1\right)} \left\{ \left[ \sum_{i=(2m-1)}^{i=(2m+1)} \sum_{j=(2n-1)}^{j=(2n+1)} (P(i,j;t_k) > H_0) \right] > C_0 \right\}$$

and (M,N) designates frame dimensions; $H_0$ is the first predetermined threshold indicating a brightness threshold; $C_0$ is a minimum number of neighboring pixels based on a selected connectivity type; $P(i,j))t_k$ represents a pixel value at time tk; and a time connectivity of order K applied to a pixel p of coordinates (ij) means that:

$$\left\{ \left[ \sum_{i=(2m-1)}^{i=(2m+1)} \sum_{j=(2n-1)}^{j=(2n+1)} (P(i,j;t) > H_0) \right] > C_0 \right\} \text{ for } t = t_k, t_{k-1}, \ldots, t_{k-K}$$

for K frames at different points in time t. The method may also include: setting an indicator if a hotspot is detected. The indicator may be one of a plurality of inputs to data fusion processing producing as an output a system fire signal in accordance with said plurality of inputs. The determining of a connected bright region may be performed in response to detecting a first precondition using a global metric. The global metric may characterize pixels and associated values of said frame.

In accordance with another aspect of the invention is a computer program product that detects hotspots comprising executable code that: determines a connected bright region for a portion of a frame, said connected bright region including each pixel of said portion which exceed a first predetermined threshold and has a minimum number of neighboring pixels exceeding said first predetermined threshold and being connected to said each pixel; and determines, using a feature based on said connected bright region, whether a hotspot exists in accordance with a detection threshold. The minimum number of neighboring pixels may be determined in accordance with a connectivity configuration indicating particular pixel positions adjacent to said each pixel. The connectivity configuration may specify one of 4 and 8 pixel positions adjacent to a pixel of interest. The computer program product may further comprise executable code that: determines a first metric for a first portion of a first frame using a first connected bright region associated with said first frame at a first point in time; determines a second metric for a second portion of a second frame using a second connected bright region associated with said second frame at a second point in time; and determines whether a hotspot exists using said first and said second metrics. The computer program product may further comprise: executable code that performs a trend analysis using said first and said second metrics to determine whether a hotspot exists. The feature may use the number of pixels included in said connected bright region. The portion may be one of: said entire frame, and pixels selected from said frame in accordance with a predetermined pattern. The portion may include every other pixel in a designated area of said frame. The frame may be obtained using a thermal lighting view in which no controlled light is switched on. The frame may be obtained using a camera that receives near infrared light. The first predetermined threshold may be determined offline in accordance with an image histogram of gray level distribution obtained using a thermal lighting view with all controlled lighting switch off with a fire condition. The first threshold distribution may be determined in accordance with predetermined criteria including at least one of: minimizing false positives, limitations of a camera used to obtain said frame, image noise, and detection prior to a conventional fire detection system. A reference frame may be subtracted from said frame. The reference frame may be used to filter out light sources. A pixel in the connected bright region may meet a time connectivity parameter K, K being greater than or equal to zero, K representing whether a pixel has been included in at least K previous connected bright regions associated with K other frames determined at different points in time. The computer program product may further comprise executable code that: determines a ratio of a number of pixels included in said connected bright region to a total number of pixels in said portion; and determines if a hotspot exists in said frame if said ratio exceeds a hotspot detection threshold. The ratio may be represented as:

$$HotSpot\ Coverage(t_k) = \frac{100}{\left(\left(\frac{M}{2}-1\right) \times \left(\frac{N}{2}-1\right)\right)} \times \sum_{m=1}^{\left(\frac{M}{2}-1\right)} \sum_{n=1}^{\left(\frac{N}{2}-1\right)} \left\{ \left[ \sum_{i=(2m-1)}^{i=(2m+1)} \sum_{j=(2n-1)}^{j=(2n+1)} (P(i,j;t_k) > H_0) \right] > C_0 \right\}$$

and (M,N) designates frame dimensions; $H_0$ is the first predetermined threshold indicating a brightness threshold; $C_0$ is a minimum number of neighboring pixels based on a selected connectivity type; $P(i,j))t_k$ represents a pixel value at time tk;

and a time connectivity of order K applied to a pixel p of coordinates (i,j) means that:

$$\left\{\left[\sum_{i=(2m-1)}^{i=(2m+1)}\sum_{j=(2n-1)}^{j=(2n+1)}(P(i,j;t)>H_0)\right]>C_0\right\} \text{ for } t=t_k,t_{k-1},\ldots,t_{k-K}$$

for K frames at different points in time t. The computer program product may also include: executable code that sets an indicator if a hotspot is detected. The indicator may be one of a plurality of inputs to data fusion processing producing as an output a system fire signal in accordance with said plurality of inputs. The executable code that determines a connected bright region may be responsive to executable code that detects a first precondition using a global metric. The global metric may characterize pixels and associated values of said frame.

In accordance with aspect of the invention is a method for distinguishing a smoke condtion from a dust condition comprising: obtaining a first frame of video data; determining at least one feature of a portion of said first frame; and determining a smoke condition if a threshold value for said at least one feature is crossed, and, in the presence of a dust condition, said treshold value is not crossed. A fire indicator may be set if the threshold value is crossed. At least one feature may be an average absolute gray level intensity represented as:

$$\mu(t)=\frac{1}{N_m\times M_m}\sum_{i=1}^{N_m}\sum_{j=1}^{M_m}|P(i,j;t)-P_{Ref}(i,j;t_0)|$$

where: $P(i,j;t)$ is a pixel value at location (i,j) and time t; $P_{Ref}(i,j;t_0)$ is a pixel value at location (i,j) of a reference frame at time 0; and $N_m$ and $M_m$ are dimensions of said portion. The first frame may be obtained using one of: an overhead lighting view in which only overhead controlled lights are turned on, a diagonal lighting view in which only a light source opposite a camera obtaining said first frame is on, and a pilot lighting view in which only a light source co-located with a camera obtaining said first frame is on. If the threshold value is crossed, a smoke condition may be determined. The threshold value may be determined in accordance with a vibration level of noise in a system. The method may also include: selecting said threshold in accordance with criteria that all fire conditions are properly classified and an acceptable rate of dust cases are improperly classified. The criteria may include detecting a fire condition prior to a selected conventional smoke detector. The feature may have a larger value in a smoke condition than a dust condition. The feature may include a plurality of features each associated with at least one threshold. The plurality of features may include at least two of: a mean intesity value of an average pixel intensity for all pixels in said portion; a maximum pixel intensity value of a maximum pixel intensity for all pixels in said portion; a number of pixels in a bright region, said number representing a number of pixels in said portion that are one of: greater than a threshold intensity, and greater than a threshold intensity and connected to a minimum number of neighboring pixels; a mean norm of intensity gradient vector for all pixels in said portion; and a norm of the second order moment matrix calculated over all pixels in said portion. A fire condition may be determined if any one of the plurality of features crosses an associated threshold. Different features may be determined and used in detecting a smoke condition in accordance with the particular lighting view of a frame. The mean intensity value may be determined for a frame obtained in one of a diagonal and overhead lighting view, said maximum pixel intensity may be determined for a frame obtained in one of diagonal view, and said size of a brightness region may be determined for a frame obtained in one of a diagonal and overhead lighting views. A different threshold may be used for each combination of feature and lighting view for at least one feature. The plurality of features may include a feature that is a mean intensity represented as:

$$\text{mean}(P)=\frac{1}{MN}\sum_{i=1}^{M}\sum_{j=1}^{N}P(i,j)$$

where: M represents a number of pixel rows in said portion; N represents a number of pixel columns in said portion; P is said portion of a frame; P(i,j) is a pixel intensity or gray level at pixel position i,j in P. The plurality of features may include a second feature that is a mean norm of a gradient vector represented as:

$$\text{mgrad}(P)=\frac{1}{MN}\sum_{i=1}^{M-1}\sum_{j=1}^{N-1}\sqrt{G_1(i,j)^2+G_2(i,j)^2}$$

where $G_1$ and $G_2$ are given by:

$$G_1(i,j)=X(i+1,j)-X(i,j)$$
$$G_2(i,j)=X(i,j+1)-X(i,j).$$

A value of said second feature may decrease as an image decreases in sharpness of detail. A third feature of said plurality of features may be a norm of a second order moment matrix represented as:

$$\text{norm2}(P)=\text{norm}\left(\begin{bmatrix}SM20(P)&SM11(P)\\SM11(P)&SM02(P)\end{bmatrix}\right)$$

where second order moments SM 20, SM 02 and SM 11 are defined via equations:

$$X\text{center}(P)=\frac{1}{MN}\sum_{i=1}^{M}\sum_{j=1}^{N}iP(i,j);$$

$$Y\text{center}(P)=\frac{1}{MN}\sum_{i=1}^{M}\sum_{j=1}^{N}jP(i,j);$$

$$SM20(P)=\frac{1}{MN}\sum_{i=1}^{M}\sum_{j=1}^{N}(i-X\text{center})^2P(i,j)$$

$$SM02(P)=\frac{1}{MN}\sum_{i=1}^{M}\sum_{j=1}^{N}(j-Y\text{center})^2P(i,j) \text{ and}$$

-continued $$SM11(P) = \frac{1}{MN}\sum_{i=1}^{M}\sum_{j=1}^{N}(i - Xcenter)(j - Ycenter)P(i, j).$$

The plurality of features may include a fourth feature that is the size of a bright region represented as:

$$brsize(P) = \sum_{i=1}^{M}\sum_{j=1}^{N}T(i, j)$$

where binary thresholded image T is defined through at least an intensity threshold. The bright region may be determined in accordance with an intensity threshold and a connectivity factor. A fire condition may be determined if any one value of any one feature crosses a threshold. The method may also include: determining said first, said second and said fourth features if said first frame is obtained using a diagonal lighting view in which said frame is obtained using only an opposing camera light; and determining said first, said second and said third features if said first frame is obtained using an overhead lighting view in which said frame is obtained using only overhead lights. At least one feature may be determined for multiple windows of said portion. At least one of said plurality of features may be determined using a relative change expressed as a ratio of a first value to a second value, said first value representing said feature for said portion and said second value representing a steady state feature value. Each of said multiple windows may be determined in accordance with a location of at least one light relative to location and field of view of a camera acquiring frames. The plurality of features may include a fifth feature that is a maximum pixel intensity value represented as:

$$\max(P) = \max_{\substack{i=1,M \\ j=1,N}} P(i, j)$$

where: M represents a number of pixel rows in said portion; N represents the number of pixel columns in said portion; P is said portion; and P(i,j) is a pixel intensity or gray level at pixel position i,j in said portion. The at least one feature may be a rate of change feature based on an average absolute gray level, wherein the rate of change may be calculated as:

$$\delta_\mu = \frac{\mu(t) - \mu(t - \Delta t)}{\Delta t}$$

where $\mu(t)$ and $\mu(t-\Delta t)$ are values of an average absolute intensity feature at times t and t−Δt, respectively, and wherein said average absolute gray level is represented as:

$$\mu(t) = \frac{1}{N_m \times M_m}\sum_{i=1}^{N_m}\sum_{j=1}^{M_m}|P(i, j; t) - P_{Ref}(i, j; t_0)|$$

where: P(i,j;t) is a pixel value at location (i,j) and time t; $P_{Ref}(i,j;t_0)$ is a pixel value at location (i,j) of a reference frame at time 0; and $N_m$ and $M_m$ are dimensions of said portion. A value of said rate of change feature may be higher for a smoke condition than for a dust condition.

In accordance with another aspect of the invention is a method of detecting a fire condition comprising: determining a lighting view associated with a frame; if said lighting view is an opposite lighting view, determining a number of pixels associated with a portion of a frame in accordance with a lighting view of said frame, said number of pixels representing a number of pixels in said portion which increase or decrease by an amount exceeding a brightness threshold with respect to a reference frame, each of said number of pixels being connected to a minimum number of neighboring pixels in terms of space, and determining a ratio of said number of pixels for a current frame with respect to said number of pixels of a reference frame; and if said ratio exceeds a first threshold, determining that a fire condition exists, said first ratio being determined in accordance with the opposite lighting view. For a current frame at a time tk, said ratio may be represented as a percentage of fading with an opposite view configuration:

$$Fading(t_k) = 100 \times \frac{\sum_{m=1}^{\frac{M}{S_s}}\sum_{n=1}^{\frac{N}{S_s}}\left\{\left(\sum_{i=-1}^{i=1}\sum_{j=-1}^{j=1}|P(S_sm+i, S_sn+j; t_k) - P_{Ref}(S_sm+i, S_sn+j; t_0)| > D_0\right) > C_0\right\}}{Fading(t_0)}\%$$

wherein Fading($t_0$) is a number of bright and connected pixels generated by an opposite light of a reference image represented by:

$$Fading(t_0) = \sum_{m=1}^{\frac{M}{S_s}}\sum_{n=1}^{\frac{N}{S_s}}\left\{\left(\sum_{i=-1}^{i=1}\sum_{j=-1}^{j=1}P_{Ref}(S_sm+i, S_sn+j; t_0) > D_0\right) > C_0\right\}$$

such that Fading($t_0$) is non zero; (M,N) designates dimensions of said portion;

$D_0$ is said brightness threshold determined in accordance with an opposite lighting view;

$S_s$ is a sweeping step across one of a horizontal and vertical directions; and $C_0$ is a clustering threshold that is said minimum number of neighboring pixels in terms of space. Each of said number of pixels in said current frame may exceed said brightness threshold and said minimum number of neighboring pixels for a predetermined number of previous samples representing a time connectivity, said predetermined number being greater than zero. The method may also include: determining if said lighting view is one of: an overhead and near view lighting, and if so, determining a feature for said portion as a number of fading/glowing pixels represented as:

$$FG(t_k) = \sum_{m=1}^{\frac{M}{S_s}}\sum_{n=1}^{\frac{N}{S_s}}\left\{\left(\sum_{i=-1}^{i=1}\sum_{j=-1}^{j=1}|P(S_sm+i, S_sn+j; t_k) - P_{Ref}(S_sm+i, S_sn+j; t_0)| > D_0\right) > C_0\right\}$$

wherein Do of FG(tk) is determined in accordance with one of said overhead and near lighting views; and determining a fire condition if FG(tk) exceeds a second threshold selected in accordance with one of said overhead and near lighting views. The opposite lighting view and at least one of said overhead and near lighting views may be used in determining whether a fire condition exists. A fire condition may be determined if at least one of said first and second thresholds are exceeded. The method may also include: determining whether Fading ($t_0$) is non zero; and if Fading($t_0$) is not non-zero, determining existence of a system problem. The method may also include: in response to determining an existence of a system problem, selecting a different feature for use with said current frame other than Fading($t_k$).

In accordance with another aspect of the invention is a computer program product that distinguishes a smoke condition from a dust condition comprising executable code that: obtains a first frame of video data; determines at least one feature of a portion of said first frame; and determines a smoke condition if a threshold value for said at least one feature is crossed, and, in the presence of a dust condition, said treshold value is not crossed. The computer program product may include executable cod that sets a fire indicator if said threshold value is crossed. The computer program product may also have said at least one feature be an average absolute gray level intensity represented as:

$$\mu(t) = \frac{1}{N_m \times M_m} \sum_{i=1}^{N_m} \sum_{j=1}^{M_m} |P(i, j; t) - P_{Ref}(i, j; t_0)|$$

where: $P(i,j;t)$ is a pixel value at location $(i,j)$ and time t; $P_{Ref}(i,j;t_0)$ is a pixel value at location $(i,j)$ of a reference frame at time 0; and $N_m$ and $M_m$ are dimensions of said portion. The first frame may be obtained using one of: an overhead lighting view in which only overhead controlled lights are turned on, a diagonal lighting view in which only a light source opposite a camera obtaining said first frame is on, and a pilot lighting view in which only a light source co-located with a camera obtaining said first frame is on. If said threshold value is crossed, a smoke condition may be determined. The computer program product may also include executable code that determines said threshold value in accordance with a vibration level of noise in a system. The computer program product may also include: executable code that selects said threshold in accordance with criteria that all fire conditions are properly classified and an acceptable rate of dust cases are improperly classified. The criteria may include detecting a fire condition prior to a selected conventional smoke detector. The feature may have a larger value in a smoke condition than a dust condition. The feature may include a plurality of features each associated with at least one threshold. The plurality of features may include at least two of: a mean intesity value of an average pixel intensity for all pixels in said portion; a maximum pixel intensity value of a maximum pixel intensity for all pixels in said portion; a number of pixels in a bright region, said number representing a number of pixels in said portion that are one of: greater than a threshold intensity, and greater than a threshold intensity and connected to a minimum number of neighboring pixels; a mean norm of intensity gradient vector for all pixels in said portion; and a norm of the second order moment matrix calculated over all pixels in said portion. A fire condition may be determined if any one of the plurality of features crosses an associated threshold. The computer program product may also include executable code that determines different features used in detecting a smoke condition in accordance with a particular lighting view of a frame. The mean intensity value may be determined for a frame obtained in one of a diagonal and overhead lighting view, said maximum pixel intensity is determined for a frame obtained in one of diagonal view, and said size of a brightness region is determined for a frame obtained in one of a diagonal and overhead lighting views. A different threshold may be used for each combination of feature and lighting view for at least one feature. The plurality of features may include a feature that is a mean intensity represented as:

$$\text{mean}(P) = \frac{1}{MN} \sum_{i=1}^{M} \sum_{j=1}^{N} P(i, j)$$

where: M represents a number of pixel rows in said portion; N represents a number of pixel columns in said portion; P is said portion of a frame; and $P(i,j)$ is a pixel intensity or gray level at pixel position i,j in P. The plurality of features may include a second feature that is a mean norm of a gradient vector represented as:

$$\text{mgrad}(P) = \frac{1}{MN} \sum_{i=1}^{M} \sum_{j=1}^{N} \sqrt{G_1(i, j)^2 + G_2(i, j)^2}$$

where $G_1$ and $G_2$ are given by:

$$G_1(i, j) = X(i+1, j) - X(i, j)$$
$$G_2(i, j) = X(i, j+1) - X(i, j).$$

A value of said second feature may decrease as an image decreases in sharpness of detail. A third feature of said plurality of features may be a norm of a second order moment matrix represented as:

$$\text{norm2}(P) = \text{norm}\left(\begin{bmatrix} SM20(P) & SM11(P) \\ SM11(P) & SM02(P) \end{bmatrix}\right)$$

where second order moments SM 20, SM 02 and SM 11 are defined via equations:

$$Xcenter(P) = \frac{1}{MN} \sum_{i=1}^{M} \sum_{j=1}^{N} iP(i, j)$$

$$Ycenter(P) = \frac{1}{MN} \sum_{i=1}^{M} \sum_{j=1}^{N} jP(i, j)$$

$$SM20(P) = \frac{1}{MN} \sum_{i=1}^{M} \sum_{j=1}^{N} (i - Xcenter)^2 P(i, j)$$

$$SM02(P) = \frac{1}{MN} \sum_{i=1}^{M} \sum_{j=1}^{N} (j - Ycenter)^2 P(i, j) \text{ and}$$

$$SM11(P) = \frac{1}{MN} \sum_{i=1}^{M} \sum_{j=1}^{N} (i - Xcenter)(j - Ycenter)P(i, j).$$

The plurality of features may include a fourth feature that is the size of a bright region represented as:

$$brsize(P) = \sum_{i=1}^{M}\sum_{j=1}^{N} T(i, j),$$

where binary thresholded image T is defined through at least an intensity threshold. The computer program product may also include executable code that determines said bright region in accordance with an intensity threshold and a connectivity factor. A fire condition may be determined if any one value of any one feature crosses a threshold. The computer program product may also include executable code that determines said first, said second and said fourth features if said first frame is obtained using a diagonal lighting view in which said frame is obtained using only an opposing camera light; and executable code that determines said first, said second and said third features if said first frame is obtained using an overhead lighting view in which said frame is obtained using only overhead lights. At least one feature may be determined for multiple windows of said portion. At least one of said plurality of features may be determined using a relative change expressed as a ratio of a first value to a second value, said first value representing said feature for said portion and said second value representing a steady state feature value. Each of said multiple windows is determined in accordance with a location of at least one light relative to location and field of view of a camera acquiring frames. The plurality of features may include a fifth feature that is a maximum pixel intensity value represented as:

$$\max(P) = \max_{\substack{i=1,M \\ j=1,N}} P(i, j)$$

where: M represents a number of pixel rows in said portion; N represents the number of pixel columns in said portion; P is said portion; and P(i,j) is a pixel intensity or gray level at pixel position i,j in said portion. The at least one feature may be a rate of change feature based on an average absolute gray level, wherein the rate of change is calculated as:

$$\delta_\mu = \frac{\mu(t) - \mu(t - \Delta t)}{\Delta t}$$

where $\mu(t)$ and $\mu(t-\Delta t)$ are values of an average absolute intensity feature at times t and t−Δt, respectively, and wherein said average absolute gray level is represented as:

$$\mu(t) = \frac{1}{N_m \times M_m} \sum_{i=1}^{N_m}\sum_{j=1}^{M_m} |P(i, j; t) - P_{Ref}(i, j; t_0)|$$

where: P(i,j;t) is a pixel value at location (i,j) and time t; $P_{Ref}(i,j;t_0)$ is a pixel value at location (i,j) of a reference frame at time 0; and $N_m$ and $M_m$ are dimensions of said portion. A value of said rate of change feature may be higher for a smoke condition than for a dust condition.

In accordance with another aspect of the invention is a computer program product that detects a fire condition comprising executable code that: determines a lighting view associated with a frame; if said lighting view is an opposite lighting view, determines a number of pixels associated with a portion of a frame in accordance with a lighting view of said frame, said number of pixels representing a number of pixels in said portion which increase or decrease by an amount exceeding a brightness threshold with respect to a reference frame, each of said number of pixels being connected to a minimum number of neighboring pixels in terms of space, and determining a ratio of said number of pixels for a current frame with respect to said number of pixels of a reference frame; and if said ratio exceeds a first threshold, determines that a fire condition exists, said first ratio being determined in accordance with the opposite lighting view. For a current frame at a time tk, said ratio may be represented as a percentage of fading with an opposite view configuration:

$$Fading(t_k) = 100 \times \frac{\sum_{m=1}^{M/S_s}\sum_{n=1}^{N/S_s}\left\{\left(\sum_{i=-1}^{i=1}\sum_{j=-1}^{j=1} |P(S_s m + i, S_s n + j; t_k) - P_{Ref}(S_s m + 1, S_s n + j; t_0)| > D_0\right) > C_0\right\}}{Fading(t_0)}\%$$

wherein $Fading(t_0)$ is a number of bright and connected pixels generated by an opposite light of a reference image represented by:

$$Fading(t_0) = \sum_{m=1}^{M/S_s}\sum_{n=1}^{N/S_s}\left\{\left(\sum_{i=-1}^{i=1}\sum_{j=-1}^{j=1} P_{Ref}(S_s m + 1, S_s n + j; t_0) > D_0\right) > C_0\right\}$$

such that $Fading(t_0)$ is non zero; (M,N) designates dimensions of said portion; $D_0$ is said brightness threshold determined in accordance with an opposite lighting view; $S_S$ is a sweeping step across one of a horizontal and vertical directions; and $C_0$ is a clustering threshold that is said minimum number of neighboring pixels in terms of space. Each of said number of pixels in said current frame may exceed said brightness threshold and said minimum number of neighboring pixels for a predetermined number of previous samples representing a time connectivity, said predetermined number being greater than zero. The computer program product may also include: executable code that determines if said lighting view is one of: an overhead and near view lighting, and if so, determining a feature for said portion as a number of fading/glowing pixels represented as:

$$FG(t_k) = \sum_{m=1}^{M/S_s}\sum_{n=1}^{N/S_s}\left\{\left(\sum_{i=-1}^{i=1}\sum_{j=-1}^{j=1} |P(S_s m + i, S_s n + j; t_k) - P_{Ref}(S_s m + i, S_s n + j; t_0)| > D\right) > C_0\right\}$$

wherein $D_0$ of FG(tk) is determined in accordance with one of said overhead and near lighting views; and executable code that determines a fire condition if FG(tk) exceeds a second threshold selected in accordance with one of said overhead and near lighting views. The opposite lighting view and at least one of said overhead and near lighting views may be used in determining whether a fire condition exists. A fire condition may be determined if at least one of said first and second thresholds are exceeded. The computer program product may also include: executable code that determines whether Fading($t_0$) is non zero; and executable code that, if Fading($t_0$) is not non-zero, determines existence of a system problem. The computer program product may also include: executable code that, in response to determining an existence of a system problem, selects a different feature for use with said current frame other than Fading($t_k$).

In accordance with one aspect of the invention is a method of detecting a fire condition comprising: determining at least one feature for a portion of a frame of video data; processing said at least one feature using fuzzy logic and producing an output; and determining whether a fire condition exists using said output. A second feature may be processed using said fuzzy logic and said second feature characterizes non-visual data. The second feature may be a reading from a sensor. The second feature may be one of: relative humidity and temperature. The at least one feature may be based on pixel intensity of said portion. The at least one feature may be an absolute average gray level represented by:

$$\mu(t) = \frac{1}{N_m \times M_m} \sum_{i=1}^{N_m} \sum_{j=1}^{M_m} |P(i, j; t) - P_{Ref}(i, j; t_0)|$$

where P(i,j;t) is the pixel value of a pixel at location (i,j) and time t; $P_{Ref}$(i,j;$t_0$) is a pixel value at location (I,j) of a reference frame at a time 0; and $N_m$ and $M_m$ are dimensions of said portion of said frame. The at least one feature may be obtained in accordance with an opposite lighting view. The processing may also comprise: projecting said at least one feature using a rule into at least one fuzzy set; applying a logical operator to determine a degree of support for said rule; and determining said output in accordance with said degree of support. The method may also include: comparing said output to a threshold; and determining whether a fire condition exists in response to said comparing. The output may be a probability of confirmation representing a degree of certainty that a fire condition exists. The processing may use a Mamdani approach. The output, y, may be represented as:

$$y = Df\left(\underset{\substack{\{r,s\}=\{1,1\}\\r\neq s}}{\overset{\{r,s\}=\{R,R\}}{Ag}}\left[Ip\left(W_r \underset{\substack{\{a,b\}=\{1,1\}\\a\neq b}}{\overset{\{a,b\}=\{A_r A_r\}}{Op}} (MF_{ar}(x_{ar}), MF_{br}(x_{br})), MF_{cr}\right),\right.\right.$$
$$\left.\left. Ip\left(W_r \underset{\substack{\{a,b\}=\{1,1\}\\a\neq b}}{\overset{\{a,b\}=\{A_r A_r\}}{Op}} (MF_{ar}(x_{ar}), MF_{br}(x_{br})), MF_{cr}\right)\right]\right)$$

wherein R represents one or more rules involved in a inference fuzzy system; $A_r$ represents one or more antecedents per rule "r", said rule including one or more antecedents and a rule consequent Cr, each pair of antecedents is connected by a logical operator; $x_{ar}$ represents an input value of an antecedent "a" of the rule "r"; $MF_{ar}$ represents a membership function at an antecedent "a" of a rule "r"; MFc, represents a membership function at a unique consequent "c" of a rule "r"; $\mu_r$(a) represents a membership degree at a given antecedent "a"; Ip(.,.) represents an implication method; Ag(.,.) represents an aggregation method; Op(.,.) represents one of a logical T-norm and S-norm operator; $W_r$ represents a weight of a rule "r"; Df(.,.) represents a defuzzification method; Fo represents a resulting fuzzy set of all rules; and y represents said output of the fuzzy inference system. The processing may use an area centroid approach as a defuzzification operator with a Mamdani-type fuzzy inference system. The output, y, may be represented as:

$$y = CENTROID\left(\underset{\substack{\{r,s\}=\{1,1\}\\r\neq s}}{\overset{\{r,s\}=\{R,R\}}{MAX}}\left[Min\left(W_r \underset{\substack{\{a,b\}=\{1,1\}\\a\neq b}}{\overset{\{a,b\}=\{A_r A_r\}}{Min}} (\Gamma_{ar}(x_{ar}), \Gamma_{br}(x_{br})), \Gamma_{cr}\right),\right.\right.$$
$$\left.\left. Min\left(W_r \underset{\substack{\{a,b\}=\{1,1\}\\a\neq b}}{\overset{\{a,b\}=\{A_r A_r\}}{Min}} (\Gamma_{ar}(x_{ar}), \Gamma_{br}(x_{br})), \Gamma_{cr}\right)\right]\right)$$

where Γ stands for a Gaussian membership function. The method may also include: comparing y to a threshold; and determining a fire condition if y exceeds said threshold. The at least three features may be processed using said fuzzy logic, said at least three features including: temperature, relative humidity, and an absolute value of an average grey level of pixel intensity for said portion. Fuzzy representations of said relative humidity may be represented using a membership function with three overlapping regions, each of said three overlapping regions, respectively, being associated with a dry condition, a humid condition, and a foggy condition. Fuzzy representations of said relative humidity may be represented using a membership function with two non-overlapping regions, each of said two non-overlapping regions, respectively, being associated with a dry condition and a humid condition. Overlap of two or more of said regions may increase as inaccuracy of a sensor recording relative humidity increases. Fuzzy representations of said temperature may be represented using a membership function with three overlapping regions, each of said three overlapping regions, respectively, being associated with a low temperature condition, a medium temperature condition, and a large temperature condition. Fuzzy representations of said absolute value of an average grey level of pixel intensity may be represented using a membership function with three overlapping regions, each of said three overlapping regions, respectively, being associated with a low intensity condition, a medium intensity condition, and a large intensity condition. Y may be a probability of confirmation representing a degree of certainty that a fire condition exists. Y may be a defuzzified value represented as:

$$\text{Probability of confirmation} = \frac{\sum_{i=1}^{N} i \times \text{area}(i)}{\sum_{i=1}^{N} \text{area}(i)}$$

where area(i) is a membership function of an aggregated fuzzy output function at a sample i; and N is a number of samples defined by a final fuzzy output shape and a sampling period. Membership sets of said probability of confirmation may be selected to have a minimum overlap. The probability of confirmation may be used to make a final determination about a fire condition.

In accordance with another aspect of the invention is a method of setting an indicator comprising: determining at least one feature for a portion of a frame of video data; processing said at least one feature using fuzzy logic and producing an output; and determining whether to set said indicator positively indicating a condition using said output. The processing may use at least one additional feature characterizing non-visual data. The at least one additional feature may include a reading from a sensor.

In accordance with another aspect of the invention is a computer program product that detects a fire condition comprising executable code that: determines at least one feature for a portion of a frame of video data; processes said at least one feature using fuzzy logic and producing an output; and determines whether a fire condition exists using said output. The computer program product may also include executable code that processes a second feature using said fuzzy logic and said second feature characterizes non-visual data. The second feature may be a reading from a sensor. The second feature may be one of: relative humidity and temperature. The at least one feature may be based on pixel intensity of said portion. The at least one feature may be an absolute average gray level represented by:

$$\mu(t) = \frac{1}{N_m \times M_m} \sum_{i=1}^{N_m} \sum_{j=1}^{M_m} |P(i, j; t) - P_{Ref}(i, j; t_0)|$$

where: $P(i,j;t)$ is the pixel value of a pixel at location $(i,j)$ and time t; $P_{Ref}(i,j;t_0)$ is a pixel value at location $(I,j)$ of a reference frame at a time 0; and $N_m$ and $M_m$ are dimensions of said portion of said frame. The at least one feature may be obtained in accordance with an opposite lighting view. The executable code that processes may further comprise executable code that: projects said at least one feature using a rule into at least one fuzzy set; applies a logical operator to determine a degree of support for said rule; and determines said output in accordance with said degree of support. The computer program product may also include, executable code that: compares said output to a threshold; and determines whether a fire condition exists in response to said comparing. The output may be a probability of confirmation representing a degree of certainty that a fire condition exists. The executable code that processes may use a Mamdani approach. The output, y, may be represented as:

$$y = Df\left(\underset{\substack{\{r,s\}=\{1,1\}\\r\neq s}}{\overset{\{r,s\}=\{R,R\}}{Ag}}\left[Ip\left(W_r \underset{\substack{\{a,b\}=\{1,1\}\\a\neq b}}{\overset{\{a,b\}=\{A_r A_r\}}{Op}}(MF_{ar}(x_{ar}), MF_{br}(x_{br})), MF_{cr}\right),\right.\right.$$
$$\left.\left. Ip\left(W_r \underset{\substack{\{a,b\}=\{1,1\}\\a\neq b}}{\overset{\{a,b\}=\{A_r A_r\}}{Op}}(MF_{ar}(x_{ar}), MF_{br}(x_{br})), MF_{cr}\right)\right]\right)$$

wherein R represents one or more rules involved in a inference fuzzy system; $A_r$ represents one or more antecedents per rule "r", said rule including one or more antecedents and a rule consequent Cr, each pair of antecedents is connected by a logical operator; $x_{ar}$ represents an input value of an antecedent "a" of the rule "r"; $MF_{ar}$ represents a membership function at an antecedent "a" of a rule "r"; $MF_{cr}$ represents a membership function at a unique consequent "c" of a rule "r"; $\mu_r(a)$ represents a membership degree at a given antecedent "a"; Ip(.,.) represents an implication method; Ag(.,..) represents an aggregation method; Op(.,..) represents one of a logical T-norm and S-norm operator; $W_r$ represents a weight of a rule "r"; Df(.,.) represents a defuzzification method; Fo represents a resulting fuzzy set of all rules; and y represents said output of the fuzzy inference system. The executable code that processes may use an area centroid approach as a defuzzification operator with a Mamdani-type fuzzy inference system. The output, y, may be represented as:

$$y = CENTROID\left(\underset{\substack{\{r,s\}=\{1,1\}\\r\neq s}}{\overset{\{r,s\}=\{R,R\}}{MAX}}\left[Min\left(W_r \underset{\substack{\{a,b\}=\{1,1\}\\a\neq b}}{\overset{\{a,b\}=\{A_r A_r\}}{Min}}(\Gamma_{ar}(x_{ar}), \Gamma_{br}(x_{br})), \Gamma_{cr}\right),\right.\right.$$
$$\left.\left. Min\left(W_r \underset{\substack{\{a,b\}=\{1,1\}\\a\neq b}}{\overset{\{a,b\}=\{A_r A_r\}}{Min}}(\Gamma_{ar}(x_{ar}), \Gamma_{br}(x_{br})), \Gamma_{cr}\right)\right]\right)$$

where $\Gamma$ stands for a Gaussian membership function. The computer program product may further comprise executable code that: compares y to a threshold; and determines a fire condition if y exceeds said threshold. The at least three features may be processed using said fuzzy logic, said at least three features including: temperature, relative humidity, and an absolute value of an average grey level of pixel intensity for said portion. Fuzzy representations of said relative humidity may be represented using a membership function with three overlapping regions, each of said three overlapping regions, respectively, being associated with a dry condition, a humid condition, and a foggy condition. Fuzzy representations of said relative humidity may be represented using a membership function with two non-overlapping regions, each of said two non-overlapping regions, respectively, being associated with a dry condition and a humid condition. Overlap of two or more of said regions may increase as inaccuracy of a sensor recording relative humidity increases. Fuzzy representations of said temperature may be represented using a membership function with three overlapping regions, each of said three overlapping regions, respectively, being associated with a low temperature condition, a medium temperature condition, and a large temperature condition. Fuzzy representations of said absolute value of an average grey level of pixel intensity may be represented using a membership function with three overlapping regions, each of said three overlapping regions, respectively, being associated with a low intensity condition, a medium intensity condition, and a large intensity condition. Y may be a probability of confirmation representing a degree of certainty that a fire condition exists. Y may be a defuzzified value represented as:

$$\text{Probability of confirmation} = \frac{\sum_{i=1}^{N} i \times \text{area}(i)}{\sum_{i=1}^{N} \text{area}(i)}$$

where: area(i) is a membership function of an aggregated fuzzy output function at a sample i; N is a number of samples defined by a final fuzzy output shape and a sampling period. Membership sets of the probability of confirmation may be selected to have a minimum overlap. The probability of confirmation may be used to make a final determination about a fire condition.

In accordance with another aspect of the invention is a computer program product that sets an indicator comprising executable code that: determines at least one feature for a portion of a frame of video data; processes said at least one feature using fuzzy logic and producing an output; and determines whether to set said indicator positively indicating a condition using said output. The executable code that processes may use at least one additional feature characterizing non-visual data. The at least one additional feature may include a reading from a sensor.

In accordance with one aspect of the invention is a method of analyzing visual data, comprising: obtaining a current frame of visual data; determining a number of segments of the current frame; and determining that the current frame is not indicative of smoke based a criteria that varies according to the number of segments in the current frame. The method may also include: obtaining a background frame of visual data; and determining a number of segments of the background frame. The criteria may also vary according to the number of segments in the background frame. The criteria may be the difference between the number of segments of the current frame and the number of segments of the background frame and wherein it may be determined that the current frame is not indicative of smoke if the difference is greater than a predetermined value. The method may include: if the difference between the number of segments of the current frame and the number of segments of the background frame is not greater than a predetermined value, performing follow on processing to determine if the current frame is indicative of smoke. The segments may be closed loop segments. The segments may be segments of a particular length or greater. The segments may be segments of a particular length or smaller. The segments may be segments of a particular curvature or greater. The segments may be segments of a particular curvature or smaller. The number of segments of the current frame may vary according to a number of edges of the current frame. The number of segments of the background frame may vary according to a number of edges of the background frame. The criteria may vary according to standard deviation of frame intensity. The criteria may vary according to standard deviation of frame intensity. The criteria may vary according to a value of a gradient norm and higher statistics thereof. The criteria may vary according to a value of a gradient norm and higher statistics thereof. The criteria may vary according to a rate of change of number of segments.

In accordance with another aspect of the invention is computer software that analyzes visual data, comprising: executable code that obtains a current frame of visual data; executable code that determines a number of segments of the current frame; and executable code that determines that the current frame is not indicative of smoke based a criteria that varies according to the number of segments in the current frame. The computer software may also include: executable code that obtains a background frame of visual data; and executable code that determines a number of segments of the background frame. The criteria also may vary according to the number of segments in the background frame. The criteria may be the difference between the number of segments of the current frame and the number of segments of the background frame and wherein it may be determined that the current frame is not indicative of smoke if the difference is greater than a predetermined value. The computer software may include: executable code that performs follow on processing to determine if the current frame is indicative of smoke if the difference between the number of segments of the current frame and the number of segments of the background frame is not greater than a predetermined value. The segments may be at least one of: closed loop segments, segments of a particular length or greater, segments of a particular length or smaller, segments of a particular curvature or greater, segments of a particular curvature or smaller, and segments of the current frame may vary according to a number of edges of the current frame. The number of segments of the background frame may vary according to a number of edges of the background frame. The criteria may vary according to standard deviation of frame intensity. The criteria may vary according to standard deviation of frame intensity. The criteria may vary according to a value of a gradient norm and higher statistics thereof. The criteria may vary according to a value of a gradient norm and higher statistics thereof. The criteria may vary according to a rate of change of number of segments.

In accordance with one aspect of the invention is a system for acquiring camera data in a space, comprising: a plurality of cameras disposed in the space; a first plurality of illumination units wherein each of the first plurality of illumination units is disposed proximal to one of the cameras; a second plurality of illumination units disposed overhead in the space; and a control unit that controls actuation of the illumination units and the cameras. The system may include: a plurality of filters that filter energy provided to the cameras, wherein the filters pass energy corresponding to the output of the illumination units. The filters may pass light having a wavelength of above approximately 800 nm. The control unit may actuate different combinations of illumination units while the cameras acquire data. The different combinations may be selected from one or more of the following: all illumination units on, all illumination units off, only the second plurality of illumination units on, and only a subset of the first plurality of illumination units on. The cameras may be CCD cameras. The first and second plurality of illumination units may emit light in the NIR band. The filters may filter out visible light. The cameras may be CCD cameras and the first and second plurality of illumination units may emit light in the NIR band.

In accordance with another aspect of the invention is a system for acquiring camera data in a space, comprising: cameras means for accepting camera data; a first plurality of illumination unit means disposed proximal to the camera means; a second plurality of illumination unit means disposed overhead in the space; and control means for controlling actuation of the illumination unit means and the camera means. The system may include: a plurality of filters means for filtering energy provided to the cameras and for passing energy corresponding to the output of the illumination units. The filter means may pass light having a wavelength of above approximately 800 nm. The control means may actuate different combinations of illumination units while the cameras acquire data.

In accordance with another aspect of the invention is a method of acquiring data in a space, comprising: placing a plurality of cameras in the space; placing a plurality of illumination units in the space, wherein some of the illumination units are overhead in the space and some of the illumination units are associated with each of the cameras; and actuating the illumination units while the cameras acquire the data. Actuating the illumination units may include actuating different combinations of illumination units while the cameras acquire data. The different combinations may be selected from one or more of the following: all illumination units on, all illumination units off, and only a subset of the plurality of illumination units on. The method may also include: filtering out light having a particular range of wavelengths. The particular range of wavelengths includes visible light. The cameras may be CCD cameras and the illumination units may emit light in the NIR band.

In accordance with another aspect of the invention is computer software that acquires data in a space, comprising: executable code that actuates a plurality of cameras; and executable code that actuates a plurality of illumination units while the cameras acquire the data, wherein different combinations of illumination units to be actuated are selected from one or more of the following: all illumination units on, all illumination units off, and only a subset of the plurality of illumination units on. The computer software may include: executable code that causes undesirable light to be filtered out.

In accordance with another aspect of the invention is a method of compensating for ambient light in connection with video data collection, comprising: obtaining at least one reference frame of data corresponding to no illumination units being actuated; obtaining a plurality of frames of data while at least one illumination unit is actuated; and adjusting each of the frames of data by subtracting therefrom a frame corresponding to the at least one reference frame. A different reference frame may be obtained prior to obtaining each of the plurality of frames of data. Obtaining at least one reference frame may include: obtaining a first reference frame prior to obtaining each of the plurality of frames of data; obtaining a second reference frame after obtaining each of the plurality of frames of data; and averaging the first and second reference frames to provide the frame corresponding to the at least one reference frame. The first reference frame for a particular iteration may be the second reference frame for a previous iteration. The at least one reference frame may be obtained prior to obtaining the plurality of frames. The method may also include: periodically obtaining a new reference frame. The method may include: adjusting intensity of the at least one illumination unit to avoid pixel saturation. The method may further comprise: adjusting camera settings to avoid pixel saturation. The method may also include: compensating for differences in gain associated with the at least one reference frame and the plurality of frames of data.

In accordance with another aspect of the invention is software that compensates for ambient light in connection with video data collection, comprising: executable code that obtains at least one reference frame of data corresponding to no illumination units being actuated; executable code that obtains a plurality of frames of data while at least one illumination unit is actuated; and executable code that adjusts each of the frames of data by subtracting therefrom a frame corresponding to the at least one reference frame. A different reference frame may be obtained prior to obtaining each of the plurality of frames of data. The executable code that obtains at least one reference frame may include executable code that obtains a first reference frame prior to obtaining each of the plurality of frames of data, executable code that obtains a second reference frame after obtaining each of the plurality of frames of data, and executable code that averages the first and second reference frames to provide the frame corresponding to the at least one reference frame. The first reference frame for a particular iteration may be the second reference frame for a previous iteration. The at least one reference frame may be obtained prior to obtaining the plurality of frames. The computer software may include: executable code that periodically obtains a new reference frame. The computer software may include: executable code that adjusts intensity of the at least one illumination unit to avoid pixel saturation. The computer software may also include: executable code that adjusts camera settings to avoid pixel saturation. The computer software may further comprise: executable code that compensates for differences in gain associated with the at least one reference frame and the plurality of frames of data.

BRIEF DESCRIPTION OF DRAWINGS

Features and advantages of the present invention will become more apparent from the following detailed description of exemplary embodiments thereof taken in conjunction with the accompanying drawings in which:

FIG. 75 is a graphical representation of different defuzzification methods for example universe of discourses;

DESCRIPTION OF EMBODIMENT(S)

Figure 1:
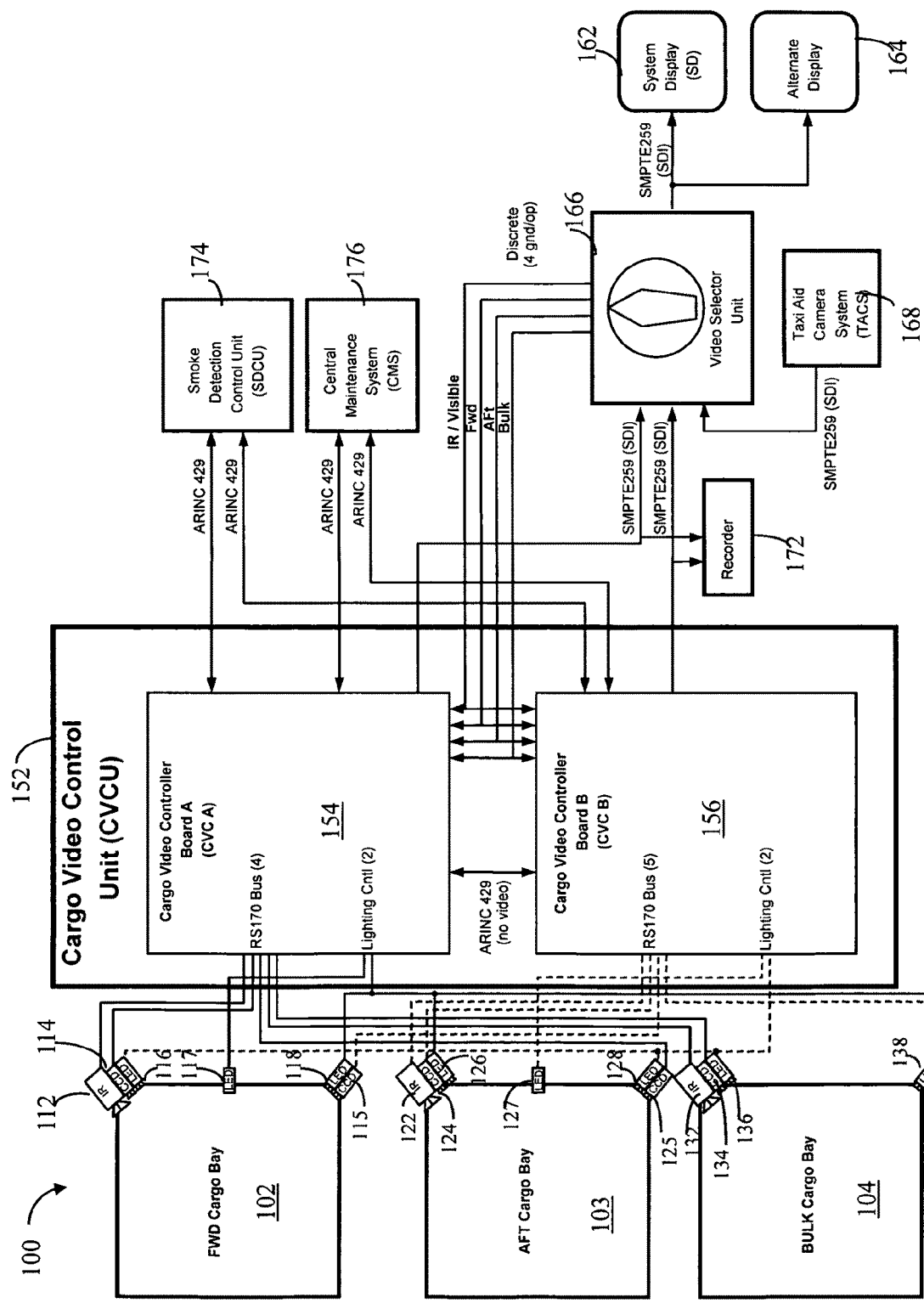
FIG. 1 shows hardware for implementing the system described herein.

Referring to FIG. 1, a diagram 100 shows a system for monitoring and automatic detection and verification of fire within aircraft. The system described herein may be seen as particular application of a more general Autonomous Vision System (AVS) which is a concept for a family of products. The AVS provides a user with a tireless automated surveillance capability to monitor various elements of the aircraft integrity. The system may be used in applications where surveillance is needed and simple decisions for immediate corrective actions are well defined. Most of the hardware and software described herein is expandable to various applications of the AVS where analysis of "visual" phenomena is expected.

The system monitors a plurality of aircraft cargo bays 102-104 to detect/verify the presence of fire. The cargo bay 102 includes an IR (infrared) camera 112, two CCD (charge coupled device) cameras 114, 115, and a plurality of LED (light emitting diodes) sources 116-118 that are used to detect and verify the presence of fire within the cargo 155 bay 102. Similarly, the cargo bay 103 includes an IR camera 122, two CCD cameras 124, 125, and a plurality of LED sources 126-128. The cargo bay 104 includes an IR camera 132, two CCD cameras 134, 135, and two LED sources 136, 138. In an embodiment disclosed herein, the components 112, 114, 115-118, 122, 124, 125-128, 132, 134, 135, 136, 138 provide redundant coverage so that failure of one component does not result in failure of the entire system. Accordingly, in some embodiments, fire detection may be adequately performed even after failure of one of the IR cameras 112, 122, 132. Note also that the system could use chemical sensors (not shown) to detect, for example, an increase in $CO_2$ in one of the cargo bays 102-104. The additional information could be used by follow on processing to help determine the presence of a fire condition.

The IR cameras 112, 122, 132 measure IR energy (i.e., heat) provided in each of the respective ones of the cargo bays 102-104. The CCD cameras 114, 115, 124, 125, 134, 135 measure and provide signals of visible light in each of the cargo bays 102-104. In some instances, there may be no ambient light in the cargo bays 102-104. The LEDs 116-118, 126-128, 136, 138 provide light in each of the cargo bays 102-104. The LEDs 116-118, 126-128, 136, 138 may be actuated by an external source or may simply provide illumination in a way that may be synchronized with the CCD cameras 114, 115, 124, 125, 134, 135.

Note that, as used herein, the term "video" includes the output of the IR cameras, whether visible or not and whether the output is provided in any conventional format or not. Similarly, the term "video" also includes output of the CCD/CMOS cameras, whether visible or not and whether the output is provided in any conventional format or not.

The cameras 112, 114, 115, 124, 125, 132 134, 135 and the LEDs 116-118, 126-128, 136, 138 may be mounted in any location within the cargo bays 102-104. However, for an embodiment disclosed herein, the cameras 112, 114, 115, 124, 125, 132 134, 135 are mounted in an upper corner of each of the cargo bays 102-104. In addition, the LEDs may be mounted anywhere within the cargo bays 102-104. However, for an embodiment disclosed herein, each of the cameras has an LED unit mounted therewith. However, as shown in the diagram 100, there may also be LED's 117, 127 that are not directly mounted in relatively close proximity with any of the cameras 112, 114, 115, 124, 125, 132 134, 135. Note also that, for an embodiment disclosed herein, each of the IR cameras 112, 122, 132 is mounted proximate to a corresponding on of the CCD cameras 114, 124, 134. However, for other embodiments, it may be possible to have one or more IR cameras not mounted in relatively close proximity to a corresponding CCD camera.

Note also that it is possible to provide any number of cameras to each of the cargo bays 102-104. Providing additional cameras for each of the cargo bays 102-104 would tend to improve the accuracy of the result but would also tend to increase the amount of processing needed. The cameras and LED's that are mounted proximate to one another may be provided in a protective enclosure (not shown).

Each of the CCD cameras 114, 115, 124, 125, 134, 135 may be any conventional CCD camera having at least 320 by 240 pixel resolution. A wide-angle lens (e.g., 90 degrees) may provided with one or more of the CCD cameras 114, 115, 124, 125, 134, 135. In some embodiments, the CCD cameras 114, 115, 124, 125, 134, 135 may have at least a 640 by 480 pixel resolution. Different ones of the cameras 114, 115, 124, 125, 134, 135 may have different resolution than other ones of the cameras 114, 115, 124, 125, 134, 135. The CCD cameras 114, 115, 124, 125, 134, 135 may be sensitive to light wave lengths between 400 and 1000 nanometers at better than 1 lux. Such a camera may be provided by, for example, using a Pulnix model TM-7EG CCD camera with filters. Note also that the CCD cameras 114, 115, 124, 125, 134, 135 may have on-board DSP processing (and corresponding hardware) and/or may be used with other DSP processing provided therewith.

The IR cameras 112, 122, 132 may have a resolution of at least 320 by 240 pixels and be sensitive to wave lengths between 8 and 13 microns. An appropriate IR camera may be provided, for example, by the Raytheon OEM Series 300 model. Different ones of the cameras 112, 122, 132 may have different resolution than other ones of the cameras 112, 122, 132. Note also that the IR cameras 112, 122, 132 may have on-board DSP processing (and corresponding hardware) and/or may be used with other DSP processing provided therewith. In addition, in some embodiments, no IR cameras may be used, in which case the processing described herein will be performed for CCD cameras.

The LEDs may be any conventional homogenious LED providing an appropriate amount and wave length of light for the CCDs to operate. For example, the LEDs may provide light at 800 nanometers.

Note that, as will become apparent from the discussion herein, the performance and resolution of the cameras and the LEDs may be a function of the processing power used to process the information from the cameras. Thus, for example, the cameras may be provided with additional resolution provided that the follow on processing system that processes the data from the cameras can handle the improved resolution. In some embodiments, the CCD cameras 114, 115, 124, 125, 134, 135 provide 30 frames per second, although other frame rates may be possible provided that the other rates are consistent with the processing for detecting fires. The follow on processing may process, for example, one out of ten video frames although, for some embodiments, this may be accomplished by having the follow on processing process five successive frames out of every fifty. Other rates and techniques for processing a subset of the frames may also be used. The CCD cameras 114, 115, 124, 125, 134, 135 may also provide a black and white (i.e., gray scale) output rather than a color output. In instances where the CCD cameras provides a color output, the color information may be converted to a gray scale and/or may be used to provide additional detection using the additional information provided by the color.

Note that the CCD cameras may also be replaced by another type of camera (such as CMOS cameras) that handle light in and around the visible spectrum. Thus, for the discussion herein, references to the CCD cameras will be understood to include other types of cameras capable of detecting light as described herein. In an embodiment herein, the CCD camera has a size of no greater than 4.7" by 0.8" by 0.8", a weight of no greater than 0.075 lbs. A power consumption of no greater than 2.5 watts, an operating temperature between −10 to 60 degrees centigrade, a storage temperature of between −40 to 80 degrees centigrade, a resolution of 640× 480 pixels, and an optical wavelength response of between 400 and 1000 nanometers. The CCD camera may detect temperatures above 700K due, at least in part, to the wavelength response thereof. In some embodiments, the CCD camera may work with an automatic gain control to adjust for the amount of light provided in the cargo bay. Note that, in some embodiments, the CCD cameras may only have a response in the range of 400 to 700 nm, in which case additional cameras having a response in the range of 700-1000 nm may or may not also be used. The CCD cameras may use special lenses having, for example, a seventy five degree or ninety degree field of view. Other wide angle lenses, such as two-hundred and seventy degrees or even three-hundred and sixty degrees may be used.

The IR cameras may be uncooled (also known as a Focal Plane Array (FPA)) and may have a size of no greater than 6.5" by 2.2" by 2.2", a weight of no greater than 0.5 lbs., a power consumption of less than 1.2 watts, an operating temperature of between −10 and 60 degrees-centigrade, a storage temperature of between −40 and 80 degrees centigrade, and an optical wavelength response of between 7 and 14 micrometers. The IR cameras may use special lenses having, for example, a seventy five degree or ninety degree field of view. Other wide angle lenses, such as two-hundred and seventy degrees or even three-hundred and sixty degrees may be used. The lens may be made out of Germanium, but Zinc Selenide may also be used. The FPA may be made out of amorphous silicon and have a 160×120 resolution. The IR cameras may detect temperatures of 230K and above and thus may not require additional illumination, Similarly, in an embodiment disclosed herein, the LEDs have a size of no greater than 2"×2"×2", a weight of no more than 0.125 lbs., a power consumption of no more than 1.5 watts, an operating temperature of between −40 to 70 degrees centigrade, and a storage temperature of between −55 and 120 degrees centigrade, and an optical wave length of around 820 nanometers.

The signals from the camera may be provided to a cargo video control unit (CVCU) 152. The CVCU 152 accepts signals from the cameras 112, 114, 115, 122, 124, 125, 132, 134, 135 and provides lighting control signals to the LED's 116-118, 126-128, 136, 138. In some embodiments, the CVCU 152 may receive digital data from the CCD cameras 114, 115, 124, 125, 134, 135. Alternatively, the CVCU 152 may use a frame grabber to convert an analog video signal from one or more of the cameras 114, 115, 124, 125, 134, 135 to one or more appropriate digital signals.

The CVCU 152 contains conventional on board processing to receive and send signals, as described herein, and to provide appropriate processing of the signals input thereto to determine if a fire can be verified. The CVCU 152 may contain a DSP chip or other DSP hardware to facilitate processing.

In an embodiment disclosed herein, the CVCU 152 is redundant and includes a first processing board 154 and a second processing board 156 having identical functionality to the first processing board 154. The design of the CVCU is redundant so that if one of the boards 154, 156 fails, the other one of the boards 154, 156 may perform the functions of the failed board. When the boards 154, 156 have not failed, one of the boards 154, 156 may be used to provide the processing described herein. Alternatively, in an embodiment disclosed herein, one of the boards 154, 156 may be used to process approximately half of the input signals while the other one of the boards 154, 156 may be used to process the remaining signals. The independent results provided by each of the boards may then be used for follow on processing, as described below.

Each of the boards 154, 156 contains appropriate hardware for receiving input signals, such as signals from the cameras 112, 114, 115, 122, 124, 125, 132, 134, 135.

Each of the boards 154, 156 may also include appropriate hardware for actuating the LEDs and include appropriate processing for performing the detection/verification discussed herein. Each of the boards 154, 156 may also contain hardware for providing appropriate video output to be viewed by the user of the system, as described below. In an embodiment disclosed herein, each of the boards 154, 156 may operate in parallel to provide separate results that may be used by follow on processing.

The system includes a system video display 162 and an alternate video display 164. The system video display 162 may be a video screen provided in a cockpit for the for other purposes. The alternative video display 164 may be another alternative display provided for use in the cockpit for other purposes or may be provided for the sole purpose of use with the system described herein.

A video selector unit 166 provides a signal to the boards 154, 156 to select a particular video signal to be viewed on the system video display 162 and/or the alternative video display 164. The video selector unit 166 operates in a conventional fashion to provide a conventional signal to the boards 154, 156 indicating a position of a manually moveable actuator of the video selector unit 166. In response, the boards 154, 156 provide the selected video output signal to the video selector unit 166 which is then displayed on one or both of the system video display 162 and the alternate video display 164. The system may overlay a text message on one or both of the video displays 162, 164 to indicate the results of the other processing described herein. The output from an IR camera may be converted to a visual form so that, for example, different colors represent different temperatures. A conventional taxi aid camera system 168 may also provide a video input to the video selector unit 166 so that the video selector unit 166 may also select for display the video output from the taxi aid camera system 168. A recorder 172 may record the video output that is provided by the boards 154, 156.

The video signal provided to the video displays 162, 164 may be either the video signal provided directly by the cameras or may be an enhanced video signal, which represents the video signal from the cameras that has been processed to remove unwanted artifacts, such as die effects of vibration and distortion caused by lenses. Providing the enhanced video signal is described in more detail below.

In addition, in some cases, such as of a cargo compartments being fully filled with containers, the video signal from the cameras or even the enhanced video signal may not provide sufficient information about the state of the compartment (e.g., whether the compartment contains smoke, fog, dust, etc. and/or whether the compartment is in a fire or non-fire state). In those cases, the multiple two-dimensional camera views may be used to synthesize a three-dimensional view. The walls of the compartment and/or the contents may be represented in a wire frame form. Algorithms for doing this are known in the art. Then, the locations of suspected fire regions may be displayed within those frames. In some embodiments, one or more edge detection routines such as those disclosed herein may be used to outline a suspicious feature and a graphical outline of the feature may be superimposed on the video signal (raw, enhanced, and/or synthetic) to provide more information. An option of overriding the synthetic view option and returning to regular or enhanced video mode could be provided to allow verification of the source of the displayed diagnosis.

A conventional smoke detection control unit 174 and a central maintenance system 176 may also interface with the CVCU 152. The smoke detection control unit 174 indicates whether a fire has been detected by the conventional cargo bay fire detection system. In an embodiment disclosed herein, the signal from the smoke detection control unit 174 performs a gating function so that a user only receives an indicator of fire after the smoke detection and control unit 174 has provided a signal indicating the presence of fire. In other embodiments the signal from the smoke detection control unit 174 is one of the inputs to follow on processing so that it is possible for the user to receive an indication that a fire is present even though the smoke detection control unit 174 has not detected a fire.

The central maintenance system 176 provides signals such as weight on wheels and ambient temperature which are used by the system in a manner discussed in more detail elsewhere herein. Other signals that may be provided by the smoke detection control unit 174 and/or the central maintenance system 176 include an indicator of whether fire suppression steps have already been taken. Note that some fire suppression steps (such as the spraying of Halon) may effect the fire detection/verification system and may be handled by, for example, filtering out any image distortion caused by the fire suppression steps.

The CVCU 152 contains processors that can run software that processes image data from the cameras to verify if a detected fire is a false alarm or not. That is, the software of the CVCU 152 receives as input video image data from the cameras and other external information, described below, and provides, as an output, video data to be displayed on one or both of the system video display 162 and alternate video display 164, and in addition, provides an indicator of whether a detected fire is a false alarm. For an embodiment disclosed herein, the components may communicate by any appropriate means, such as, for example, using an ARINC 429 transmit bus.

Figure 2:
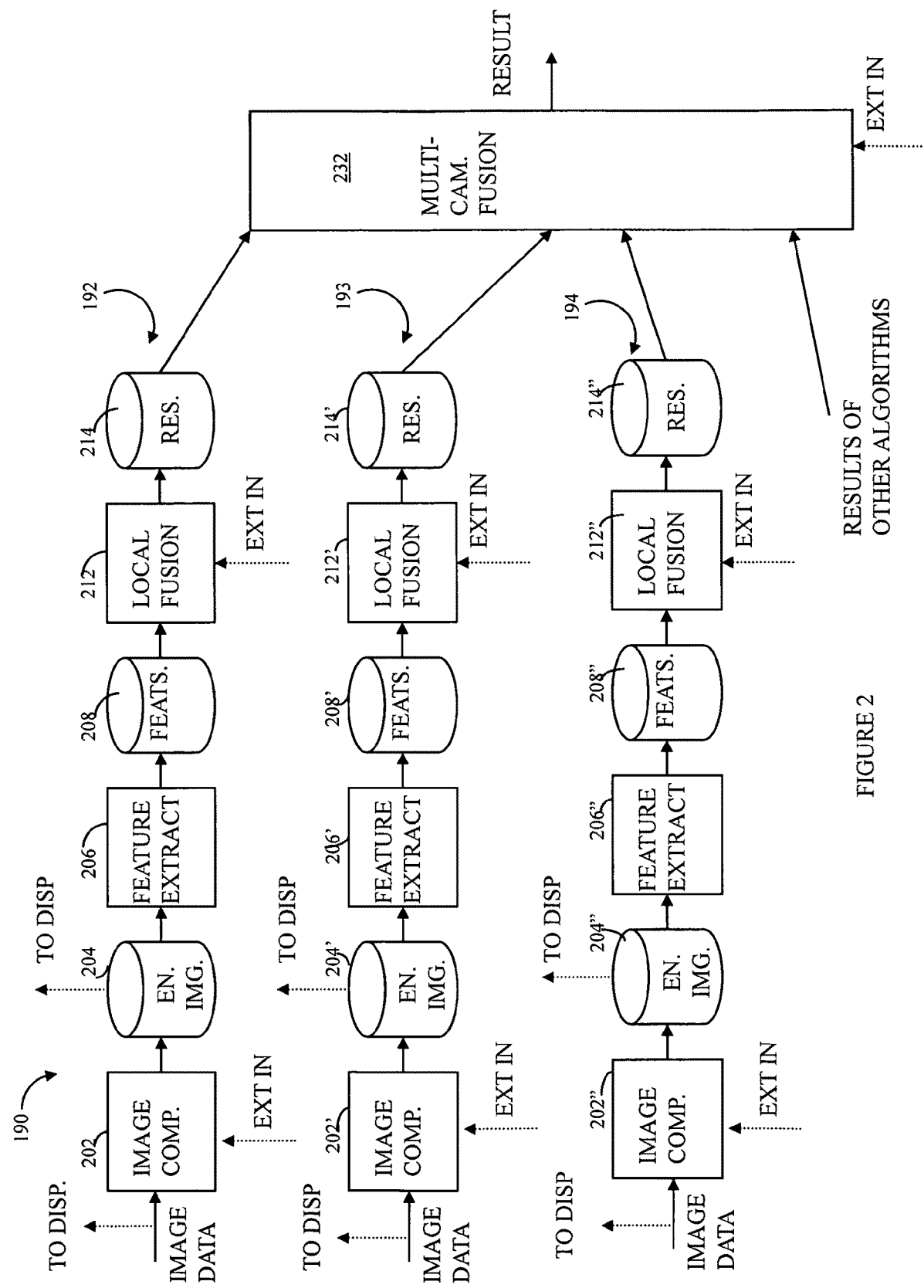
FIG. 2 is a data flow diagram illustrating operation of the system described herein.

Referring to FIG. 2, a data flow diagram 190 illustrates operation of the software that runs on each of the boards 154, 156 of the CVCU 152 of FIG. 1 to detect/verify fire in each of the cargo bays 102-104. In an embodiment disclosed herein, fire verification and detection is performed independently for each of the cargo bays 102-104. However, for other embodiments, the system described herein may be adapted to provide for performing fire verification and detection by processing and combing information from more than one of the cargo bays 102-104.

The diagram 190 shows a plurality of data paths 192-194, where each of the paths 192-194 represents processing performed on image data from one of the cameras. That is, for example, the path 192 represents it processing performed on a first camera, the path 193 represents processing performed on a second camera, the path 194 represents processing performed on a third camera, etc. There may be as many data paths as there are cameras.

Turning to the data path 192, image data from the cameras is provided to an image compensation routine 202. The processing performed at the image compensation routine 202 includes, for example, adjusting the image for vibrations (using, for example, a conventional Wiener filter), compensation to account for any special lenses used on the cameras, compensation (image transformation) used in connection with the calibration (or miscalibration) of a camera, compensation for dynamic range unbalance, and temperature compensation for the IR cameras. Note that some calibration may be appropriate to compensate for aging of the cameras. Also, some of the compensation parameters may be preset (e.g., at the factory) and provided by, for example, the camera manufacturer, to any compensation processing.

The image compensation routine 202 receives as input external values that are used in connection with the image compensation. The external values may include, for example, results provided by the smoke detection control unit 174 of FIG. 1, the ambient temperature which may used to handle compensation for the IR cameras, a weight-on-wheels signal (indicating that the aircraft is on the ground), an aircraft altitude signal, and a cargo bay door open status signal. Specific image compensation algorithms that may be used are discussed in more detail below. Note that the image data that is input to the image compensation routine 202 is also provided to the video displays 162, 164 of FIG. 1 (i.e., is also provided as a video output). In some embodiments, the user of the system may prefer to view the raw, uncompensated, image provided by the cameras.

The output of the image compensation routine 202 is enhanced image data 204. Note that the enhanced image data 204 is also provided to the video displays 162, 164. Thus, in some embodiments, a user can view both the raw video image data and the enhanced video image data. The benefit of having the option to view both is that, while the enhanced image data has many artifacts removed from it and thus may be an opportunity to see the image clearer, the user may question whether the image compensation routine 202 has added undesirable characteristics that make it difficult to evaluate. Accordingly, in an embodiment disclosed herein, the user would have the option of displaying the raw image or the enhanced image.

In an embodiment of the system herein, no follow on processing is performed beyond the processing performed at the image compensation routine 202. Thus, a user would be able to use the system to switch between raw and enhanced camera images using the video selector unit 166. When the smoke detection control unit 174 indicates the presence of a fire, the user switches between raw and enhanced images to view the source of the alarm. For other embodiments of the system, follow on processing is performed to detect/verify the presence of fire, as described below.

The enhanced image data 204 is provided to a feature extraction routine 206. The feature extraction routine process the enhanced image data 204 to provide feature data 208. Feature data is a description of the enhanced image reduced to various values and numbers that are used by follow on processing to determine if fire is present or not. Thus, the specific features that are provided in the feature data 208 depend upon what algorithms are being used to detect fire. For example, if the total pixel energy of video frames is one of the parameters used in an algorithm to detect fire, then one of the features provided with the feature data 208 and calculated by the feature extraction routing 206 would be the total pixel energy of a video frame.

The feature data 208 is provided as an input to a local fusion routine 212. The local fusion routine 212 may also be provided with external inputs similar to the external inputs provided to the image compensation routine 202. The local fusion routine 212 may process the feature data 208 to determine whether a fire is present and/or to determine the likelihood of a fire being present. The processing performed by the local fusion routine 212 is discussed in more detail below. The output of the local fusion routine 212 is result data 214 which indicates the result of the local fusion processing at the local fusion routine 212.

Similar processing for other cameras may be performed for the data path 193 and the data path 194 (and other data paths not shown). Corresponding routines and data of the data path 193 are marked with a single '. Corresponding routines and data of the data path 194 are marked with a double ".

The results for the fusion calculations for each of the cameras are provided in the result data 214, 214', 214". The result data 212, 214', 214" from the different data paths 192-194 is provided to a multi-camera fusion routine 232. The multi-camera fusion routine 232 combines results for the different cameras to determine an overall result indicating whether a fire is present or not and/or the likelihood of a fire being present. The multi-camera fusion routine 232 may also receive a signal from the smoke detection control unit 174 of FIG. 1 and/or may receive results from other fire detection algorithms not specifically disclosed herein. The multi-camera fusion routine also receives other external inputs like those received by the image compensation routines 202, 202', 202" and the local fusion routines 212, 212', 212". For example, the multi-camera fusion routine 232 may receive an pitch and roll indicator allowing for a sensitivity adjustment because of the fact that cargo moving in the cargo bays 102-104 may result in a false alarm due to the resulting change caused to the images received by the cameras.

Note that in some embodiments, there may be less processing performed at the local fusion routines 212, 212', 212" and more processing performed at the multi-camera fusion routine 232. That is, the processing of the features 208, 208', 208" may be shifted and allocated between and among the local fusion routines 212, 212', 212" and the multi-camera fusion routine 232. In some embodiments, the multi-camera fusion routine 232 is simply a score of the various weighted results of the individual camera fusion routines. In another embodiment, the multi-camera fusion routine 232 could provide an OR of individual boolean results.

The image compensation performed at the steps 202, 202', 202" may include compensation for camera artifacts, compensation for dynamic range unbalance, compensation for aircraft vibration, compensation for aircraft temperature variations, and compensation for fog and smoke effects. State-of-the-art digital cameras may provide for some level of preliminary filtering directly within camera hardware. The resulting image may be acquired by the CVCU 152 through standard means. Image preprocessing may be applied to provide images with acceptable clarity as well as to prepare the image for further processing. Preprocessing steps include image restoration and image enhancement.

Camera artifacts are one of the sources of inaccuracy in vision-based detection systems for which compensation may be provided at the routines 202, 202', 202". As a camera ages, pixels within the focal plane turn "dead" and will appear in the image as permanently bright or dark spots. Similarly, whole lines may drop out as dark or bright, and the camera may produce some vertical streaking. Most of these artifacts may be automatically factored out without expensive preprocessing by considering the presence of change between video frames. Straight and effective techniques that include image subtraction and image averaging may be used in the system described herein. Smoothing filters (e.g. low-pass filters and median filters) as well as sharpening filters (e.g. high-pass filters) that are simple and effective in dealing with background noise and illumination irregularities may be used. Because indicators of a fire may be in a statistical difference of subsequent frames-differences caused by real phenomena other than noise, stochastic techniques may be used with the system described herein. Among such methods, histogram processing may be used given its simplicity and effectiveness in capturing statistical trends. The histogram representation provides information about the image gray level distribution. The shape of a histogram, in particular, may provide useful information to exclude the effect of irregular pixels caused by camera artifacts. A priori knowledge of the statistics of pixel distribution in the difference-images facilitates compensation for the artifacts. This a priori knowledge may be gained, for example, by estimating the camera parameters through some calibrations and/or by obtaining information from the camera manufacturer.

In addition to the dead spots and lines caused by the camera imperfections, it is possible for a camera to display non-uniform brightness across a field of view where the center is brighter than the corners. Image enhancement performed at the routines 202, 202', 202" may include a technique that handles such artifact is to enhance the image in the space domain by applying a contrast stretching technique that increases the dynamic range of the image. A simple comparison of the dynamic range with a predetermined reference image may provide appropriate enhancement and bring the dynamic range within an optimal distribution for both IR and visible images. Bright sources such as fire and heated objects in thermal IR imagery and light sources in visible imagery can quickly saturate the dynamic range of the frames. A linear transformation of the dynamic range of the cameras may first be provided to balance the image grayscale distribution. For a particular camera type, tests may be conducted to calibrate the dynamic range of the cameras and to cause the image to be in the capability of the display screen.

Hotspots detected by IR cameras may be enhanced at the routines 202, 202', 202" by using a gray level slicing technique to highlight a specific range of gray levels where hotspot-related features may be more ostensible. Spatial filters that approximate a given frequency-based filter may be generated from frequency domain specifications to take advantage of both space and frequency domains. This technique may be tested in terms of enhancement performance and execution speed.

In addition, in some cases the compensation routines 202, 202', 202" may be used to filter out know hot areas of the cargo bays 102-104 from the IR data. For example, the cargo bays 102-104 could be relatively warm due to the aircraft having been on the ground in a warm area. Also, mechanical coolers provided in the cargo bays 102-104 could generate local hot spots that are filtered out at the image compensation routines 202, 202', 202". Other non-fire sources heat may also need to be filtered out.

With respect to vibration, the image compensation performed at the routines 202, 202', 202" may include a simple frame-difference that minimizes the vibration effect to a very low level. Then, a Wiener filter may be applied to substantially improve the image quality. The efficiency of the Wiener filtering approach stems from a realistic assumption about the image noise caused by unstable cameras. It may be assumed that image blurring due to camera motion is convolutive (and not additive or multiplicative) in nature. In the case of a uniform linear motion of the sensing camera, an analytical expression of the optimal (in the sense of mean square minimization) restored image may be provided by the Wiener filtering technique. In some instances, an assumption of uniform linear motion may not be fully met. In those cases, it is acceptable to adjust the so-called Wiener parameter until an acceptable quality of restoration is obtained.

In some cases, it may be anticipated that after applying the Wiener filter, there may still be traces of a periodic type on the resulting frame. This effect may be suppressed in the frequency domain via homomorphic filters. Such filters may be designed to perform a simultaneous brightness range compression and contrast enhancement. Homomorphic filters are based on the assumption that a pixel value is a product of the illumination component and the reflection component at the location of such a pixel. The filter starts by applying a logarithmic transformation to the image of interest to split the illumination and the reflection components from each other. Then, the resulting image is processed in the frequency domain where both functions of brightness range compression and contrast enhancement are performed simultaneously. A more simple, yet effective technique of matrix multiplication may be used to suppress the camera vibration effect. The Matrix elements may be determined and verified in relation with the vibration patterns (e.g. frequency, magnitude, orientation . . . etc) observed in an aircraft environment.

Temperature variability due to aircraft location and altitude may be accounted for by the fire detection system in connection with use with the IR cameras. Hot airfields in hot climates cause cargo bay temperatures to be quite different from high altitudes in cold climates. A statistical change detection approach provided at the routines 202, 202', 202" solves this problem by taking its thermal baseline as dictated by ambient conditions. Various thermal baselines may be determined for each flight profile including, loading, landing/taking off, and cruising. The thermal baselines may be defined in a such a way that changes in ambient thermal conditions do not cause false alarms by the system. Aircraft profiles may be analyzed to determine the correct baseline-setting strategy.

During fog or smoke, everything may look gray. Although all the information about a scene may be in the "gray" image, the human eye may not be able to distinguish the gray scale differences on various objects. The routines 202, 202', 202" may handle this by expanding the dynamic range of the image to match the human eye. The lowest luminance levels in the image could be made more 'dark' whereas the highest levels could be made more 'bright'. The matching of the dynamic range can be done through hardware by tuning the gain and offset (contrast and brightness) of the camera or through software by using a nonlinear transformation of the dynamic range. One method of foggy image enhancement is a conventional technique called "histogram stretching".

Figure 3:
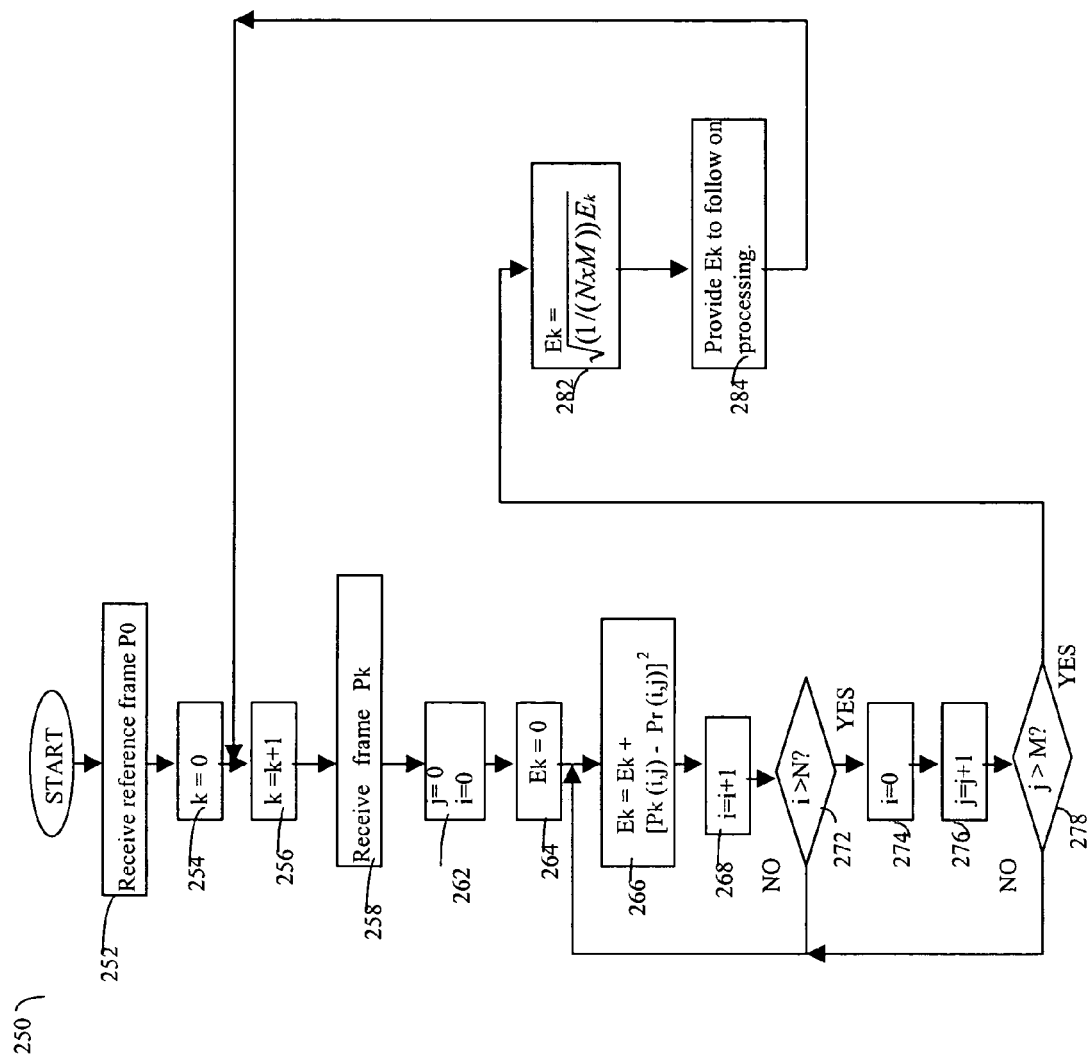
FIG. 3 is a flow chart illustrating determination of video frame energy according to the system described herein.

Referring to FIG. 3, a flow chart 250 illustrates a portion of the processing that may occur at the feature extraction routines 206, 206', 206". The energy of the frames of the video image (i.e., brightness of the pixels) may be useful for follow on processing that detects/verifies the presence of fire in one or more of the cargo bays 102-104. The energy for frames of the video may be determined by comparing the energy of each frame to a reference frame (a video frame that represents a no fire condition) or by comparing the energy of each frame to the energy of an immediately preceding frame (first order effect) or by comparing the energy of each frame to the energy provided two frames prior (second order effect). These techniques will be described with reference to FIG. 3.

Processing begins at step 252 where a first reference frame, $P_0$, is received. The first reference frame may be stored in the memory of the system or may be the first video frame provided when the system is initialized. Note that determination of the first reference frame when the system is initialized may depend upon receipt of a signal indicating that the cargo bay door is closed. Otherwise, the first reference frame may contain undesirable energy from ambient light that occurs when the cargo bay door is open.

Following the step 252 is a step 254 where a variable k is set to zero. The variable k is used to index each of the frames. Following the step 254 is a step 256 where the variable k is incremented. Following the step 256 is a step 258 where the frame $P_k$ is received. The frame $P_k$ represents the kth video frame. Following the step 258 is a step 262 where index variables i and j are set to zero. Following the step 262 is a step 264 where a quantity $E_k$ is set to zero. The quantity $E_k$ represents the energy associated with the kth video frame.

Following the step 264 is a step 266 where the quantity $E_k$ is set equal to the previous value of $E_k$ plus the square of the difference between the energy at pixel i, j of the current frame, $P_k(i,j)$, and the energy at pixel i, j of the reference frame, $P_r(i,j)$, which is either $P_0(i,j)$ (the reference frame), $P_{k-1}(i,j)$ to measure a first order effect of rate of change, or $P_{k-2}(i,j)$ to measure a second order effect of rate of change. Note that for calculating the second order effect, it may be necessary to obtain two reference frames, $P_0$ and $P_1$, at the step 252, in which case k may be initialized to one at the step 254.

Following the step 266 is a step 268 where the index variable i is incremented. Following the step 268 is a test step 272 where it is determined if the index variable i is greater than N. N represents a maximum value for i which corresponds to the number of pixels in the direction indexed by the variable i. If it is determined at the test step 272 that i is not greater than N, then control transfers back to the step 266, discussed above, to continue computation of $E_k$. Otherwise, if it is determined at the test step 272 that i is greater than N, then control transfers from the step 272 to a step 274 where i is set equal to zero, thus resetting i to facilitate processing the next group of pixels. Following step 274 is a step 276 where the index variable j is incremented. Following the step 276 is a test step 278 where it is determined i,j is greater than M, where M represents the number of pixels in the jth direction. If not, then control transfers from the step 278 back to the step 266, discussed above, to continue calculation of $E_k$.

If it is determined at the test step 278 that j is greater than M, then all of the pixels of the frame have been processed and control transfers from the step 278 to a step 282 where the value of $E_k$ is further calculated by taking the square root of the current value of $E_k$ divided by the product of N times M.

Following the step 282 is a step 284 where the value of $E_k$ as provided to follow on processing (i.e., local data fusion and multi camera data fusion) to perform appropriate detection and verification. The follow on processing is described in more detail below. Following the step 284, control transfers back to the step 256 to process the next frame.

The flow chart 250 of FIG. 3 and the description above represents calculating the energy difference between each video frame and a reference frame. The reference frame could either be a background frame of a no fire condition ($P_0$) or could be the previous video frame ($P_{k-1}$) (first order effect) or could be the frame before the previous frame ($P_{k-2}$) (second order effect). The use of all these types of values is described elsewhere herein. However, note that it may be possible to calculate multiple values for each $E_k$ by using the different alternatives for the reference frame $P_r$, discussed above.

In some instances, it may be desirable to not use all of the pixels produced by the cameras to perform the energy calculations illustrated in FIG. 3. For example, it may be desirable to conserve processing power by using half as many pixels (by, for example, selecting every other pixel for processing). It is also possible to first re-size or down-sample each frame produced by the cameras (using any one of a variety of possible compression techniques) prior to performing the calculations illustrated in FIG. 3. Alternatively still, it is possible to select only a portion of each frame for processing, either before or after any compression. The selection of a portion of each frame may be performed by any one of a variety of techniques such as, for example, selecting a portion of each frame containing the greatest pixel variability or selecting a portion of each frame containing the greatest pixel energy. The selection may also be performed by using any one of a variety of techniques to determine a portion of the frame surrounded by the highest pixel gradient. One of a variety of edge detection techniques and/or multiscale modeling, discussed below, may be used to select portions of the video frames for processing.

It is possible to use the calculated frame energy values to predict the presence of fire. In some instances, fire will cause the frame energy to increase relative to a background image. Thus, detection of a frame energy increase could be used to detect and/or verify the presence of fire. In other instances, it may be possible to use the calculated frame energy values, and the distribution thereof, to differentiate between smoke (i.e., a fire condition) and false conditions that would cause the smoke detection control unit 174 to incorrectly indicate the presence of fire, such as when fog is present in one of the cargo bays 102-104.

Figure 4:
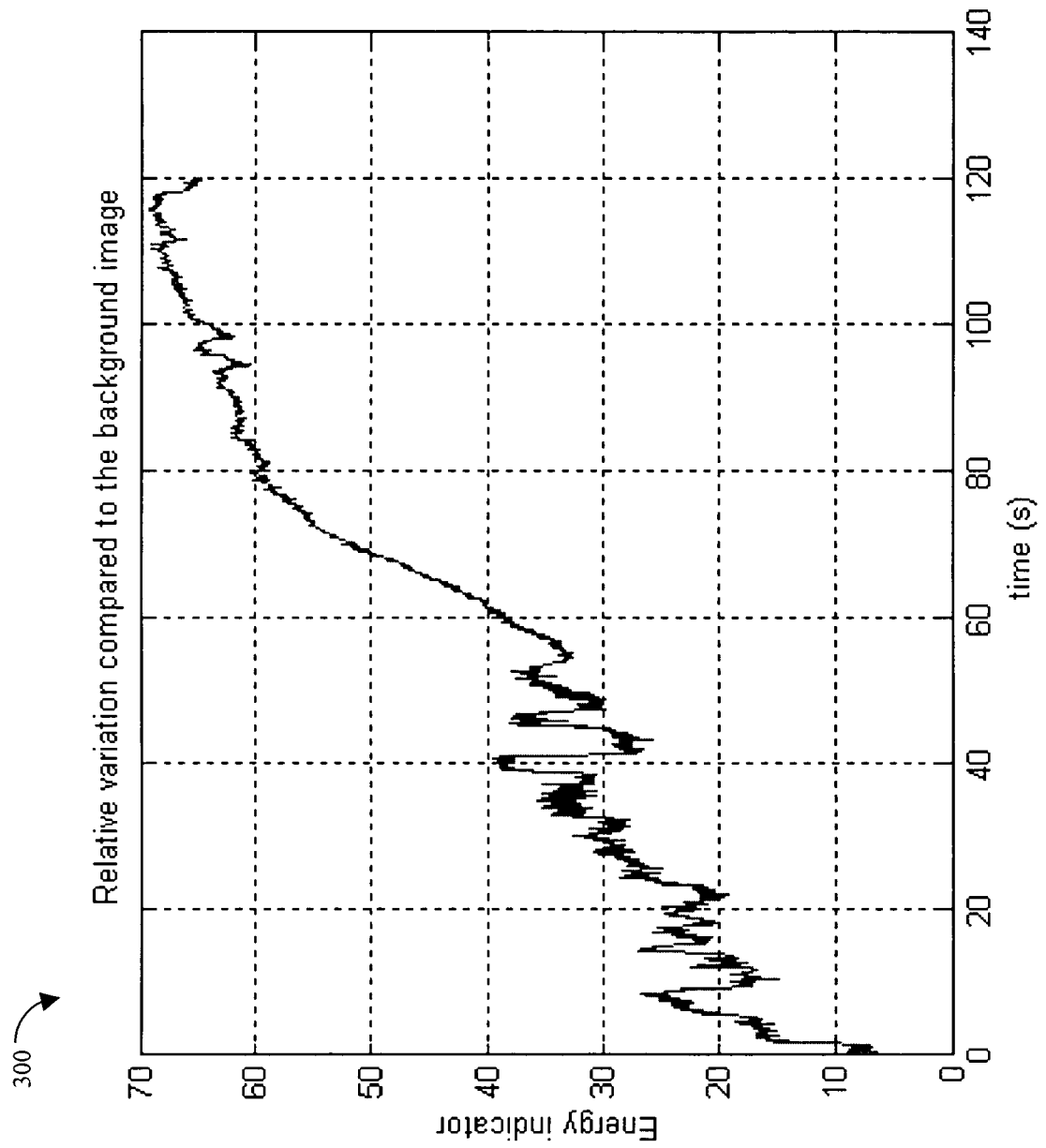
FIG. 4 is a graph illustrating an energy indicator as a function of time for video frames corresponding to a fire condition according to the system described herein.

Referring to FIG. 4, a graph 300 illustrates the value of an energy indicator (i.e., $E_k$) relative to time when a fire occurs. In the case of the graph 300, the energy indicator is calculated by comparing the pixel brightness at each frame with the brightness of a corresponding pixel of a background image. As can be seen from the graph 300, the energy generally increases with time in the case of a fire being present. The energy values calculated at the feature extraction routines 206, 206', 206" may be provided to the corresponding local fusion routine 212, 212', 212" and/or the multi-camera fusion routine 232 to detect a relative increase in the energy indicator using, for example, a neural network. Using a neural network or other techniques to process the energy indicators to detect characteristics indicative of fire is described in more detail below.

Figure 5:
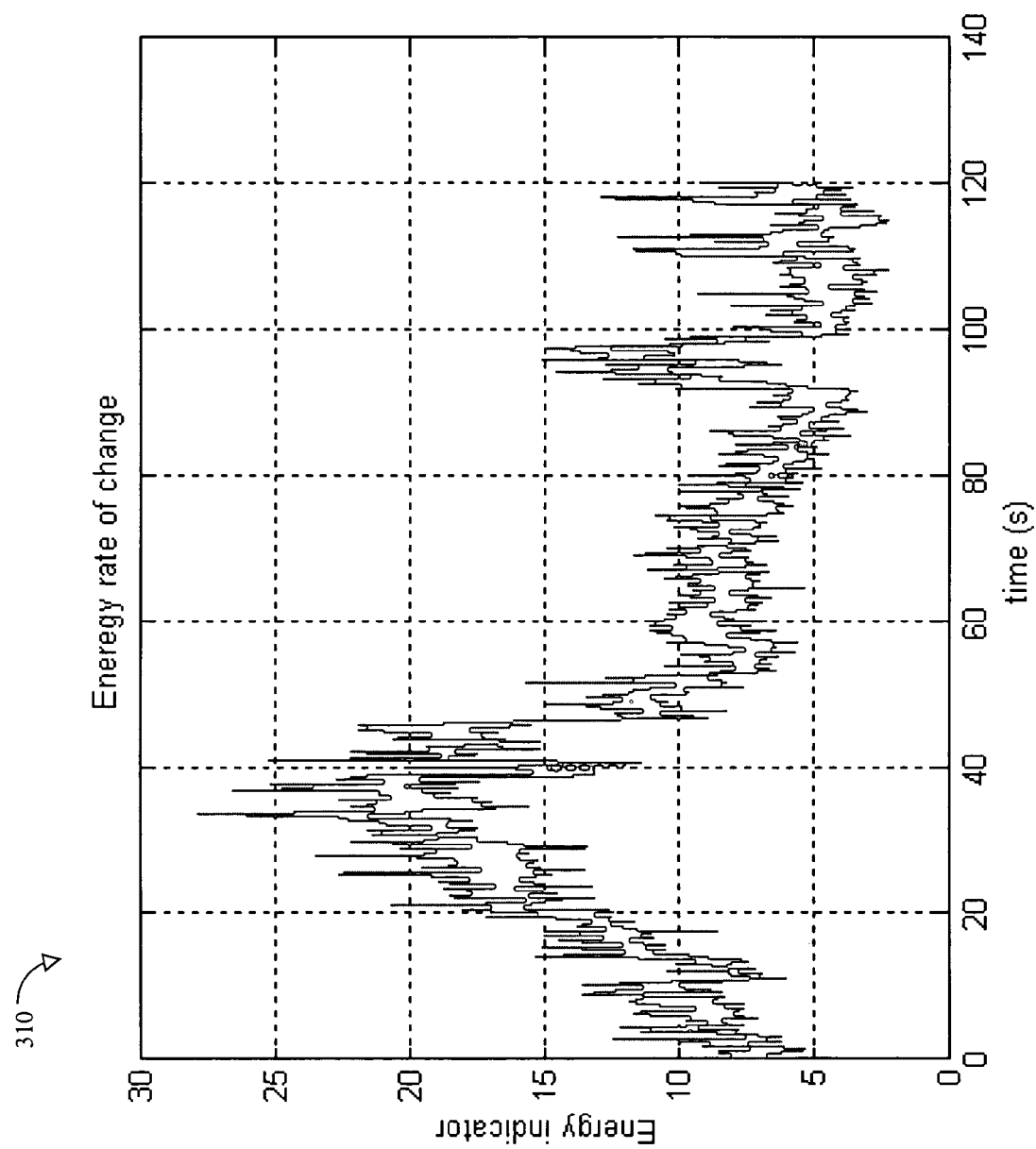
FIG. 5 is a graph illustrating a first order rate of change for an energy indicator as a function of time for video frames corresponding to a fire condition according to the system described herein.

Referring to FIG. 5, a graph 310 illustrates energy rate of change of the energy indicator (first order effect, described above) with respect to time when a fire is present. Although it may not be visually apparent from the graph 310 that the energy rate of change correlates with the presence of fire, it may be possible in some instances to use this data to train a neural network (or other follow on processing, described below) to obtain useful information/correlation between the presence of fire and the first order effect energy rate of change.

Figure 6:
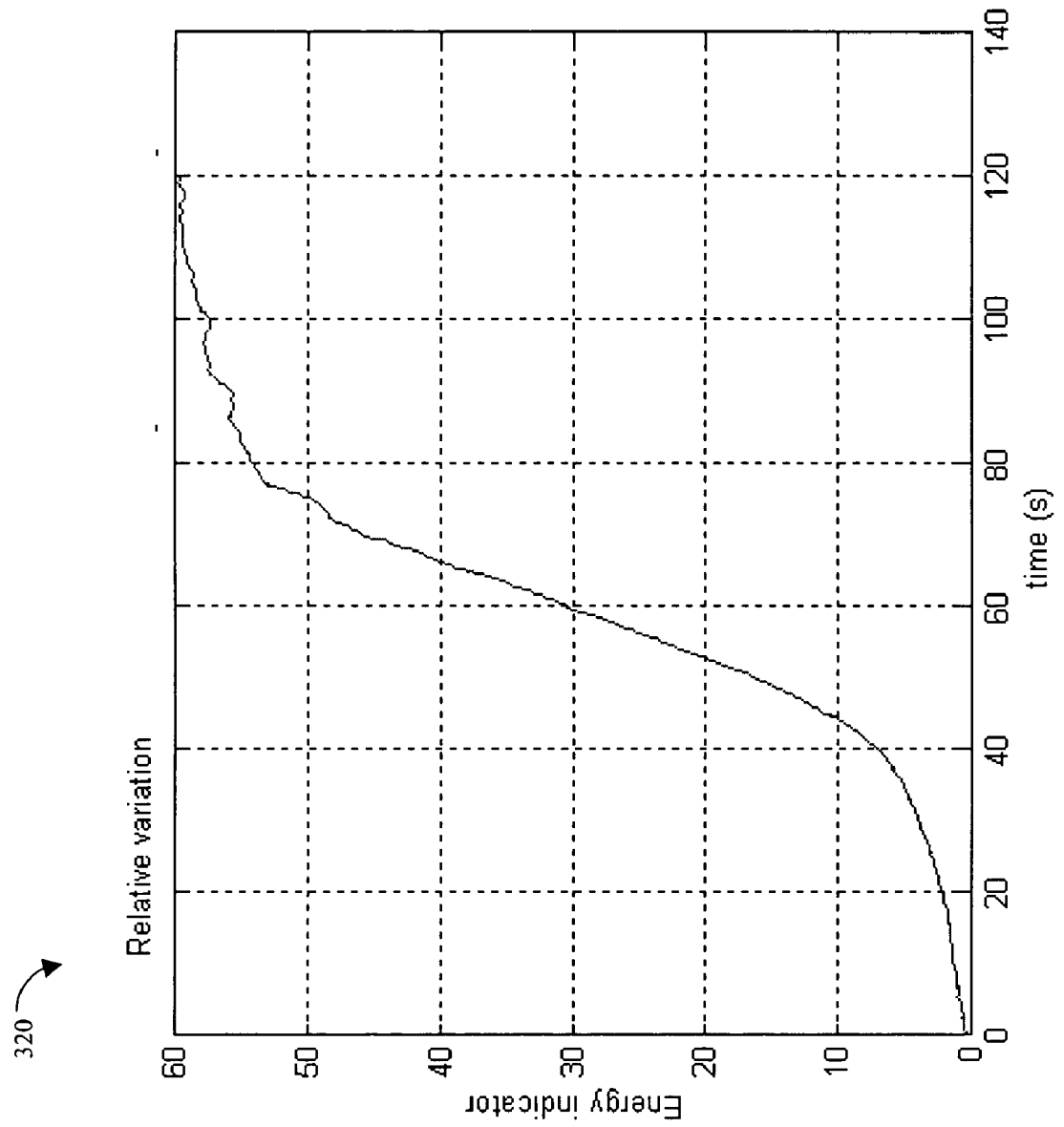
FIG. 6 is a graph illustrating an energy indicator for IR energy as a function of time for video frames corresponding to a fire condition according to the system described herein.

Referring to FIG. 6, a graph 320 indicates the energy indicator for an IR camera with respect to time in connection with the presence of fire. The graph 320 indicates a relatively significant increase in the energy indicator when fire is present. Accordingly, the graph 320 appears to show a relatively good correlation between the presence of fire and the increase in the IR energy indicator.

Figure 7:
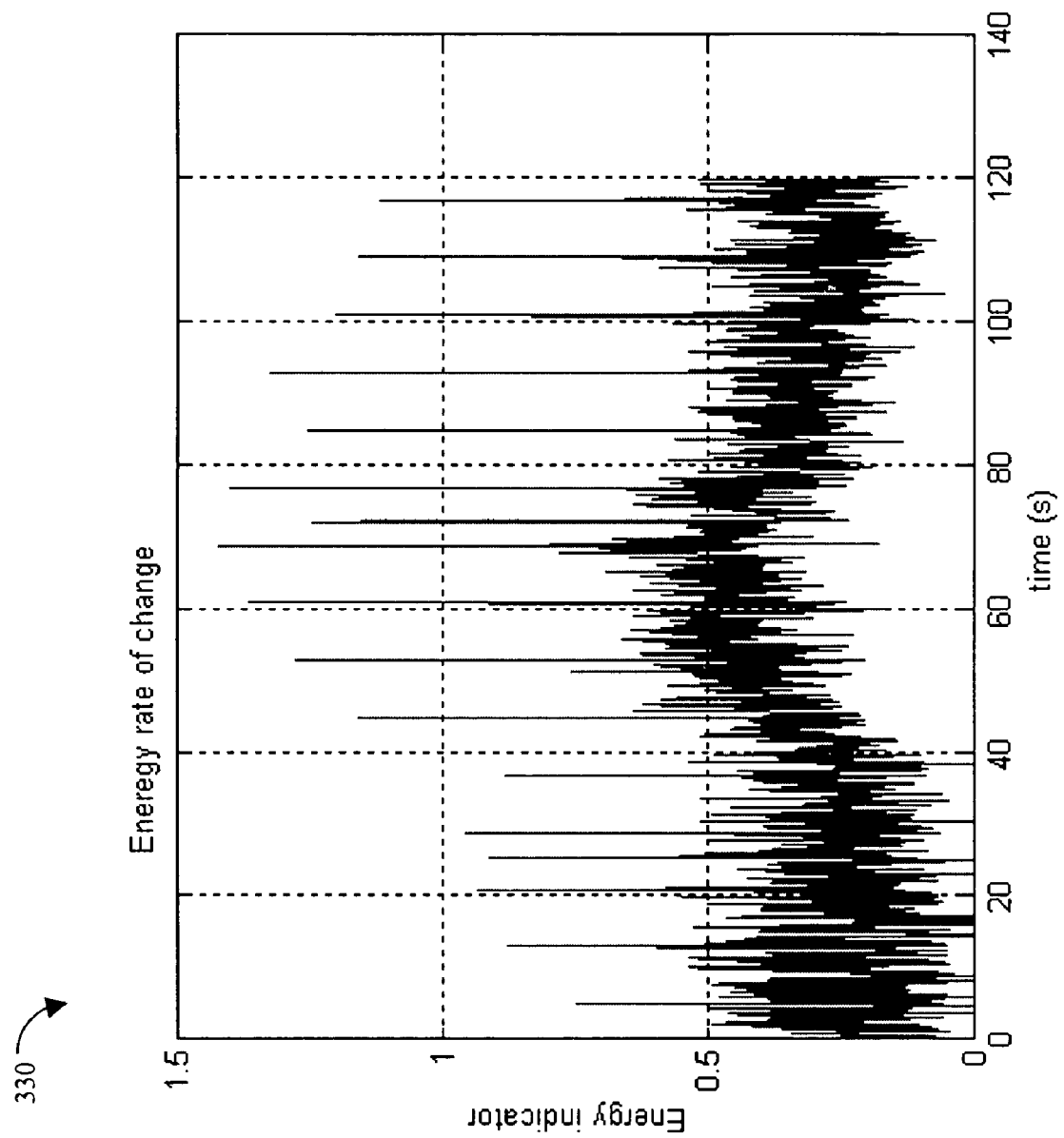
FIG. 7 is a graph illustrating a first order rate of change for an energy indicator for IR energy as a function of time for video frames corresponding to a fire condition according to the system described herein.

Referring to FIG. 7, a graph 330 illustrates an energy rate of change (first order effect) of the energy indicator of an IR camera over time in the presence of fire. In the case of the graph 330, it may not be visually apparent that there is a strong correlation between the first order effect energy rate of change in the energy indicator of an IR camera and the presence of fire. However, it may be possible in some instances to use this data to train a neural network (or other follow on processing, described below) to obtain useful information/correlation between the presence of fire and the first order effect energy rate of change of the energy indicator from an IR camera.

In some instances, a system may have difficulty distinguishing between smoke and the presence of something that looks like smoke, such as fog, which may cause the smoke detection control unit 174 to issue a false alarm. Accordingly, it may be useful to be able to distinguish between smoke and (for example) fog in order to reduce the likelihood of false alarms. The following graphs illustrate measured differences between the energy indicators associated with fog and the energy indicators associated with smoke which was generated by burning a box in a test cargo bay.

Figure 8:
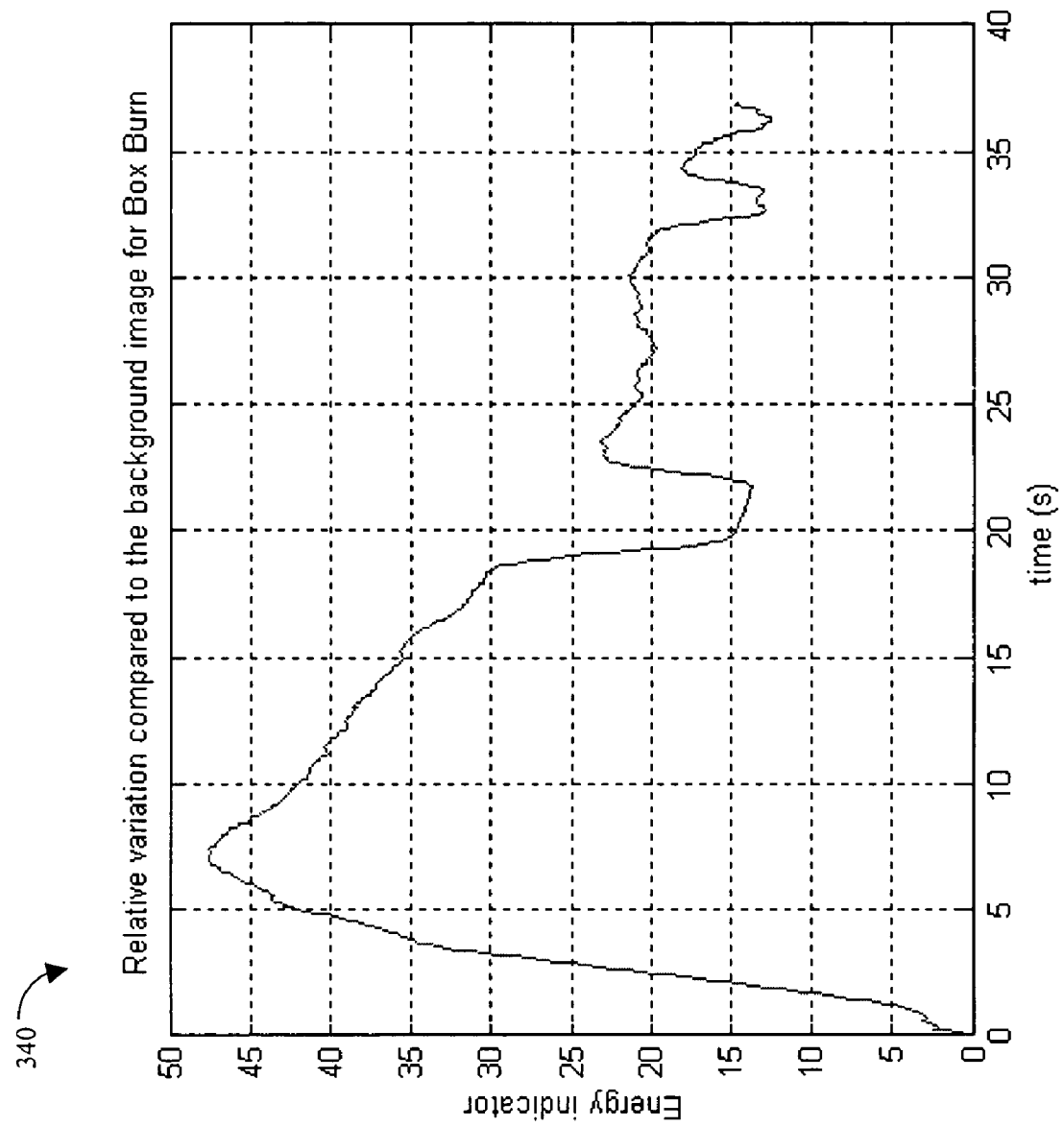
FIG. 8 is a graph illustrating an energy indicator as a function of time for video frames corresponding to a smoke condition according to the system described herein.

Referring to FIG. 8, a graph 340 illustrates a plot of an energy indicator as a function of time for the box burn. The energy indicator was calculated using a background reference frame ($P_0$, described above). Note that the value of the energy indicator generally increases until around seven seconds and then begins to generally decrease, perhaps due to the increase in smoke blocking light to the camera when the decrease begins.

Figure 9:
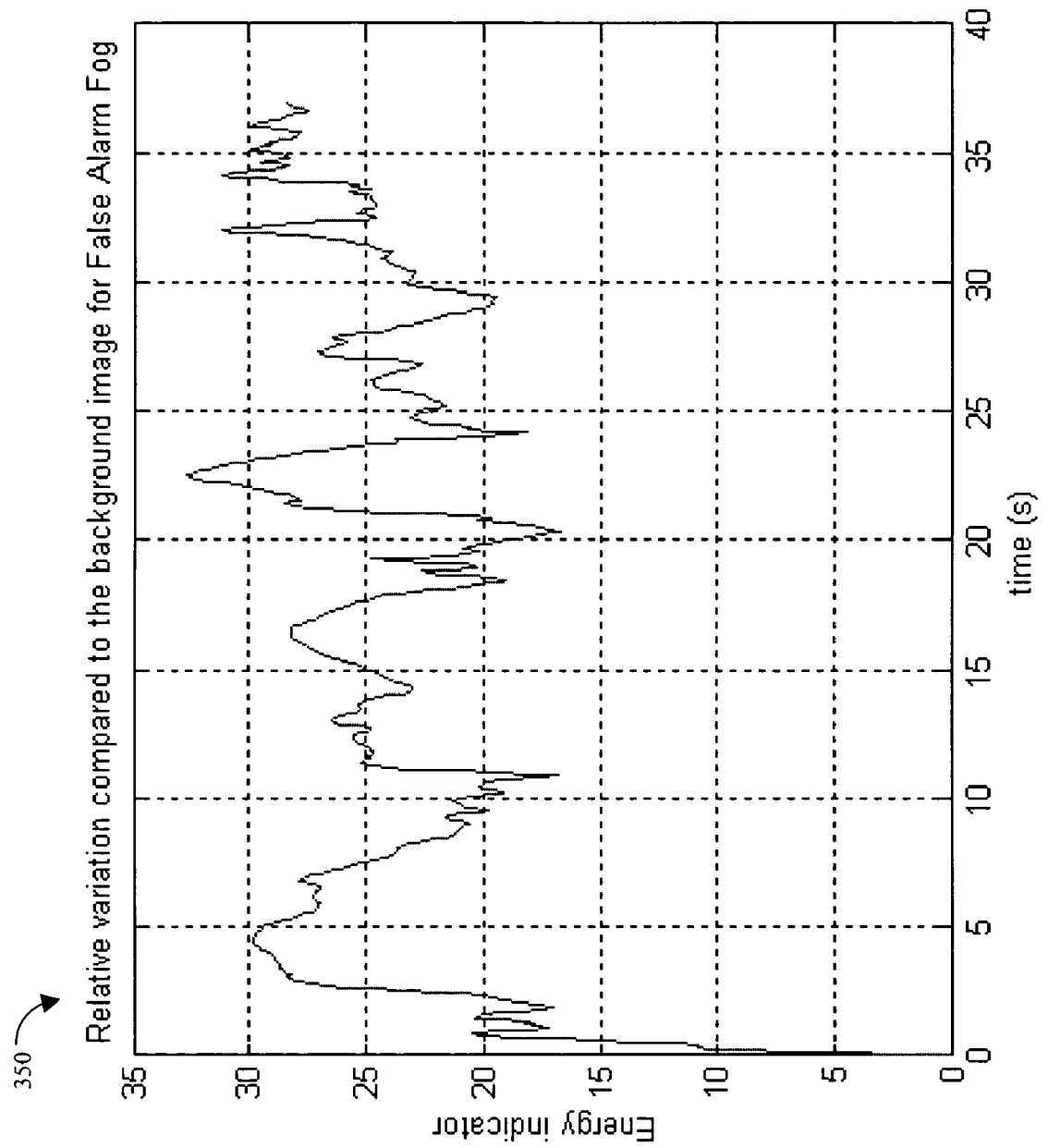
FIG. 9 is a graph illustrating an energy indicator as a function of time for video frames corresponding to a fog condition according to the system described herein.

Referring to FIG. 9, a graph 350 shows the plot of an energy indicator with respect to time for fog. Note the differences between the graph 350 and the graph 340 of FIG. 8. This indicates that the energy indicator comparing the frame energy with the background frame energy as a function of time is potentially a good predictor and a good discriminator between smoke and fog. As described in more detail below, this may be used by follow on processing (such as a neural net) to differentiate between smoke (a true fire condition) and fog (a false alarm).

Figure 10:
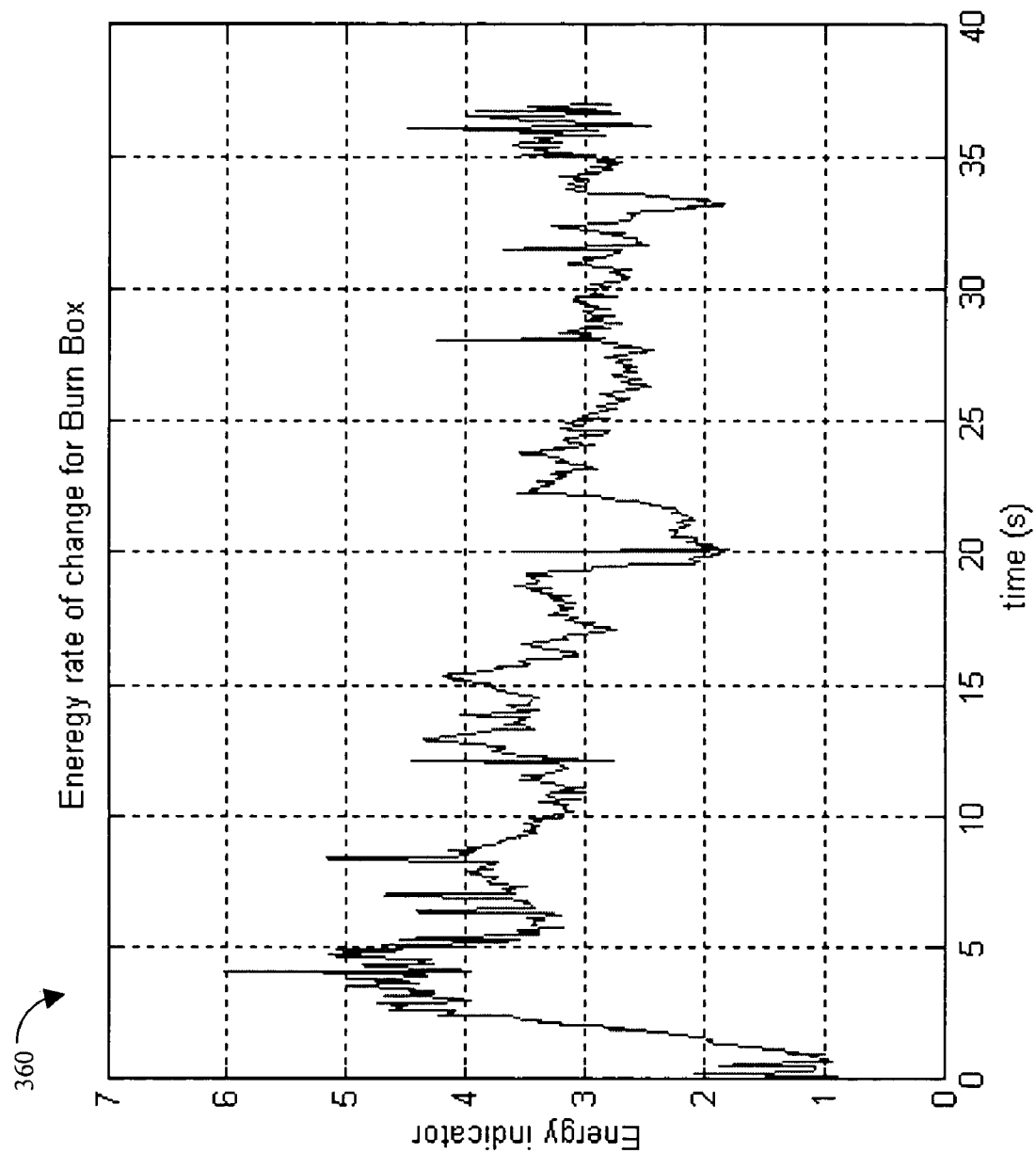
FIG. 10 is a graph illustrating a first order rate of change of an energy indicator as a function of time for video frames corresponding to a smoke condition according to the system described herein.

Referring to FIG. 10, a graph 360 illustrates an energy rate of change (first order effect) for an energy indicator as a function of time for a burn box (smoke). The energy rate of change is determined by comparing the frame energy between successive frames.

Figure 11:
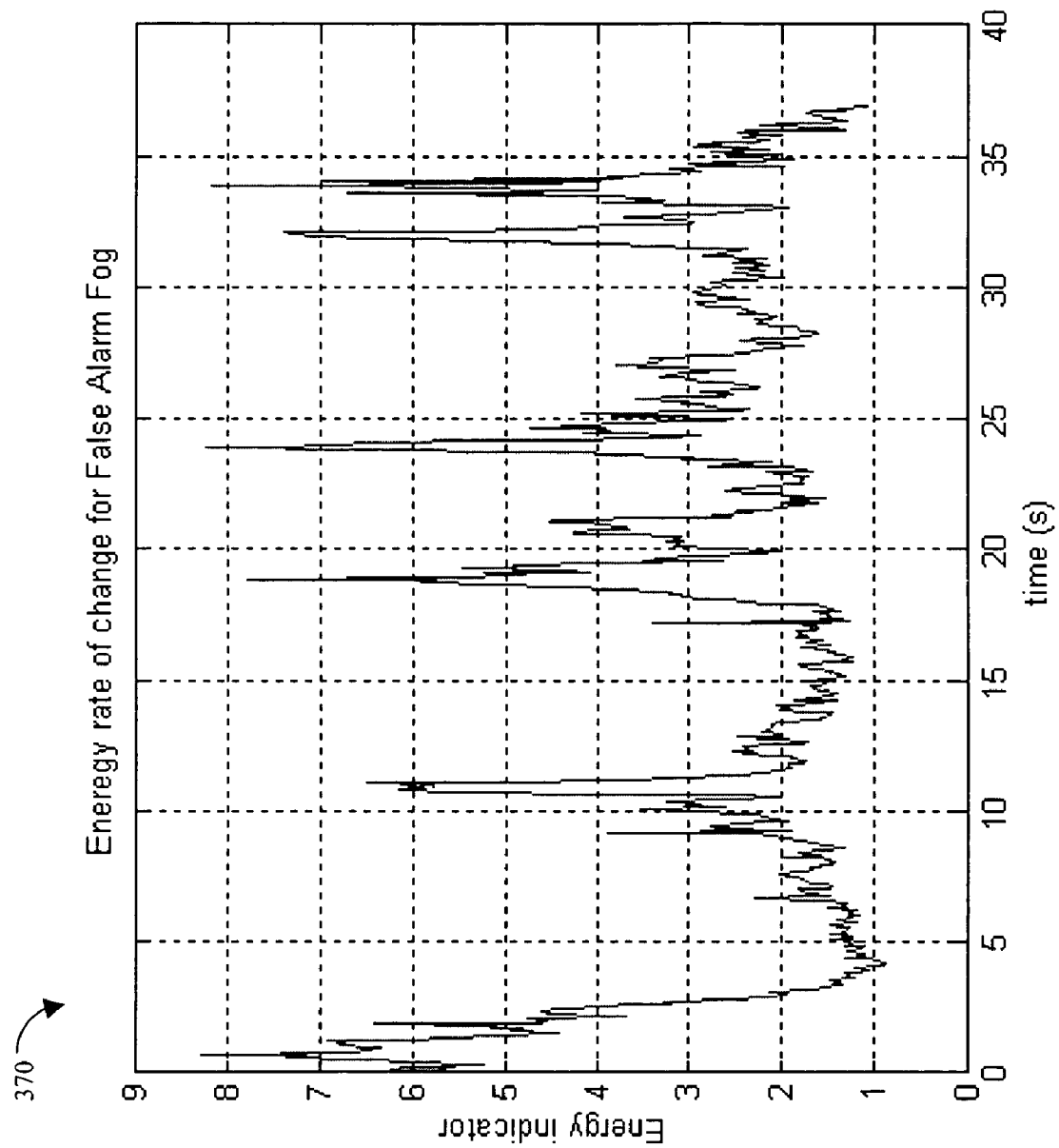
FIG. 11 is a graph illustrating a first order rate of change of an energy indicator as a function of time for video frames corresponding to a fog condition according to the system described herein.

Referring to FIG. 11, a graph 370 illustrates an energy rate of change (first order effect) for an energy indicator as a function of time for fog. Note the differences between the graph 370 and the graph 360. This indicates that the energy rate of change (first order effect) of the energy indicator is potentially a good predictor and discriminator between fog and smoke. This information may be used by follow on processing, described below, to differentiate between smoke and fog.

Figure 12:
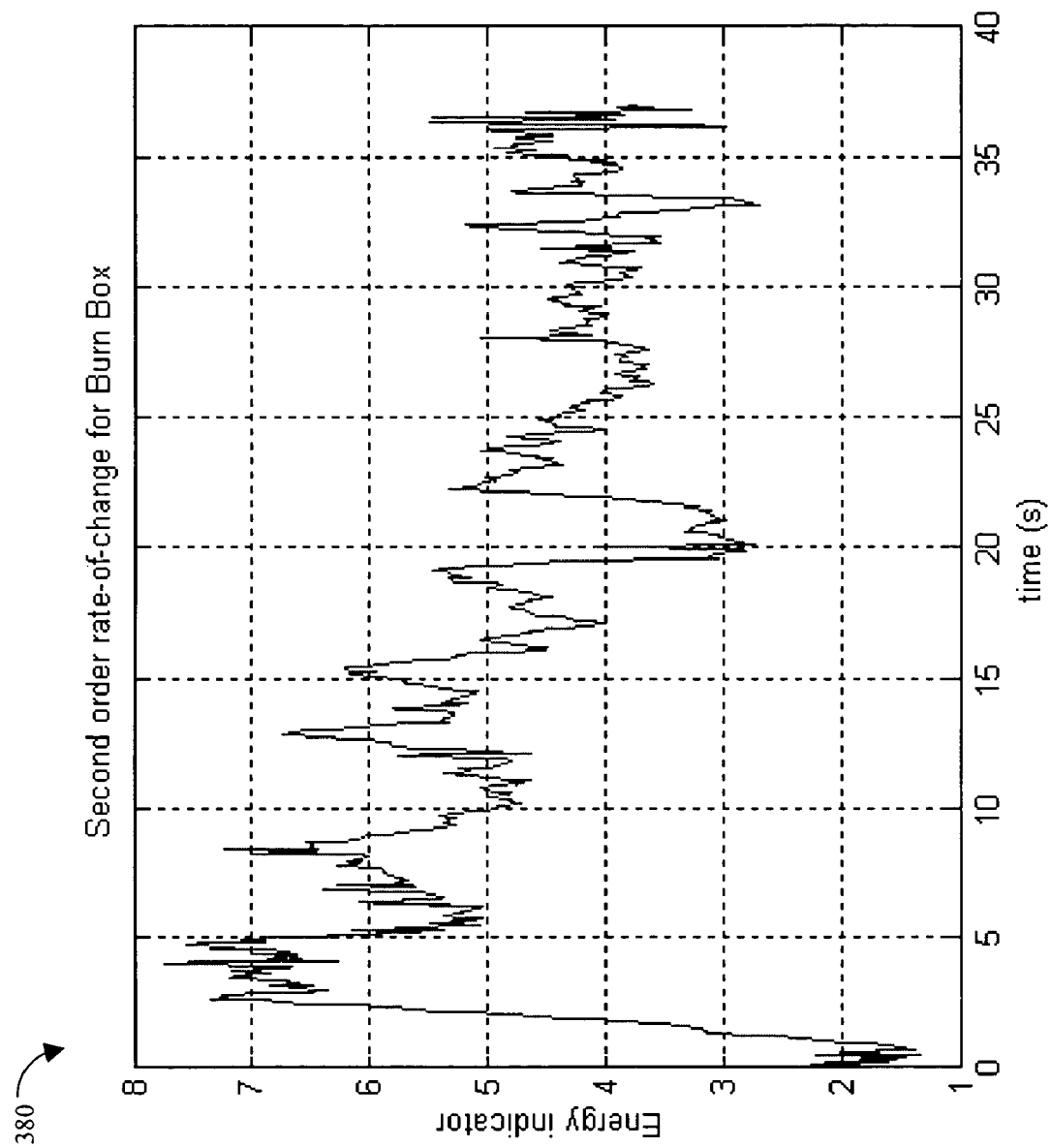
FIG. 12 is a graph illustrating a second order rate of change of an energy indicator as a function of time for video frames corresponding to a smoke condition according to the system described herein.

Referring to FIG. 12, a graph 380 illustrates a second order energy rate of change for an energy indicator as a function of time for a bum box (smoke). The second order energy rate of change is determined by comparing the energy of a frame with the energy of a frame that precedes a previous frame.

Figure 13:
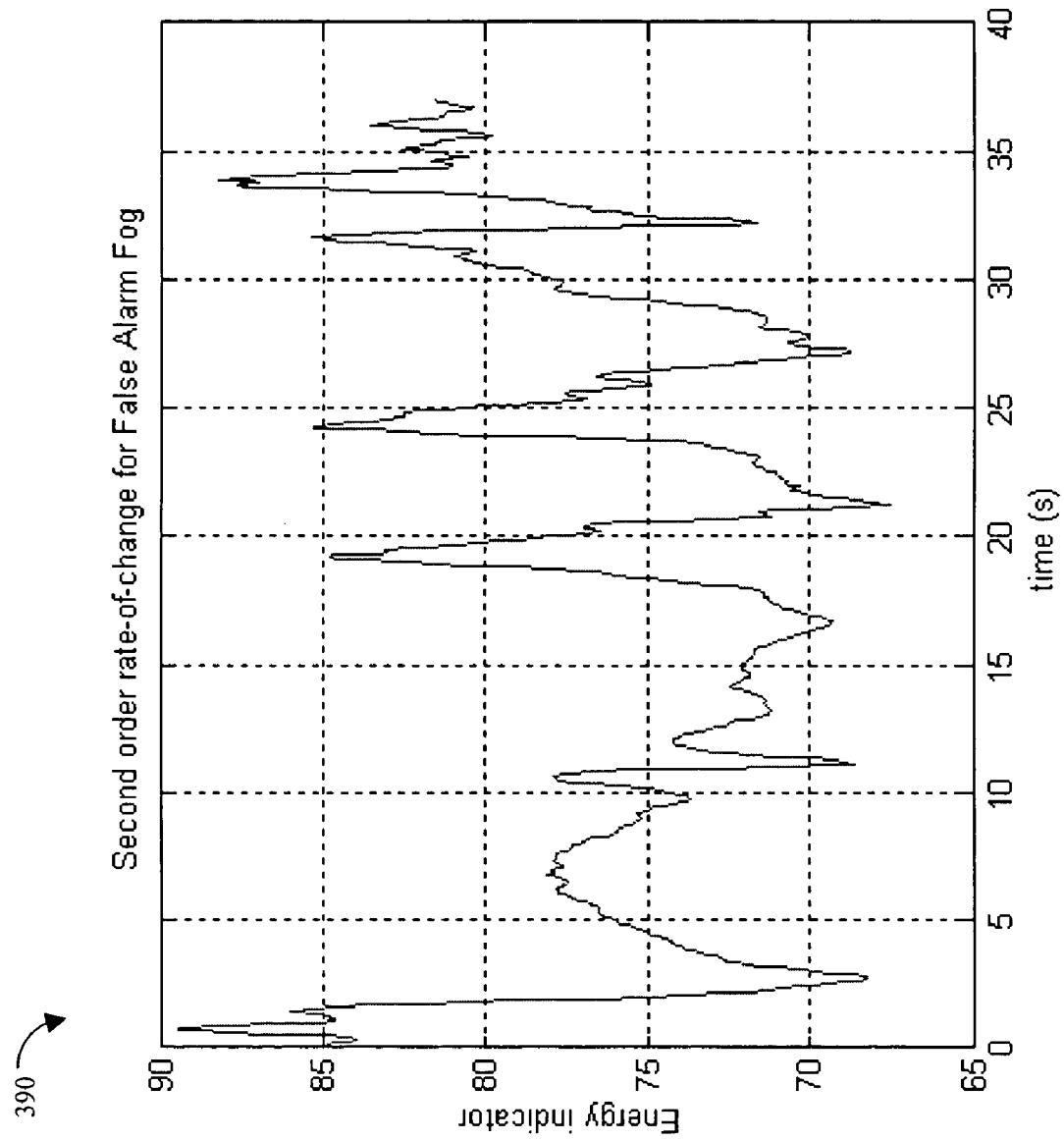
FIG. 13 is a graph illustrating a second order rate of change of an energy indicator as a function of time for video frames corresponding to a fog condition according to the system described herein.

Referring to FIG. 13, a graph 390 illustrates a second order energy rate of change for an energy indicator as a function of time for fog. Note the differences between the graph 390 and the graph 380. This indicates that the second order energy rate of change of the energy indicator is potentially a good predictor and discriminator between fog and smoke. This information may be used by follow on processing, described below, to differentiate between smoke and fog.

Other features that may be useful to extract at the feature extraction routines 206, 206', 206" include space variance of pixel intensity. For example, the presence of a "bright spot" within one of the cargo bays 102-104 may indicate the presence of fire. The space variance of pixel intensity features may be calculated using any one of a variety of conventional techniques, such as measuring the deviation in brightness between regions of the frames. Note also that it may be possible to perform separate feature extraction of regions of the frames so that, for example, one region has a first set of features associated therewith and another region has another set of features associated therewith. Having separate sets of features for different regions could allow for more sophisticated processing by the multi-camera fusion routine 232.

Another feature that may be useful to extract at the feature extraction routines 206, 206', 206" relates to the edges found in an image. Edge extraction routines detect edges by locating portions of the image having a pixel intensity gradient greater than a predetermined value. The output of an edge detection routine, the edge locations in the imagine, may be indicated by a pixel having a first value (i.e., one or zero) where edges are detected and by a pixel having a second, different, value for areas of an image where no edges are detected. There are a variety of conventional edge detection techniques known in the art. Examples include the Sobel technique, the Prewitt technique, the Roberts technique, and the Canny technique. There are also conventional methods that use Laplacian of Gaussian and zero-crossing methods.

Many conventional edge detection techniques find edges using an approximation of the first derivative to detect points of maximum gradient. The Canny technique finds edges by looking for local maxima of the gradient of the original image. The gradient may be calculated using the derivative of a Gaussian filter where two thresholds to detect strong and weak edges are defined. The Canny technique identifies weak edges in the output only if the weak edges are connected to strong edges. The Laplacian of Gaussian method finds edges by looking for zero crossings after filtering the original image with a Laplacian of Gaussian filter. The zero-cross method finds edges by looking for zero crossing after filtering the original image by a user specified filter (e.g., a low pass filter). Various edge detection techniques are disclosed, for example, in the publication "Digital Image Processing" by R. C. Gonzales and R. E. Woods, published by Prentice Hall (www.prenhall.com/gonzalezwoods).

Figure 14:
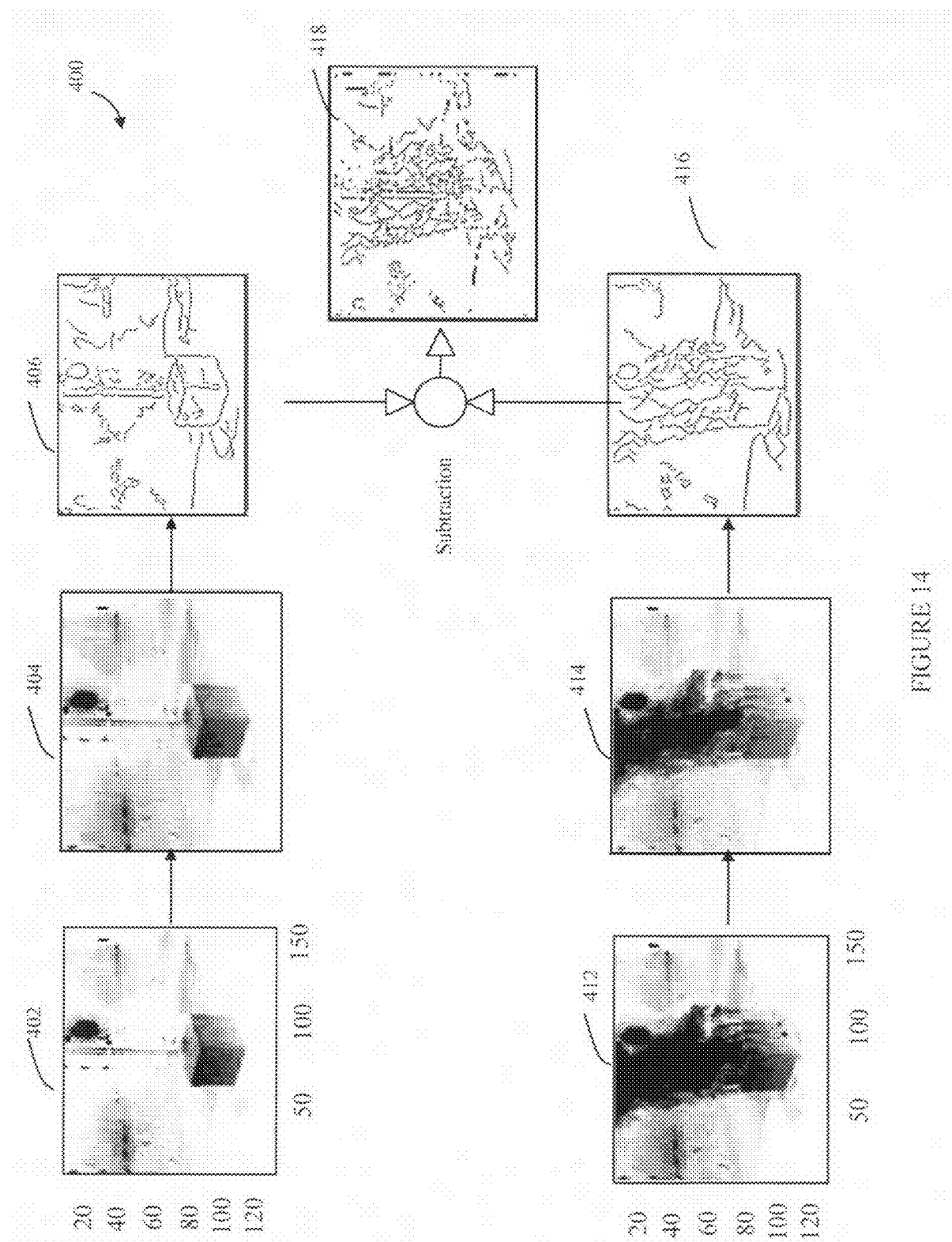
FIG. 14 is a diagram illustrating edge detection and comparison according to the system described herein.

Referring to FIG. 14, a diagram 400 illustrates extraction of edge features used to detect fire. Two frames 402, 404 represent reference frames corresponding to no fire being present. The frame 404 occurs after the frame 402. The result of performing edge detection on one of the frames 402, 404 is shown in the edge result frame 406.

In contrast, two frames 412, 414 show conditions corresponding to a fire. The frame 414 occurs after the frame 412. An edge result frame 416 represents the results of performing edge detection on one of the frames 412, 414. The difference between the edge result frame 406 corresponding to no fire and the edge result frame 416 corresponding to a fire condition is provided in a difference frame 418. The light portions in the frame 418 (representing differences) may be used to determine the presence of fire. The energy of the difference frame 418 may be calculated using any conventional method, such as summing the square of the pixel intensity of the difference frame 418 and taking the square root thereof divided by the number of pixels in the difference frame 418.

Figure 15:
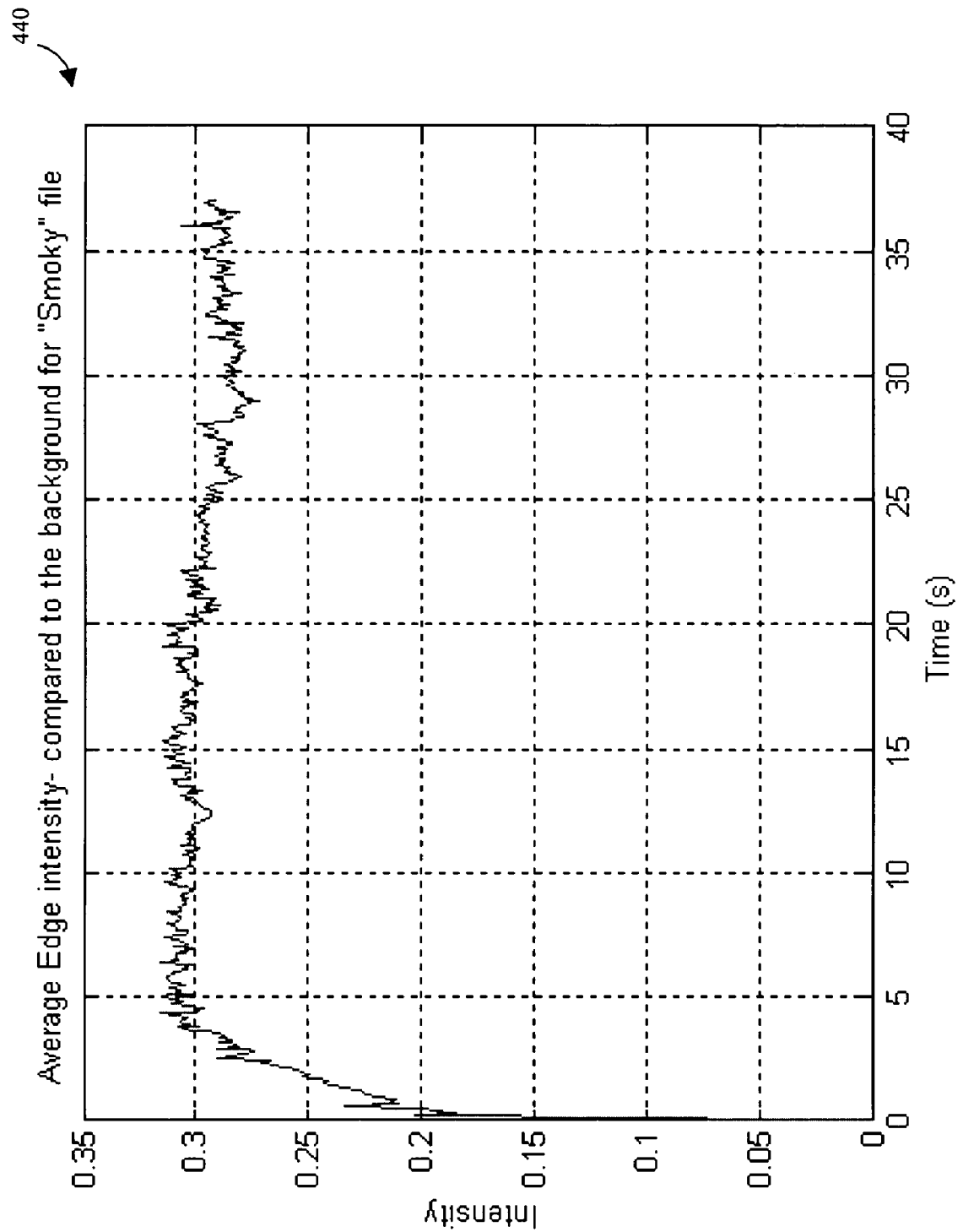
FIG. 15 is a graph illustrating average edge intensity for video frames corresponding to a smoke condition compared to background as a function of time according to the system described herein.

Referring to FIG. 15, a graph 440 illustrates a plot of average edge intensity vs. time of the edge difference frame 418. Note that as time progresses (i.e., as the fire progresses), the average edge intensity of the difference frame 418 increases.

Figure 16:
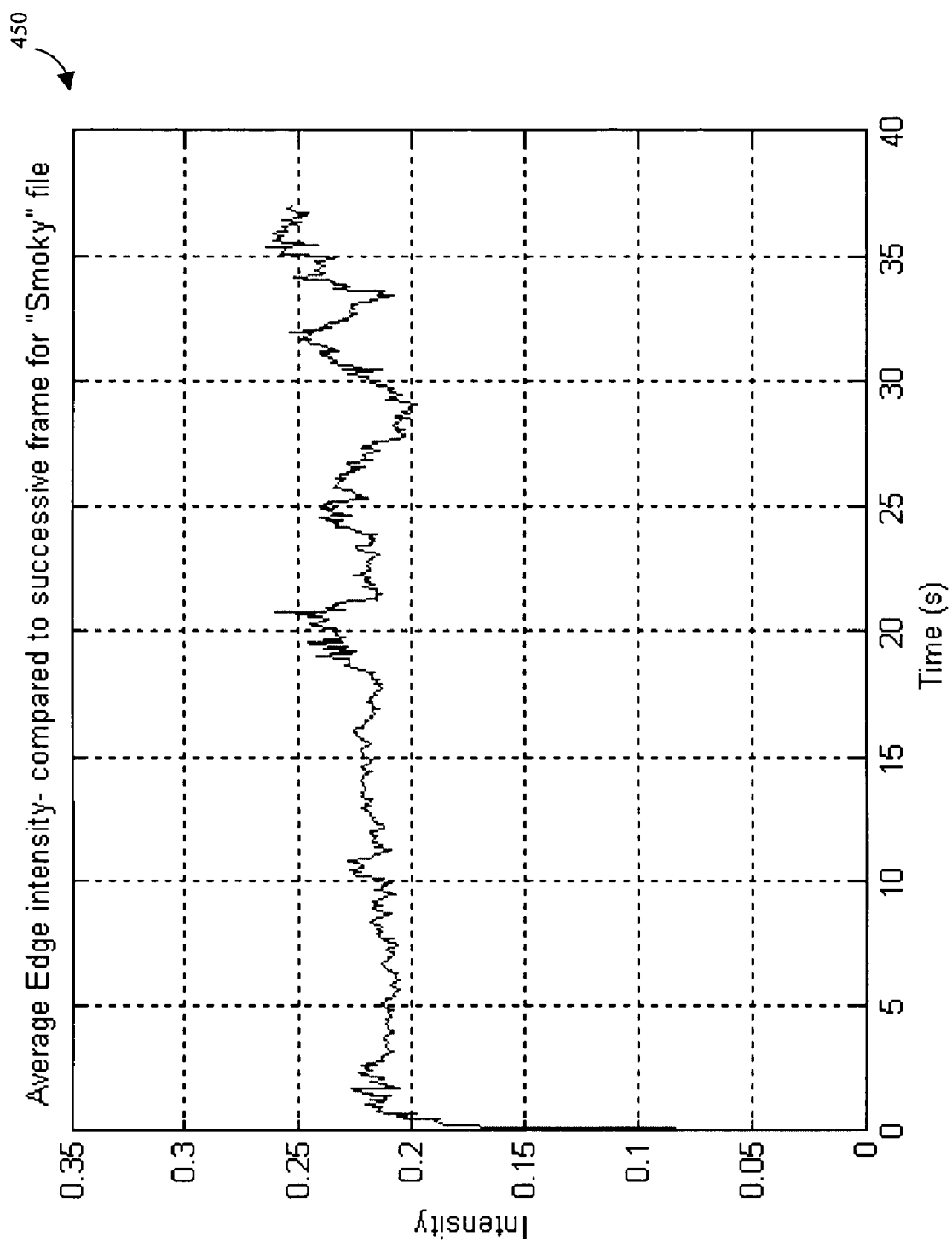
FIG. 16 is a graph illustrating average edge intensity for successive video frames corresponding to a smoke condition as a function of time according to the system described herein.

Referring to FIG. 16 a graph 450 illustrates average edge intensity between successive frames for the frame 416 of FIG. 14. As time progresses, the intensity of the edge frame 416 may be calculated at each time.

Figure 17:
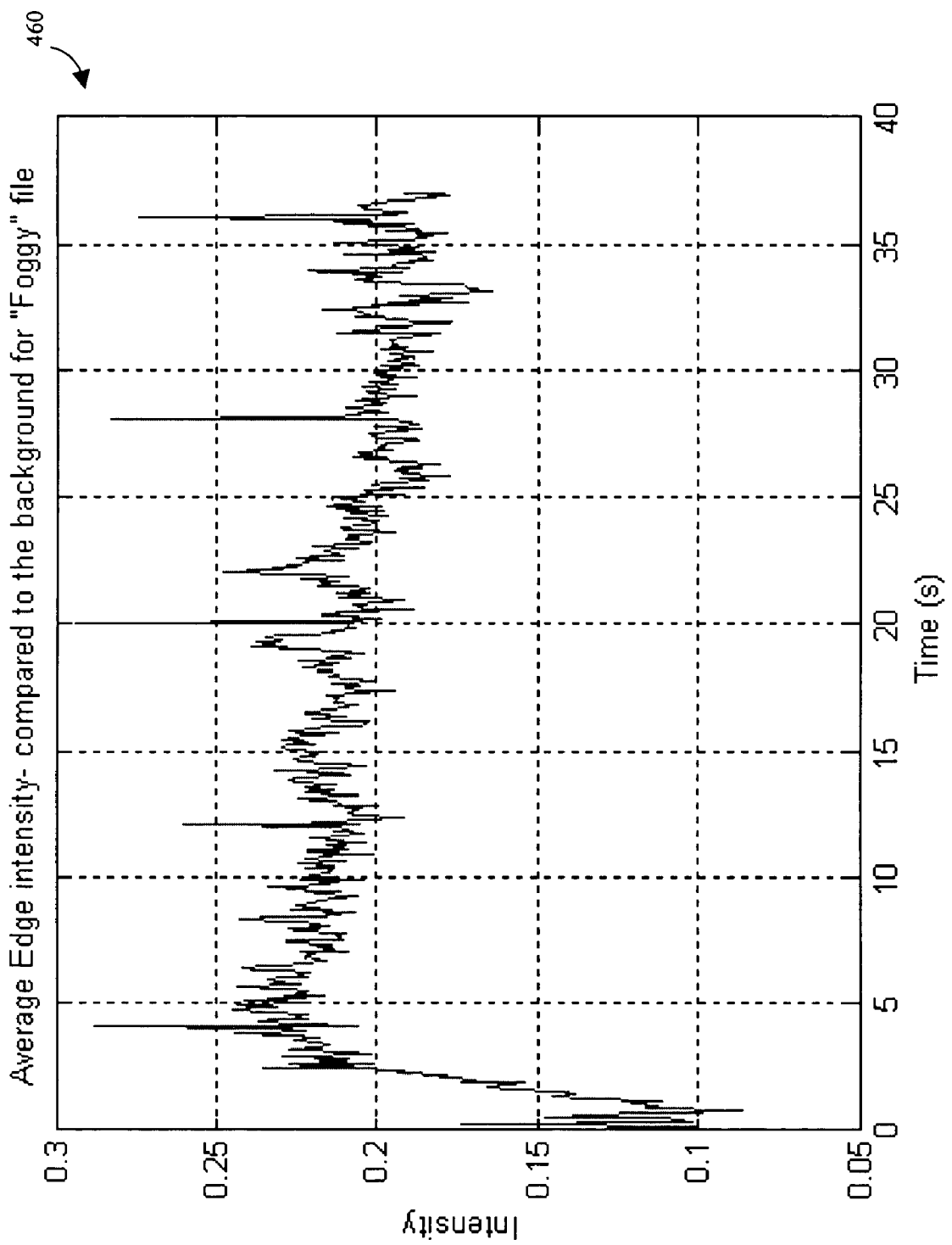
FIG. 17 is a graph illustrating average edge intensity for video frames corresponding to a fog condition compared to background as a function of time according to the system described herein.

Referring to FIG. 17, a graph 460 illustrates average edge intensity over time of a difference frame corresponding to the difference between a background frame and a frame representing simulated fog being provided to a test cargo bay (not shown). Note the difference between the graph 460 and the graph 440 of FIG. 15. This indicates that the average intensity compared to the background frame is potentially a good predictor and discriminator between fog and smoke. This information may be used by follow on processing, described below, to differentiate between fog and smoke.

Figure 18:
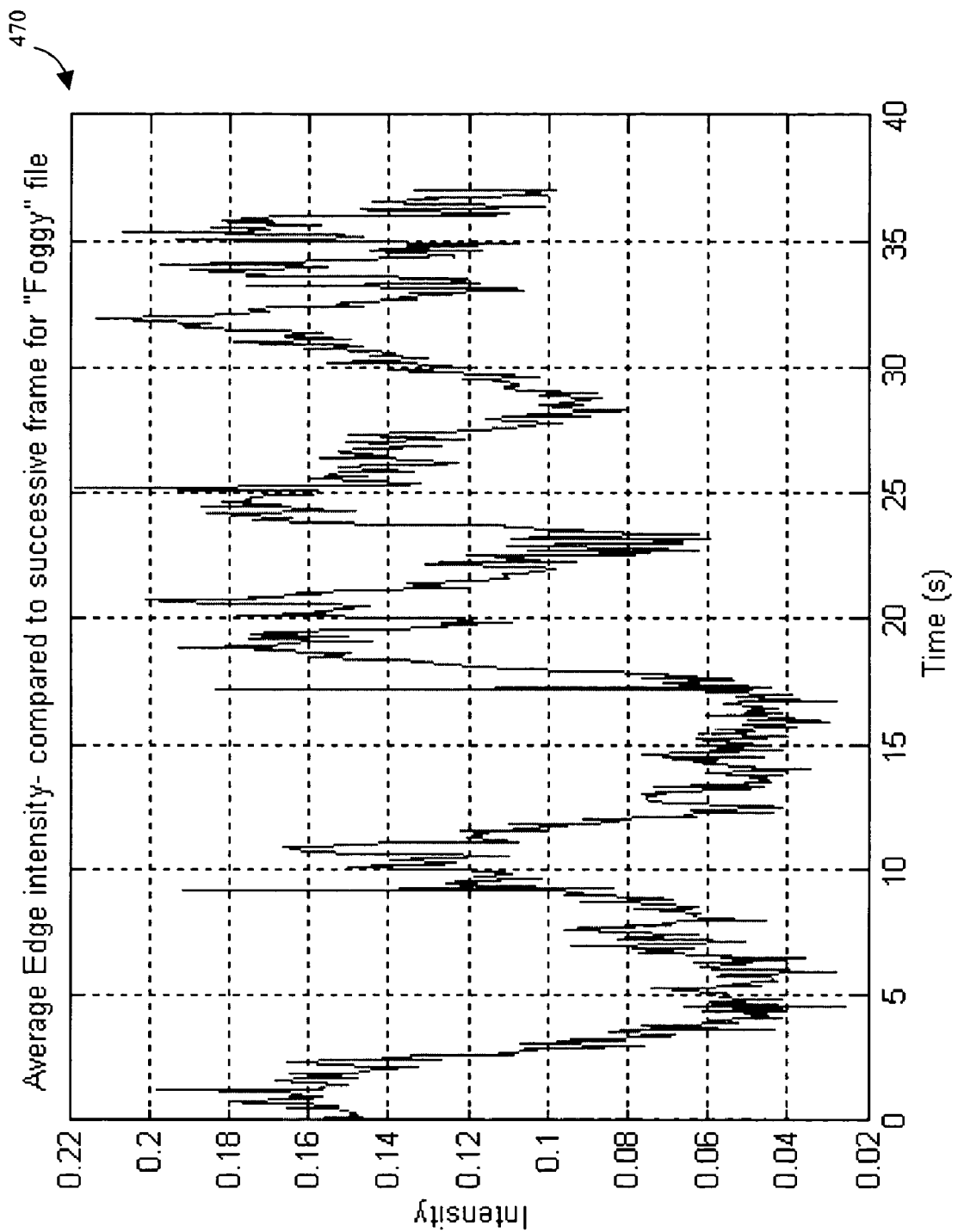
FIG. 18 is a graph illustrating average edge intensity for successive video frames corresponding to a fog condition as a function of time according to the system described herein.

Referring to FIG. 18, a graph 470 illustrates an average edge intensity over time that is determined by comparing successive frames for the simulated fog in the test cargo bay. Note the differences between the graph 470 and the graph 450 of FIG. 16. This indicates that the frame parameters illustrated by FIGS. 16 and 18 are potentially good predictors in discriminator between fog and smoke. This information may be used by follow on processing, described below, to differentiate between fog and smoke.

Other types of features may be extracted at the feature extraction routines 206, 206', 206". The types of features that are extracted depend upon the follow on processing performed by the local data fusion routines 212, 212', 212" and/or the multi-camera fusion routine 232. For example, certain types of visual problems, such as fire detection, may lend themselves to a multiscale approach where, generally, information is obtained by determining the differences between images at different scales, as described below.

The multiscale approach may be used to address two different classes of problems, both of which have potential applicability to the system described herein. The first class may include those cases where the multiscale concepts are actually part of the process being investigated, for example, such as the case where information is gathered by sensors at different resolutions or scales. A second class of multiscale processes includes cases where the multiscale approach may be used to seek computational advantages and the high parallelism of multiscale techniques such as, for example, when multiple versions of an original image are generated at various resolutions in connection with pyramidal transformations such as the Gabor and wavelet transforms, where the coefficients associated with the scalings convey information.

As will be described herein, the multiscale technique has several attractive features and advantages that may be included in an embodiment of the system described herein such as, for example, mathematical efficiency, scale invariant interpretation, richness of describing a variety of different processes including images, and a strong connection to wavelet representation. Mathematical efficiency of the multiscale approach is based upon the use of statistical models that may be applied in a parallel scheme. Parallelism may provide for efficiency, for example, by allowing the processing of signal samples, such as image pixels, in a parallel fashion one at a time rather than being processed in a series pixel by pixel scheme.

The multiscale technique may also provide a scale invariant interpretation for signals that evolve in scales. For example, when representing an image, large features may be represented in one particular scale and finer features may be represented on a smaller scale.

Wavelets, which are provided in connection with using the multiscale approach, may be used to generate features that are useful for detecting visual phenomena in an image. Wavelets may be used as an efficient technique to represent a signal in a scale domain for certain types of processes, for example, such as non-stationary processes. This is in contrast, for example, to stationary processes which may be better represented in the frequency domain for example, by means of a Fast Fourier transform (FFT).

The multiscale approach may be used as a technique for example, in connection with fusing data that is gathered by sensors of different scales or resolutions. In some applications that may be used for image processing, global monitoring may use remote sensing cameras in which there are a plurality of cameras each operating in different spectral bands. Images collected by different frequency band devices may be at several different scales. The multiscale technique may be used to provide a scale invariant interpretation of information. Even if only one type of sensor is used, different ways of measurement may be performed leading to resolution differences. Using information of these different scales may be performed using the multiscale technique. The second class of problems which may be addressed by the multiscale approach as related to the system disclosed herein are discussed below.

Figure 19:
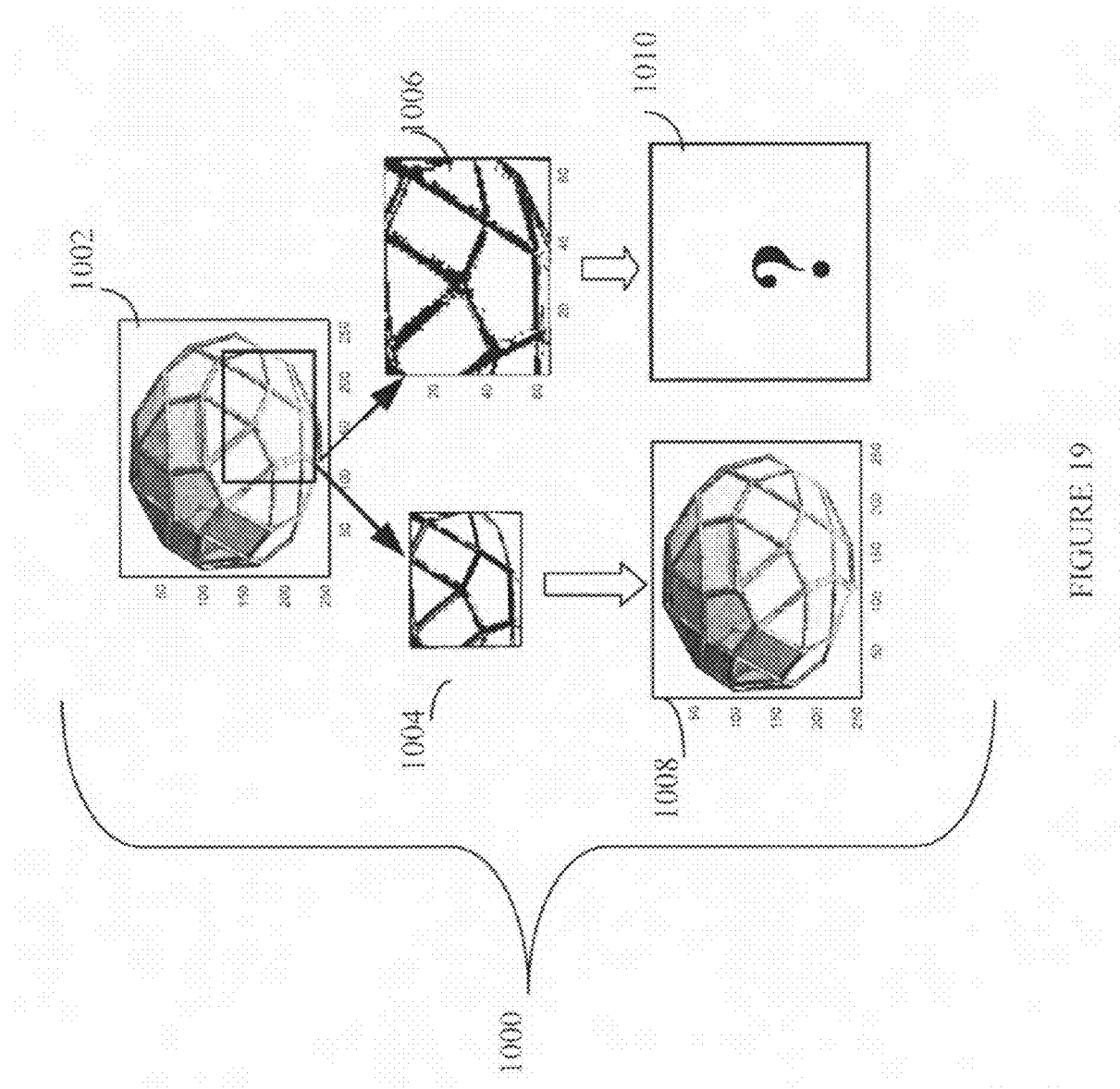
FIG. 19 is a diagram illustrating an aspect of a multiscale approach used in the system described herein.

Referring now to FIG. 19, shown is an example 1000 of different images 1002, 1004, 1006, 1008 containing complementary information about a given scene. In particular, each of the elements included in the example 1000 are images of the same object taken as different perspectives, for example, such a zoom of a particular object. However, the information included in each of the images 1002, 1004, 1006, 1008 may be complementary information about the same scene. The courser images, such as the images 1002, 1008, may each be a 256×256 pixel image containing information about the object on the entire scene. A finer image may be a zoom of a particular portion of the larger image such as, for example, the images 1004, 1006 may zoom in on a particular portion of a larger image, such as the images 1002, 1008.

Since these different images in the illustration 1000 are of different scales, information is generated in connection with obtaining the transforms used to scale the images. Accordingly, it may be possible to extract features of an image using information from transforms applied in connection with a multiscale technique.

Multiple versions of an image may be generated at various resolutions by means of pyramidal transformations, such as the Gabor transform and wavelet transforms, for example. Using such techniques, the original process or image in this instance may be transformed into two sets of coefficients. A first set of coefficients may include low frequency content of the signal and may be referred to as scaling or approximation coefficients. A second set of coefficients may be characterized as containing high frequency content of the signal or image and may be referred to as wavelet or detail coefficients.

Because of the pyramidal structure of the wavelet transform, the representation of the approximation and detail coefficients may be represented as a tree structure.

Models indexed on homogeneous trees may be applied in various fields of signal processing and may also be applied in connection with images. In such a technique, a tree may be used to represent the multiscale model where each level of the tree represents a scale. As the model evolves from one level to another down the tree, (from the root to a leaf), the signal evolves from one resolution to the next. An embodiment may utilize the tree structure to describe many classes of multiscale stochastic processes and images such as Markov random fields and fractional Brown motions.

The tree representation may be used in connection with a coarse to fine recursion in the scale domain, for example, using Haar wavelets synthesis equation.

$$f(m+1, n) = \sum_{k=-\infty}^{k=+\infty} h(2k-n) f(m, k) + \sum_{k=-\infty}^{k=+\infty} g(2k-n) d(m, k) \qquad \text{EQUATION 1.1}$$

In the foregoing, Equation 1.1, f(m,) represents the sequence of scaling or the approximation coefficients of the original signal having a scale of m. It should be noted that the higher the scale m is, the finer the resolution. In the foregoing equation, the term d(m,) may represent the sequence of wavelet or detail coefficients as the scale m.

An embodiment of the system described herein may simplify the description of wavelet coefficients (i.e., d(m,)) as being nearly white. In accordance with this assumption, models may be defined in accordance with the homogenous tree structure on a scale-to-scale scheme as represented in accordance with:

$$X(s)=A(s)X(\bar{\gamma}s)+E(s)W(s) \qquad \text{EQUATION 1.2}$$

In Equation 1.2, "s" may represent an abstract index corresponding to nodes in the tree, ($\bar{\gamma}$s) denotes the parent of the node s, and $\bar{\gamma}$ may represent an upward shift operator on a set of nodes of a tree. W(s) is a driving white noise under the assumption of white wavelet coefficients. The term A(s) x($\bar{\gamma}$s) and E(s)(w) in Equation 1.2 may represent, respectively, the predictable and unpredictable parts of an image as it evolves from one scale to the next.

In accordance with the foregoing tree structure, and the different scalings represented at different levels of a tree of a particular image, different one-dimensional and two-dimensional images or signals may be represented with different tree structures.

Figure 20:
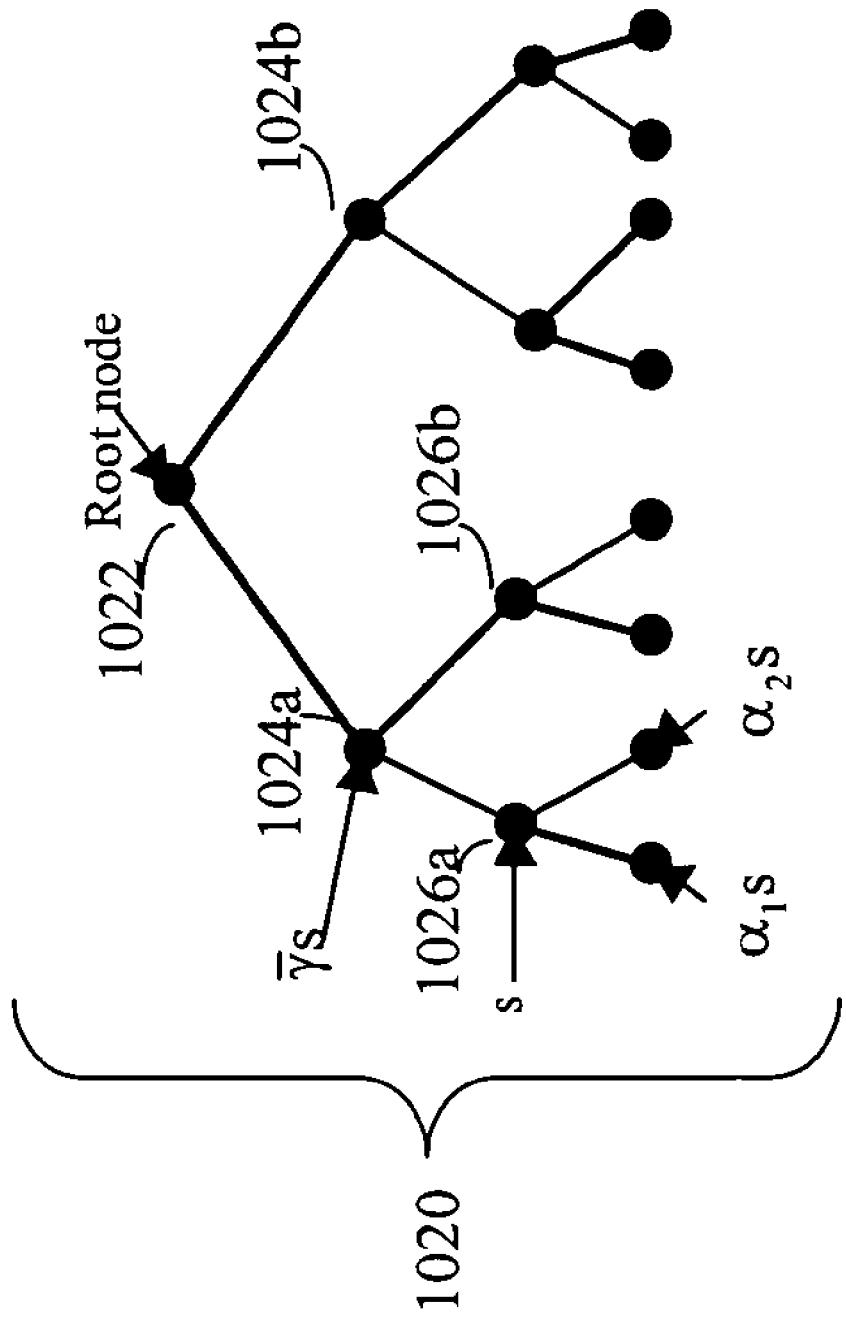
FIG. 20 is a diagram illustrating a tree structure that facilitates the multiscale approach used in the system described herein.

Referring now to FIG. 20, shown is an example of an embodiment of a tree structure 1020 that may be used to represent one dimensional signals or images. The tree structure 1020 of a dyadic tree structure may be used to represent a one-dimensional signal or image representation. In this particular example of a tree for one dimensional signal or images, each parent node has two child nodes. A root node 1022 may correspond to a first image that is decomposed into approximations at lower resolutions, for example, in accordance with different orientations. The detailed root node 1022 may be decomposed into a plurality of images at lower levels for child nodes within the tree of a courser resolution. In this example, the root node 1022 may be a detailed image decomposed into two child node images 1024a, 1024b. Similarly, each of the images 1024a, 1024b may be decomposed into coarser images. For example, the image 1024*a* may be decomposed into two images 1026*a*, 1026*b*, as shown in the tree structure 1020.

Figure 21:
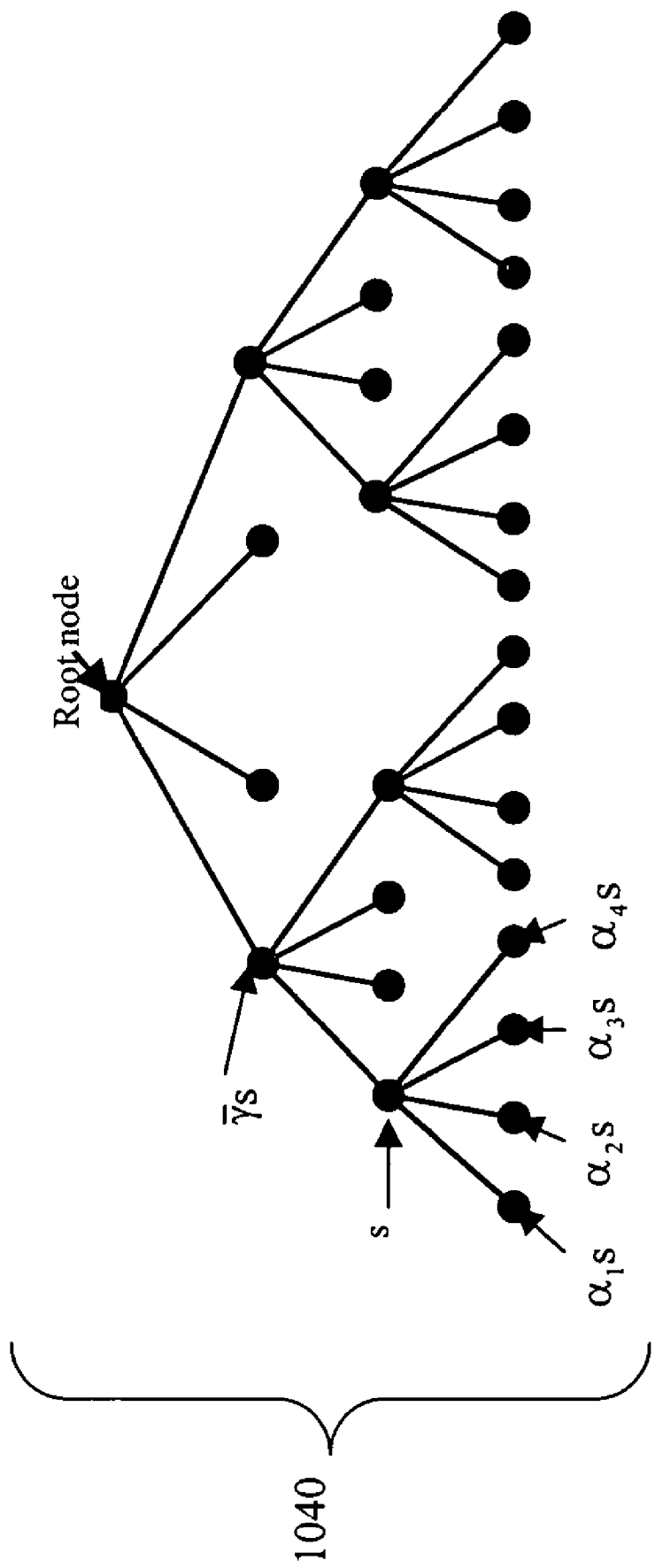
FIG. 21 is a diagram illustrating another tree structure that facilitates the multiscale approach used in the system described herein.

Referring now to FIG. 21, shown is an example of another tree structure 1040 that may be used to represent a two-dimensional signal or image. The tree structure 1040 in this example shows the first four levels of a quadratic tree structure for a two-dimensional image representation. In the representation 1040, each node may have four children or child nodes. The tree structure 1040 may also be characterized and referred to as a quadratic tree. Other types of tree representations, for example, such structures where a node has a different number of child nodes, may vary in accordance with the dimension of the image or signal being decomposed as well as whether a wavelet decomposition is being used as in this instance. The tree representation of images described herein may be used in accordance with the wavelet structure. Wavelet decomposition of an image, such as a two-dimensional image, may yield four images each of a courser resolution than an image of its parent node.

Figure 22:
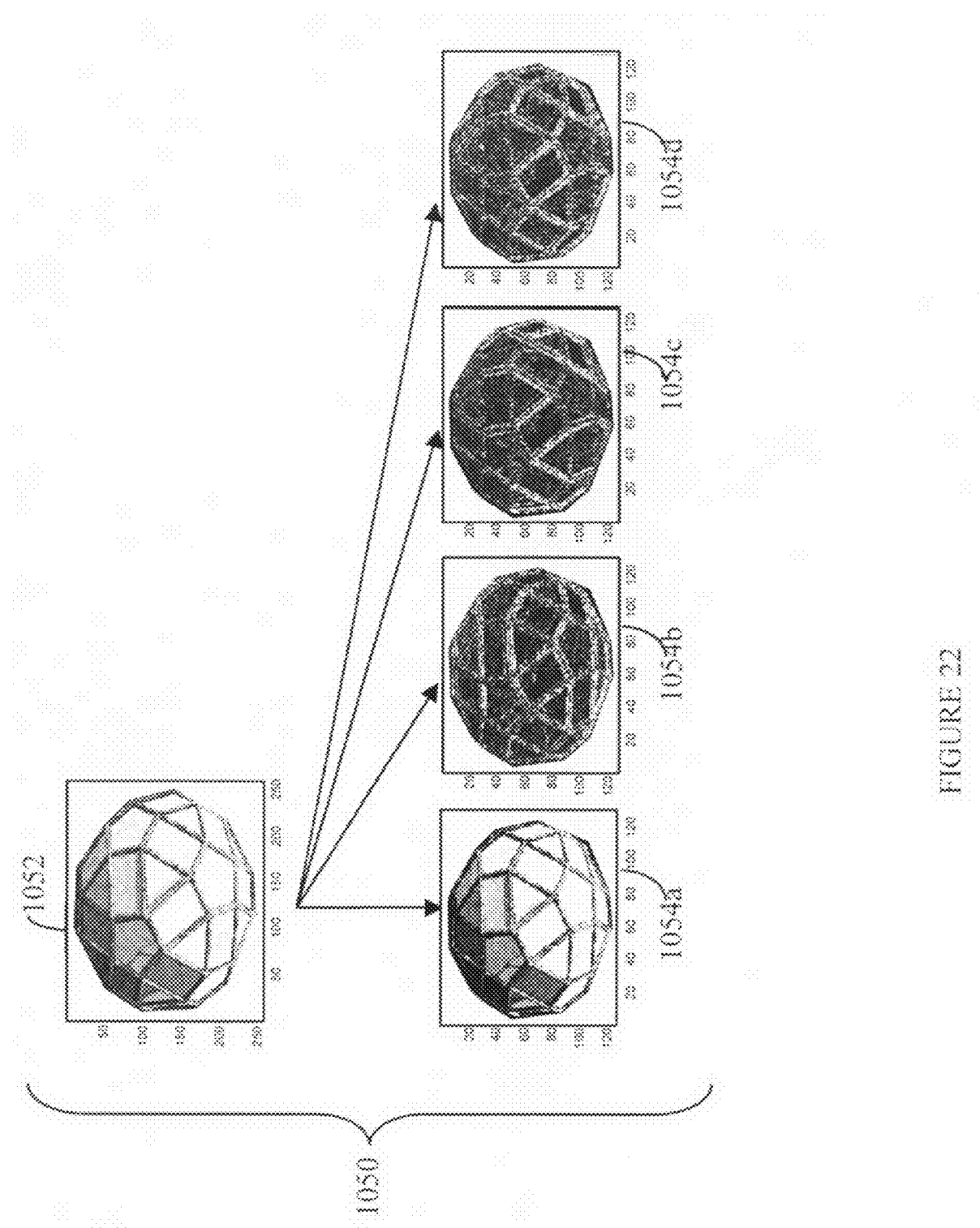
FIG. 22 is a diagram illustrating another aspect of a multiscale approach used in the system described herein.

Referring now to FIG. 22, shown is an example of a tree representation 1050 of an image decomposed by wavelet transformation. In this example, an initial image 1052 may be a 256 by 256 pixel image decomposed by wavelet transformation into its approximation at lower resolution, such as 128 by 128 pixels, and three detailed images showing details at the horizontal, vertical and diagonal orientations. With reference to the tree structure 1050, the image 1052 may be approximated at a lower resolution an image 1054*a*. Three images 1054*b*, 1054*c*, 1054*d*, may represent detailed images, respectively, showing details of the horizontal, vertical, and diagonal orientations.

Each node "s", except at the top and bottom in a q-order tree, has a parent node and q offspring nodes. Different levels of the tree represent distinct scales in this set of multiscale versions of the image. The tree architecture or typology may be used to represent images exhibiting multiscale features across varying scales. In a tree model, it should be noted that nodes may be correlated vertically or across scales between levels rather than horizontally within the same domain or level. The stronger the correlation across scales, such as between different levels, the more efficient the tree model may be. Depending on the way of interpreting nodes in the tree, scales may be organized from finer to coarser, or coarser to finer, as the tree is scanned from top to bottom (root to leaf).

For example, consider the case where a process or image may be represented as a set of images representing the same scene, but at different resolutions or scales. Different image versions at various resolutions may be generated using a wavelet transform. The original image may be at the root of the tree which is the finest scale. The first round of wavelet transformations may yield four images, one approximation and three detailed images for example as described in connection with FIG. 22. The second round of wavelet transformations as applied to each one of these images may yield a total of sixteen images.

Repeating the application of a wavelet transformation, for example N times, yields a multiscale process of order N. A tree having N levels may represent the set of images where nodes of the tree represent the images as described herein. Each level of the tree may represent a subset of images at a certain resolution or scale. According to this arrangement, scales may progress from finer to coarser as the trees scanned from the top to the bottom or from the root node to its leaves.

In another example, if the approximation images are considered, each node of the tree may represent the pixel information and the scale arrangement may be reversed. In this particular example, scales may progress from coarser to finer as one scans the tree from top to bottom. In this example, the bottom of the tree may then represent pixels of the finest image.

The following describes the tree representing an image where the bottom of the tree represents the pixels of the finest image and the coarser image is represented as at the root or top. If an ordinary node "s" is located at a particular scale M, then the parent node is located at the scale M−1, and the offspring nodes of the node "s" are accordingly located at the scale M+1 of the tree.

In the foregoing tree structures, each node "s" in the tree may correspond to a state vector (x) representing scale information at a particular node "s". The state vector (x) may be interpreted in a variety of different ways. For example, (x) may represent the gray level of pixels in a set of intensity images or the RGB (red green blue) content of pixels in a set of colored images. The vector (x) may be a combination of wavelet and scaling coefficients after applying a wavelet transform to the original process.

As described above, the multiscale technique considers an image of the mapping of node coordinates into density values represented in a tree-like structure. The general technique is to have an original image projected at different scales or resolutions where the image dynamics connect pixels with various resolutions in a scale-to-scale restructure as described, for example, in connection with FIG. 21 and FIG. 22.

It should be noted that, for example, in the case of a suspected fire, information provided by the gray level of image pixels may not be sufficient to identify a fire because the image quality may depend heavily on local variations of image intensity. Accordingly, to capture such local information, the size of the neighborhood where the contrast is computed may be adapted to the size of the objects to be analyzed. A specific resolution or scale may be used to characterize the size of the neighborhood in order to analyze the local information. In connection with a suspected fire, for example, objects may have different sizes and it may not be possible to define an optimal common resolution for all local information extracted from a particular image. Thus, taking a set of images at different resolutions may provide additional information for image analysis and use of the multiscale features may be generated by use of the wavelet transformation as described herein. Using such features such as combinations of scaling and wavelet coefficients, linear and non-linear multiscale models may be implemented to characterize specific classes of images such as those corresponding, for example, to normal, smoky, foggy or hazardous environments. In particular, simple and effective classes of linear auto regressive models may be tested. Additionally, neural network-based multiscale models, described below, may be identified and implemented to ensure early fire detection and increase the system's robustness to variability of relevant factors and the system environment.

Figure 23:
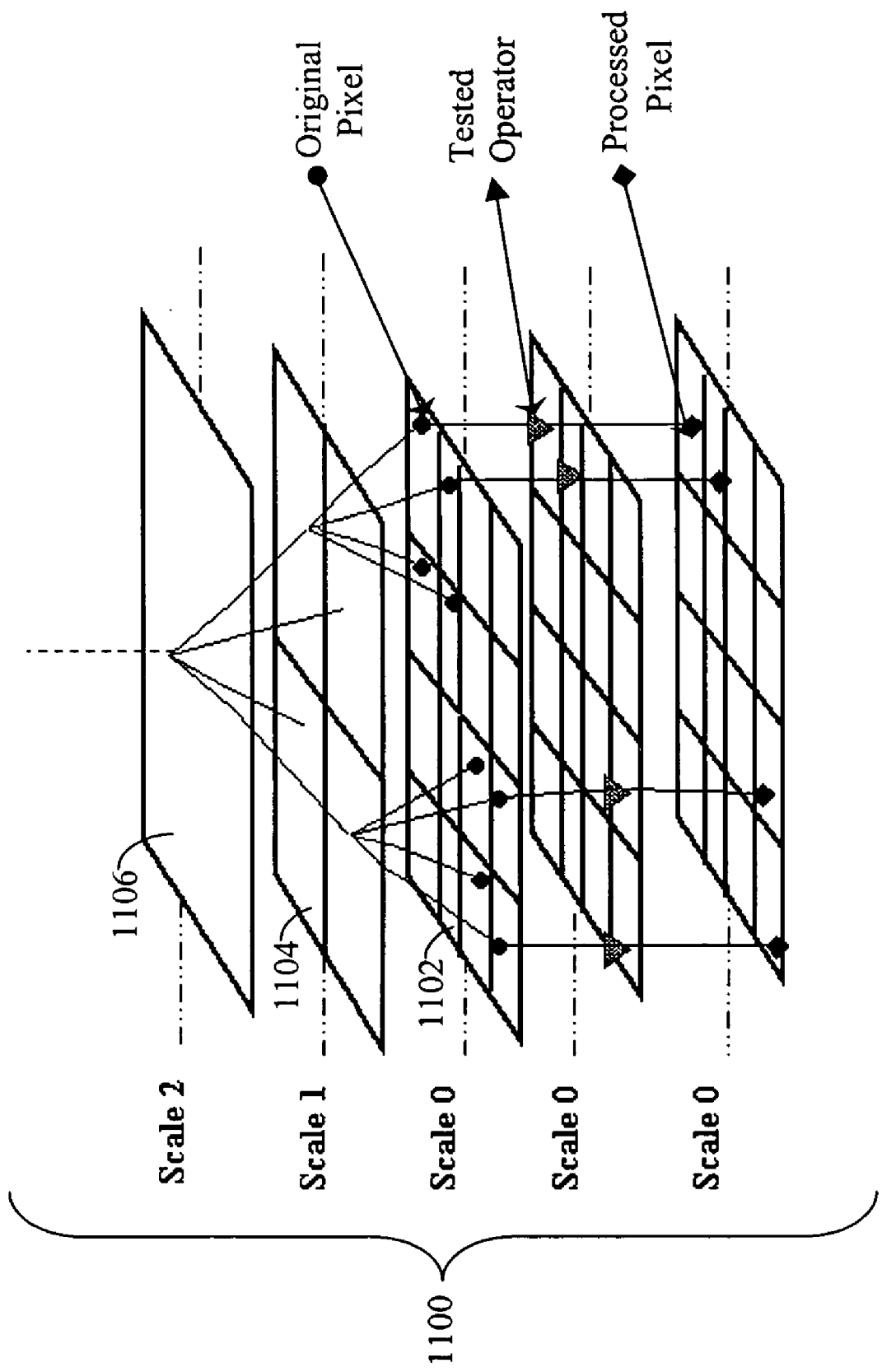
FIG. 23 is a diagram illustrating an example of an image represented according to the multiscale approach used in the system described herein.

Referring now to FIG. 23, shown is an example of an image represented in accordance with the multiscale technique described herein. The representation 1100 of FIG. 23 includes an original image 1102 shown as having a scale of zero. Applying, for example, the wavelet transformation a first time, the original image or set of pixels 1102 may be transformed to a scale of one at an image 1104. Subsequently applied again, the wavelet transformation may produce yet another image 1106 having a scale of two. Beginning with the original pixel image, the same operation may be applied across the plurality of pixels of the same image in parallel generating a plurality of paths of the tree.

The Wavelet coefficients calculated in connection with performing the multiscale process are the features extracted at the routines 206, 206', 206" which may be used by follow on processing, as described below.

Another technique that may be used to extract features at the routines 206, 206', 206" is Principal Component Analysis (PCA), which considers an image as a single vector and computes eigenvalues of the correlation matrix of the image vector. Each eigenvalue corresponds to a so-called eigenimage. Computed eigenvalues may be used as projection weights of the original image into the space spanned by the eigenimages. Each class of images may be characterized by a weighting factor detailing its projections into a set of eigenimages. This technique may be used to represent an image by a relatively small number of eigenvalues that are coefficients of decomposition of an image into principal components. For example, eigenvalues may be determined for visual images corresponding to conditions that are normal, smoky, foggy or another type of an environment. The pixel image matrix may be represented with a small number of uncorrelated representative integers or eigenvalues.

The PCA technique may be used to discriminate between different sensed scenes, for example such foggy, cloudy or a fire, in a particular location of a plane. Different images, such as the foggy image and the smoke image, may have special principal components differing from principal components of other images. Accordingly, PCA techniques may be used to represent known images, for example, those associated with a smoky condition or a foggy condition.

Applying PCA techniques, a known condition, such as a smoky or foggy condition may be represented by a set of eigenimages together with a set of eigenvalues. Fog may be classified by a set of particular eigenvalues or weighting factors. Similarly, another condition may be characterized by a different set of weights or eigenvalues.

As described in more detail below, the PCA technique may be used, for example, with a neural network where a particular set of known weights may be associated with a particular condition such as foggy. The neural net may be trained to recognize and associate a particular set of eigenvalues of weight with the existence of a particular condition such as fog or smoke. Once the neural net is trained to differentiate between these different conditions, a target image may be used and the trained neural net may determine whether the particular target image corresponds to anyone of a particular set of conditions that the neural net has been trained for. In other words, the trained neural net compares certain characteristics or features with those of conditions specified by training data fed to the neural net. The neural net may be used to determine whether the target image corresponds to one of the particular conditions for which the neural net was trained. Generally, PCA transforms a number of correlated variables into a number of uncorrelated variables that may be referred to as Principal Components.

Generally, the first principal component may account for as much of the variability and data as possible and each succeeding component may also account for as much of the remaining variability as possible. The principal components reflect the inter-correlation between the matrix elements (e.g. image pixels). This procedure may often be referred to as eigenanalysis. In one embodiment, the eigenvector associated with the largest eigenvalue may have the same direction as the first principal component. Accordingly, the eigenvector associated with second largest eigenvalue may determine the direction of the second principal component and so on. The sum of the eigenvalues equals the trace of the square matrix and the maximum number of eigenvectors equals the number of rows or columns of this matrix.

PCA may be characterized as a one unit transformation similar to factor analysis. PCA may be represented or described as a weighted linear combination producing a new set of components by multiplying each of the bands or components in the original image by a weight and adding the results. The weights in the transformation may collectively be referred to as the eigenvectors. For any given number of original bands or components, an equal number of transformation equations may be produced yielding an equivalent number of component images.

Note that, in other embodiments, it is possible to use both the eigenvalues and the eigenimages to detect/verify various conditions. In those cases, the follow on processing (e.g., neural net) would be trained/programmed with both the eigenvector data and the eigenimage of particular conditions. Then, for detection/verification, both the eigenvector data and the eigenimages would be used.

PCA, and other techniques described herein, such as the multiscale modeling technique, may be used to reduce the data dimensionality and to develop meaningful features to describe and represent images. Example of such techniques may include wavelet coefficients, high order statistical moments, edges, skeletons, and the like.

Figure 24:
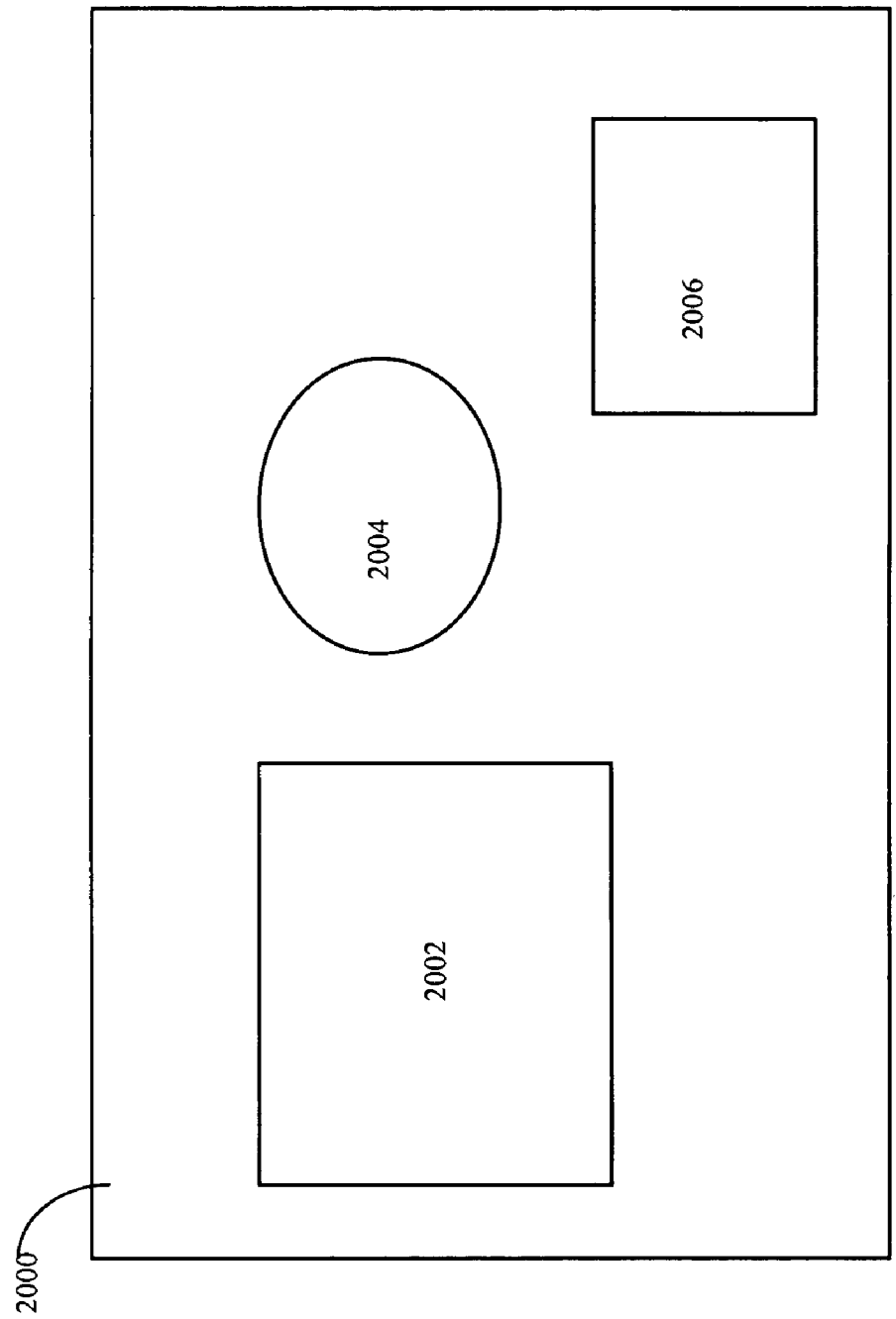
FIG. 24 is a diagram illustrating use of Principal Component Analysis (PCA) in connection with the system described herein.

Referring now to FIG. 24, shown is an example of an image 2000 that may be produced using cameras that are part of the system described herein. The image 2000 may include objects 2002, 2004, 2006. Each of the objects 2002, 2004, 2006 in the image 2000 may correspond, for example, to items included in one of the cargo bays 102-104. PCA may be used to extract feature information from the image 2000, for example, resulting in a first principal component corresponding to the object 2002, a second principal component corresponding to the object 2004, a third principal component corresponding to the object 2006, and a fourth principal component corresponding to the object 2008. The image 2000 may represent objects in a bay under normal conditions. In contrast, if there is a fire or smoke in the bay, there may be additional or different principal components when the PCA technique is applied to the image.

Figure 25:
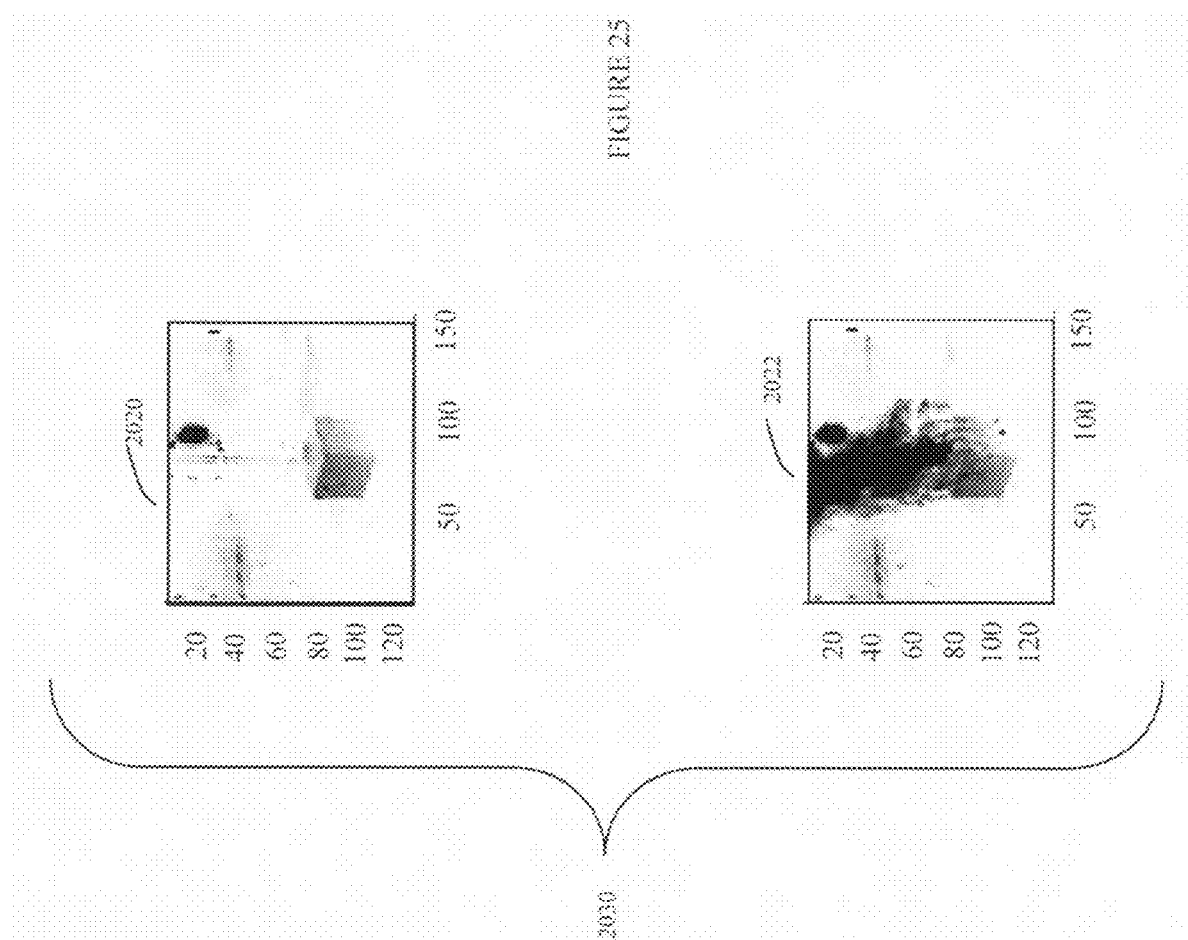
FIG. 25 is a diagram illustrating application of PCA on a background frame and a frame corresponding to a fire condition according to the system described herein.

Referring now to FIG. 25, shown is an example 2030 of images corresponding to normal and smoky conditions within one of the cargo bays 102-104. A first image 2020 may correspond to the normal condition. When a PCA technique is applied to the image 2020 one or more principal components may be produced corresponding, for example to the rectangular-shaped object in the center of the image 2020 and the elongated pipe-like shape extending from the top portion of the rectangular-shaped object.

A second image 2022 may correspond to a smoky condition of one of the bays 102-104. When a PCA technique is applied to the image 2022, one or more principal components may be produced corresponding to the rectangular-shaped object in the center of the image 2022 and the smoke arising from the top portion of the rectangular-shaped object. As described in more detail below, these principal components may be produced and used to "teach" for example, a neural net. The resulting trained neural net may be used to make a decision regarding whether one or more observed images exhibits the "normal" or "smoky" states.

In other embodiments, it may be possible to first combine signals from more than one camera (either before or after image compensation) prior to extracting features. In that case, the local fusion routines 212, 212', 212" may be processing features generated by more than one camera.

Once features have been extracted using the feature extraction routines 206, 206i', 206", the features are processed by a combination of the local fusion routines 212, 212', 212" and the multi-camera fusion routine 232. The fusion may be performed using any one of a variety of techniques, such as neural nets, fuzzy logic, hidden Markov models, and/or multiple model state estimation. The use of various techniques is described in more detail below. Note that any of the features discussed herein, or any other type of feature, may be processed using fusion techniques to provide a result. For example, the energy indicators discussed above in connection with FIG. 3 may be used as inputs to a neural net, fuzzy logic routine, hidden Markov model, and/or multiple model state estimator to detect some of the patterns/trends discussed above in connection with FIGS. 4-18.

A neural network may be characterized as a set of units or nodes and connections between the nodes. A node may have one or more inputs and a single output. Nodes may be interconnected together by nets. The values of inputs of the node may be multiplied by an internal weight associated with the node. If there are multiple inputs to a node, the resulting value associated with each of these inputs multiplied by an internal unique weight may be combined and then processed by an internal function associated with the node to produce an output.

A neural network may learn by "training" using training input. The process of training a neural network may involve adjusting input weights associated with each of the nodes in accordance with training input such that the operative network is consistent with the desired output. This involves the development of a training file which may include data for each input node, and the correct or desired response for each of the network's output nodes. Training of a network may be used, for example, in image recognition and other applications.

For the system disclosed herein, features used in connection with neural net training may include any one of a variety of features extracted at the feature extraction routines 206, 206', 206". An embodiment may include any one of a different variety of different types of neural net training techniques. An embodiment may include a supervised training technique that requires a target for learning. In such an embodiment, the neural net based system adjusts its internal parameters (weights and biases) to minimize the error between the system estimated output and the target. This type of training may be included in an embodiment, for example, if there is good knowledge of the system model. An embodiment may also use a well known locally convergent technique such as the back propagation technique used to train a neural net by adjusting weights and biases. Note also that it may be possible to train the system using experimentally obtained image data recorded for various scenarios.

Once the network has been trained, input data may be provided to the network for processing to produce a response in accordance with what the network "learned" during its training. Neural networks may be implemented in hardware and/or software and be used in any one of a variety of different applications ranging from, for example, voice recognition systems, image recognition, medical imaging, and the like. In this particular example, neural networks may be used for follow on processing to process any of the features extracted using any one of a variety of different techniques such as, for example, principal component analysis or PCA, multiscale modeling techniques, and the like. As part of the training process, the interconnection strengths or weights between the nodes may be adapted to learn from a particular set of training patterns.

Figure 26:
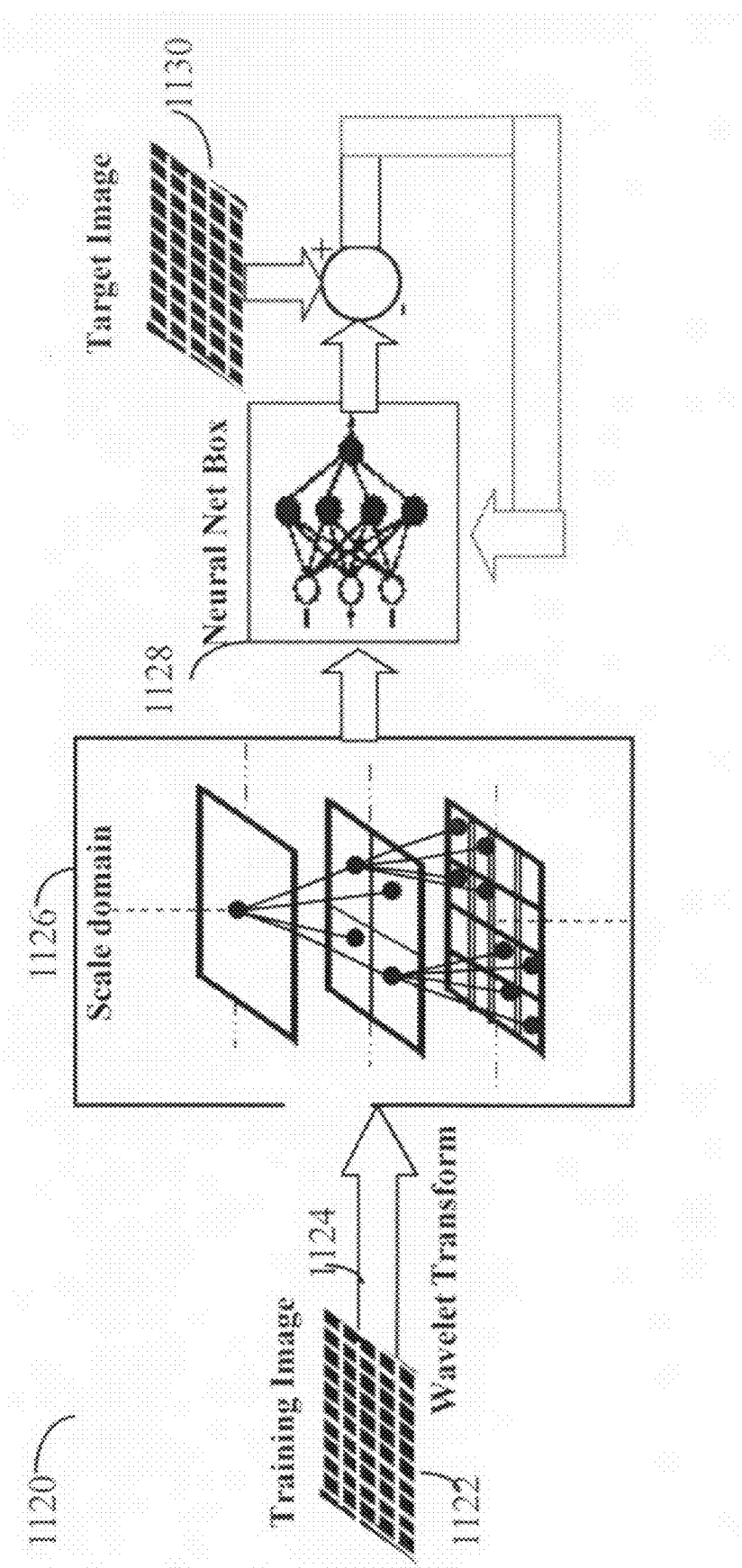
FIG. 26 is a diagram illustrating use of a neural net according to the system described herein.

Referring now to FIG. 26, shown is a block diagram 1120 of a neural network multiscale model that may be used in connection with identifying and implementing early fire detection. By analyzing wavelet coefficients associated with transforming images of different conditions such as, for example, normal conditions, smoky, foggy or other hazardous environments, training images 1122 may, in conjunction with the wavelet transformation 1124, be used to produce a structure of images 1126. The wavelet coefficients of the training images may be used to "teach" a neural net 1128 to recognize particular conditions. The result is the trained neural net 1128 which may subsequently receive as input wavelet coefficients of a target image 1130. Accordingly, the neural net 1128 may be used to identify or classify particular ones of the target image 1130 as one corresponding to, for example, normal conditions, smoky conditions, foggy conditions or other type of hazardous or alarm environment conditions in accordance with the particular training images uses.

In the block diagram 1120, the wavelet transformation may be used in an embodiment as part of the feature extraction processing 206, 206', 206" described elsewhere in connection with FIG. 2. The trained neural net 1128 may be executed as part of the processing associated with some combination of the local fusion routines 212, 212', 212" and the multi-camera fusion routine 232. Additionally an embodiment may also use one or more different feature extraction techniques with the neural network (or a different neural network running in parallel) such as, for example, Principal Component Analysis (PCA), Multiscale modelling, frame energy calculations, and the like. Generally, the system described herein may mix and match any one or more particular feature extraction techniques to be used in combination with any one or more different techniques associated with the combination of the local fusion processing 212, 212', 212" and the multi-camera fusion routine 232

Another technique that may be used by a combination of the local fusion routines 212, 212', 212" and the multi-camera fusion routine 232 is the Hidden Markov Model (HMM). An HMM may be used to identify patterns which appear over a period of time. In connection with images described herein, by observing images over time, a particular hidden state of interest may be determined.

Generally a Markov process may be defined as one which moves from state to state depending only on the previous N states. In this instance, the process may be called an order N Markov mode where N is the number of states affecting the choice of the next state. The simplest Markov process is a first order process (N=1) where the choice of state may be made purely on the basis of the prior state.

For a first order Markov process having M states, there are M squared transitions possible between states since it may be possible to move from any one state to another. Associated with each transition is a particular probability of progressing for moving from one state to another. Such a probability may be referred to as a transition probability. The M squared probabilities associated with each of the transitions in a first order Markov process having M states may be collected together in the form of a matrix that may be referred to as a state transition matrix. As described herein, these probabilities do not vary with time although it is possible to contemplate embodiments where the probabilities may vary over time.

In initializing a system using Markov processes, an estimate or probability at time=zero may be determined. In one embodiment, this quantity may be defined in a vector of initial probabilities also referred to as the $\pi$ vector. The initial vector $\pi$ of probabilities sum to one. Similarly, each of the rows or columns of the transition matrix also sum to a probability of one. A system that may be characterized in such a manner as to have one or more hidden states, a set of initial conditions defining initial probabilities at time=0 ($\pi$), and a state transition matrix defining the probability of a system in a state N given a previous state N−1 may be described as a Markov process. Markov processes permit recognition of patterns evolving over time or across any other variable such as scale.

In connection with an observed sequence of states or images, there may be a probabilistic relationship to the hidden process or hidden states, for example, such as those characterized as normal or others with the presence of smoke or fire. In the instance where an observed sequence of images is probabilistically related to hidden states, processes may be modeled using an HMM where there is an underlying hidden Markov process that changes over time as well as a set of observable states which are probabilistically related to the hidden states of the process. Similar to representing the sum of probabilities of hidden states, the probabilities involving all observable states sum to one. In addition to the state transition matrix, an HMM may also have what will be referred to herein as a confusion matrix containing the probabilities of the observable states given a particular hidden state. The hidden states may be characterized as the real states of the system described by a particular Markov process. The observable states may represent those states of the process that are observable, such as represented by images taken from a camera. A set of initial probabilities may also be specified as well as a state transition matrix and a confusion matrix. The HMM may be characterized as a standard Markov process or augmented by a set of observable states with the addition of a confusion matrix to express the probabilistic relation between the hidden and observable states. The terms of the state transition matrix and the confusion matrix may be constant in one embodiment and may not vary over time following a timing variance assumption in this example. Accordingly, the following triple ($\pi$, A, B) may be used to define an HMM mathematically in a more concise way as follows:

$\Pi=(\pi_i)$: Vector of initial state probabilities (4a)

$A=(a_{ij})=Pr(x_i^t/x_j^{t-1})$: State transition matrix (4b)

$B=(b_{ij})=Pr(y_i/x_j)$: Confusion matrix (4c)

What will now be described are three types of problems that may be solved using HMMs for processes that generate patterns evolving over a space of time. The evaluation problem matches the most likely system to a sequence of observations. In other words, given an HMM model, what is the probability of generating a given sequence of observations. This technique, based on the notion of HMM, that is used to solve this problem is known as the forward algorithm.

The decoding problem determines the hidden sequence most likely to have generated a sequence of observations. In other words, given a sequence of observations that are associated with a given HMM, what sequence of hidden states most probably generated such observations. The technique, based on the notion of HMM, that is used to solve this problem is known as the Viterbi algorithm.

The learning problem determines the model parameters most likely to have generated a sequence of observations. In other words, given a set of observed sequences, what HMM most probably underlies such set, such as, for example, what are the parameters of such an HMM. The technique, based on the notion of HMM, that is used to solve this problem is known as the forward-backward algorithm. Each one of these three problems and techniques are described in more detail in following paragraphs.

In connection with the evaluation problem and the forward algorithm, given a triple ($\pi$, A, B), what is the probability that an certain observable sequence may occur?

Figure 27:
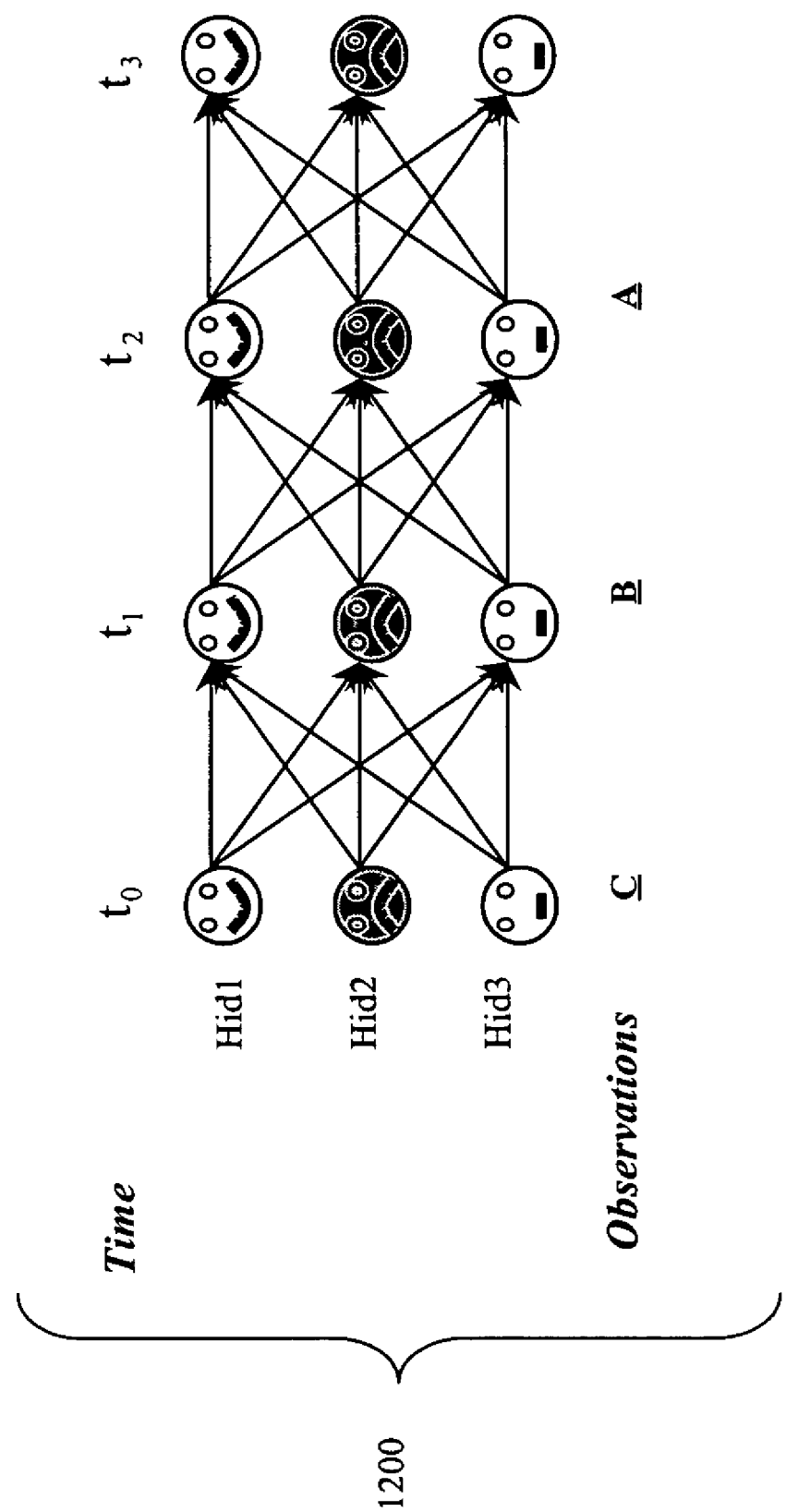
FIGS. 27-31 are diagrams illustrating use of a Hidden Markov Model in connection with the system described herein.

Referring now to FIG. 27, shown is an example 1200 of a representation of hidden states over a period of time. The hidden states in this example may be referred to as Hid1, Hid 2, and Hid 3 at various times t0, t1, . . . in the trellis representation 1200. Each of the hidden states has a probabilistic relationship to one or more hidden observed. For example, there may be four observable states (A, B, C, D) in an embodiment which represent the customer satisfaction ratings made by consumers in connection with a particular service. These observed states may be associated with, for example, three hidden states (Hid1, Hid2, Hid3). The probabilistic relationship when moving from one hidden state to the next with a Markov process of order 1 may be used to define the transition matrix which is a 3×3 matrix of probabilities in this example.

The initial probability vector is a 1×3 vector and the confusion matrix is a 3×3 matrix of probabilities representing the probability of an observed state given a particular hidden state.

Figure 28:
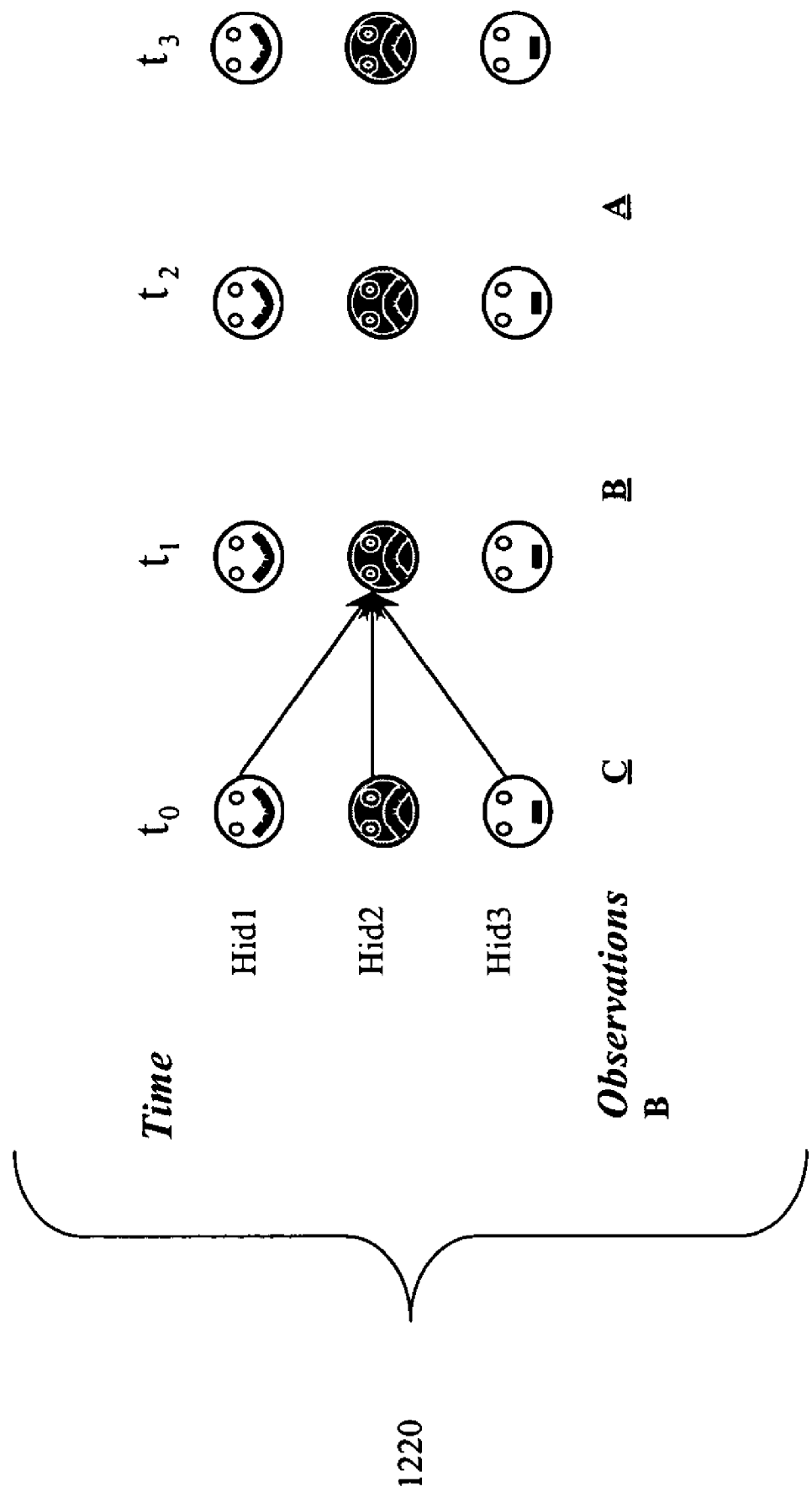

The forward technique uses the time invariance property of the probabilities to reduce the complexity of the calculations such that partial probabilities may be used in a recursive manner. The partial probability may be defined as the probability of reaching an intermediate state in the trellis representation 1200. The probability of reaching an intermediate state in the trellis is the sum of all possible paths to that state. For example, referring to FIG. 28, the probability of the customer being in state Hid2 at time t1 may be represented as in the trellis representation 1220.

Let the partial probability of state j at time $t_k$ and observation $o_k$ be denoted as $\alpha_{t_k}^j(o_k)$. In other words, $\alpha_k^{t,j}(o_k)$=Pr (Observation $o_k$|hidden state is j)×Pr(all paths to state j at time $t_k$). If the partial probability is determined for reaching each of states Hid1, Hid2, and Hid3 at time t3, and these three partial probabilities are summed together, the sum of these partial probabilities is the sum of all possible paths through the trellis. Following is a representation of the recursive formula that may be used to determine the partial probabilities:

$\alpha_{t_k}^j(o_k)$=Probability (observation Ok|hidden state is j)×$Pr$ (all paths to state $j$ at time $tk$).

At time 0 (i.e. $t_k=t_0$), there are no paths leading to the first column of the hidden states in the trellis representation. Hence, the partial probability of a certain observation o given a hidden state j is defined as the initial probability of the HMM at the hidden state j multiplied by the probability of having the observation o at time 0; that is:

$\alpha_{t_0}^j(o)=\pi(j)b_{j0}$ where, $\pi(j)$ stands for the probability of the HMM being at the hidden state j at time 0 and b stands for the probability of observing the observation o given the hidden state j. Assuming the partial probabilities at any time $t_k$ are available, the partial probabilities at time $t_k$ may be used in determining the probabilities at time $t_{k+1}$. This may be represented recursively as:

$$\alpha_{t_{k+1}}^j(o_{k+1}) = b_{jk}\sum_{l=1}^{n}a_{1j}\alpha_{t_k}^1(o_k)$$

Thus the partial probability may be calculated as the product of the appropriate observation probability (i.e. probability of having the observation $o_{k+1}$, being provoked by hidden state j, at time $t_{k+1}$) with the sum of probabilities of reaching that state at that time. Finally the sum of all partial probabilities gives the probability of the observation, given the HMM. The recursive relationship given by the foregoing permits calculation of the probability of an observation sequence given an HMM at any time. This technique reduces the computational complexity of calculating the probability of an observation sequence given a HMM. For instance, consider the case of a sequence of T observations and a HMM (Π, A, B). The computation of partial probabilities grows linearly with T if this forward algorithm is used. However, this computation grows exponentially with T if one uses the "naive" (or exhaustive) method.

Figure 29:
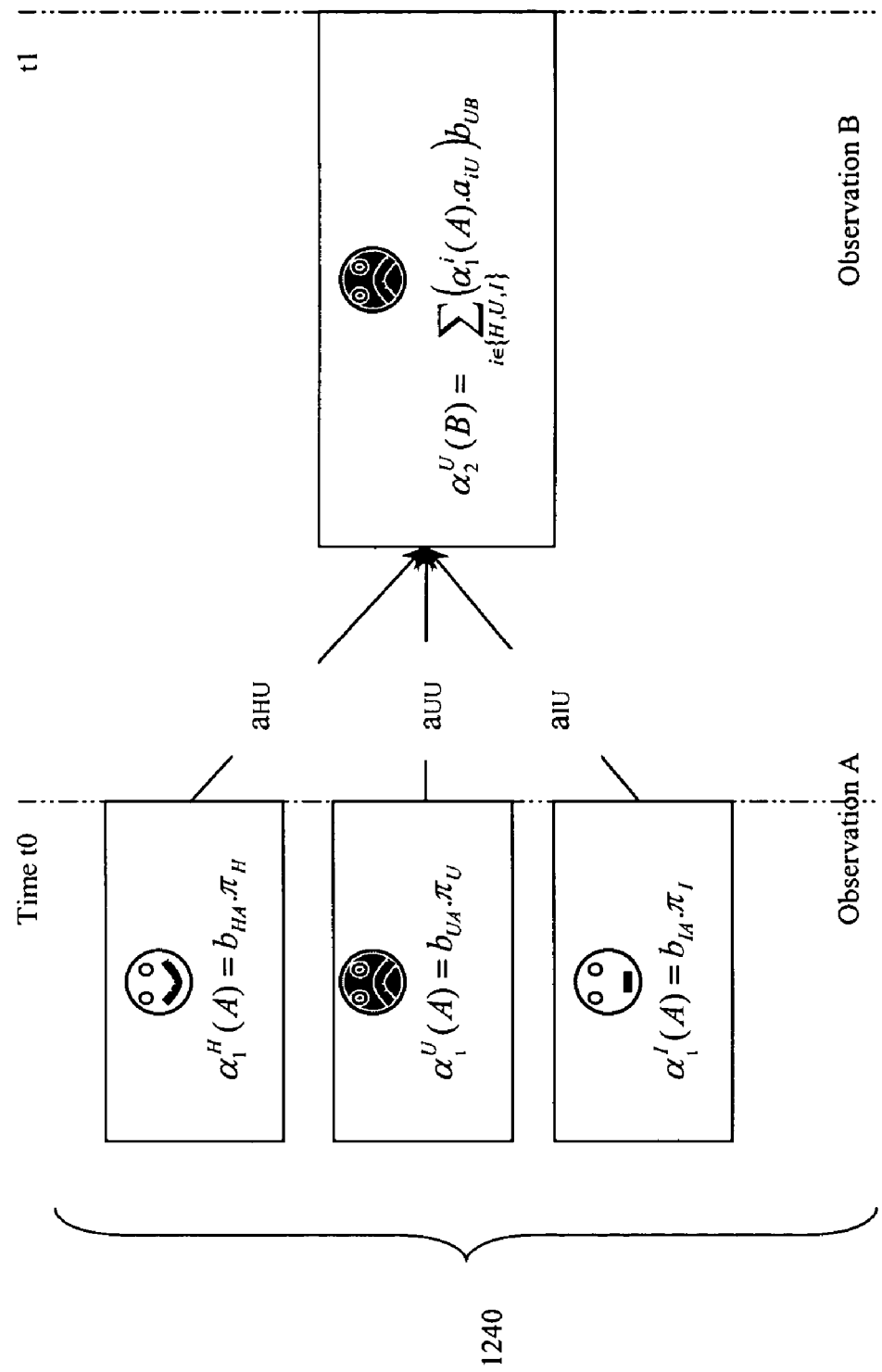

Referring now to FIG. 29, shown is a representation 1240 of an example of the forward algorithm applied. FIG. 29 shows the calculation of the partial probability at time $t=t_1$ for an "Unhappy" state with a sequence of observations ("A", "B"). This is the product of the appropriate observation probability and the sum of the previous partial probabilities multiplied by the appropriate transition probabilities. In this diagram 1240, the notation was changed for clarification purposes. Upper and lower scripts were used to designate hidden and observed states.

In connection with the second problem, the Viterbi algorithm may be used to efficiently answer the following question: "Given a particular HMM and an associated sequence of observations, what is the most likely sequence of underlying hidden states that might have generated such observation sequence"? One technique that may be used in determining this most likely sequence is to find the most probable sequence of hidden states that generated such observation sequence. First, all possible sequences of hidden states may be listed and the probability of the observed sequence for each of the combinations. Second determine the sequence of hidden states that maximizes:

Pr(observed sequence|hidden state combination).

Such a sequence of hidden states is the most likely sequence that generated the observation sequence at hand. A naive approach may be used by exhaustively calculating each combination. Alternatively, the time invariant property may be considered as with the forward algorithm described herein.

Figure 30:
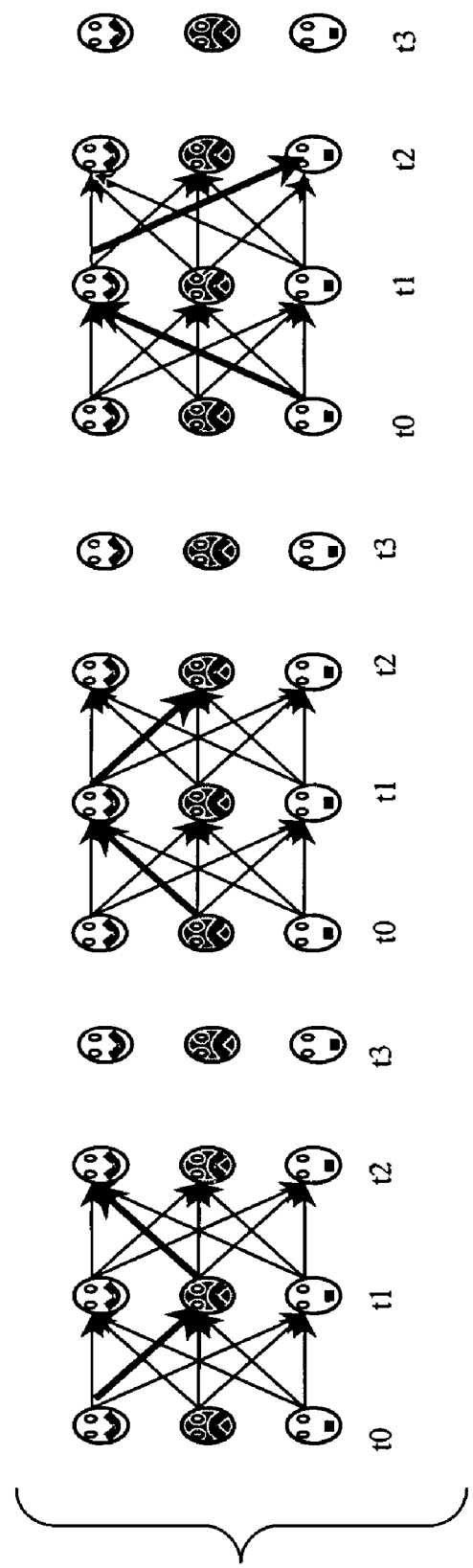

Referring now to FIG. 30, shown is an example of a trellis state representation 1280. Each hidden state in the trellis has a most probable path leading to it. Consider, for instance, the three intermediate states at time $t_2$. The most probable partial path to each one of these three states at time $t=2$ may be as in 1280. These paths may be referred to as best partial paths. Each of these best partial paths has an associated probability called partial probability denoted by $\delta_{t_k}^j(o_k)$ where j stands for the hidden state, $t_k$ for the time of observation (i.e. $k^{th}$ column in the trellis), and ok for the observation at that time. Unlike its definition in the forward algorithm, the partial probability $\delta_{t_k}^j(o_k)$ is defined here as the maximum probability of all sequences ending at state j and observation ok at time $t_k$. The sequence of hidden states that achieves this maximal probability is the partial best path. The partial probability and its associated best path exist for each cell of the trellis (i.e. for any triplet j, $t_k$, and $o_k$). In particular, each state at the final time $t_k=T$ (i.e. end of the observation sequence) will have a partial probability and a partial best path. The overall best path is associated to the state with the maximum partial probability.

This maximum partial probability may be defined recursively. Recall that the Markov assumption in the case of a first order Markov model states that the probability of $j_k^1$ occurring after a sequence depends only on the previous state.

Hence, the most probable path to the hidden state $j_k^1$ at time $t_k$ and observation $o_k$ is given by:

$$Pr(j_k^1 \text{ at time } t_k \text{ and observation } o_k) = \quad (9)$$
$$\max_{i \in \{1,2,3\}} [Pr(j_{k-1}^i \text{ at time } t_{k-1} \text{ and observation } o_{k-1}) \times$$
$$Pr(j_k^1 / j_{k-1}^i) \times ((o_k \text{ at } t_k)/j_k^1)]$$

The first term of the right-hand side of the above equation (9) is given by the partial transition probabilities and the third by the observation probabilities. The probability of the partial path to the state $j_k^{i_0}$ at time $t_k$ and observation $o_k$ is recursively computed in a general way as:

$$\delta_{t_k}^{j_0}(o_k) = \max_{i \in \{1,2,\ldots n\}} \left[ \delta_{t_{k-1}}^{j_{k-1}^i}(o_{k-1}) a_{j_k^{j_0} j_{k-1}^i} b_{j_k^{j_0} o_k} \right] \quad (10)$$

Equation 10 provides the partial probability $$\delta_{t_k}^{j_0}(o_k)$$

at each intermediate and final hidden state of the trellis. Recall that the aim is to find the most probable sequence of states through the trellis given an observation sequence. Hence, one needs to develop a technique of "remembering" the partial best paths through the trellis. This remembering can be achieved by holding, for each state, a back pointer that points to the predecessor state that optimally led to the current state; that is:

$$\phi_{t_k}(j_k^{j_0}) = \arg\left\{\max_{i \in \{1,2,\ldots n\}} \left[ \delta_{t_{k-1}}^{j_{k-1}^i}(o_{k-1}) a_{j_k^{j_0} j_{k-1}^i} \right]\right\} \quad (11)$$

The operator at the right-hand side of the equation (11) selects the index i which the bracketed expression. This expression is calculated from the previous partial probability δ of the preceding time step and the transition probabilities. It does not include the observation probability as in (10). The foregoing Viterbi algorithm may be used to decode an observation sequence providing two important advantages: i) reduction in computational complexity by developing a recursive relationship between partial probabilities and ii) providing the best interpretation given the entire sequence of the observations.

Figure 31:
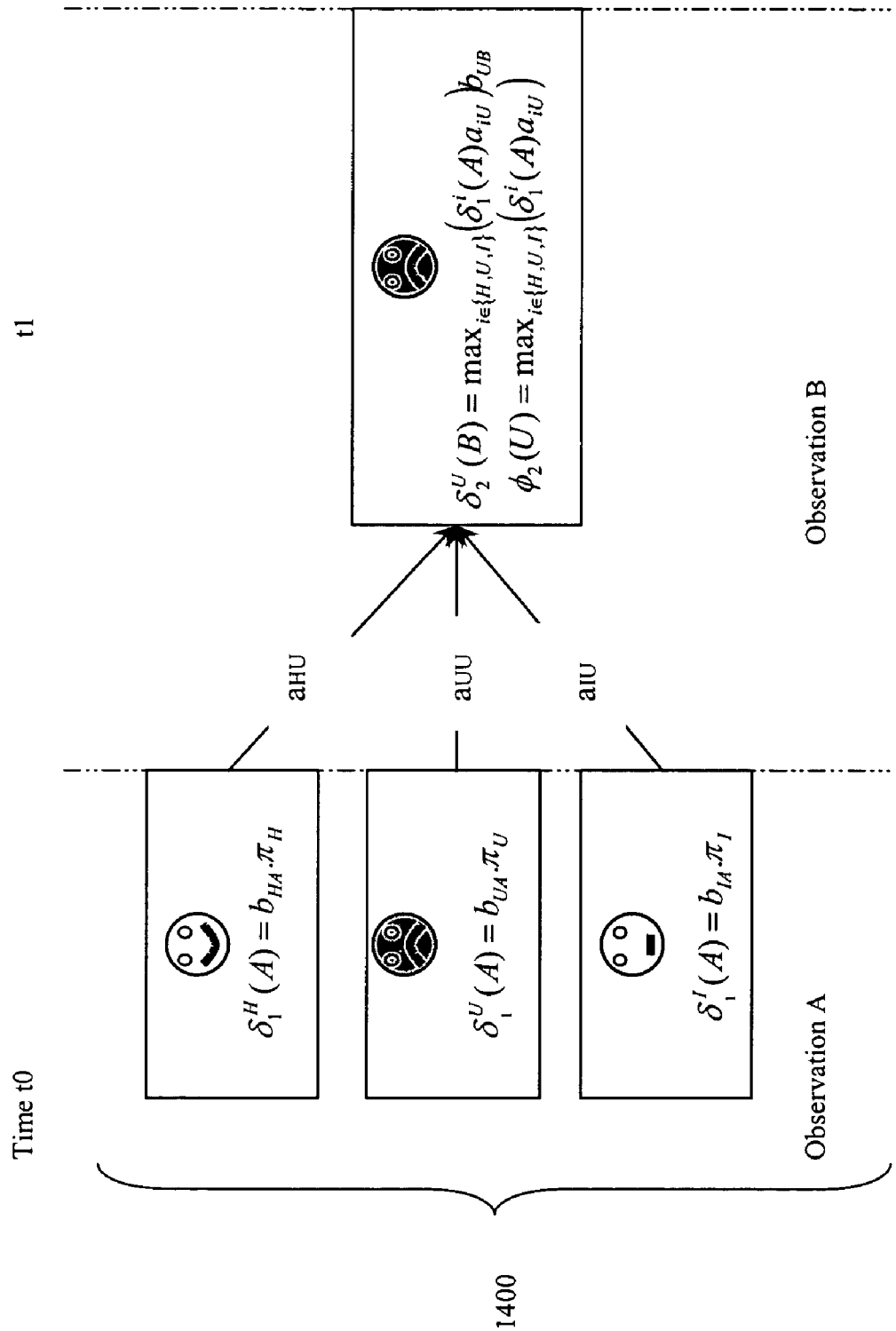

Referring now to FIG. 31, shown is a representation 1400 of the calculation of the Viterbi coefficients. The calculation of these coefficients is similar to the calculation of partial probabilities in the forward algorithm. Consider, for instance, the same example 1240 and calculate the Viterbi coefficients at time $t=t_1$ for the "Unhappy" state with a sequence of observation ("A", "B").

The representation 1400 is similar to the representation 1240. One difference is that the summation operator of the forward algorithm of 1240 is replaced by the maximization operation in the Viterbi algorithm in 1400. It should be noted that the Viterbi algorithm makes a decision based on an entire sequence rather than determining the most likely state for a given time instant. In other words, the Viterbi algorithm determines the maximum probability after examining all paths.

What will now be described is the third problem, the learning problem, and the associated forward-backward algorithm (also known as the Baum-Welch algorithm). The forward-backward algorithm is an iterative procedure that solves the learning problem based on a set of sequences of observations that follow a known hidden HMM. For example, a speech processing database may have underlying speech modeled by a Markov process based on known phonemes. As another example, an image database may have a series of images model a process for a fire within a bay. Given a current model approximation, the forward-backward algorithm computes the 'forward' probability of arriving at each state in the trellis and the 'backward' probability of generating the final state of the model. Both of these executions are computed advantageously by exploiting recursion.

As defined elsewhere herein, coefficients $\alpha_{t_k}^j(o_k)$ are the partial probabilities that a given HMM has generated an observation $o_k$ at instant $t_k$ and at hidden state j. The Forward algorithm is build on a left-to-right sweep through the trellis starting from time zero (i.e. first column of the trellis) and ending at time T of the last observation in the sequence. The counterpart of $\alpha_{t_k}^j(o_k)$, $\beta_{t_k}^j(o_k)$, build on a right-to-left sweep through the trellis starting from time T (i.e. last column of the trellis) and ending at time 0, may also be defined. Similarly to $\alpha$, $\beta$ can be computed recursively as follows:

$$\begin{cases} \beta_{t_T}^j(o_T) = \varphi(j) b_{j o_T}(o_T); & \text{for } k = T \\ \beta_{t_k}^j(o_k) = b_{j(k+1)}(o_{k+1}) \sum_{l=1}^{n} a_{1j} \beta_{t_{k+1}}^1 (o_{k+1}); & \text{for } 0 \leq k < T \end{cases} \quad (13)$$

The vector $\phi$ is defined similarly to the vector $\pi$ of initial probabilities in the forward algorithm. $\gamma_{ij}(o_k)$ may be defined as the HMM probability of moving from the hidden state i to the hidden state j and observing $o_k$ given the observation sequence $(o_0, o_1, \ldots o_T)$; that is:

$$\gamma_{ij}(o_k) = \frac{\alpha_{t_k}^j(o_{k-1}) a_{ij} b_{ij}(o_k) \beta_{t_k}^j(o_k)}{\alpha_{t_T}^{s_f}} \quad (14)$$

where $\alpha_{t_T}^{S_t}$, known as the alpha terminal, is the probability that the HMM generated the observation sequence $(o_0, o_1, \ldots o_T)$. The expected number of transitions from state i to state j given $(o_o, o_1, \ldots, o_T)$ is $$\sum_{k=0}^{T} \gamma_{ij}(o_k)$$

and the expected number of transitions from state i to all other states is $$\sum_{k=0}^{T} \sum_{l=1}^{n} \gamma_{il}(o_k).$$

The coefficients $a_{ij}$ and $b_{ij}$ can be then recomputed as follows:

$$\hat{a}_{ij} = \frac{\sum_{k=0}^{T} \gamma_{ij}(o_k)}{\sum_{k=0}^{T} \sum_{l=1}^{n} \gamma_{il}(o_k)} \quad (15)$$

and, $$\hat{b}_{ij}(o_1) = \frac{\sum_{k \ni o_k} \gamma_{ij}(o_k)}{\sum_{k=0}^{T} \gamma_{il}(o_k)} \quad (16)$$

Equation (15) means that the estimate of $a_{ij}$ is recomputed as the probability of taking the transition from state i to state j. However, equation (16) means that the estimate of $b_{ij}(o_1)$ is recomputed as the ratio between the frequency that symbol $o_1$ is emitted and the frequency that any symbol is emitted. $a_{ij}$ and $b_{ij}(o_1)$ given respectively by (15) and (16) are unique global values. This means that at every iteration there is an improvement of the HMM unless it is already in a critical point. The following steps may be used to define the forward-backward algorithm:

1. Guess an initial set of the parameters {a, b}
2. Compute $\hat{a}_{ij}$ and $\hat{b}_{ij}$ using the re-estimation formulas (15) and (16)
3. Set $\hat{a}_{ij}$ to $a_{ij}$ and $\hat{b}_{ij}$ to $b_{ij}$ As described elsewhere herein, an HMM may be used if hidden states of a particular phenomena under investigation are accessible through some observations. In one embodiment in connection with images, HMM may be used to model the distribution map, for example, of fire and smoke, within the space domain. Hidden states representing, for example, normal air, smoke and fire may be defined in one embodiment. Various interpretations may be investigated including, for example, coefficients of the Karhunen-Loeve Transform (KLT) for each feature under consideration.

In connection with the distribution map as described above, reference is made to one or more types of features that may be based upon an image distribution map. For example, intensity, such as the gray level value associated with a pixel distribution, is one way to reference the distribution of pixels in a given frame or image. Other features in addition to pixel intensity may be used to describe and characterize the distribution map of various regions of interest in a particular frame such as, for example, fire, smoke, or hot spots. Among those features, one may also consider Fourier descriptors, wavelet coefficients, statistical moments, and the like. These features may be evaluated, decoded, and taught to the HMM to identify various regions of interest in a particular image. Thus, a distribution map may relate to one or more features including direct intensity level values of image pixels as well as single or combined relevant factors such as time, statistical properties, correlation between pixels, and the like.

An embodiment using the HMM technique described herein may use the three general solutions described elsewhere herein to be solved referenced as the evaluation problem, the decoding problem, and the learning problem. The evaluation problem may be used to determine the probability of an observed sequence such as hot spot to smoke to fire or the sequence hot spot to hot spot to smoke for example. The decoding problem may be used to estimate the most likely sequence of underlying hidden states that might have generated a particular observed sequence. Knowing in a probabilistic way the hidden sequence that enables the HMM process to produce a given sequence may be used in confirming and predicting the evolution of a particular sequence either on time or on space to characterize growing and shrinking regions in an image.

The description of an observation of a particular process at hand, for example, such as one of fire, smoke or a detected hot spot, may be closely related to the feature being used. Once a given feature, such as the pixel gray level or the energy indicator, is decided upon to be included in an embodiment, various matrices described herein in connection with the HMM model may be determined. In particular, in connection with a particular feature, the initial probability matrix, the transition matrix, and the confusion matrix may be determined. Recall that the initial probability matrix represents the determination of the probabilistic matrix defining the initial condition of the state. The transition matrix includes probabilities of moving from one hidden state to another. The confusion matrix includes probabilities of observing a sequence given an HMM process. Values of the probability matrices depend on the selected features and the adopted statistical method used to classify those particular features. Consider an example in which the pixel gray level is a feature to be used. A smoky region may be defined as a set of contiguous pixels with values in the interval [S1, S2]. A fire region may be defined as a set of contiguous pixels with values in the interval [F1, F2]. A hot spot region may be defined as a set of contiguous pixels with values in the interval [H1, H2]. In determining such distributions, an embodiment may use a statistically meaningful set of images of pixels such as thousands of images. The probability of a given pixel to be in one of the various regions of interest such as the smoky region may be calculated as the ratio of the number of pixels whose intensity values are within the particular range [S1, S2] and the total number of pixels. A pixel may vary in one or more particular regions in accordance with time. The forward algorithm as described elsewhere herein in connection with the evaluation problem may be used in providing an estimation of the probability of the system changing from one state to another such as used in connection with the transition matrix. An embodiment may also use a more heuristic approach in accordance with experience and common sense of inexperienced user to determine the values of particular matrices described and used in connection with defining an HMM.

In the foregoing, it should be noted that the forward algorithm as may be used in connection with the evaluation problem described elsewhere herein may be used in determining an estimation of the probabilities used in connection with the transition matrix. An example of a use in an embodiment of the decoding problem and associated algorithm is that it may first be executed to determine the most likely sequence of underlying hidden states given a particular observed sequence. This decoding problem and associated algorithm may be used in connection with confirming or denying the existence of a particular state such as fire, smoke and the like. Similarly, the learning problem as described herein may be used in determining model parameters most likely to have generated a sequence of observations and may be used in providing initial values for probabilities as part of a learning phase, for example, in connection with determining probabilities the state transition matrix and confusion matrix.

In connection with an HMM, the KLT transform is a decomposition technique that is a variation of the PCA also described herein. It should be noted that PCA may also be referred to as the Hotelling transform. The KLT decomposition or transformation technique may be characterized as a decorrelation technique proceeding by finding an orthogonal set of eigenfunctions that capture, in increasing order, most of the image energy (entropy information or a variability between pixels). The data may then be expanded in terms of an eigenfunctions at each frame, varying in time or in space, for example. The variation of the KLT coefficients v. time in space describes the dynamics of the particular process. The KLT may be preferred in an embodiment, for example, when the data contains a certain degree of symmetry. The KLT decomposition technique extracts features that may not be ostensible in the original image and preserves essential information content in the image where the reduced number of features. These features, as described elsewhere herein, may be used as an input in connection with the HMM processing or any other image classification and interpretation process such as, for example, the neural net, fuzzy logic, multiple model state estimator, and the like also described elsewhere herein.

Note that for the example of HMM provided herein, hidden customer states were provided. However, it would be possible to adapt this example to fire detection by replacing the customer states with various fire-related states, such as no fire, fog, and smoke situations. For a general discussion of HMM and applications thereof, see L R Rabiner and B H Juang, "An introduction to HMMs," IEEE ASSP Magazine 3, pp. 4-16, January 1986.

The features which are obtained from a particular image or set of images observed may be initially determined to correspond to a particular condition, such as smoke, fire, and the like. In one embodiment, once a particular alarm condition has been determined, one or more estimators may be used to obtain the "true" values of the particular features. The use of the estimators may be characterized as a type of filtering to process feature values. There may be many estimators running in parallel as fire-related image features, for example, are identified.

Described in following paragraphs are techniques that may be included in an embodiment having a plurality of estimators. Each estimator may be utilizing a different model of the system being considered. An estimator may be utilizing, for example, the PCA technique or the multiscale modeling technique. Inputs to the estimators may be the features under consideration that may be combined and accordingly weighted to produce a final result or estimate as to the existence of a particular state. By using multiple state estimation modules, an embodiment may reduce dependence of the overall state estimator on stand-alone fault detectors and provide a more robust system against sensor faults.

The multiple state estimation module and techniques used therein may be included in the multi-camera fusion routine 232 in an embodiment. It should be noted that other embodiments may include the multiple state estimation module and techniques used therein in other components of a system.

An embodiment may include features or sensors of different types that are inputs to the estimators. In one embodiment, these features may be extracted from images as described herein. The techniques described in following paragraphs uses analytical redundancy such that the inputs (sensor data or features based thereon) to the estimators depend on each other via a set of equations.

In this instance, the inputs to the multiple state estimation module correspond to features determined, for example, by the feature extraction routines 206, 206', 206" using, for example, feature extraction techniques like those discussed herein, such as frame energy determination, edge detection, PCA, etc One type of estimator may utilize Kalman filtering techniques. The concept of event detection via Kalman filtering is based on comparison between expected and actual prediction error, where an event is defined as a transition between states such as a transition from a no fire state to a fire state. At each iteration, the filter makes a prediction of future feature values $$\hat{y}_{k+1|k} = C\hat{x}_{k+1|k}$$

and compares the estimated or computed value it to the actual feature value. In an extended Kalman filter, the prediction is made via a nonlinear function $\hat{y}_{k+1|k} = g(\hat{x}_{k+1|k})$. The correction step is based on the assumption that the prediction errors $$e_{k+1} = y_{k+1} - \hat{y}_{k+1|k}$$

referred to as innovations, form a sequence of uncorrelated Gaussian variables with zero mean and covariance $S_{k+1} = \Sigma_{k+1|k} + R_{k+1}$ where innovation covariance is denoted as S; in [3] it is denoted $\Sigma$). Intuitively speaking, unusually large (or small) values of innovation indicate that the model used by the filter does not adequately represent the actual system. A method suggested in Y. Bar-Shalom and X.-R. Li, *Estimation and tracking: principles, techniques, and software*, Artech House, 1993 is to monitor normalized squared innovation $$\epsilon_k = e_k^T S_k^{-1} e_k$$

which, if the model is correct, has a $\chi^2$ distribution with m degrees of freedom. At a risk of delayed change detection, a system may also monitor a moving average of past s innovations $$\varepsilon_k = \sum_{j=k-s+1}^{k} e_j^T S_j^{-1} e_j$$

which should have $\chi^2$ distribution with ms degrees of freedom. Then, an event can be signaled if $\epsilon_k$ exceeds a threshold value, based on some pre-specified tail probability. This technique is suitable if the goal is a Boolean choice between two competing hypotheses: that the model is correct and that it is not. In using a particular model, observed discrepancies may be caused not only by events, but also, for example, by inaccurate specification of noise parameters Q and R. Consequently, event detection based on statistical testing of normalized innovation may be very sensitive to threshold choices.

An alternative method to the foregoing to assess model validity using innovations is based on multi-dimensional distribution of the innovation. If the model is correct, feature vector $y_{k+1}$ (features extracted from the k+1 image) has Gaussian distribution with mean $\hat{y}_{k+1}$ and covariance $S_{k+1}$, or equivalently innovation $e_{k+1}$ has Gaussian distribution with zero mean and covariance $S_{k+1}$. Likelihood of the current feature vector $y_{k+1}$, conditioned on the previous feature vectors, is the value of the corresponding probability density function calculated at point $e_{k+1}$ $$p(y_{k+1} | \hat{y}_{k+1}, S_{k+1}) = \frac{\exp\left(1 - \frac{1}{2} e_{k+1}^T S_{k+1}^{-1} e_{k+1}\right)}{\sqrt{(2\pi)^m \det(S_{k+1})}}$$

Calculation of likelihood values for different competing models allows differentiating between those models that fit the observed data better than the others. In the multiple-model estimation techniques, the above likelihood value may be used to generate relative weighting for combining estimates from the different models and associated estimators.

The multiple models may be weighted as described below. Suppose that there are K competing state estimators, each utilizing a different model of the system. Suppose that prior to measurement at moment k+1, an i-th estimator produced its own state estimate $$\hat{x}_{k+1|k}^{(i)},$$

its covariance $$\Sigma_{k+1|k}^{(i)},$$

the predicted feature vector value $$\hat{y}_{k+1}^{(i)},$$

and the innovation covariance $$S_{k+1}^{(i)}.$$

Assume also that based on observations collected so far, probability that the i-th model is the correct one has been assessed as $$P_{k+1|k}^{(i)}.$$

Then, after the features calculated on image k+1 ($y_{k+1}$) arrives, each of the estimators performs its own state update $$\hat{x}_{k+1|k+1}^{(i)}$$

and calculates an updated covariance $$\Sigma_{k+1|k+1}^{(i)}.$$

In addition, for each estimator there is an innovation $$e_{k+1}^{(i)} = y_{k+1} - \hat{y}_{k+1|k}^{(i)},$$

and the associated likelihood of the observed feature vector $$P_{k+1}^{(i)} \equiv p(y_{k+1} \mid \hat{y}_{k+1|k}^{(i)}, S_{k+1}^{(i)}) = \frac{\exp\left(-\frac{1}{2} e_{k+1|k}^{(i)T}(S_{k+1}^{(i)})^{-1} e_{k+1|k}^{(i)}\right)}{\sqrt{(2\pi)^m \det(S_{k+1}^{(i)})}}$$

At this point, the Bayes formula may be used to update the probabilities of the competing models $$P_{k+1|k+1}^{(i)} = \frac{p_{k+1}^{(i)} P_{k+1|k}^{(i)}}{\sum_{j=1}^{K} p_{k+1}^{(j)} P_{k+1|k}^{(j)}}$$

Note that some models may only be concerned with a subset of the features, but for clarity of notation it is assumed in the discussion herein that all features are provided to all models. With the posterior probabilities calculated, the combined estimate and its approximate covariance is calculated using formula for approximation of mixture of Gaussian densities $$\hat{x}_{k+1} = \sum_{i=1}^{K} P_{k+1|k+1}^{(i)} \hat{x}_{k+1|k+1}^{(i)}$$

$$\sum_{k+1} = \sum_{i=1}^{K} P_{k+1|k+1}^{(i)} \left( \sum_{k+1|k+1}^{(i)} + v_{k+1}^{(i)} v_{k+1}^{(i)T} \right)$$

where terms $$y_{k+1}^{(i)}$$

represent the spread of means of all estimators around the weighted average $\hat{x}_{k+1}$:

$$v_{k+1}^{(i)} = \hat{x}_{k+1} - \hat{x}_{k+1|k+1}^{(i)}$$

The above formulae and associated description may be utilized in connection with the multiple-model estimation techniques described herein. The difference between different multiple-model estimation techniques is due to the way in which the prior estimates $$\hat{x}_{k+1|k}^{(i)}, \sum_{k+1|k}^{(i)}, \text{ and } P_{k+1|k}^{(i)}$$

(to be used in the next iteration k+1) are calculated from the posterior estimates $$\hat{x}_{k|k}^{(i)}, \sum_{k|k}^{(i)}, \text{ and } P_{k|k}^{(i)}$$

(generated in the previous iteration k).

Following is a description of how the basic concept of multiple-model estimation may be used for detection of changes in the status of the bay, such as appearance of a smoke cloud, hot spot or a flame. The feature extraction stage that preceds the multiple estimator module outputs a set of features that characterize the image. This set may be represented as a vector of M inputs to the multiple model estimator. To provide possibility of detecting all events of interest, a separate state estimator may be included for each of possible K states of the cargo bay. Each of the K models associated with different possible states of the cargo bay may use some or all elements of the feature vector. Each model incorporates different mechanism of predicting future values of the feature vector assuming that's its hypothesis about the state of the bay is correct. The prediction function of the i-th model may be expressed as $$\hat{y}_{k+1}^{(i)} = g^{(i)}(\hat{x}_{k+1|k}^{(i)})$$

Innovation for this model may be calculated as:

$$e_{k+1}^{(i)} = y_{k+1}^{(i)} - \hat{y}_{k+1|k}^{(i)} = y_{k+1} - g^{(i)}(\hat{x}_{k+1|k}^{(i)})$$

Different measurement prediction functions $g^{(i)}$ can be used by different models.

Figure 32:
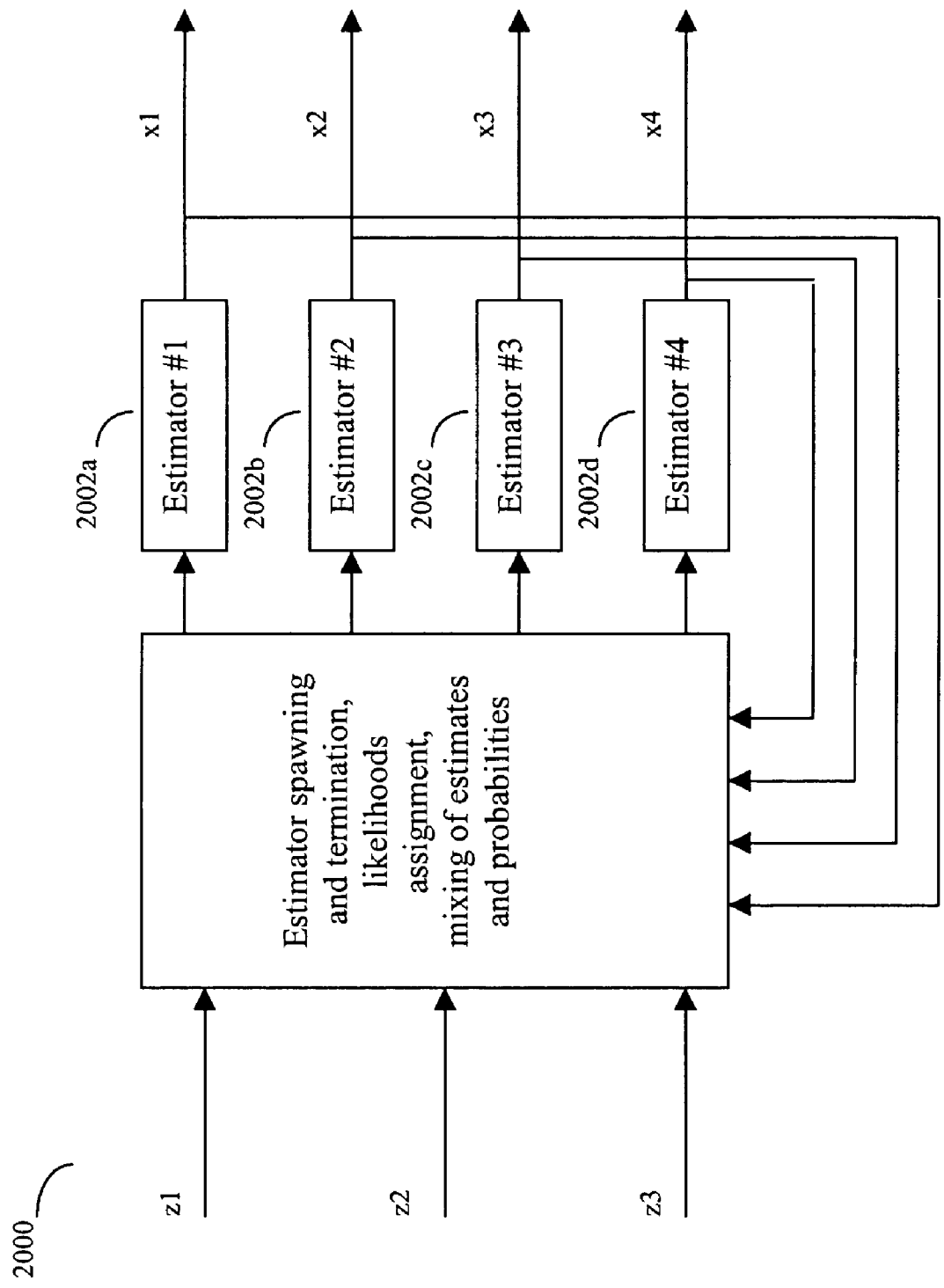
FIGS. 32-35 are diagrams illustrating use of a multi-model estimator according to the system described herein.

Referring now to FIG. 32, shown is an example of a an embodiment of the multiple-model estimator 2000. All estimators have access to the same feature vector and use to predict the future values of the feature vector based on their different assessment of the state of the cargo bay. The likelihood of current feature vector under each model is determined and the one estimator with the highest likelihood value dominates the fused output. In other words, we select the outlier in terms of the likelihood function as the selected correct model.

Figure 33:
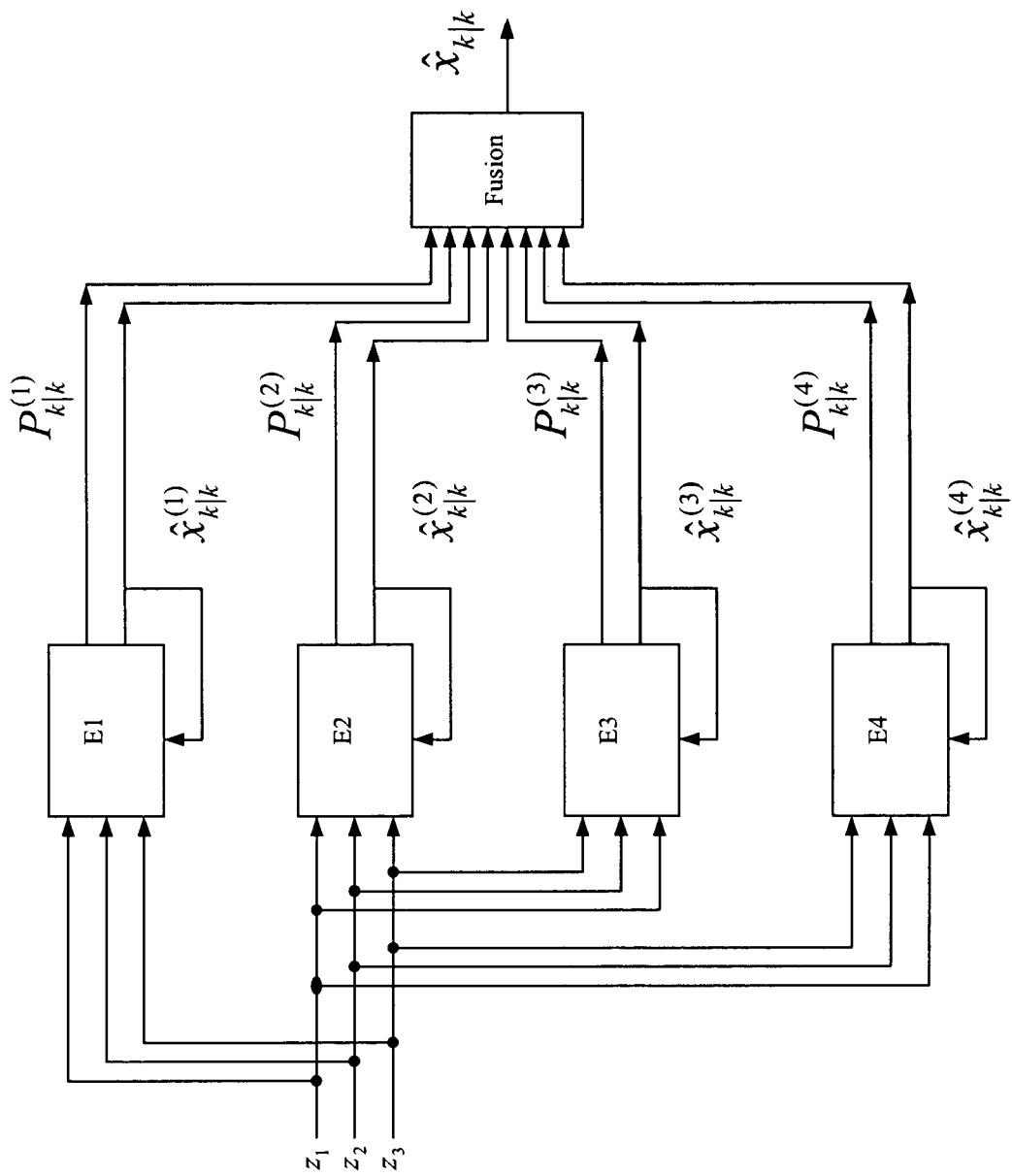

Referring now to FIG. 33, shown is another example of an embodiment of a multiple model estimation technique that may be characterized as a non interacting multiple state model.

In this arrangement 2020, the multiple models run separately, with no interactions between the internal state of other models. The only mixing of the estimates is the calculation of the combined output. The prediction of the next state and measurement in each estimator is based only on its own previous estimate:

$$\hat{x}_{k+1|k}^{(i)} = f^{(i)}(x_{k|k}^{(i)})$$
$$\hat{y}_{k+1|k}^{(i)} = g^{(i)}(\hat{x}_{k+1|k}^{(i)})$$

For calculation of appropriate covariance matrices, separate Jacobian matrices $A_k^{(i)}$ and $B_k^{(i)}$ are obtained for each filter by linearizing functions $f^{(i)}$ around the posterior estimates $$\hat{x}_{k|k}^{(i)}$$

from the previous moment k, and Jacobians $$C_{k+1}^{(i)}$$

are found by linearizing functions $g^{(i)}$ around the predicted estimates $$\hat{x}_{k+1|k}^{(i)}.$$

As a starting condition, the system may use initial state estimates $$\hat{x}_{0|0}^{(i)}$$

for each of the estimators, as well as prior probabilities $$P_{0|0}^{(i)}.$$

The arrangement 2020 utilizes techniques that may be referred to as the ZOA or zero-order approximate filter as described in D. T. Magill, "Optimal adaptive estimation of sampled stochastic processes", *IEEE Transactions on Automatic Control*, vol. 10, 435-439, 1965; and D. G. Lainiotis, "Partitioning: a unifying framework for adaptive systems, I: estimation", *Proceedings of the IEEE*, vol. 64, 1127-1143; and K. A. Loparo, M. R. Buchner and K. S. Vasudeva, "Leak detection in an experimental heat exchanger process: a multiple model approach", *IEEE Transactions on Automatic Control*, vol. 36, 167-177, 1991.

An embodiment utilizing the ZOA technique may be based on the assumption that one of the competing models/estimators is correct at all times in that only one hypothesis about the internal state of the aircraft bay is likely all the time. Because of this, the a priori probability at the beginning of step k+1 is the same as the a posteriori probability at the end of step k $$P_{k+1|k}^{(i)} = P_{k|k}^{(i)}$$

An embodiment using the ZOA approach may have the probability of all models, except the one most likely, decay virtually to zero because at each iteration the a priori probability is multiplied by the relative likelihood of the current observation under the particular model. Therefore, after some time, the estimator may lose ability to detect changes and adapt. An embodiment may compensate for this, for example, by specifying some small lower bound on probability of each possible model, to keep all models "alive" even when highly unlikely.

Another multiple state model estimation technique may be referred to as the generalized pseudo-Bayesian algorithm I (GPBI). This multiple-model approach is an approximation of the optimal Bayesian estimation for a system that may switch from one operational regime to another, for example, as described in G. A. Ackerson and K. S. Fu, "On state estimation in switching environments", *IEEE Transactions on Automatic Control*, vol. 15, 10-17, 1970; and Y. Bar-Shalom and X.-R. Li, *Estimation and tracking: principles, techniques, and software*, Artech House, 1993. This particular technique is based on the assumption that the system configuration (or operational regime) may change randomly at any time. The system is modeled as a Markov chain—that is probability of a switch from regime (or model) i to regime j depends only on the current regime, and is not dependent on history of previous switches. This makes it possible to recover from a misdiagnosed event or to detect temporary events, such as forming of fog that subsequently disperses, or a flame that is subsequently suppressed by an extinguishing action.

An embodiment using the GPBI technique includes a matrix of transition probabilities $P_T$, whose elements $p_{i,j}$ are a priori probabilities that a switch from model i to model j may occur at any given iteration. The transition probabilities are used to calculate the prior probability of model i at the start of iteration k+1 as a function of all posterior probabilities at the end of iteration k $$P_{k+1|k}^{(j)} = \sum_{i=1}^{K} p_{i,j} P_{k|k}^{(i)}$$

Because of this, model j may be still a viable option at iteration k+1 even if it was unlikely at iteration k, provided that a switch from some other, more likely model is possible.

Another aspect of the GPBI approach is that at each iteration, all estimators make their temporal predictions using as a starting condition the same fused (weighted) estimate $\hat{x}_{k|k}$ from the previous iteration. In addition, for the temporal update they all use the same fused covariance $\Sigma_{k|k}$.

Figure 34:
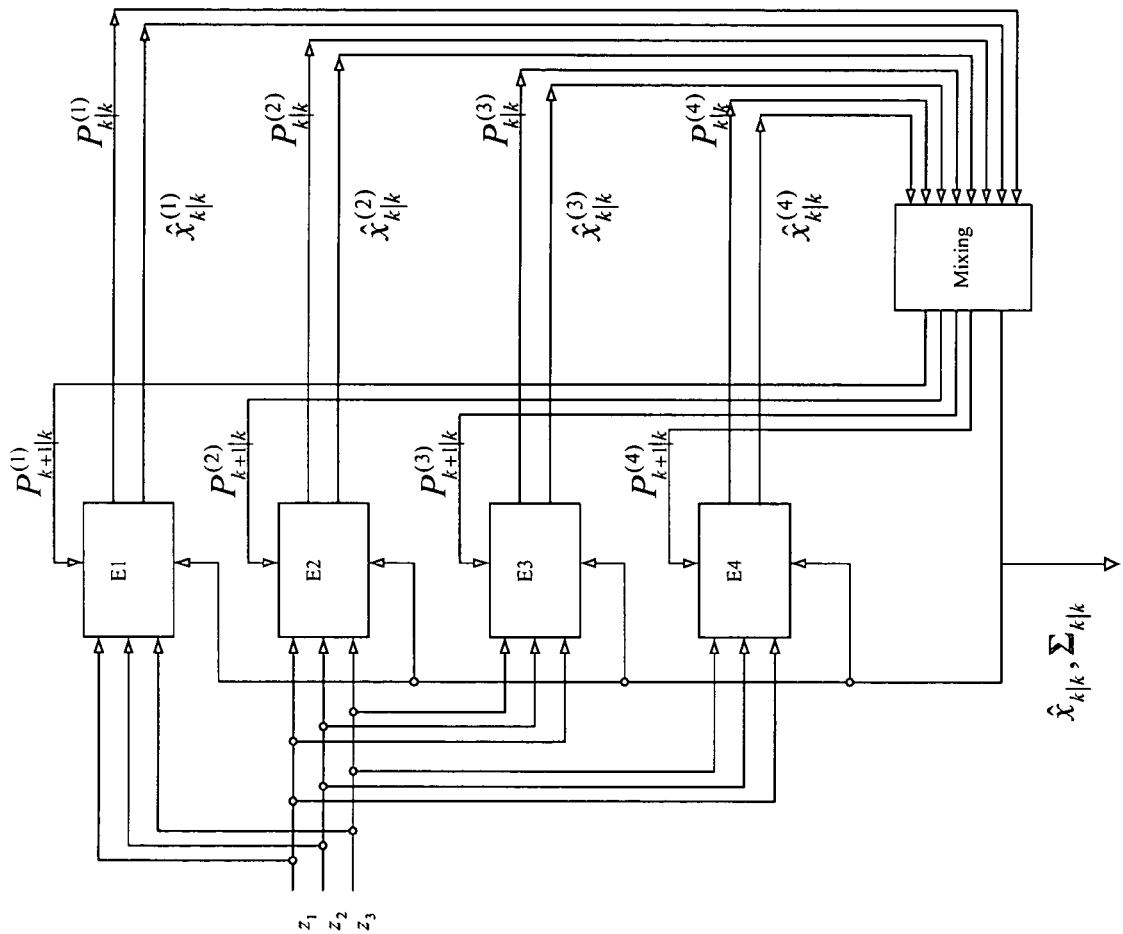

Referring now to FIG. 34, shown is an example of an embodiment of the GPBI technique. The example 2100 includes three inputs or feature inputs to the four estimators. Each model/estimator uses its own state transition and measurement function to calculate its a priori estimate $$\hat{x}_{k+1|k}^{(i)}$$

based on the common estimate $\hat{x}_{k|k}$. Similarly, each estimators calculates its own covariance matrix $$\Sigma_{k+1|k}^{(i)}$$

calculated from the fused covariance $\Sigma_{k|k}$.

$$\hat{x}_{k+1|k}^{(i)} = f^{(i)}(\hat{x}_{k|k})$$

$$\Sigma_{k+1|k}^{(i)} = A_k^{(i)} \sum_{k|k} A_k^{(i)T} + B_k^{(i)} Q B_k^{(i)T}$$

Jacobian matrices $A_k^{(i)}$ and $B_k^{(i)}$ are calculated separately for each estimator such that linearization of functions $f^{(i)}$ is performed around the points $$\hat{x}_{k|k}^{(i)}$$

Prediction of measurement values may be performed for each model according to its own output equation $$\hat{y}^{(i)}_{k+1|k} = g^{(i)}(\hat{x}_{k+1|k})$$

All other computations may be performed as described in a previous section on general multiple-model approach.

Note that the GPBI technique has interacting models, which may make analysis more difficult, for example, than using the ZOA technique. Additionally, if using the GPBI technique, an embodiment should note that using a weighted sum of two likely estimates may not produce a good fused estimate.

An embodiment may also utilize the IMM or Interactive Multiple Models technique in connection with the Multiple Model State estimation. The IMM is described in Y. Bar-Shalom and X.-R. Li, *Estimation and tracking: principles, techniques, and software*, Artech House, 1993. In this approach, global pooling of a posteriori estimates for all models is replaced by local mixing of a priori estimates for each model separately. As in GPBI, one parameter is the transition probability matrix $P_T$. Its elements $p_{i,j}$ are used at the beginning of each iteration to calculate mixing coefficients $\mu_k^{i,j}$, which are interpreted as probabilities that model i was in effect during previous iteration and that model j is in effect during current iteration. Since such a transition has a priori probability $p_{i,j}$, the mixing coefficients are calculated as follows:

$$\mu_k^{i,j} = \frac{p_{i,j} P^{(i)}_{k|k}}{\sum_{l=1}^{K} p_{l,j} P^{(l)}_{k|k}}$$

Note that the expression in the denominator is in fact the a priori probability that model j is in effect during current operation, calculated as in GPBI algorithm $$P^{(j)}_{k+1|k} = \sum_{l=1}^{K} p_{l,j} P^{(l)}_{k|k}$$

Then for each model, prior to the temporal update step, state estimates and covariance are mixed:

$$\tilde{x}^{(j)}_{k|k} = \sum_{i=1}^{K} \mu_k^{i,j} \hat{x}^{(i)}_{k|k}$$

$$\tilde{\Sigma}^{(j)}_{k|k} = \sum_{i=1}^{K} P^{(i,j)}_{k|k}(\Sigma^{(i)}_{k|k} + \tilde{v}^{(i,j)}_k \tilde{v}^{(i,j)T}_k)$$

where terms $\tilde{v}_k^{(i,j)}$ represent the spread of non-mixed estimates around the mixed j-th estimate $$\tilde{x}^{(j)}_{k|k}$$

$$v_k^{(i,j)} = \hat{x}^i_{k|k} - \tilde{x}^{(i,j)}_{k|k}$$

The prediction step is performed for each estimator separately, using the mixed values $$\tilde{x}^{(j)}_{k|k} \text{ and } \tilde{\Sigma}^{(j)}_{k|k}:$$

$$\hat{x}^{(j)}_{k+1|k} = f^{(i)}(\tilde{x}^{(j)}_{k|k})$$

$$\Sigma^{(j)}_{k+1|k} = A^{(j)}_k \tilde{\Sigma}^{(j)}_{k|k} A^{(j)T}_k + B^{(j)}_k Q B^{(j)T}_k$$

$$\hat{y}^{(j)}_{k+1|k} = g^{(i)}(\hat{x}^{(j)}_{k+1|k})$$

Calculation of Jacobian matrices in IMM is performed separately for each estimator, since the corresponding nonlinear functions are linearized around different points. The measurement prediction and linearization of functions $g^{(i)}$ is performed with a different argument $$\hat{x}^{(j)}_{k+1|k}$$

for every model, as in an embodiment using the ZOA technique. Thus, in a general case IMM has computational complexity greater than the non-interacting ZOA algorithm. The additional cost comes from the mixing operation—in particular from calculation of mixed covariance matrices $$\tilde{\Sigma}^{(j)}_{k|k}.$$

The final estimate output may be calculated as in GPBI and ZOA algorithms—through a weighted sum using probabilities $$P^{(j)}_{k|k}.$$

Unlike in GPBI, though, the fused estimate $\hat{x}_{k+1|k+1}$ is not used internally within the estimator.

Figure 35:
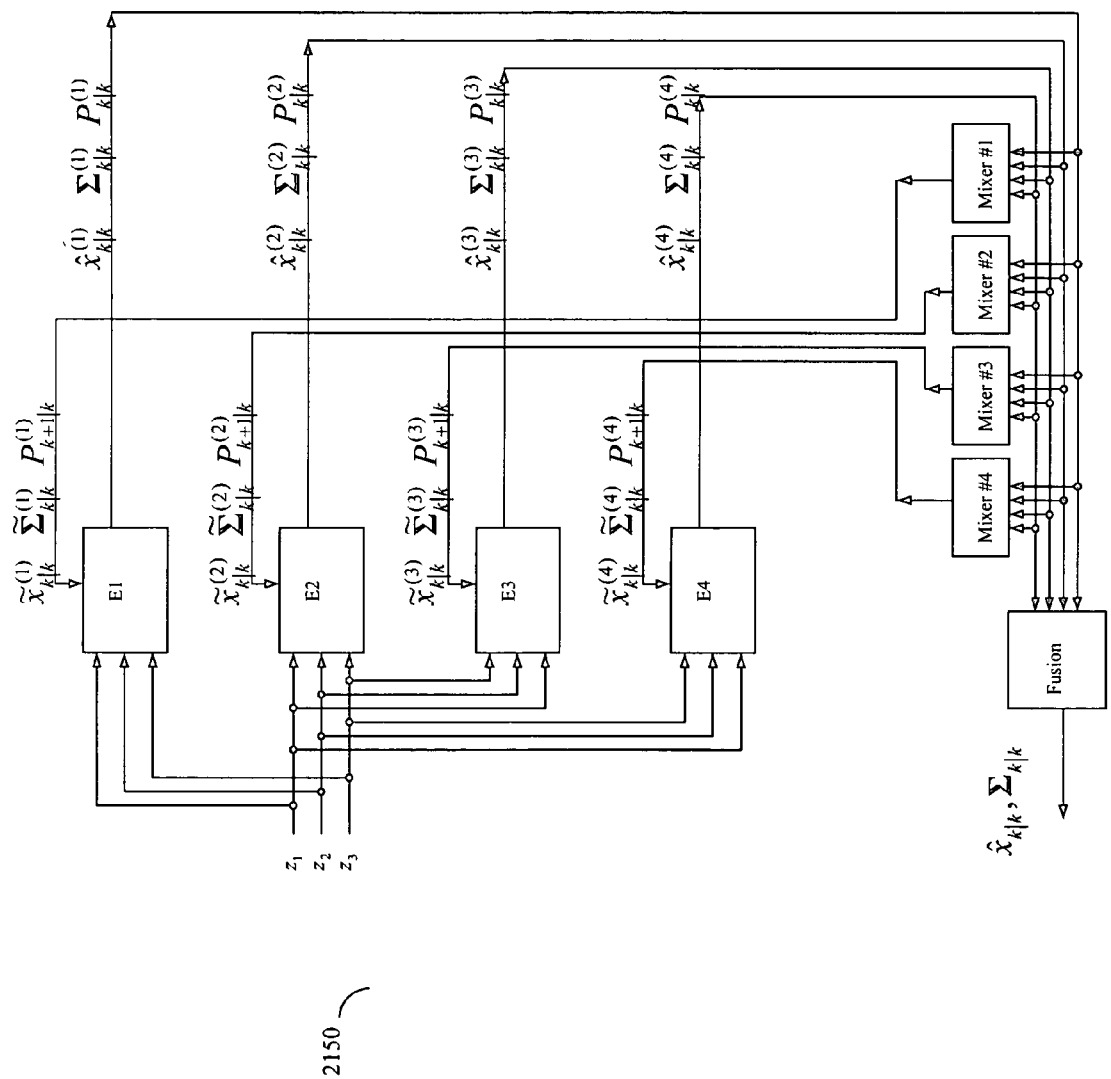

Referring now to FIG. 35, shown is an example of an embodiment 2150 of a three-input or feature input IMM estimator.

In the foregoing, it should be noted that the GPBI and IMM approaches require specification of model transition probabilities. In one embodiment, those may be probabilities of the state of the bay changing, for example from clear to foggy or smoky. The form of transition probability matrix corresponds to the user's knowledge, or belief about likelihood of such a change of the bay stste in any given time instant. At the same time, the structure of the matrix may influence computational load of the algorithm. As mentioned before, a significant fraction of processor time may be spent calculating the fused or mixed covariance matrices. Since the mixing coefficients $\mu_k^{i,j}$ in IMM are proportional to model transition probabilities $p_{i,j}$, it follows that a sparse matrix PT may help significantly reduce computational effort such that the only non-zero contributions to the mixed covariance are those that correspond to non-zero $p_{i,j}$.

If no specific prior knowledge is available about transition probabilities, then a sensible approach is to utilize a dense transition probability matrix in which all elements of the transition matrix are equal:

$$p_{i,j} = \frac{1}{M+1}$$

This, in Bayesian terms, may be characterized as a non-informative case in that nothing is known about probabilities of input faults, so any model transition is judged equally probable at any given time. An embodiment of the three feature or three-input example may use a matrix represented as:

$$P_T = \begin{bmatrix} \frac{1}{4} & \frac{1}{4} & \frac{1}{4} & \frac{1}{4} \\ \frac{1}{4} & \frac{1}{4} & \frac{1}{4} & \frac{1}{4} \\ \frac{1}{4} & \frac{1}{4} & \frac{1}{4} & \frac{1}{4} \\ \frac{1}{4} & \frac{1}{4} & \frac{1}{4} & \frac{1}{4} \end{bmatrix}$$

Even though the foregoing is a dense matrix, use of this matrix leads to dramatic reduction of computational effort in IMM. In fact, an embodiment using IMM in this instance may be computationally equivalent to the GPBI algorithm, since all mixing equations are the same.

In an embodiment, if transition probabilities are approximately known and different, then it is possible to exploit those differences by propagating independent multiple models. Alternatively, if there is little or no knowledge about transition probabilities, there is no advantage in using more sophisticated techniques, and simple pooling as in GPBI may be included in an embodiment.

The uniform matrix structure above may seem extremely conservative in its assessment of risk, that is it assumes that any fire-related scenario is as likely as the non-fire scenario. In the sparse structure, small transition probabilities may be used and characterized as "cautious". Using the uniform matrix may lead to frequent false alarms, but recovery from a misdiagnosis may be easy in comparison to other techniques and values. Since maximal distance between any two nodes on the transition graph is equal to one, the technique used should be able to quickly recover and detect true fire events.

What will now be described are some implementation concerns that may be taken into consideration for an embodiment.

One difficulty in using the proposed multiple-model estimation scheme may be the necessity to calculate likelihood values. As described elsewhere herein, calculation of likelihood values requires inversion of innovation covariance matrix $S_{k+1}$, and calculation of its determinant. Both problems may be solved if all covariance matrices are represented using modified Cholesky, or upper-unit-triangular-diagonal (UD) factorization, for example, as explained in M. S. Grewal and A. P. Andrews, *Kalman filtering: theory and practice*, Prentice Hall, 1993. An innovation covariance matrix may be written as:

$$S = U_S D_S U_S^T$$

where $U_S$ is the upper-unit-triangular factor (with ones on its main diagonal), and $D_S$ is the diagonal factor. The determinant of the covariance matrix may be expressed as the product of diagonal elements of $D_S$ $$det S = \Pi d_{i,j}$$

This factorization technique provides for avoiding inversion of matrix S. Special form of factors $U_S$ and $D_S$ facilitates calculation of $S^{-1}e$.

An embodiment using Kalman filtering within the estimator may assume uncorrelated measurement noises–that is matrix R is diagonal. In this case, the observational update in Kalman filtering algorithm may be performed sequentially—a version using UD factorization of matrix $\Sigma_{k+1|k}$, as described in section 6.5.3 of M. S. Grewal and A. P. Andrews, *Kalman filtering: theory and practice*, Prentice Hall, 1993, such that the direct factorization of $S_{k+1}$ is not necessary. In other words, diagonal elements of $D_S$ naturally appear as a by-product of the observational update procedure, as do elements of $S^{-1}e$. Therefore, in case of uncorrelated measurement noise, calculation of likelihood values requires virtually no additional computational effort.

In an embodiment utilizing a standard Kalman filter as an estimator, calculation of a priori covariance matrix may be computationally expensive:

$$\Sigma_{i-1|k} = A_k \Sigma_{k|k} A_k^T + B_k Q B_k^T$$

An efficient method to compute UD factors of $\Sigma_{k+1|k}$ in terms of factors of $\Sigma_{k|k}$ and Q is given in section 6.6.3 of M. S. Grewal and A. P. Andrews, *Kalman filtering: theory and practice*, Prentice Hall, 1993. This method may also be used with a sum of more than two matrices, so that factorization of the mixed covariance can be performed using the already available factors of the contributing covariances. An advantage of using UD factorization approach is that multiplication of a matrix by a mixing coefficient μ may use only m scalar multiplications of diagonal factors, rather than $$\frac{m(m-1)}{2}$$

multiplications

In IMM and GPBI, an embodiment may change number and structure of the individual estimators. Based on observed feature vectors and operating conditions. Some models may be removed from the list of viable mÄsyetm model, and some other may be added.

In case of elimination or addition of certain models, the transition probability matrix $P_T$ may be rectangular, instead of square. In an embodiment, it may also necessary that all newly added models use the same structure of the state vector, so that mixing and fusing of state estimates and covariance matrices is possible. An embodiment using the ZOA technique may not take into account this latter condition where there is no interaction between estimators. State vectors of different estimators may have different dimensionalities, as long as the fused output is in their common subset.

The foregoing describes multiple model state estimator techniques. In particular, described herein are embodiments of the IMM, GPBI and ZOA multiple model state estimator techniques that may utilize a plurality of estimators. These estimators may use as their inputs different feature vectors, which may result from different feature extraction methods such as PCA, wavelet transforms, and others. Each of these estimators may be used to predict an expected next set of feature values and compare those to actual input. The output values of estimators may be weighted and combined in accordance with the particular multiple model state estimator technique utilized. The way in which the estimators and inputs are arranged as described herein provides for detection and confirmation of change of state of the aircraft bay, for example, in the instance of fog or smoke formation.

It is also possible to use fuzzy logic to process the features determined at the feature extraction routines 206, 206', 206". Fuzzy logic is a known system of implementing, for example, rule-based expert systems that can account for uncertainties in values and rules applied thereto. It would be straightforward to one of ordinary skill in the art to process features extracted at the feature extraction steps 206, 206', 206" using fuzzy logic to detect the presence or absence of fire.

The system described herein may be seen as a particular application of a more general Autonomous Vision System (AVS) which is a concept for a family of products. The AVS provides a user with a tireless automated surveillance capability to monitor various elements of the aircraft integrity. The system may be used in applications where surveillance is needed and simple decisions for immediate corrective actions are well defined. Most of the hardware and software described herein is expandable to various applications of the AVS where analysis of "visual" phenomena is expected. Some examples of other AVS applications, where most of the system functions can be expanded, are described below.

The system may handle parked aircraft surveillance by monitoring the surroundings of the airplane by cameras and by detecting unexpected motion or intrusion such as loitering or movement of unauthorized personnel in restricted areas. The system can also be designed to take actions against acts of vandalism (e.g. forceful intrusion, intentional damage of the aircraft by stones and other means) by issuing an alarm signal to a designated third party through a wireless connection. This latest feature is useful particularly for general aviation and business jets that may have to park in remote areas and small airports (in the US and abroad) where aircraft and crew physical protection is inadequate. The concept would include standard surveillance function plus added intelligence in image processing, situational awareness, decision process and then some type of notification. This notification could be via some wireless, internet or other technique which would remote the information to some security center any where in the world or even to the pilot in his hotel room via his lap top computer.

The system may also be used for aircraft taxiing and moving assistance. The system would provide "eyes" for the pilot when moving the aircraft. In particular, the system could help assess wing tip clearances and verify that nothing is in the path of backing out aircraft. This functionality of enhancing the pilot awareness is useful for nose wheel steering and other activities such as docking. The value difference would be the augmentation of the video with intelligence to prompt he pilot of pending critical situations via the classical image process, situational awareness, decision algorithms and notification through human friendly graphical or other interfaces.

The system may also handle runway incursion prevention. The system could provide video monitoring data and possibly issue alerts to the crew if another plane, a ground vehicle, an airport crew, or any other unauthorized body or material (e.g. chocks) is intruding onto the runway. The system would improve the aircraft safety and help prevent on-the-ground collisions at overcrowded airports. The system could be tied to GPS and a data base of runway features to provide the pilot with an enhance image at several levels, including a synthetic heads up display.

The system may be used for pilot alertness monitoring. Long flight operations can often result in fatigue and disruption that may significantly diminish the pilot alertness leading to a decline in the safety margin of the aircraft and its crew. A way to detect pilot fatigue is highly desirable to prevent fatigue-related accidents. One way to check the pilot awareness is to directly monitor his/her eyes (and face) to detect micro-sleeps, head nodding, and eyelid movements. A video-based system, where a camera points directly toward the pilot's face and monitors the eyelid droop, pupil occlusion, and eyelid closure, seems an appropriate technique to implement this approach for pilot awareness monitoring.

The system may also be used as way for the aircrew to survey the situation of the physical aircraft. An option of showing images from outside of the aircraft body parts and the surroundings is a particular system upgrade that may become a baseline in the future. This could include the Goodrich Ice Hawk product function for detection of wing icing and complementary functions. This function may have also dual use as entertainment display for passengers. Live view from outside the airplane to the cabin passengers can be put in an entertainment and distraction context, particularly for business jet passengers.

The system could be used for monitoring of aircraft body parts and other inaccessible area for safety and security enhancement. Dedicated video-based systems with specific functions, cameras, and optics can be designed to monitor specific parts of the aircraft that include, for example, i) wheel wells and landing gear (e.g. to look for closure and hot spots); ii) engine nacelle; iii) battery compartment; iv) oxygen generator compartment; v) electronics compartment; vi) radar compartment; vii) communication compartments; viii) flaps; ix) actuator movement; x) wings (Tail mounted camera and others provide view of A/C while in flight to look for wing icing); xi) access door; and xii) cabin.

The AVS may be designed to sense patterns of interest at the monitored places such as motion, smoke, flames, hot spots (by means of the IR sensor), signs of fatigue, or suspicious action. Upon detection and verification (by numerous cameras and sensor fusion techniques) of patterns of interest, the system can be designed to take a set of predefined actions that include i) issuing an alarm to a third party with the specific type of threat; ii) initiating video recording of the view of interest and transmitting it to a remote location for storage or independent review. The importance of this action is such that the video recording may begin before the event could take place; and iii) taking measures to protect the aircraft such as turning the lights on if applicable, stopping the aircraft movement on the ground, and releasing of fire extinguishing agents.

The scope of the AVS can be expanded beyond the commercial aerospace segment to include military applications and other ground and sea transportation vehicles. Potential applications of the AVS in the military segment includes tanks and military vehicles to augment the user vision and awareness situation. Almost all the above applications apply to busses and heavy trucks. An AVS integrated to a large ship or submarine can provide close maneuvering and docking, monitoring exterior conditions and hazardous areas such as cargo bays, motor winch and munitions compartments.

Hardware and software elements of the system described herein may be expanded to other applications without or with minor changes. Cameras and associated modules (CCD or CMOS type cameras) and IR (Infra Red) are directly expandable to other applications. In particular, cameras optics that include lenses and camera calibration routines are expected to be applicable with minor changes to most of the mentioned AVS applications. A Digital Signal Processor unit may be used herein to process and move video data between cameras, memory units, logging system, and display screen. Characterization of the DSP unit including memory capacity, periphery architecture, processing speed and style (e.g. serial or parallel), and data bus configuration may be directly expandable to other AVS products. Image processing and decision making techniques constitute a universal platform that may be applicable to any AVS product. Among such image-processing functions that are directly expandable, it is expected that others that will be developed and tested. Validated and verified algorithms are expected to be applied to other AVS products directly or with some minor changes. These algorithms include spatial transformation, gray-level interpolation, correlation techniques, lowpass filtering, highpass filtering, homomorphic filtering, generation of spatial masks for enhancement, generation of spatial masks for restoration, image subtraction, image averaging, intensity transformation, histogram processing, gray level interpolation, inverse filtering to remove blur caused by linear motion, algebraic approach, Wiener filter, constrained least squares restoration, line detection, edge detection by gradient operator, edge detection by Laplacian operator, edge detection by Canny and Sobel operators, multiscale decomposition, edge linking, segmentation by thresholding, illumination effect, global thresholding, optimal thresholding, adaptive thresholding, multivariable thresholding, region-oriented segmentation, region growing by pixel aggregation and averaging, region splitting and merging, use of motion in segmentation, spatial segmentation by accumulative differences, frequency-based segmentation, feature representation and extraction, representation approach, chain codes, polygonal approximation, boundary segments, skeleton, boundary descriptors, geometrical quantities, Fourier descriptors, moments, relational descriptors, pattern recognition and decision making, pattern classification, decision-theoretic methods, pixel matching, optimal statistical classifiers, neural networks, structural methods, feature matching, syntactic methods, multiscale modeling, decision making, If-Then rules, neural networks, expert systems.

All the techniques set forth above are well defined and established in the public domain. It is expected that most, if not all of them, can be applied to a given AVS. Selecting one technique or another depends mainly on the application at hand.

The foregoing system and processing performed therein may utilize a variety of different techniques in connection with smoke and/or fire detection, monitoring, and verification.

Fog may be formed within an aircraft, such as within the cargo bay of an aircraft. Smoke and/or fire detection systems as described herein may issue a false alarm in the event that the system improperly distinguishes between fog and smoke. Fog may be formed in any one or more of a variety of different ways in which super-saturation is reached such as, for example, during takeoff and landing of an aircraft due to a rapid change in pressure that itself leads to change in temperature and consequently to an increase in relative humidity. Empirical evidence indicates that a large portion of false alarms due to-fog formation may occur while an aircraft is ascending or descending. Fog may also be formed at other points in flight when conditions within the cargo bay, or other area, cause humidity to increase to the point of super-saturation. For example, cargo may emit moisture in a non-ventilated or inadequately-ventilated bay, or portion thereof.

An embodiment of the system described herein may utilize fog detection and discrimination techniques to reduce the number of false alarms caused by fog being incorrectly identified as smoke. Set forth in following paragraphs are some techniques that may be used in an embodiment in connection with fog detection and discrimination.

It should be noted that as described herein, the term "energy" is used interchangeably with "intensity". Thus, for example, frame intensity is a measure of the frame brightness or visible light energy.

Figure 36:
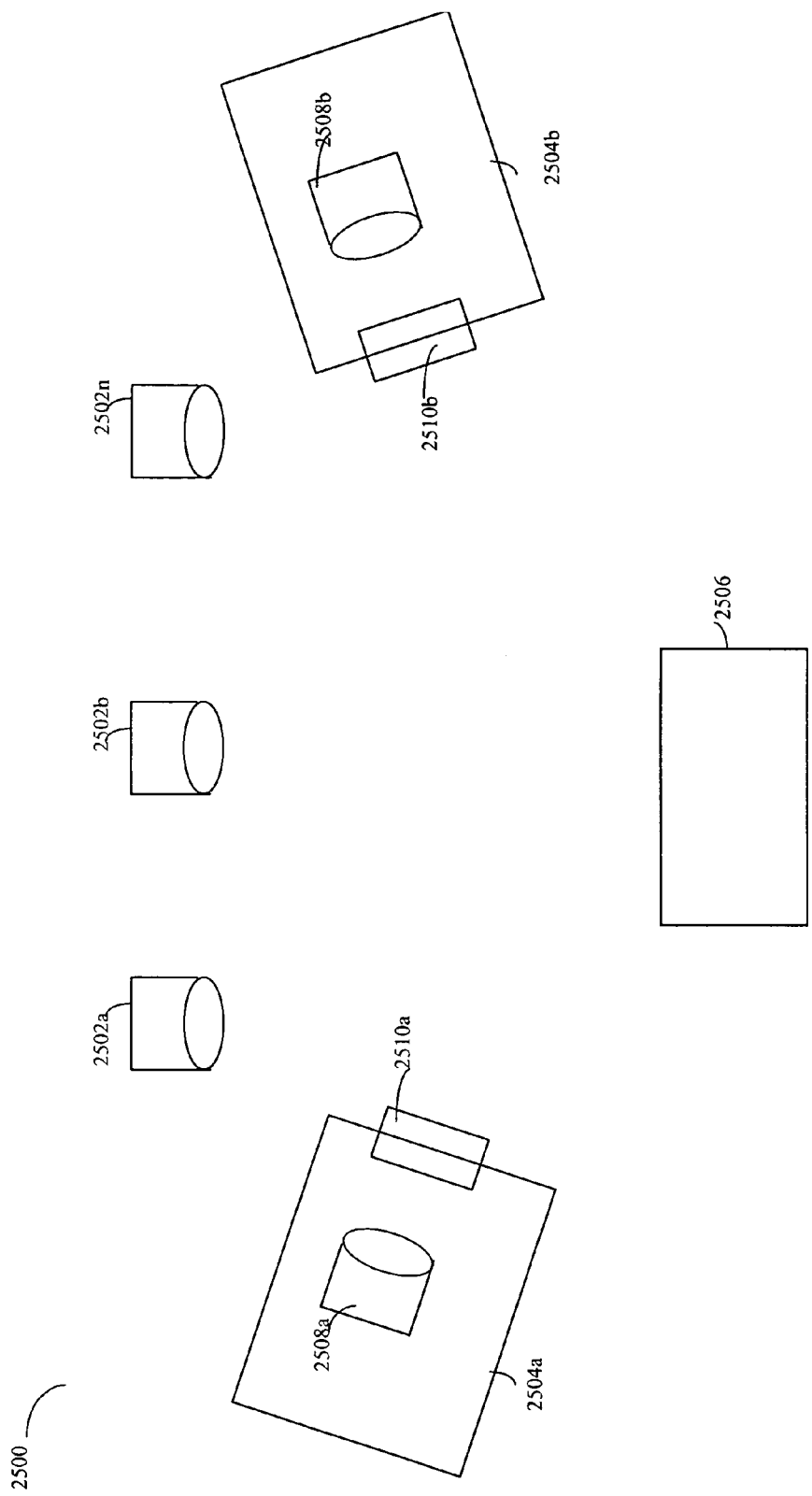
FIG. 36 is an example of components that may be used in connection with viewing a cargo bay area to obtain video information used in fog detection.

Referring now to FIG. 36, shown is an example of an embodiment of a portion of a lighting and camera arrangement that may be used in connection with differentiating between fire conditions and non-fire conditions (e.g., differentiating between smoke and fog) and/or detecting fire conditions. In this example, the arrangement 2500 may be used in connection with a cargo bay of an aircraft. It will be appreciated that the arrangement 2500, and other arrangements, as well as various lighting scenarios described hereinafter and possibly other lighting scenarios, may be useful for detecting fire, smoke, and other appropriate conditions (including, without limitation, non-fire conditions) using the functionality described herein. Additionally, the arrangements, scenarios and techniques described herein may be used to distinguish between fire and non-fire conditions, such as, distinguishing fog from fire attributes or conditions (e.g., distinguishing fog from smoke).

In FIG. 36, the example arrangement 2500 includes one or more overhead lights 2502a through 2502n, two cameras 2504a and 2504b, and cargo 2506 that may be included in cargo bay area of the aircraft being monitored. The cameras 2504a and 2504b may be used in connection with a video detection system for detecting smoke and/or fire as described elsewhere herein. The cameras 2504a and 2504b may be mounted in any one or more of a variety of different positions and locations. In the embodiment 2500, the cameras 2504a and 2504b are shown mounted at a downward angle as may be the case, for example, when the cameras are mounted on cargo bay sidewalls, or other supporting structures, or suspended from a ceiling. It is preferable that the cameras are installed in such a way that all or most of the cargo bay is within the field of view of at least one camera. If possible, the mounting should be also designed to maximize the portion of the bay that is within the field of view of two or more cameras. It should be noted that the particular components included in 2500 may be a portion of those components included in the system 100 of FIG. 1.

An area such as the cargo bay area may be illuminated with one or more light sources. At least a portion of the one or more light sources may be selected in accordance with the type of lighting to which the one or more cameras included in 2500 respond. In other words, the scene is illuminated with a light source or sources that match, at least partially, response characteristics of the particular camera or cameras used. In one embodiment as described elsewhere herein, the cameras 2504a and/or 2504b may be a CCD or CMOS camera although an embodiment may include any one or more different types of cameras.

The camera 2504a includes a light source 2508a and a lens 2510a. The camera 2504b includes a light source 2508b and a lens 2510b. In other embodiments, one or more of the cameras 2504a, 2504b, do not include a corresponding light source like the light sources 2508a, 2508b. It should be noted that the cameras 2504a, 2504b and/or the lenses 2510a, 2510b may include any one or more other components including filters, Digital Signal Processor (DSP) and the like. However, this simplistic view is shown in connection with 2500 for the sake of clarity and should not be construed as a limitation of the number or type of components that may be included in any particular camera and/or lens. It should be noted that the camera 2504b may include the same or different components of the camera 2504a and that the lens 2510a may include the same or different components of the lens 2510b.

As described elsewhere herein, the particular light source of the camera may be selected in accordance with the response characteristics of the one or more cameras used in an arrangement. For example, a CCD or CMOS camera may use any type of visible lighting as the source. If a camera includes options, such as a special type of optical filter, the light source may be selected in accordance with these options. For example, if a filter blocks visible light allowing only near infrared light to pass therethrough, the light source may include near infrared components. Accordingly, an embodiment may include as a suitable light source a near infrared LED rather than, for example, a fluorescent lamp. The light source of the camera may be co-located with the camera providing illumination, for example, from behind the lens of the camera. This is shown in connection with camera 2504a with light source 2508a located behind the lens 2510a of the camera 2504a. However, it should be noted that the light source associated with a particular camera may be located in other or different locations in accordance with different lighting schemes. A camera may also rely on one or more light sources located, for example, on adjacent side walls, ceilings of the bay, and the like. In addition to the light source associated with, and in the example co-located with, each camera, the arrangement 2500 includes one or more light sources 2502a through 2502n located on the ceiling of a cargo bay area. It should be noted that although the embodiment 2500 includes camera light sources 2508a and 2508b shown co-located with the cameras, respectively, 2504a and 2504b, behind the lenses, and additional light sources 2502a-2502n in the ceiling of the cargo bay area, light sources may be included in other locations other than as described herein in connection with the particular lighting scene desired. The particular light source(s) and location as well as the particular cameras may vary in connection with the different views being obtained.

In connection with one embodiment of smoke and/or fire detection systems, different light sources may be continually switched on and/or off in order to obtain different lighting views of a particular scene such as the cargo bay area. In connection with the arrangement 2500, camera light sources 2508a and 2508b as well as overhead lights 2502a through 2502n may be switched on and off via a controller using hardware and/or software. Although not shown in FIG. 36, a control unit, such as the CVCU 152 of FIG. 1, may be used in connection with controlling the lighting as well as the cameras. This is described elsewhere herein in more detail, for example, in connection with FIG. 1.

In one embodiment, four different lighting views may be used in connection with viewing a particular scene such as the cargo bay area. A lighting view may be defined in accordance with a particular set of light sources being on or off. The first view may be defined by having a camera on gathering one or more video frames while its own light source is off. However, one or more alternate light sources may be on, such as that of an opposing camera. In accordance with the first lighting view, camera 2504a may have its own light source 2508a off while the camera 2504a is enabled for gathering video data. At the same time, another opposing camera, such as 2504b, may have an associated light source on providing light for camera 2504a. In other words, the light source 2508b of camera 2504b may be used to provide lighting in connection with the video frames taken by camera 2504a. This foregoing may be used in connection with defining a first lighting view in which a camera has a light source provided from an alternate camera. Note that the another lighting source or sources located on the opposing wall within the field of view of camera 2504a might be used in addition to or instead of the light source of camera 2504b. The resulting view will be referred to as "opposite view", "diagonal view" or "far view" where the camera lighting is provided by the opposite camera or by an alternative opposite light source or sources.

An embodiment may also define a second lighting view in which all light sources are off except for the overhead lights 2502a through 2502n. Referring to 2500, in connection with the second lighting view, lights 2502a through 2502n are switched on and the camera light sources 2508a and 2508b are switched off while one or more cameras 2504a and/or 2504b are enabled to gather video frames. This view will be referred to as "overhead view". A third lighting view may be defined within an embodiment in which all controlled lights are off with zero illumination as may be used, for example, in connection with hot spot or flame detection. This view will be referred to as "thermal view" or "dark view". It should be noted that this third lighting view may not be used in connection with aerosol detection/distinction relating to smoke, fog, and dust since aerosol particles are typically not "hot" enough to be spotted by the camera in the dark.

In connection with a fourth lighting view, cameras may be paired, such as 2504a and 2504b, such that each camera of the pair is alternately enabled for scene lighting. When a first camera of the pair is enabled to access video information, the first camera's light source is also on while the second camera of the pair has its light source off and does not access video information. This view will be referred to as the "pilot view" or "near view" where each camera provides its own illumination (from behind). This is in contrast to the first lighting view in which the first camera of the pair accesses video information when the other camera of the pair has its light source on. For the pair of cameras 2504a and 2504b in connection with the fourth lighting view, if the light source 2508a is enabled, camera 2504a accesses video information while camera 2504b has its light source off. Similarly, if light source 2508b is enabled, camera 2504b accesses video information while camera 2504a has its light source off. It is worth noting that in some embodiments, each and every camera may always—independently from the light sources—be gathering video information but that such information is only used when appropriate.

In another embodiment, cameras may simultaneously gather and access information only when instructed by the control unit or the camera's own DSP. For example, when camera 2504a has its light source switched on and camera 2504b has its light source switched off, then both cameras may be gathering, accessing and processing video information simultaneously—the view seen by camera 2504a is its pilot view (near view), while the view seen by camera 2504b is its opposite view (far view).

An embodiment may define any one or more different views other than as described herein. The four lighting views described herein that may be included in an embodiment should not be construed as a limitation. For example, the fourth lighting scenario where the camera view is illuminated by its own lighting source (i.e. pilot/near view) may be preferred for fog/smoke discrimination. This view may provide better lighting coverage both in space and depth so that fog-related features, such as image spatial distribution and gradient intensity, are better identified for discrimination from those related to smoke or other aerosols.

The controller which may be used in controlling the operation of the lights and/or cameras described in the example 2500 may operate in one or more modes. Various operating modes may be selected via a predefined configuration file or based on the observed scene circumstances. One embodiment includes an automatic mode which may be characterized as cycling through the one or more lighting views described herein in an automated fashion. This first or automatic mode may provide for gathering a predetermined number of video frames in each of the views in a cyclic fashion. An embodiment may also include a second mode of operation of the lighting and/or cameras which may be characterized as a selectively programmed mode in which the control unit may be programmed to vary the amount of time and/or frames gathered for each of the lighting views in a particular system. The selectively programmed mode may be used, for example, in connection with programming the control unit using hardware and/or software to gather additional video frames and information in connection with one or more particular points of view. As an example, one particular camera may be at a preferred common location or view variation. Accordingly, the one particular camera may located within a cargo area to provide a better view of the cargo bay than other cameras and thus may be accessed more frequently than one or more other cameras. Additionally, the selectively programmed mode may be used in connection with gathering data about a particular location depending upon the detection of other conditions. For example, if certain conditions within a portion of the cargo bay area are detected, in response, it may be desirable to gather more video information about the portion.

In one embodiment, the first or automatic mode may be the normal mode of operation in which consecutive video frames are obtained corresponding to each of the different lighting views in a cyclic fashion. A control unit may be used in connection with continually switching on and off different light sources to obtain different lighting views of the particular scene being observed. Consecutive video frames in this mode of operation may correspond to each of the different lighting views. Alternatively, an embodiment may take a plurality of consecutive video frames for one particular lighting view such that a set of consecutive video frames may correspond to a single lighting view before switching to a different lighting view.

In connection with techniques described herein, it is assumed that the video frames being analyzed correspond to the same lighting conditions or views. In other words, a subsequence of frames may be extracted from the overall video feed if an embodiment is operating in the first or automatic mode. Additionally, as also described herein, fog discrimination may require that some source of light be present. However, ambient uncontrolled light may be sufficient in some instances. Frames taken with no illumination such as in connection with hot spot or flame detection may not be useful in connection with fog detection at all. As described above, the third lighting view in which all light sources are off, such as in connection with dark or hot spot detection, may not be used in connection with fog discrimination techniques described herein. Accordingly, an embodiment that operates in accordance with the first or automatic mode does not analyze the one or more frames produced using the foregoing third lighting view using the fog discrimination techniques described herein.

It should be noted that the techniques that are described herein may be executed using two or more different subsequences of frames each corresponding to different lighting conditions. For example, the techniques described herein may be used in analyzing video frames associated with the first lighting view described above (i.e. opposite/far view). Similar (perhaps adapted or related) techniques may be used in connection with analyzing a second subsequence of frames produced in accordance with the second lighting view described above (i.e. overhead view). Yet a third subsequence of frames may be analyzed in accordance with the similar (perhaps adapted or related) techniques in which the frames are produced using the fourth lighting view described above (i.e. pilot/near view). The embodiment may combine the diagnosis or conclusion reached using each of the different subsequences for the first lighting view, the second lighting view, and the fourth lighting view producing a combined final result by using data fusion techniques, for example, such as fuzzy logic and/or Bayesian decision making. The data fusion method may involve appropriate weighting to be applied to information from different views according to their usefulness for the overall detection task. For example, more emphasis may be put on the fourth lighting view (i.e. pilot/near view) where the fog movements and spatial distribution are best captured.

Figure 37:
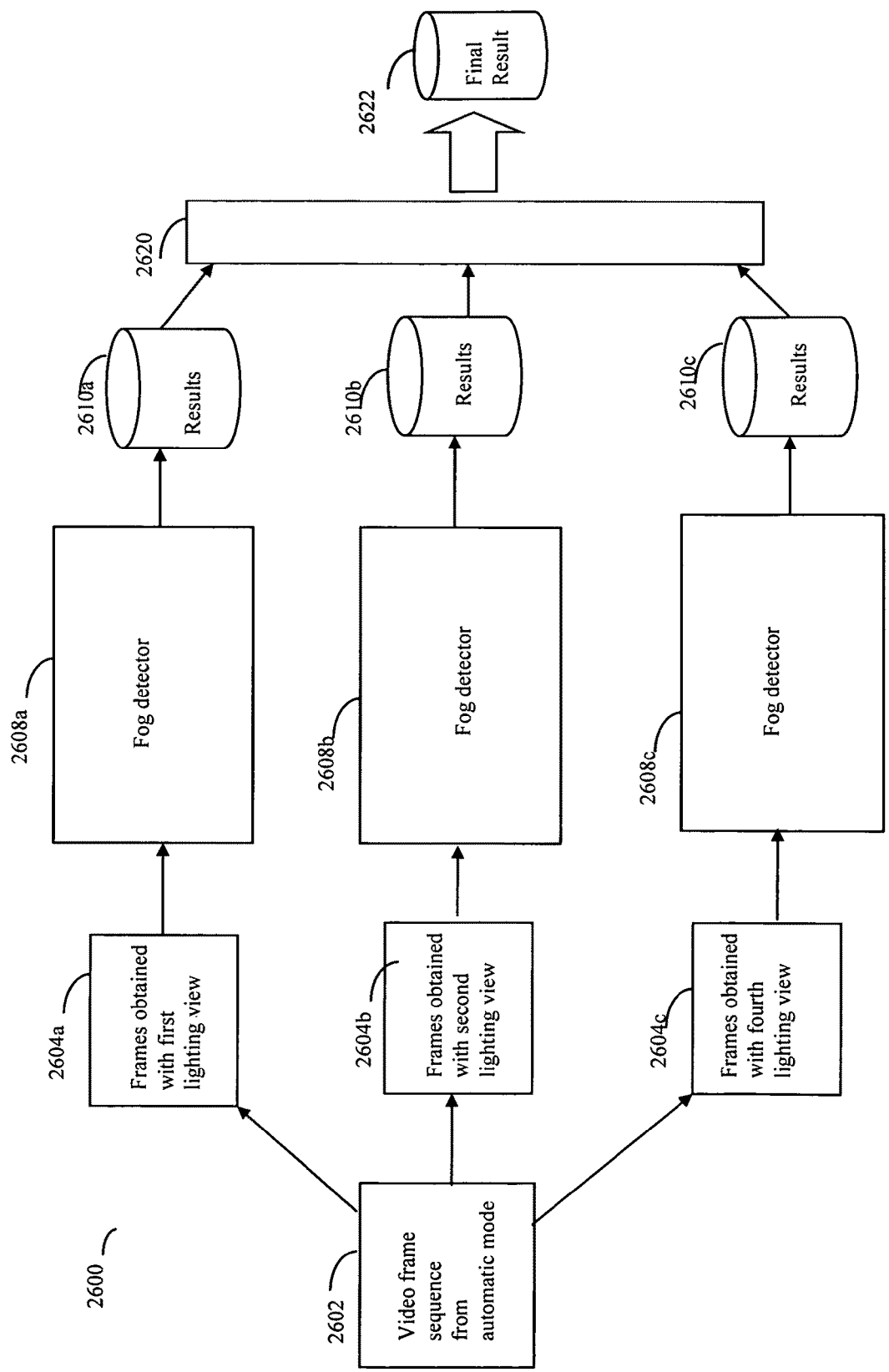
FIG. 37 is an example of data flow between components using data fusion techniques in fog detection.

Referring now to FIG. 37, shown is an example of an embodiment 2600 of data flow and components therebetween in connection with performing fog detection and discrimination. FIG. 37 summarizes the data flow just described in connection with an embodiment obtaining video frames using cameras and lighting operating in accordance with the automatic mode as described herein. At 2602, a video frame sequence is obtained in connection with plurality of lighting views in which lighting and cameras are operated in automatic mode as described elsewhere herein. These one or more video frames may be separated in accordance with each particular lighting view such that the frames 2604a obtained with the first lighting view are grouped together. Similarly, all of the frames 2604b obtained with the second lighting view are also grouped together, and those frames 2604c obtained with the fourth lighting view are also grouped together. Each of the different subsequences of frames associated with a particular lighting view are processed using the fog detection techniques described elsewhere herein that may operate in the fog detectors such as 2608a through 2608c. Each of the individual fog detectors 2608a-2608c outputs results in accordance with the particular subsequence of frames produced using a particular lighting view. The results of the fog detector processing the first set of frames obtained with the first lighting view are shown as results 2610a. Similarly, each of the subsequences of frames analyzed in accordance with each of the other lighting views also output results as shown in 2600. When each of the different fog detectors outputs individual results, these individual results may be combined using a data fusion scheme embodied within 2620. The data fusion scheme embodied within the component 2620 may produce a final result 2622 as a result of fusing the plurality of individual results. Each of the individual results is obtained based on a particular lighting view.

It should be noted that the techniques used in each of the fog detectors 2608a through 2608c may be the same or different fog detection techniques. The fog detectors 2608a through 2608c may utilize the fog detection techniques described herein or other types of techniques. Additionally, it should be noted that although the illustration 2600 includes only three types of lighting views and accordingly three subsequences of frames, any number of subsequences of frames may be analyzed and should not be construed as a limitation.

Techniques used in connection with fog detection, such as may be used in each of the fog detectors of FIG. 37, may analyze extracted features from the video frames to determine whether one or more of the extracted features indicate the presence of fog. These one or more extracted features may be based on the visual characteristics of fog. What will now be described are such characteristics that may be used in fog detection and discrimination techniques. It should be noted that the characteristics described herein are based on experimental video and non-video data collected.

It should also be noted that the characteristics and features set forth herein may be used in connection with an entire image or a portion of an image being analyzed.

A first visual characteristic of images in which fog is observed is that there may be a change in overall intensity of the image, or portion(s) thereof of interest. Fog droplets lead to diffusion of light such that light is reflected in different directions. As a result, more light gets reflected back-towards the camera causing the overall image intensity of the area of interest to increase. In other words, a lighting scene appears brighter.

A second visual characteristic of images in which fog is observed is that there may be a decrease in image contrast. Less light reaches the objects that are obscured by fog. Consequently, a smaller portion of light is reflected from those same objects. As a result, objects that normally appear very bright in the absence of fog now show a decrease in brightness in the presence of fog. Additionally, objects that normally appear very dark in the absence of fog appear lighter in the presence of fog since a portion of the light is reflected by fog droplets instead of being absorbed by those dark objects. As a result, image contrast decreases such that differences in intensity are smaller.

A third visual characteristic of images in which fog is observed is that there may be a decrease in image crispness or sharpness. Sharpness of detail decreases in foggy images as edges appear blurred.

A fourth visual characteristic of images in which fog is observed is that the changes in the foregoing first through third visual characteristics approximate a uniform change across an image or portion of image that is of interest. In other words, the intensity, contrast and sharpness changes are approximately uniform across an entire image or region(s) such that, for example, no localized fog cloud is visible. With fog, intensity increases throughout the image, or region of interest, at a relatively uniform rate. Similarly, edges get slightly blurred in all objects of the image. This is in distinct contrast to smoke which moves from its source into the camera field of view. Image changes resulting from smoke may be observed within a portion of an area under consideration, while fog causes the same type of change in a more global fashion throughout the entire area or region of interest. Note that it is possible for fog effects to be present only in a portion of the observed view, and therefore the image change may be not completely uniform. However, in a typical situation, image changes due to fog are more uniformly distributed across the image, or other region of interest being analyzed, than image changes due to smoke.

A fifth visual characteristic of images in which fog is observed is that there may be a rapid initial change in image intensity, contrast, and/or sharpness globally within an image and/or area being monitored. Fog droplets may form simultaneously or within a short time interval everywhere within the entire cargo bay or a large portion thereof. The resulting changes in image intensity, contrast or sharpness occur quickly, such as, for example, within single seconds, such that the changes in image intensity, contrast, and/or sharpness take place very rapidly. In contrast, smoke typically would fill the cargo bay from an initially localized source, and the observed image changes would increase gradually through a longer time.

A sixth visual characteristic of images in which fog is observed is that there may be an immediate but slow dispersal of the fog once formed such that intensity, contrast and/or sharpness characteristics may gradually return to pre-fog formation levels. In other words, once fog is formed, a scene may, within a few minutes, return to its previous non-fog state. This process may also be characterized as approximately uniform across the whole image or portion thereof of interest. The recovery process may be characterized as approximately linear over time. It should be noted that the sixth characteristic may not always be present with fog. The sixth visual characteristic may be used in an embodiment, for example, as a confirming or secondary condition when performing fog detection. If an embodiment uses one or more other characteristics which indicate the presence of fog, features related to the sixth visual characteristic may be used in confirming this positive result of the other characteristics. An embodiment may also use the sixth characteristic in fog detection and determination when a change in pressure is determined. If no change in pressure has been determined, an embodiment may optionally decide not to use image features based on the sixth visual characteristic in making a decision regarding fog detection.

Based on the foregoing visual characteristics described above, what will now be described are some numerical features that may be extracted from an image and how they may be used in automatic fog detection. It should be noted that the numerical features described below may be characterized as a partial list of such features and an embodiment may also utilize other extracted features in accordance with the visual characteristics described herein. It should also be noted that each of the extracted features described herein may be performed using the entire image, or one or more regions of interests.

A first extracted feature that may be used in an embodiment is image intensity. An embodiment may use average intensity of an image as an indication of overall brightness of an image, or portion thereof of interest. The average intensity m of an image at a time "t" may be calculated as:

$$m(t) = \frac{1}{N} \sum_{j=1}^{N} Xj(t) \qquad \text{EQUATION F1}$$

where N represents the total number of pixels in the image, or portion thereof, at a time "t" and $X_j(t)$ represents the intensity value at pixel location "j" and time "t". The foregoing average intensity may be determined for a plurality of images over a period of time to detect a trend in image brightness. The summation in the above formula may also be performed only over pixels from a small predetermined region of the image instead of over the entire image, particularly if only portions of the image are effectively illuminated, such as in opposite or overhead view. If the overall brightness of the region(s) of interest increases over a predetermined time period above a predetermined threshold, then this may be an affirmative indicator of the presence of fog.

An embodiment may also determine the intensity of a change image or difference image, $D_j(t,\delta)=X_j(t)-X_j(t-\delta)$, which is a difference between images, or portions thereof, taken at time instances t and t−δ. The intensity of image change may be calculated as:

$$m_D(t, \delta) = \frac{1}{N}\sum_{j=1}^{N} Dj(t, \delta) \qquad \text{EQUATION F2}$$

It should be noted that the intensity of an original image at a time "t" is a positive number, while its change may be positive or negative relative to the initial intensity. Therefore indicator m(t) assumes only positive values, while $m_D(t,\delta)$ may be positive or negative. Positive changes in m(t) or positive values of $m_D(t,\delta)$ indicate creation of fog, while negative changes in m(t) or negative values of $m_D(t,\delta)$ indicate its dispersion.

It should also be noted that the time interval δ between the two compared frames may be fixed throughout the operation of the system. An embodiment may also adjust the time interval in accordance with particular conditions and parameters in an embodiment. In other words, the reference frame X(t−δ) need not be always delayed with respect to the current frame X(t) by the same time interval. For example, in one instance, the reference frame X(t−δ) may be fixed representing an initial view of a cargo bay X(0), such as, for example, one that may be interpreted as the background scene. In this case δ grows linearly so that δ is always the current time t since the start of the flight from the time of the initial view. The difference image D(t,δ) in this case represents the cumulative change of view since the beginning of the flight.

An embodiment may also reset the reference image X(t−δ) periodically to accommodate possible slow changes of background. An embodiment may also have the reference frame e X(t−δ) set to the frame immediately preceding the current one such that δ=1. In this instance, the difference image D(t,δ) represents the instantaneous rate of change of the view.

An embodiment may use one or both of the foregoing average intensity and change in image intensity with respect to a reference image, or portion thereof, as described above. The particular one used in an embodiment may vary in accordance with the conditions existing in a system. For example, in a system in which there is a lot of vibration, it may be desirable to use the average intensity of an image as determined by EQUATION F1 and observed over a time period.

It should be noted that an embodiment may use a numerical value determined from EQUATION F2 as an indicator that fog is present in accordance with predetermined threshold values. If the calculated value is a positive value greater than the threshold, then this calculated value indicates affirmatively that fog has been detected. The particular thresholds used in connection with this value and others described herein may be empirically determined. The particular thresholds used may also vary in accordance with the particular conditions of each embodiment such as, for example, the illumination, camera settings, and the like.

In connection with the various features described herein, a single image, or portion thereof, may be used. Additionally, the features described herein may also be determined using the change or difference image.

In connection with EQUATION F1 above, an embodiment may also determine and use as an extracted numerical feature the standard deviation of the image intensity as:

$$s(t) = \sqrt{\frac{1}{N}\sum_{j=1}^{N}(Xj(t) - m(t))^2} \qquad \text{EQUATION F3}$$

Large values of s(t) indicate high variability of intensity and are related to high contrast. Low values of s(t) indicate lower contrast. In connection with fog detection, creation of fog occurs when there is a rapid decrease of s(t), while an increase in s(t) may be used an indicator of fog dispersal. If s(t) is below a predetermined threshold, this may be used an affirmative indicator that fog is present. As with mean intensity numerical feature and all other features described herein, standard deviation of intensity may be calculated over the entire image or over a predetermined region which is a portion of the entire image.

An embodiment may also determine the average absolute difference from the mean. In some instances, standard deviation may be too computationally expensive since it requires each intensity difference to be squared, or that each intensity be squared. An embodiment may use pre-calculated values stored in a table and at runtime, look up values in the table rather than perform the calculation. In other words, a lookup table containing numerical values of the standard deviation corresponding to a few (i.e. not all) pixel combinations may be computed offline and stored in the computer memory. Given an actual frame with a certain pixel combination (i.e. intensity map) at time t, the frame standard deviation may be approximated by the value corresponding to the pixel combination in the lookup table that is closest to the actual frame at time t. However, in some embodiments, the computational and resource cost may still be deemed to be high even with a table look up feature. Another possibility is to store, as a look-up table, different values of the square $(Xj(t)-m(t))^2$ for different pixel intensity values, and thus avoid squaring operation for each pixel. An embodiment may alternatively determine a mean absolute difference from the mean as:

$$d(t) = \frac{1}{N}\sum_{j=1}^{N}|Xj(t) - m(t)| \qquad \text{EQUATION F4}$$

Similarly as in a standard deviation case using EQUATION F3, creation of fog is related to rapid drop of d(t), while its rise indicates fog dispersal.

An embodiment may also determine the absolute value of the average intensity change as:

$$d_a(t, \delta) = \left|\frac{1}{N}\sum_{j=1}^{N}(Xj(t) - Xj(t-\delta))\right| \qquad \text{EQUATION F5}$$

This feature is useful in eliminating random fluctuations around the mean since pixel differentials with opposite signs cancel each other. Random fluctuations may be caused, for example, by a source other than fog, such as background and camera noises.

It should be noted that an embodiment may use the features of EQUATIONS F4 and F5 as an alternative to, or in addition to, other features described herein.

An embodiment may also use features in connection with comparing an image, or portion thereof, to a reference image. Two such features that may be included in an embodiment are described in connection with EQUATION F6 and EQUATION F7 below.

An embodiment ray determine a correlation measurement based on the t-Student distribution as:

$$d_s(t, \delta) = \frac{\sum_{j=1}^{N}(Xj(t) - m(t-\delta))}{\sqrt{\sum_{j=1}^{N}(Xj(t) - m(t-\delta))^2}} \quad \text{EQUATION F6}$$

This feature may be used in tracking the statistical evolution of the video stream as compared to the reference image at time $t-\delta$. The values determined using EQUATION F6 are large in the case of uniformly distributed pressure-related fog since this feature emphasizes uniform dispersion around the mean intensity. If values determined using EQUATION F6 are greater than a predetermined threshold, this may be used as an affirmative indicator of fog.

An embodiment may also determine a correlation similar to that described by EQUATION F6 based on the likelihood ratio distribution and calculated as:

$$d_1(t) = 1 - \min_{j=all\ pixels}\left(LR_j, \frac{1}{LR_j}\right) \text{ where} \quad \text{EQUATION F7}$$

$$LR_j = \frac{\left[\frac{(s(t))^2 + (s(t-\delta))^2}{2} + \frac{(X_j(t) - m(t-\delta))^2}{2}\right]^2}{(s(t))^2(s(t-\delta))^2}$$

An embodiment may determine an intensity range. Maximum (Xmax) and minimum (Xmin) intensity may provide an indication of reduced image contrast. If $$\chi_{max}(t) = \max_{j=all\ pixels} X_j(t), \chi_{min}(t) = \min_{j=all\ pixels} X_j(t) \quad \text{EQUATION F8}$$

then, intensity range may be expressed as:

$$r(t) = \chi_{max}(t) - \chi_{min}(t) \quad \text{EQUATION F9}$$

Creation of fog may be indicated by a rapid drop of r(t), while an increase in r(t) may indicate fog dispersal. If r(t) decreases below a threshold amount, this may be used as an affirmative indicator that fog is present.

An embodiment may also extract frequency-based features to identify and discriminate foggy scenes. The main premise is to determine motion estimates via a Fourier transform formulation of an image, or portion thereof. In contrast to smoke which typically moves from its source (e.g. hotspot) in some direction with a certain propagation velocity, fog tends to diffuse everywhere in all directions without a regular propagation velocity. To capture this discrimination feature consider the following formulation of the problem.

1. Suppose a stream of digital frames of size M by N is captured at a certain constant rate of "$\Delta t$" frames per second.

2. Further, suppose that a reference frame captures all light reflections due to static structures in side the bay—such as bay walls, cargo, containers, and fixed light sources. The reference frame will be subsequently subtracted from any subsequent frame of the video stream. Any change in the stream of images is supposedly due to fog or other aerosol, such as smoke.

3. To simplify the formulation, suppose that a unique and bright one-pixel region is moving in the X-direction with a constant velocity. In other words, everything is static (i.e. with value "0") except for a single pixel (i.e. with value "1") at location $(x_0, y_0)$ that is moving with a constant speed in the X-direction.

4. Project the image plane into the X-axis; that is the pixel values are summed across the columns (from 0 to M−1). This summation generates a 1-D vector of length M with all its entries equal to zero except for the entry at the order $x_0$; that is:

$$V_M = [\,0,\ 0,\ 0,\ \ldots,\ 0,\ 1,\ 0,\ \ldots,\ 0\,]$$
$$\text{order:} \uparrow 0,\ \uparrow 1,\ \ \ldots,\ \uparrow(i_0),\ \ldots,\ \uparrow(M-1).$$

5. Multiply components of the vector by the complex value: $e^{[j\pi a_1 x \Delta T]}$, x=0, 1, 2, . . . (M−1) where $a_1$ denotes a positive integer (i.e. a frequency).

6. Summation of the vector components yields the complex value of $e^{[j2\pi a_1 x_0 \Delta T]}$ in terms of polar coordinates.

7. Suppose that in the second frame (i.e. t=1) the one pixel object has moved in parallel direction to the X-axis with a unit value; that is to coordinates $(x_0+1, y_0)$.

8. Repeating the projection procedure of step 4 yields a complex value of $e^{[j2\pi a_1(x_0+1)\Delta T]}$. If the object continues to move at the pace of one pixel location per frame, at any time integer time $t_k$ then the result of the projection procedure is $e^{[j2\pi a_1(x_0+1)\Delta T]}$ that has a real part (i.e. physical) value of:

$$\cos[2\pi a_1(x_0 + t_k)\Delta T];\ t_k = 0, 1, 2, \ldots, K-1.$$

In other words, the foregoing represents a harmonic with frequency "$a_1$" where $a_1$ is actually an arbitrary positive integer picked to facilitate the projection process. If the object is moving $v_1$ pixels between frames, then the sinusoidal frequency may be represented as $a_1 v_1$.

9. Applying the Discrete Fourier Transform (DFT) to the sinusoidal results in a peak at the frequency $a_1 v_1$. Another peak, because of DFT symmetry, is detected at frequency $(K - a_1 v_1)$ and should be ignored. Recall K is the number of frames of the video stream. Dividing the peak value (i.e. $a_1 v_1$) by the predefined integer $a_1$ yields the object velocity in the x-direction (i.e. $v_1$).

Applying a similar process to the y-axis yields a velocity component (i.e. $v_2$) in the y-direction. The foregoing is one technique known in the art for capturing frequency based features to determine motion estimates as described, for example, in Rafael C. Gonzalez, Richard E. Woods, "Digital Image Processing," Prentice Hall, New Jersey 2002, and Murat Tekalp "Digital Video Processing," Prentice Hall, New Jersey 1995. Other techniques may be used in connection with extracting this and other frequency-based features for identifying and discriminating foggy scenes.

Based on the above process, the following projection functions may be defined as:

$$g_x(t, a_1) = \sum_{x=0}^{M-1}\sum_{y=0}^{N-1} p(x, y; t)e^{[j2\pi a_1 x \Delta T]};\ t = 0, 1, \ldots, (K-1)$$

$$g_y(t, a_2) = \sum_{x=0}^{M-1}\sum_{y=0}^{N-1} p(x, y; t)e^{[j2\pi a_2 y \Delta T]};\ t = 0, 1, \ldots, (K-1)$$

Applying DFT to these functions yields 2 frequency responses as follows:

$$G_x(u_1, a_1) = \frac{1}{K}\sum_{t=0}^{K-1} g_x(t, a_1) e^{\left[\frac{-j2\pi u_1 t}{K}\right]}; u_1 = 0, 1, \ldots, (K-1)$$

$$G_y(u_2, a_2) = \frac{1}{K}\sum_{t=0}^{K-1} g_y(t, a_2) e^{\left[\frac{-j2\pi u_2 t}{K}\right]}; u_2 = 0, 1, \ldots, (K-1)$$

As mentioned earlier, the Frequency-based process result in two peaks relating frequency to motion velocity as follows:

$$\begin{cases} u_1 = a_1 v_1 \\ u_2 = a_2 v_2 \end{cases}$$

The total motion quantity can be estimated in pixel per frame-time by:

$$\Gamma = \sqrt{(v_1)^2 + (v_2)^2}$$

A value of $\Gamma=5$ means motion of 5 pixels per K frames. For example, if $\Gamma=5$ and K=30 frames, dT=7 frames per second, and distance between pixels is translated into physical distance 0.03 m, then the actual object motion is:

$$\Gamma = (5 \text{ pixels})(0.03 \text{ m/pixel})(2 \text{ frames})/(30 \text{ frames})$$
$$= 0.01 \text{ m/s}$$

Recall that this calculation is based on the assumption of 1-pixel object moving at constant velocity. In the case of several "objects", such as edges of aerosol clouds, the motion quantity may be computed based on the detection of several peaks (i.e. moving pixels) and not constant (i.e. time-dependant).

The trend of the foregoing frequency-based motion estimator $\Gamma$ with fog may be characterized as small and smoothly varying with time in contrast to the smoke case that may be characterized as exhibiting high and irregular values of $\Gamma$.

An embodiment may extract a gradient feature since sharpness of image, or portion thereof, may be characterized by the intensity gradient of an image. The x and y gradient components at pixel i,j may be defined and/or approximated in any one or more a variety of different ways, for example, as described in Rafael C. Gonzalez, Richard E. Woods, "Digital Image Processing," Prentice Hall, New Jersey 2002, and Murat Tekalp "Digital Video Processing," Prentice Hall, New Jersey 1995. For example, a gradient may be defined in terms of left, right, or double-sided differences, as set forth below, respectively, in EQUATIONS F10, F11, and F12:

$$G_{i,j}^x(t) = X_{i,j}(t) - X_{i-1,j}(t) \quad \text{EQUATION F10}$$

$$G_{i,j}^y(t) = X_{i,j}(t) - X_{i,j-1}(t)$$

$$G_{i,j}^x(t) = X_{i+1,j}(t) - X_{i,j}(t) \quad \text{EQUATION F11}$$

$$G_{i,j}^y(t) = X_{i,j+1}(t) - X_{i,j}(t)$$

$$G_{i,j}^x(t) = \frac{X_{i+1,j}(t) - X_{i-1,j}(t)}{2} \quad \text{EQUATION F12}$$

$$G_{i,j}^y(t) = \frac{X_{i,j+1}(t) - X_{i,j-1}(t)}{2}$$

Although the foregoing defines a gradient in terms if differences between pixel locations with time as a constant, such as within a same image, a gradient may also be determined by examining pixel values of images taken at different points in time. As described elsewhere herein, the gradient, as well as other features set forth herein, may be determined on a single image or the difference image described elsewhere herein.

Note that other expressions may be used to approximate gradient values. If more computational resources are available, then a standard approximation such as Prewitt or Sobel formula for numerical gradient may be used. Any of variety of known gradient approximation methods may be used.

It should be noted that that a calculation of gradient values may not be possible for all pixels. This may vary in accordance with the particular technique and formula used to determine gradients. For example, border pixels may be excluded when determining gradient values depending on the particular technique and formula used. In connection with equations described herein, such as in EQUATION F13 below, summations are performed using the appropriate non-border pixels, and the number of pixels N is understood accordingly as excluding any border pixels needed.

An embodiment may use large gradient values to give a measure of image sharpness such that sharp edges correspond to large values of a gradient. An embodiment may define a mean absolute gradient value as:

$$g_a^x(t) = \frac{1}{N} \sum_{i,j=\text{all pixels}} |G_{i,j}^x(t)|, \quad \text{EQUATION F13}$$

$$g_a^y(t) = \frac{1}{N} \sum_{i,j=\text{all pixels}} |G_{i,j}^y(t)|$$

Using EQUATION F13, creation of fog may be signified by a rapid drop in $g_a^x(t)$ and/or $g_a^y(t)$ while, in contrast, an increase in $g_a^x(t)$ and/or $g_a^y(t)$ may indicate fog dispersal. An embodiment may also define the overall average gradient characteristic as:

$$g_a(t) = g_a^x(t) + g_a^y(t) \quad \text{EQUATION F14}$$

and use EQUATION F14 as an alternative to, or in addition to, using $g_a^x(t)$ or $g_a^y(t)$ separately, for example, as set forth in EQUATION F13.

An embodiment may also include another gradient measure is based on the average gradient norm. Let the gradient norm at pixel i,j be defined as:

$$G_{i,j}^n(t) = \sqrt{G_{i,j}^x(t)^2 + G_{i,j}^y(t)^2} \quad \text{EQUATION F15}$$

for all "N" pixels used, and the average gradient norm may be defined as:

$$g_n(t) = \frac{1}{N} \sum_{i,j=all\ pixels} G_{i,j}^n(t) \qquad \text{EQUATION F16}$$

Using the values for the feature of EQUATION F16, creation of fog is related to a rapid drop in $g_n(t)$, such as below a predetermined threshold value. An increase in the values determined using EQUATION F16 may indicate fog dispersal. Using a gradient, other possible features may be determined and used in an embodiment. For example, other possible features included in an embodiment as related to image sharpness may be the maximum and/or minimum gradient norms defined as:

$$g_{max}(t) = \max_{i,j=all\ pixels} G_{i,j}^n(t), \qquad \text{EQUATION F17}$$

$$g_{min}(t) = \min_{i,j=all\ pixels} G_{i,j}^n(t)$$

An embodiment may also utilize the maximum and/or minimum values of its x and y components defined as:

$$g_{max}^x(t) = \max_{i,j=all\ pixels} |G_{i,j}^x(t)|, \qquad \text{EQUATION F18}$$

$$g_{min}^x(t) = \min_{i,j=all\ pixels} |G_{i,j}^n(t)|$$

$$g_{max}^y(t) = \max_{i,j=all\ pixels} |G_{i,j}^y(t)|, \qquad \text{EQUATION F19}$$

$$g_{min}^y(t) = \min_{i,j=all\ pixels} |G_{i,j}^y(t)|$$

If one or more of the above minimums and/or maximums drop below a predetermined threshold, this may indicate the presence and/or creation of fog.

Another feature that may be used in an embodiment relates to the dynamic range of intensity change. To measure spatial uniformity of image changes, an embodiment may determine a standard deviation of intensity change over some predefined time interval, δ, defined as:

$$s_d(t, \delta) = \sqrt{\frac{1}{N} \sum_{j=all\ pixels} (D_j(t, \delta) - m_d(t, \delta))^2} \qquad \text{EQUATION F20}$$

As related to fog, the initial pixel intensity increase and the subsequent pixel intensity decrease is distributed evenly across the image. Therefore the change image D(t,δ) should be uniformly grey with all pixels close to the mean value $m_D(t,\delta)$ such that the quantity $s_d(t,\delta)$ of EQUATION F20 is close to zero. Accordingly, an embodiment may compare feature values determined using EQUATION F20 to one or more threshold values in order to discriminate between fog and other conditions such as, for example, other aerosols, smoke, and the like which may result in non-uniform intensity changes.

An embodiment may also replace standard deviation with mean absolute deviation from the mean value of the change or difference image and use the following:

$$d_d(t) = \frac{1}{N} \sum_{j=all\ pixels} |D_j(t, \delta) - m_d(t, \delta)| \qquad \text{EQUATION F21}$$

An embodiment may used the image feature of EQUATION F21 in addition to, or in place of, EQUATION F20. The feature extracted with EQUATION F21 may be characterized as similar to that of standard deviation $s_d(t,\delta)$ of EQUATION F20 above. However, an embodiment using EQUATION F21 may use less computing resources than those associated with EQUATION F20 calculations resulting in a reduction in CPU time to determine associated numerical values.

An embodiment may also measure uniformity of change in an image, or portion thereof, through spatial moments of the change or difference image. Let coordinates of the center of mass of the change image D(t,δ) be defined as:

$$i_c(t, \delta) = \frac{\sum_{i,j=all\ pixels} i D_{i,j}(t, \delta)}{\sum_{i,j=all\ pixels} D_{i,j}(t, \delta)} \qquad \text{EQUATION F22}$$

$$j_c(t, \delta) = \frac{\sum_{i,j=all\ pixels} j D_{i,j}(t, \delta)}{\sum_{i,j=all\ pixels} D_{i,j}(t, \delta)}$$

If the image change is uniform across the image or region of interest, the coordinates of EQUATION F22 are very close to the geometric center of the image. If the above coordinates of EQUATION F22 are far away from the center of image, this indicates that the intensity change does not appear to be uniform, and accordingly is probably not caused by fog.

An embodiment may also determine one or more higher order moments of change image. These may be defined as:

$$M_{2,0}(t, \delta) = \sum_{i,j=all\ pixels} (i - i_c(t, \delta))^2 D_{i,j}(t, \delta) \qquad \text{EQUATION F23}$$

$$M_{0,2}(t, \delta) = \sum_{i,j=all\ pixels} (j - j_c(t, \delta))^2 D_{i,j}(t, \delta) \qquad \text{EQUATION F24}$$

A moment of inertia of the change or difference image may be defined as:

$$M_i(t, \delta) = \sum_{i,j=all\ pixels} \left((i - i_c(t, \delta))^2 + (j - j_c(t, \delta))^2\right) D_{i,j}(t, \delta) \qquad \text{EQUATION F25}$$

To reduce computational load, an embodiment may use average absolute values rather than squares of distances as set forth above, resulting in the following image features:

$$M_{1,0}^a(t, \delta) = \sum_{i,j=all\ pixels} |i - i_c(t, \delta)| D_{i,j}(t, \delta) \qquad \text{EQUATION F26}$$

-continued $$M_{0,1}^a(t, \delta) = \sum_{i,j=all\ pixels} |j - j_c(t, \delta)| D_{i,j}(t, \delta)$$ EQUATION F27

$$M_l^a(t, \delta) = \sum_{i,j=all\ pixels} (|i - i_c(t, \delta)| + |j - j_c(t, \delta)|) D_{i,j}(t, \delta)$$ EQUATION F28

An embodiment may use the foregoing EQUATIONS 26 through 28 in addition to, or in place of, the features determined using EQUATION 23 through 25.

In connection with the foregoing, moments may be used as an indicator of how spread around a center is the image. Using the foregoing equations, if the change or difference image is uniform, all these quantities are relatively large since pixels that are away from the center of mass have the same values of $D_{i,j}(t,\delta)$ as pixels close to the center of mass. If the above quantities are small, the change is concentrated close to its center mass and may be characterized as not uniform or localized.

One of the characteristics of fog described elsewhere herein in more detail is that fog has a change in pixel intensity which is global uniformly. Accordingly, larger moment values indicate a more uniform change and may be used as an indicator of the presence of fog. In contrast, smaller moment values may indicate non-uniform or localized change in pixel image intensity and may be associated with a condition other than the presence of fog.

In the presence of ideally uniform change, all values $D_{1,j}(t,\delta)$ are equal to $m_D(t,\delta)$ such that ratios of the above moments to $m_D(t,\delta)$ depend only on the dimension of the image. Thus, based on actual calculated value of average change intensity $m_D(t,\delta)$ it is possible to calculate what the value of a particular spatial moment should be if the change were ideally uniform. An embodiment may pre-calculate these ideal values. Then, these pre-calculated values may then be used as reference or threshold values against which the actual moments are compared. For instance, specific threshold values for foggy scenes can be estimated using experimental fog video data. If the computed values are below a suitably chosen threshold, the change image is not uniform in intensity, and therefore the change may be determined as not being caused by fog. An embodiment may also use other thresholds. An embodiment may also use other higher order moments than as described herein to characterize uniformity of change.

In connection with any one or more of the foregoing features as related to fog, suitable rates of change may be calculated and compared against pre-determined thresholds. Formation of fog may be characterized as being quite rapid, while the recovery process is slow. Rate of change for any of the above discussed numerical image characteristic may be calculated for example by taking difference between values calculated at two different time instances. Then, resulting rate of change value may be compared against suitably chose thresholds. Choice of threshold values to classify changes as rapid or slow as well as choice of the particular method to estimate the rate of change values may be based on experimental data and may vary with each embodiment.

An embodiment may also use fusion techniques that combine both one or more image features and one or more other non-image measurements to detect fog. This may be performed using the entire image or one or more regions of interest defined therein.

Note that all numerical features described above may also be calculated for one or more portions of an image or view rather than for the entire image or view. That is, only those pixels that belong to a predetermined region of an image may be taken into account while performing summation, or finding maximum or minimum value. For example, when analyzing the overhead view, the effects of fog dispersing light may be seen in a relatively small region below the light source. Accordingly, calculations of one or more numerical image features may be restricted to this region. Similarly, when analyzing an opposite view, only a region of the image surrounding the opposite light may be analyzed for appropriate image features. The region of interest may be specified as any one or more different shapes such as, for example, a rectangle, an oval, a suitable polygon, or in any other shape and/or size that may be convenient. Summations in the above formulae may be performed only over pixels belonging to the region.

It should also be noted that the region of interest being analyzed may also be represented as a union of a number of smaller regions, which may be disjoint or overlapping. For example, if two or more opposite lights are installed on the opposite wall, then two or more regions may be defined around the images of those lights. The computation of image features described herein may be performed using only pixels belonging to those two or more regions. Exact location and shape of those regions may vary, for example, with the specific geometric characteristics of camera and light source installation. From the point of view of ease of implementation and fast code execution, it is preferred that all small regions are represented as rectangles. However, for more accurate system performance, other forms of region description, such as ellipses, may be useful. Advantages of operating on only portions of one or more images rather one or more entire images include much lower computational load, better sensitivity to even small image changes, and higher robustness with respect to image noise.

Figure 38:
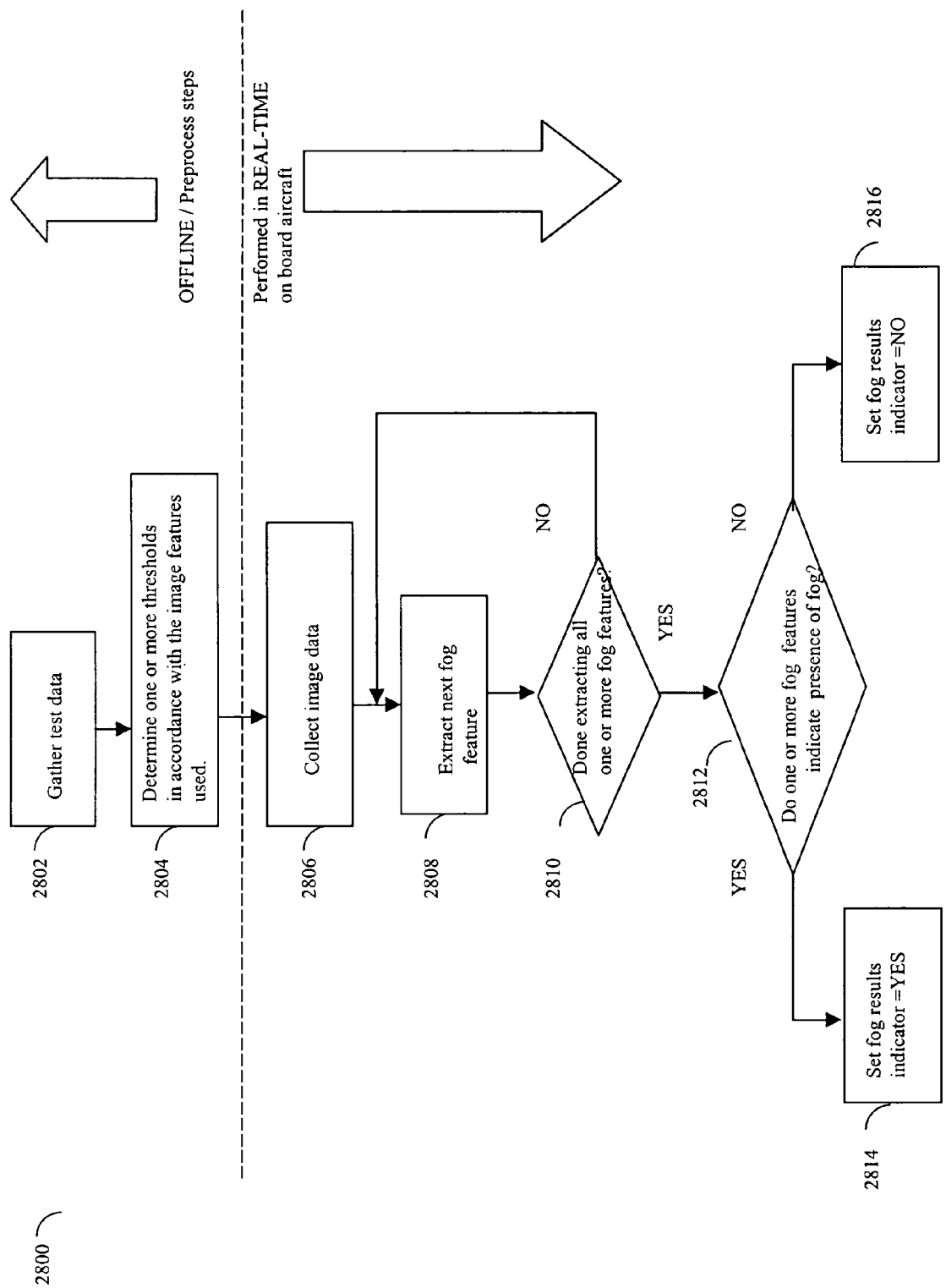
FIG. 38 is a flowchart of a first method of fog detection that may be included in an embodiment.

Referring now to FIG. 38, shown is a flowchart 2800 of steps that may be performed in one embodiment in connection with fog detection as described herein. It should be noted that the flowchart 2800 includes a dashed line delineating those steps which may be performed off-line prior to actually performing the remaining steps. As indicated, those steps above the dashed line may be performed off-line prior to performing the remaining steps below the dashed line in real-time when acquiring a "live" stream of video to look for fog and other elements.

At some point prior to data acquisition, steps 2802 and 2804 are performed. At step 2802, test data may be gathered. At step 2804, one or more thresholds may be determined using the test data in accordance with the particular one or more fog image features used in analyzing future image data for fog detection.

At some point in time later, remaining steps of flowchart 2800 may be performed in real-time as described above. Image data is collected at step 2806. The image data may be raw image data, or processed using techniques described elsewhere herein, such as filtering, sorting frames in accordance with lighting views, and the like. At step 2808 the next fog feature is extracted. At step 2810, a determination is made as to whether the fog feature extraction is complete. If not control proceeds to step 2808 until all fog features have been extracted from the image data. Control proceeds to step 2812 where a determination is made as to whether the one or more fog features indicate the presence of fog. If so, control proceeds to step 2814 where an output or result indicator is set to YES. Otherwise, control proceeds to step 2816 where an output or result indicator is set to NO. It should be noted that the processing of step 2812 may use any one or more techniques as described herein or otherwise known in the art in combining the one or more image features, such as known data fusion techniques.

Figure 39:
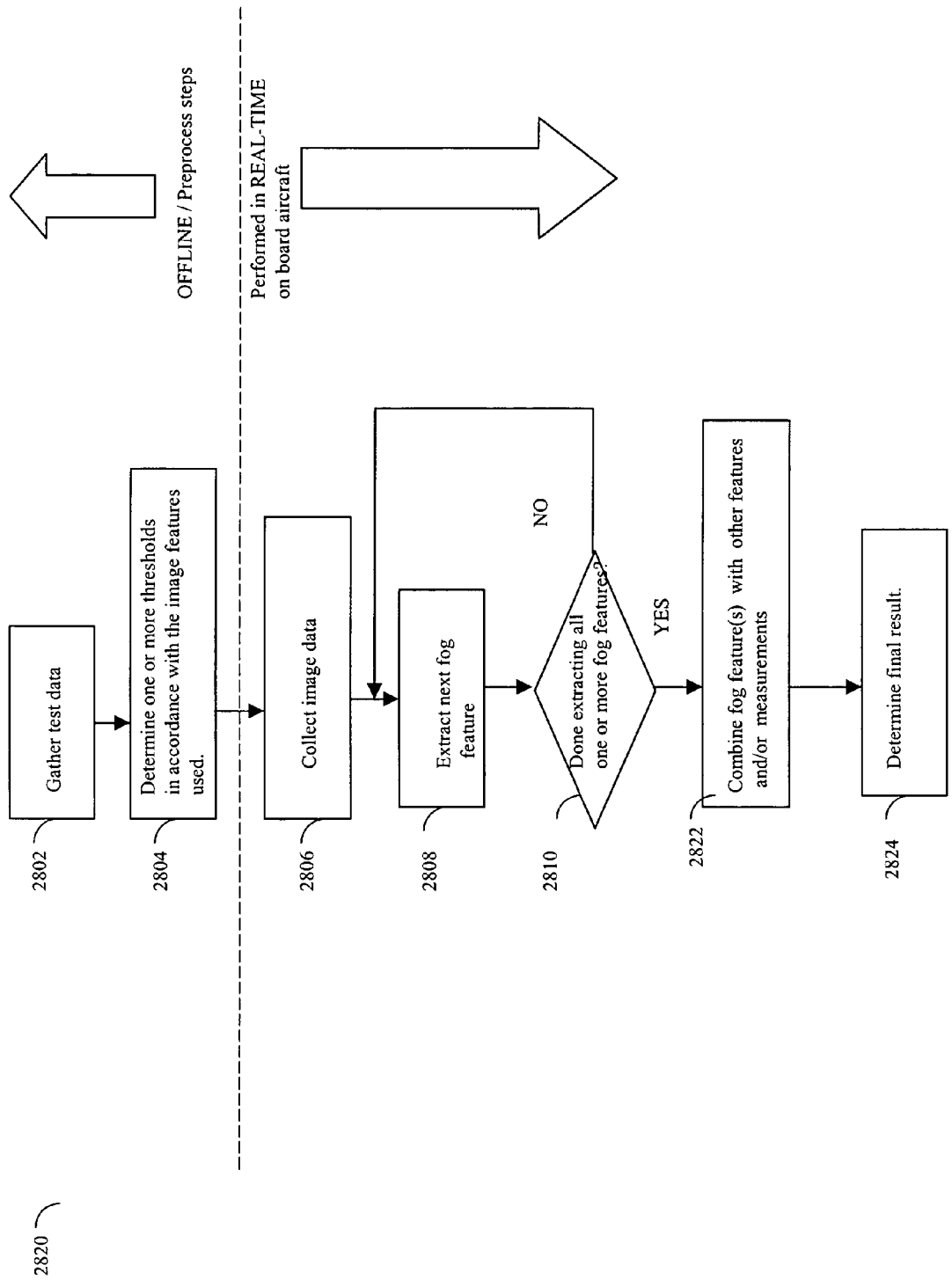
FIG. 39 is a flowchart of a second method of fog detection that may be included in an embodiment.

Referring now to FIG. 39, shown is a flowchart 2820 of steps of another embodiment for fog detection. Steps 2802, 2804, 2806, 2808, and 2810 are as described in connection with FIG. 38. At step 2822, the fog features may be combined with other features and/or measurements using any one or more of a variety of different techniques to produce a final result at step 2824 as to whether fog has been detected. FIG. 39 processing differs from FIG. 38 processing in that other features and/or measurements in addition to the image features for fog detection are used in fog detection.

Figure 40:
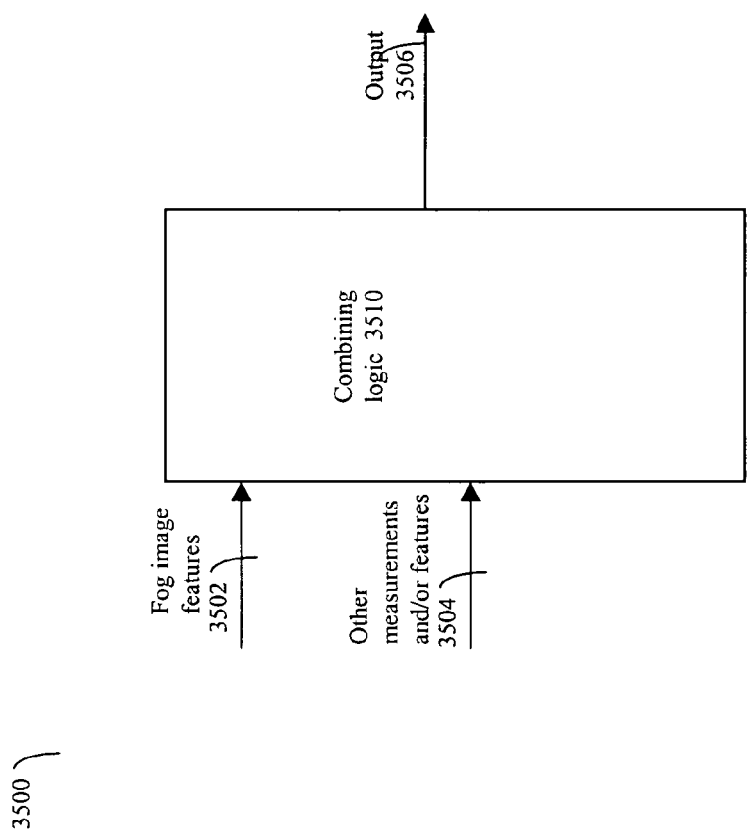
FIG. 40 is an example representation of the data flow of the method steps of FIG. 39.

Referring now to FIG. 40, shown is an example of an embodiment 3500 in which one or more image features of fog detection may be combined with one or more image and/or non-image features. FIG. 40 is a representation of the data flow of FIG. 39. The embodiment 3500 includes combining logic 3510 having as inputs one or more fog image features 3502 and one or more other measurements and/or features 3504. As an output, the combining logic 3510 produces a final result 3506 indicating the presence or absence of fog. The one or more fog features 3502 may be one or more of those image-based fog features described herein. The one or more other measurements and/or features 3504 may be actual measurements or features derived from measurements. The element 3504 may include measurements and/or features associated positively with the presence of fog. Element 3504 may include non-image measurements/features such as, for example, humidity, pressure and/or temperature measurements. Elements 3504 may include image and/or non-image measurements and/or features also associated with the presence of other non-fog conditions, such as smoke and/or fire. Solely using image features associated with fog may not be sufficient for effective discrimination of fog from other non-fog states depending on the particular conditions of each implementation. One or more other non-image measurements, or features based thereon, may be used in combination with the image features described herein in connection with fog detection. Other non-image measurements may include, for example, humidity, pressure and/or temperature measurements. One or more of these or other measurements may be used in combination with the image features described herein to increase the level of certainty for the fog detection techniques. For example, if relative humidity is not sufficiently high as may be determined in accordance with test data and knowledge, fog cannot be formed.

The choice of appropriate thresholds used in an embodiment may be based on experimental data, and vary, among other things, with the quality of available humidity, temperature, or pressure sensors. An embodiment may also use appropriate filtering and/or smoothing of measurements.

The combining logic 3510 may use any one or more techniques implemented in hardware and/or software. For example, the combining logic 3510 producing as a final output 3506 a determination of fog versus non-fog decisions may be based on rules defined by a domain expert. An embodiment of 3510 may also use fuzzy logic inference rules derived, using manual and/or automatic techniques known in the art, from experimental data. An embodiment of 3510 may also utilize a learning technique, such as based on those of a Bayesian decision making using a statistical analysis of the available data. For example, fuzzy rules may be synthesized such that they implement optimal Bayesian rules. Any one or more different techniques known in the art may be used in connection with the system and methods described herein.

The thresholds used and described herein may be determined in accordance with experimental data and selected such that all test cases of fire or smoke are diagnosed correctly as smoke, and so that all fog cases are correctly diagnosed as fog. The threshold selected should leave a "safety margin" such that a small variation does not dramatically change the diagnosis. It should be noted that an embodiment should not incorrectly misdiagnose any fire conditions/cases. In one embodiment, incorrectly determining that a fog condition is smoke is permitted, while confusing smoke for fog resulting in a missed detection of smoke should not occur.

Use of the image related features of fog described herein may be combined in an embodiment to produce a more robust fog detection technique. The combining logic 3510 may vary in complexity in accordance with each embodiment. The particular techniques used may vary in accordance with many factors, for example, such as the amount of test data available.

Figure 41:
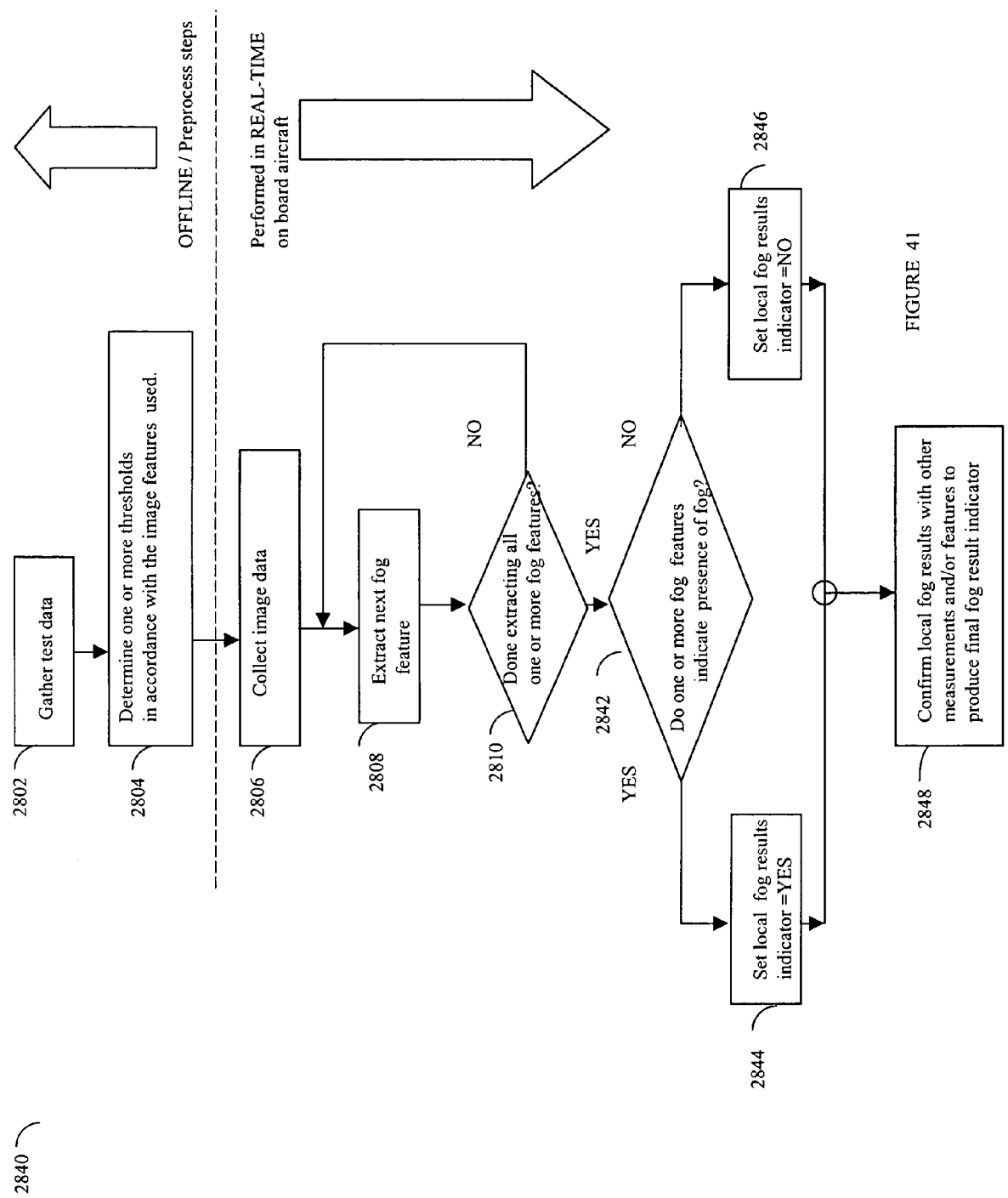
FIG. 41 is a flowchart of a third method of fog detection that may be included in an embodiment.

Referring now to FIG. 41, shown is a flowchart 2840 of processing steps of another embodiment that may be used in fog detection. Steps 2802, 2804, 2806, 2808, and 2810 are as described in connection with FIG. 38. At step 2842, a determination is made as to whether the one or more fog features indicate the presence of fog. If so, control proceeds to step 2844 to set a local fog results indicator to YES. Otherwise, control proceeds to step 2846 to set a local fog results indicator to NO. At step 2848, the local fog results are confirmed by combining the local results with other measurements and/or features to produce a final fog result indicator.

Figure 42:
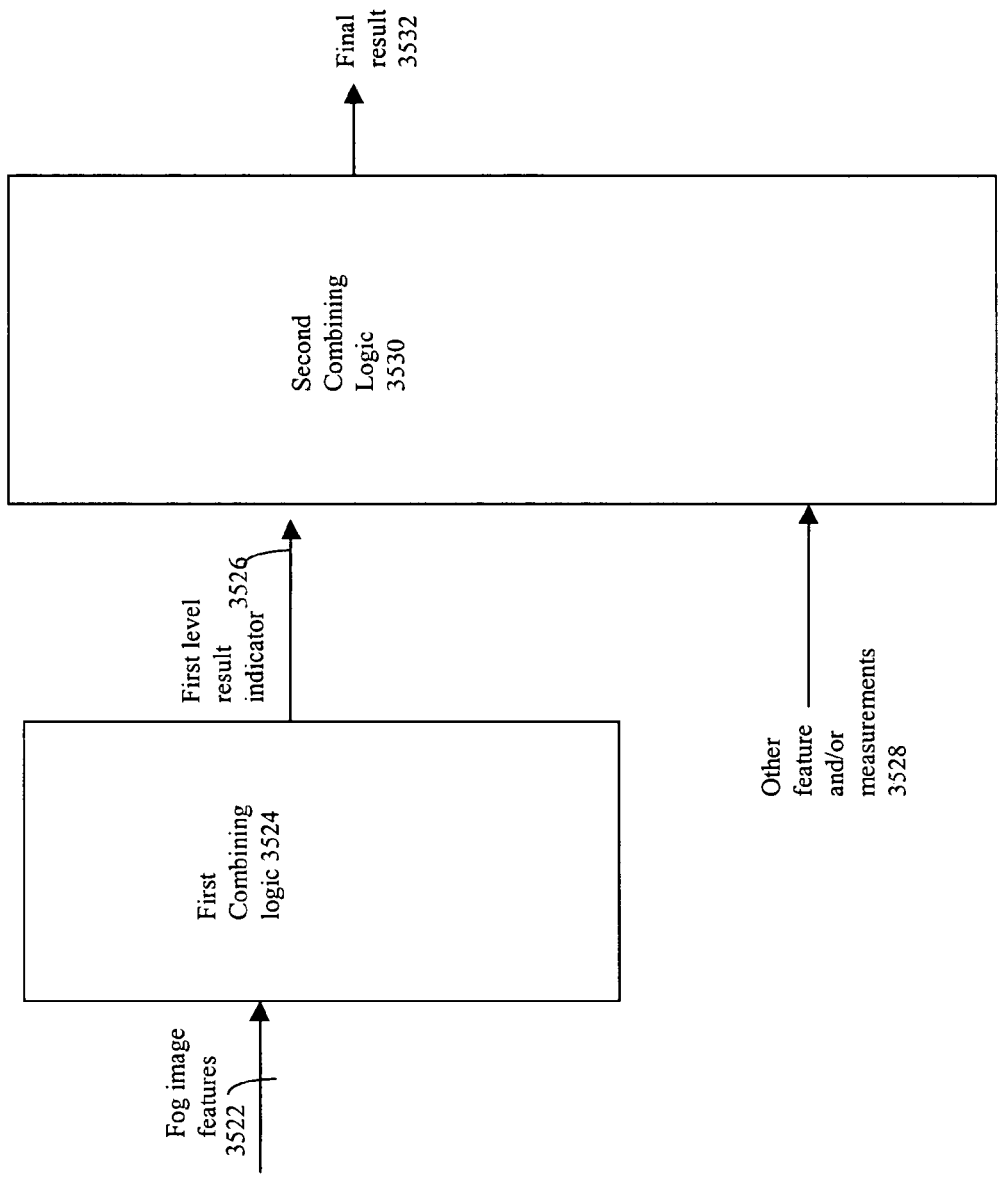
FIG. 42 is an example representation of the data flow of the method steps of FIG. 41.

Referring now to FIG. 42, shown is an embodiment 3520 representing the data flow of the processing steps of FIG. 41. The one or more fog image features 3522 are input to first combining logic 3524 producing as an output a first level result indicator 3526. Inputs to the second combining logic 3530 are the first level result indicator 3526 and one or more other features and/or measurements 3528. The second combining logic outputs a final result 3532. It should be noted that processing steps of FIG. 41 as shown in FIG. 42 may be used in implementing levels of logic such as may be used, for example, in confirming the results of previous combination logic levels. Although FIG. 42 shows only two levels, an embodiment may include more than 2 levels. FIG. 41 processing may be distinguished from the processing steps of FIG. 39 in that the various input features are combined in FIG. 41 in levels. In contrast, FIG. 39 provides a technique in which all inputs are described as illustrated in FIG. 40 at single level. Each of the different combining logics, such as 3524 and 3530, may be use the same or different techniques in accordance with the one or more inputs thereto.

It should be noted that the representations of FIGS. 40 and 42 may be used in embodiments of one or more fog detectors as described, for example, in connection with FIG. 37.

Described herein are techniques that may be used in connection with identifying features, such as image-related features, that may be associated with fog. The techniques described herein may be used in connection with analyzing an image, or portion(s) thereof, to look for global, uniform changes, rather than localized, non-uniform changes with respect to the image area of interest. In connection with one or more images, an embodiment using the foregoing techniques for fog detection may: determine if there is a simultaneous increase in intensity and a decrease in contrast, look for a decrease in sharpness, analyze spatial uniformity of change, and/or look for rapid formation and/or subsequent slow dispersal of fog. The foregoing also describes using image features in fog detection, for example, such as: use of the mean absolute deviation from the mean to measure dynamic range, use of the gradient norm or means of absolute gradient component to measure change of sharpness, use of the standard deviation of a change or difference image to measure uniformity, use of the mean absolute deviation of intensity change from its mean to measure uniformity, use of spatial moments of a change or difference image to measure uniformity, and use of moment quantities $M_{1,0}{}^{\alpha}$, $(t,\delta)$, $M_{0,1}{}^{\alpha}(t,\delta)$, $M_r{}^{\alpha}(t,\delta)$ with absolute index differences to measure uniformity of change.

In one embodiment of a system that performs fog and smoke detection using the techniques described herein, IR cameras are not utilized. It should be noted that an embodiment may include a subset of those included in FIG. 1. It should be noted that an embodiment used for fog and/or smoke detection may select not to exclude IR cameras since data obtained using the IR cameras is not suitable for use in smoke and/or fog detection.

In the foregoing system embodiment not including IR cameras, the positioning of the lights and the associated cameras for fog detection in this embodiment are located in opposite directions to let the light of each camera serve as a smoke detection device for the other opposing camera. This is described elsewhere herein as the opposite lighting view. Whenever smoke, dust, and the like, build in the space between the two opposing cameras, such as 114 and 115, the smoke, dust, and the like obscure the scene making the light of an opposite camera appear to dim. This dimming effect, as described and used herein, is a useful indicator of the presence of smoke and may be used by the system described herein to detect the presence of smoke. Placing the two cameras, such as 114 and 115, opposite each other with associated light sources maximizes the dimming effect for early smoke detection. The CCD cameras in this embodiment without including IR cameras measure and provide signals of Near Infra Red (NIR) light in each of the cargo bays. Any one or more of the CCD cameras may use a wide angle lens (e.g., 90 degrees) and the CCD cameras may have at least a 320 by 240 pixel resolution. In one embodiment, the CCD camera may have a resolution of 512×480 pixels and an optical wavelength response above approximately 770 nanometers. Such a wavelength response may be shaped via a low pass optical filter that blocks visible light at 30 dB attenuation at about 700 nanometers. It should be noted that the camera wavelength of about 770 nanometers and above should not limit the scope of the techniques described herein. In some instances when all or part of the visible light spectrum is made available for detection, the operational camera wavelength may include a portion of the visible light spectrum, all the visible light spectrum and/or NIR spectra. For example, a camera may detect wavelengths between approximately 400 and 1200 nanometers if the view of the bay is totally obscured, such as for example, when the cargo bay is full with cargo except for the gap space. The CCD camera in this embodiment may also detect temperatures above approximately 400 degrees centigrade. The LEDs in this embodiment may have an optical wavelength of around 880 nanometers.

As described herein, it should be noted that longer wavelengths may be preferred but may be limited in an embodiment in accordance with the range limitations of the particular CCD camera included in an embodiment. Lower temperature detection than those values specified herein is possible with CCD cameras that have a different detection range than as described in this particular embodiment.

In one embodiment of the system of without IR cameras which includes software operating in accordance with the data flow of FIG. 2, the image compensation routine 202 may receive external input values including a cargo bay temperature value that may be used to check for conditions in connection with fog formation as described herein. Other possible external values are described elsewhere herein. Additionally, the techniques described herein for HMM and/or multiscale modeling may also be omitted in this embodiment.

As described herein, an embodiment may use the feature data to confirm or deny a possible alarm as may be determined by a conventional smoke detector or other primary smoke detector. In other words, one or more features as described herein may be used in connection with reducing the possibility of false alarms detected by another smoke detection system or component.

The image compensation described herein may also include compensation for lens distortion, and preprocessing steps which may, for example, compensate for any noise and also improve the visual appearance of an image. In connection with fog as described herein, one method of foggy image enhancement is dynamic range stretching based on histogram equalization.

It should be noted that the expression of the energy function Ek, as described herein as the square sum of frame difference, may also be expressed in any one or more other ways such as, for example, the absolute value function, a linear combination of the pixel value and its surroundings, or other non-linear function. An embodiment may use, for example, fuzzy logic to process the energy indicator to detect characteristics indicative of fire. An embodiment may obtain data, such as through empirical testing, in accordance with various fire and non-fire conditions to create a knowledge base of data that may be used in any one or more techniques described herein.

An embodiment may implement the follow-on processing described herein using a fuzzy logic-based decision unit to differentiate between a true fire condition, such as smoke, and non-fire or false alarm conditions, such as fog.

The feature extraction routines described herein may extract features including, for example, distribution (i.e., standard deviation) of pixel intensity. The distribution of pixel intensity may be determined using any one or more conventional techniques such as, for example, measuring the deviation in intensity between the frame mean intensity and the frame pixels.

As described herein, wavelets may be used to generate features for use with non-stationary processes. This is in contrast to stationary processes including, for example, an instance of fast evolving fire events, and sudden fog formation. The multi-scale approach also described herein may be used, for example, in fusing data gathered by different sensors of different scales or resolutions. In some instances, cargo bay monitoring may require fusion of frames taken at different focus points such as may be the case of near range-focus when cargo containers are present and far range-focus when the cargo bay is empty. Frames collected at such different focus points may used in connection with a multiscale framework and technique as described herein. The multiscale technique may be used to provide a scale invariant interpretation of the information.

The PCA technique as described herein may be used in connection with classifying various aerosols, such as smoke and fog, by characterizing each aerosol by a profile showing the variation over time of the first (or respectively second) principal component (eigenvalue) versus the second (or respectively first) principal component. An approximation of this technique is to represent each class of aerosols by the profile showing average intensity (i.e., first order) versus the standard deviation (i.e., second order).

It should be noted that the cameras and associated lighting sources in an embodiment may be installed within a two-inch gap from the ceiling of a cargo bay. An aircraft cargo bay area may be full except for a two-inch gap space between the ceiling in the cargo bay area and the top of the cargo. Other arrangements may have a gap space of a different size than as described herein. As such, the images used herein may be obtained from one or more cameras and associated one or more light sources mounted in this two-inch gap from the ceiling of the bay area with a camera and an associated light source each mounted opposite one another at approximately the same height level. The camera and its opposing light source may be mounted opposite one another in this two inch gap directly across from one another. If the light starts to dim quickly, as may be determined by analyzing the image obtained with a camera over time, this may be used as a feature that indicates the presence of smoke.

It should be noted that the distance between the camera and its associated light source may represent a maximum distance between any two opposing positions within the cargo bay area.

Figure 43:
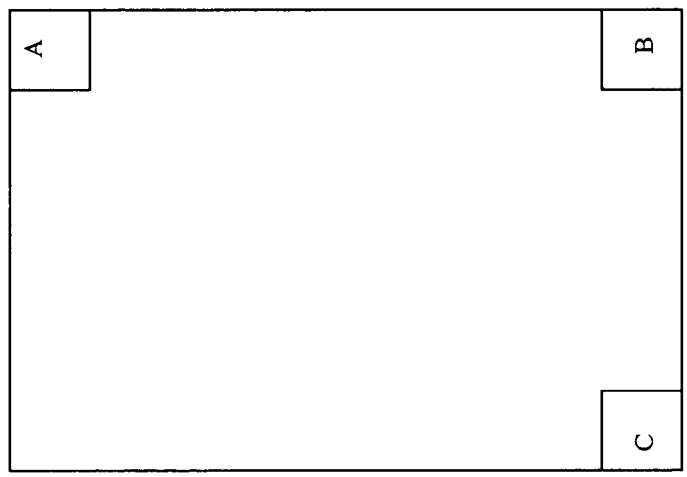
FIG. 43 is an example of an embodiment of a rectangular-shaped cargo bay area.

Referring now to FIG. 43, shown is an example of a rectangular shaped cargo bay area that may be monitored. Shown in the cargo bay area 4500 are positions A, B, and C. An embodiment may position a camera and its opposing light source at positions A and B rather than, for example, at positions B and C.

As described herein, an embodiment may include CCD cameras with different characteristics. An embodiment may include one or more CCD cameras that are NIR CCD cameras with an operational wavelength between 770 and 1000 nanometers. An embodiment may also include CCD cameras that may be characterized as conventional CCD cameras having an operational wavelength between approximately 400 and 1200 nanometers. These conventional CCD cameras may be used when the cargo bay area, or other viewing area, is obscured, such as, when the area is filled with cargo, or nearly so, except for the two-inch ceiling gap. An embodiment may also utilize one or more CCD cameras with an operational wavelength between approximately 400 and 1200 nanometers with one or more portions of the range of approximately 400 to 1200 nanometers blocked or excluded in accordance with a particular device, light source, and the like, emitting at particular portions of the range of approximately 400 to 1200 nanometers. This exclusion may be performed by using one or more filters in accordance with the particular range to be excluded.

It should be noted that an embodiment may use components having different particulars than as described herein for different components, such as the camera types, sizes, ranges, and the like. The specifics set forth herein should not be construed as a limitation of the techniques and system described herein. For example, a CCD camera may be used in one embodiment having the specific camera characteristics described herein as related to, for example, wavelength range of sensitivity between approximately 400 and 1000 nanometers, a pixel resolution of 320 by 240, frame rate of 30 frames per second, and the like. An embodiment may also be include a CCD camera having different characteristics than as described herein such as, for example, a frame rate of 25 frames per second or an open frame rate, and the ability to detect temperatures above approximately 700K due, at least in part, to the wavelength response thereof. An embodiment may also use different types of cameras including, for example, a line scan camera in addition to, or instead of, other camera types described herein.

An embodiment may also distribute processing tasks between components than as described herein, such as in connection with FIG. 1. This may vary in accordance with the particular hardware with each embodiment as well as the particular design of a system utilizing the techniques described herein. For example, referring to FIG. 1, the processing of tasks may be distributed between the CVCU as well as among one or more other components, such as the cameras. This may depend on factors such as whether cameras include on-board processing capabilities. This just one example of a system using the techniques described herein may be implemented. Aircraft data, such as, for example, temperature used in processing described herein, may come from one or more different sources and/or a central unit, such as the central maintenance system 176 described herein.

What will now be described are techniques that may be used with detecting and discriminating smoke based on shrinking and growing brightness regions of one or more images. The techniques described herein may be used in one embodiment using CCD cameras and switching light units as may be used in a cargo fire verification system (CFVS), described elsewhere herein, for detection and verification of fire in an aircraft cargo bay. A CFVS is described, for example, in connection with FIG. 1. CFVS may be used to reduce the rate of false alarms issued by the conventional smoke detection systems installed in majority of commercial aircraft. In one embodiment, the CCD cameras receive NIR (near infrared) light from the illumination units controlled by the system's control unit. By appropriately switching the illumination units, different illumination scenarios are obtained. This allows detecting of various visual effects in images associated with those illumination schemes. The data fusion techniques, also described elsewhere herein, may be used to combine evidence about aerosol presence obtained from those images. This allows faster and more reliable aerosol detection and discrimination so that the presence of smoke may be detected.

Described in following paragraphs are techniques that may be used in connection with an image processing feature for smoke detection. The feature may be characterized as local since it is built on a pixel by pixel analysis rather than on global analysis of the frame as a whole. Other techniques may use global features, such as the average frame intensity and average frame motion and their standard deviations, which characterize the frame as a whole. Although such global analysis may be computationally efficient and used in some instances, such global analysis and characteristics/features related thereto, may not be adequate in some cases where only a small group of pixels are affected. In addition the feature described herein may be characterized as robust with respect to vibration and does not require a reference frame for processing. The technique looks for connected (i.e. non-isolated) pixels above certain thresholds. The connectivity as used with this technique relates to pixels greater than a brightness threshold or intensity of interest. The technique described herein uses the additional property of connectedness of pixels under test in a segment-based image processing approach. It should be noted that considering only pixels with certain intensity descriptors, without being coupled with connectedness or connectivity, may be misleading in a noisy environment (e.g. hot environment, camera artifacts, and the like).

For a pixel to be characterized as non-isolated as used herein, the pixel is connected to n (with n being greater or equal to 1) neighboring pixels. Thus, for a pixel to satisfy the connection condition, it must be greater than a threshold intensity and also connected to a predefined number of neighboring pixels n which are also above the threshold intensity.

What will now be described are different types of connectivity that may be used in describing a pixel neighborhood. These may include, for example, the 4-pixel and the 8-pixel types of connectivity, and extensions or variations of the foregoing 2 types.

Figure 44:
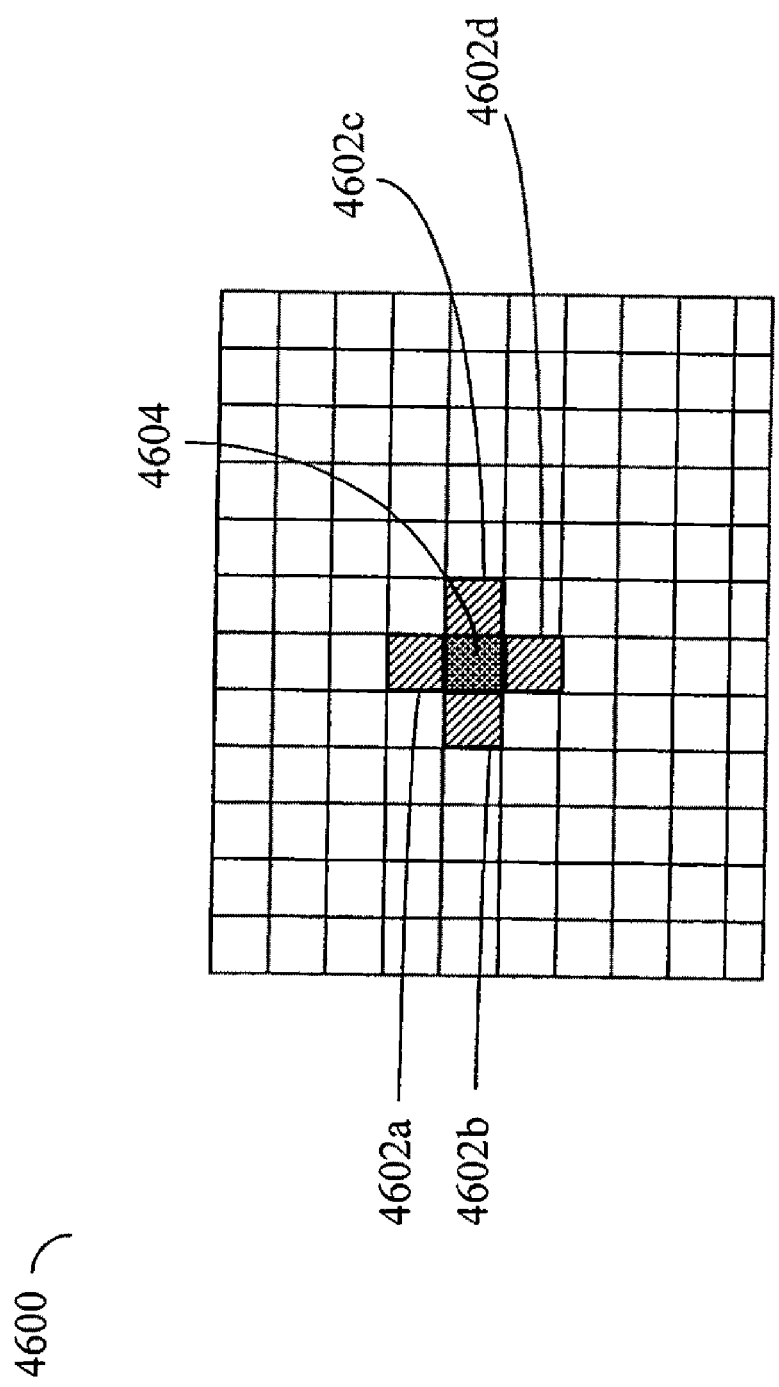
FIGS. 44, 45A, 45B and 45C are examples of embodiment of different pixel connectivities.

Referring now to FIG. 44, shown is a representation 4600 of a 4-pixel connectivity. The pixel under consideration for which connectivity is being determined is 4604. Pixel positions considered for the 4-pixel connectivity are the 4 pixels denoted as 4602a-4602d.

Figure 45A:
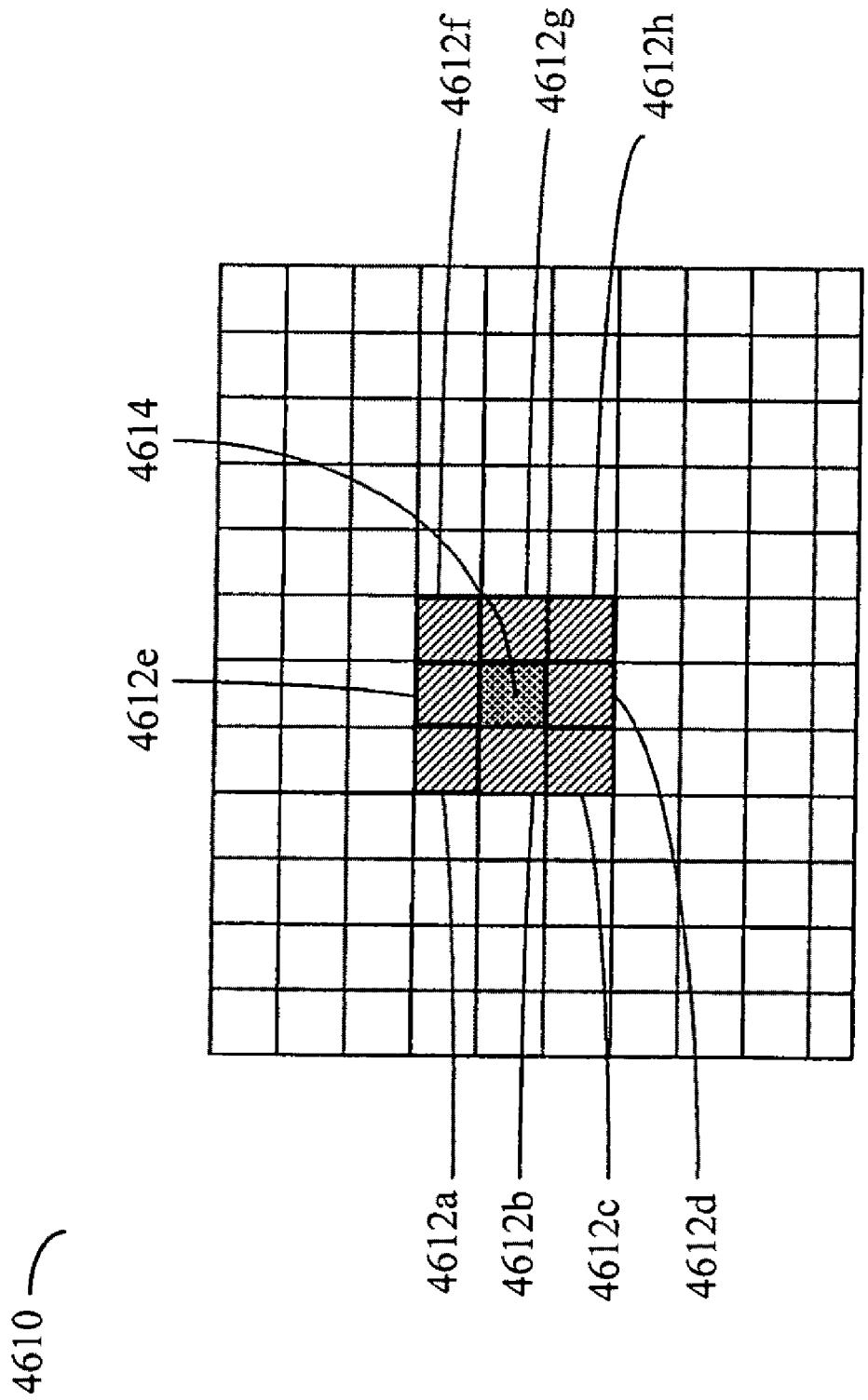

Referring now to FIG. 45A, shown is a representation 4610 of an 8-pixel connectivity. The pixel under consideration for which connectivity is being determined is 4614. Pixel positions considered for the 8-pixel connectivity are the 4 pixels denoted as 4612a-4612h.

Note that the 4-pixel connectivity may be characterized as a stronger connectivity than that as represented by the 8-pixel type. In the foregoing, the center pixel is the pixel of interest. In the 8-pixel connectivity representation, the 4 pixels located at the corners of the pixel of interest (4612a, 4612c, 4612f, and 4612h) may be characterized as representing "weaker" connectivity of the pixel under processing with respect to the other 4 pixels.

Another possible type of connectivity that may used in an embodiment may be characterized as variations based on the foregoing 4-pixel and 8-pixel connectivities in which other pixels of outer layers are required to be above the threshold intensity in addition to specified adjacent pixels.

Figure 45B:
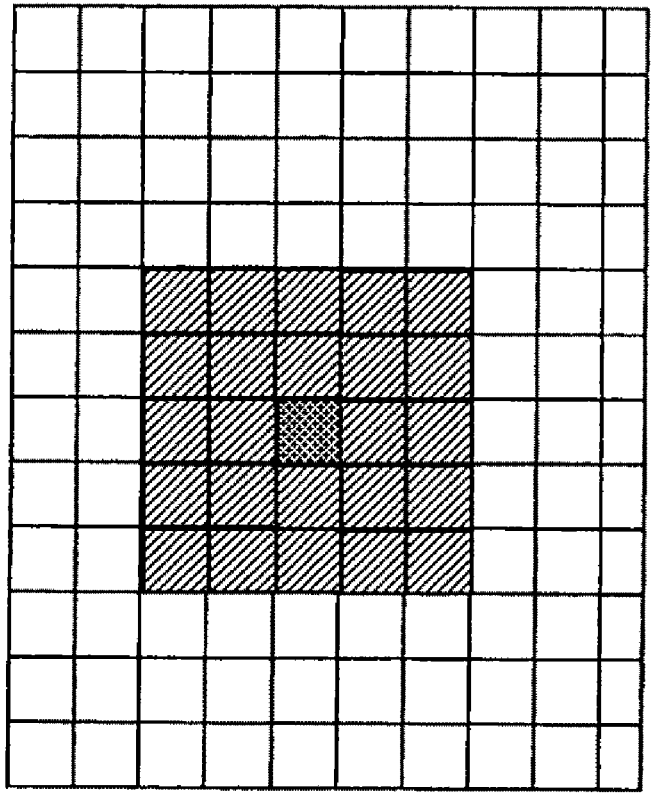

Referring now to FIG. 45B, shown is an example 4620 of another connectivity that may be used in an embodiment. The illustration 4620 may be characterized as an extension of the 8-pixel connectivity type in which the connectivity is extended to a next outer layer of pixels with respect to the pixel of interest.

Figure 45C:
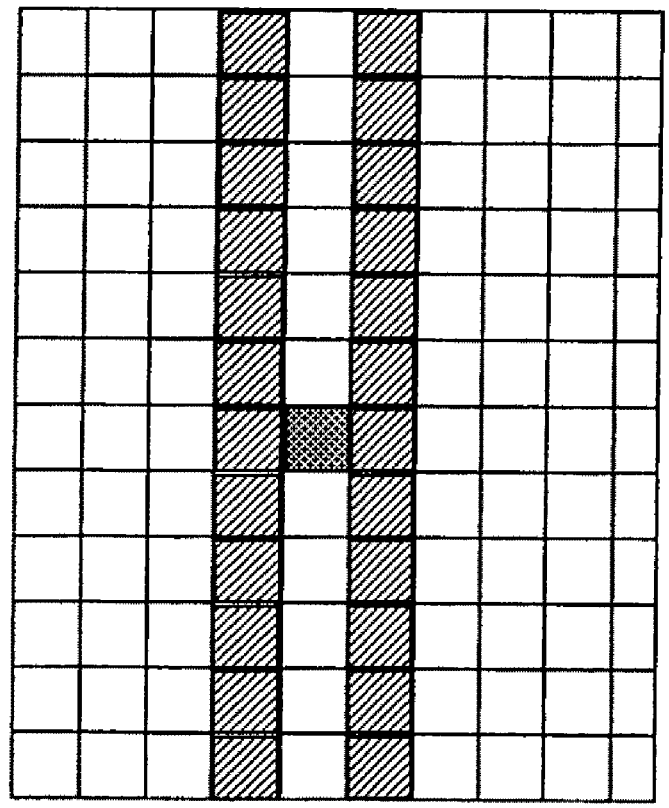

Referring now to FIG. 45C shown is an example 4630 of another connectivity that may be used in an embodiment. The illustration 4630 may be characterized as a horizontally-oriented connectivity. Other types of connectivity may include, for example vertically-oriented connectivity, shape-specific connectivity (e.g., connectivity in the form of a square, triangle, rectangle), and the like, to emphasize certain properties of the data under analysis. For example, a rectangular shape as shown in 4630 may be used to focus on motion along a horizontal line.

In one embodiment, the techniques described herein may be used to detect and "quantify" the shrinking of bright regions of arbitrary shapes due to smoke (or other similar aerosols). In particular, the occurrence of a dimming of the opposite camera light may be used in connection with this feature. One feature described in following paragraphs is a number of bright and connected pixels associated with a frame, or a portion thereof. By comparing at different points in time the number of bright and connected pixels of a connected bright region selected in accordance with predetermined conditions, as described in more detail in following paragraphs, a smoke condition may be detected as the size of a connected bright region shrinks.

Figure 46:
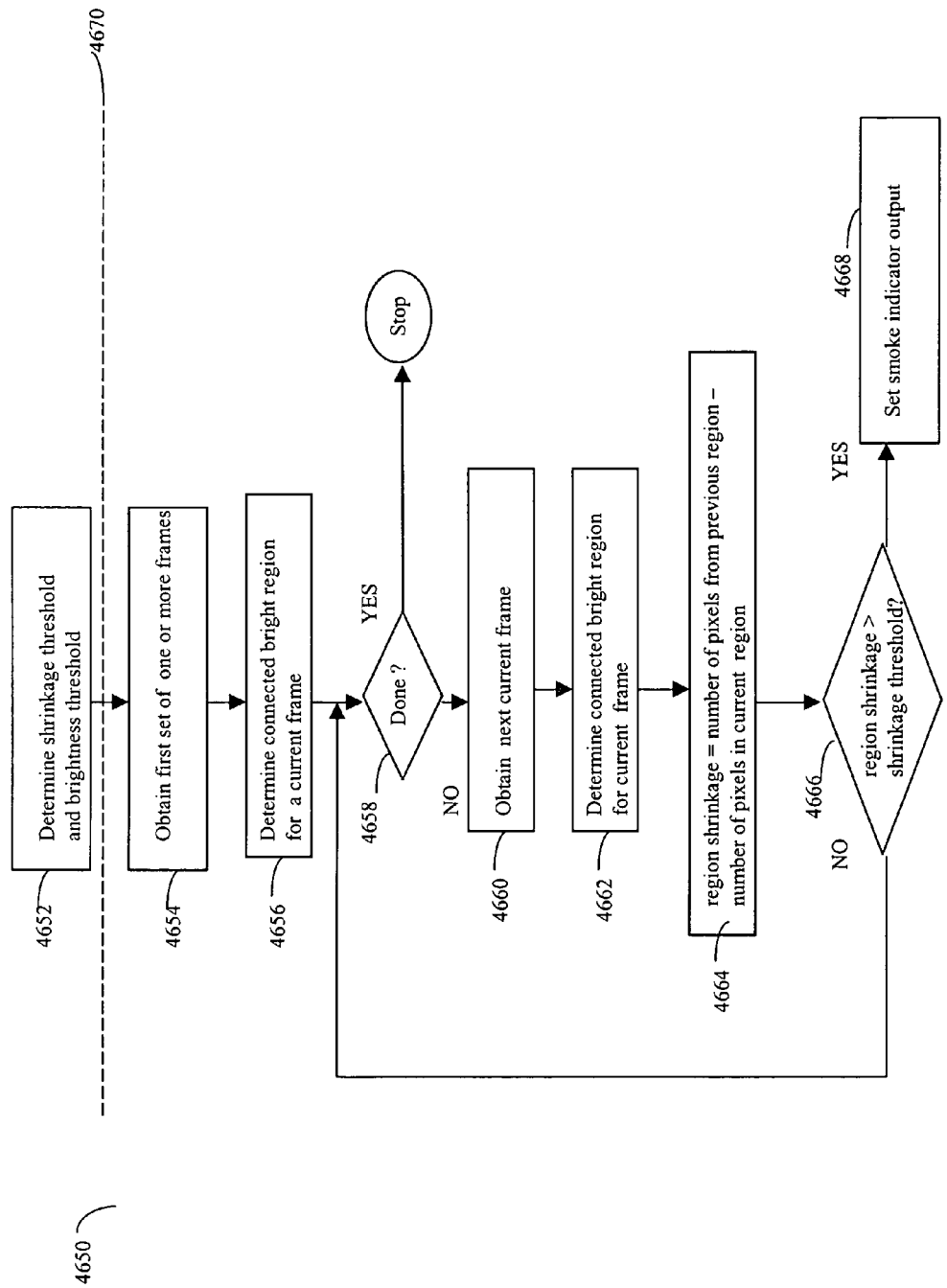
FIG. 46 is a flowchart of steps of one embodiment for detection of smoke.

Referring now to FIG. 46, shown is a flowchart 4650 of processing steps of one embodiment for detection of smoke. It should be noted that, as described elsewhere herein, the smoke indicator produced as an output of the processing steps of 4650 may be used in many different arrangements in an embodiment. The smoke indicator output of step 4668 may be used, for example, as a single input or may be combined with other indicator results, such as using data fusion, to produce a system level smoke indicator and/or fire condition indicator. The smoke indicator may be used as a verification for a conventional or other fire detection system.

At step 4652, a shrinkage threshold and a brightness threshold are determined. In one embodiment, these values may be determined off-line prior to running the smoke detection system for smoke and fire detection. The shrinkage threshold may be characterized as a threshold value representing a difference of a number of pixels in a connected bright region determined with respect to two different points in time. In other words, the number of pixels in a connected bright region is determined at a first point in time and again at a second point in time. The difference between the number of pixels at each point in time is determined and compared in subsequent processing steps to the shrinkage threshold. An embodiment may consider one particular case of interest when the "previous" frame is the reference frame taken at time zero. Thus, in this instance, the difference between the number of connected and bright (i.e. above the threshold) pixels at the current frame and the original number (i.e. at time zero) of connected and bright pixels constitutes the quantity of "shrinkage". The reference frame could be fixed and held unchangeable at the system memory or could be updated according to a certain scheme that takes in consideration various flight properties. Such flight properties may include, for example, stationary (i.e. long time) variations of the scene or the camera properties, air/ground status, door open/closed status, whether a fire event had happened, or whether a fire extinguisher was deployed. When the difference is above the threshold, a smoke indicator output is set. The brightness threshold represents a pixel intensity threshold level used in determining a minimum level of pixel intensity for inclusion in a connected bright region. As described elsewhere herein, the region shrinkage may be determined using one or more different features based on the number of pixels determined for a connected bright region.

It should be noted that although step 4652 may be performed off-line in an embodiment prior to utilizing the smoke detection techniques described herein for real-time fire/smoke detection, an embodiment may also perform this step 4652 at other times. An embodiment may use empirical testing and determination and general know how in accordance with different testing conditions to determine these values. Different techniques and considerations that may be used in connection determining these and other threshold values are described elsewhere herein in more detail.

Steps subsequent to step 4652 may be performed when the techniques described herein are used in data gathering and analysis for smoke and fire detection.

At step 4654, a first set of one or more frames may be obtained to establish a reference frame. At step 4656, the connected bright region is determined for the current frame. This is described in more detail elsewhere herein. At step 4658, a determination is made as to whether smoke detection and processing using the techniques of flowchart 4650 is complete. If so, processing stops. Otherwise, control proceeds to step 4660 to obtain another frame for which a connected bright region is determined at step 4662.

At step 4664, region shrinkage is determined. In one embodiment, this may be determined as the difference of the number of pixels in a connected bright region as determined at two different points in time. Other parameters that may be used in an embodiment to determine region shrinkage are described elsewhere herein. At step 4666, a determination is made as to whether the region shrinkage is greater than the shrinkage threshold. If so, control proceeds to step 4668 where a smoke indicator may be set as an output. Otherwise, control proceeds to step 4658 where a determination is made as to whether processing is complete. If not, processing continues with the next set of image data.

In one embodiment, a function may be used to determine the number of bright and connected pixels associated with a first set of image data. It should be noted that an embodiment may use, for example, an entire frame of image data or a portion of a frame in determining the number of bright and connected pixels. An embodiment may compare the same test regions for different frames.

Figure 47:
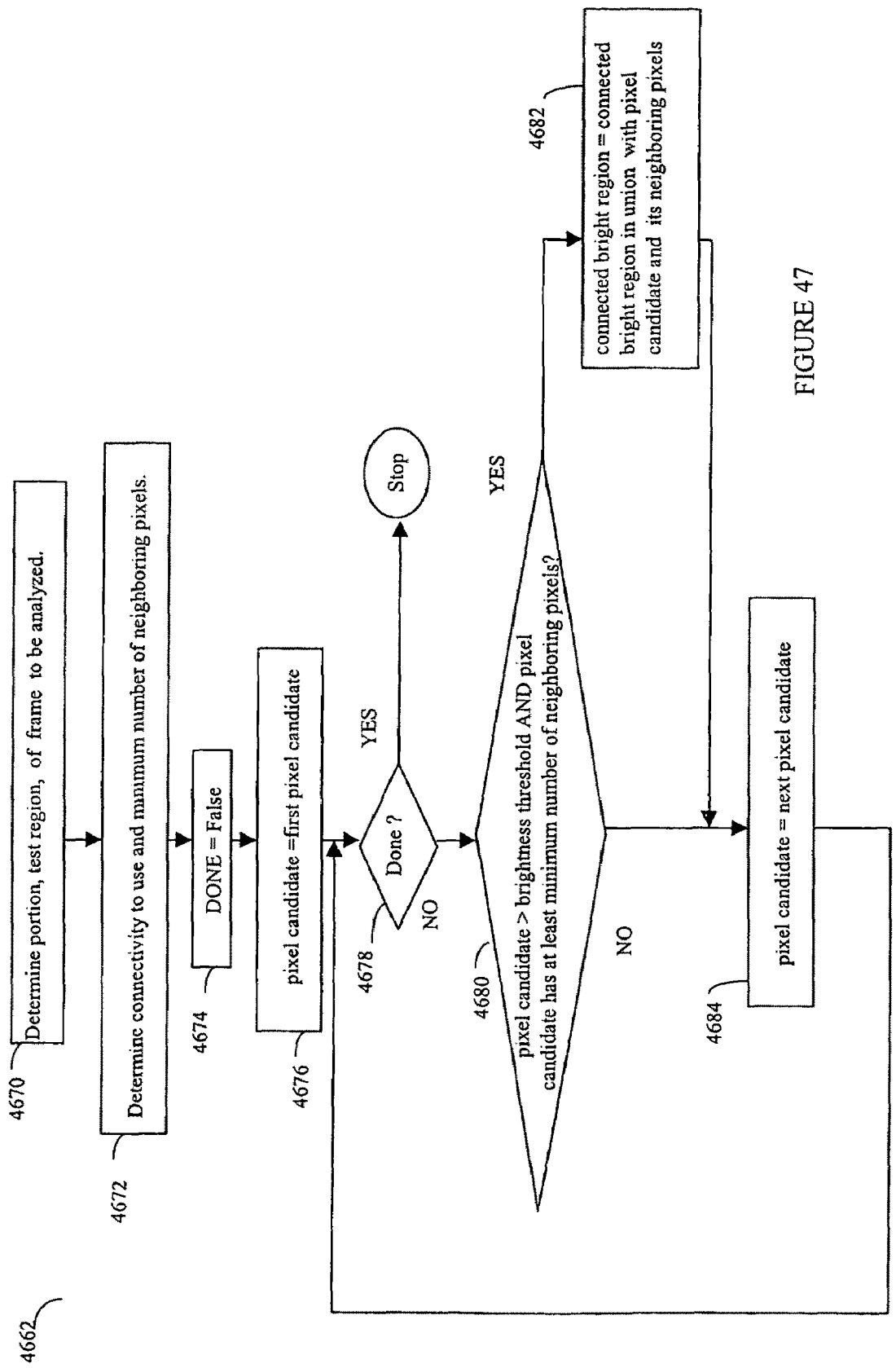
FIG. 47 is a flowchart of steps of one embodiment for determining a connected bright region.

Referring now to FIG. 47, shown is a flowchart 4662 of processing steps of one embodiment for determining a connected bright region for a set or frame of image data.

This flowchart describes in more detail the processing associated with step 4662 and step 4656 of flowchart 4650. At step 4670, the test region to be analyzed is determined. The test region may be the entire frame, or a portion thereof. Different techniques for selecting a portion of a frame are described in more detail elsewhere herein.

At step 4672, a connectivity value and a minimum number of neighboring pixels value is selected. The connectivity value may be 4 or 8 indicating, respectively, whether the 4-pixel or 8-pixel connectivity is used. The minimum number of neighboring pixels indicates the minimum number of pixels with respect to a pixel of interest that are both connected to the pixel of interest and are above the pixel brightness or intensity threshold as may be determined at, for example step 4652 processing. The minimum number of neighboring pixels is a value between 1 and the "connectivity value".

At step 4674, a boolean flag DONE is initially set to false. At step 4676, the pixel candidate is assigned the first pixel candidate. Pixel candidate selection is also described in more detail in following paragraphs. At step 4678, a determination is made as to whether processing of the test region is complete. If so, processing stops. Otherwise, control proceeds to step 4680 where a determination is made as to whether the pixel candidate has a brightness or intensity greater than the brightness threshold and also has at least the minimum number of connected neighboring pixels also greater than the brightness threshold. If so, control proceeds to step 4682 where the pixel candidate and its neighboring pixels are added to the connected bright region. It should be noted that pixels outside the test region may be used as neighboring pixels in determining whether a pixel under consideration within the test region should be included in the connected bright region. For example, a pixel candidate may be located in the uppermost left corner of a test region. Pixels outside the test region are used in determining a number of neighboring pixels of the pixel candidate. However, only pixels in the test region in this embodiment may be included in the connected bright region.

It should also be noted that an embodiment may determine a connected bright region at step 4682 to include only the pixel candidate of interest rather than also include the neighboring pixels. For example, an embodiment may also use a variation of what is described at step 4682 represented as follows:

region=region UNION pixel candidate, if pixel candidate>brightness threshold, AND is connected with min number of neighbors in this frame AND is included in region for K other previous consecutive (or otherwise) frames.

The foregoing variation does not require retaining the previous frames on the memory. The approach represented in FIG. 47 may be characterized as more robust with respect to noise and may be preferred in use with other techniques, such as, for example, with hotspot detection as described elsewhere herein.

Control proceeds to step 4684 either after execution of step 4682, or directly upon determining the pixel candidate does not meet the test condition(s) at step 4680. At step 4684, the next pixel candidate is determined and processing continues with subsequent pixel candidates to determine the connected bright region associate with the current set of image data, or portion thereof, until processing of the current test region is complete.

In connection with step 4670 processing for determining the test region to be analyzed for a current set of image data, an embodiment may use any one or more techniques. An embodiment may use an entire frame as the test region. An embodiment may also use a portion of a frame or set of image data. In one embodiment, the region may be determined in accordance with the projection area of the opposite camera lighting physical coordinates.

What will now be described are processing steps of one embodiment for determining a portion of an image frame to be used as the test region.

Figure 48:
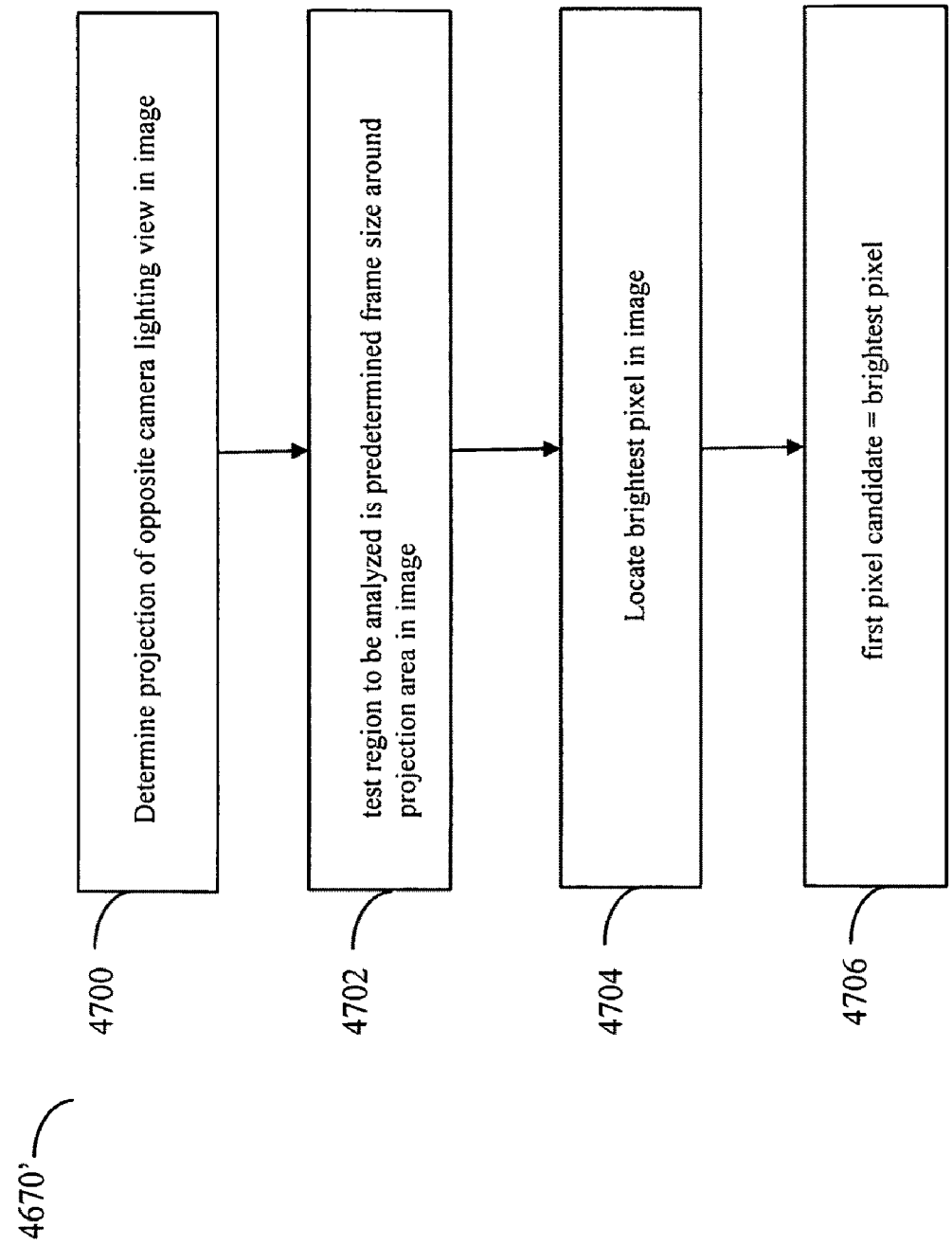
FIG. 48 is a flowchart of processing steps of one embodiment for determining a test region using the opposite camera light.

Referring now to FIG. 48, shown is a flowchart 4670' of processing steps of one embodiment for determining a test region using the opposite camera light. At step 4700, the opposite camera lighting view is examined at a time 0, for example, prior to use in smoke detection. The projection in the image plane of the opposite camera light is determined. A rectangular framing of the image plane may be performed at step 4702 to capture the portion of the image including the light. It is within this portion of the image that changes may be observed of the recorded image of the projected light source in the event of smoke. Accordingly, the analysis of a connected bright region is performed in one embodiment with respect to the portion of the image including this opposite camera light projection view. At step 4704, the brightest pixel in the test region may be selected and used, at step 4706, as the first pixel candidate in flowchart 4662 processing. Subsequent pixel candidates are selected in this embodiment by sweeping through the remaining pixels in the test region have not been considered as pixel candidates in a row by row, or column by column fashion. Other embodiments may use other techniques for considering each pixel within the test region as a pixel candidate and making a determination as to whether the pixel meets the specified brightness threshold and connectivity criteria.

It should be noted that the foregoing processing steps in one embodiment are based on the condition that the opposite lighting source is the only lighting source present. An embodiment may also performing filtering and use other techniques to mask out or account for other unwanted light sources for the purpose of this analysis. Additional light sources may be known or fixed, for example, as part of an initial condition such as a constant background or external light source. For example, a cargo door may be open and generate an additional external light source. The techniques described herein may be used to monitor the cargo bay area for fire detection when on the ground, for example, with cargo being loaded or unloaded. By taking into account the initial condition of all external light sources in addition to the opposite lighting source, the techniques and system described herein may be used at times other than when in flight or without having the opposite camera light be the only light source. It should also be noted that the techniques described herein are not limited for use in a cargo bay. They may also be used in connection with monitoring other areas, such as storage areas, and the like.

An embodiment may also use other techniques in connection with determining the test region. The foregoing processing of FIG. 48 uses a priori information of the opposite camera position. This information may not be available or used in an embodiment, for example, due to constant changing lighting arrangements. An embodiment may also select another fixed portion of the image frame for analysis. An embodiment may also use the entire frame of pixels and sweep the entire image, pixel by pixel, until the connected bright region is detected.

Figure 49:
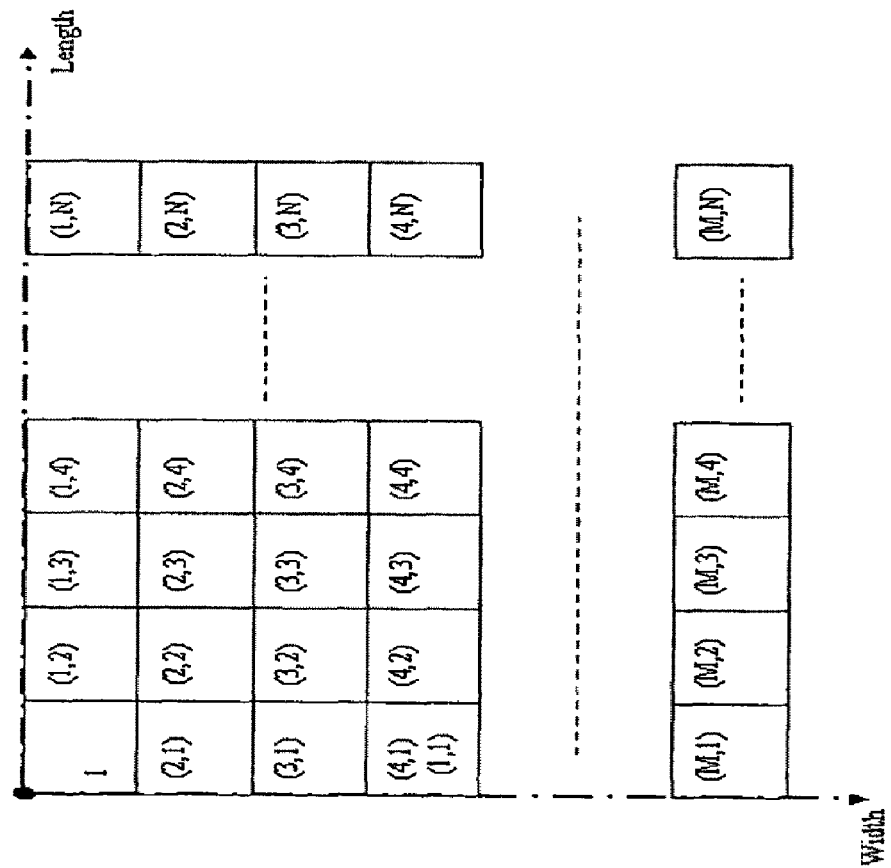
FIGS. 49-50 are representations of an image frame in a coordinate system.

Referring now to FIG. 49, shown is a representation 4720 of an image frame in a coordinate system. In this representation, the frame is treated as a grid of discrete elements (i.e. pixels) ordered from top to bottom and from left to right as illustrated in an M (number of rows) by N (number of columns) frame. In one embodiment, what will now be described is how a pixel candidates may be determined using a "sweeping" process through the foregoing representation for a test region. The steps in following paragraphs describe a "sweeping" process that may be used more generally in an embodiment whenever accessing a rectangular area of pixels—including the whole frame. In one embodiment, the sweeping may be performed using a double loop sweeping through each row of the test region. Consider, for instance, the case of a rectangular region characterized by two points containing the coordinates of the upper left corner (Mo,No) and lower right corner (M1,N1). Pixels of such rectangle may then be accessed as expressed by the following pseudo code-like representation:

```
while next candidate is not FOUND do
{m = Mo : M1 {n = No : N1
    if P(m,n) > brightness threshold and has not been considered as a
    pixel candidate;
        then
            return pixel (m,n) as a pixel candidate;
        else n = n+1
    }
    m = m+1
}
```

In the foregoing example, for a pixel coordinate (m,n), the first component, m, (the width or row) increases, while the second component (length or column) increases to the right.

Figure 50:
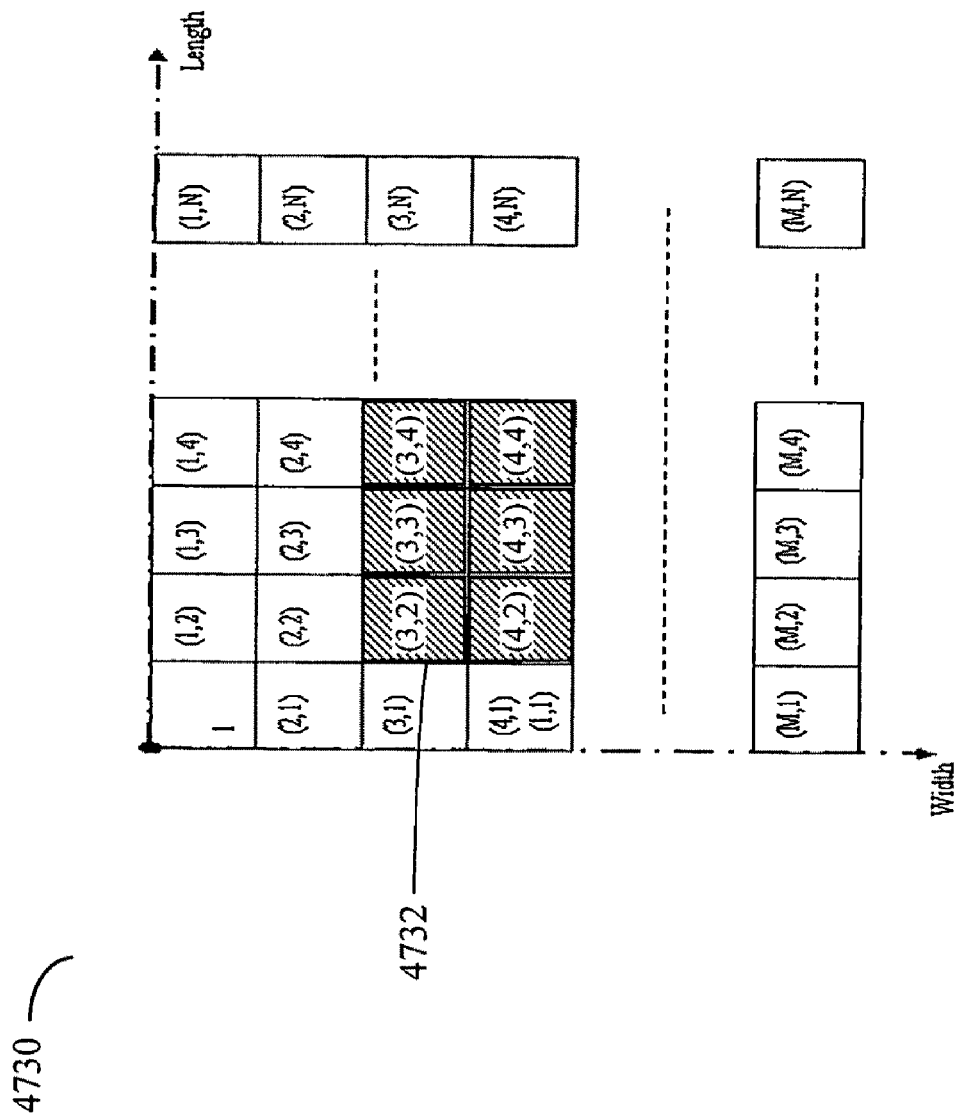

Pixel coordinates are integers between l and the frame size. To further illustrate the foregoing with reference to FIG. 50, for example, a goal is to look for pixel candidates as pixels of interest in the rectangular portion 4732. Pixels in the test region 4732 may be accessed beginning with the indices cycling through each row. It should be noted that an embodiment may also sweep through the test region in a column like or other fashion. It should also be noted that the foregoing processing steps may use any one or more of a variety of different data structures in accordance with the particular technique used to examine each pixel in the test region to indicate that a particular pixel has already been considered as a pixel candidate. For example, a pixel in the test region may not be above the brightness threshold and excluded from further consideration if an embodiment first determines, for each pixel in the test region, whether the pixel is above the brightness threshold.

As described herein, an embodiment may monitor at each new frame, or selected frame intervals, the number of non-isolated pixels and use this as part of a feature to be used in smoke detection. An embodiment may including a function for computing the number of "bright and connected" pixels having the following interface:

ShrinkingRegion(TestRegion Threshold, Connectivity, MinimumNeighboringPixels)

In one embodiment of this function, inputs are:
1. TestRegion: the set of pixels to be processed
2. BrightnessThreshold: the minimum pixel-value to be considered for inclusion. In one embodiment, a default may be used which is the mean value of the region, as indicated by the parameter TestRegion, to be processed.
3. Connectivity: neighboring pixels: either 4 or 8; the default is 8
4. MinimumNeighboringPixels: a number between 1 and "connectivity" indicating the minimum number of neighboring pixels to the pixel of interest that should be considered for inclusion. In one embodiment, a default value of 1 may be used.

An embodiment of the foregoing function may be:
a) Applied only to the region of interest. In one embodiment, the region of interest maybe, for example, the upper quarter of the frame where the 2-inch, or other size, gap located at the top of a cargo bay area is included.
b) Applied to every other pixel of a frame, or portion thereof, horizontally as well as vertically. This may be used to reduce the computation complexity even further by a factor of 4. An embodiment utilizing this step b) may prefer to select a connectivity value of 8.

It should be noted that an embodiment may use one or both of the foregoing steps a) and b).

Prior to invoking the foregoing function, a brightness threshold, as indicated by the Brightness Threshold input parameter above and as used in step 4652 of FIG. 46, may be established. As described elsewhere herein, determining the brightness threshold is a task that can be done offline.

Figure 51:
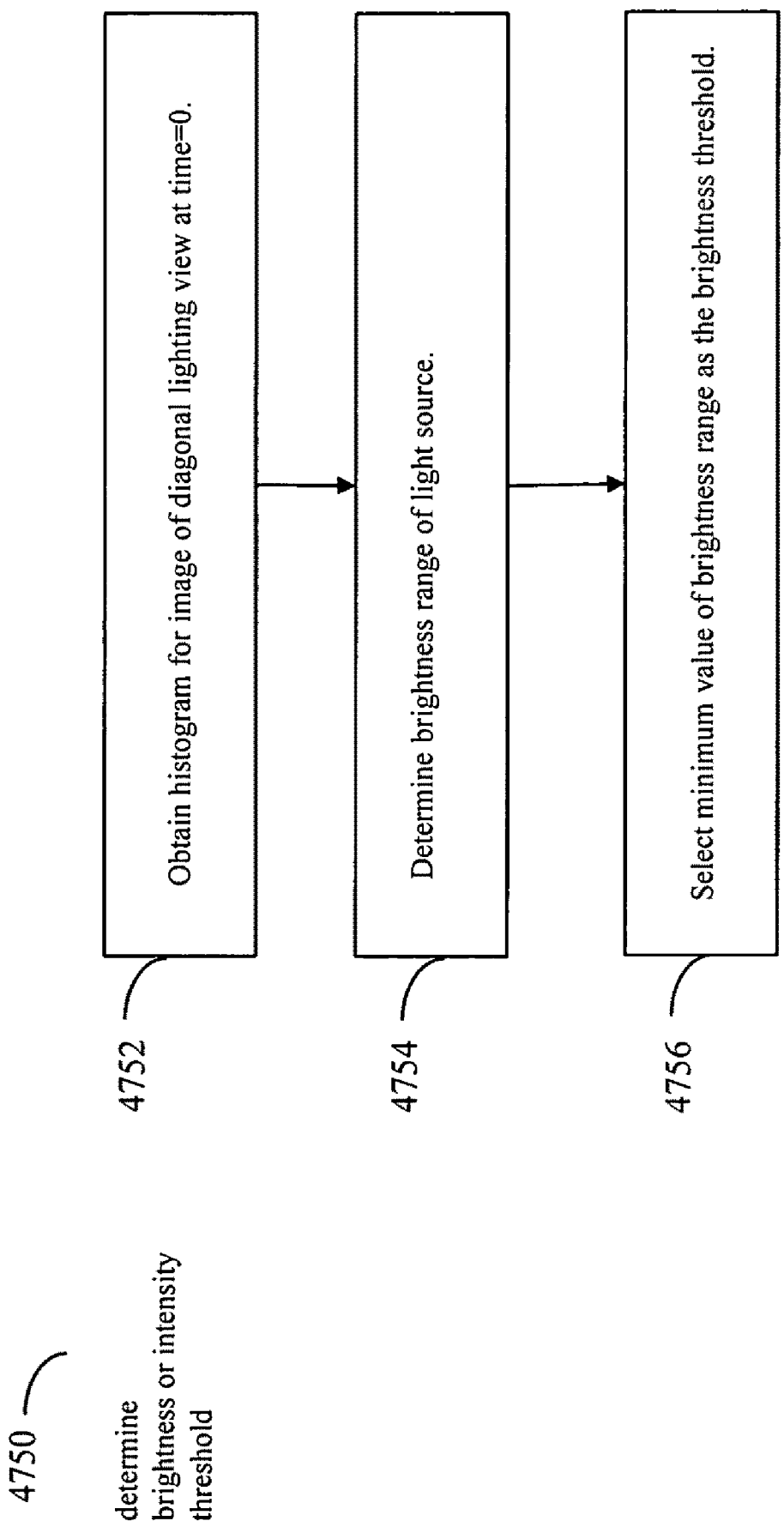
FIG. 51 is a flowchart of processing steps of one embodiment for determining brightness or intensity threshold.

Referring now to FIG. 51, shown is a flowchart of processing steps of one embodiment for determining the brightness or intensity threshold in which the histogram of grey scale values of the initial opposite lighting view is examined. An image may be obtained offline prior to use of the techniques described herein in connection with smoke detection. The image of an opposite camera lighting view and its associated image histogram may be obtained as in step 4752. The histogram may list the different pixel grey level intensities and the number of pixels having that particular grey scale value. Using this distribution, the brightness range as may be associated with the opposite camera light is determined at step 4754. At step 4756, an embodiment may select the minimum value of the brightness range as the brightness threshold. It should be noted that other embodiments may select other values as the brightness threshold and use other techniques than as described herein.

Figure 52:
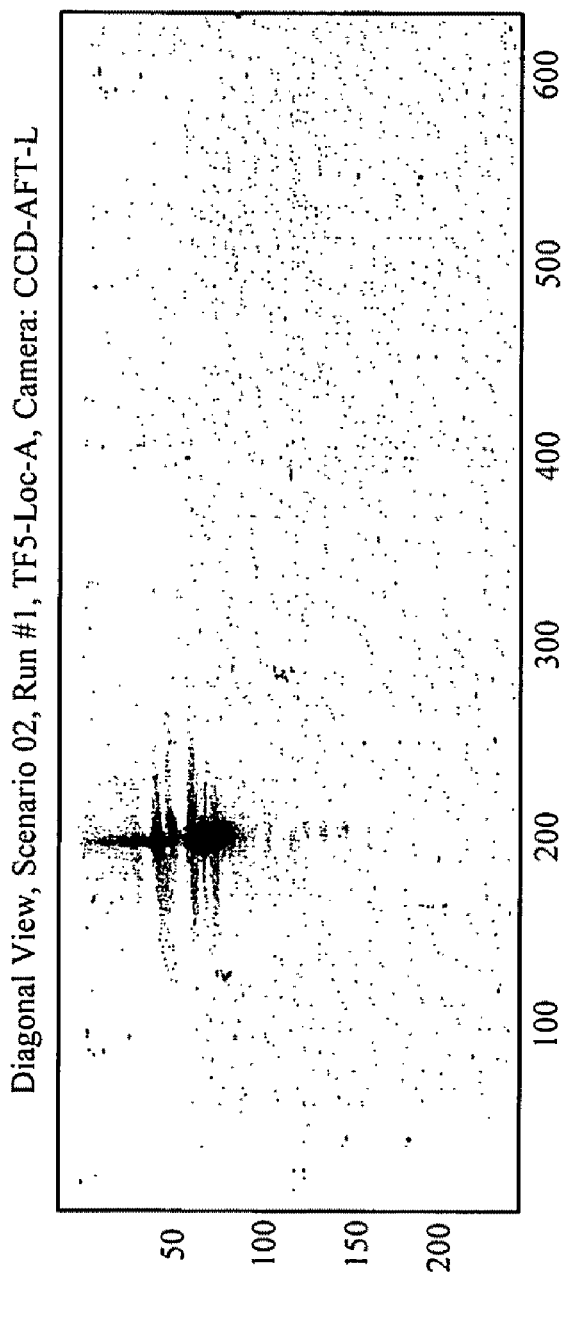
FIG. 52 is an illustration of an image frame obtained with the opposite lighting view.
Figure 53:
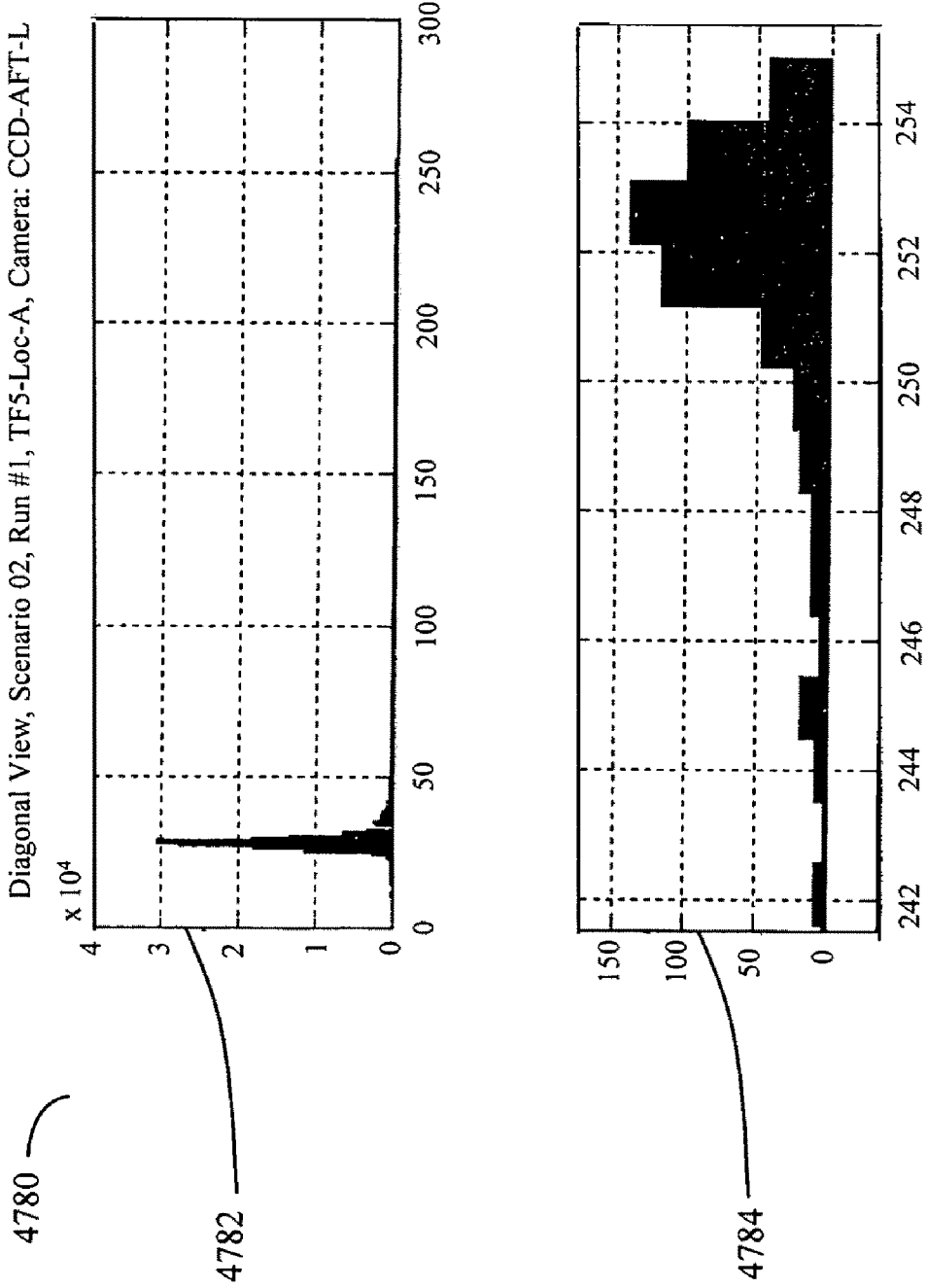
FIG. 53 is an illustration of histograms of grey level distribution.

The processing steps of FIG. 51 will now be illustrated with respect to an image and its associated histogram. Referring now to FIG. 52, shown is an illustration 4770 of an image frame obtained using an opposite lighting view. Referring now to FIG. 53, the histogram 4782 illustrates the grey level distribution in accordance with the number of pixels with the grey level values. On the X axis is the grey level value and the number of pixels indicated on the Y axis. The histogram 4784 is a zoom-in view of a portion of the histogram 4782 of the bright pixels, representing the opposite light having a range of 240 to 255 gray levels such that the brightness threshold in an embodiment may be set at 240 in this instance.

Referring to 4782, it should be noted that a majority of pixels (i.e. black) are in the camera noise level of 20 to 40 gray levels. The large difference between the pixels of interest of the opposite light source in this example and the grey level values of the background camera "noise" in that particular example indicates that the technique described herein may be characterized as more robust when there may be different types of noise, such as with ambient temperature and dust. This difference between the two spikes in the histograms below indicates a relatively large amount of tolerance in setting the brightness threshold to filter out various uncertainties and other image noise.

It should be noted that imposing a higher number of neighboring pixels for inclusion results in excluding pixels with "weaker links" to the neighbors—although they are above the brightness threshold. Additionally, the farther away from the lighting source an image is obtained, the less connected a pixel may become with respect to other pixels.

An embodiment may use the foregoing techniques to determine a number of pixels which are both connected and above a brightness threshold for a test region. The time series of various test regions may be analyzed to determine and detect "fast" shrinking regions. A detection of a "fast" shrinking connected bright region may be used to indicate the presence of smoke. It should be noted that as used herein, "fast" may be characterized as a relative term when compared, for example, to a rate of change over time for images associated with the presence of fog or dust. The feature of the rate of change with respect to a connected bright region may be determined as "growing" (e.g., the number of new "bright" pixels that exceed the brightness threshold per time sample), or "shrinking" (e.g., the number of pixels per time sample that become "non-bright" (below brightness threshold) for each region.

It should be noted that an embodiment of the function ShrinkingRegion may determine a number of connected and bright pixels in a region in a variety of different ways. An embodiment may count the number of pixels included in the connected bright region in which each pixel in the region is both above the brightness threshold and has a minimum number of such connected neighboring pixels. As shown in step 4664 of FIG. 46, values obtained at different points in time may be subtracted and compared to a threshold amount of change. An absolute value of the difference obtained may also be used.

An embodiment may also determine a number of bright and connected pixels using a pixel by pixel comparison with respect to a reference frame, for example, that may be obtained at a time=0 prior to obtaining image data as part of monitoring for fire conditions. In this instance, each pixel of the reference frame is examined to determine if each pixel's state has changed with respect to the pixel's state in the current frame. In other words, a pixel is included in the number of pixels feature as determined, for example, by the ShrinkingRegion function, if the pixel's state has changed from "bright and connected" (meets brightness and connectivity criteria) to "not bright or not connected" (does not meet brightness and/or connectivity criteria) with respect to the reference image and a current image, and vice versa. A difference between two such values determined for two different points in time may be used as well as an absolute value of the difference. A feature that may be used is the ratio of a number of bright and connected pixels using a pixel by pixel comparison with respect to a reference frame compared to the number of bright and connected pixels of a reference frame. Two such ratios obtained at two points in time may be subtracted or otherwise compared to a threshold as, for example, at step 4666 to make a determination as to whether a smoke condition exists. Use of such a ratio may be used, for example, to account for concerns regarding different visibility conditions as well as, for example, mounting LEDs and lenses.

It should also be noted that, rather than examine a difference or determine a rate of change between two points in time, an embodiment may compare a feature value described herein utilizing the connected and brightness criteria obtained at a first point in time to a threshold value.

Another example of a feature that may determined at step 4664 and used at step 4666 may be represented as:

$$\frac{|FeatureValue(t) - FeatureValue(0)|}{FeatureValue(0)}$$

in which FeatureValue(t) represents a value of the feature at time t for a frame, or portion thereof, and FeatureValue(0) represents a value of the feature at time 0, or of a reference frame, or portion thereof. Examples of such features may include, without limitation, the number of bright and connected pixels in a connected bright region, mean intensity, intensity standard deviation, gradient mean, and gradient mean standard deviations. The foregoing may be characterized as a "relative" comparison to the reference frame and may be preferably used for early detection and robustness with respect to mounting and hardware tolerances as to various cargo bay configurations.

Figure 64A:
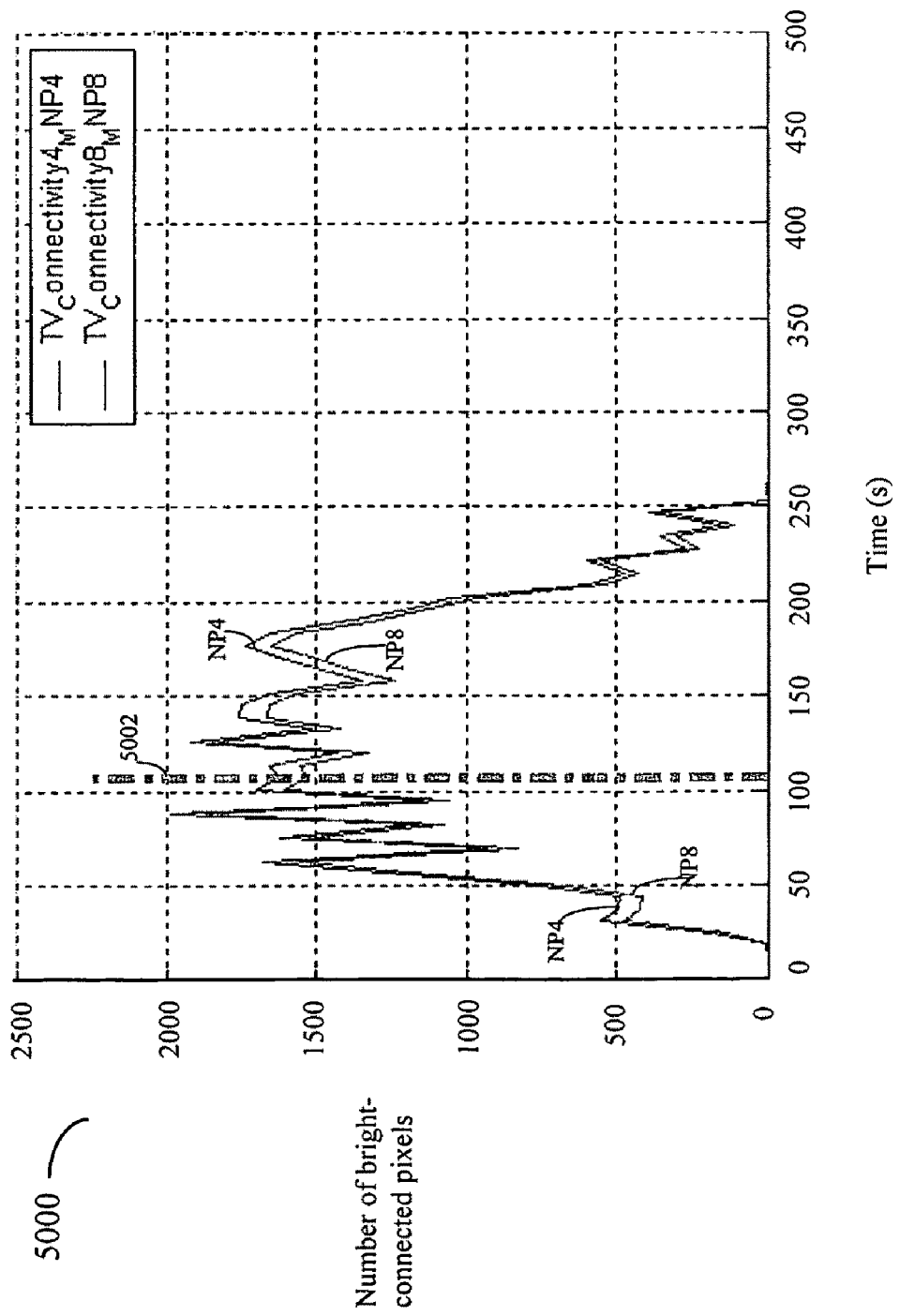
FIG. 64A is a graphical illustration of the number of bright and connection pixels with the thermal lighting view.
Figure 64B:
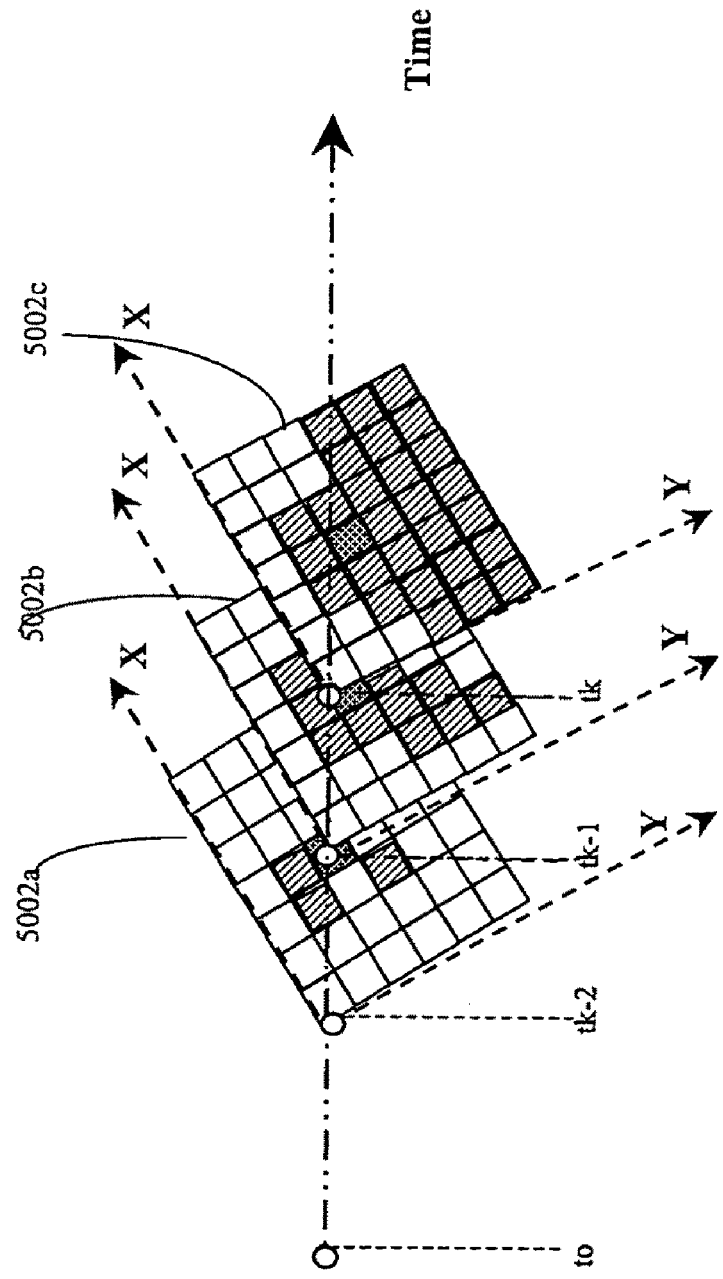
FIG. 64B is an illustration of the time connectivity that may be used with connected bright regions.

It should also be noted that an embodiment may include a time dimension of connectivity as described elsewhere herein in connection with 5004 of FIG. 64B. This time dimension may be used in connection with determining whether a pixel is included in a connected bright region. In other words, in addition to requiring that a pixel candidate meet a brightness intensity or threshold, and a connectivity criteria, the pixel candidate may also be required to exhibit the foregoing for a minimum number of K frames or time samples.

The various thresholds used herein may be determined in accordance with one or more criteria and other conditions that may vary with each embodiment and system. For example, different values may be used in accordance with the particular conventional smoke or fire detection unit that may also be used in an embodiment. For example, if the techniques used herein are being combined or otherwise compared to the rate of detection of an existing system, the particulars of that existing system may serve as benchmarks or minimum values of acceptability used in accordance with the techniques described herein. In one embodiment, the performance criteria may include that the parameter values be tuned such that at least the following always hold true: no fire or smoke conditions are misclassified ard that the smoke or fire condition is determined at or before the time at which an existing or conventional unit detects such a condition. Once these two conditions are met, the embodiment may also seek to tune or select parameters such that the number of false positives are minimized. In other words, as a secondary criteria, an embodiment may select thresholds, and the like, that result in a minimum number of non-fire conditions, such as fog and dust, being properly classified. Other embodiments may use other or different criteria than as described herein that may be used in the particular selection of parameter and threshold values for an embodiment.

An embodiment may empirically tune the selection of parameter and threshold values through actual testing scenarios, simulation of fire and non-fire conditions, or a combination thereof.

What will now be described are some characteristic example curves of the foregoing feature using the number of bright connected pixels for a test region. It should be noted that the fire experiments, cases and codes used herein are included in the European BSI Standard entitled EN-54 Fire Detection and Fire Alarm Systems. It should be noted that the results indicated by these curves are illustrations of example conditions and alarms in accordance with particular testing conditions. Actual results may vary in accordance with each embodiment.

Figure 54:
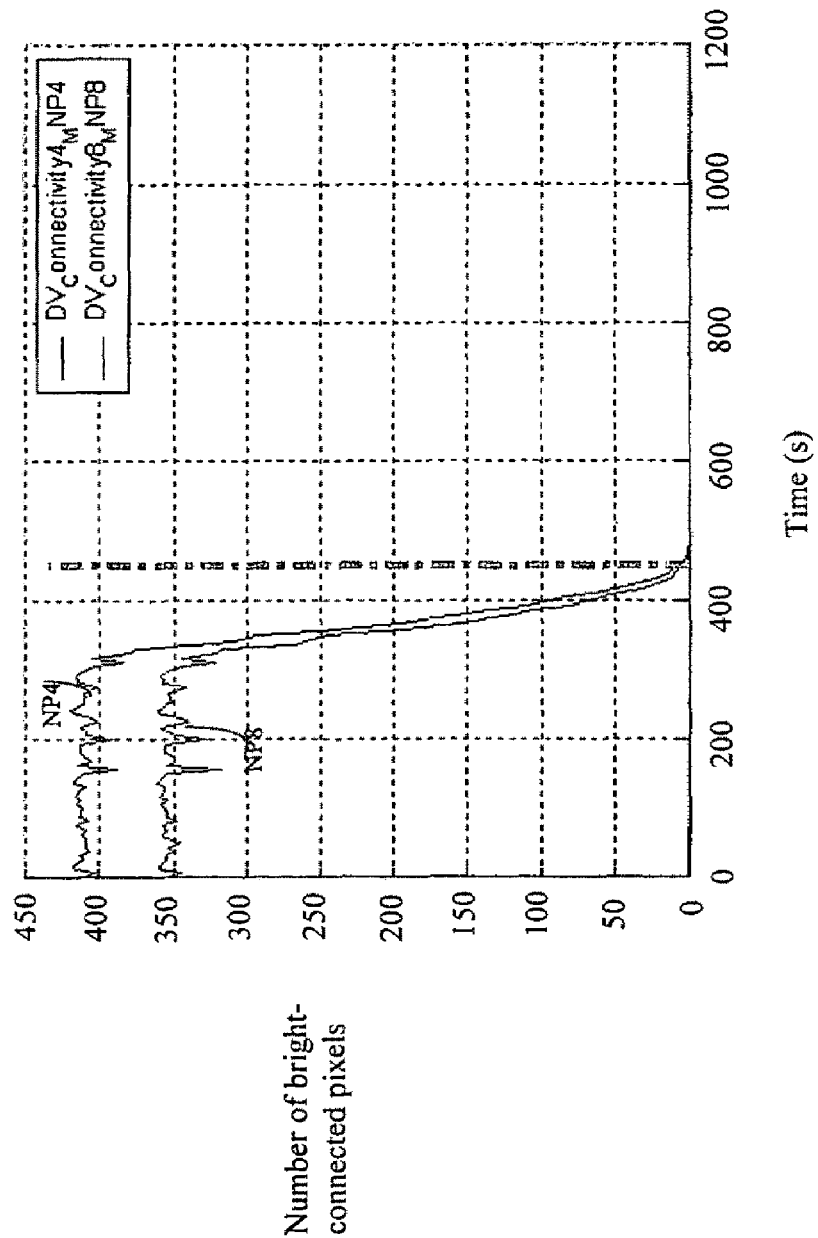
FIGS. 54, 55, 56, 57, 58 and 59 illustrate detection performance of the shrinking region.
Figure 55:
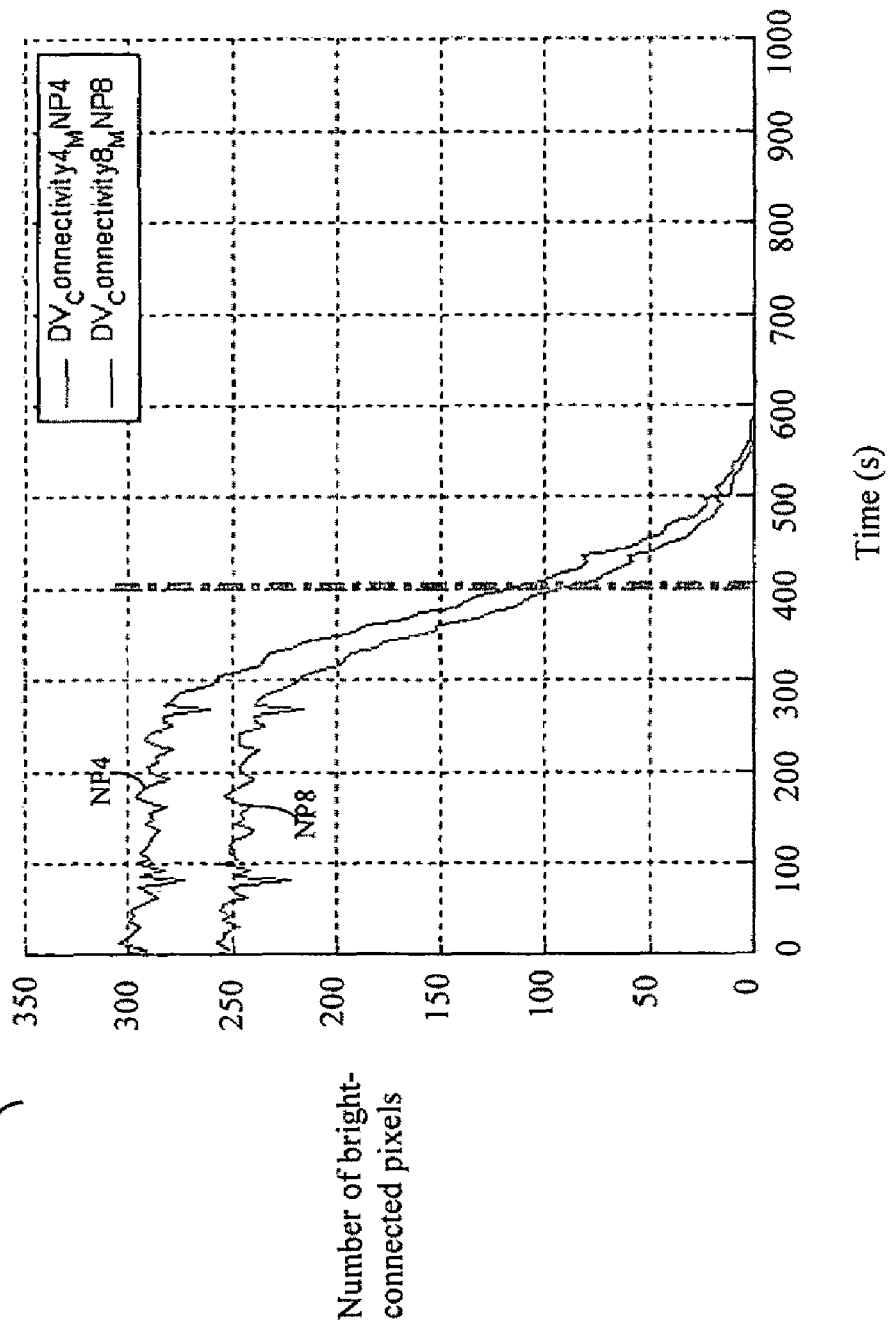

In one set of test data using TF2 fire experiments, fire and smoke conditions were detected "on time" with respect to the amount of time it takes a conventional smoke detector, such as, for example the Cerberus detector. FIGS. 54 and 55 illustrate the detection performance of this feature of shrinking regions. The NP8 curves indicate the time series of the number of bright pixels connected (8-type connectivity) to all its 8 neighbors. The NP4 curves indicate the time series of the number of bright pixels connected (4-type connectivity) to its 4 neighbors. Note that in these FIGS. 54 and 55, the set of 4-connected pixels is larger than the set of 8-connected ones because the latter set is a subset of the previous one. Also note that at the end of an experimental run testing illustrated by FIGS. 54 and 55 using the techniques described herein, the foregoing data sets are reduced to empty because of the total obscuration of the opposite light by smoke.

It should be noted that with reference to FIGS. 54-57, the vertical dashed line indicates the fire or smoke detection time for a conventional or existing fire detection system for purposes of comparison. Also, the number of bright and connected pixels indicated on the Y axis is determined by a pixel by pixel comparison of a current frame with a reference frame obtained using the diagonal lighting view. If a pixel has changed its state from meeting the specified criteria for inclusion in the connected bright region to not meeting the criteria, or vice versa, the pixel is included in the total number indicated by the Y-axis.

Referring to FIG. 55, for example, if the threshold number of bright and connected pixels using a pixel by pixel comparison with respect to a reference frame is set, for instance, at 150 then the detection lead times are, respectively, 45 seconds and 25 seconds for the 8 type of connectivity and 4-type of connectivity. As described elsewhere herein, it should be noted that setting of the function parameters depends on the compromise or criteria for an embodiment regarding early detection and false alarm (dust/fog) tolerance.

Figure 56:
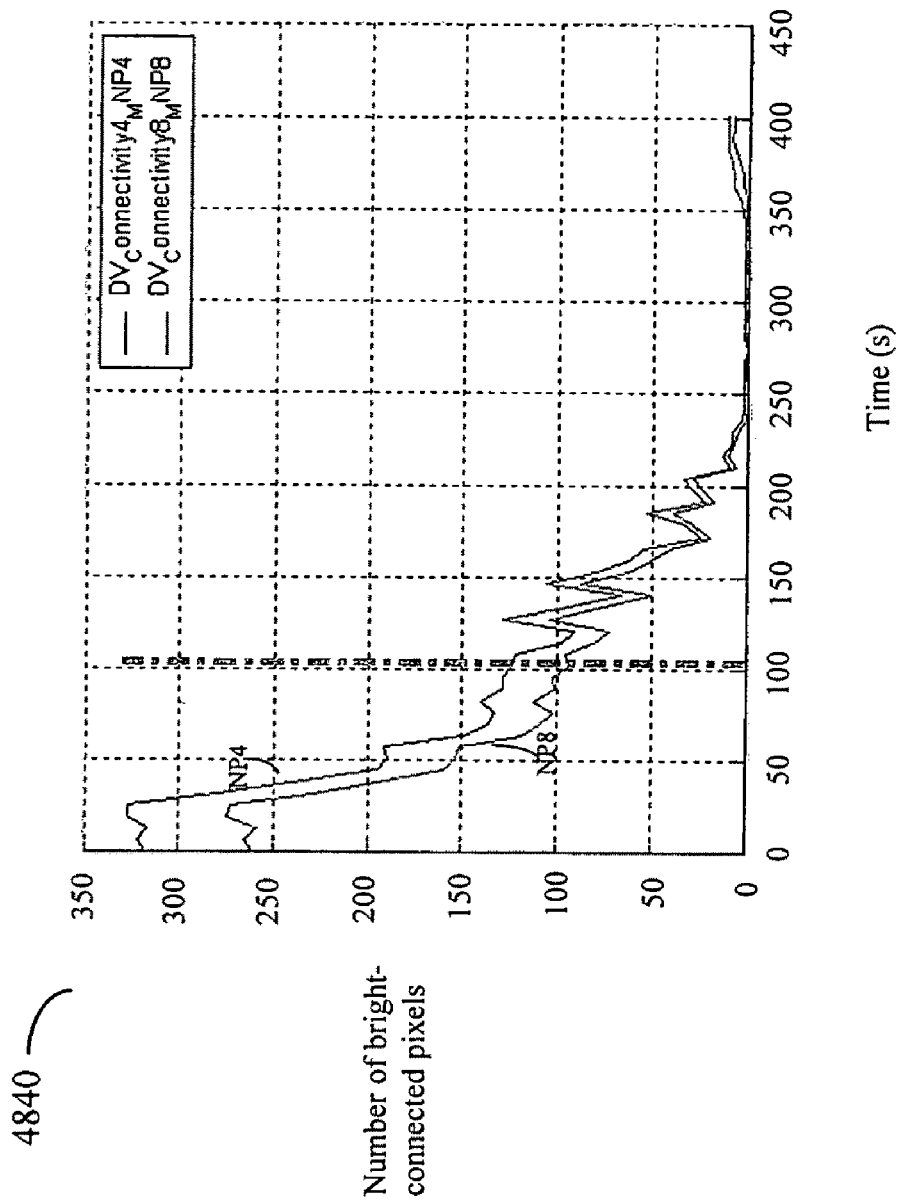
Figure 57:
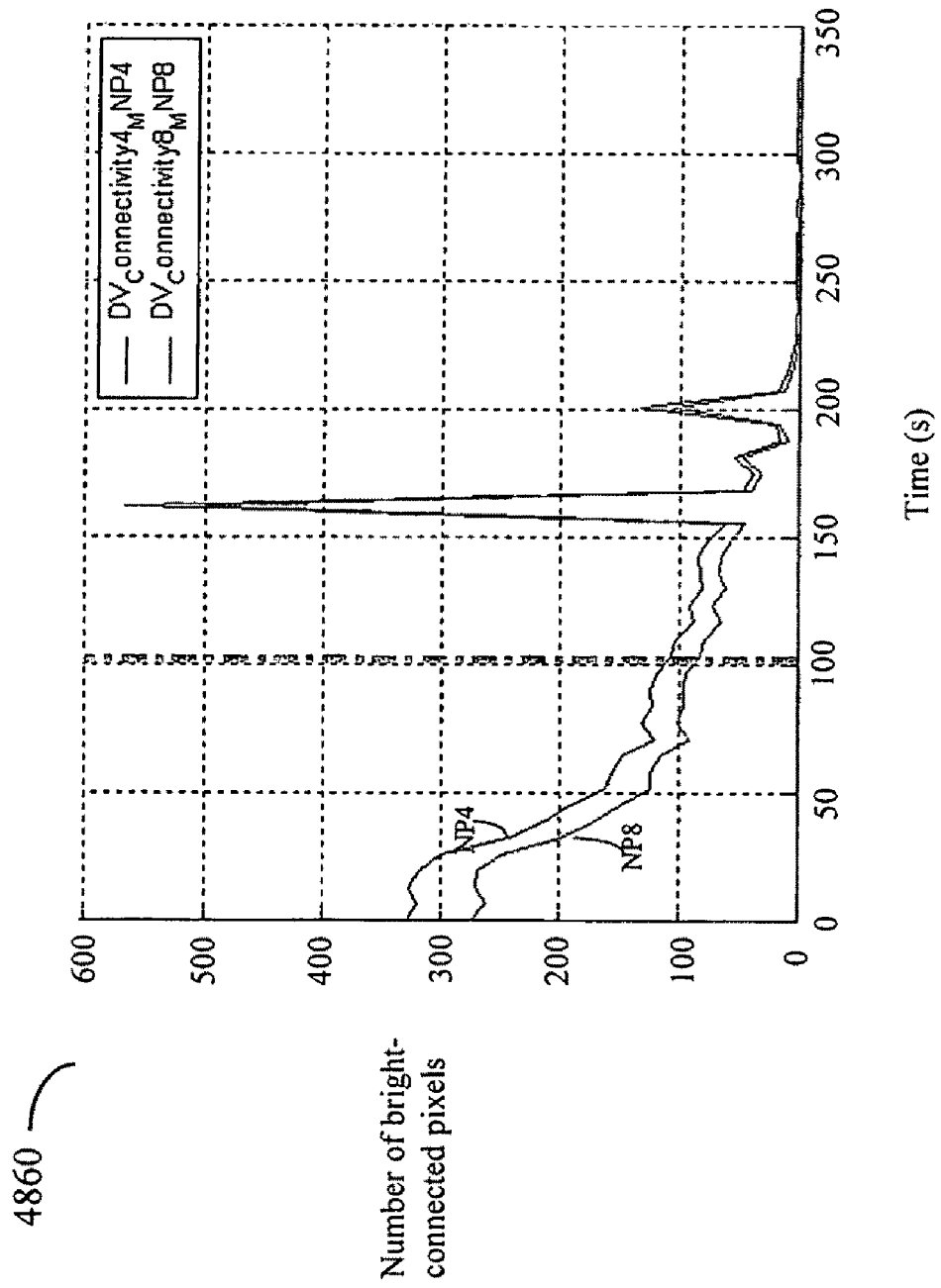

In additional testing conditions using the foregoing smoke detection features, all TF5 fire experiments also detected smoke conditions "on time" with respect to when the same condition is also detected by the Cerbus detector. FIGS. 56 and 57 graphically illustrate the extracted feature in accordance with a set of test data to generally illustrate the behavior of the feature under the specific test conditions. Referring to FIG. 56, keeping the detection threshold number at 150 as described previously in connection with FIG. 55 results in detection lead times in comparison to detection time by a conventional detection system used in testing of 45 seconds and 40 seconds for, respectively, the 8 type of connectivity and 4-type of connectivity.

It should be noted that in connection with FIG. 57, illustration 4860 indicates two spikes around 160 and 200 seconds. In the illustrated test conditions, these spikes are due to the flames observed at the opposite view within the region of the 2-inch gap. The "2-inch gap", other size gap at the top of the cargo space as may exist in connection with an aircraft cargo bay, is described elsewhere herein. An embodiment may, for example, consider only pixels that originally are indicated as bright with respect to a first or reference image. In other words, the original region can only shrink. An embodiment may choose to only consider pixel state changes from bright in a first reference frame to non-bright in a subsequent frame. The reference frame may be used to assist in filtering unwanted conditions that may be encountered. As also described herein, the absolute value of the difference between a first feature value determined for a frame and a second feature value at time 0 or the feature value.

Figure 58:
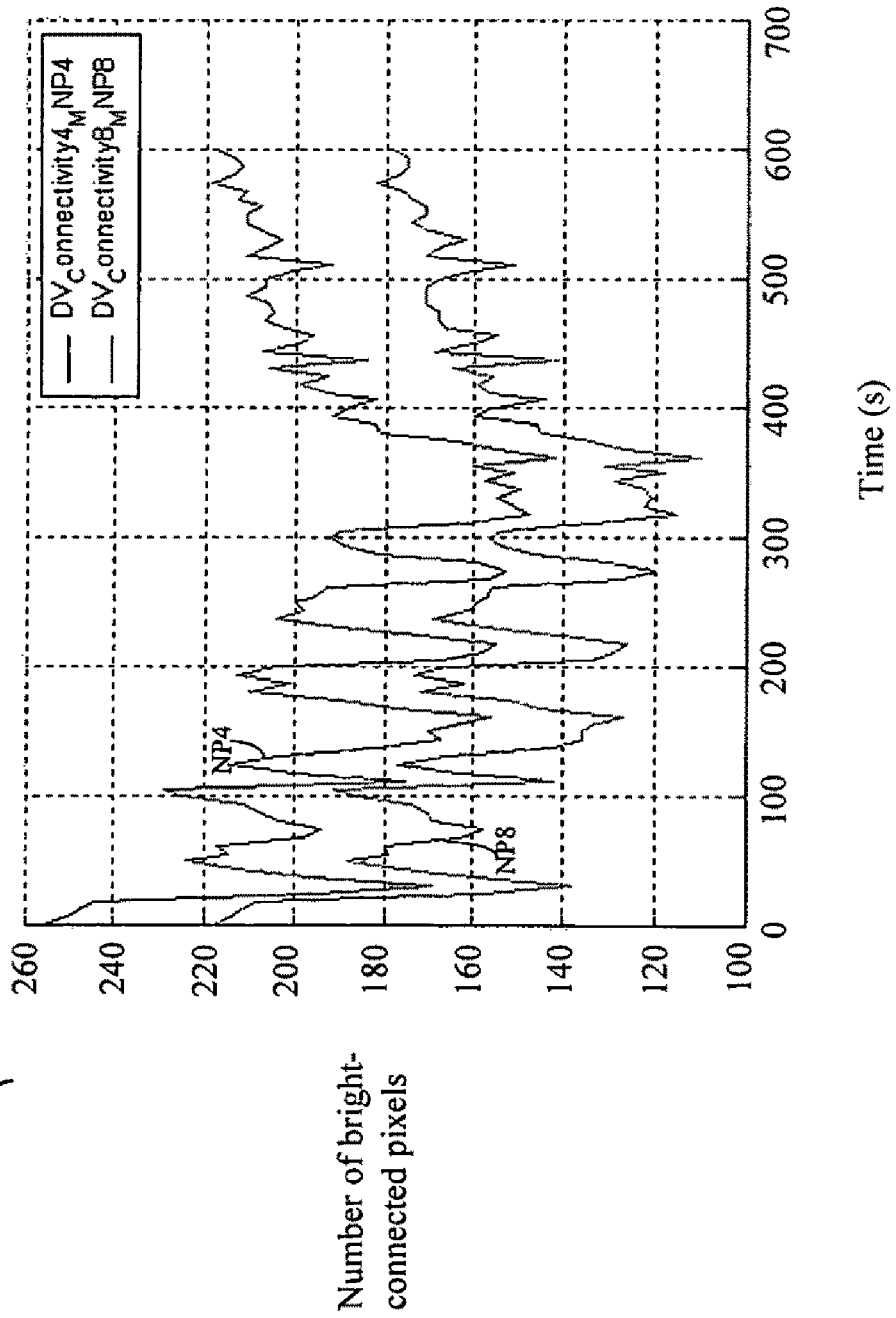
Figure 59:
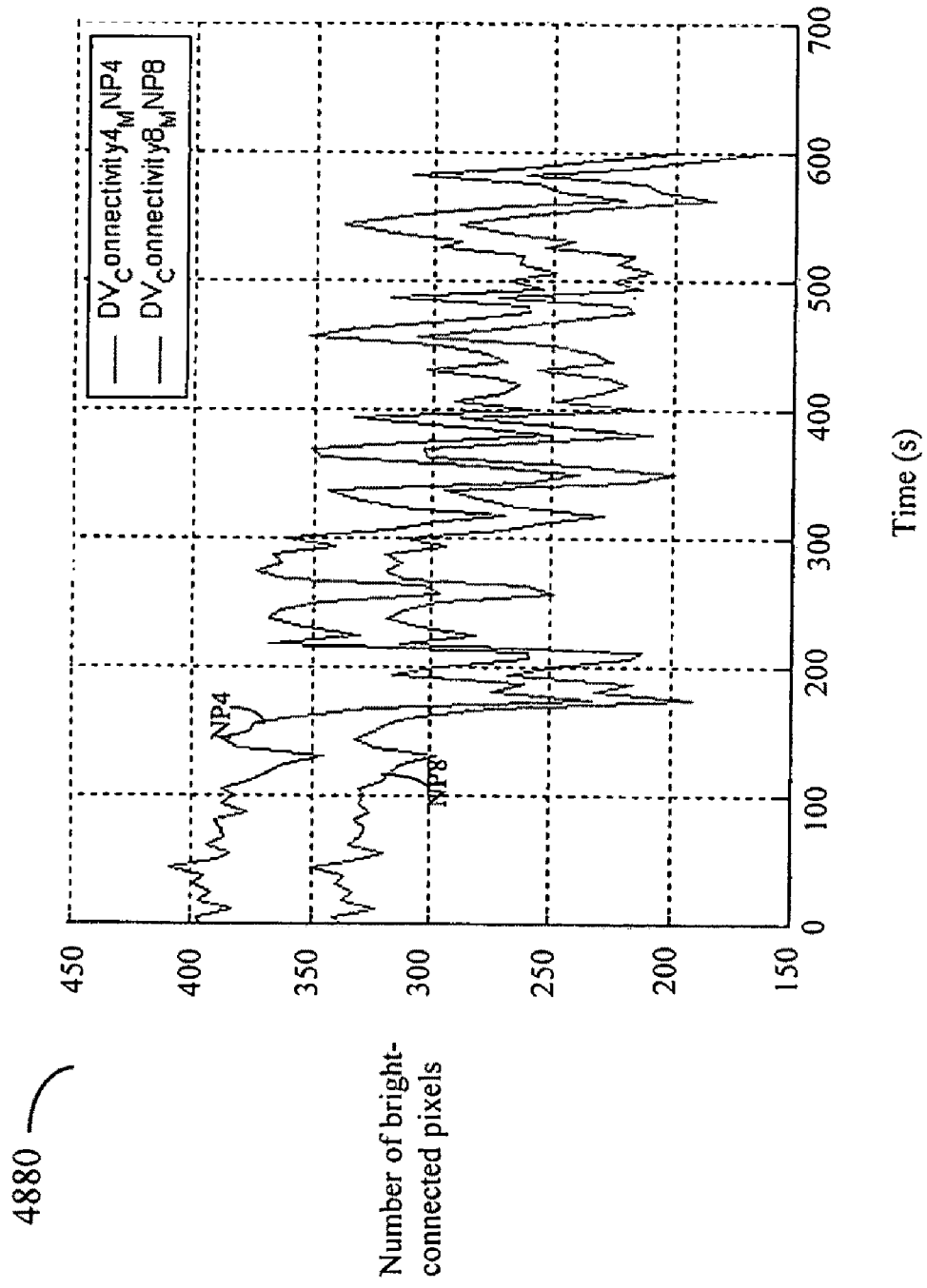

Referring now to FIGS. 58 and 59, shown are graphical illustrations 4870, 4880 of the connected bright region feature's performance in connection with the presence of, respectively, dust and fog. FIG. 58 and 59 may be characterized as illustrating the behavior of the foregoing feature in connection with non-smoke conditions, such as fog and dust. Thus, the behavior of this feature over time with respect to smoke is distinguishable from the behavior of this feature over time with respect to non-smoke conditions. With reference to FIG. 58, a test run using a 4-type connectivity and a 120 detection threshold, 8 (out of 19) dust cases were properly confirmed as non-smoke/fire conditions. Additionally, there were also 3 (out of 17) fog experiments that were properly confirmed as non-smoke/fire conditions. It should be noted that even when covered by fog, the bright pixels may not dim because of the "transparency" of foggy environment.

The foregoing described a feature based on the notion of image segmentation that relies on a pixel by pixel analysis, rather than on a global analysis of the entire frame. The foregoing may be used in detecting smoke via monitoring the dimming of an opposite light to the camera of interest. As described herein, this feature may be characterized as the number of connected pixels above a predetermined brightness threshold. The foregoing techniques utilize the notion of pixel connectedness in segment-based image processing coupled with pixel brightness or intensity level considerations. The foregoing techniques may be used in an embodiment for early and strong smoke detection while minimizing false alarms due to dust and fog. Another advantage of the foregoing feature is its robustness with respect to vibration and initial view content.

In the foregoing, pixels may be used in selection of a seed or initial pixel candidate and for next pixel candidates in connection with the ShrinkingRegion function as described herein. Any one or more different techniques may be used in connection with pixel selection for these values as well as in determining the region of interest (test region). An embodiment may look for "bright" and "connected" pixels within a predetermined "small" sub-image of the frame based on a priori knowledge of the opposite camera position. For instance, given the physical XYZ position of the camera, the camera's projection can be determined in the image plane (i.e. xy). Then a "small" rectangle around that center xy may be determined to account for variability in the camera mounting and light power (i.e. size of brightness area or image projection due to the opposite camera's light source). An embodiment may also start sweeping the entire image, or a portion thereof, pixel by pixel (e.g. starting from the pixel at the upper left corner) until a bright and connected area is detected. The foregoing assumes that no other light, during the opposite view lighting, is present except the opposite light. In other words, an embodiment may use the entire image or a portion thereo.

It should be noted that as used herein, TF2 is a type of fire-well defined by a European standard (i.e. EN54) among other fire types (i.e. TF1 to TF7). TF2 is actually the smoldering of 30 pieces (1 cm by 2 cm by 3.5 cm each) of Beech wood over a pan in a test fire chamber of a certain dimensions (I think the dimensions are about 9 by 7 by 4 meters). As used herein, Cerberus detection time may be used as a representative of a "conventional" smoke detector. The brand "Cerberus" is manufactured by Siemens. Other conventional smoke detectors may also be used in an embodiment and parameters, threshold, results, and the like using the techniques described herein may vary with each embodiment. As used herein, "on-time" means at the time or a few seconds before the conventional smoke detector detects a smoke condition. As also used herein, "dark view" may refer to the lighting scenario in which all lights, such as all controlled lights in the cargo bay area/system, are off.

It should be noted that a trend analysis of any one or more of the foregoing features may be used in determining whether a smoke condition exists. The trend analysis may include comparison to a known trend of feature values previously observed over time. In other words, an embodiment may indicate the presence of smoke if a pattern of feature values is detected for a plurality of different points in time.

What will now be described are techniques that may be used in connection with detecting and discriminating hotspots. In one embodiment, near infrared (NIR) CCD cameras or digital cameras may be used with pixel connectivity as described herein in a technique for hotspot detection and discrimination. In one embodiment a filter may be used to block ambient light. However, the particulars of such embodiments as described herein should not be construed as a limitation of the other types of filters or other types of equipment that may be used with the hotspot techniques described in following paragraphs. For instance, the techniques described in following paragraphs for hotspot detection may be used in an embodiment with IR cameras (i.e. no filter is necessary) or with CCD (or CMOS) cameras without using a filter. Rather than use a filter, an embodiment may use a comparison and differentiation technique between frames of different views, or frames of the same view but at different times, as described elsewhere herein, for example, in connection with FIG. 36. The filter itself may be used to block a portion of light or other portion of the spectrum (visible or otherwise).

The technique described in following paragraphs may be used with a system, such as the system of FIG. 1 and its variations described herein, for detection and verification of fire in aircraft cargo bay. It should be noted that the techniques described herein are not limited for use within a cargo bay, but may also generally be used in connection with other embodiments of a fire detection and/or verification system. In connection with one embodiment of the system described herein for fire detection, it may be desirable to reduce the rate of false alarms issued by the conventional smoke detection systems as may be the case, for example, with those installed in a majority of commercial aircraft. The system's CCD cameras or arrays or other digital cameras may receive NIR light from the illumination units controlled by the system's control unit. By appropriately switching the illumination units, different illumination scenarios are obtained. Various lighting scenarios that may be used are described else where herein. Use of different lighting scenarios allows detecting of various visual effects in images associated with those illumination schemes. The data fusion techniques may be used to combine evidence about aerosol and hotspot presence obtained from those images. The data fusion approach may also be used in an embodiment for hotspot and flame detection with the techniques described herein.

The techniques that will now be described use an image processing feature for hotspot and flame detection. In one embodiment, the feature may be characterized as local in nature and may be used in performing a pixel by pixel analysis rather than a global analysis of the frame as a whole. It should be noted that the techniques described herein may also be used an embodiment to analyze an entire frame or portion thereof, as will be described in following paragraphs. Other existing techniques and feature may use global features, such as the average frame intensity and average frame motion and their standard deviations. The feature described in following paragraphs may also be characterized as robust with respect to vibration and does not require a reference frame for processing. The technique in following paragraphs uses pixel connectivity by determining connected (i.e. non-isolated) pixels above certain thresholds. An embodiment may use this technique by coupling the features of connectivity and pixel brightness or intensity for use in segment-based image processing. It should be noted that considering only pixels with certain intensity descriptors may be misleading under particular conditions, such as in a noisy environment (e.g. hot environment, camera artifacts, and the like).

The techniques described in following paragraphs may be used to detect a growing connected bright region due to flames or hotspots. Different types of pixel connectivity, such as the 4-pixel connectivity, 8-pixel connectivity and shape-based connectivity, and determining a connected bright region in connection therewith, are described elsewhere herein in more detail. The purpose of this technique is to detect and "quantify" the existence and the growing of connected bright regions of arbitrary shapes due to the presence of hotspots and/or flames during the thermal view such as, for example, when all controlled lights are off (i.e. dark view). In one embodiment, hotspots may be defined as very hot objects with temperatures exceeding a certain threshold (e.g. 350 degrees Celsius). Flames are fire blazes or reflections of fire that may be originated by a hotspot (i.e. smoldering fire) or otherwise (e.g. abrupt fire formation by a spilled hydrocarbon). The feature described herein can be used to detect growing (or emerging new) connected bright regions. In particular, this detection technique may be used in an embodiment for early detection of hotspots and flames using a thermal or dark lighting view. Note that the brightness detection threshold that may be used in an embodiment with the thermal lighting view may be relatively low in comparison to thresholds for smoke detection since the starting point is a dark view (i.e. no bright region). An embodiment may select a brightness threshold in accordance with, for example, the particular camera, lense(s), and filter(s). For example, one embodiment may use a threshold of 30 grey levels to be above the ambient camera noise and also allow for a certain margin as the camera performance deteriorates over time. The reference may be used as a starting point for the threshold and then lowered several grey levels in accordance with the foregoing camera deterioration over time. The number of non-isolated pixels, as defined above, may be monitored over time from one frame to another.

Figure 60:
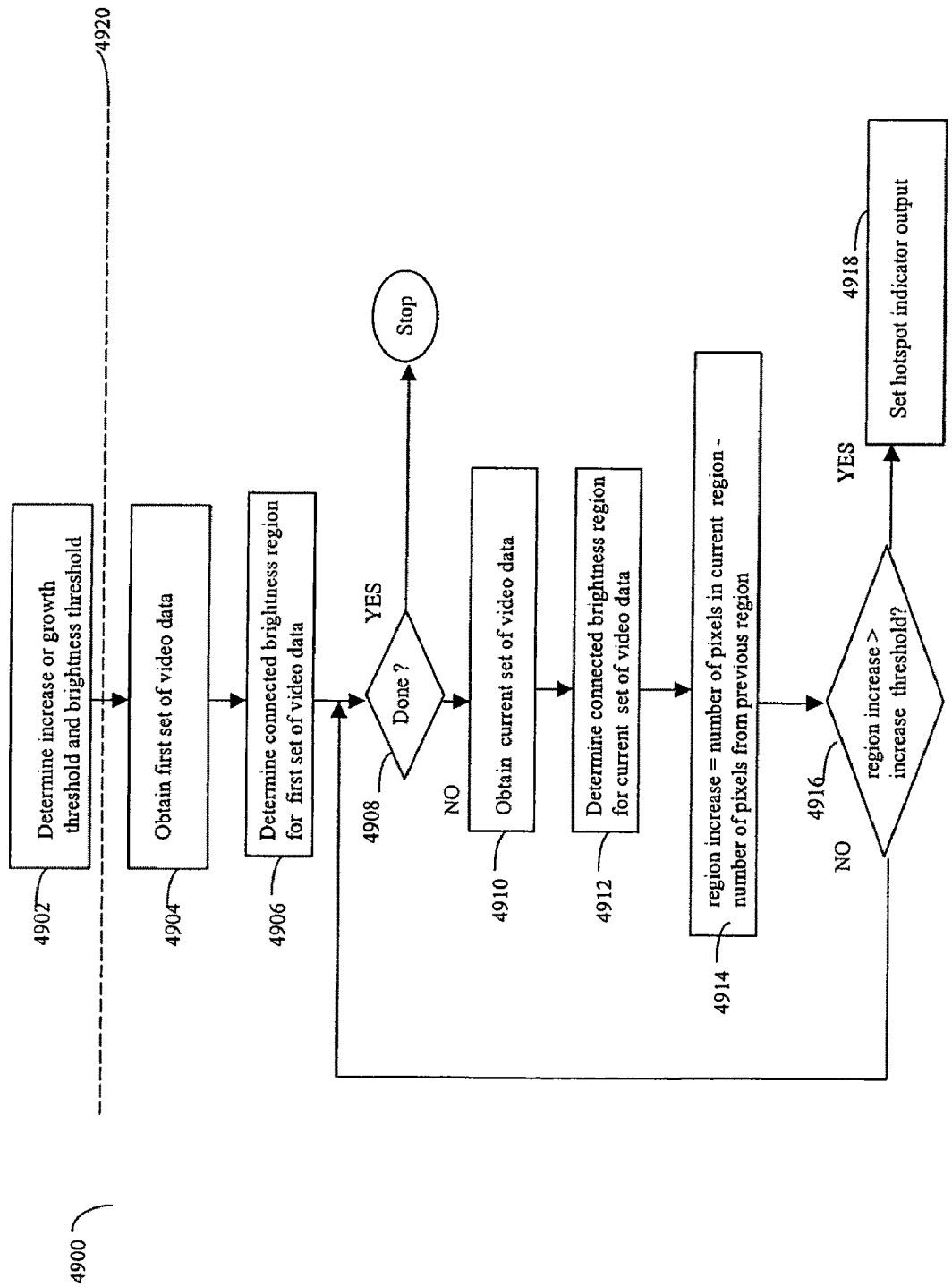
FIG. 60 is a flowchart of steps of an embodiment for hotspot detection using growing regions.

Referring now to FIG. 60, shown is a flowchart 4900 of steps of one embodiment for hotspot detection by detecting growing connected bright regions in accordance with the monitored size of the connected bright region for multiple frames over time. It should be noted that, as described elsewhere herein, the hotspot detection indicator produced as an output of the processing steps of 4900 may be used in many different arrangements in an embodiment. The hotspot indicator output of step 4918 may be used, for example, as a single input or may be combined with other indicator results, such as using data fusion, to produce a system flame indicator and/or fire condition indicator. The hotspot indicator may be used as a verification for a conventional or other fire detection system.

At step 4902, an increase or growth threshold and a brightness threshold are determined. In one embodiment, these values may be determined off-line prior to running the hotspot detection techniques as may be included, for example, in a fire detection system. In one embodiment, the increase or growth threshold may be characterized as a threshold value representing a difference of a number of pixels in a connected bright region determined with respect to two different frames at different points in time. In other words, the number of pixels in a connected bright region is determined at a first point in time and again at a second point in time. The difference between the number of pixels at each point in time may be determined and compared in subsequent processing steps to the growth or increase threshold. An embodiment may use a different technique in computing the difference. An embodiment may also determine a pixel by pixel difference and compute the feature value of the difference image. An embodiment may also compute the absolute value, or other operator such as minimum or maximum, of the frame difference before computing the number of bright and connected pixels. When the difference is above the increase threshold, a hotspot indicator output is set. In one embodiment, the brightness threshold represents a pixel intensity threshold level used in determining a minimum level of pixel intensity for inclusion in a connected bright region. As described elsewhere herein, the associated growth of a detected region may be determined using one or more different features based on the number of pixels for a connected bright region at different points in time.

It should be noted that although step 4902 may be performed off-line in an embodiment prior utilizing the hotspot detection techniques described herein for real-time fire/smoke detection, an embodiment may also perform this step 4902 at other times. An embodiment may use empirical testing and general know how to determine step 4902 values in accordance with different testing conditions in each embodiment. Different techniques and considerations that may be used in connection determining these and other threshold values are described elsewhere herein in more detail. It should be noted that an embodiment may determine the increase or growth threshold used in accordance with experimental data and/or camera properties.

Steps subsequent to step 4902 may be performed when the techniques described herein are used in data gathering and analysis for hotspot detection.

At step 4904, a first set of image data is obtained for analysis. At step 4906, the connected bright region is determined for the first set of image data. This is described in more detail elsewhere herein. At step 4908, a determination is made as to whether processing using the techniques of flowchart 4900 is complete. If so, processing stops. Otherwise, control proceeds to step 4910 to obtain another current set of image data for which a connected bright region is determined at step 4912.

At step 4914, region growth is determined. In one embodiment, this may be determined as the difference of the number of pixels in a connected bright region as determined at two different points in time. Other parameters that may be used in an embodiment to determine region growth are described elsewhere herein. At step 4916, a determination is made as to whether the region growth is greater than the increase or growth threshold as may be determined, for example, at step 4902. If so, control proceeds to step 4918 where a hotspot indicator may be set as an output. Otherwise, control proceeds to step 4918 where a determination is made as to whether processing is complete. If not, processing continues with the next set of image data.

Using the foregoing processing steps of flowchart 4900, the feature region increase may be used in hotspot detection. This feature uses the number of pixels in a connected bright region determined for different frames at different points in time. As will be described elsewhere herein, other features may use the number of pixels in a connected and bright region for one or more frames. Additionally, an embodiment may also use different criteria for determining whether a pixel is to be included in the connected and bright region for a frame as also described herein.

In one embodiment, a function may be used to determine the number of bright and connected pixels associated with a first set of image data. It should be noted that an embodiment may use, for example, an entire frame of image data or a portion of a frame in determining the number of bright and connected pixels. An embodiment may compare the same test regions for different frames. In one embodiment, a function for computing the number of "bright and connected" pixels may have the following interface definition:

GrowingRegion(TestRegion, Brightness Threshold, Connectivity MinimumNeighboringPixels)

An embodiment of the above-referenced function may include code for implementing the processing steps for determining a connected bright region as described in connection with, for example, processing step 4906 of flowchart 4900. It should be noted that the input parameters to the GrowingRegion function are similar to those as described herein for the ShrinkingRegion function. Aspects of the GrowingRegion function may be characterized as similar to the ShrinkingRegion function in that both detect, for an input frame or portion thereof, a connected bright region. However, the GrowingRegion function may be used in the detection of connected bright regions that increase in size. Both functions may use similar techniques in determining a connected bright region for a frame, or portion thereof. However, the criteria for determining whether a pixel is included in a connected bright region being determined may vary in accordance with whether a shrinking or growing region is being determined, and may also vary in accordance with each embodiment. For example, both routines may use input parameters having a similar description and produce an output that is the number of pixels determined as being included in a connected bright region. However, an embodiment of ShrinkingRegion may use different criteria than GrowingRegion for determining whether a pixel is "bright and connected" for inclusion in the region. This is described elsewhere herein in more detail.

In one embodiment of the GrowingRegion function as used, for example, in step 4906 processing, a pixel may be included in the connected bright region if the pixel is above the specified BrightnessThreshold and connected to at least the MinimumNeighboringPixels in accordance with the pixel arrangement as specified by the Connectivity parameter. This is described elsewhere herein in more detail for example, in connection with FIGS. 44 and 45.

It should be noted that an embodiment may select an entire frame, or a portion thereof, as the testregion. An embodiment may select a portion of a frame, for example, due to redundant area coverage by multiple cameras.

What will now be described are more detailed processing steps of determining the brightness threshold of step 4902 in one particular embodiment. As described elsewhere herein, the brightness threshold may be determined offline, for example, prior to using the techniques described herein as part of a fire detection system. An embodiment may then use this brightness threshold, such as the function input parameter for GrowingRegion, in determining whether a pixel may be considered as "bright" for inclusion in a connected bright region for hotspot detection.

An embodiment may perform the task of determining a brightness threshold offline, for example, by examining the histogram of one or several frames taken at a thermal (i.e. dark) view with a test condition of flame presence. For example, in one embodiment, it was found that a gray level between 75 to 100 may be an acceptable brightness threshold value for hotspot/flame detection. However, to reduce sensitivity to noise and other uncertainties, an embodiment may use a higher brightness threshold, for example, of 100, to avoid any agglomeration of "non bright" regions. The particulars in selection of a brightness threshold may vary with system criteria, such as tolerance for false positives and the like, and also the particular hardware, such as the camera and lighting used, and data gathering environment. The brightness threshold may be determined, for example, using black body experiments where camera sensitivity (e.g., mean frame intensity) versus temperature is established. If, for instance, a temperature of 350 degrees Celcius means that 4 (or more) pixels are above 50 gray levels, then such threshold should be set in the vicinity of 50.

Figure 61:
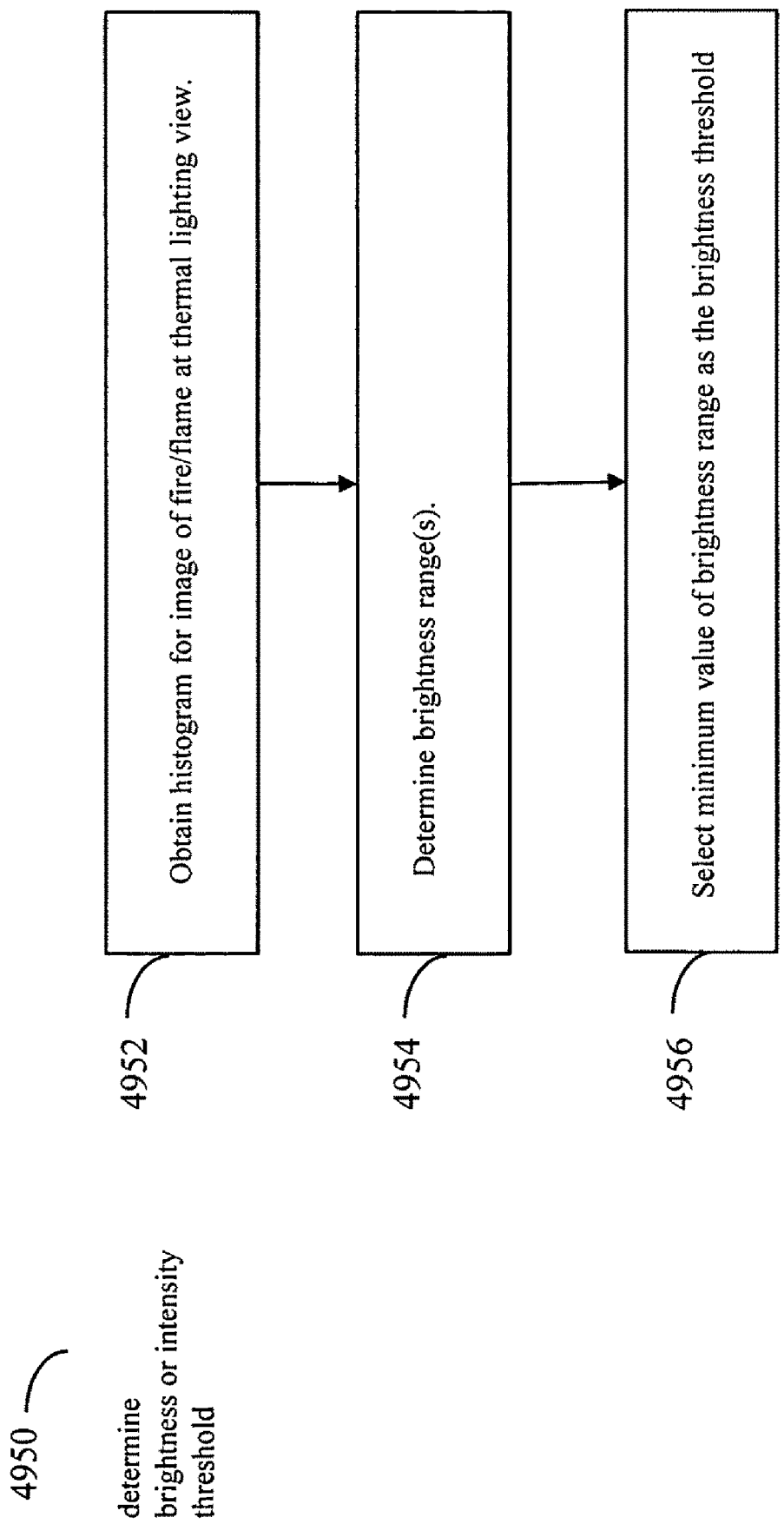
FIG. 61 is a flowchart of steps of one embodiment for determining the brightness threshold.

Referring now to FIG. 61, shown is a flowchart 4950 of processing steps of one embodiment for determining the brightness threshold offline. At step 4952, a histogram for an image of a fire or flame with a dark or thermal lighting view is obtained. This may include, for example, obtaining an image using test conditions which include a thermal or dark lighting view scenario. Recall that, as described elsewhere herein, a thermal or dark lighting view is one in which there are no controlled light sources switched on in the image viewing area, such as the cargo bay. A histogram illustrating the pixel grey level distribution and the number of pixels having each particular grey level may be determined for each image. It should also be noted that one or more histograms and corresponding images may be used in determining this threshold in accordance with the particular conditions of each fire detection system, or other system, and environment in which the hotspot detection techniques described herein may be used.

At step 4954, one or more brightness ranges are identified in accordance with the histograms from step 4952. In other words, different bands of brightness levels may be determined by examining the one or more histograms. Different bands of brightness levels detected may be associated with one or more conditions known in a particular environment. For example, in an environment with a particular known level of "noise", a first brightness band may be detected with pixels of a relatively low grey level value. In selecting the brightness threshold, it may be determined that the brightness threshold in an embodiment should be greater than the maximum grey level associated with the first brightness band as described above.

A second brightness band having a minimum greater than the maximum of the first band may also be detected in a histogram. It may be determined that this second band represents pixel values associated with hotspots or flames. One or more values of this second band may be used in also determining a brightness threshold. For example, an embodiment may use the minimum value of this second band as a brightness threshold. An embodiment may also use the minimum value of this second band in conjunction with the maximum value of the first "noise" band to determine the brightness threshold. The particular brightness threshold used may vary in accordance with the particular criteria of each embodiment. Such criteria, as also described elsewhere herein in more detail, may include, for example, the tolerance for false positives, how quickly or early a determination for hot spot detection is desired, and the like. For example, in one embodiment, there may be a high tolerance for false positives and a desire for an early detection of hotspots. In this instance, a brightness threshold at or closer to the maximum of the first band may be used.

What will now be described is an illustration of how the foregoing techniques may be used in determining a brightness threshold for a growing region in hotspot detection.

Figure 62:
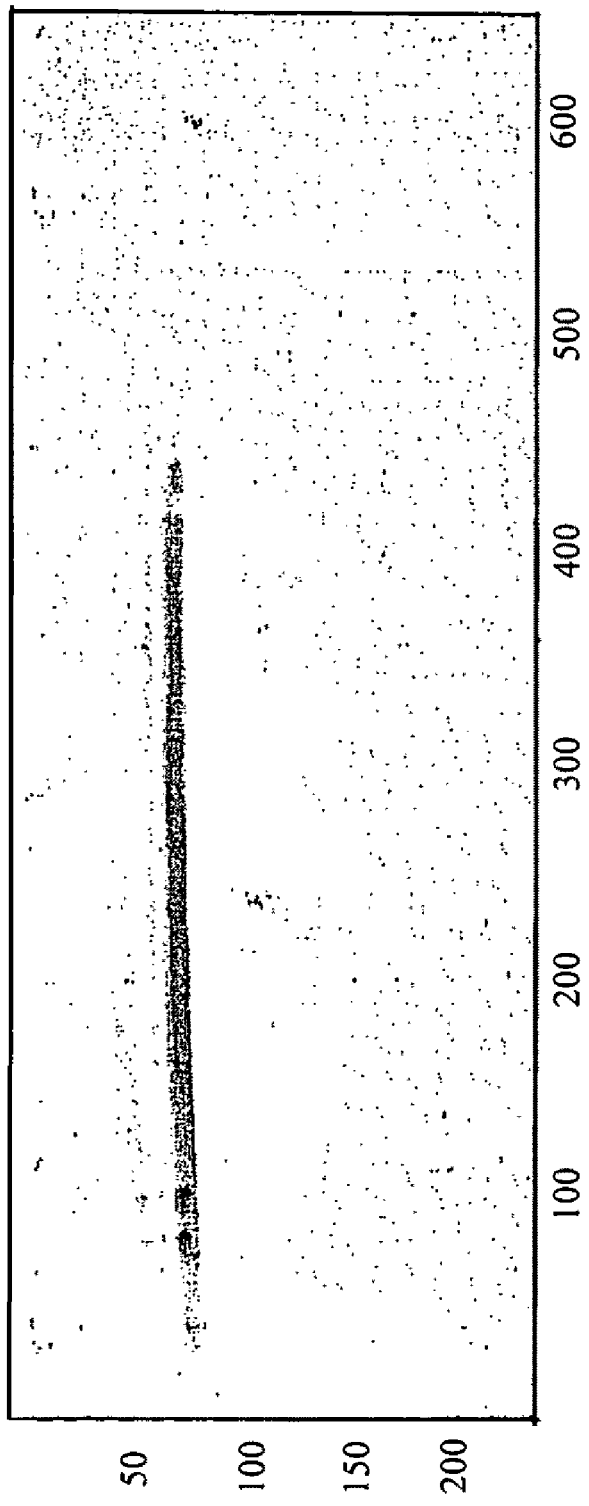
FIG. 62 is an example of an image obtained using a dark or thermal lighting view.

Referring now to FIG. 62, shown is an image obtained using a thermal or dark lighting view in test conditions with a TF5 fire. As described elsewhere herein, TF5 is a fire classification included in the European BSI Standard entitled EN-54 Fire Detection ard Fire Alarm Systems. An embodiment may use this or other test conditions in determining a brightness threshold. In the test conditions of the offline pro cessing to determine the brightness threshold for this example, the conditions also replicate the cargo bay area with a gap located at the top in which the bay is full of cargo. Other embodiments may use other environment conditions.

Figure 63:
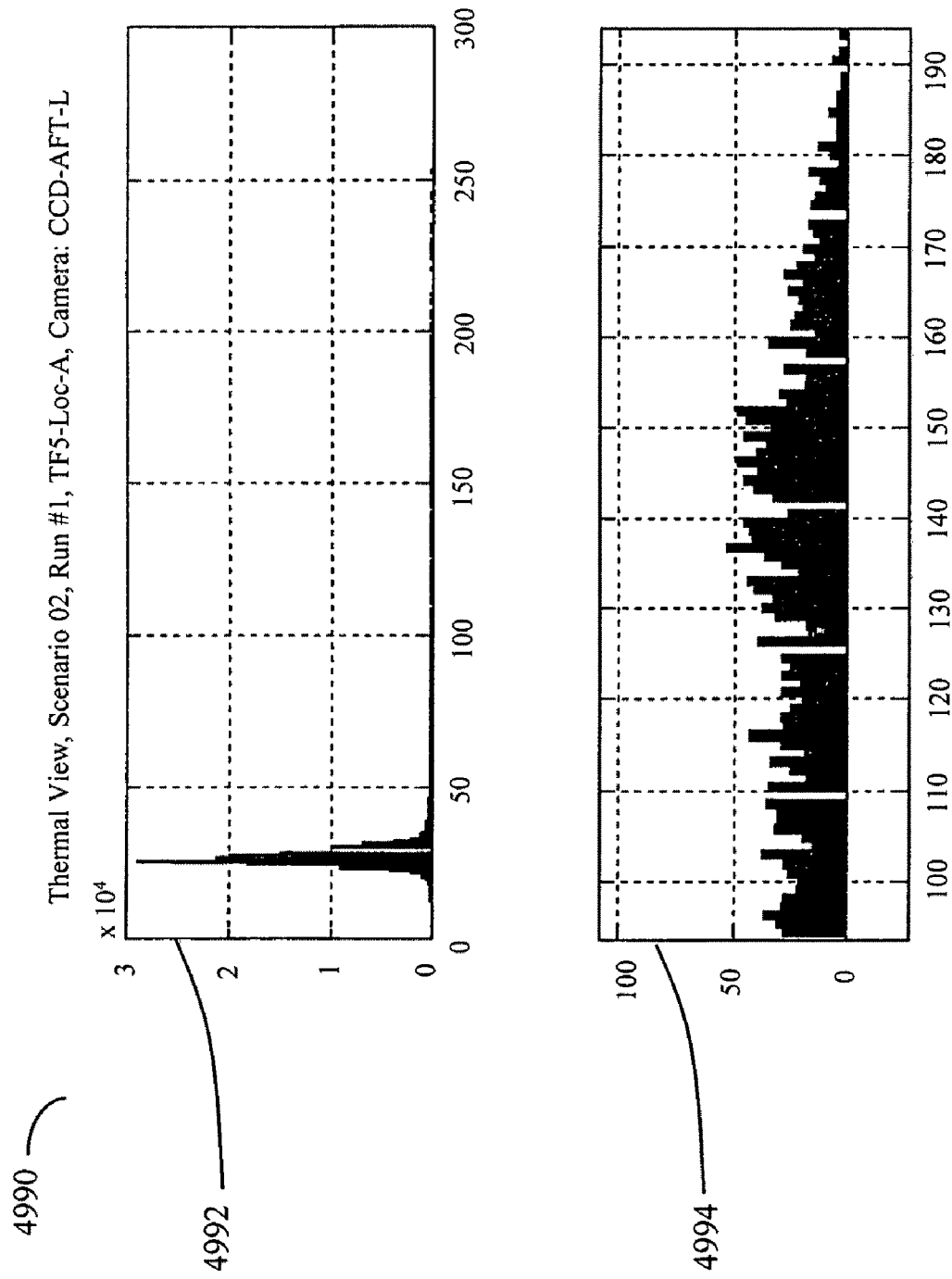
FIG. 63 are example histograms of grey scale values using the image of FIG. 62.

Referring now to FIG. 63, shown are histograms 4990 of grey scale values in accordance with the image obtained from FIG. 62. The histograms of 4990 reflect values associated with the upper half of a frame 4980 taken at a dark view. The upper half of the frame may be analyzed as the test region of interest in this example since the region of interest is the top portion or gap of the cargo bay area that is full of cargo. Each of the histograms 4992 and 4994 display the pixel gray levels (X-Axis) and the number of pixels having this particular grey level (Y-Axis). It should be noted that in the foregoing histogram 4992, a majority of pixels are in the region between 20 and 40 grey levels. This may be detected as a first band of grey levels corresponding to, for example, the grey levels of image "noise". Histogram 4994 is a zoom of a portion of the histogram 4992. In particular, the histogram 4994 illustrates a zoom view of the region in the 100-200 gray levels from 4992. In accordance with the regions detected herein, an embodiment may select a brightness threshold of 100 due to the relative "high agglomeration" of pixels around the band of 130-150 gray levels, the criteria of the embodiment to detect all hotspots early and with a goal of minimizing the number of false positives. It should be noted that this threshold value may vary with each embodiment and characteristics thereof. For example, the threshold may be determined in accordance with the hardware, such as camera type, in an embodiment and also by the desired tradeoff to be established between early detection and robustness to noise.

In test runs of one embodiment of TF5 fire (e.g. scenario 2), the techniques described herein for hotspot detection provided for detection of hotspots only a few seconds after the ignition. It should be noted that these results were established in one embodiment using a local analysis technique in which the test region is the entire frame monitored at different points in time. The foregoing embodiment did not utilize any techniques for further reducing the number of pixels processed in the test region. For example, this embodiment used all pixels in the test region rather than, for example, using only every other pixel of a test region horizontally and/or vertically, as described elsewhere herein. However, it should be noted that an embodiment may use the hotspot detection techniques described herein in processing in which the test region is the entire frame, or a portion thereof, and includes processing all the pixels in the test region or a portion of the pixels as described elsewhere herein. Other variations may also be used in accordance with techniques known to those in the art and in accordance with each embodiment.

Referring now to FIG. 64A, shown is a graphical illustration 5000 of the feature of the number of bright and connected pixels included in a connected bright region using the techniques described herein with the thermal lighting view for one set of conditions for a TF5 fire. The vertical dashed line 5002 indicates the detection time of a fire as determined using one particular conventional smoke/fire detector. The foregoing illustrates that the number of bright and connected pixels included in a connected bright region increases over time, for example, as when examining a trend of the number of pixels in the region at various points in time.

Other feature variations may be used in determining a relative change for hot spot detection in connection with processing steps of 4900 of FIG. 60. For example, the following:

$$\frac{|FeatureValue(t) - FeatureValue(0)|}{FeatureValue(0)}$$

where FeatureValue(t) stands for the value of the feature at time t, and FeatureValue(0) stands for the value of the feature at time 0, or of a reference frame. Examples of such features include, without limitation, the number of bright and connected pixels, the mean pixel intensity, pixel intensity standard deviation, or gradient mean and standard deviations. For example, an embodiment may determine the number of bright and connected pixels in a connected brightness region. At step 4914, an embodiment may use the foregoing absolute difference of feature values over the feature value of the reference frame in determining a relative change at step 4916.

The foregoing approach of a "relative" comparison to the reference may be preferably used in an embodiment for early detection and robustness with respect to mounting and hardware tolerances as to various cargo bay configurations Another variation of the "relative" change that may also be used in an embodiment may be represented as:

$$\frac{FeatureValue(t)}{FeatureValue(0)}, \frac{(FeatureValue(t) - FeatureValue(0))^2}{FeatureValue(0)}$$

It should be noted that an embodiment may determine and detect a "growing region" in connection with other lighting views, such as the overhead view because of light scattering. However, the thermal view may be the preferred view used in an embodiment. An embodiment, however, may prefer to use frames with the thermal or darkened view rather than the overhead view since the thermal view may provide for earlier detection.

It should be noted that in instances when fires are closely located under the overhead light in connection with the overhead lighting view, the number of pixels in the connected bright region may be best for early detection with cross confirmation of detection using additional different lighting views.

As described herein, an embodiment may use the hotspot detection techniques with a test region corresponding to all or a portion of each frame. Additionally, an embodiment using the hotspot detection techniques described herein may also consider additional criteria in selecting one or more thresholds and other processing steps in order to minimize adverse effects, for example, due to the existence of background noise, illumination irregularities, temperature variation, aging effects of cameras, vibration, and the like.

In accordance with techniques described herein, an embodiment may determine small and consistent clusters of similar pixel grey levels at an early stage of formation using the connected bright region. As described herein, the connection premise is based on both pixel location and intensity or brightness. Detection of hotspots, flames, reflections, and the like may be performed using the techniques described herein with the "thermal view" when all controlled lights are turned off.

As described in more detail in following paragraphs, an embodiment may also have an additional time-based connectivity criteria imposed on clustering pixels. In other words, before a given pixel is classified as being included in a connected bright region as determined for a particular frame, an embodiment may also determine whether the given pixel exhibits one or more similar properties for one or more previous frames. For example, before a pixel is classified as being included in the connected bright region for a frame at time "n", the same pixel should be included in the connected bright region for one or more frames, or portions thereof, at one or more times prior to "n".

Referring now to FIG. 64B, shown is an illustration 5004 of the pixels included in a connected bright region determined for different frames processed at different points in time (t0, tk-2 . . . tk). The pixels included in the connected bright regions 5002a-5002c determined at different points in time are indicated by shading.

As described elsewhere herein, an embodiment may set the hotspot brightness threshold relatively low in comparison, for example, to thresholds for smoke detection, since the dark or thermal view may, for example, be characterized as immune from the presence of light sources and vibration effects. An embodiment may monitor the percentage of pixels included in a connected bright region with respect to the total number of pixels in each frame, or test region, for hotspot/flame detection.

It should be noted that an embodiment may use a reference frame determined at a time, such as t=0, with the thermal view. This reference frame may be used, for example, to filter out other known of fixed sources of light, thermal energy, and the like. The reference frame, or portion thereof, may be, for example, subtracted from a frame, or portion thereof, at a later point in time prior to processing for determining a connected bright region.

In one embodiment using a Sony camera with an NIR filter centered around 880 nm, a gray level between 50 and 100 may be used a brightness threshold for hotspot/flame detection. An embodiment may select this or another brightness threshold in accordance with black body experiments that set the camera/lens physical limitations in detecting hot spots using a thermal view by examining one or more histograms as described elsewhere herein. In other words, as described elsewhere herein, the brightness threshold may be determined, for example, using empirical analysis and in accordance with the particular hardware, such as camera type. It should be noted that the brightness threshold in this embodiment being coupled with the added condition that pixels also be connected may allow an embodiment to use a lower brightness threshold than, for example, in an embodiment using hotspot detection without any connectedness criteria.

For example, an embodiment may run experiments using a blackbody at a distance of 10 meters from the camera at 350 degrees Celcius in determining a brightness threshold with a thermal view. Particular conditions used may be determined based on camera limitations and lens or filter limitations. Using a hotspot detection technique without connectivity, an embodiment may use a first threshold of 78 gray level. For use with the techniques described herein for hotspot detection with the connected bright region described herein, a lower threshold, such as 60 gray level, may be used as the brightness threshold. The embodiment may also determine, for example, by examining histograms obtained using a thermal view, that in the presence of no flames or reflection, a "cold" pixel intensity of around 23 gray level may be determined. It should be noted that an embodiment may use techniques as described herein in determining a starting brightness threshold value that may be adjusted in accordance with other testing or modifications in accordance with each embodiment.

An embodiment may use a connectivity-based feature that may be referred to herein as the percentage of "hotspot coverage" which may be defined as the ratio of pixels included in a connected bright region for a frame over the total number of pixels (i.e. 640*480=307200 pixels). In one embodiment, as described elsewhere herein, a pixel may be considered as included in a connected bright region if its intensity exceeds a certain threshold and so do a number of its neighboring pixels (both in space plan and in time axis) using the techniques described herein. In other words, an embodiment of the GrowingRegion function may determine a pixel as included in the connected bright region for a frame, or portion thereof, based on a brightness threshold or intensity, a minimum number of neighboring pixels, 4 or 8 pixel connectivity, and a time connectivity parameter of K specifying whether the pixel has been included in K or more previous connected bright regions associated with other frames determined at different points in time, K being greater than or equal to zero (0). The last criteria, K, may also be specified as an additional function parameter in an embodiment.

Following are some selection criteria that may be used in an embodiment in determining values used in connection with the techniques described herein. However, it should be noted that an embodiment may use different values in accordance with the particular types of fires and conditions in each test environment. The time connectivity parameter (K) is in some sense a parameter of non-linear filtering. A given pixel is categorized as being included in a connected bright region only if it is labeled as such for the previous K consecutive frames. An embodiment may select a particular value of K in accordance with the storage requirements and capacity of a particular embodiment. In an embodiment using K>0, pixel values for each frame, or portion thereof, being maintained for K frames need to be stored in memory to insure time-connectivity. For example, if a time-connectivity parameter of 3 is imposed, an embodiment may maintain pixel values, or indicators as to whether each pixel is included in the connected bright region for a frame, for the previous 3 frames to check detection continuity.

The hotspot coverage feature, expressed in percentage, as may be used in an embodiment may be computed using the following equation:

$$HotSpot\ Coverage(t_k) = \frac{100}{\left(\left(\frac{M}{2}-1\right)\times\left(\frac{N}{2}-1\right)\right)} \times$$

$$\sum_{m=1}^{(\frac{M}{2}-1)}\sum_{n=1}^{(\frac{N}{2}-1)}\left\{\left[\sum_{i=(2m-1)}^{i=(2m+1)}\sum_{j=(2n-1)}^{j=(2n+1)}(P(i,j;t_k) > H_0\right] > C_0\right\}$$

In the foregoing:
(M,N) designates the frame dimensions (i.e. 640×480);
$H_0$ is the hotspot threshold (e.g. 60 gray levels); and
$C_0$ is the clustering threshold or minimum number of neighboring pixels (i.e. 7 pixels) based on a selected connectivity type, such as the 8-pixel connectivity type.
A time connectivity of order K applied to a pixel p of coordinates (i,j) means that:

$$\left\{\left[\sum_{i=(2m-1)}^{i=(2m+1)}\sum_{j=(2n-1)}^{j=(2n+1)}(P(i,j;t) > H_0)\right] > C_0\right\} \text{ for } t=t_k, t_{k-1}, \ldots, t_{k-K}$$

An embodiment may use the foregoing hotspot coverage metric in determining growth of a connected bright region. An embodiment may determine this metric for each frame and compare the metric value of a frame to a hotspot coverage threshold, such as, for example 1%. When the metric value meets or exceeds this hotspot coverage threshold, a hotspot may be detected. The hotspot coverage threshold may be determined as what percentage of the pixels of a frame, or portion thereof, being analyzed may indicate a threshold presence of a hotspot as an indicator of a fire condition.

It should be noted that an embodiment may use the foregoing techniques applied to a set of pixels after detection of a first or preliminary condition. For example, an embodiment may first make a determination that a global or frame intensity threshold is met prior to performing the foregoing on a portion of a frame at the pixel level. For example, if the mean frame intensity does not exceed a certain global threshold then, there is no need to perform the foregoing computation at the pixel level for the frame, or portion thereof. An embodiment may also perform processing such that, once a hotspot is detected using the foregoing techniques, the foregoing techniques for hotspot detection may then be performed for subsequent frames without requiring the occurrence of the first or preliminary condition.

In selecting the minimum number of neighboring pixels, an embodiment may desire to select a value large enough in accordance with, for example, aging effects, vibration, and temperature variability such that these conditions do not lead to misleading results. An embodiment may select, for example, 7 or 8 as the minimum number of neighbors when using an 8-pixel connectivity to insure that pixels of interest are fully connected and non-isolated.

It should be noted that an embodiment using the hotspot coverage feature and other described herein may have a higher sensitivity to the brightness threshold than other parameters and values selected, such as, for example, the minimum number of neighboring pixels. As described elsewhere herein, the brightness threshold is hardware-dependent and an embodiment may preferably select this in accordance with criteria and specifications of the production camera/lens/light source combinations to set the optimal threshold for an embodiment.

It should be noted that in an embodiment using the foregoing techniques in connection with the thermal lighting view, the foregoing techniques may be used without a reference frame to account for initial cargo bay view. In one embodiment, the thermal lighting view may be completely dark except for NIR sources that should not emit any radiations during thermal view acquisition. The absence of a frame of reference for this analysis makes the technique less sensitive to vibration.

To minimize the processing time using the hotspot coverage feature described herein, an embodiment may selectively implement the foregoing connectivity equations taking various arithmetic considerations into account such as, for example, constants at each loop iteration. For example, a first portion of the hotspot coverage equation of $$\frac{100}{\left(\left(\frac{M}{2}-1\right)\times\left(\frac{N}{2}-1\right)\right)}$$

forms a constant that may be calculated once for the entire processing rather than, for example, for each and every iteration. Additionally, an embodiment may use the foregoing features described herein to process every predetermined number of frames or pixels within a frame, during particular times, subsequent to detection of a first or preliminary condition, and a combination of any of the foregoing.

As described herein, the dark or thermal view may be used with detection techniques described herein. Use of this particular view may be preferable over other views in some embodiments in connection with different types of fire conditions that may occur in an embodiment, such as, for example, TF2 fire conditions. For example, an embodiment may use a less stringent condition on the hotspot coverage percentage for early detection with a thermal view than in connection with other views. An embodiment may also use the foregoing hotspot detection techniques with less stringent conditions for the hotspot coverage percentage when coupled with results from other smoke detection techniques using other illuminated views. For example, rather than have use a hotspot coverage percentage threshold of 1%, when coupled with other smoke detection techniques, a hotspot coverage percentage threshold of 0.02% may be used in an embodiment.

One embodiment of the foregoing technique based on both time and space of pixel connectivity may be used in detection of hotspots and/or flames at early stages, such as prior to detection by a conventional smoke detection system, while being less sensitive to vibration and noise. An embodiment may also use lower detection thresholds in combination with smoke indication via other illuminated views for detection of particular fire conditions, for more reliable detection, and the like, such as, for example, in connection with early detection of TF2 fires. An embodiment may use the foregoing techniques with the thermal lighting view.

Figure 65:
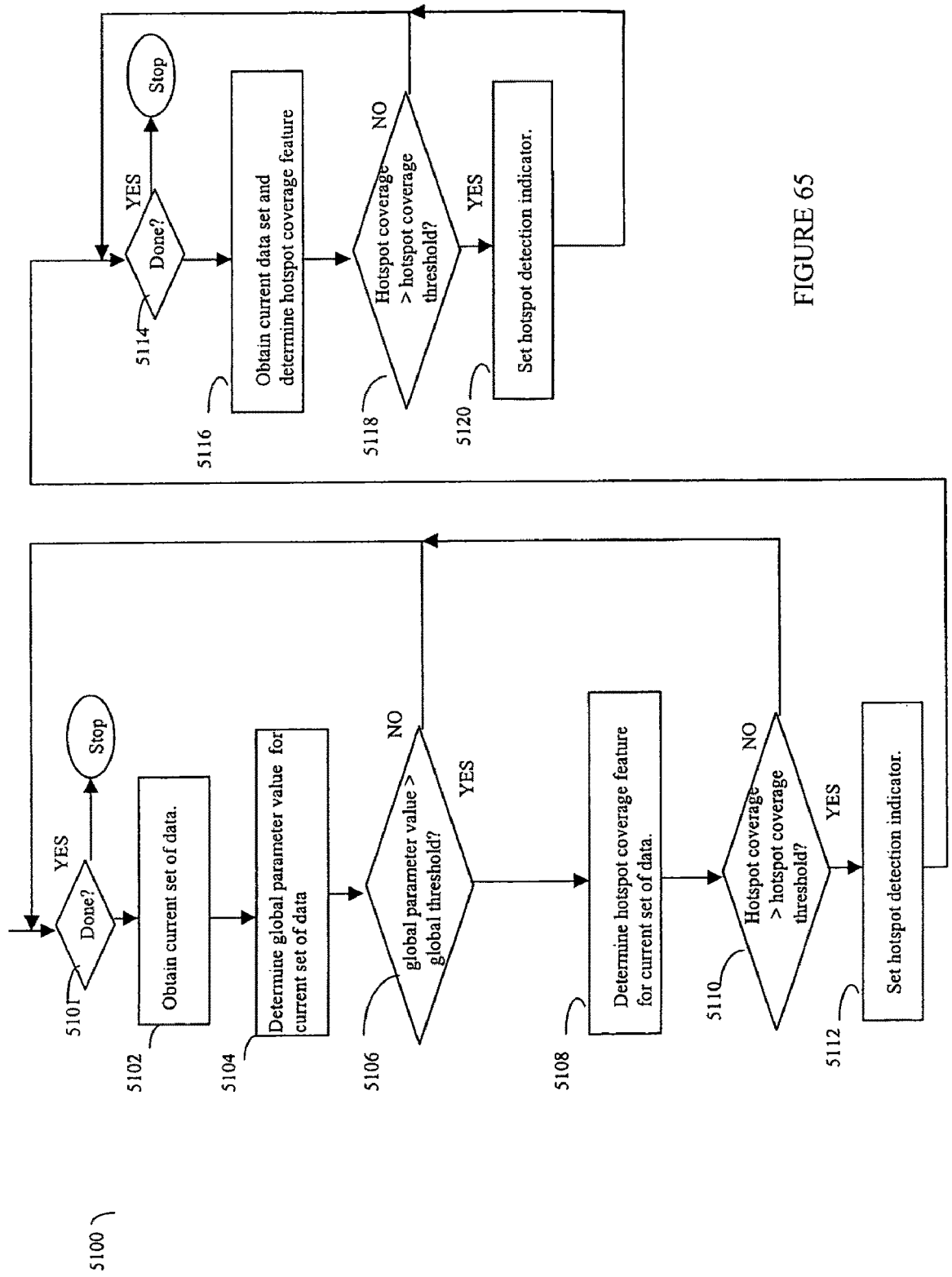
FIG. 65 is a flowchart of steps of one embodiment for hotspot detection.

Referring now to FIG. 65, shown is a flowchart 5100 of steps of one embodiment for hotspot detection using the techniques described herein. The processing steps of flowchart 5100 summarize processing steps that may be performed in an embodiment as described above. At step 5101, a determination is made as to whether are any data sets, such as frames or portions thereof, for processing. If not, processing stops. Otherwise, control proceeds to step 5104 where a global parameter value is determined for the current set of data. The global parameter value may be, for example, a characteristic about an entire frame of data, such as mean frame intensity, as described elsewhere herein. Other metrics characteristic of the entire frame may also be used. It is determined at step 5106 whether the global parameter value for the current set exceeds a particular global threshold. For example, the global threshold for the mean frame intensity may be determined heuristically based on empirical analysis. An embodiment may also use other techniques, such as a neural network that sets a global threshold, for example, to minimize the mean square error between actual and predicted values. Other techniques may be used in an embodiment. If the global threshold is not exceeded, control proceeds to step 5101. Otherwise, control proceeds to step 5108 to determine the hotspot coverage feature for the current set of data using the entire frame, or a portion thereof. At step 5110, it is determined if the hotspot coverage exceeds the hotspot coverage threshold. In one embodiment, this may be determined as 1% using the hotspot coverage equation described elsewhere herein. This value may vary in accordance with each embodiment. If the hotspot coverage threshold is not exceeded, control proceeds to step 5101. Otherwise, control proceeds to step 5112 to set a hotspot detection indicator. It should be noted that this indicator may be produced as an output of hotspot processing and may be used in connection with one or more other inputs in producing a fire detection signal for the system. The indicator at step 5112 may be set to high, for example, for a predetermined amount of time, such as in processing the current frame. Subsequently, the indicator may automatically reset to off indicating no hotspot when processing of the next cycle, frame, and the like, begins. Control proceeds to step 5114 where a determination is made as to whether processing is complete. If so, processing stops. Otherwise, control proceeds to step 5116 where the next data set is obtained for the next frame and the hotspot coverage feature is determined. At step 5118, it is determined if the hotspot coverage feature exceeds the hotspot coverage threshold. If not, control proceeds to step 5114. Otherwise, processing proceeds to step 5120 to set the hotspot detection indicator.

The foregoing processing of 5100 illustrates and embodiment in which the hotspot coverage feature is determined for a frame, or portion thereof, only if a first or preliminary condition is met. In this example, it is a global characteristic threshold. Once the first condition is true, the hotspot detection is performed. Additionally, once an initial hotspot has been detected using one of the techniques described herein, the hotspot coverage feature is determined for subsequent data sets.

In the foregoing processing of 5100, the hotspot detection indicator may be set multiple times in connection with each one or more frames processed. This may be used as an input for a particular cycle in connection with timing for particular hardware and/or software components evaluating whether there is a fire, smoke and the like, for a predetermined time period.

It should also be noted that an embodiment may choose to set a hotspot indicator once and have the indicator remain high rather than reset for subsequently processed frames. For example, an embodiment may perform a trend analysis and set the indicator once a pattern is observed for a predetermined number of frames.

Figure 66:
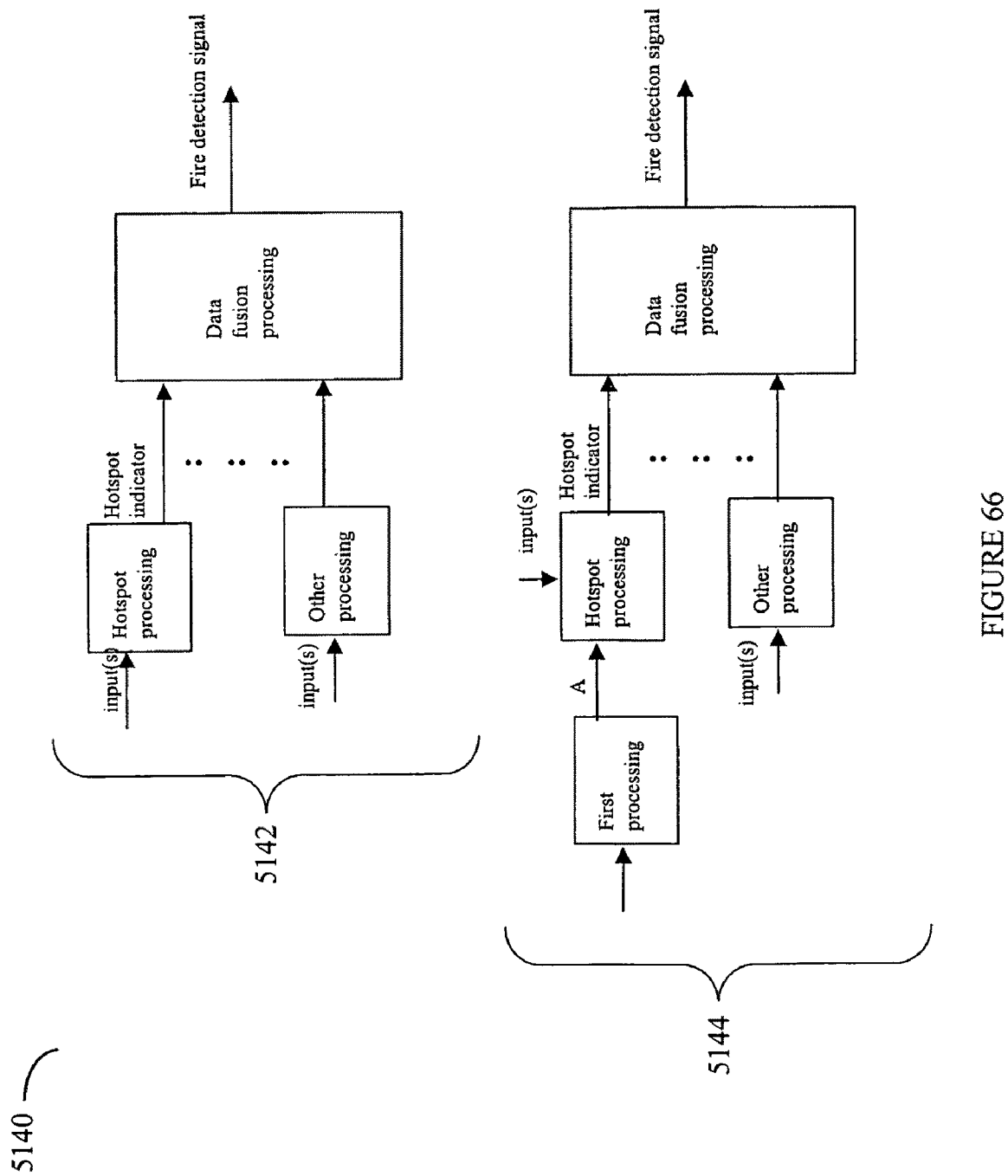
FIG. 66 is an example of two representations of how hotspot indicators may be used with system components for fire detection.

Referring now to FIG. 66, shown is an example of two representations 5140 of how the hotspot indicator may be used in connection with other system components. The processing and techniques described herein may be embodied in software and/or hardware for processing data signals input to the hotspot processing. As an output, the hotspot processing may output a hotspot indicator. In 5142, this hotspot indicator may be one of other inputs used in connection with data fusion processing to output a system level fire detection signal. In 5144, a first processing may output a first processing signal A, such as described in connection with flowchart 5100 processing. The hotspot processing may only be performed when the output A is set. The hotspot indicator may then be used as an input to data fusion processing to produce the system level fire detection signal. Other arrangements may be used in an embodiment in connection with the forgoing techniques described herein. In the foregoing arrangements, the hotspot indicator may be set on high, with or without a reset, and used as an input for processing into data fusion processing.

What will now be described are techniques that may be used in connection with dust mitigation for the purpose of smoke detection, for example, in cargo bays using video images.

The techniques described in following paragraphs may be used in an embodiment of a system, such as the system of FIG. 1 and its variations described herein, for detection and verification of fire in aircraft cargo bay. The techniques described in following paragraphs may be used to provide the aircrew with images of the cargo bay and its conditions, and to detect fire and selected non-fire conditions before the conventional smoke detection system. In one embodiment, the system's primary detection may be characterized as video based. Criteria of the system in this embodiment may include that it must detect fire and non-fire events significantly faster than the traditional system. One such fire condition is smoke. Other embodiments may have different performance criteria.

While fog may be characterized as a non-fire condition that causes false alarms in the traditional smoke detection system, feathers (or other sizable airborne morsels) and dust may also cause false alarms. Smoke includes water vapor and both oxidized and un-oxidized particles that may cause a problem in distinguishing fire conditions from non-fire conditions.

What will now be described are techniques that may be used to mitigate the obscuration effect caused by dust in a cargo bay environment based on video data. The techniques described herein may be used in an embodiment that properly confirms all smoke/fire conditions while also properly classifying as many non-smoke/fire conditions as possible. In other words, as described herein, an embodiment may operate in accordance with one or more performance criteria that include, for example, proper classification of all fire cases while also minimizing the number of non-fire cases improperly classified. It should be noted that the techniques described herein may be used in connection with detecting different types of fire and dust conditions. Described herein are a combination of thresholds and conditions that may be used in an embodiment such that the system using the techniques described herein may properly classify and detect a portion of the dust cases while properly classifying all fire cases. Dust cases that do not reach the specified thresholds are properly classified as a non-fire condition while all fire cases exceed the thresholds.

An embodiment may use the techniques described herein to analyze video data with the focus on setting detection thresholds that allow some dust cases to be properly classified, while properly confirming smoke-related cases in all instances. One problem in discriminating dust from smoke is the similarity of particles that may appear in the event of a smoke condition and also for dust. Because of this, complete discrimination of smoke from dust may not be a plausible objective or performance criterion. Rather, the techniques described herein may be used in connection with raising the detection bar to properly classify as high a percentage of dust cases as possible, while allowing for some extreme dust cases to be misclassified as smoke (i.e. fire). On the other hand, all fire cases, in which smoke is present, should always be detected and classified as such. As described in following paragraphs, it may also be desirable to identify different dust types and conditions differ significantly from all smoke cases, and which are too similar to smoke conditions to be classified properly. This may be used in an embodiment to identify a set of one or more dust conditions that may be properly classified before flagging a smoke condition used to indicate the presence of a fire. The foregoing may be used to define criteria and qualification test conditions. Described in following paragraphs are two different technical approaches to assess the system performance in connection with dust detection and discrimination.

A first approach may be characterized as using frame intensity-based thresholding in which a thresholding baseline for detection is selected so that the system properly classifies some dust scenarios as non-smoke related without missing any smoke conditions. It should be noted that the techniques described herein may not discriminate between dust and smoke in all instances. Rather, the selection of thresholds may be determined such that the detection thresholds properly classify some dust cases that do not reach the detection thresholds while allowing all smoke conditions to exceed those thresholds.

The average absolute gray level intensity, as described in more detail in following paragraphs, may be used in an embodiment for detection of a portion of dust cases while also allowing for proper classification of all fire conditions. This approach provides a minimum performance level that the system is anticipated to reach. An embodiment may also use any one or more factors in connection with determining detection thresholds. For example, an embodiment may use conditions particular to an embodiment such as those based on vibration levels. An embodiment may also use heuristics in adjusting feature values and/or associate thresholds for better performance, as well as general know-how gained through experience and as may be obtained through empirical testing and/or simulation. It should be noted that an embodiment may use the average absolute gray level with one or more other thresholds associated with other features, as described elsewhere herein, for additional flexibility in order to maximize the number of dust cases to be properly dismissed by the system while confirming all smoke cases. The additional features may include, for example, the maximum pixel intensity, size of bright areas, connected bright regions, and the like.

The average absolute gray level intensity is a feature that may be determined for a frame, or a portion thereof of interest by subtracting a background or reference image. The background or reference frame may be determined, for example, offline prior to gathering and analyzing video data. The reference frame may be represented, for example, at a time t=0. A different reference frame may be determined and used for each lighting scenario or view used in an embodiment. The reference frame may also be a fixed frame other than one obtained, for example, prior to flight or gathering data in real-time. The reference frame for one or more views may be updated or changed as the conditions in an environment may change. In connection with the techniques described herein, it should be noted that all or portion of a frame may be analyzed. In one embodiment, a portion of a frame analyzed may be determined in accordance with different lighting views in accordance with the physical location of the particular lights included in an embodiment as well as the location of the area under analysis, such as the location of the gap space above a cargo bay area. Using a portion of a frame may provide for a localized analysis in an embodiment.

The average absolute gray level intensity may be determined for the frame of interest, or portion thereof, as may be designated using a local mask. The average absolute gray level may be represented as:

$$\mu(t) = \frac{1}{N_m \times M_m} \sum_{i=1}^{N_m} \sum_{j=1}^{M_m} |P(i, j; t) - P_{Ref}(i, j; t_0)| \qquad \text{EQUATION DM1}$$

where:

$P(i, j; t)$ is the pixel value within a frame at location (i,j) and time t;

$P_{Ref}(i, j; t_0)$ is the pixel value at location (i,j) of the reference or background frame at time 0; and $N_m$ and $M_m$ are the local mask (that could be around entire frame) dimensions.

In one embodiment, the pixel value is defined as the pixel intensity level, such as a gray level between 0 (black) and 255 (white), for the frame of interest at the designated pixel coordinates (i,j) and time (t). The pixel value range may depend on characteristics of image acquisition hardware and/or software. For example, if a 16-bit intensity depth is used, the range may be from 0 (black) to 65535 (white).

Figure 67:
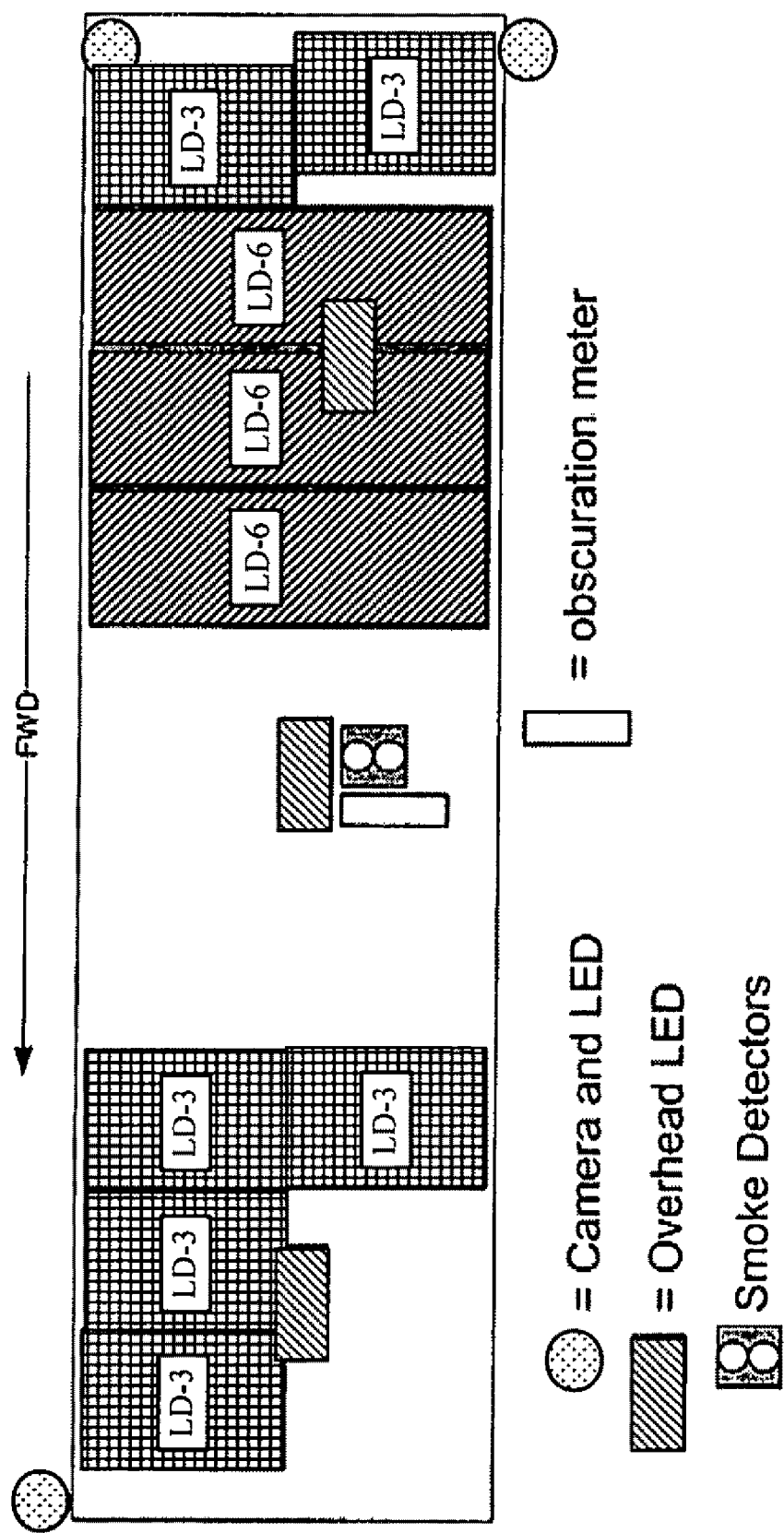
FIG. 67 is an example of one configuration of a system in an area being monitored for fire detection.

Note that applying the absolute value at the pixel-difference of interest as indicated in EQUATION DM1 may be used to account for any change in the image intensity whether such change is positive or negative. This may be used to compensate for instances where changes in the frame intensity may not be reflected in the average frame intensity value. This may occur, for example, when the frame exhibits an intensity increase in one part and an intensity decrease in another part. This is the case, for instance, where both phenomena of light scattering (i.e. increasing intensity) and dimming (i.e. decreasing intensity) are observed at the diagonal view, or the case of smoke moving or fire flickering in the pilot view. The goal of using this technique in one embodiment is to set a thresholding baseline for detection so that the system properly confirms some dust scenarios without missing any smoke-related occurrences. In one embodiment, the cameras used may receive NIR light. An embodiment may use any one or more particular arrangements of lighting, cameras, and the like. For example, one embodiment may use the arrangements, types, and variations thereof as also described herein, with reference to FIG. 1. Another arrangement of lighting and cameras that may be used in obtaining one or more data values is illustrated in FIG. 67. The techniques described herein may be performed in hardware and/or software of the system of FIG. 1 using the arrangement of FIG. 1, the arrangement of FIG. 67, or a variation thereof.

For all cameras used in an embodiment, each camera may provide video data sampled at different points in time at one or more sampling rates for each of four different views of a scene: the thermal view (i.e. all lights off), pilot view (i.e. own camera light on), overhead view (i.e. only overhead heads lights on), and diagonal view or opposite view (i.e. opposite camera light on). All of these views are described elsewhere herein in more detail. It should be noted that an embodiment may not process data from the thermal view in connection with dust mitigation techniques described herein. It should be noted that an embodiment may prefer to obtain video data at a sampling rate, for example, of 1 frame per second. Although any sampling rate may be used in an embodiment, it may be preferred to use as a high sampling rate as possible. The preferred sampling rate may vary in accordance with each embodiment.

It should be noted that any one of a variety of different techniques may be used in connection with determining a threshold value for the foregoing feature of EQUATION DM1 and other features described herein. What will now be described is one way in which an embodiment may determine a threshold value using detection modes with different associated thresholds.

In one embodiment, various detection modes may be defined. Test runs may be performed and evaluated using the various thresholds associated with each detection mode in accordance with system criteria. This is one technique that an embodiment may use in determining appropriate thresholds to use. An embodiment may also choose to readjust threshold values and other system parameters at run time during data acquisition, use and evaluate previously collected data, use general know-how, and the like, in establishing threshold values.

In one embodiment, detection of a fire condition may be declared if at least one of the cameras, via at least one of its 3 various views (excluding the dark or thermal view), exhibits an increase in the average absolute gray level of EQUATION DM1 that exceeds a given threshold for a given period of time. In such case, detected incidents are flagged as smoke conditions as may be related to fire events. An embodiment may also further use other techniques described herein to additionally distinguish that a confirmed fire condition produced using these techniques is not fog, or another non-fire condition.

A rationale that may be used in an embodiment is to set thresholds in terms of noise magnitude caused by vibration. In one embodiment, the system may operate in various vibration and background noise levels and such values may be used in determining thresholds used in connection with the average absolute gray level for fire detection. For example, an embodiment may select a threshold based on a previous analysis of laboratory vibration data. An average gray level may be selected that is a reasonable level to account for image displacement due to vibration. In general, the level of intensity change due to vibration may depend on the particular data acquisition hardware and software characteristics, including resolution of intensity, and on vibration levels that the system is expected to accommodate. Other embodiments may use other thresholds with this and other techniques described herein that may be determined in accordance with particular conditions of each embodiment.

In determining a threshold value, an embodiment may select a set of different threshold candidates. Each of the different threshold candidates may be associated with a different level of detection. An embodiment may run test data using these various candidate thresholds in accordance with one or more performance criteria specified in accordance with an embodiment to determine which one or more candidate threshold values may be preferred for selected performance criteria. In one embodiment, four detection modes may be used that are defined in accordance with a gray level threshold candidate to be held for a specified number of samples or time period as follows:

1. Very stringent mode. The detection threshold is set to K1 times the vibration level (where K1 may be, for example 4, and the threshold may equal, for example, to 12 gray levels) for a period of at least T1 samples (which may equal, for example, to 20 seconds)
2. Stringent mode. The detection threshold is set to K2 times the vibration level (where K2 may be, for example, 3, and the threshold may equal, for example, to 9 gray levels) for a period of at least T2 samples (which may equal, for example, to 15 seconds).
3. Moderate mode. The detection threshold is set to K3 times the vibration level (where K3 may be, for example 2, and the threshold equal, for example, to 6 gray levels) for a period of at least T3 samples (which may equal, for example, to 10 seconds).
4. Tolerant mode. The detection threshold is set to K4 times the vibration level (where K4 may be, for example 1, and the threshold may equal, for example, to 3 gray levels) for a period of at least T4 samples (which may equal, for example, to 5 seconds).

It should be noted that the foregoing assumes that the vibration level (e.g., the intensity change level due to vibration) is equal to 3 gray levels. However, other embodiments may use different detection thresholds according to different vibration levels. Note that the multipliers K1 to K4 as well as the vibration level being multiplied may differ according to the view being analyzed. That is, different values of K1 through K4 may be used for opposite, overhead and pilot views. An embodiment may also use different numbers of samples T1 through T4 in different detection modes, according to image acquisition hardware and software characteristics. Additionally, an embodiment may use more or less than the number of detection modes and associated thresholds defined above. In particular, only one of the above detection modes may be used by an embodiment, based on the performance requirements and the environmental conditions. For example, the system may switch between the different detection modes depending on the flight phase. Alternatively, a single mode may be always in effect for the particular embodiment, based on the specific performance requirements for the aircraft in question. One embodiment may determine the average absolute gray level as a feature for each frame of data gathered. This data may be analyzed in accordance with the appropriate threshold for the detection mode currently in effect and for the view being analyzed. A fire condition is detected if at least one of the cameras for at least one of the views meets the threshold condition.

In one embodiment, the system's performance for a given detection mode may be measured in accordance with one or more performance criteria. For example, in one embodiment, the performance criteria may include the number of fire cases successfully detected ahead of a conventional smoke detector, and the number of dust cases properly classified. In one embodiment, the following performance criteria may be used in order of priority, to rank the various detection modes and associated thresholds: permit the proper detection and classification of all fire cases ($1^{st}$ performance criterion), provide for detection of fire cases with as long a lead time as possible prior to detection by the conventional smoke detector, ($2^{nd}$ criterion), properly classify dust conditions, ($3^{rd}$ criterion), and allow a relatively long time with respect to the monitoring period before the feature exceeds a specified threshold due to dust.

An embodiment may determine, for example, through testing, the system performance under a tolerant mode indicates that an embodiment may select a detection threshold higher than K4 times the vibration level threshold in order for some dust cases to be properly confirmed. An embodiment may find that improvement of dust performance confirmation is possible at the expense of decreasing fire detection capability. This may vary in accordance with each embodiment and configuration being monitored.

In one embodiment using the foregoing moderate mode, the detection bar is raised so that some of the dust conditions are properly classified while all fire cases are timely detected ahead of the onsite smoke detector. Raising the detection bar has the benefit of not setting the fire indicator in cases of few aerosol concentrations (e.g. fog or dust), but also has the downside of delaying smoke/fire detection time. Different types of conditions associated with dust may be detected and properly classified as a non-fire condition using the thresholds of the moderate mode.

An embodiment may also use thresholds selected in accordance with a defined stringent mode in order to properly classify additional non-fire dust conditions. Increasing the threshold provides for properly classifying additional dust cases as compared to the moderate and tolerant levels having an increased dust concentration without missing fire related conditions.

At the very stringent mode, fire-related conditions may be missed as a result of the higher threshold. In accordance with the performance criteria of one embodiment for which all fire-related conditions should be properly confirmed, the very stringent mode may be unacceptable even though the number of dust conditions properly detected increased as compared to other modes.

One embodiment using the average absolute gray level as defined herein may set a thresholding baseline for properly classifying dust conditions while not missing any smoke-related fire cases. One purpose of this approach in one embodiment may not discriminate dust from smoke, but rather set detection thresholds to provide a minimum performance level that the system is expected to reach. It also allows for certain rationale to set the detection thresholds based on vibration levels. Different thresholds may be evaluated in accordance with particular performance criteria. In one embodiment, for example, using the foregoing four modes may determine that the "stringent" mode, where the average intensity threshold is set around 3 times the vibration level and the multiplier K2 is 3, may be used as an optimal setting in an embodiment to properly detect about 50% of dust scenarios similar to those conducted using test data as described herein while also properly detecting all smoke-related (fire) cases at least 30 seconds before the conventional smoke detector.

It should be noted that the foregoing thresholding technique may be used in an embodiment as described herein regardless of the camera location (Fwd or Aft), lighting scenarios(i.e. pilot, overhead, or diagonal), and regardless of the intensity increasing rate. Other embodiments may use variations of the values, conditions, criteria, and the like, in accordance with each embodiment. It should also be noted that the average absolute gray level grew steadily and fast in the case of fire in contrast to the dust scenarios where values of the average absolute gray level grew at a very slow rate to reach a steady state. An embodiment may also take this into consideration when selecting the detection thresholds used. In other words, the average absolute gray level may be characterized as generally higher in the presence of smoke than dust at a particular point in time.

Additionally, an embodiment may use a rate of change feature based on the average absolute gray level. The rate of change may be calculated as $$\delta_\mu = \frac{\mu(t) - \mu(t - \Delta t)}{\Delta t}$$

where $\mu(t)$ and $\mu(t-\Delta t)$ are the values of the average absolute intensity feature at times t and t–$\Delta t$, respectively. Values of this feature will be typically higher in smoke than in dust conditions, particularly in a cargo bay environment with no fresh dust sources, where dust concentration is not likely to rise rapidly, as opposed to fire conditions, where smoke concentration rapidly increases due to combustion.

It should be noted that an embodiment may include different detection thresholds and one or more different modes than as described herein.

Figure 68:
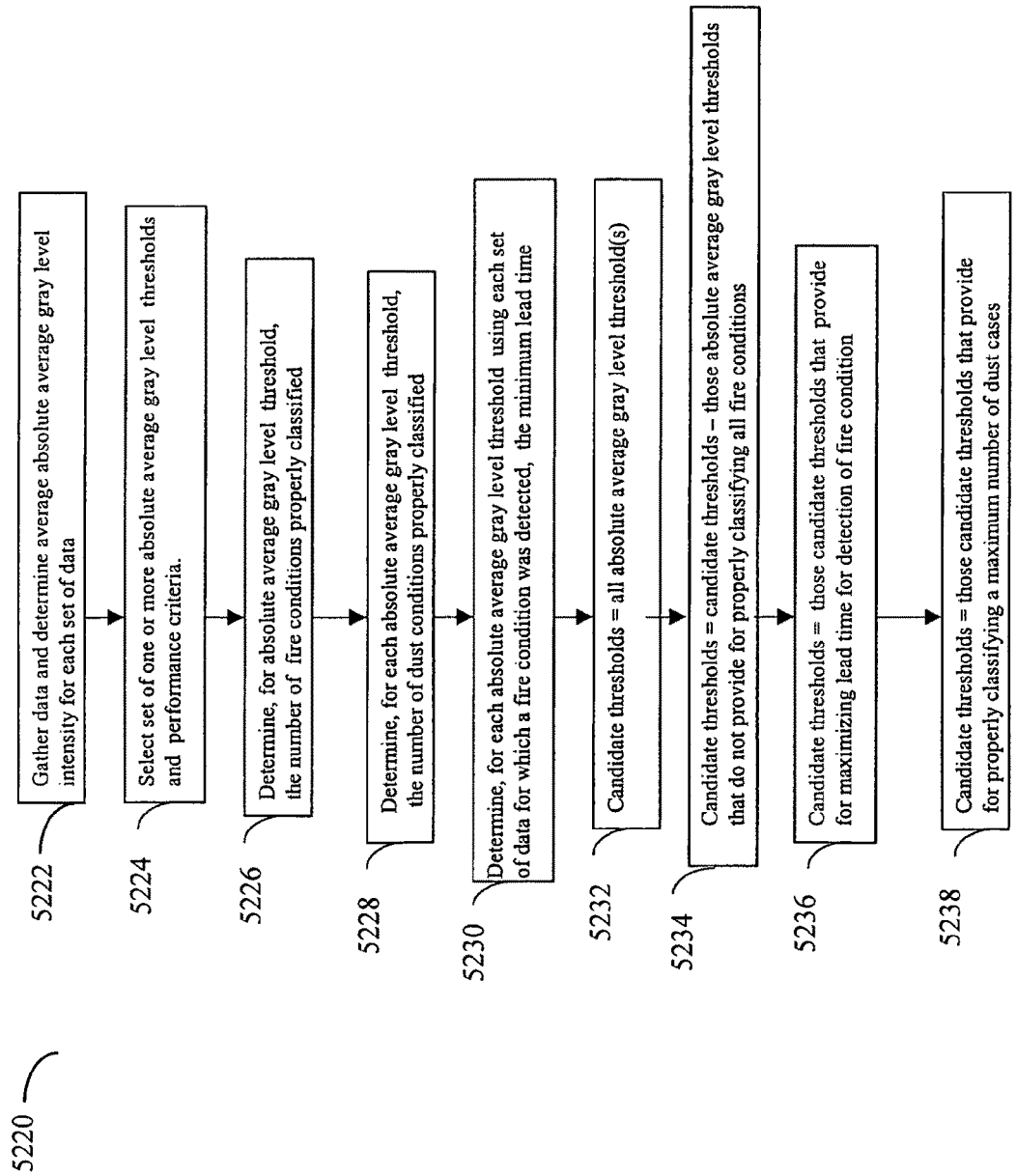
FIG. 68 is a flowchart of steps of one embodiment for determining detection thresholds.

Referring now to FIG. 68, shown is a flowchart 5220 of steps of one embodiment for determining detection thresholds that may be used. It should be noted that an embodiment may perform the steps of 5220 off-line prior to running the system for fire detection and/or verification. It should also be noted that the steps of 5220 may be characterized as part of system design. In other words, an embodiment may perform the steps of 5220 prior to operation. During operation, an embodiment may switch between a set of predetermined thresholds, adjust thresholds continually within predetermined ranges in accordance with current conditions, and the like. The threshold ranges or sets may be determined in an embodiment prior to operation, such as part of 5220 processing. It should also be noted that an embodiment may also use different techniques in selecting the threshold(s) prior to operation than as shown in 5220.

Also, although the steps of 5220 are described with reference to a single feature, the average absolute gray level, thresholds for one or more other features described herein may also be evaluated. The video data used in processing of steps 5220 may also be obtained from one or more different sources as also described herein such as from previously collected data, simulated test data, experimental test data, and the like.

At step 5222, data is obtained and the feature, the average absolute gray level, is determined for each frame, or portion of interest thereof. At step 5224, one or more average absolute gray level detection thresholds are determined and the performance criteria are determined. The one or more detection thresholds may be, for example, a value which indicates a fire condition when exceeded. An embodiment may select one or more detection thresholds to evaluate in an effort to determine which detection threshold(s) to use in accordance with the particular performance criteria.

At steps 5226, 5228, and 5230, the feature is evaluated in terms of the particular performance criteria specified in one embodiment. If other criteria are specified instead of, or in addition to, these criteria, these are also evaluated. At step 5226, the number of fire conditions properly classified is determined using each of the different average absolute gray level thresholds determined at step 5224. At step 5228, the number of dust conditions properly classified is determined in accordance with each of the different average absolute gray level thresholds. At step 5230, the minimum lead time is determined in accordance with each of the different average absolute gray level thresholds. As described elsewhere herein, the lead time is the amount of time that the technique and feature being evaluated determines a fire condition prior to detection of such condition by a particular conventional smoke and/or fire detector. The particular conventional detector used may vary with embodiment and may also effect the selection of various thresholds and criteria of an embodiment. At step 5232, an initial set of candidate thresholds is determined as all absolute gray level thresholds. At step 5234, elements from the set of candidate thresholds are eliminated if they do not meet a first performance criterion which, in this example, is the proper classification of all fire conditions. At step 5236, additional candidates may be eliminated if they do not meet a second performance criterion which, in this example, is the maximizing of lead time. An embodiment may eliminate particular candidates that do not always provide a minimum lead time. At step 5238, additional candidates may be removed if a predetermined number of dust cases are not properly classified. It should be noted that the foregoing processing may also produce a prioritized list of candidates and select a best from the list of candidates using one or more performance criteria.

The foregoing is an example of how an embodiment may establish and/or adjust one or more threshold values used in an embodiment. Other techniques may be used and other factors considered in determining one or more threshold values.

Once the one or more thresholds are determined for an embodiment, the feature of EQUATION DM1 may then be used in detection of a smoke and/or fire condition. It should also be noted that the techniques just described for determination of threshold(s) may be used in connection with determining other threshold values for one or more other features described herein, or otherwise used, in an embodiment.

What will now be described is a second approach that may be characterized as multifeature-based thresholding. In previous paragraphs, a single feature-based thresholding approach has been described. Now, a technique will be described using multiple features that may: include the foregoing average absolute gray level, use one or more additional features, or use different features without the average absolute gray level.

An embodiment may use the techniques described herein to discriminate as high a percentage of dust cases as possible, while allowing for some dust cases to be misclassified as a smoke condition (i.e. fire condition). On the other hand, an embodiment may include performance criteria such that thresholds are used such that all smoke-related conditions present with fire cases should always be properly classified. It may be desirable to establish which types of dust tests differ significantly from all smoke-related fire cases, and which are too similar to fires to be classified properly. This may be used in defining dust conditions which the system may discriminate from smoke conditions. This in turn may be used to define the system's performance criteria.

Based on the foregoing, image features and their corresponding threshold values may be selected in an embodiment such that they result in triggering an alarm condition for all smoke-related (fire) cases but do not trigger an alarm condition for most, or ideally all, dust cases.

In calculations used herein in one embodiment for this multifeature-based thresholding approach, the image features may be calculated from actual images, without subtracting a reference image. This multifeature-based thresholding approach may be contrasted to the previous approach using the average absolute gray level which makes of a reference frame. The advantage of not requiring a reference frame is that it may be characterized as robust with respect to small changes of the scene due to vibration or flexing of the airframe. Use of a reference frame in particular features may be desirable and useful in detecting and then tracking movement of objects within the scene.

An embodiment may use the following features:

Feature #1: Mean intensity value represented as:

$$\text{mean}(P) = \frac{1}{MN} \sum_{i=1}^{M} \sum_{j=1}^{N} P(i, j)$$

where:

M represents the number of pixel rows in the frame, or portion thereof, of interest;

N represents the number of pixel columns in the frame, or portion thereof, of interest;

P is the frame, or portion thereof,

P(i,j) is the pixel intensity or gray level at pixel position i,j in the image portion or region P.

This first feature measures the average intensity or brightness of the image, or portion thereof. High values correspond to bright images and lower values correspond to darker images. In case of diagonal, or opposing, and overhead lighting views, this feature may be calculated locally in a properly chosen portion of a frame, such as, for example, including the gap that may be located at the top of a cargo bay area. In smoke conditions, values of this feature typically decrease in diagonal or opposing illumination, and increase in overhead and camera's own illumination. In one embodiment, this may be determined as the average pixel gray level or intensity value for all the pixels included in the area of interest.

Feature #2: Maximum pixel intensity value represented as:

$$\max(P) = \max_{\substack{i=1,M \\ j=1,N}} P(i,j)$$

where:
M represents the number of pixel rows in the frame, or portion thereof, of interest;
N represents the number of pixel columns in the frame, or portion thereof, of interest;
P is the frame, or portion thereof,
P(i,j) is the pixel intensity or gray level at pixel position i,j in the image portion or region P.

This second feature may be preferably used in an embodiment with the diagonal or opposing illumination and may be computed for a portion of a frame, such as, for example, including the gap that may be located at the top of a cargo bay area. This feature measures a decrease of brightness of the LED illumination through smoke. This value drops much more sharply in smoke than in dust. This feature may be determined as the maximum pixel intensity or gray level value of all pixels in the area of interest.

Feature #3: Mean norm of gradient vector may be represented as:

$$\mathrm{mgrad}(P) = \frac{1}{MN} \sum_{i=1}^{M-1} \sum_{j=1}^{N-1} \sqrt{G_1(i,j)^2 + G_2(i,j)^2}$$

where
M represents the number of pixel rows in the frame, or portion thereof, of interest;
N represents the number of pixel columns in the frame, or portion thereof, of interest;
$G_1$ and $G_2$ represent vertical and horizontal components of intensity gradient, given by $$G_1(i,j) = P(i+1,j) - P(i,j)$$

$$G_2(i,j) = P(i,j+1) - P(i,j)$$

P is the frame, or portion thereof, of interest for the feature; and
P(i,j) is the pixel intensity or gray level at pixel position i,j in the image portion or region P.

This third feature may be characterized as measuring sharpness or detail information about the image or portion under analysis. Higher values for this feature that neighboring pixels often differ in intensity, which means that the image is sharp and detailed, or has a wide range of pixel intensity. Lower values of this feature correspond to images with blurred edges or details, or with narrow intensity range.

It should be noted that an embodiment may use other techniques in computing different approximations of intensity gradient and its norm, that may be easier and less costly to compute, such as $L_1$ norm formulation, or other approximations as described in, for example, R. C. Gonzales and R. E. Woods, *Digital Image Processing*, Prentice Hall, 2002, pages 134-135 and 577-579.

Feature #4: Norm of the second order moment matrix may be represented as:

$$\mathrm{norm2}(P) = \mathrm{norm}\left(\begin{bmatrix} SM20(P) & SM11(P) \\ SM11(P) & SM02(P) \end{bmatrix}\right)$$

where the second order moments SM20, SM02 and SM11 are defined via equations:

$$X\mathrm{center}(P) = \frac{1}{MN} \sum_{i=1}^{M} \sum_{j=1}^{N} iP(i,j)$$

$$Y\mathrm{center}(P) = \frac{1}{MN} \sum_{i=1}^{M} \sum_{j=1}^{N} jP(i,j)$$

$$SM20(P) = \frac{1}{MN} \sum_{i=1}^{M} \sum_{j=1}^{N} (i - X\mathrm{center})^2 P(i,j)$$

$$SM02(P) = \frac{1}{MN} \sum_{i=1}^{M} \sum_{j=1}^{N} (i - Y\mathrm{center})^2 P(i,j)$$

$$SM11(P) = \frac{1}{MN} \sum_{i=1}^{M} \sum_{j=1}^{N} (i - X\mathrm{center})(j - Y\mathrm{center}) P(i,j)$$

and where:
M represents the number of pixel rows in the frame, or portion thereof, of interest;
N represents the number of pixel columns in the frame, or portion thereof, of interest;
P is the frame, or portion thereof; and
P(i,j) is the pixel intensity or gray level at pixel position i,j in the image portion or region P.

This fourth feature is related to spatial distribution of intensity throughout the image or region of interest. If a single concentrated bright area is responsible for overall intensity increase, than the feature value may be relatively low, as high intensity pixel values are multiplied by small squared index differences. If high intensity is spread over the entire image or window, then the feature value will be higher.

It should be noted that an embodiment may use any one of a variety of different techniques in determining the matrix norm. As described herein, an embodiment may use a spectral matrix norm. However, an embodiment may also use another type of matrix norm, such as 1-norm or Frobenius norm, and the like. Such alternatives are well-known as described, for example in L. N. Trefethen and D. Bau, *Numerical Linear Algebra*, SIAM 1997, pages 19-23.

Feature #5: Size of bright region of a frame, or portion thereof, P may be represented as:

$$\mathrm{brsize}(P) = \sum_{i=1}^{M} \sum_{j=1}^{N} T(i,j)$$

where binary thresholded image T is defined through an intensity threshold and/or through connectivity parameters, as discussed elsewhere herein. A bright region may also be determined using only the intensity threshold without considering connectivity, or an embodiment may also consider how bright and connected the pixels are as described elsewhere herein in connection with determining a connected bright region. An embodiment may also use other techniques in connection with determining a bright region and the number of pixels therein than as described herein.

This fifth image feature measures the size either of the image of the opposite LED or of smoke/dust cloud illuminated by the overhead LED. In other words, the size of a bright area may be determined as a number of pixels using the opposite and/or overhead lighting view. The number of pixels exceeding a particular brightness threshold may be determined for a frame, or portion thereof. An embodiment may select a brightness threshold, for example, based on actual observed mean and maximum intensity and the size of the bright area as calculated. In smoke conditions, the size of the brightness region may decrease with a diagonal illumination and increase in overhead illumination. These changes are much sharper in smoke than in dust. It should be noted that an embodiment may determine a bright region as a connected bright region using techniques described elsewhere herein, for example, in connection with growing and shrinking regions. The techniques of 4 and/or 8 pixel connectivity and pixel brightness or intensity may be used in determining a number of pixels in a connected bright region.

In using the foregoing features 1-5 in an embodiment, a fire or smoke condition may be set if any one feature for any one view from one camera indicates such a condition. In other words, the output of an embodiment using the foregoing features may logically OR the indicators associated with each feature for each frame such that if any one feature crosses a threshold, a fire condition is indicated.

An embodiment may determine particular features in accordance with frames obtained with different lighting views. For example, an embodiment may determine feature 1, 3 and 4 for overhead lighting view, feature 1, 2, 3 and 5 for diagonal view, and feature 1, 2 and 3 for pilot lighting view. Other combinations of image features for different views may also be used.

It should be noted that an embodiment may combine any two or more features, such as those described herein, in accordance with one or more different views for use in an embodiment. Any particular pairings of features, views and the like should not be construed as a limitation of the techniques described herein.

A threshold may be specified for each combination of view and feature. For example, feature 1 may have 2 thresholds, one for the diagonal view and another for the overhead view. Similarly, other features may have one threshold for each view. An embodiment may determine these thresholds by empirical testing. The behavior of smoke as compared to dust is that smoke tends to exhibit a larger change from a long term base value or average value obtained over a relatively long period of time. The long term base value may be obtained, for example, by determining an average value based on historical data for a feature, using collected sample and/or test data, and the like.

For the opposite view, a single threshold value may be specified for each feature. It should be noted that the dimming effect with the opposite lighting view for smoke may be characterized as more severe than with dust. Thus, thresholds may be selected such that if the feature value associated with a frame is less than the threshold, a fire condition is indicated.

For the overhead view, a lower and an upper threshold value may be specified indicating an acceptable range with a lower end of: base value-lower threshold, and an upper range of: base value+upper threshold. It should be noted that in the presence of smoke for the overhead view, the total change (either dimming or brightening) is more severe in smoke than in dust. The thresholds should be selected such that all features stay within the range for all dust scenarios and at least one threshold is crossed (upper or lower bound) for all smoke scenarios.

It should be noted that an embodiment may have one or more thresholds associated with each feature as may vary with each feature used in an embodiment. Additionally, when a single threshold is specified for use in an embodiment, this may be an upper or a lower threshold. For example, an embodiment may specify a first lower threshold for use with the diagonal view and a feature, a second upper threshold for use with the pilot view for a feature, and an upper and lower threshold for use with a feature for the overhead view. The foregoing is just an example and the number of thresholds may vary with each feature and/or lighting view used in an embodiment.

For each of these features and each lighting scenario, a threshold may be determined by examining variations from the base value for dust and smoke test cases. For example, in determining thresholds for the opposite lighting view, an embodiment may determine the largest change from the mean or base value for dust, and the smallest change from the mean or base value for smoke. The threshold value selected in an embodiment may fall somewhere between these two values.

Other embodiments may use other techniques and consider other factors in connection with determining threshold values.

It should be noted that the foregoing, and other features, may be used and determined for an entire frame, or portion thereof, such as a portion including the gap in the cargo bay area, or including a particular lighting source. Additionally, the foregoing features may be determined for the particular views mentioned above as well as in connection with other lighting views and camera arrangements that may be used in an embodiment.

An embodiment may use opposing cameras, such as with reference to the aft left and forward right cameras of FIG. 67 for the opposing or diagonal lighting view, in connection with obtaining data for analysis using the multi-feature based thresholding approach as described above.

The foregoing 5 features may be characterized as using an absolute change approach. Any one or more of the foregoing 5 features may be used with a relative change approach that will now be described.

The relative approach technique uses the same image features 1 through 5 as described above. However, the feature values are not used directly for comparison against the threshold values. Instead, for each image feature, a ratio is calculated by dividing the current feature value by a corresponding reference value. If the ratio is significantly greater than 1, then the feature value has grown above its steady-state value. Likewise, if the ratio is significantly lower than 1, then the feature value has decreased below the steady-state value. For each case an appropriate threshold value may be chosen to indicate smoke condition.

It should be noted that an embodiment may be analyzing image data that may be characterized as having a high level of noise. Accordingly, an embodiment may optionally choose to perform one or more filtering steps. An embodiment may characterize data as being "noisy" if, for example, even in complete absence of any smoke or flame phenomena, feature trajectories display many oscillations. Filtering may be performed in an embodiment while not hampering fast smoke detection.

In one embodiment, a first filtering step may be performed. Time-series data for each numerical feature may be passed through a first-order filter $$y_{filt\,1}(k) = \alpha_{filt\,1}(k-1) + (1-\alpha)y_{row}(k)$$

with coefficient $\alpha_{filt}$ determining the time constant of the filter. For example, if one image per second is acquired and analyzed for a particular view, the filtering constant may be equal to $\alpha_{filt} = 0.6$, which would correspond to 95% settling time of 6 seconds. Larger values of $\alpha_{filt}$ may be used if images are more noisy, while lower values of $\alpha_{filt}$ may be used when noise intensity is lower. If images are acquired more frequently then once per second, then value of $\alpha_{filt}$ may be closer to 1. In an extreme case when images contain no noise at all, the constant value $\alpha_{filt} = 0$ may be used, which corresponds to no filtering at all.

In addition to linear first order filtering, other well-known filtering techniques may be used to reduce the noise effects. Such filters may include higher order filters, for example, optimal Butterworth filters, nonlinear filters such as median or other smoothing filters, etc.

For calculation of the steady-state reference value of the image feature of interest, another filtering operation may be simultaneously performed. In its simplest form, this reference value filter may be also a first-order filter of the form $$y_{long}(k) = \alpha_{long} y_{long}(k-1) + (1-\alpha)y_{row}(k)$$

with coefficient $\alpha_{long}$ determining the time constant. The intention of this filter is to calculate a long-time average of the image feature that may serve as a reference for short term changes that need to be detected. For this reason, the filtering coefficient $\alpha_{long}$ needs to be much closer to 1 then the short term filtering coefficient $\alpha_{filt}$. For example, in case of the sampling rate being one image per second, this filtering constant may be equal to $\alpha_{long} = 0.995$, which would correspond to 95% settling time of 10 minutes, or 600 frames. Different filtering constants may be used depending on the particular flight conditions and performance criteria. If the reference image is not likely to change quickly, then a long may be even closer to 1. The extreme case of $\alpha_{long} = 1$ would correspond to the case when no adjustment is ever allowed and the reference value remains the same.

As with the short-term filter, long-term reference value may also be calculated using a number of other well-known filtering techniques, including various finite response and infinite response linear and non-linear filters.

An advantage of using the long-term average of each image feature as its reference value is that the detection algorithm does not rely on any single reference image, but rather takes into account a large number of consecutive frames. In addition, slow fluctuations or drifts of the features may be accommodated without compromising detection. For example, intensity of the opposing light may be affected by slowly changing temperature. Using the variable long-term reference technique allows for slow and gradual adjustment of the reference value without necessity to choose any particular time instant to re-initialize the reference image.

The short-term filtered value and the long-term reference value may be used to calculate the relative feature value that will be used for thresholding and decision making. For each image feature, the feature's relative value with respect to its long-term value may be determined as:

$$y_{relative}(k) = \frac{y_{filt}(k)}{y_{long}(k)}$$

This relative value may be used in an embodiment to make a smoke decision and activate an alarm, or otherwise produce an output signal indicating a fire/smoke condition.

A lower threshold for a particular feature may be a number between 0 and 1, chosen in such a way that if the feature's relative value decreases below it then a fire condition must be confirmed. Similarly, an upper threshold may be a number larger than 1, chosen in such a way that if the feature's relative value increases above it then a fire condition must be confirmed.

It should be noted that in order to calculate the relative value of the feature, its steady-state long-term reference value that appears in the denominator must not be equal zero. In practice, the values of all the features described above are positive. For an intensity-based feature to be zero all pixel values within the region of interest would have to be zero. Similarly, for a gradient-based feature to be zero all pixel values within the region would have to be identical. Some fluctuations may occur between the pixels, so that neither situation may occur and the feature value will be positive. Nevertheless, division by very small numbers amplifies the effects of noise and should therefore be preferably avoided. One possible remedy is to replace the denominator with a pre-selected fixed number if the denominator falls below it. In addition, an embodiment may remove particular relative feature value from its decision process if the denominator is to small, or use the absolute change technique, described elsewhere herein, instead.

It should be noted that although filtering is generally beneficial for forming the relative value, it may be performed as an optional step in an embodiment. An embodiment may use unfiltered raw values of image features for the numerator. This may be beneficial if the level of noise within images is very low or if the frame-per-second acquisition rate is very low, in which case additional filtering may prevent fast detection of fires. Likewise, an embodiment may choose not to adjust the denominator and use a fixed reference value, obtained, for example, at the system start-up, or at another appropriate time instant, such as closing of the cargo bay door. Using a fixed reference value as the denominator may be beneficial if the environmental conditions are known to be changing very little during the system operation.

It should be noted that an embodiment may also need to further adjust the input data frames and/or threshold values. In one embodiment, for example, thresholds, and/or long term relative values may be determined using one or more sets of data having a noise factor or presence. This may differ from conditions for another environment having little or no noise. Accordingly, there may be a difference in noise levels associated with thresholds and/or relative values used and new image data to be analyzed. In one embodiment, for example, there may be a significant difference in the background level associated with a current data set obtained. The threshold and long-term value may be determined using data with very low background intensity level. In the actual operation, the specific camera hardware used may be characterized by much higher background intensity. This non-zero offset may affect the decision making process.

An embodiment may include a solution to the foregoing to remove the non-zero intensity offset background from the acquired image data. In one embodiment, the background adjustment may be determined in accordance with the camera type, and other artifacts and variations of each embodiment and configuration. For example, a background offset may be calculated for each camera based on dark view images. Prior to any other processing, this background level may be subtracted from all illuminated images.

Subtracting a background offset in order to use the relative change approach should not be seen as a limitation of this approach, but rather as way to remove an artifact introduced by the camera hardware that may otherwise limit the usefulness of the acquired images.

In one embodiment, the camera may include software and/or hardware that translates all illuminated images into a common intensity scale, in which pixel intensities may be represented as 8-bit, 16-bit, or 32-bit values, or using another resolution that may be suitable for the particular case. This image transformation may include corrections to account for any intensity offsets introduced by the camera hardware. Then, the relative pixel intensity change will always be equal to relative change in amount of light reaching a particular CCD element. Therefore, the issue of non-zero background intensity may not be relevant in accordance with the particulars of each embodiment.

It should be noted that an embodiment may compensate or adjust data analyzed in accordance with the conditions associated with thresholds used as described herein or using other techniques.

It should be noted that different image features may be used in connection with different lighting views in an embodiment. Thus, for a frame obtained with an overhead view, the frame, or portion thereof, may be analyzed using the features 1, 3 and 4 as described above. If the frame is obtained with the far or diagonal lighting view, the frame, or portion thereof, may be analyzed using the image features 1, 3, and 5, as described above. In one embodiment, frames obtained using different lighting views are not analyzed. In other words, the lighting may be controlled so that images for each of four lighting scenarios are obtained alternating through each lighting scenario every fourth sample. Analysis may be performed on those frames associated with the overhead and diagonal lighting views. Alternatively, an embodiment may control lighting so that only the diagonal and overhead lighting views are used and alternated through every other sample. Other embodiments may also use the techniques described herein with different lighting views.

For diagonal and overhead lighting views in one embodiment, analysis may be performed only within small neighborhoods of images of the opposite and overhead lights. In one embodiment, window coordinates may be used based on mechanical analysis of camera and lighting mounting, using the known camera's field of view.

In one embodiment, there may be three overhead lights including in the system's lighting configuration. Therefore, three separate overhead windows may be defined for each camera. The image windows, or regions, should be chosen in such a way that light scattering effects due to smoke are always visible within them. The particular camera(s) used and included in an embodiment, and the associated image windows used to analyze the diagonal and overhead views may vary with each embodiment.

In one embodiment in connection with the techniques described herein, each window for each view may be analyzed independently with the corresponding feature values checked against the thresholds. As described elsewhere herein, for analysis of the far view, features #1, #3 and #5 (mean intensity, mean norm of gradient vector, and size of bright region) may be preferably used. For analysis of overhead view, image features #1, #3 and #4 (mean intensity, mean norm of gradient vector, and norm of the second order moment matrix) may be preferably used. If any of the features cross a respective threshold in any one of the analyzed windows, fire is declared. In other words, in one embodiment, a simple OR function may be used on all decision functions. However, it should be noted that an embodiment may require more than one threshold to be crossed in order to declare a fire condition. Additionally, the output produced using the techniques described herein may be further combined and/or confirmed with other output indicators. One such example is described elsewhere herein in connection with FIG. 69.

Symbolically, the decision functions for each camera in the bay described above in connection with one embodiment may be represented as:

$$FIRE_{far\,cam\,i}(k) = (mean_{relative}(Y_{far\,cam\,i}) < \text{thr\_mean}) \text{OR}$$
$$(mgrad_{relative}(Y_{far\,cam\,it}) < \text{thr\_mgrad}) \text{OR}$$
$$(brsize_{relative}(Y_{far\,acam\,i}) < \text{thr\_brsize}) \text{OR}$$

where $Y_{far\,cam\,i}$ is the window or portions of a frame analyzed for the far view of camera i. Note that the same 3 threshold values, thr_mean, thr_mgrad and thr_brsize, may be used for all cameras in one embodiment.

The decision functions for the overhead view in the embodiment described herein use all three windows of each frame for each camera and may also be represented as follows:

$$FIRE_{ovr\,cam\,i}(k) = (mean_{relative}(Y_{ovr1\,cam\,i}) < \text{thr\_mean\_lo}) \text{OR} \quad (mean_{relative}(Y_{ovr1\,cam\,i}) > \text{thr\_mean\_up}) \text{OR}$$
$$(mgrad_{relative}(Y_{ovr1\,cam\,i}) < \text{thr\_mgrad\_lo}) \text{OR} \quad (mgrad_{relative}(Y_{ovr1\,cam\,i}) > \text{thr\_mgrad\_up}) \text{OR}$$
$$(norm2_{relative}(Y_{ovr1\,cam\,i}) < \text{thr\_norm\_lo}) \text{OR} \quad (norm2_{relative}(Y_{ovr1\,cam\,i}) > \text{thr\_norm\_up}) \text{OR}$$
$$(mean_{relative}(Y_{ovr2\,cam\,i}) < \text{thr\_mean\_lo}) \text{OR} \quad (mean_{relative}(Y_{ovr2\,cam\,i}) > \text{thr\_mean\_up}) \text{OR}$$
$$(mgrad_{relative}(Y_{ovr2\,cam\,i}) < \text{thr\_mgrad\_lo}) \text{OR} \quad (mgrad_{relative}(Y_{ovr2\,cam\,i}) > \text{thr\_mgrad\_up}) \text{OR}$$
$$(norm2_{relative}(Y_{ovr2\,cam\,i}) < \text{thr\_norm\_lo}) \text{OR} \quad (norm2_{relative}(Y_{ovr2\,cam\,i}) > \text{thr\_norm\_up}) \text{OR}$$
$$(mean_{relative}(Y_{ovr3\,cam\,i}) < \text{thr\_mean\_lo}) \text{OR} \quad (mean_{relative}(Y_{ovr3\,cam\,i}) > \text{thr\_mean\_up}) \text{OR}$$
$$(mgrad_{relative}(Y_{ovr3\,cam\,i}) < \text{thr\_mgrad\_lo}) \text{OR} \quad (mgrad_{relative}(Y_{ovr3\,cam\,i}) < \text{thr\_mgrad\_up}) \text{OR}$$
$$(norm2_{relative}(Y_{ovr3\,cam\,i}) < \text{thr\_norm\_lo}) \text{OR} \quad (norm2_{relative}(Y_{ovr3\,cam\,i}) < \text{thr\_norm\_up})$$

It should be noted that in the foregoing, $Y_{ovr1\ cam\ i}$, $Y_{ovr2\ cam\ i}$, $Y_{ovr3\ cam\ i}$ are 3 overhead windows for camera i as described previously. Note that even though the overall decision in this one embodiment described herein may use 18 conditions for all 3 windows of each camera overhead views, there are only 6 distinct threshold values involved: 3 lower thresholds thr_mean_lo, thr_mgrad_lo and thr_norm_lo, and 3 upper thresholds thresholds thr_mean_up, thr_mgrad_up and thr_nommup. The threshold values should be selected in such a way that in all fire cases at least one of them is crossed by a corresponding relative feature value, but none of them is crossed for a large portion of dust cases under consideration.

It should be noted that other embodiments may also use different subsets of features for analysis of different views. As described elsewhere herein, for some features, only upper thresholds or only lower thresholds may be used.

Figure 69:
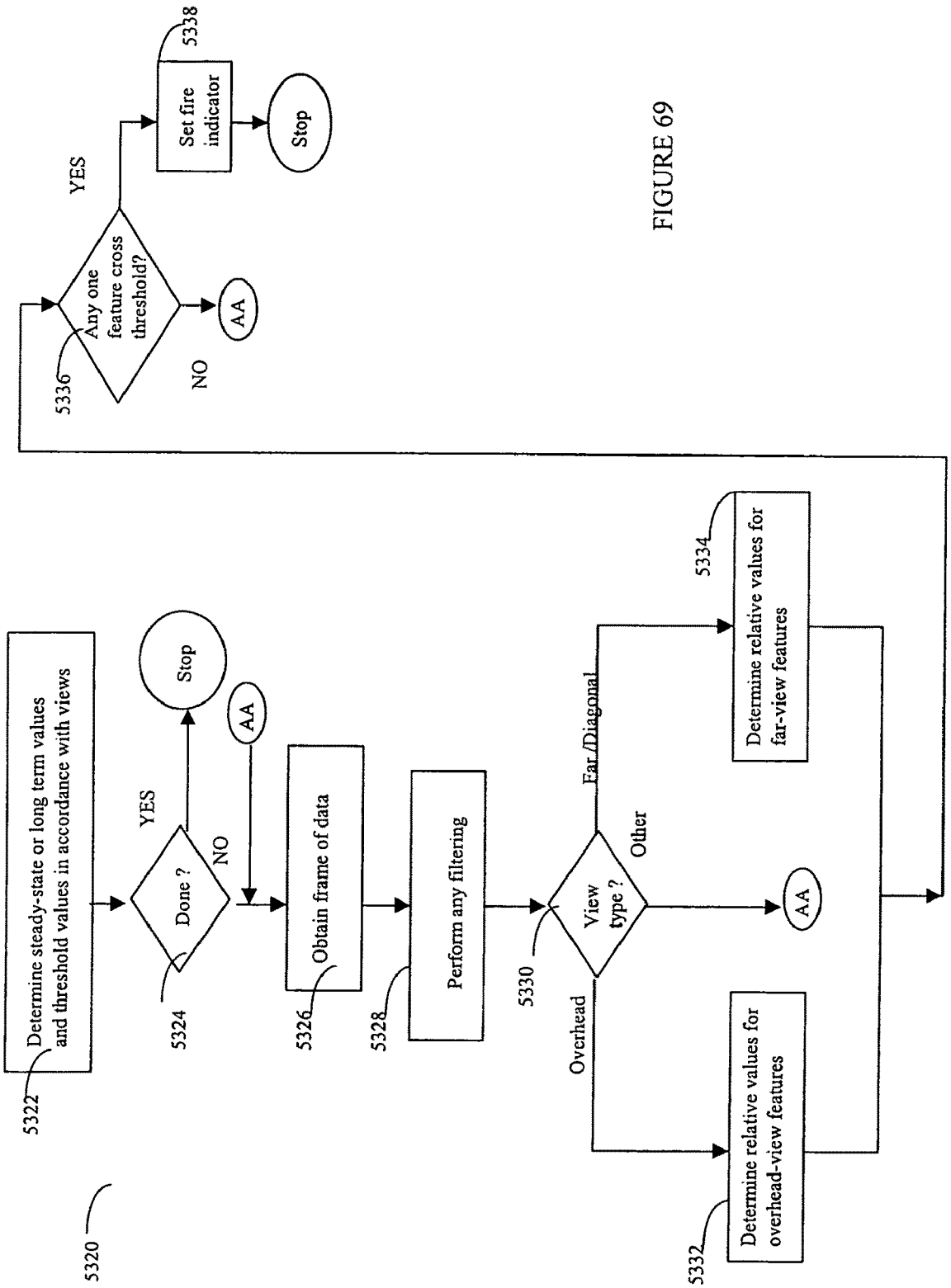
FIG. 69 is flowchart of steps of one embodiment for detection a fire.

Referring now to FIG. 69, shown is a flowchart 5320 of steps of one embodiment for detecting a fire condition. Flowchart 5320 summarizes the second approach just described. At step 5322, steady-state or long term values and one or more threshold values in accordance with the different lighting views are determined. At step 5324, a determination is made as to whether data acquisition and analysis has stopped. If so, processing stops. Otherwise control proceeds to step 5326 where the next frame of data is obtained. At step 5328, any desired filtering may be performed. At step 5330, a determination is made as to the lighting view of the current frame. If the lighting view is the overhead lighting view, control proceeds to step 5332 to determine relative values for the overhead view features. If the lighting view is the far or diagonal view, control proceeds to step 5334 to determine relative values for the far or diagonal view features. If the view is another type, control proceeds to step 5324 and the current frame is not processed. After steps 5332 and 5334, processing proceeds to step 5336 where a determination is made as to whether any one of the thresholds is crossed. If so, control proceeds to step 5338 to set the fire indicator. Otherwise, processing proceeds to step 5324.

Variations of the processing steps of 5320 are described elsewhere herein such as, for example, requiring more than one threshold to be crossed at step 5336 before determining a fire indication, and the like. Different features other than the four relative values in this one embodiment may be used. Other features as used in the first embodiment of the multi-feature based thresholding approach may also be used. Additionally, the feature of the average absolute gray level of EQUATION DM1 may also be used alone or in combination with other features described herein as an absolute or relative value in setting a fire indicator such as, for example, in 5320 processing steps.

As described herein, an embodiment may determine thresholds using empirical testing. It should be noted that the detection thresholds described herein may be determined under conditions with little or minimal flame reflections in accordance with particular environment conditions and lighting views. That is, the data used for derivation of these threshold values should correspond to flame-less, smoldering fires, or to fires in which flames were hidden from the camera. On the other hand, if flames or their reflections do appear in an image during operation of the system, they will be immediately classified as fire via dark view analysis. Therefore, threshold selection only via smoldering fire images does hamper in any way the use of the system for detection of flaming fires.

As described elsewhere herein, an embodiment may tune threshold values in accordance with the performance criteria of an embodiment and also in accordance with the sensitivity and detection time of a conventional smoke detector.

It should be noted that tests conducted by the inventors using the four features in the multi-feature based thresholding as described herein with the particular lighting scenarios may be characterized as robust in a system having 4 particular performance criteria as also defined elsewhere herein. In particular, the foregoing may be characterized as insensitive with respect to lighting intensity, camera settings, fire type, container and wall materials, and video capture parameters (required intensity offset correction). In these tests conducted by the inventors, fire conditions were successfully detected as true before smoke concentration reached levels that would cause the conventional smoke detectors to alarm, and about half of all dust cases were properly classified. It should be noted that in testing conditions and other fire conditions that may be characterized as having a high degree of reflectivity, an embodiment may increase thresholds or otherwise make adjustments to account for the added reflection. The techniques described herein may be used in detecting a fire condition and for discriminating between fire and non-fire conditions. An embodiment may preferably use the four features described herein with the relative change approach for multi-feature based thresholding. However, an embodiment may also use these features in with an absolute rather than relative change value. Additionally, one or more the features described herein may be used alone or in combination with other features for producing a final system indicator of a fire or non-fire condition.

It should also be noted that different lighting views may provide for better detection of fire conditions than other lighting views in an embodiment. For example, based on experimental results by the inventors, the opposite lighting view alone may not allow for a sufficient level of detection of open TF3 fires in an embodiment. Other views may be used in order for dust scenarios to be properly unconfirmed. An embodiment may use detect and differentiate hidden TF2 and hidden TF3 fires from dust using the far or diagonal view.

It should be noted that TF3 and other types of fires described herein are defined in the EN-54 European Standard BSI, "EN-54 Fire Detection and Fire Alarm Systems". The standard fires were formulated for testing standard smoke detectors and are referred to herein as open fires. For developing a video-based detection system, the definition of standard fires was augmented to include visual obstacles between the cameras and the fire source. These fires are referred to herein as hidden fires.

By varying threshold values for different image features, the tradeoff between successful detection of smoke conditions and proper classification of dust events and other criteria may be considered in an embodiment in accordance with particular performance criteria. Thresholds used in an embodiment in connection with the foregoing features, as well as other features, may vary in accordance with the different conditions of each embodiment. An embodiment may determine thresholds through empirical testing, as well as using other techniques.

If it is desired in an embodiment to increase the lead time for fire detection with respect to a conventional detector, then the misclassification rate of dust increases. Dust conditions may not trigger a false fire detection in accordance with one or more conditions that may vary with each embodiment including, for example, a rate and/or amount of dust in a viewing area, a distance of a dust cloud from a camera. As the rate, amount and/or concentration of a dust cloud increases as well as the distance to the camera increases, the ability to properly classify a dust condition decreases.

It should be noted that the type and sensitivity of a conventional detector, as may be used in determining thresholds and performance criteria, may vary resulting in varying detection times. Therefore, image features and threshold values may vary in accordance with each embodiment. For example, if a detector is used having a relatively fast detection time and one of the performance criteria is to have the techniques described herein detect a fire condition prior to this detector, adjusting threshold values to meet this particular performance criterion may result in an increasing number of dust cases misclassified as smoke.

It should be noted that an embodiment of video-based detection system may be designed to function as a primary detection system, without a reference to a conventional smoke detection system. In such a case, the performance criteria may not include lead time with respect to any smoke detectors. Instead, the system may be designed and the threshold may be selected to provide fire detection quick enough to satisfy other criteria, such as those specified in the EN-54 norm for fire detection. For example, the system may be required to detect fire no later than at a specified time after starting a test fire, or after smoke concentration level, measured by a smoke obscuration, has been reached. Other performance criteria may also be used in designing the system.

The techniques described herein for smoke versus dust differentiation is based on setting the smoke detection thresholds low enough so that all fire cases having smoke are classified as such before the conventional smoke alarm, but high enough so that majority of dust cases do not cross those thresholds.

The foregoing multi-feature based thresholding as well as the single feature based thresholding described above may be used alone or in a system combining other techniques for fire/smoke detection and/or verification.

Figure 70:
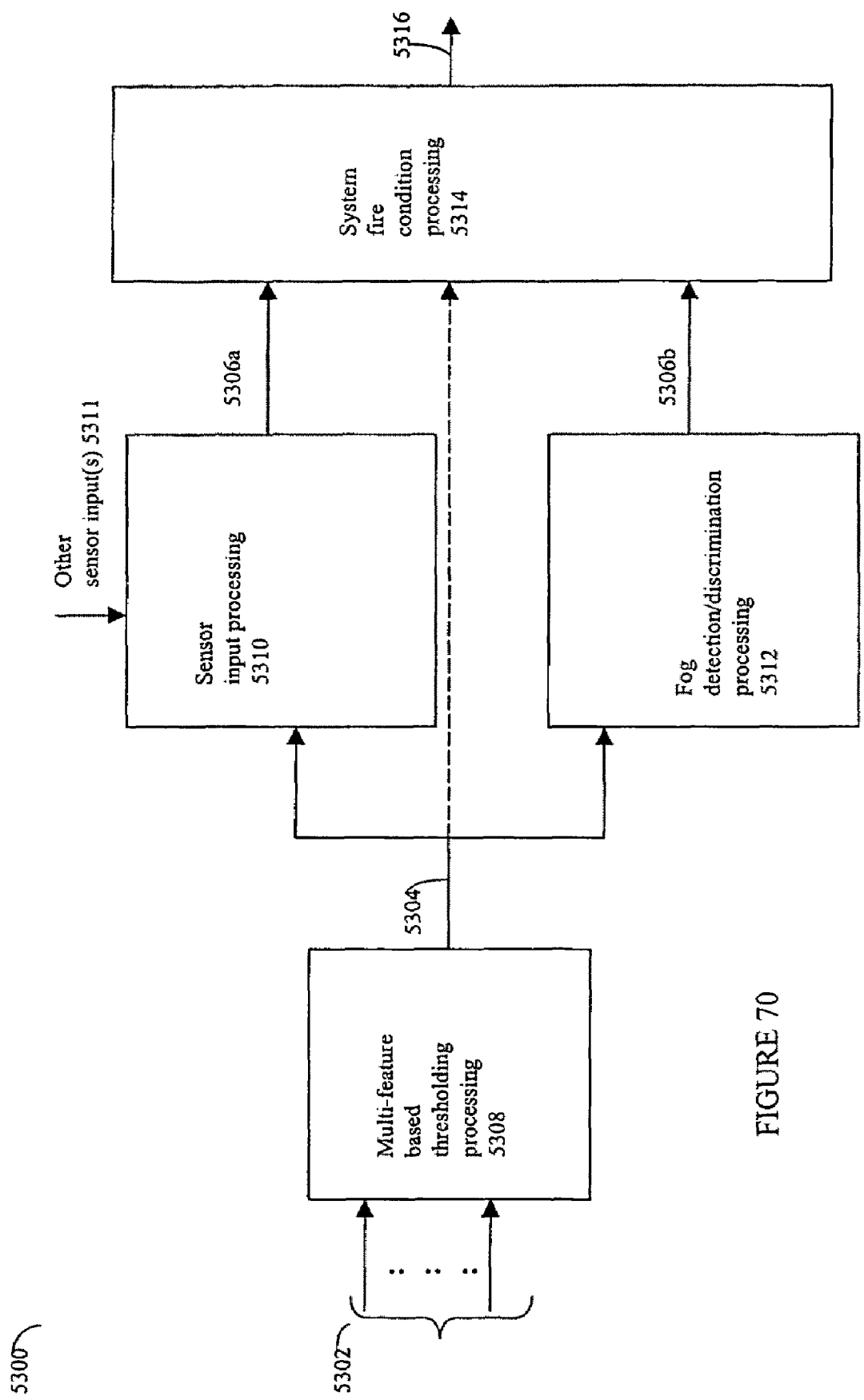
FIG. 70 is an example of an embodiment of a system, or components thereof, that may use the multi-feature based thresholding processing described herein.

Referring now to FIG. 70, shown is an example of an embodiment 5300 of a system that may use the multi-feature based thresholding processing described herein. The embodiment 5300 is an example of one arrangement and configuration of a system using the techniques for multi-feature based thresholding in combination with other processing modules that may be included in an embodiment. Multiple features 5302 are obtained and analyzed for frames and used as inputs to the multi-feature based thresholding processing module 5308 that may produce an output 5304 indicating a fire or non-fire condition. Output 5304 may be used as an input to a second level of processing or modules including sensor input processing 5310 and fog detection/discrimination processing 5312. The sensor input processing 5310 may also have as inputs one or more other sensor inputs 5311. The sensor inputs may include one or more inputs or readings for the current environment conditions, for example, temperature, humidity, a door open indicator, and the like. The sensor input processing may include logic in hardware and/or software for further confirming or denying the output 5304. For example, if the output of 5304 indicates a fire condition, the sensor input processing may seek to provide an additional level of confirmation or this condition in accordance with one or more other inputs. Sensor input processing 5310 may produce an output signal 5306a of a fire condition if, in addition to 5304 indicating a fire condition, for example, the temperature is above a certain level, the humidity indicator is at a certain level, and the like. Fog detection/discrimination processing 5312 may produce an output 5306b that indicates a fire or a non-fire condition. The module 5312 may perform processing described elsewhere herein for fog detection/discrimination such that if 5304 indicates a fire condition, module 5312 may produce and output signal 5306b indicating fire if a module 5312 processing also indicates that a fog condition is not present. Signal 5306b may also indicate a no fire condition in the event that module 5312 detects the presence of fog or other non-fire conditions independent of 5304. The system fire condition processing module 5314 may produce a system fire/non-fire signal 5316 in accordance with one or more inputs, such as 5306a and 5306b. The system fire condition processing module 5314 may use any one or more data fusion techniques described herein and known in the art. It should be noted that an embodiment may have modules 5310 and 5312 override an output signal 5304 if modules 5310 and 5312 do not reach the same conclusion of fire/non-fire matching the output 5304. An embodiment may also provide for module 5314 directly receiving as an input the signal 5304 as indicated by the dashed line. In this way, 5310 and 5312 may be used as confirming or denying the signal 5304. However, the module 5314 also has available as an input the raw signal 5304. An embodiment of 5314 may output a first signal value on 5316 if 5304 indicates a fire condition that is not confirmed by either 5310 or 5312, a second signal value if 5304 indicates a fire condition confirmed by at least one of 5310 or 5312, and a third signal value if 5304, and at least one of 5310 and 5312 indicate a non-fire condition. Other embodiments may use other techniques, arrangements, and values than as described herein.

What will now be described are other features that may be included in an embodiment in defining image-based features and thresholds for smoke detection so that system confirms all fire cases ahead of any onsite smoke detectors while also properly confirming as many non-fire cases as possible (minimizing the number of false positives). It should be noted that in connection with this and other examples herein, one of the system's performance criteria may be to detect a fire condition prior to a smoke detector. It should be noted that an embodiment may also use any or more other types of smoke indicators and/or measuring apparatus with an appropriate threshold against which performance of the system using the fire detection and verification techniques described herein may be measured. In addition to a smoke detector, an embodiment may also use, for example, an obscuration meter, a particle counter, a density counter, or other indicator measuring a dimension of the presence of smoke. The use of a conventional smoke or fire detector herein is used for the purposes of illustration and example and should not be construed as a limitation.

It should be noted that an embodiment may use the features described herein in order to automate the detection process and minimize the dependence on hardware mounting and bay configurations. For example, it may be desirable to define and use the detection features as described herein since they are insensitive to the camera and/or LED positions, size and intensity of lighting elements, camera gain and exposure time, and size of the processing window.

The features described in following paragraphs in this embodiment may prove most useful in detecting and discriminating smoky fires from non-fire conditions as opposed to detection of a fire in connection with other conditions, such as flames. The features described in following paragraphs may be combined in an embodiment with one or more other features, such as hotspot, in order to provide for detection of different types of fires. An embodiment may also use the feature described in following paragraphs alone in detection and distinguishing fire from non-fire conditions. Additionally, an embodiment may use the feature described in following paragraphs in combination with other variables, such as relative humidity, temperature, and the like, to also provide for smoke detection and discrimination.

The technique described in following paragraphs is a threshold technique as described elsewhere herein such that the feature described in following paragraphs, taken alone or in combination with others, may be used to set a combination of thresholds and detection conditions so that aerosols (including dust) are not declared by the system as smoke unless those thresholds are crossed. If such thresholds are crossed, dust is then perceived by the system as smoke. The feature described in following paragraphs may be used in an embodiment such that no dust case is improperly confirmed as fire while also timely confirming all fire cases when at least two different lighting views are used in an embodiment. It should be noted that, as also described herein, all such fire cases are properly confirmed in accordance with system criteria such as using the techniques and feature(s) described herein to detect all fire conditions prior to an onsite smoke detector, alarm or other fire indicator by at least a predetermined amount of time. An embodiment may also use additional views and/or additional cameras in order to improve system performance. An embodiment may use the feature described in following paragraphs and elsewhere herein in connection with other non-fire condition detection features and techniques, for example, such as those described in connection with distinguishing fog from smoke/fire conditions.

An embodiment may use the feature described in following paragraphs in accordance with the amount of bright/faded pixels as a univariate approach to set a baseline for discrimination between smoke and dust. An embodiment may also combine this feature described in following paragraphs as part of a multi feature-based approach including other features, for example, such as the image intensity and motion first order statistics (e.g. average and standard deviation) and higher order statistical features. An embodiment combining this feature with others in the multi-feature approach may have the benefit of additional flexibility in setting combined thresholds and conditions to improve the system's performance in dusty and foggy environments. The feature described in following paragraphs monitors, over time the amount of connected, fading (due to the dimming effect), and/or glowing (due to the scattering effect) pixels due to the presence of aerosols, such as dust, in the camera field of view. The amount of fading/glowing pixels is computed in a similar fashion to the number of hot and connected pixels previously used to detect hotspots. As mentioned earlier, in order to develop features as robust as possible with respect to camera/light mounting and setting and various bay configurations the following parameter may be used to measure the amount of fading/glowing pixels due to smoke or dust with the opposite camera lighting (i.e. far view). In order to use the following feature, the opposite light must be seen and detected by the camera of interest at time zero due to the fact that otherwise, the denominator of this feature goes to zero. The percentage of fading during the far view configuration may be represented by:

$$\text{Fading}(t_k) = 100 \times \frac{\sum_{m=1}^{M/S_s} \sum_{n=1}^{N/S_s} \left\{ \left( \sum_{i=-1}^{i=1} \sum_{j=-1}^{j=1} |P(S_s m + i, S_s n + j; t_k) - P_{Ref}(S_s m + i, S_s n + j; t_0)| > D_0 \right) > C_0 \right\}}{\text{Fading}(t_0)} \%$$

where Fading($t_0$) stands for the number of "bright" and connected pixels generated by the opposite light at time "zero" of the reference image and may be represented by:

$$\text{Fading}(t_0) = \sum_{m=1}^{M/S_s} \sum_{n=1}^{N/S_s} \left\{ \left( \sum_{i=-1}^{i=1} \sum_{j=-1}^{j=1} P_{Ref}(S_s m + i, S_s n + j; t_0) > D_0 \right) > C_0 \right\}$$

The quantity Fading($t_0$) must be non zero for the above division to hold. That is, at time zero the opposite camera light must be visible to the camera of interest so that a minimum threshold number of pixels must be classified as bright and connected. Fault conditions that might preclude fulfillment of this condition may include, for example, obstruction of opposite light and dirty lenses. The minimum threshold number of pixels may vary with each embodiment and may be determined empirically. In the event that this minimum number is not met at time $t_0$, it may indicate a problem with the system, such as, for example, a problem with the camera, gain control setting, and the like. In the event that this minimum is not met, an embodiment may take any one or more alternative actions rather than use the above-referenced feature for the opposite lighting view. An embodiment may choose to not use this particular view, may select another feature for use, may require that additional checking of system components be performed, and the like. In the foregoing and other features, it should be noted that:

(M,N) designates the processing window dimensions (e.g. 320×480);

$D_0$ is the "brightness" threshold, such as, for example, a value of 100 gray levels over a scale of 0 to 255;

$S_S$ is the sweeping step across horizontal and/or vertical directions; and $C_0$ is the clustering threshold, such as 3.

In one embodiment, a default value may be used for any one or more of the foregoing. For example, a default value of 1 may be used for $S_S$. It should be noted that $S_S$ indicates a stepping factor of the number of pixels processed in the region of interest as designated by (M,N). The stepping factor may be used to reduce the number of pixels processed. An embodiment may select $D_0$ by examining histogram(s) of pixel values as described elsewhere herein for the particular environment. An embodiment may have the processing frame or area of interest padded (e.g. by zeros) at the perimeter to allow the processing of pixels at the border of the processing window. It should be noted that the clustering threshold $C_0$, the brightness threshold $D_0$ are described elsewhere herein in connection with determining a number of pixels in a bright and connected region or connected bright region, for example, as described with shrinking and growing regions. An embodiment may use a default pixel-connectivity, such as a 4-pixel connectivity, and may also exclude pixels at the edge of the rectangular neighborhood of the pixel of interest (i.e. i+j=±1). It should also be noted that the inner double sum of the fading equation translates into a four element sum in the case of 4-pixel connectivity type:

$[P_{Ref}(S_s m-1, S_s n; t_0) + P_{Ref}(S_s m, S_s n-1; t_0) + P_{Ref}(S_s m+1, S_s n; t_0) + P_{Ref}(S_s m, S_s n+1; t_0)] > D_0$

Recall that before applying the above connectivity formula the pixel of interest itself has to exceed the detection threshold; that is $P_{Ref}(i,j;t_0) > D_0$, $(i,j) = (S_s m, S_s n)$. An embodiment may first compare a pixel to the brightness threshold $D_0$ prior to determining other more processor-intensive calculations, such as pixel connectivity.

It should be noted that in addition to space connectivity as described herein with a connected property of a connected bright region, an embodiment may also require that a pixel also be connected in time to a degree before declaring it as a "bright" and "connected" pixel. For instance, a time-connectivity of order K means that the detection-connectivity conditions must be met during the previous K consecutive time samples:

$$\left\{ \left[ \sum_{i=1}^{M} \sum_{j=1}^{N} (|P(i, j; t_k) - P_{Ref}(i, j; t_0)| > D_0) \right] > C_0 \right\}$$

for $t = t_k, t_{k-1}, \ldots, t_{k-K}$

Note that pixels of interest in the foregoing may be compared to the reference pixel using absolute value in order to preclude situations where glowing and fading effects might occur simultaneously and cancel each other. Use of absolute value may provide a benefit of increasing the system sensitivity to detect scene changes quickly. When the opposite light is totally obscured, a fading value approaches 100%. This phenomenon may be observed in fire cases. Use of the foregoing feature offers several benefits including:

Not dependent on the processing window size (in contrast to other features such as the mean intensity) that can be affected by mounting and bay configurations.

For instance, the processing window may be set initially to the upper half of the flame (i.e. 320 by 480) where the opposite light is guaranteed to appear regardless of the light and camera positions. However, if the light coordinates are known a priori then the window might be reduced to include pixels just around the light of interest to speed up the processing time.

Not highly dependent on the opposite light size and intensity

Not highly dependent on the camera gain and exposure time settings

Not very sensitive to noise since space and time connectivity conditions may exclude spurious and intermittent bright pixels from being detected.

More sensitive to "thick" smoke and similar aerosols characterized by a high efficiency in obstructing the opposite light and breaking pixel connectivities, thus increasing dramatically the fading percentage feature.

Less sensitive to "light" (e.g. dust) and moving (e.g. fog) aerosols.

The foregoing fading feature may not be used as defined above in connection with views other than the opposite lighting view because at time zero there may be no bright pixels. In fact, it is expected that during overhead lighting, for example, no light might be visible except when smoke or other aerosols are scattered. In addition, the size of glowing area during overhead and near view lighting is not necessarily proportional to the original size of the bright area. For instance, during the pilot view, a large amount of bright pixels may be originally present due to reflections of the camera's own lighting from the container sides. Another limitation is the range of the variable that may vary from 0 to thousands making it hard to benchmark it. For these reasons, only the change in the scene intensity may be measured by the number (and not the percentage) of glowing/fading pixels. Although the feature described in following paragraphs for use with the overhead and near lighting views is similarly less dependent on the processing window, camera/light mounting, and spurious pixels, it may be characterized as more dependent on the camera gain and exposure time settings than the feature defined above for the opposite lighting view. The feature that may be used for detection during overhead and near view lighting as the number of fading/glowing pixels may be represented by:

$$FG(t_k) = \sum_{m=1}^{M/S_s} \sum_{n=1}^{N/S_s} \left\{ \left( \sum_{i=-1}^{i=1} \sum_{j=-1}^{j=1} |P(S_s m + i, S_s n + j; t_k) - P_{Ref}(S_s m + i, S_s n + j; t_0)| > D_0 \right) > C_0 \right\}$$

In one embodiment, different detection parameters and thresholds may be used for the opposite lighting view and another set for the overhead and near lighting views. For example, an embodiment may specify the following depending on the view being processed:

TABLE I

Detection threshold and parameter values to confirm smoke

|  | Far view | Overhead view | Near view |
|---|---|---|---|
| Minimum fading percentage for detection | 20% | — | — |
| Minimum number of fading and/or glowing pixels for detection | — | 10 | 10 |
| Brightness threshold (gray levels) | 100 | 130 | 40 |
| Connectivity type | 4-pixel | 4-pixel | 4-pixel |
| Space connectivity parameter (pixels) | 3 | 3 | 4 |
| Time connectivity parameter (samples) | 2 | 2 | 2 |
| Sweeping step parameter (pixels) | 1 | 1 | 1 |

In one embodiment, the decision logic to confirm may be a logical OR such that IF the feature exceeds its predefined threshold in any of the active views THEN smoke will be confirmed. An embodiment may also require that at least two different views be used in making this determination. It should be noted that the following represents preferred ranking of views that may be used in an embodiment with the features described herein: opposite, overhead, and near or pilot view, in which opposite is the preferred view and near or pilot may be the least preferred. The foregoing ranking may be used in an embodiment when determining a combination of views to be used in detection of fire conditions.

It should be noted that an embodiment may select thresholds, such as the brightness threshold, by empirical analysis. For example, histograms of pixel grey level distributions from prior conditions may be examined for dust conditions and smoke conditions. An embodiment may determine, for a given set of data, the maximum brightness value associated with a dust condition and a minimum brightness value associated with a smoke condition. The embodiment may select a threshold from within this range in accordance with the particular system performance criteria and particulars of each embodiment. It should be noted that, as described elsewhere herein, an embodiment may select a detection time, such as may be determined using an onsite smoke detector, an obscuration meter, and the like. This detection time may serve as a benchmark time by which the techniques described herein are used in connection with detection of a fire condition. In other words, one of the performance criteria of an embodiment may include detection of a fire condition prior to this detection time. The detection time may also be, for example, a time specified in accordance with a particular smoke detector, a time when a particular condition associated with smoke (e.g., density, particle count) is reached.

Using the foregoing features, fire conditions may be detected prior to an onsite smoke detector or other detection threshold without improperly confirming dust cases. An embodiment may also use a higher exposure time availability and a higher gain setting for different cameras, such as those used in connection with the near view lighting. However, this may also increase the system sensitivity to dust and fog. The detection parameters and threshold may be balanced in accordance with particular conditions in an embodiment. An embodiment may also use other features, such as those described elsewhere herein for hotspot detection.

An embodiment may impose a time connectivity (e.g., detection for at least 2 consecutive samples) to minimize the effect of fluctuations of the studied feature. Other filtering may also be used an embodiment such as, for example, using a low pass filter (e.g., similar to a slosh filter for a fuel system) to avoid fluctuations. However, it should be noted that use of filtering techniques may cause a delay in the system detection performance in an embodiment.

As described herein, detection efficiency in an embodiment may depend on the active view (far, near, or overhead) and camera position (Aft or Fwd cameras). In one embodiment, an active view may be considered as a view for detection if the system exceeded the appropriate detection threshold ahead of the fastest onsite smoke detector (without alarming during all dust cases). Note that, as described elsewhere herein, detection in an embodiment may be performed by requiring at least 2 active views and require that at least one threshold for one view be exceeded for a fire condition to be determined.

As described elsewhere herein, an embodiment may use the far or opposite lighting view since this may be characterized as generally most efficient in terms of detection. Different types of fire conditions and other particulars of an embodiment may result in other lighting views being more or less efficient than others. For example, a poor efficiency of the near view lighting in an embodiment may be due to the insufficient amount of light captured by the cameras may make them less sensitive during their own lighting. An embodiment may preferably select to use a different feature than the number fading/glowing pixel feature as described above. For example, an embodiment may alternatively select a feature of mean pixel intensity, and/or the first statistical moment for use with the near view.

An embodiment may use the foregoing single feature with different parameters and thresholds in accordance with lighting views to detect fire cases ahead of the onsite smoke detectors or other detection means without improperly confirming any dust cases. An advantage of the foregoing when used in combination with far view was its robustness towards camera settings and mounting, bay configurations, spurious noisy and intermittent pixels, and processing window. It should be noted that if, during most of the dust scenarios feature values are zero in test conditions, the foregoing approach may be efficient in avoiding dust false alarms. The amount of lead time used an embodiment may be balanced with the desire of system performance criteria for avoiding negative false alarms.

Data fusion techniques, as described elsewhere herein, may be used in a fire detection and verification system. An embodiment of a fire detection and verification system is described, for example, in connection with FIG. 1 and its possible variations. One such technique that can be used in connection with data fusion uses fuzzy logic to combine multiple inputs and produce a final decision regarding whether a fire conditions exists. Data fusion techniques may use inputs including, for example, sensor outputs, outputs from—other techniques, features based on visual information, and/or features based on non-visual information. The outputs from other techniques may be outputs produced using techniques described elsewhere herein such as, for example, those used in discrimination and detection of fire and non-fire conditions including fog, dust, and the like.

Fuzzy logic is a generalized form of conventional logic where an element can either be a member or not a member of a particular set. Fuzzy logic may be characterized as an efficient approach to map an input space to an output space and may be used with systems that involve vague data and/or an imprecise decision process. Fuzzy logic allows for an approximation using a set of intuitive rules conjectured from human experience and relevant data. One advantage that may be afforded by a system using fuzzy logic is the ability to provide a compromise between accuracy and significance. Fuzzy logic may be used in connection with applications where accurate measurement is not achievable and/or critical decisions may be needed in a timely manner based on possibly "imprecise" data.

Use of fuzzy logic is based on a rigorous theory of approximation that is well suited to many real-world applications including smoke detection.

What will now be described are concepts and definitions pertaining to conventional logic that may be generalized for use with fuzzy logic in connection with techniques described herein.

A fuzzy set is made up of elements with only a partial degree of membership. In contrast to classical sets where an element either belongs or does not belong to the set, an element belongs to its fuzzy set with a certain degree of membership between 0 and 1. In the particular case of a binary degree of membership (i.e. either 0 or 1), the fuzzy set coincides with the conventional crisp set. The general concept of a fuzzy set is intuitive and more descriptive of natural phenomena. Take for instance the set of "warm months in Vermont". The classical definition asserts that a month can only be warm or not. This classification may be representative in the case of the month of July, but not in the case of the month of April, for example. If the "warm months in Vermont" set is considered with months of the year as its elements, two different representations may result depending on the definitions of the classical (i.e. 2-valued) and fuzzy sets as illustrated in FIG. 71.

Figure 71:
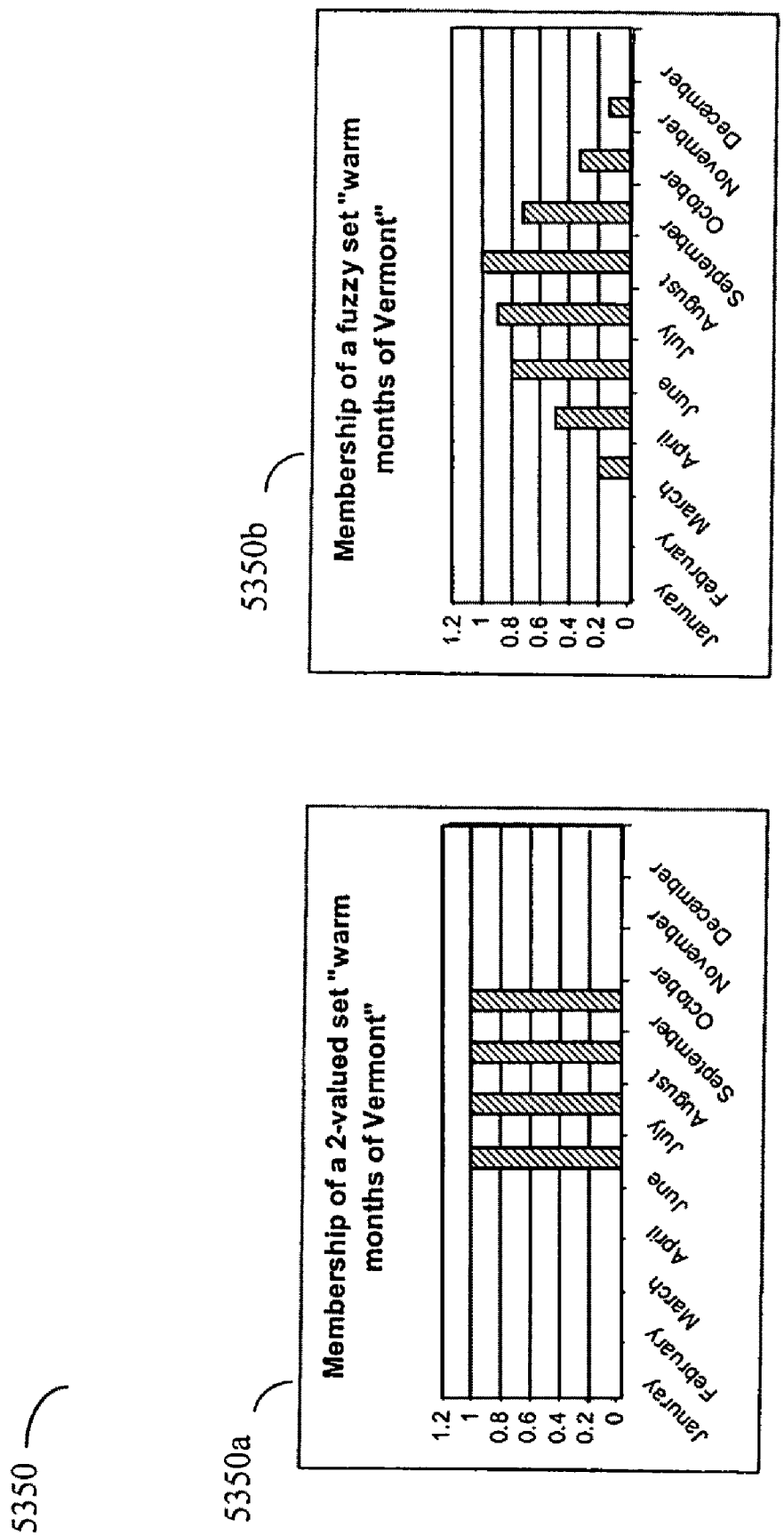
FIG. 71 is an illustration of a fuzzy set and conventional sets for a first example.

In the 5350 of FIG. 71, a fuzzy set may be used to represent the statement "warm weather in Vermont" differently than with conventional sets.

A membership function is a curve that maps each point in the fuzzy set to a real number in the interval [0 1] that defines the degree of membership of such point to the fuzzy set. Consider, for example, the set of smoky scenes in connection with a fire testing chamber. The scene of an EN54 chamber after approximately 10 minutes of a TF2 fire experiment, where smoke is allover the chamber, may be characterized as a smoky scene. It should be noted that the EN-54 and related fire types (e.g., TF-2), codes and the like, as used and also described elsewhere herein, refers to the European BSI Standard entitled "EN-54 Fire Detection and Fire Alarm Systems". Just before the fine is started, the scene may be characterized as a clear. However, it may not be clear how to describe the scene during the 10 minutes between the two scenes. Proper characterization of those 10 minutes is crucial in connection with smoke detection. The following two membership functions depict examples of both fuzzy and classical membership functions for the space TF2-type "smoky scene".

Figure 72:
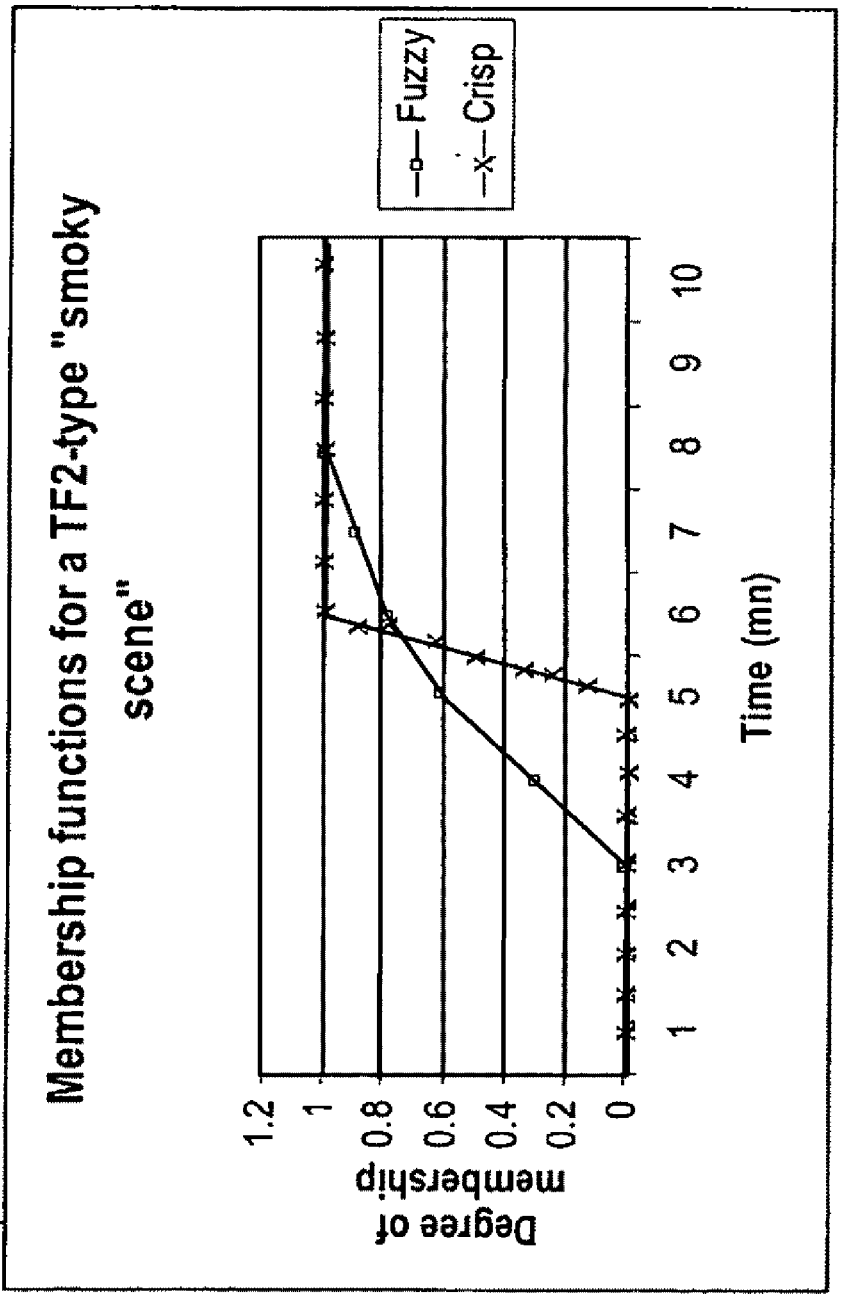
FIG. 72 is a graphical illustration of a continuous variation of a fuzzy membership function.

Referring now to FIG. 72, shown is an example 5352 graphically illustrating how a continuous variation of the fuzzy membership function may be preferred as more descriptive of a "smoky scene" than the sharp-edged crisp function.

Fuzzy logical reasoning may be used to extend standard Boolean logic to all real numbers between 0 (i.e. completely false) and 1 (completely true). Such extensions may be embodied in many ways. An embodiment may use techniques for extending the logical operators, such as "AND", "OR", and "NOT", wherein:

i) (A AND B)→min(A,B) where A and B are 2 real numbers between 0 and 1 ii) (A OR B)→max(A,B) where A and B are two real numbers between 0 and 1 iii) (NOT A)→1-A where A is a real numbers between 0 and 1

Note that for the particular case of A=0 and B=1, fuzzy logical operators in this example coincide with the classical Boolean logic. These logical operators may also be defined in more general terms so that various fuzzy operators can be developed for specific types of applications. The AND operator is an example of a more general binary mapping called a "T-norm" (i.e. Triangular norm) whereas, the OR operator is an example of a more general "S-norm" (or T-conorm) under the following conditions:

$$\text{Boundary condition} \begin{cases} T(0, 0) = 0, \quad T(a, 1) = T(1, a) = a \\ S(1, 1) = 1, \quad S(a, 0) = S(0, a) = a \end{cases} \quad a)$$

$$\text{Monotonicity condition} \begin{cases} T(a, b) <= T(c, d) \text{ if } a <= c \text{ and } b <= d \\ S(a, b) <= S(c, d) \text{ if } a <= c \text{ and } b <= d \end{cases} \quad b)$$

$$\text{Commutativity condition} \begin{cases} T(a, b) = T(b, a) \\ S(a, b) = S(b, a) \end{cases} \quad c)$$

$$\text{Associativity condition} \begin{cases} T(a, T(b, c)) = T(T(a, b), c) \\ S(a, S(b, c)) = S(S(a, b), c) \end{cases} \quad d)$$

The first condition imposes generalization to conventional crisp sets. The second condition guarantees that a decrease in the membership values in A or B cannot produce an increase in the membership value in (A intersection B) or (A union B). The third and fourth conditions indicate that the T and S-norms must be indifferent to the combination order of fuzzy sets. Several T and S-norms have been proposed to provide ways to vary the "intersection and union degrees" of the operators such as described in, for example, Zadeh, L. A., *Fuzzy sets*. Information and Control, Vol. 8, pp. 338-353, 1965, and Klir, G. I., Yuan, B., *Fuzzy Sets and Fuzzy Logic: Theory and Applications*. Prentice Hall, 1995.

The decision making process using fuzzy logic uses a set of IF-THEN rules that involve fuzzy sets and fuzzy operators. For example, a rule may be:

"IF (x is A) AND (y is B) THEN (z is C),"

where A, B, and C are fuzzy sets defined by their membership functions over the ranges (i.e. universe of discourse) of their input variables.

Consider the following more specific example, "IF (Average frame intensity is high) AND (Relative humidity is low) AND (Temperature is high) THEN (Smoke-likelihood is high)." Note that the statement "(Average frame intensity is high)" may be represented by a number between 0 and 1 depending on the actual average frame intensity value and its projection on the appropriate fuzzy set that defines the word "high" (e.g. Gaussian function). The statement (Smoke-likelihood is high) may mean, for example, that the probability of smoke is higher than 0.7 (in a scale of [0 1]) and that a "CONFIRM" is the right message for a smoke/fire detection system to send.

In one embodiment, inputs to an IF-THEN rule may be the current values of the input variables (e.g. frame intensity, relative humidity, and temperature). Using the Mamdani approach, for example, the output may be an entire fuzzy set which is "defuzzified" to provide a scalar (e.g. average) that represents best the output variable (probability of confirmation). It should be noted that the Mamdani approach and others that may be used in connection with fuzzy logic are known, for example, as described in Mamdani, E. H., "Applications of fuzzy logic to approximate reasoning using linguistic synthesis," IEEE Transactions on Computers, Vol. 26, No. 12, pp. 1182-1191, 1977.

One embodiment may implement an IF-THEN rule using 3 steps. As a first step, the input is "fuzzified"; that is the input variable is projected into its appropriate fuzzy set(s). Note that a variable may belong to more than one fuzzy set with different degrees of membership allowing for more than one rule to be applied. For example, a temperature value of 20 degrees Celcius may be interpreted as simultaneously meaning that "the temperature is low" with a small membership value (i.e. degree of belief) of 0.2, and also that "the temperature is medium" with a high degree of belief of 0.8 (in a scale of 0 to 1). The foregoing may be used to illustrate a benefit of using fuzzy logic in a system since fuzzy logic allows for approximate reasoning to solve conflicting information where an element may belong to more than one fuzzy set.

The second step in one embodiment using fuzzy logic and IF-THEN rules is to apply logical statements (e.g. AND) in conjunction with other inputs to compute a scalar value (i.e. degree of support for the rule) between 0 and 1. The third and final step in this embodiment assigns a fuzzy set to the output based on the degree of support of the rule and the implication operator (e.g. MIN).

Figure 73:
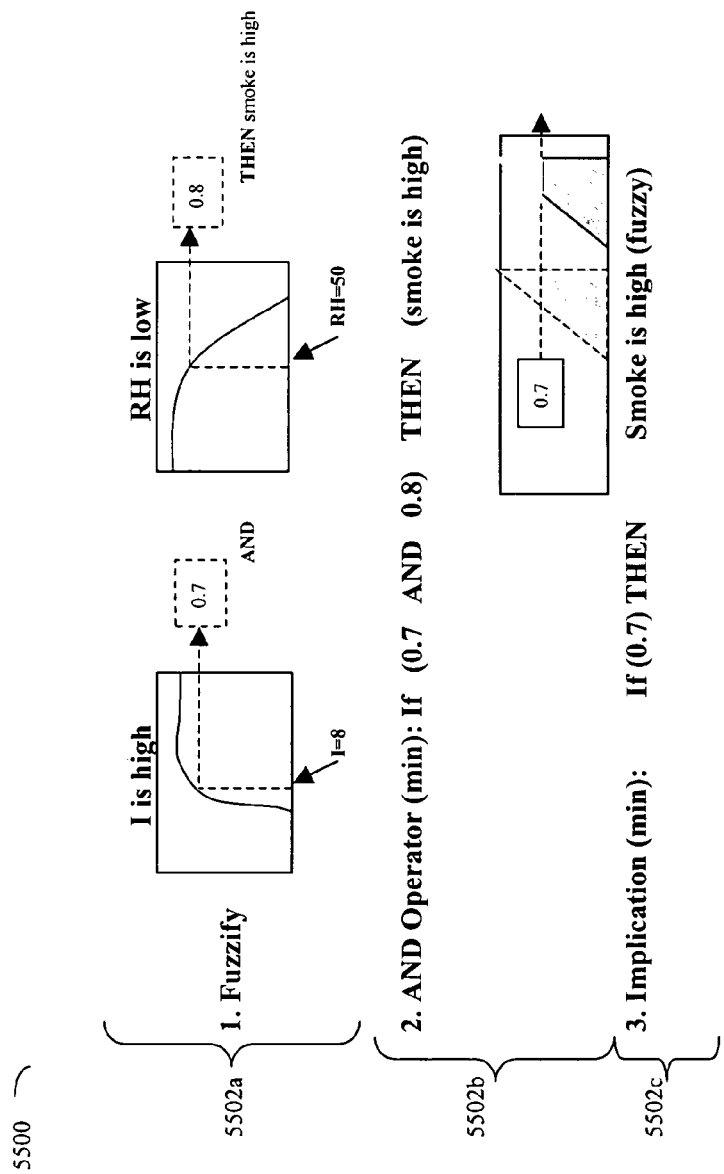
FIG. 73 is an example illustrating steps of one embodiment for implementing IF-THE rules with fuzzy logic.

Referring now to FIG. 73, shown is an example 5400 illustrating the foregoing 3 steps as may be used in an embodiment. Consider the following rule with a pair of average frame intensity and relative humidity of (8, 50): "IF (Average frame intensity is high) AND (Relative humidity is low) THEN (Smoke-likelihood is high)." The first step is represented by 5402*a* and the second step by 5402*b*. Note that the final output by applying step 3 as represented in 5402*c* (i.e. truncated triangle) is a fuzzy set representing the original verbal fuzzy output set (i.e. "smoke is high") "implicated" (via MIN operator) with the rule of support (i.e. 0.7 in this example).

An embodiment may also use other implication methods such as, for example, multiplication. However, for purposes of illustration in following paragraphs, the "MIN" operator is used. It should be noted that an embodiment may also assign one or more weights to one or more rules in which each rule consequent is multiplied by the rule weight before the implication takes place. An embodiment may use the same weight for all rules or associate different weights with one or more different rules, for example, to emphasize one rule over the other.

Fuzzy inference is the process of aggregating all fuzzy rules together to provide a unique crisp output representing the resulting fuzzy output; this process may also be referred to as the "defuzzification" process. There are multiple fuzzy inference approaches such as, for example, the two well-known approaches of Mamdani and Sugeno. The Mamdani inference approach stipulates that the result of each rule is a fuzzy set. The overall resulting output after applying all the rules using an aggregation operator (e.g. Max operator) is a fuzzy set. The final system output after defuzzification (e.g. center of gravity) of the overall fuzzy set is a number in the universe of discourse of the output variable (e.g. 0-100% probability of confirmation). Although what will be described in following paragraphs are techniques using the Mamdani-type inference to implement fuzzy logic for smoke detection, an embodiment may also use other approaches. The particular examples and approach described herein should not be construed as a limitation.

Following is an example showing the Mamdani fuzzy inference approach in aggregating fuzzy rules. Consider the following two rules:

Rule1: "IF (Average frame intensity is high) AND (Relative humidity is low) THEN (Smoke-likelihood is high)."
Rule2: "IF (Average frame intensity is low) AND (Relative humidity is medium) THEN (Smoke-likelihood is low)."

Figure 74:
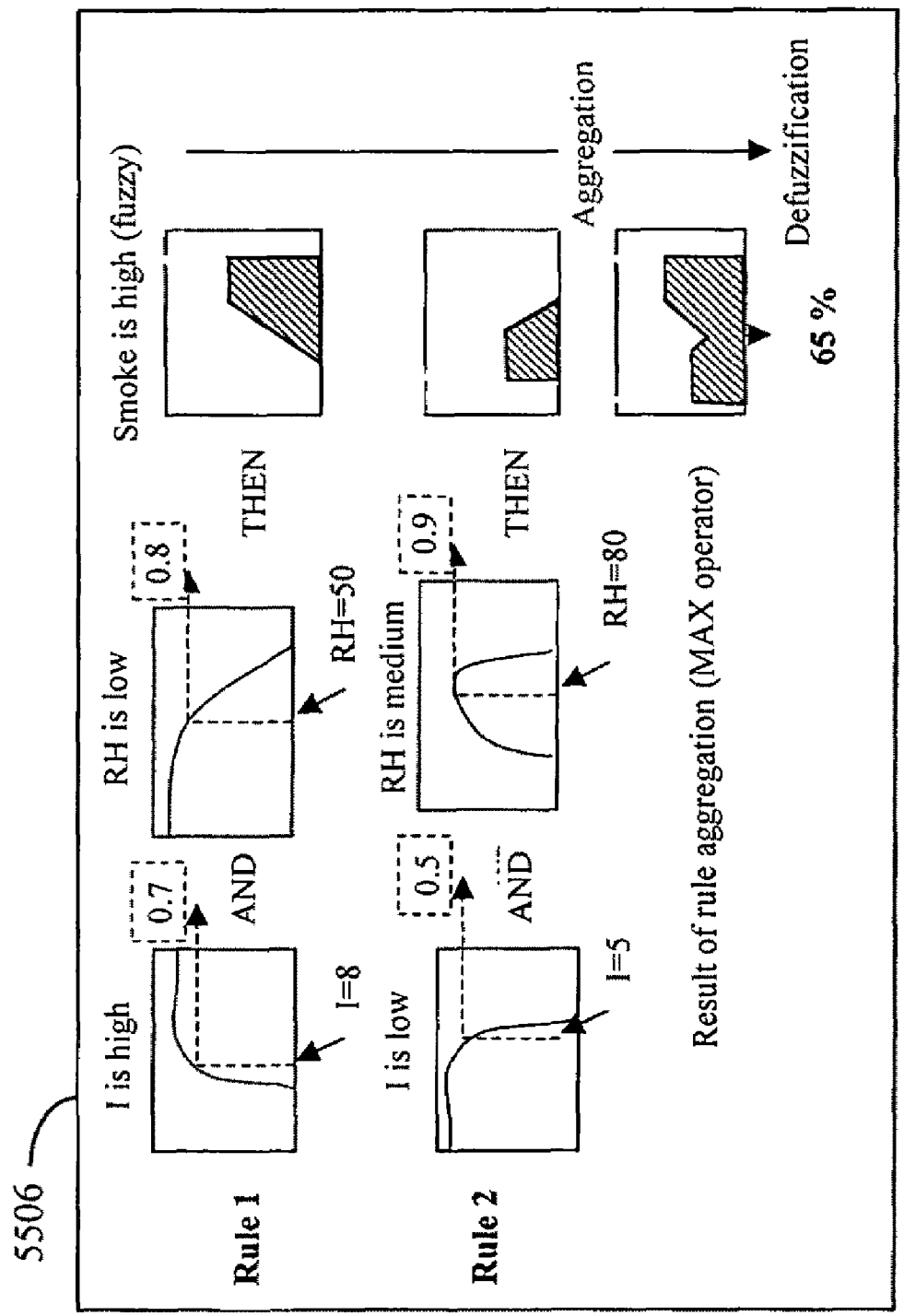
FIG. 74 is an illustration of an example after aggregation.

Consider the MAX operator as the aggregation operator and the "area centroid" as the defuzzification operator in this example. The resulting output from aggregating both rules is illustrated in 5506 of FIG. 74.

It should be noted that each rule may have its own weight depending on its degree of importance. The weight of each rule should be taken into account at the aggregation (and subsequently at the defuzzification) processes. The defuzzification method, as may be represented as the output fuzzy set by a scalar, may be used in connection with a machine-based decision since numerical quantities may be evaluated in connection with determining whether to take one action or another.

It should be noted that an embodiment may use any one of well-known methods for defuzzification depending on the desired degree of "tolerance" or "caution" of the output action that may vary with each embodiment. For example, one factor that may be considered in deciding which defuzzification method to use relates to the tradeoff between false alarms and early detection in connection with smoke detection. For instance, if emphasis needs to be put on early detection then using the "Largest Of Maximum" (LOM) as a defuzzification method may be more appropriate for use in an embodiment. However, if more emphasis needs to be put minimizing false alarms (i.e. delaying the confirmation) then the Smallest Of Maximum "SOM" defuzzification method may be more appropriate for use in an embodiment. The well-known defuzzification methods as may be used in an embodiment include, without limitation, the "CENTROID" (i.e. centroid of the aggregated area), "MOM" (i.e. middle of maximum), "SOM" (smallest of maximum), "LOM" (largest of maximum), and many others.

Referring now to FIG. 75, shown is a representation 5508 illustrating the foregoing defuzzification methods in connection with two example output universe of discourses. In other words, 5508 shows various output likelihoods that may be associated with each particular defuzzification method if a universe of discourse is as depicted. The defuzzification method selected may be chosen in an embodiment such that the associated output likelihood fairly represents the overall estimation of the system output (e.g., smoke or non-smoke).

In one embodiment using fuzzy logic for smoke detection, the CENTROID method may be used. However, other embodiments may use other defuzzification techniques that may vary in accordance with each embodiment depending on criteria, for example, such as the compromise between early smoke detection and minimal false alarm rate (e.g., due to fog, dust, and other non-aerosols), and other smoke discrimination techniques that may be used in an embodiment.

Consider the general case of multiple rules that are aggregated to compute the output fuzzy set which, in turn, is then defuzzified. Described in following paragraphs is one technique and representation. The output of a system may be determined using general fuzzy logic (i.e. T-norm and S-norm) and defuzzification (i.e. D) operators to produce a general formula. The general formula may then be applied in the case of typical operators and membership functions. Following is a set of notation used:

| | |
|---|---|
| $R \rightarrow$ | Number of rules involved in the inference fuzzy system |
| $A_r \rightarrow$ | Number of antecedents (i.e. input statements) per rule "r" (e.g. IF "Average frame intensity is high"). Without loss of generality, it is assumed that there is one input variable per antecedent. |
| $C_r \rightarrow$ | The rule consequent (e.g. THEN "Smoke-likelihood is high") |
| $x_{ar} \rightarrow$ | Input value of the antecedent "a" of the rule "r" (e.g. 6 gray levels) |
| $MF_{ar} \rightarrow$ | Membership function at the antecedent "a" of the rule "r" (e.g. Gaussian membership function) |
| $MF_{cr} \rightarrow$ | Membership function at the unique consequent "c" of the rule "r" |
| $\mu_r(a) \rightarrow$ | Membership degree (i.e. degree of firing) at a given antecedent "a". |
| $Ip(.,.) \rightarrow$ | Implication method assumed the same across the rules (e.g. MIN) |
| $Ag(.,.) \rightarrow$ | Aggregation method assumed the same across the rules (i.e. MAX) |
| $Op(.,.) \rightarrow$ | Logical T-norm (e.g. MIN) or S-norm (e.g. MAX) operator |
| $W_r \rightarrow$ | Weight of rule "r" (e.g. equal weight- i.e. 1 for all rules) |
| $Df(.,.) \rightarrow$ | Defuzzification method (e.g. CENTROID) |
| $Fo \rightarrow$ | The resulting fuzzy set of all rules |
| $y \rightarrow$ | The crisp output of the fuzzy inference system (e.g. smoke likelihood) |

A given rule "r" may have "$A_r$" antecedents. For each rule, an embodiment may follow the 3 steps (fuzzify, apply logical operators, and implicate rule) mentioned elsewhere herein to compute the degree of support of each rule. The rules may then be aggregated to compute the resulting fuzzy output set. The defuzzification process may be applied to compute the fuzzy inference output (e.g., a single number). The following is a representation of applying the 3 steps previously described for a given rule "r" with "$A_r$" antecedents. With reference to a)-e) below, it should be noted that a) corresponds to step 1 processing, b) corresponds to step 2 processing, and c), d) and e) correspond to step 3 processing:

a) Fuzzify the inputs (i.e. one input per antecedent) to compute the membership degree of each antecedent.

$$\mu_r(a) = MF_{ar}(x_{ar}) \quad a=1, 2, \ldots, A_r \qquad (1)$$

b) Apply the appropriate logical operator $Op(.,.)$ between the different antecedents of the rule.

$$\mu_r = \underset{\substack{\{a,b\}=\{1,1\} \\ a \neq b}}{\overset{\{a,b\}=\{A_r A_r\}}{OP}} (\mu_r(a), \mu_r(b)) \qquad (2)$$

Note that the order of operation is irrelevant because of the commutativity property of the logical operator.

c) Apply the implication method to compute the final fuzzy consequent of the rule "r". Note that before applying the implication method, each rule has to be multiplied by its weight—a scalar between 0 and 1 indicating the relative degree of importance of such rule with respect to the other rules.

$$C_r = Ip(W_r, \mu_r, MF_{cr}) \quad (3)$$

d) Aggregate all rules to compute the resulting fuzzy output set of the Mamdani-type inference system, $$Fo = \underset{\substack{\{r,s\}=\{1,1\} \\ r \neq s}}{\overset{\{r,s\}=\{R,R\}}{Ag}} (C_r, C_s) \quad (4)$$

e) Apply the defuzzification process to estimate the final output (e.g. single number), $$y = Df(Fo) \quad (5)$$

Rewriting the above equations into a single formula to estimate the system output yields a crisp and deterministic output that may be represented as:

$$y = Df\left( \underset{\substack{\{r,s\}=\{1,1\} \\ r \neq s}}{\overset{\{r,s\}=\{R,R\}}{Ag}} \left[ Ip\left( W_r, \underset{\substack{\{a,b\}=\{1,1\} \\ a \neq b}}{\overset{\{a,b\}=\{A_r A_r\}}{OP}} (MF_{ar}(x_{ar}), MF_{br}(x_{br})), MF_{cr} \right), \right.\right.$$
$$\left.\left. Ip\left( W_r, \underset{\substack{\{a,b\}=\{1,1\} \\ a \neq b}}{\overset{\{a,b\}=\{A_r A_r\}}{OP}} (MF_{ar}(x_{ar}), MF_{br}(x_{br})), MF_{cr} \right) \right] \right) \quad (6)$$

Using one set of operators for Mamdani-type fuzzy inference systems, Equation (6) may be rewritten in such particular case as follows, $$y = CENTROID\left( \underset{\substack{\{r,s\}=\{1,1\} \\ r \neq s}}{\overset{\{r,s\}=\{R,R\}}{MAX}} \left[ Min\left( W_r, \underset{\substack{\{a,b\}=\{1,1\} \\ a \neq b}}{\overset{\{a,b\}=\{A_r A_r\}}{Min}} (\Gamma_{ar}(x_{ar}), \Gamma_{br}(x_{br})), \Gamma_{cr} \right), \right.\right.$$
$$\left.\left. Min\left( W_r, \underset{\substack{\{a,b\}=\{1,1\} \\ a \neq b}}{\overset{\{a,b\}=\{A_r A_r\}}{Min}} (\Gamma_{ar}(x_{ar}), \Gamma_{br}(x_{br})), \Gamma_{cr} \right) \right] \right) \quad (7)$$

where Γ stands for a Gaussian membership function.

Using the output, y, of the foregoing equations, an embodiment may produce an output signal that is a Boolean signal indicating whether there is a fire event or not by comparing the fuzzy inference output, y, to a given number or threshold, such as, for example, 60%. If y is >60% then Confirm fire event, otherwise, Unconfirm.

Application of the foregoing fuzzy logic may be used in a fire detection and verification system as described elsewhere herein. An embodiment may also further tune/refine that which is described herein, for example, to determine and use optimal membership functions and their parameters, number and nature of rules, and fuzzy inference approach, that may vary in accordance with application and system. In addition to that which is described herein, other embodiments, and variations thereof, are possible and the particular examples described herein should not be construed as a limitation.

In one embodiment, 3 input variables may be used: absolute average frame intensity, relative humidity, and temperature. The system output, as represented by Equation 7, is a number between 0 and 1 representing the estimated probability of confirmation. Following is a description of the system fuzzy inference that may be used in one embodiment in connection with smoke detection.

What will now be described are the membership functions. The membership function is an important factor of the fuzzy inference system. Parameters and domain of application of the membership function should reflect the physical properties of the variable of interest. For all input and output variables, an embodiment may use, for example, the Gaussian distribution may be used to approximate sensor measurement errors and inaccuracies.

It should be noted that an embodiment may use other techniques to represent sensor measurement errors and inaccuracies. For example, an embodiment may determine a distribution representing the sensor measurement errors and inaccuracies in accordance with analyzing results of sensor's used in a particular embodiment. An embodiment may also use other well-known distributions to approximate the foregoing errors and inaccuracies including, but not limited to, a trapezoidal, a triangular, and a sigmoidal distribution.

One of the input variables is the relative humidity (RH). Relative humidity information may be used in setting thresholds for the fire detection system's decision making unit so that smoke will be detected in all cases, including the unlikely case of simultaneous fog and smoke, without compromising the system ability in minimizing fog-related false alarms.

Figure 76:
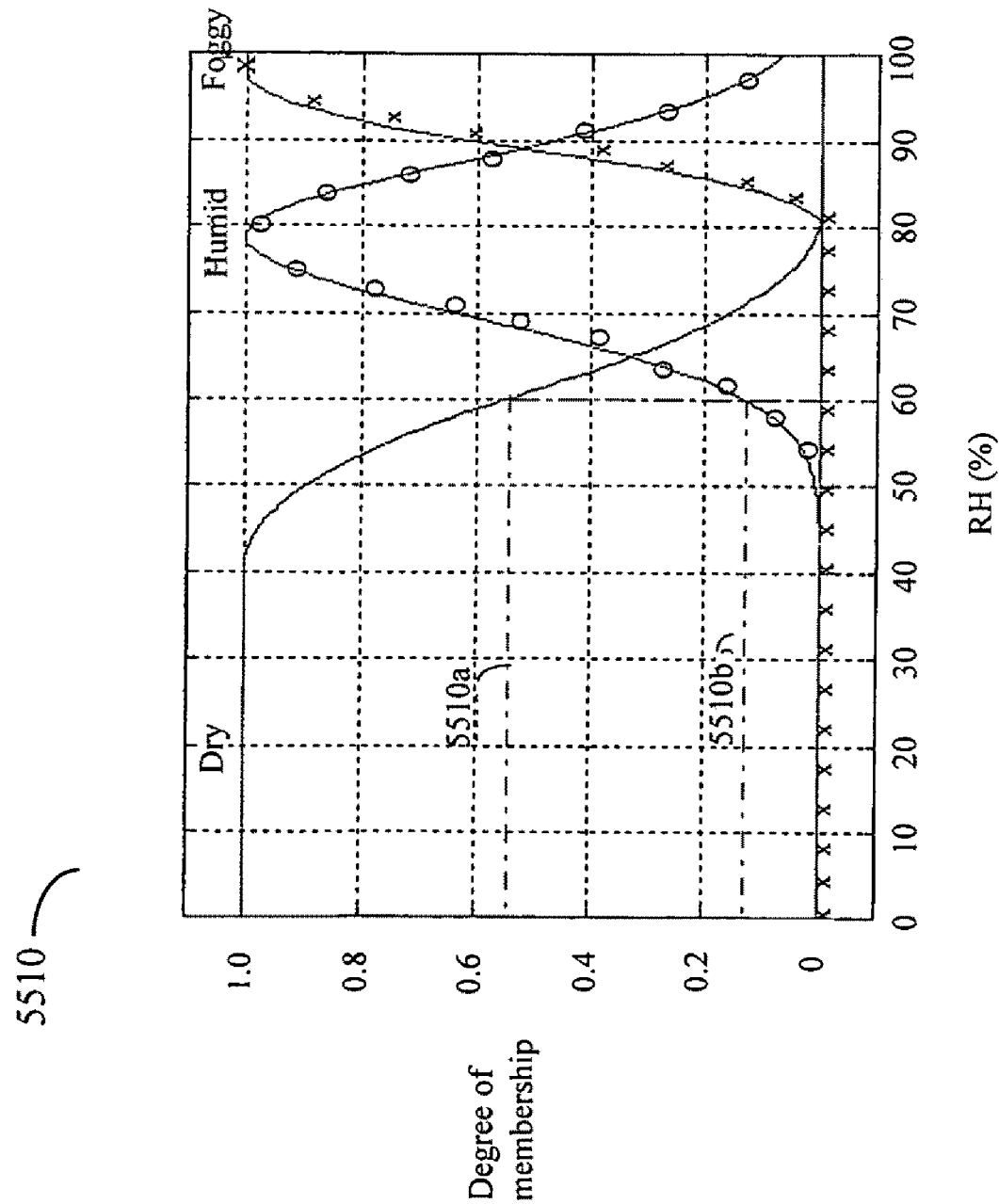
FIGS. 76-81 are examples of a graphical illustrations of membership functions that may be used in an embodiment for smoke detection.

With an RH sensor of moderate accuracy in mind, referring now to FIG. 76, shown is an example of a graphical illustration 5510 of RH membership functions that may be used in one embodiment. The membership may be used in an embodiment where the relative humidity may be in one of 3 regions (but not the 3 of them at the same time) reflecting the probability of absolute NO fog (i.e. dry for 0<RH<85), probable fog (i.e. humid for 60<RH<100), and certain fog (i.e. foggy for RH>80). This partition is built around the assumption of an RH sensor with absolute accuracy ±7.5% and about 10% uniformity across the area being monitored for smoke detection such as, for example, the bay area of an aircraft for cargo. Note that different RH regions may overlap due to, for example, sensor inaccuracy and the variability across cargo bays where fog formation may form at various RH values varying from 70 to 100%. Other embodiments may use other sensor accuracies and other factors in determining RH membership functions used.

Recall that the universe of discourse of RH is [0 100] % and that the RH membership functions are designed to detect the presence of fog and not to measure the RH. Note also that all RH readings of 40% or less indicate that no fog is present (i.e. dry) with absolute certainty (i.e. degree of membership=1). However, if the RH sensor reading occurs in a region of uncertainty where the RH value may have more than one image in two (or more) different membership functions, then fuzzy inference result in activating more than one rule leading to an efficient approximate reasoning to resolve this uncertainty. For instance, a RH reading of 60% as shown in 5510 may be interpreted in two different ways: the "RH is dry" with a membership degree of about 0.58 (line 5510a) and the "RH is humid" with a membership degree of about 0.18 (line 5510b). Rules that involve the two membership functions "Dry" and "humid" will be activated.

Figure 77:
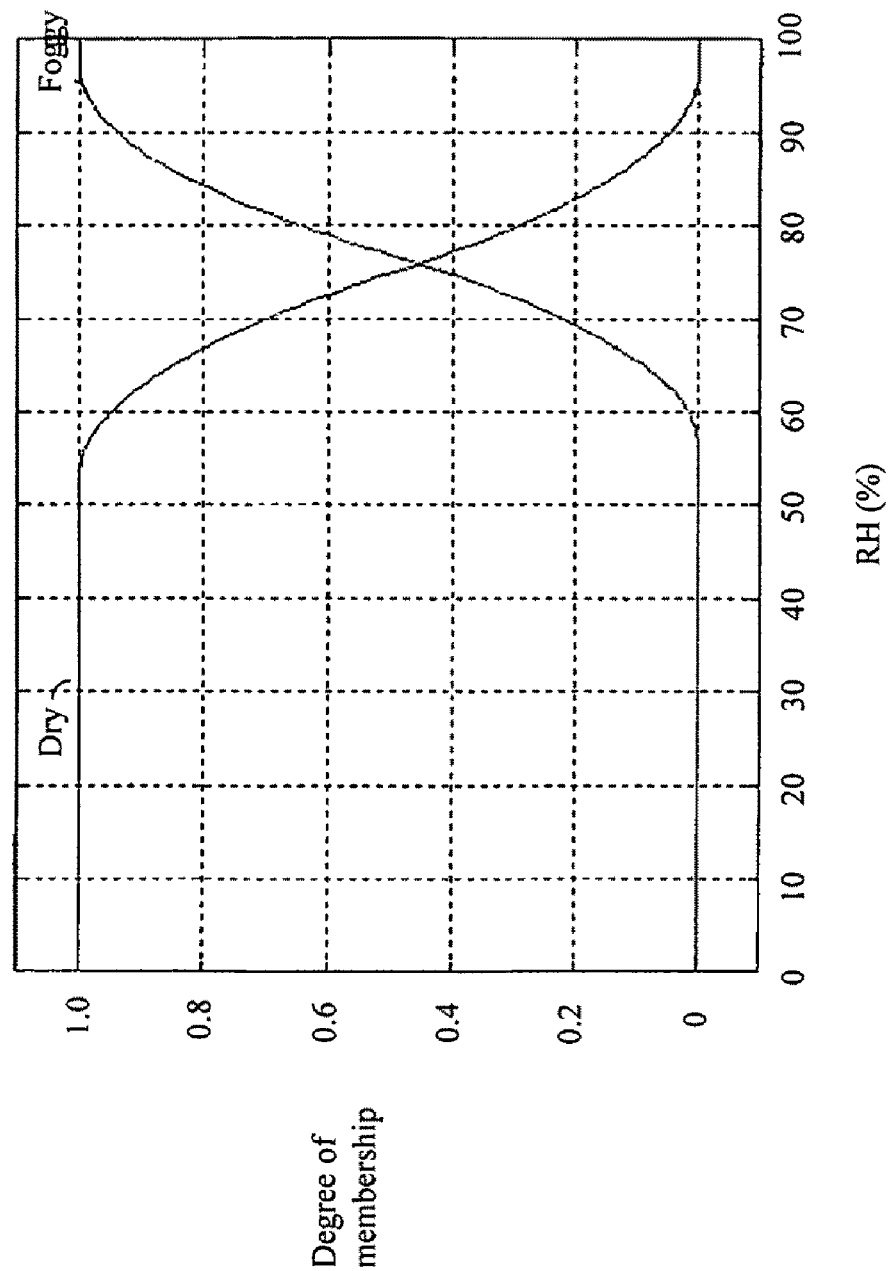

Referring now to FIG. 77, shown is another graphical illustration of RH membership functions that may be used in an embodiment. In 5512, the RH universe of discourse over the [0 100] % interval uses two regions.

Figure 78:
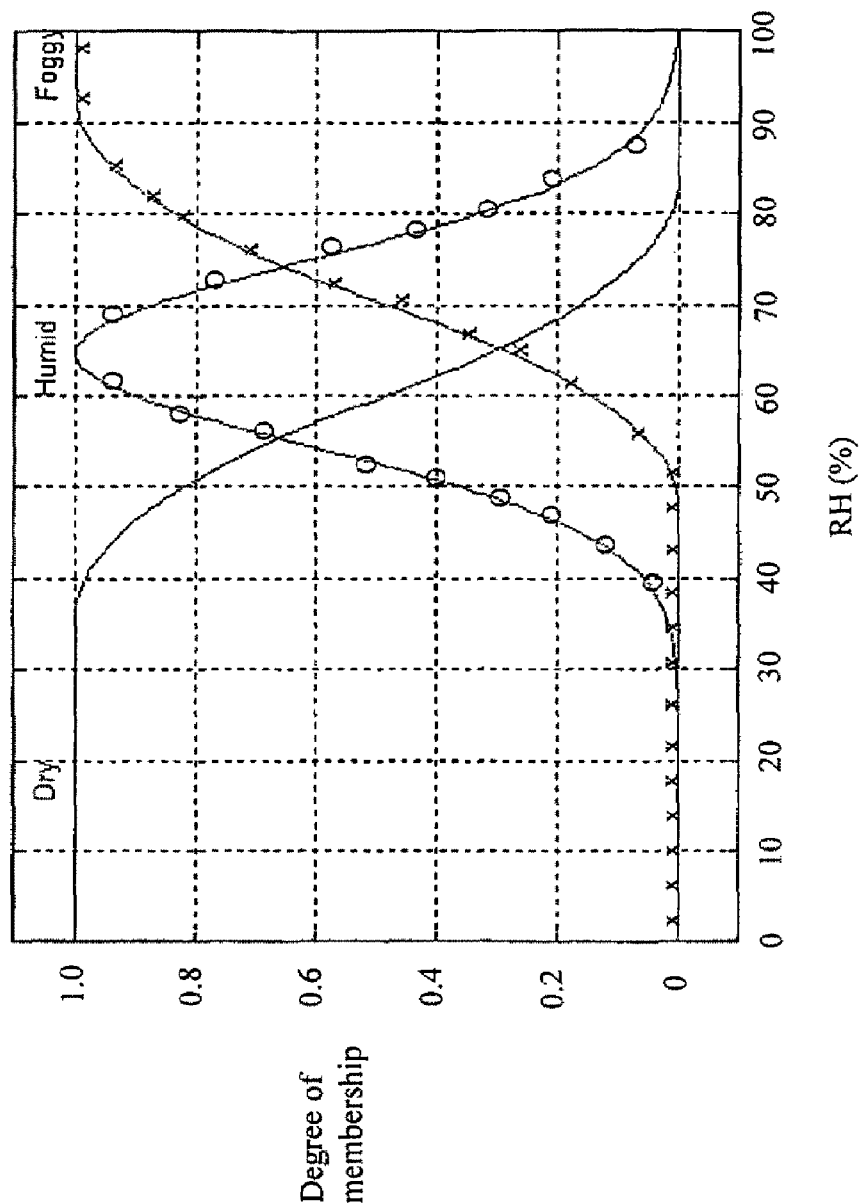

Referring now to FIG. 78, shown is another graphical illustration of RH membership functions that may be used in an embodiment. The representation 5514 includes 3 regions (i.e. "dry", "humid", and "foggy") with overlap as shown.

It should be noted that an embodiment may use one of the foregoing or other configuration in an embodiment in accordance with the particular environment of each embodiment.

Temperature is a second input variable that may be included in an embodiment for fire event detection. In some fire instances, temperature may be a deciding factor in early fire detection. Temperature information may include any one or more different parameter values including, for example, the actual and differential (i.e. temperature increase or decrease with respect to reference) values to detect heat sources and to double check the RH reading for fog formation. Other forms of temperature information, such as high order statistical moments, may also be used in an embodiment. Temperature values may be used to distinguish fire conditions, such as smoke, from other non-fire conditions, such as dust, and fog.

Figure 79:
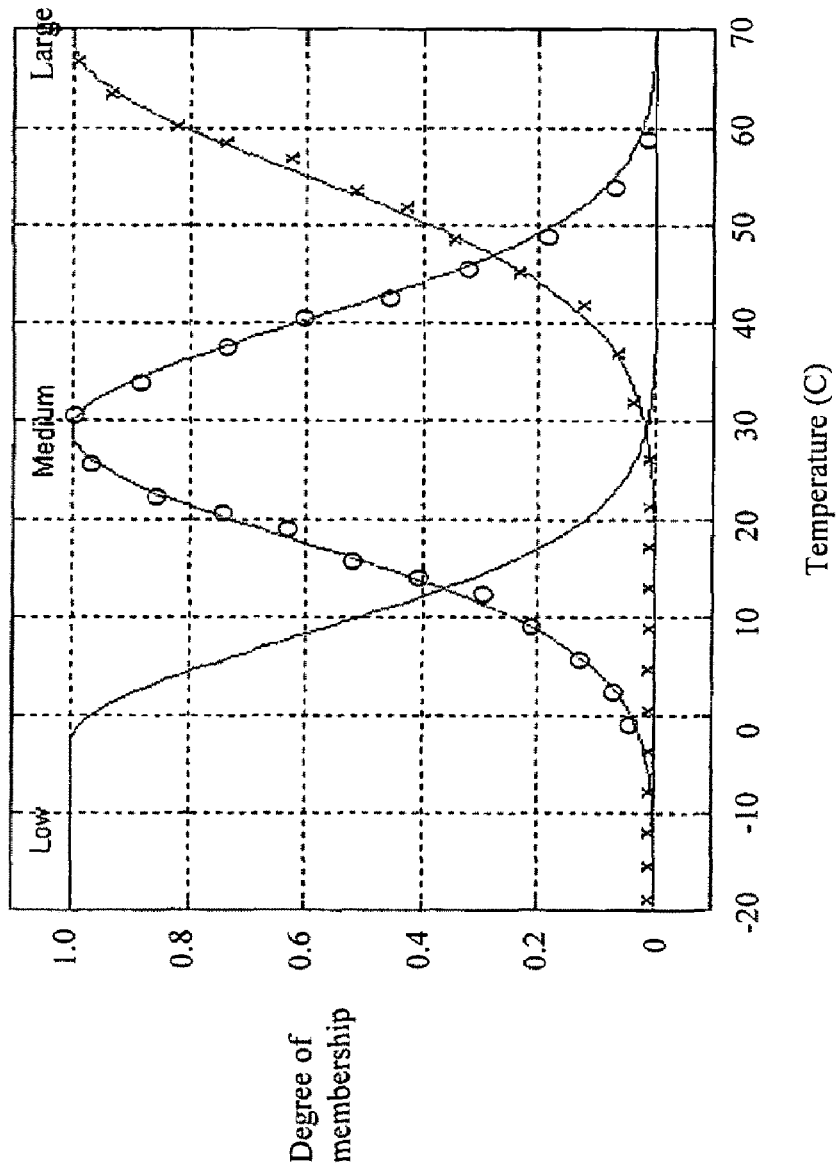

Referring now to FIG. 79, shown is a graphical illustration of 5516 of membership function partitions for temperature that may be used in an embodiment. The temperature universe of discourse in this illustration is (−20 70-degrees C.) divided into three regions (i.e. "low", "medium", and "large"). The overriding condition is that if the temperature is "large", then a fire confirmation must be positive. It should be noted that, as with other membership functions described herein, an embodiment may use other membership function definitions in accordance with a particular embodiment and associated conditions as may be determined, for example, using empirical testing or through other ways of obtaining data, such as real-time data gathering, simulation, and the like.

It should be noted that in 5516, the temperature inaccuracy of a sensor used in one embodiment and the temperature uniformity across the bay are low enough so that the three defined regions never overlap. In one embodiment, a temperature sensor used may have an inaccuracy of approximately 1 or 2 degrees and a distribution error of 10 degrees or less using the above partition. A worst case may be, for example, when the sensor reading is around 30 degrees in such case the "low" and "large" fuzzy sets may be fired but with a very low degree of membership (i.e. 0.1 compared to 1 for the "medium" fuzzy set). Other embodiments may use different membership functions in accordance with different sensors and factors associated therewith.

The third input that may be used in one embodiment is frame intensity information. The intensity information is one type of frame intensity information that may be used in an embodiment. The absolute average gray level at the local mask centered on the opposite light of a camera may be obtained and used in one embodiment after subtracting a background image from the frame at hand. The absolute average gray level is an efficient descriptor of any change in the scene and may be represented by:

$$\mu(t) = \frac{1}{N_m \times M_m} \sum_{i=1}^{N_m} \sum_{j=1}^{M_m} |P(i, j; t) - P_{Ref}(i, j; t_0)| \quad (8)$$

where:

$P(i, j; t)$ is the pixel value of the actual frame at location (i,j) and time t;

$P_{Ref}(i, j; t_0)$ is the pixel value of the reference frame (i.e. background) at time 0; and $N_m$ and $M_m$ are the dimensions of the local mask (e.g., that may be around entire frame, or a portion thereof) dimensions.

In this example, the pixel value is defined as the intensity level (i.e. between 0 (black) and 255 (white)) of the frame of interest at the designated pixel coordinates (i,j) and time (t). Note that applying the absolute value at the pixel-difference of interest may be used to account for any change in the image intensity, for example, such as whether such change is positive or negative. The absolute value consideration avoids situations where changes in the frame intensity may not be reflected in the average frame intensity value. One such example is when the frame exhibits an intensity increase in one part and an intensity decrease in another part. This is the case, for instance, where both phenomena of light scattering (i.e. increasing intensity) and dimming (i.e. decreasing intensity) are observed at the diagonal or opposite lighting view, or the case of smoke moving or fire flickering in the near or pilot view.

In using the foregoing in an embodiment, one embodiment may use a small subset of the intensity information (i.e. first order approximation at the opposite light of one camera). High order gray level intensity statistics (e.g. standard deviation), optical flow statistics, and many other features computed at multiple views and multiple cameras may be used to further improve system performance.

It should be noted that one or more different views may be preferred for use with a particular feature. For example, the absolute average grey level, as described herein, may be used in connection with an image, or portion thereof, obtained using the opposite or diagonal lighting view.

Figure 80:
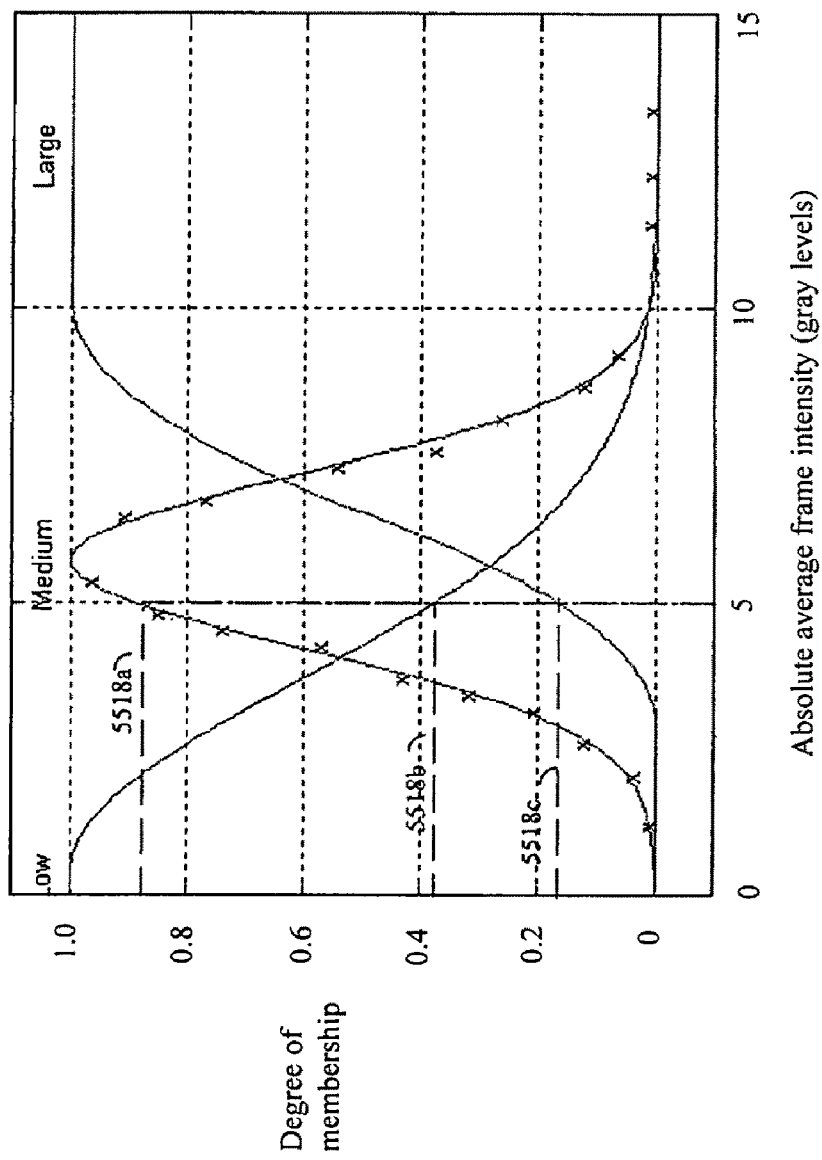

Referring now to FIG. 80, shown is a graphical illustration 5518 of one embodiment of the frame intensity membership functions. The membership functions in 5518 use the feature variable "frame-intensity" with a universe of discourse of (0 15) gray levels. This means that maximum absolute value of the average of frame difference of mask centered on the opposite light is 15 degrees. Any value encountered outside this interval in this example is interpolated using the appropriate membership function. However, an embodiment may also make sure that any variable outside the universe of discourse is interpolated correctly using an explicit definition of the membership function defined over a larger set of the university of discourse. An embodiment may also use other values and other membership functions that as described herein. Additionally, an embodiment may use one or more other feature values based on intensity information.

The frame intensity membership functions in the embodiment 5518 are defined with accountability for the vagueness and variability of the intensity information and its indication of a fire event. Under various conditions that are related to the fire type, fire location, camera view, ventilation, and other factors, the frame intensity may be described with either one of fuzzy sets (i.e. "low", "medium", or "large") at the same time depending on the severity of the fire case and the targeted primary smoke detection alarm to beat. For instance, if the absolute average of the local intensity of the frame difference of the opposite lighting view is 5 gray levels, with reference to 5518, this information is interpreted simultaneously as the frame intensity is "low" with a degree of belief (or membership) of 0.39, "medium" with a degree of belief of 0.85, and "large" with a degree of belief of 0.19. An embodiment may also further define the optimal shape and boundaries of each membership function.

Figure 81:
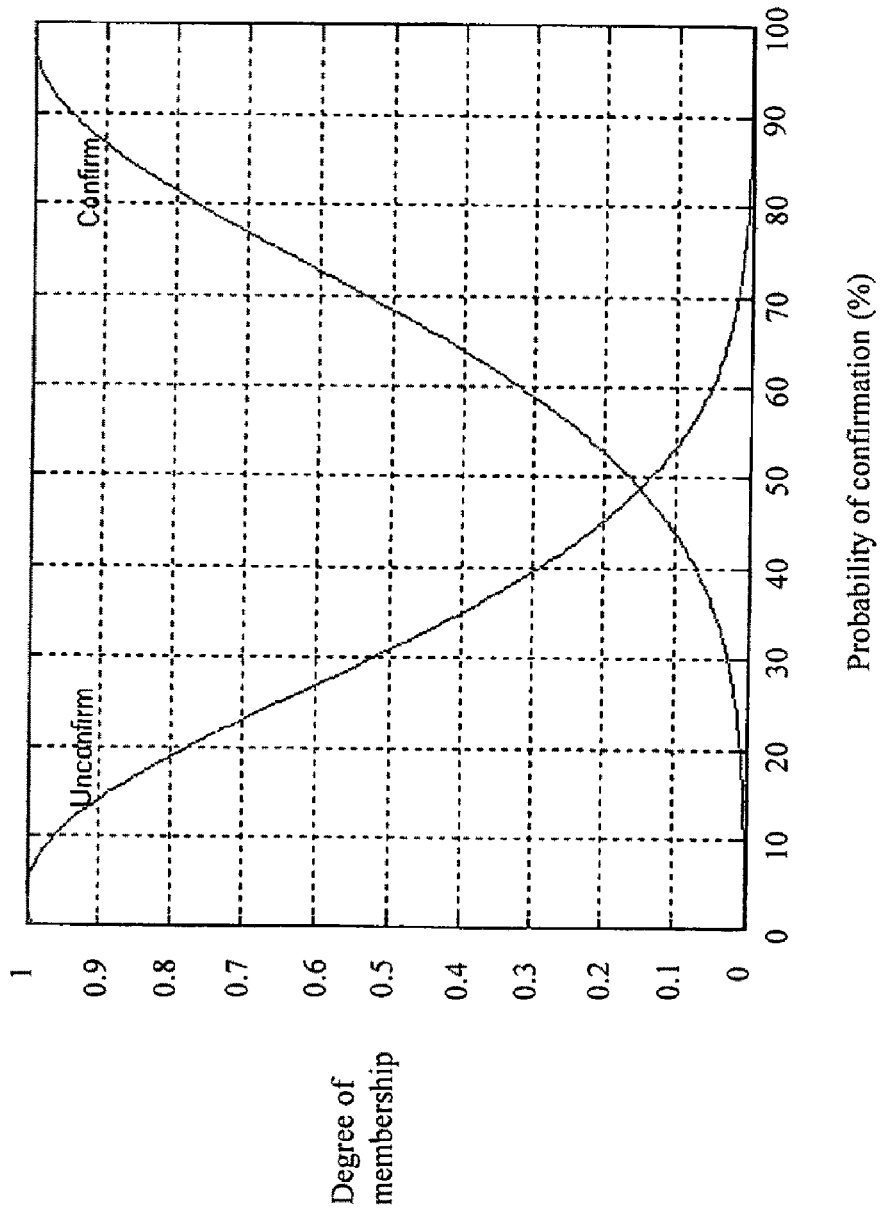

In one embodiment of a fire verification/detection system, a 2-state output may be utilized: "confirm" in case of fire situation and "unconfirm" in case of a false alarm. There is no answer in between. For this reason, the output is portioned into fuzzy sets: "Confirm" and "Unconfirm". Referring now to FIG. 81, shown is an example of a graphical illustration of confirm and unconfirm membership functions that may be used in an embodiment. Note that the two membership functions of 5520 are designed in a way to have only a small area of overlap so that a "sharp" jump between the probability of "confirm" and "unconfirm" is realized. Other embodiments may use other membership functions than as described herein.

It should be noted that the final defuzzified system output is a real number between 0 and 100% expressing the probability of confirmation of fire condition. The defuzzified output is a representation of the final aggregated fuzzy output set using the "centroid" defuzzification method as follows, $$\text{Probability of confirmation} = \frac{\sum_{i=1}^{N} i \times \text{area}(i)}{\sum_{i=1}^{N} \text{area}(i)} \quad (9)$$

where:

area(i) is the membership function of the aggregated fuzzy output function at the time sample i;

N is the number of time samples defined by the final fuzzy output shape and the sampling period (i.e. to digitally represent the final output membership function). An embodiment may use other types of defuzzification methods and associated formulae as well known and described, for example, in Roychowdhury S. *An inquiry into the theory of defuzzification*, Physica-Verlag GmbH Heidelberg, Germany 2001.

In this embodiment, the final confirmation signal is Confirm if and only if the Probability of confirmation ≧60%; otherwise Unconfirm. Other embodiments may also use other threshold probabilities as may be determined in connection with system criteria, such as, for example, tolerance for false positives, and the like.

Figure 82:
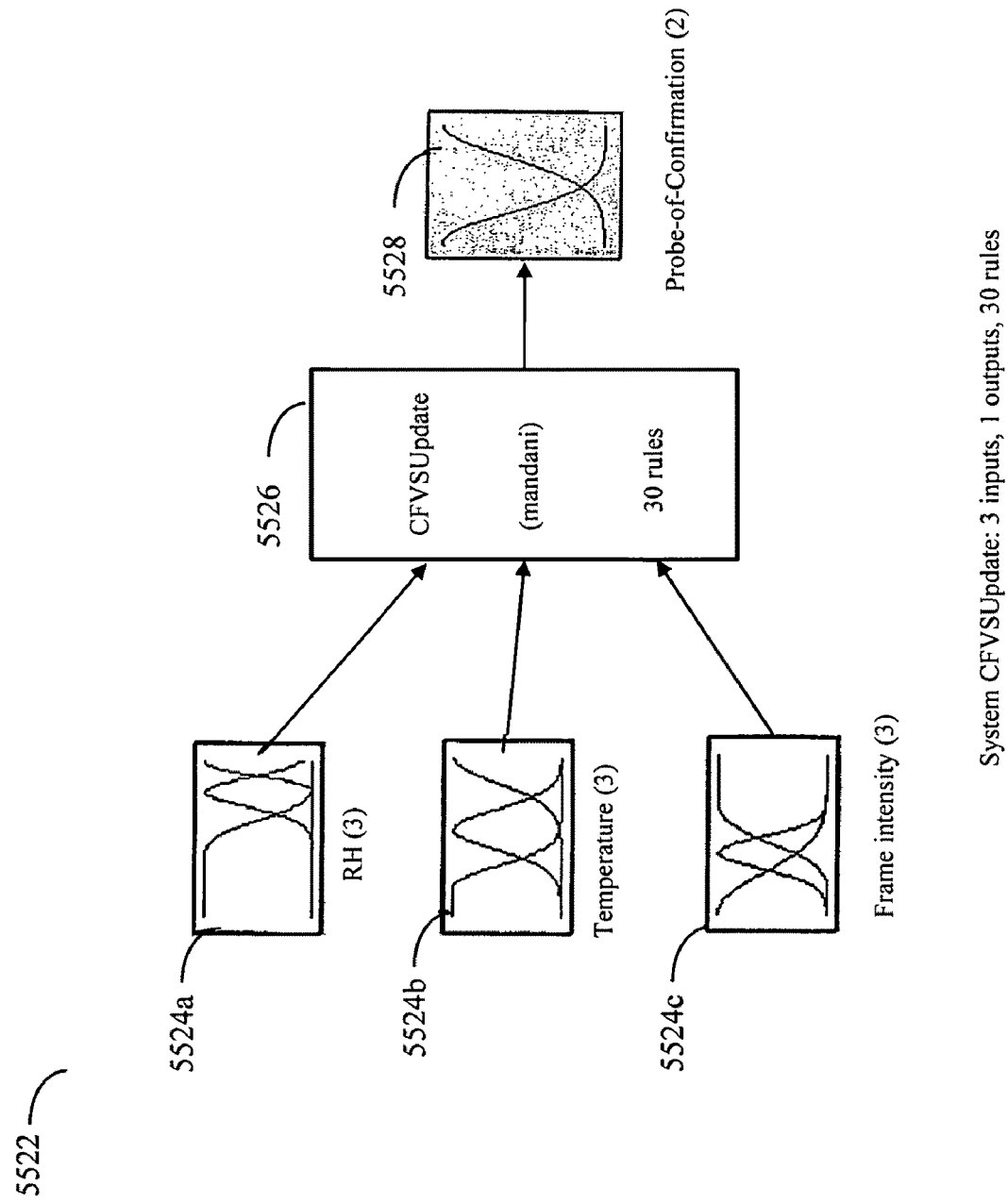
FIG. 82 is a representation of one embodiment of a fuzzy inference engine that may be used in fire detection and verification.

As described elsewhere herein, fuzzy inference may be characterized as a strong feature of fuzzy logic where the relation between the input and the output is structured into a set of intuitive and natural if-then rules expressing the physical and flexible input-output relationship of the fuzzy system. One embodiment of a fuzzy inference engine having 3 inputs and one output that may be used in a fire detection and verification system is represented in FIG. 82. The fuzzy inference engine 5522 is a representation of one embodiment as described herein. The three inputs 5524*a*-5524*c* are processed using fuzzy logic techniques in accordance with the set of rules 5526 to determine a probability of confirmation 5528. The probability of confirmation is compared to a threshold level of probability in order to make a determination as to whether a smoke or fire condition exists. The fuzzy inference engine 5522 in combination with processing to compare the probability of confirmation to a threshold and produce a signal representing a fire or non-fire condition is referred to herein as a Fuzzy Smoke Detector (FSD).

In one embodiment, there are 30 if-then rules that are designed to define the fire detection and verification decision making unit via the fuzzy inference engine:

1. If (RH is "Dry") AND (Temp is "Low") AND (F-intensity is "Low") then (Prob-Confirm is "Unconfirm")
2. If (RH is "Dry") AND (Temp is "Low") AND (F-intensity is "Medium") then (Prob-Confirm is "Confirm")
3. If (RH is "Dry") AND (Temp is "Low") AND (F-intensity is "Large") then (Prob-Confirm is "Confirm")
4. If (RH is "Dry") AND (Temp is "Medium") AND (F-intensity is "Low") then (Prob-Confirm is "Unconfirm")
5. If (RH is "Dry") AND (Temp is "Medium") AND (F-intensity is "Medium") then (Prob-Confirm is "Confirm")
6. If (RH is "Dry") AND (Temp is "Medium") AND (F-intensity is "Large") then (Prob-Confirm is "Confirm")
7. If (RH is "Dry") AND (Temp is "Large") AND (F-intensity is "Low") then (Prob-Confirm is "Confirm")
8. If (RH is "Dry") AND (Temp is "Large") AND (F-intensity is "Medium") then (Prob-Confirm is "Confirm")
9. If (RH is "Dry") AND (Temp is "Large") AND (F-intensity is "Large") then (Prob-Confirm is "Confirm")
10. If (RH is "Dry") AND (Temp is "Large") then (Prob-Confirm is "Confirm")
11. If (RH is "Dry") AND (F-intensity is "Large") then (Prob-Confirm is "Confirm")
12. If (RH is "Humid") AND (Temp is "Low") AND (F-intensity is "Low") then (Prob-Confirm is "Unconfirm")
13. If (RH is "Humid") AND (Temp is "Low") AND (F-intensity is "Medium") then (Prob-Confirm is "Unconfirm")
14. If (RH is "Humid") AND (Temp is "Low") AND (F-intensity is "Large") then (Prob-Confirm is "Confirm")
15. If (RH is "Humid") AND (Temp is "Medium") AND (F-intensity is "Low") then (Prob-Confirm is "Unconfirm")
16. If (RH is "Humid") AND (Temp is "Medium") AND. (F-intensity is "Medium") then (Prob-Confirm is "Unconfirm")
17. If (RH is "Humid") AND (Temp is "Medium") AND (F-intensity is "Large") then (Prob-Confirm is "Confirm")
18. If (RH is "Humid") AND (Temp is "Large") AND (F-intensity is "Low") then (Prob-Confirm is "Confirm")
19. If (RH is "Humid") AND (Temp is "Large") AND (F-intensity is "Medium") then (Prob-Confirm is "Confirm")
20. If (RH is "Humid") AND (Temp is "Large") AND (F-intensity is "Large") then (Prob-Confirm is "Confirm")
21. If (RH is "Foggy") AND (Temp is "Low") AND (F-intensity is "Low") then (Prob-Confirm is "Unconfirm")
22. If (RH is "Foggy") AND (Temp is "Low") AND (F-intensity is "Medium") then (Prob-Confirm is "Unconfirm")
23. If (RH is "Foggy") AND (Temp is "Low") AND (F-intensity is "Large") then (Prob-Confirm is "Confirm")
24. If (RH is "Foggy") AND (Temp is "Medium") AND (F-intensity is "Low") then (Prob-Confirm is "Unconfirm")
25. If (RH is "Foggy") AND (Temp is "Medium") AND (F-intensity is "Medium") then (Prob-Confirm is "Unconfirm")
26. If (RH is "Foggy") AND (Temp is "Medium") AND (F-intensity is "Large") then (Prob-Confirm is "Confirm")
27. If (RH is "Foggy") AND (Temp is "Large") AND (F-intensity is "Low") then (Prob-Confirm is "Confirm")
28. If (RH is "Foggy") AND (Temp is "Large") AND (F-intensity is "Medium") then (Prob-Confirm is "Confirm")
29. If (RH is "Foggy") AND (Temp is "Large") AND (F-intensity is "Large") then (Prob-Confirm is "Confirm")
30. If (Temp is "Large") then (Prob-Confirm is "Confirm")

Any statement here may be characterized as "relatively true" depending on the degree of the membership function at hand. Note that rules (11) and (30) reflect the system design to deal respectively with TF2-types of fire and TF6-types of fire. Note also that rule (23) is designed to confirm smoke even if it is foggy provided that the temperature is medium or large.

In fact, each and every rule represents a statement describing the expected system output based on a "vague" description of sensor readings.

As described herein, one embodiment of the foregoing fuzzy inference system may include the following:
- Comprise 30 rules described above
- Use the "min" method to implement the "AND" operator min
- Use the "max" method to implement the "OR" operator min
- Use the "min" method to implement the "Imp" operator (i.e. rules implication)
- Use the "max" method to implement the "Agg" operator (i.e. rules aggregation)
- Use the "centroid" method to implement the "Defuzzification" operator Using the foregoing, following is an example. Different applicable rules may be aggregated to estimate a probability of confirmation of 61.4% in the case of RH value of 62%, temperature value of 48 (C), and absolute average frame intensity of 8.43 (gray levels). In this instance, the probability of smoke confirmation in case of a primary smoke alarm is 61.4%. The centroid output (i.e. 0.614) may be computed after digitizing the universe of discourse of the aggregated output fuzzy set into 100 samples. If a confirmation threshold of 60% is used, the foregoing example situation is declared by the FSD utilizing the techniques described herein, as a genuine fire case.

For better understanding of the output decision hyper-surfaces of the fuzzy inference engine as described and used herein, the unique system output (i.e. probability of confirmation) is plotted versus the input variables. Because system inputs are more than two in the embodiment described herein, one input may be fixed as a reference (at 4 different values) while the other two inputs will vary along their universes of discourses. This presentation illustrates, for example, monitoring and verifying the system inference system as it is defined by the set of rules and the membership functions.

Figure 83:
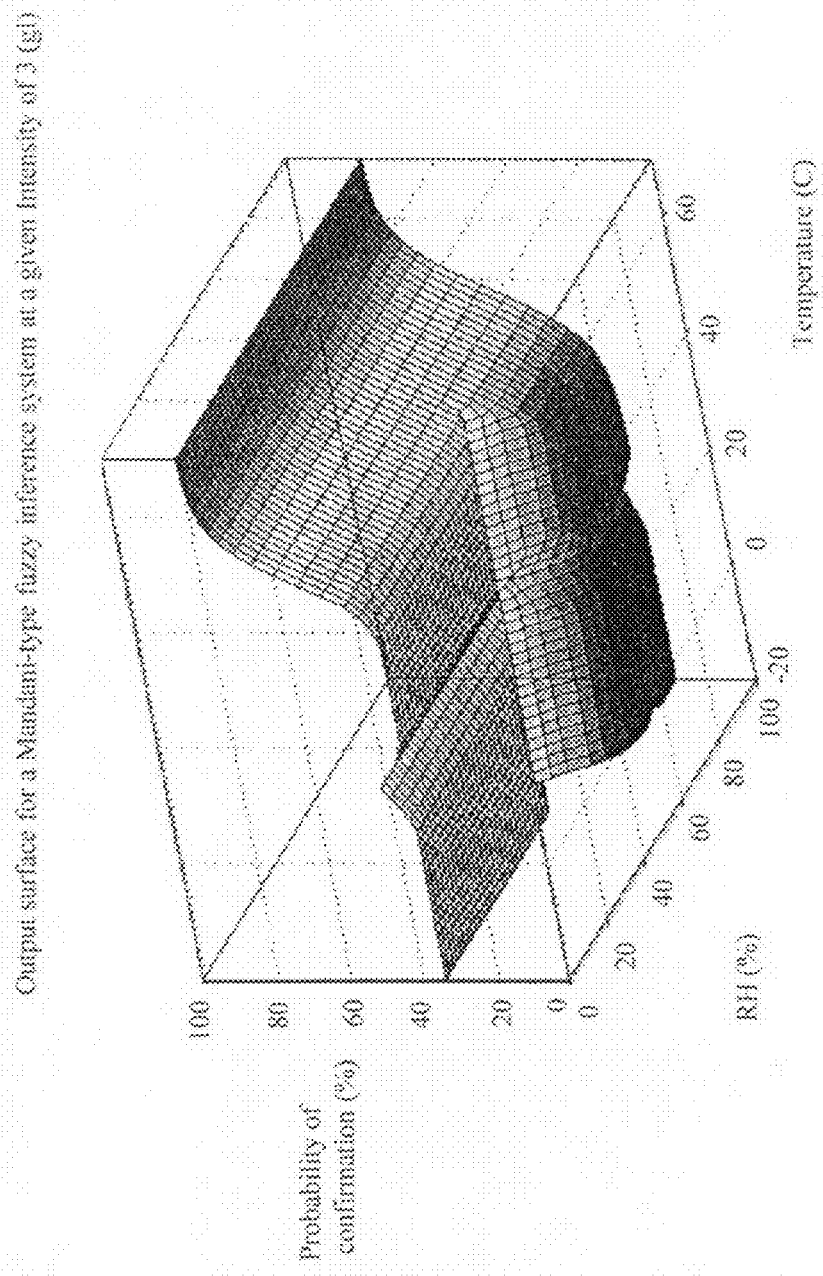
FIGS. 83-86 are example illustrations of the decision surface of a fire detection system at different fixed frame intensities.

Referring now to FIGS. 83-86, shown are example illustrations of the systems decision surface at fixed frame intensities of 3, 6, 9, and 15 gray levels, respectively. Referring to FIG. 83, note that at low gray level values (i.e. 3 gray levels are assumed to be within the vibration levels), the FSD will be triggered only if the temperature is "large" enough (i.e. >50 C). Also note that the probability of confirmation is higher when the no fog (i.e. RH<50%) is present. The vertical and horizontal lines (i.e. "bumps") reflect the overlap regions at various membership functions. If more smooth transition between decision areas is desired in an embodiment, membership functions other than "Gaussian" shapes may be used.

Figure 84:
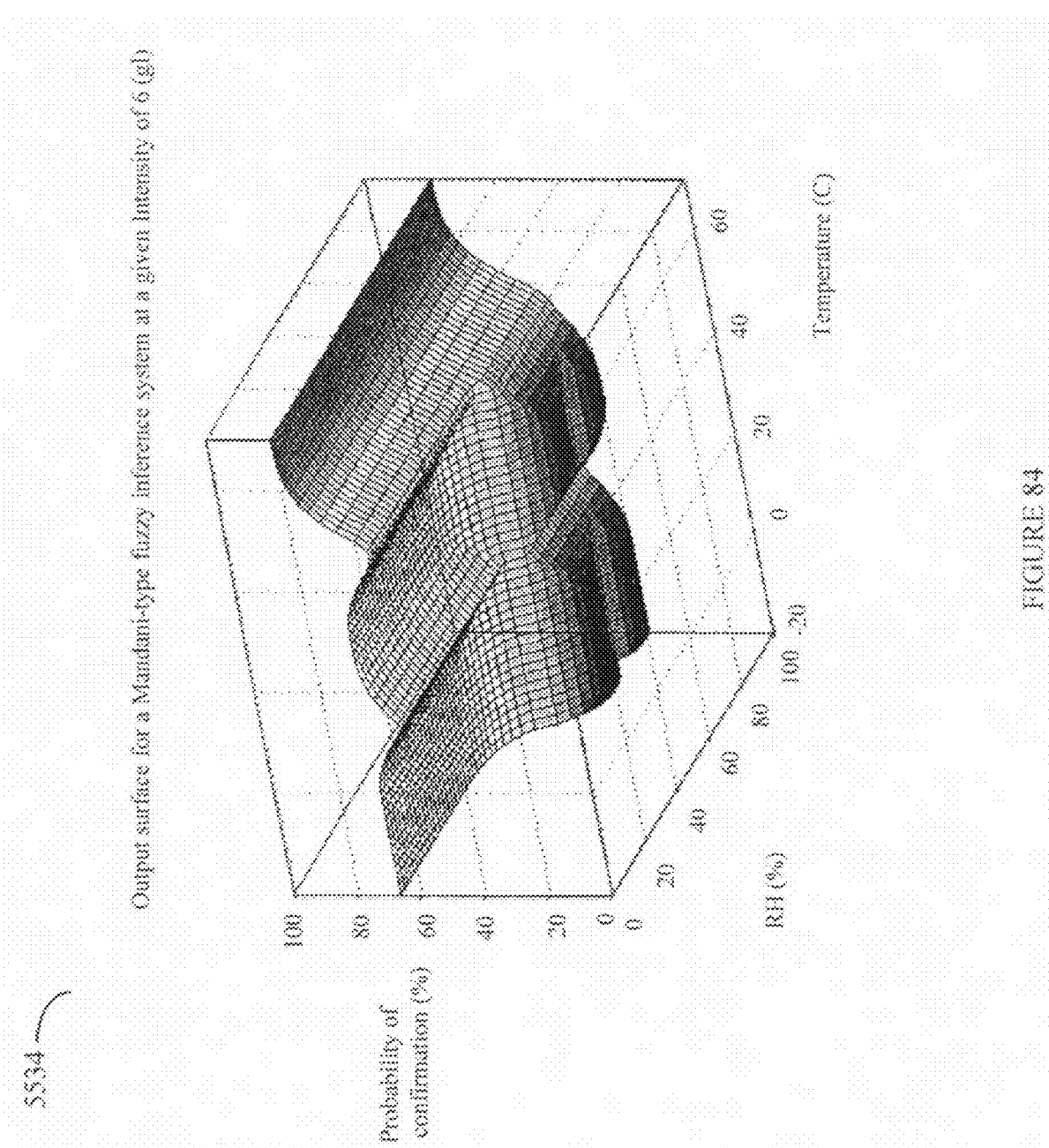

Referring now to FIG. 84, as the gray level is raised slightly (i.e. 6 instead of 3 gray levels), the probability of confirmation increases to more than 60% given that no fog is present.

Figure 85:
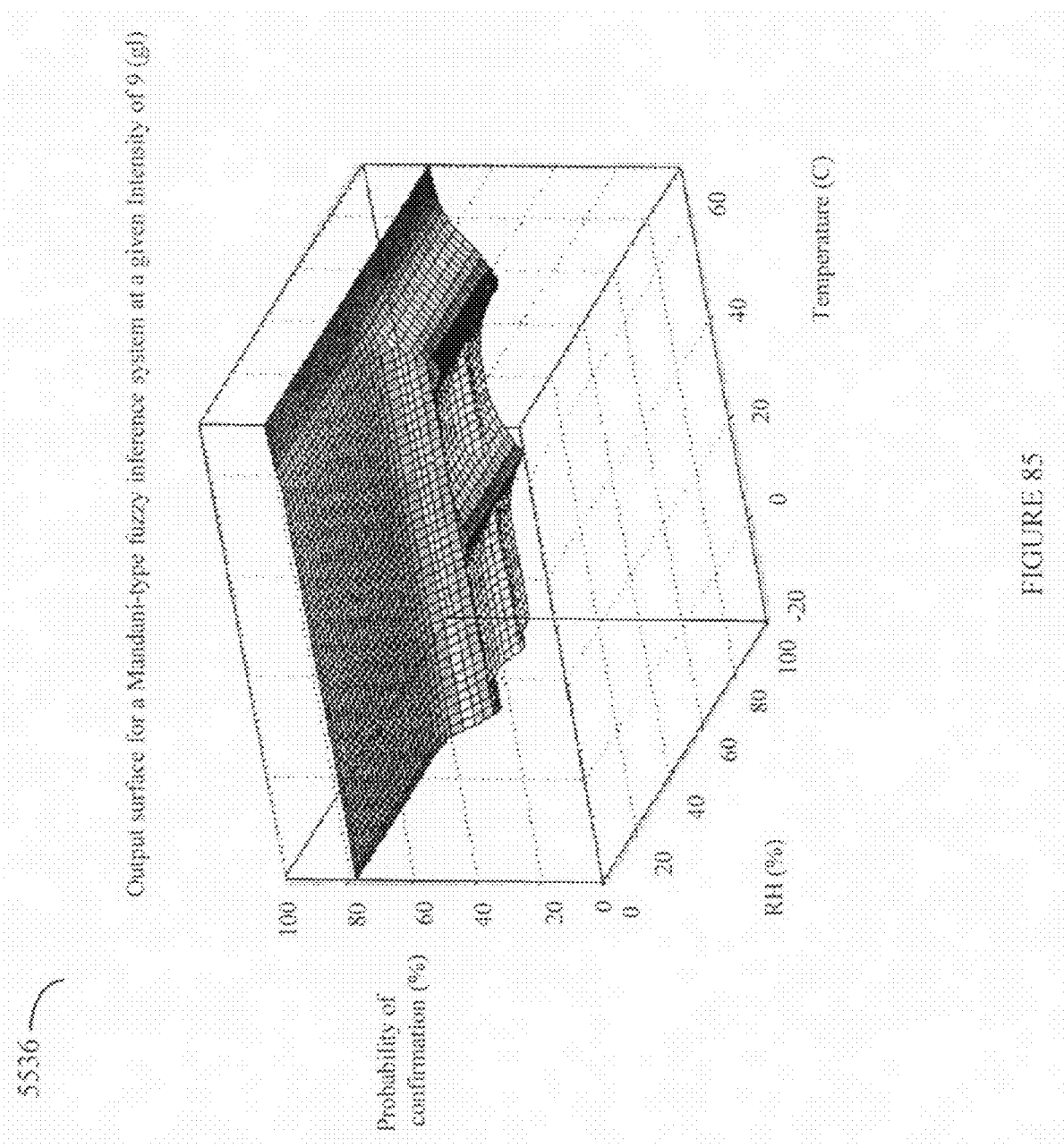
Figure 86:
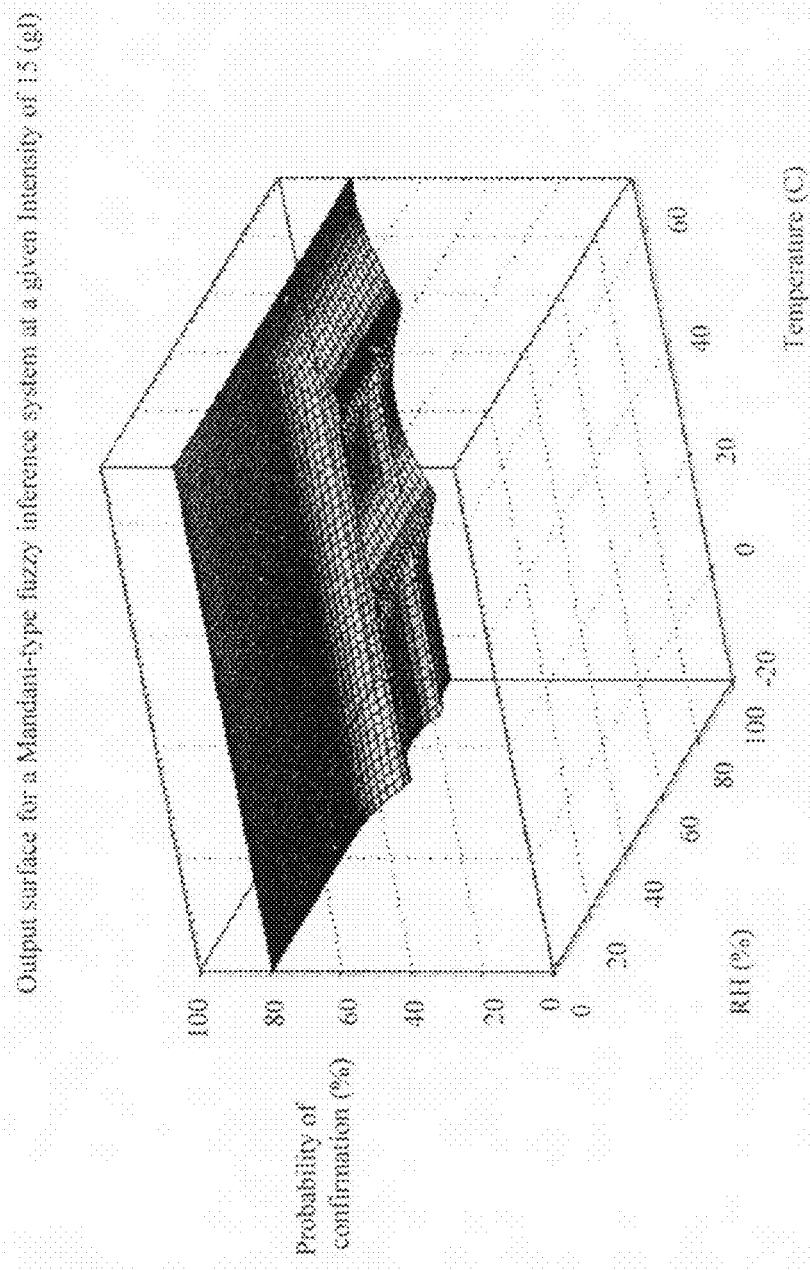
Figure 87:
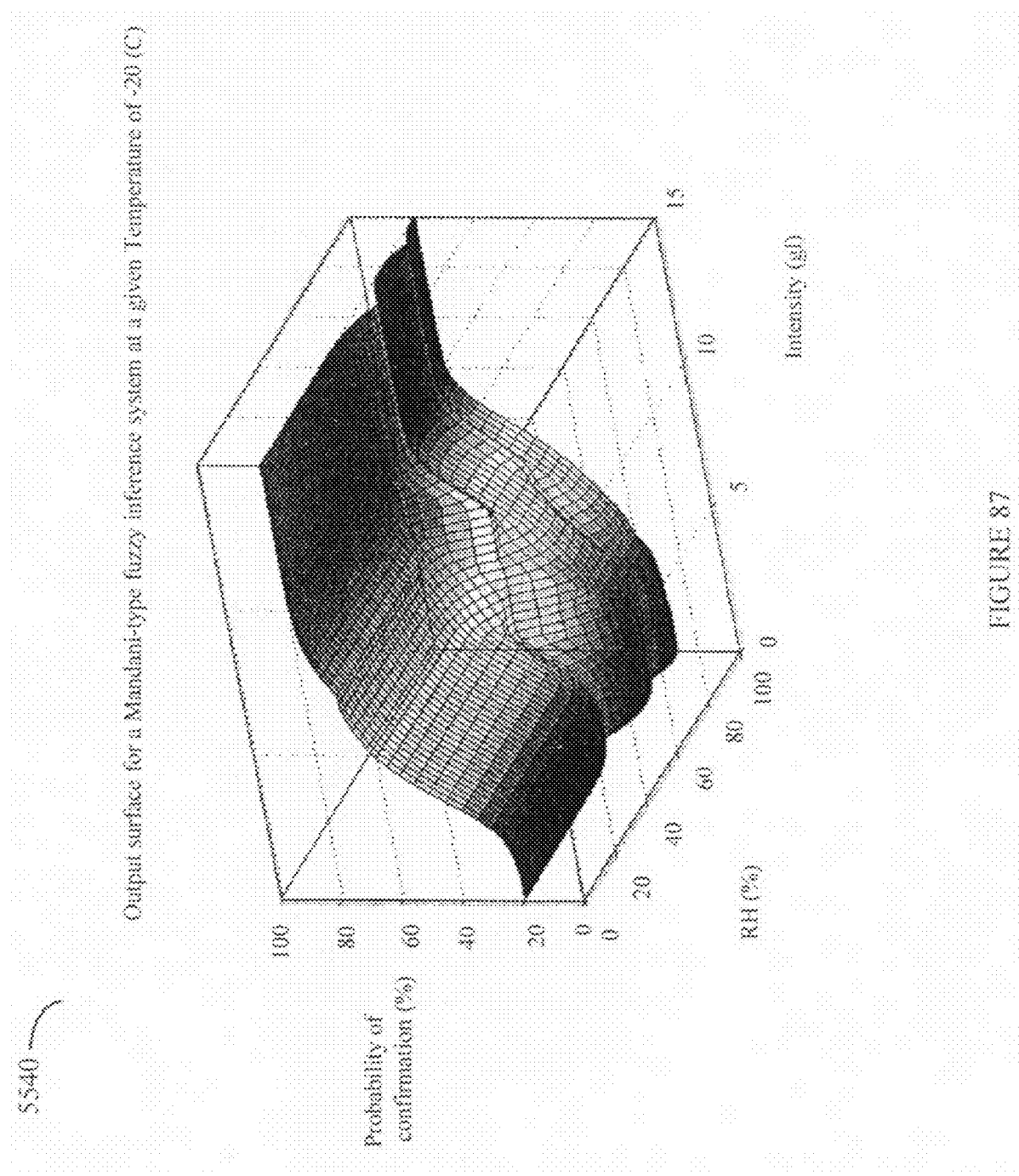
FIGS. 87-90 are example illustrations of the decision surface of a fire detection system at different temperatures.
Figure 88:
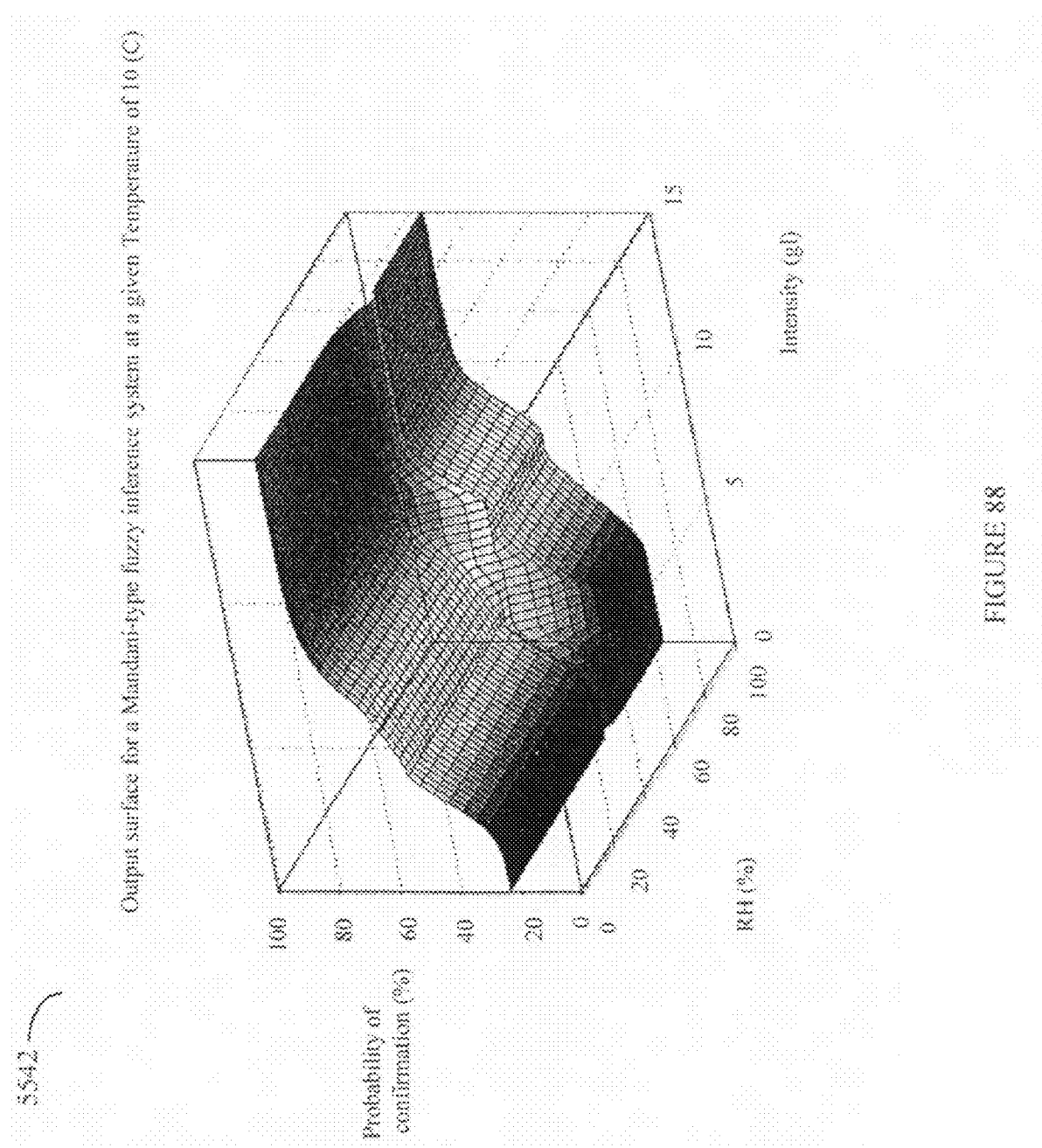
Figure 89:
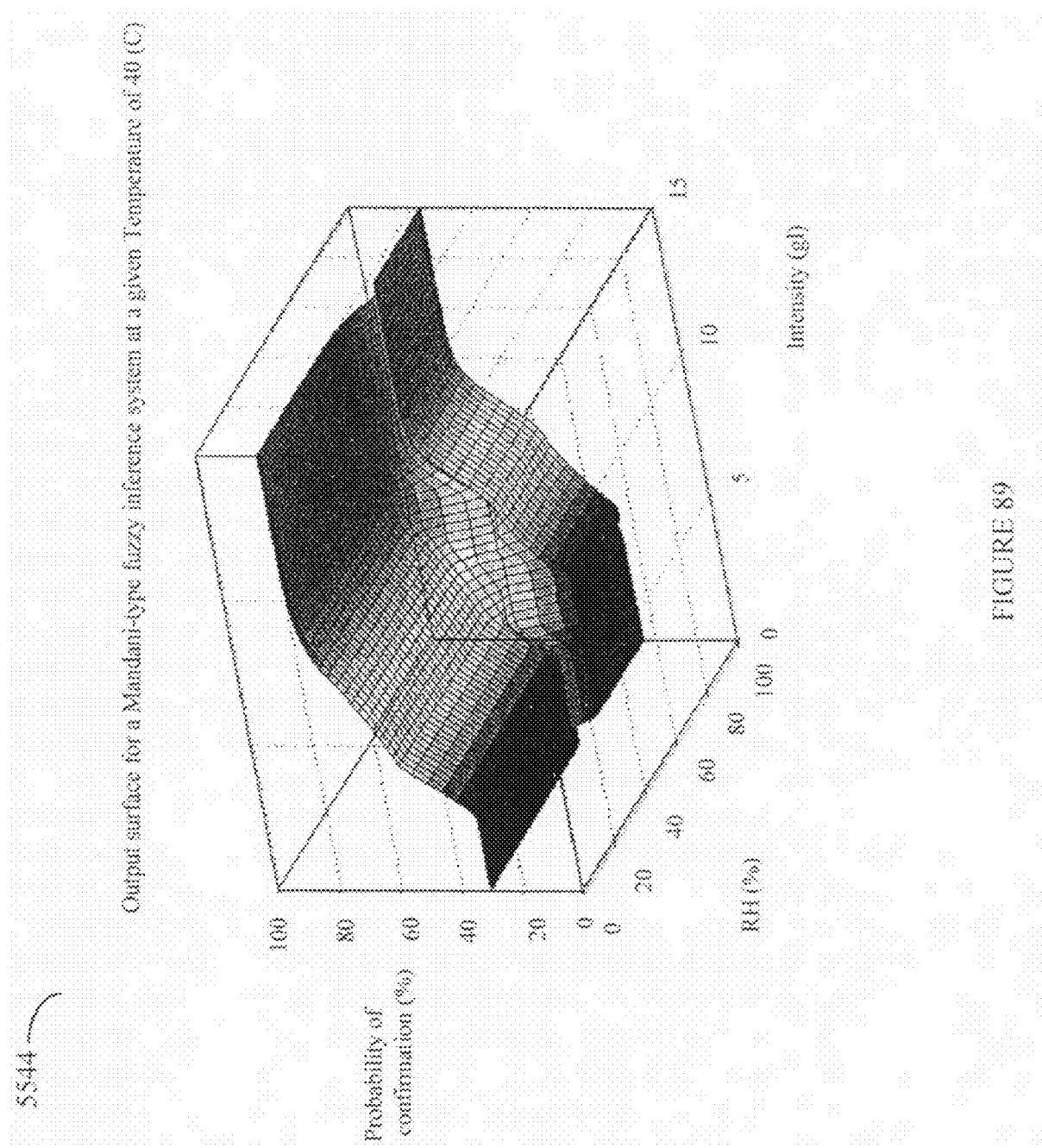
Figure 90:
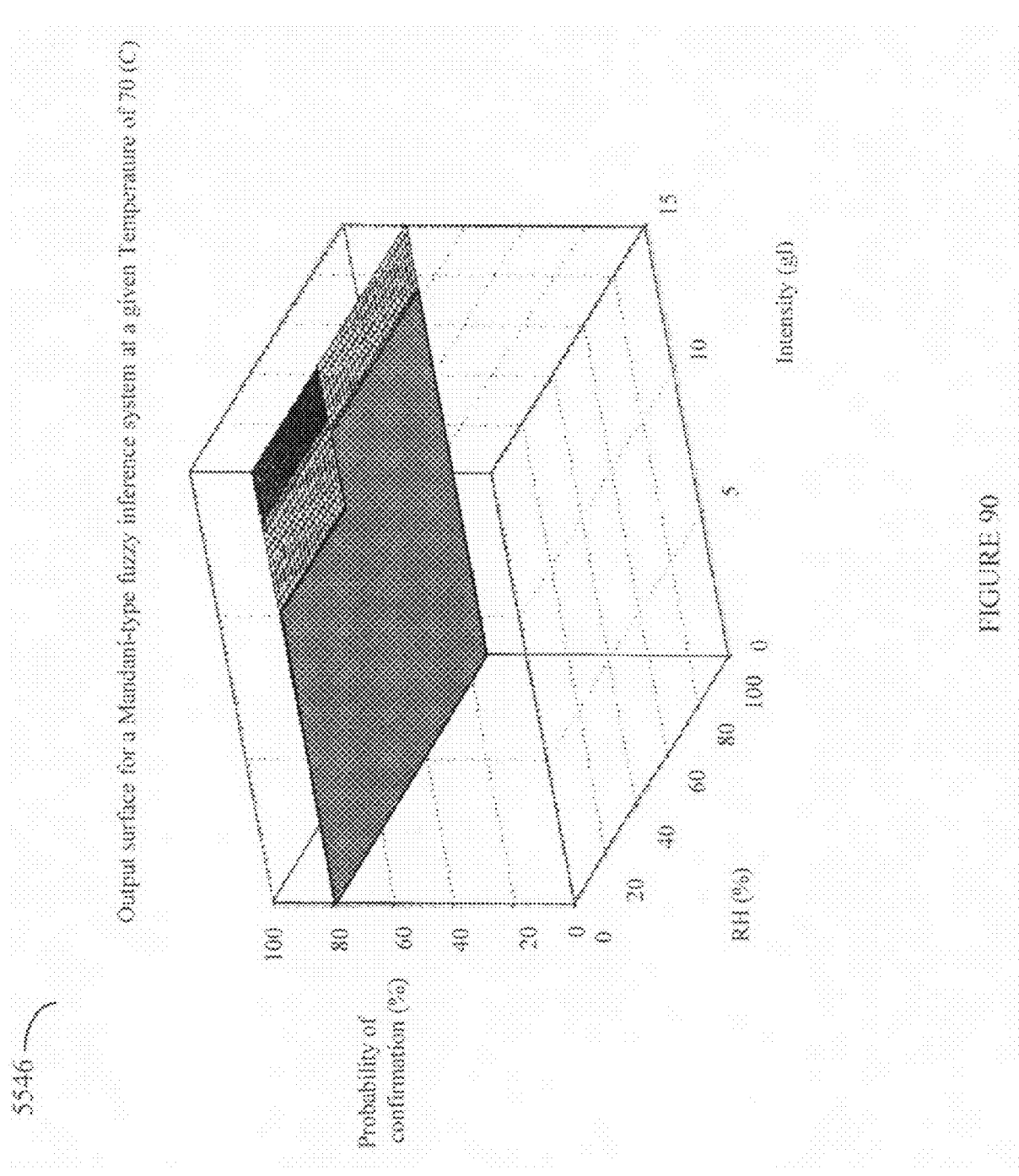

Referring now to FIGS. 85-86, an intensity value of 9 gray levels or higher, "saturates" the system decision making it to confirm fire even if such change in frame intensity is due to fog (i.e. conservative approach).

Referring now to FIGS. 87-90, illustrated is the decision surface at fixed temperatures of −20, 10, 40, and 70 degrees Celcius, respectively. Note that the FSD confirmation probability increases with the frame intensity and decreases in the presence of fog. At high temperature (TF6-type fires), the system is in a "saturated" confirmation mode.

Figure 91:
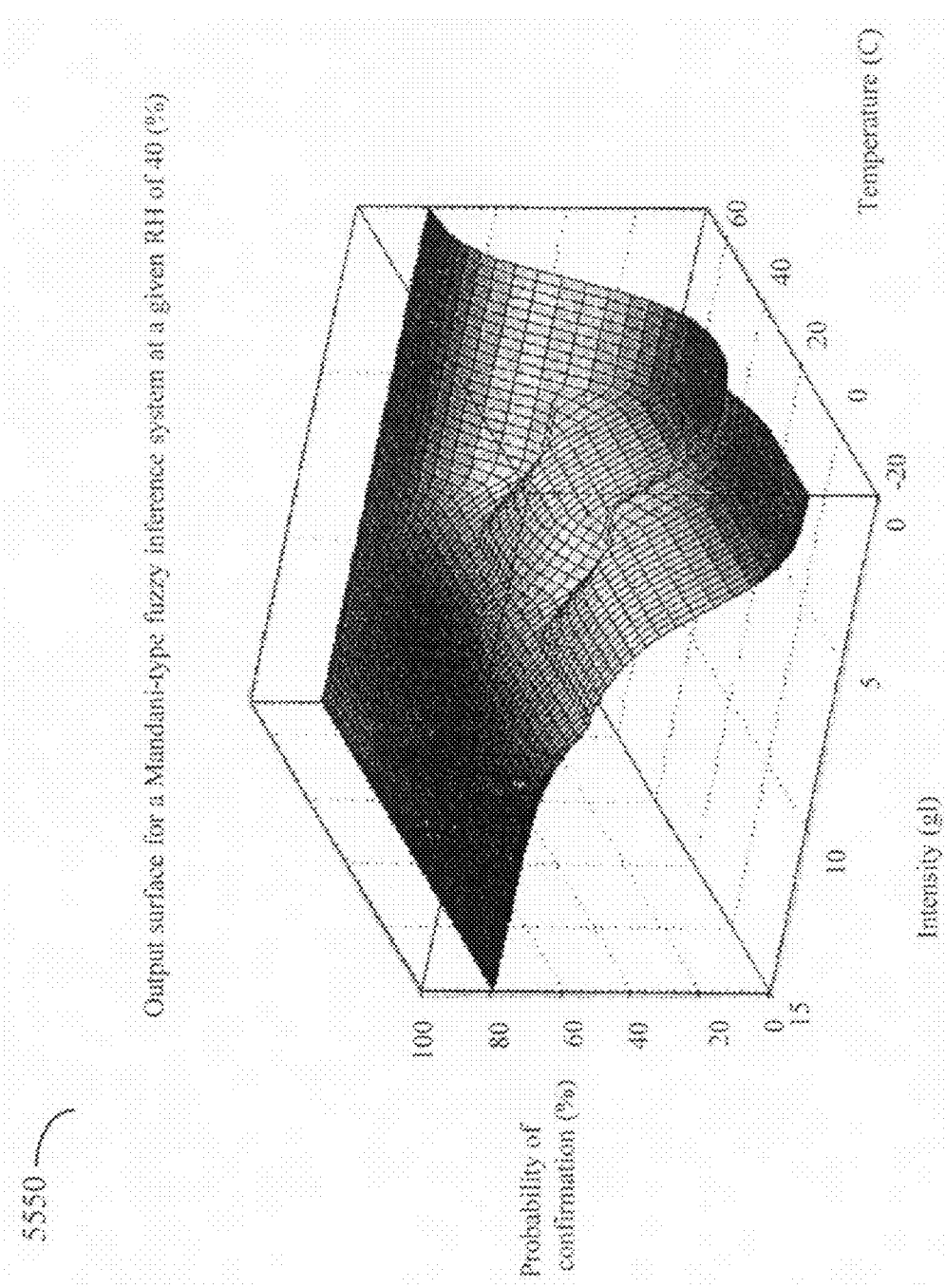
FIGS. 91-93 are example illustrations of he decision surface at different fixed relative humidity values.
Figure 92:
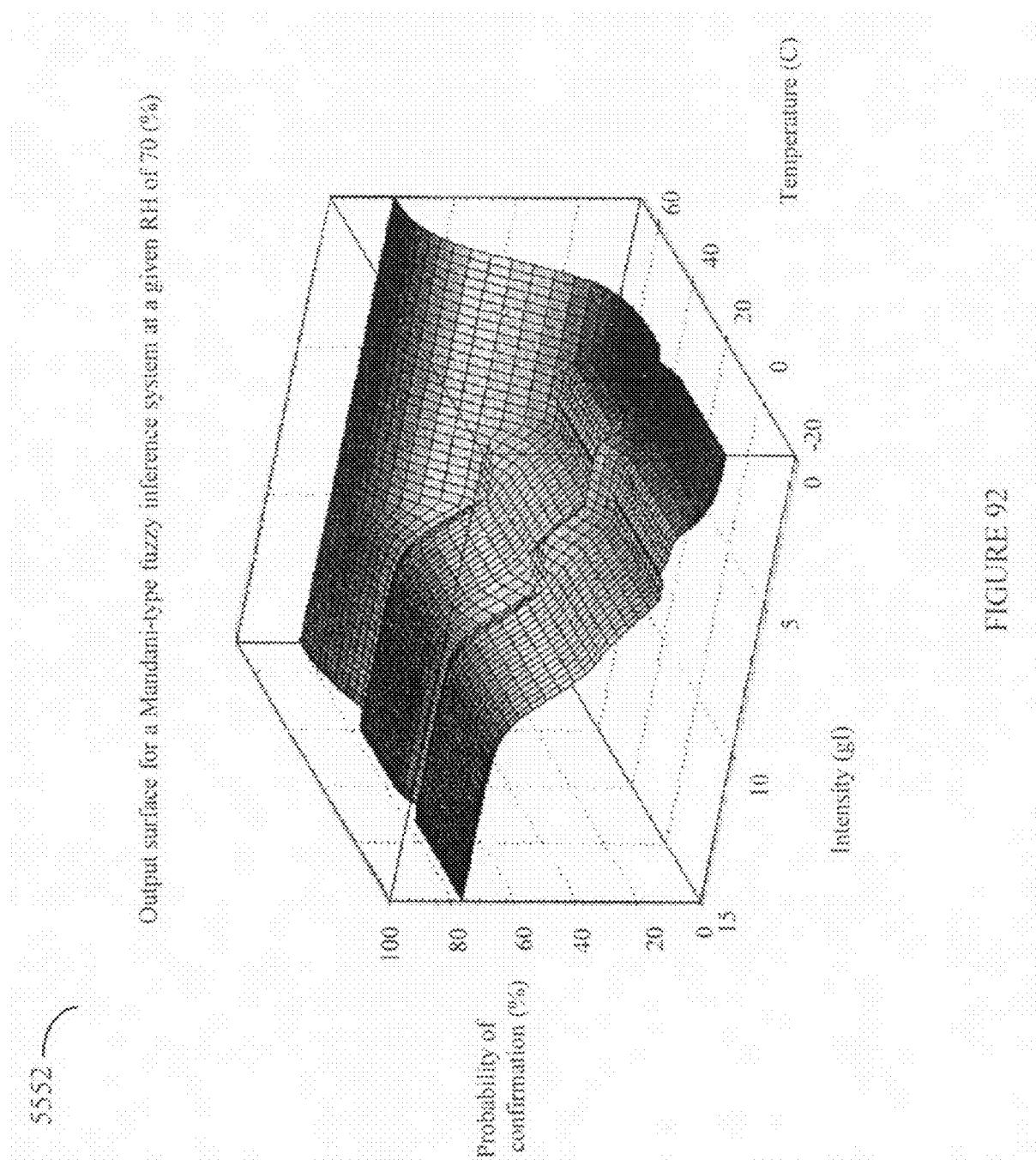
Figure 93:
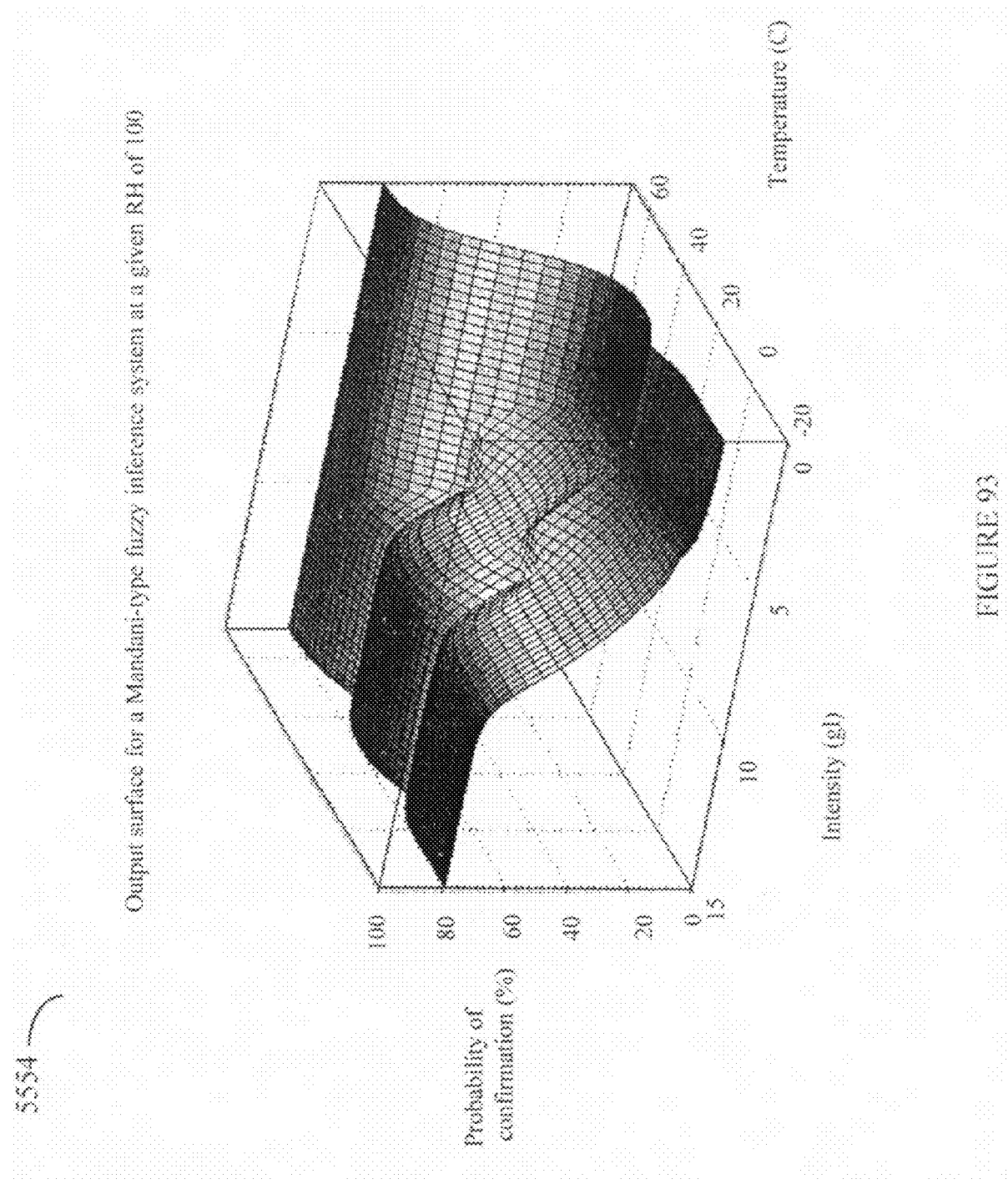

Referring now to FIGS. 91-93, shown are graphical illustrations of the decision surface at fixed RH values of 40, 70, and 100%, respectively. Note that the FSD confirmation probability increases with the frame intensity if the RH is "low" since any intensity increase in a "dry" bay may be attributed to smoke (or to a less extent to dust). As expected, the confirmation probability decreases in the presence of fog. If the temperature is "high" the system confirms any alarm regardless of the other senor readings (i.e. rule 30).

An embodiment may use the foregoing techniques to evaluate performance of a system using the foregoing fuzzy logic inference engine in comparison to a smoke detector, or other device. The system, such as a fire detection and verification system that may be used within a cargo bay area of an aircraft, may use the fuzzy logic inference engine in connection with smoke detection and verification alone or in combination with other techniques described herein.

It should be noted that in connection with this and other examples herein, one of the system's performance criteria may be to detect a fire condition prior to a smoke detector. It should be noted that an embodiment may also use any one or more other types of smoke indicators and/or measuring apparatus with an appropriate threshold against which performance of the system using the fire detection and verification techniques described herein may be measured. In addition to a smoke detector, an embodiment may also use, for example, a MIREX-based detector, a particle counter, a density counter, or other indicator measuring a dimension of the presence of smoke.

In obtaining the features related to image data, an embodiment may use a diagonal or opposite lighting view for frame intensity indication. An embodiment may also include a varying number of sensors. In one embodiment, for example, at least 2 temperature sensors and 2 humidity sensors may be used. Readings of the two or more sensors may be averaged. It should be noted that an embodiment may also perform down sampling such as, for example, down-sample the data gathered from the sensor 1 sample per second to 1 sample per 6 seconds to accommodate the slow rate (after video cut) of the video data that may be used in an embodiment.

An embodiment using the absolute value to the image difference as a feature as described herein may eliminate use of a "hot spot" detection technique as may be used with the dark view. It should be noted that the sharp transition between low and high "probability of confirmation", as illustrated in FIG. 81, provides information regarding the ambiguity that may occur if a system relies directly (or via means other than fuzzy logic) on fluctuating sensor readings.

It should be noted that an embodiment may use the foregoing techniques for the inclusion of multiple features with multiple views from multiple cameras and other sensor readings in addition to those described herein. The use of the logical OR operator may be specified in the rules to include the additional conditions.

It should be noted that an embodiment may include as inputs to the fuzzy inference engine one or more features described elsewhere herein in connection with detection and discrimination of fire and non-fire conditions including, for example, dust, fog, and the like. An embodiment may tune or adjust membership functions in accordance with one or more system performance criteria including, for example, properly detecting all fire conditions while minimizing the number of false alarms such as those caused by, for example, dust, and fog. For example, in order to minimize the number of false alarms, an embodiment may adjust one or more membership functions to increase the area of overlap between classifications causing several rules to be fired to resolve ambiguities. With reference to FIG. 80, for example, an embodiment may increase the area under the MEDIUM curve causing increased overlap with the LARGE and LOW curves. Accordingly, rules will be invoked in more instances to resolve the ambiguity as indicated by the overlap of the curves. In order to not miss any fire conditions, an embodiment may widen the LARGE membership functions while contracting the MEDIUM and LOW membership functions. The membership functions may be adjusted to make the universe of discourse extend beyond that of one or more non-fire conditions, such as those associated with dust.

An embodiment may also adjust one or more membership functions in accordance with an accuracy of one or more sensor readings. For example, an embodiment using a RH sensor that is not accurate may use a membership function with only 2 curves corresponding to 2 classes or conditions such as illustrated in FIG. 77. In contrast, an embodiment with more accurate RH sensors may use a membership function as illustrated in FIG. 76. In the event that an embodiment uses curves, such as those of FIG. 76 for the membership functions of one input, the curves may be adjusted to increase the amount of overlap in the event the inaccuracy of a sensor increases.

It should be noted that an embodiment may also examine over time, such as 3 or 4 samples, or a few seconds, the "probability of confirmation" signal in dust cases as compared to fire cases in order to determine whether a fire condition exists. In other words, a trend analysis may be performed using multiple probability of confirmation signals produced using the techniques described herein. If there is a great difference, an isolated spike, of the probability of confirmation, this may indicate a non-fire condition. On the other hand, if the probability of confirmation consistently exceeds a predetermined threshold level for a predetermined number of samples, time period, and the like, this may be used to indicate a fire condition.

It should be noted that an embodiment may use the RH information to detect fog and to account for that in the final decision regarding a fire condition. An embodiment may consider the existence of fog for very high values of RH (e.g. greater than 98%). It should be noted that it may be preferable that membership functions be adjusted in an embodiment to reflect properties of the "fuzziness" caused by sensor inaccuracies, field noise, and phenomena (i.e. smoke, fire, fog, dust,) variability, and various bay configurations.

It should be noted that the foregoing describes using fuzzy logic for decision making in general with application to the system for fire verification and detection as may be used in cargo bays in particular. The techniques described herein may be used in other embodiments besides for use within a fire detection and/or verification system of a cargo bay. As fuzzy logic is suited to deal with complex applications that are based on "imprecise" data, smoke detection via multiple sensors is only one possible application of the techniques described herein. Prognostics and diagnostics of various aircraft systems may be characterized as good candidates for fuzzy logic due to the vague and scarce data.

The foregoing uses 3 variables: average image intensity of the opposite light of one camera, relative humidity, and temperature. The foregoing may be used an embodiment with variations, such as optimizations and combining the foregoing with other fire detection techniques. For example, an embodiment may use other techniques in connection with providing for early fire detection and a robustness vis-á-vis false alarm cases related to dust and fog. An embodiment may also use other techniques to properly confirm additional dust cases. Some are described elsewhere herein. Such techniques include, for example, trends (i.e. fluctuations) of the "probability of confirmation" signal. It should be noted that temperature and RH may be characterized as almost "irrelevant" in dust detection since the temperature and the RH kept remain relatively constant The FSD described herein provides a flexible technique that is easy to implement and to test with various sensor designs (e.g. RH sensor) and different decision making strategies. The techniques described herein may also be used with other prognostics/diagnostics application such as, for example, in connection with wire diagnostics which may be used in connection with monitoring the condition, state, and health of aircraft components.

Figure 94:
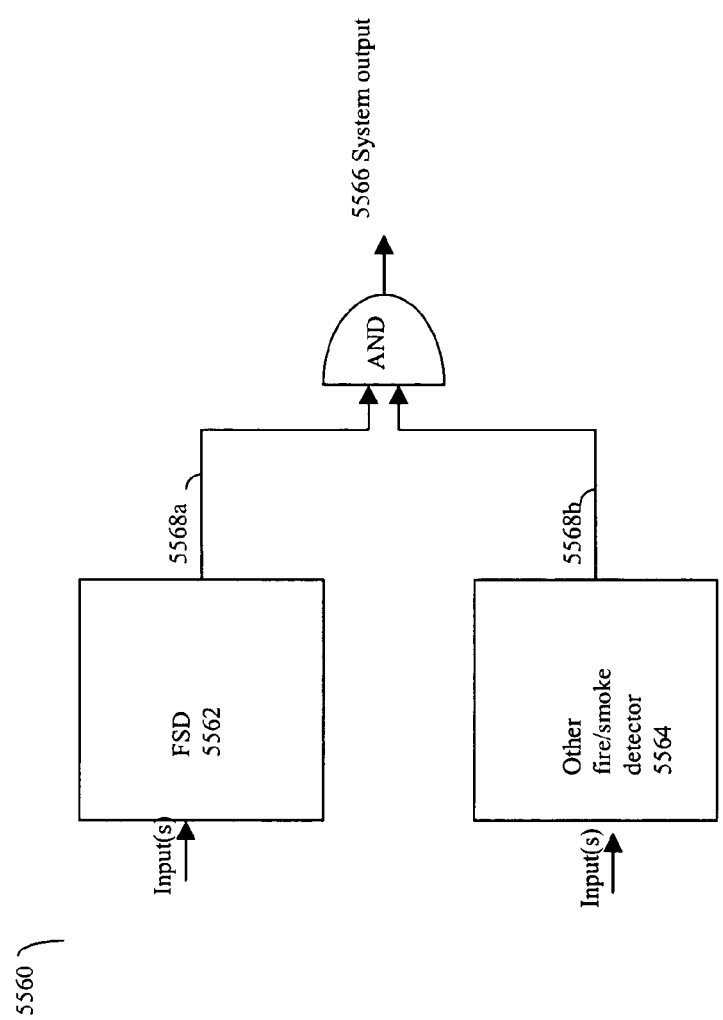
FIGS. 94-95 are example representations of how the fuzzy smoke detector may be used in connection with other system components for fire detection.

Referring now to FIG. 94, shown is an example 5560 of how the FSD output may be used in connection with other system components. The FSD may include hardware and/or software to implement the techniques described herein. The FSD 5562 may process one or more inputs and produce an output signal 5568*a*. There may be another smoke or fire detector 5564 that produces an output signal 5568*b*. Signals 5568*a* and 5568*b* may indicate whether there is a fire or non-fire condition detected by the respective component. The system output 5566 may be produced by logically ANDing the signals 5568*a* and 5568*b*. An embodiment may also logically OR the signals 5568*a* and 5568*b* to produce the output 5566. An embodiment may also include additional components than as shown in 5560. Each of the additional components may produce an output signal that is combined with those shown in 5560, or used as inputs into 5562. The output 5566 may also be an intermediate output to another component producing a final system output.

Figure 95:
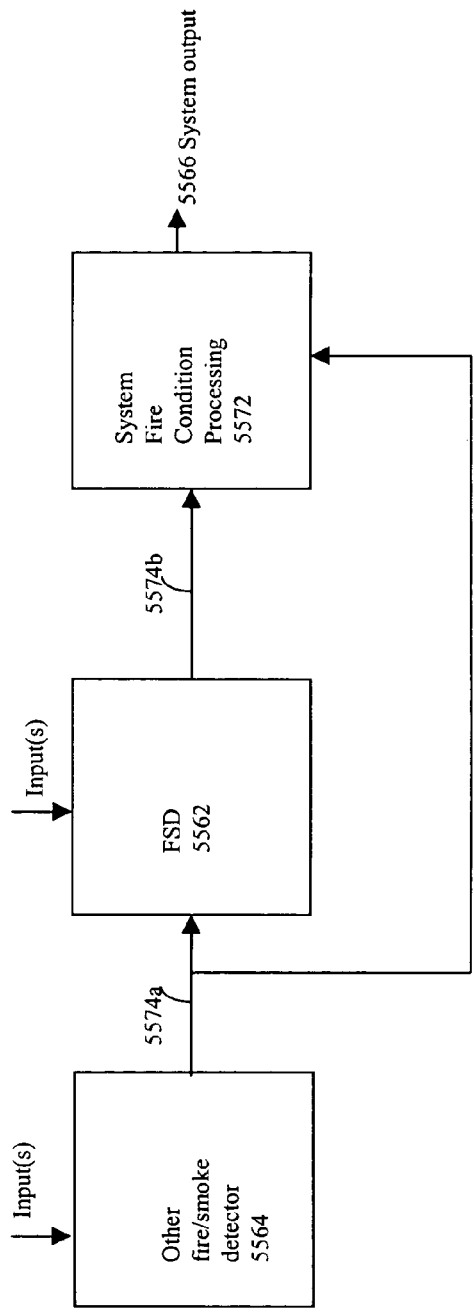

Referring now to FIG. 95, shown is another example of how the FSD output may be used in connection with other system components for fire detection and/or verification. In 5570, a fire or smoke detector 5564 produces an output signal 5574*a* which is an input to the system and fire condition processing module 5572 and the FSD 5562. In 5570, the FSD may be enabled when the signal 5574*a* indicates a fire condition. The FSD in this configuration may be characterized as verifying the fire condition signal 5574*a* and produces as an output signal 5574*b* indicating one of a fire or a non-fire condition. The system fire condition processing module 5572 takes as inputs 5574*a* and 5574*b* and produces a system output 5566 in accordance with the two inputs. Module 5572 may logically OR the input signals, or logically AND the input signals to produce output signal 5566.

The foregoing arrangements 5560 and 5570 are example configurations of components that may be included in a fire verification and detection system. An embodiment may use the fuzzy logic techniques described herein for fire detection and/or verification in other configurations and with other variations. In one embodiment the FSD may be used as the primary or the sole smoke detector.

The techniques described herein may be used for fire detection in other locations as well as for other applications besides fire detection and/or verification. The use of fuzzy logic techniques as described herein in which a feature is based on image data may be used, for example, in vision-based applications including, but not limited to, aircraft ground security, pilot alertness monitoring, cabin passenger monitoring, monitoring of aircraft body parts for safety enhancement (e.g., wheel wells and landing gear, such as to look for closure and hot spots, engine nacelle, battery compartment, oxygen generator compartment, and the electronics compartment), and aircraft taxiing, parking, and moving assistance (e.g., radar and communications compartment, flaps and access door positions, actuator movements, and wings, such as to look for wing icing).

Two types of smoke detectors that are used are optical detectors and ionization detectors, which detect the presence of aerosols—either through attenuation of light signal or ionization measurement. In some instances, it is possible for smoke alarms to incorrectly signal the presence of a fire because of the presence of non-fire conditions that mimic the presence of smoke. The system described herein may be used for detection and verification of fire in aircraft cargo bay in ways that discriminate between fire conditions like smoke and other conditions, such as chick feathers and other similar airborne morsels, that could cause a false smoke alarm signal to incorrectly indicate the presence of fire. Reducing the false smoke alarm rate is beneficial both from safety and economic point of view.

Feathers may appear within a cargo compartment when carrying chicken and birds, in particular newly hatched chicks. Similar morsels, such as paper or clothing pieces, are also known to be a source for false alarms. The system described herein provides for discriminating between feathers and fine aerosols, in particular smoke. Indications that are correlated with the spotty distribution of feathery scenes that stand in contrast to the smooth distribution of scenes with smoke, fire, fog, dust, and alike are captured.

As described in more detail below, segmenting the scene into different connected regions may provide an efficient feature that is closely related to the density of feathers. One feather (or few overlapping each others) by itself can create a spot (an isolated region of connected pixels) or an isolated segment on the scene, whereas a whole wave or plume of fine aerosols is needed to create a spot in the scene. A given pixel is "connected" to the pixel of interest if the former pixel "belongs" to the set of neighboring pixels of the pixel of interest. Different techniques that may be used in determining connected pixels are described elsewhere herein. See, for example, FIG. 44 and related text.

The presence of smoke and similar fine aerosols, such as fog and dust, obscures the scene and thus tends to make the number of isolated spots decrease as the scene becomes grayer and grayer. In contrast, the presence of feathers tends to increase the number of spots as more feathers get spread in the scene. Based on a stream of video images of the cargo bay, specific image features are identified to allow diagnosis that feathers and alike morsels are present within an enclosed area, such as a cargo bay. In one embodiment, if the primary smoke detection system issues an alarm, the vision based system may provide information to the pilot that the recorded data is consistent with formation of feathers, and provide a likelihood that the smoke alarm was a false alarm.

Referring to FIG. 36, the combination of cameras $2504a$, $2504b$, lenses/filters $2510a$, $2510b$, and lights $2502a$-$2502n$, $2508a$, $2508b$ may be used to acquire data as described elsewhere herein. In an embodiment described herein, the camera $2504a$ acquires data using the light $2508a$ associated therewith with the other lights $2508b$, $2502a$-$2502n$ being off while the camera $2504b$ acquires data using the light $2508b$ associated therewith with the other lights $2508a$, $2502a$-$2502n$ being off. Of course, other combinations of the lights $2508a$, $2508b$, $2502a$-$2502n$ may be used. In addition, arrangements other than the arrangement $2500$ shown in FIG. 36 may also be used. For example, light from the adjacent side walls, or from the ceiling of the cargo bay may be used. To distinguish between smoke and non-fire conditions that appear to be smoke to a smoke detector, it is useful to have some lighting present. Images taken with no illumination (e.g. for hot spot or flame detection) may not be as useful.

For the system described herein, the light $2508a$, lens/filter $2510a$, and the camera $2504a$ are matched so that the scene may be illuminated with a source that matches, at least partially, response characteristic of the camera $2504a$ while the light $2508b$, lens/filter $2510b$, and the camera $2504b$ are matched so that the scene may be illuminated with a source that matches, at least partially, response characteristic of the camera $2504b$. For example, if the camera $2504a$ is a CCD or CMOS camera, the combination of the light $2508a$ and the lens/filter $2510a$ may cause visible light to reach the camera $2504a$. As another example, if the lens/filter $2510a$ blocks visible light and passes only near-infra-red light, the light $2508a$ may include near-infra-red component and the camera $2504a$ may be sensitive to near-infra-red light. The camera $2504a$, the lens/filter $2510a$ and the light $2508a$ combination may have different response characteristics from the camera $2504b$, the lens/filter $2510b$, and the light $2508b$ combination or the response characteristics may be the same or similar.

Different lighting sources may be continually switched on and off in order to obtain different views of the scene such that consecutive video frames may correspond to different lighting conditions. The video frames analyzed by the system described herein correspond to the same lighting conditions although the techniques described herein may be used with other lighting conditions. In one embodiment, the same identification technique is used on two or more different subsequences corresponding to different lighting conditions. In some embodiments, feathers and alike may be more discernible with one particular lighting scheme than with another. The techniques described herein apply edge detection and image segmentation to characterize feather-like morsels and subsequently distinguish them from fine aerosols including smoke, fire, fog, and dust. The diagnoses reached from different extracted sub-sequences may be fused within a data fusion scheme using, for example, fuzzy logic, Bayesian decision, and the like, as described elsewhere herein.

Figure 96:
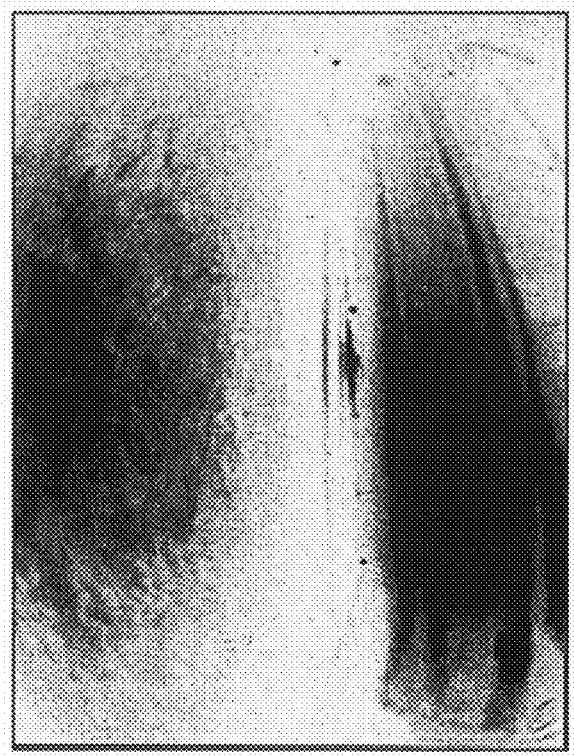
FIG. 96 is an image captured with a container in front of the camera in a simulation of a small gap in a cargo bay area filled with containers.

Referring to FIG. 96, a background image 6010 is captured with a container in front of the camera in a simulation of a small gap (e.g. 2-inches) in a cargo bay filled with containers. The background image 6010 may represent an image taken at time zero and may contain no smoke or anything else that is likely to cause a smoke alarm to issue an alarm. The background image 6010 of FIG. 96 (and subsequent images, described below) may be taken by the same camera at the same scene and comparably processed (e.g. frame rate of 13 fps, image size of 480×640 pixels, and 256 gray levels). Of course, the system described herein may use different parameters and, in addition, different images taken at different times may use some or all parameters different from each other. The particulars described herein are for purposes of example only and should not be construed as a limitation.

Figure 97:
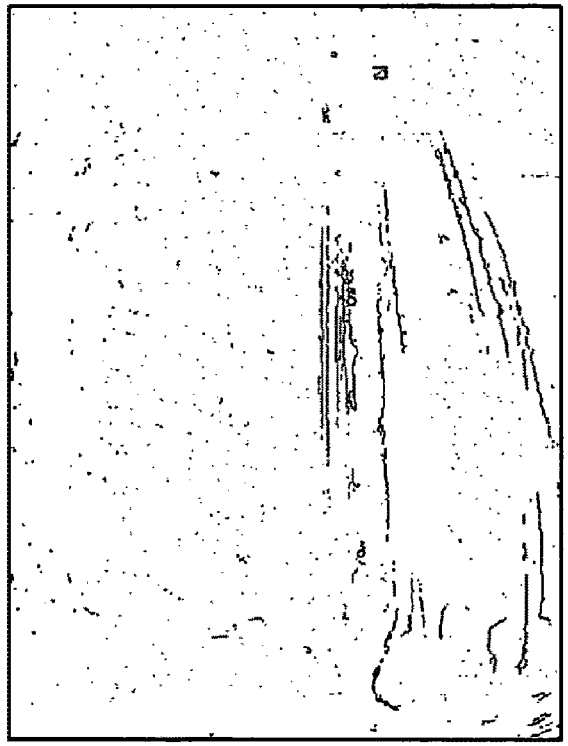
FIG. 97 is an image illustrating the result of applying edge estimation techniques to the image of FIG. 96.

Referring to FIG. 97, an image 6020 illustrates the result of applying edge estimation techniques to the background image 6010 of FIG. 96. The image 6020 represents visual edges/contrasts in the image 6010 of FIG. 96. The particular technique illustrated in the image 6020 represents edges determined with a conventional edge detection technique, such as described in Gonzalez, R. C. and Woods, R. E. *Digital Image Processing*. Prentice Hall, New Jersey 2001, that uses a Sobel operator having a threshold of ten. Once the edges are detected, it is possible to determine the number of segments and label them using conventional techniques, such as techniques described in Haralick, Robert M., and Linda G. Shapiro, Computer and Robot Vision, Volume I. Addison-Wesley, 1992. pp. 2848. In other embodiments, it may be possible to determine and count the number of segments without first explicitly detecting edges.

Figure 98:
FIG. 98 is an image showing a frame from the scene of FIG. 96 captured after spreading some feathers in an area.

Referring to FIG. 98, an image 6030 shows a frame of the scene of FIG. 96 captured after spreading some feathers in the area being shown. The area being shown by the image 6030 is the same area as being shown by the image 6010 of FIG. 96.

Figure 99:
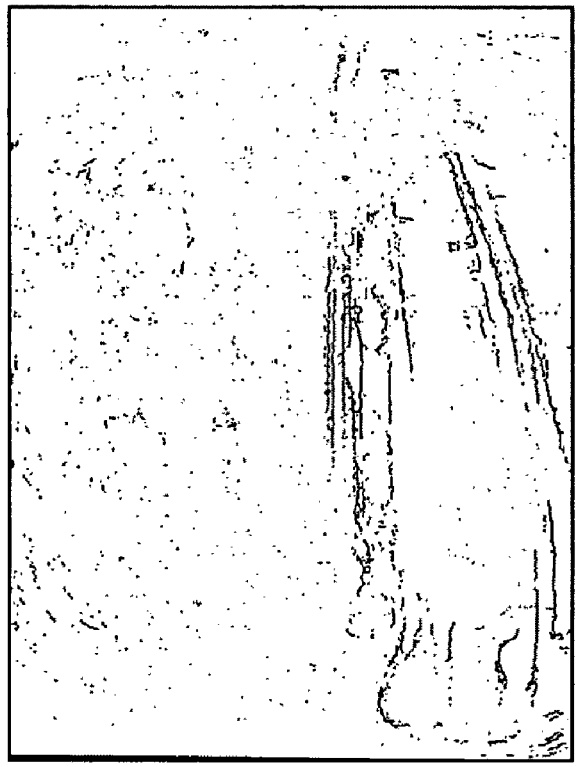
FIG. 99 is an image illustrating the result of applying the edge estimation techniques to the image with the feathers of FIG. 98.

Referring to FIG. 99, an image 6040 illustrates the result of applying edge estimation techniques to the image with feathers 6030 of FIG. 98. The image 6040 represents visual edges/contrasts in the image 6030 of FIG. 98. The particular technique illustrated in the image 6040 represents edges determined with a conventional edge detection technique that uses a Sobel operator having a threshold of ten such as the one described in Gonzalez, R. C. and Woods, R. E. *Digital Image Processing*. Prentice Hall, New Jersey 2001. Once the edges are detected, it is possible to determine the number of segments and label them using conventional techniques, such as techniques described in Haralick, Robert M., and Linda G. Shapiro, Computer and Robot Vision, Volume I. Addison-Wesley, 1992. pp. 28-48. In other embodiments, it may be possible to determine and count the number of segments without first explicitly detecting edges.

Figure 100:
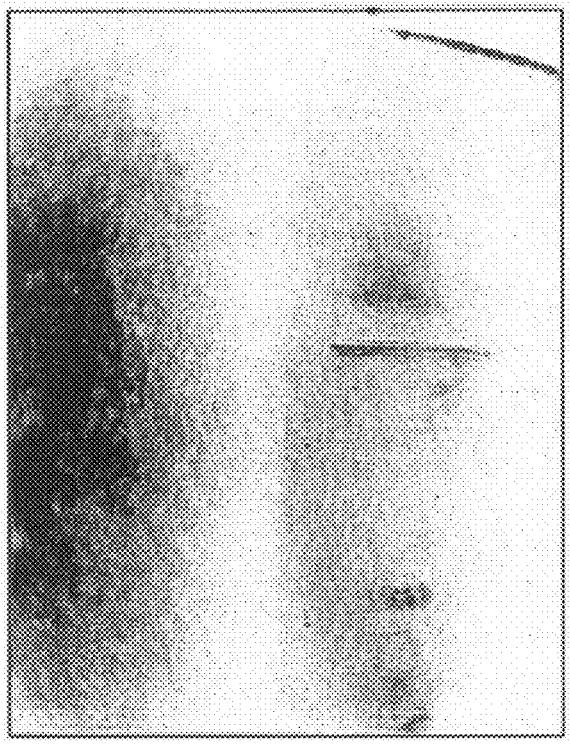
FIG. 100 is an image corresponding to a smoky scene after smoldering a card box behind a container.

Referring to FIG. 100, an image 6050 is shown that corresponds to a smoky scene after smoldering a card box behind a container for about four minutes. The image 6050 represents visual information due in part to the background content and to the smoke introduced into the area while burning the box. The density of smoke makes the view relatively smooth gray without a lot of isolated segments.

Figure 101:
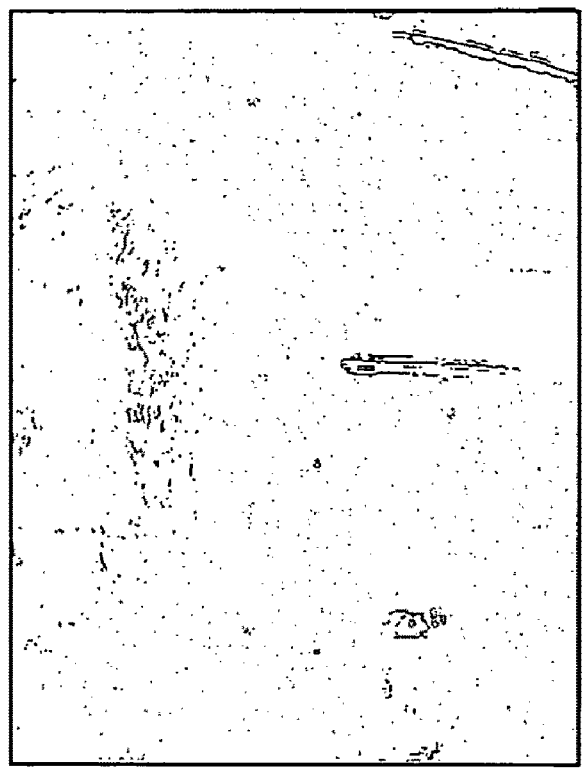
FIG. 101 is an image illustrating the result of applying edge estimation techniques to the image of FIG. 100.

Referring to FIG. 101, an image 6060 illustrates the result of applying edge estimation techniques to the image 6050 of FIG. 100. The image 6060 represents visual edges/contrasts in the image 6050 of FIG. 100. The particular technique illustrated in the image 6060 represents edges determined with a conventional edge detection technique that uses a Sobel operator having a threshold of ten such as the one described in Gonzalez, R. C. and Woods, R. E. *Digital Image Processing*. Prentice Hall, New Jersey 2001. Once the edges are detected, it is possible to determine the number of segments and label them using conventional techniques, such as techniques described in Haralick, Robert M., and Linda G. Shapiro, Computer and Robot Vision, Volume I. Addison-Wesley, 1992. pp. 28-48. In other embodiments, it may be possible to determine and count the number of segments without first explicitly detecting edges.

The number of segments per frame for a scene containing feathers or the like may be much more than the number of segments of other scenes with fines aerosols (i.e. smoke, fog, and dust). The number of segments may be used as one feature to discriminate between feathers-like morsels and fine aerosols. It is also possible to use detailed filtering, pruning, thickening, and enhancement processing to further enhance identification. In one embodiment, the number of segments may be used as a discriminator while in another embodiment, only the number of closed segments may be used.

Figure 102:
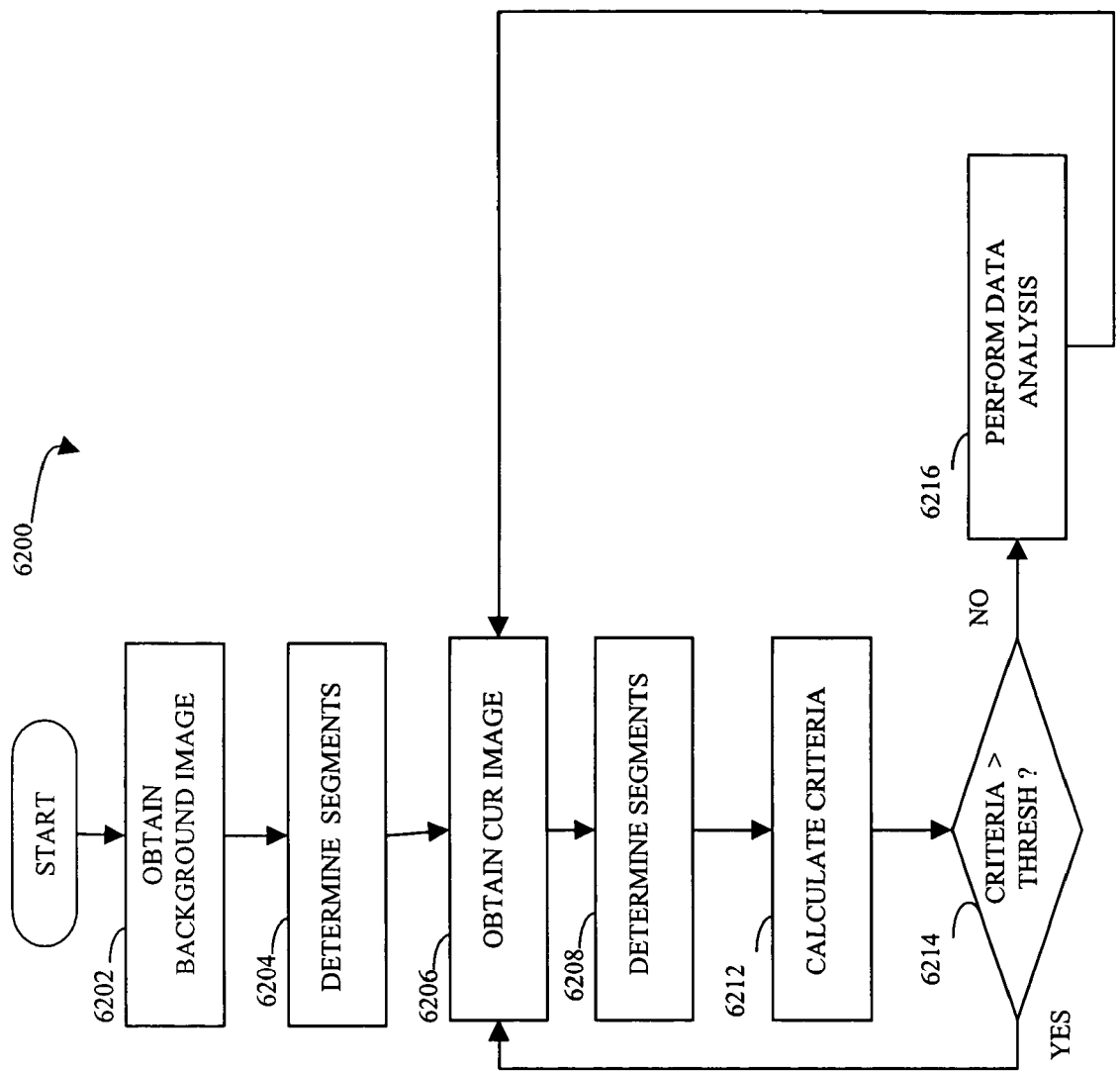
FIG. 102 is a flowchart of steps of one embodiment performed in connection with the system of FIG. 1.

Referring to FIG. 102, a flow chart 6200 illustrates steps performed in connection with the system described herein. Processing begins at a first step 6202 where a background image is obtained. The background image obtained at the step 6202 is like the background image 6010 illustrated above in FIG. 96. Following the step 6202 is a step 6204 where the number segments of the background image is determined. As discussed above, in some embodiments, the edges are first determined prior to determining the number of segments. The edges are like the edges illustrated in the image 6020 of FIG. 97.

Following the step 6204 is a step 6206, where a current image is obtained. The current image obtained at the step 6206 is obtained after some time has elapsed since obtaining the background image at the step 6202. The image obtained at the step 6206 is like the images 6030, 6050 discussed above in connection with FIGS. 98 and 100.

Following the step 6206 is a step 6208 where the number of segments of the current image is determined. As discussed above, in some embodiments, the edges are first determined prior to determining the number of segments. The edges are like the edges illustrated in the images 6040, 6060 of FIGS. 99 and 101.

Following the step 6208 is a step 6212 where a criteria is calculated to determine if the scene contains feathers (or the like). In an embodiment herein, the criteria equals the number of segments in the current image subtracted from the number of segments in the background image. Other calculations for the criteria calculated at the step 6212 may be used, including use of standard deviation and the gradient intensity as described elsewhere herein. A relatively high value of standard deviation is a further indication of the presence of feathers. In contrast, a low value is indicative of the presence of smoke that may provide a smooth and gray distribution across the scene. The random motion of feathers may yield relatively high values of the gradient intensity and its standard deviation as welt as its higher statistics.

Following the step 6212 is a test step 6214 which determines if the criteria determined at the step 6212 is greater than a predetermined threshold. In an embodiment disclosed herein, it is determined at the step 6214 if the difference in number of segments determined at the step 6212 is greater than a predetermined threshold. The threshold used at the step 6214 may be set by empirical means and depends, at least in part, upon the type of edge detection and segmentation algorithms used as well as image settings (e.g., lighting, camera resolution, gain setting, etc). If other criteria are used, then different determinations may be made at the step 6214, including any of the appropriate processing described elsewhere herein.

If it is determined at the step 6214 that the criteria exceeds the predetermined threshold, then control passes from the step 6214 back to the step 6206 to obtain new data for processing. Jumping from the step 6214 to the step 6206 represents the current image containing feathers or the like. For example, when the criteria corresponds to the difference in number of segments between the background image and the current image, the current image having a significant number of more segments than the background image may indicate that the current image contains feathers (or the like) and therefore no further processing of the current image is necessary.

If it is determined at the test step 6214 that the criteria is not greater that the predetermined threshold, control passes to a step 6216, where appropriate follow on processing, including many of the techniques described herein, is performed to determine the presence of smoke. For example, the step 6216 and/or the step 6214 may represent passing a signal (e.g., the number of segments) to one or more of the data fusion techniques described herein.

In some embodiments, the background image may not be necessary for the analysis. In such a case, trend analysis of the number of segments (labels) over time can provide information about eventual presence of feathers or the like in the scene. For instance if the number of segments within the scene increases steadily, then the likelihood of feathers and the like being in the scene is high. On the other hand, if the number of segments (labels) decreases steadily, the scene is most likely contaminated by smoke and the like.

Figure 103:
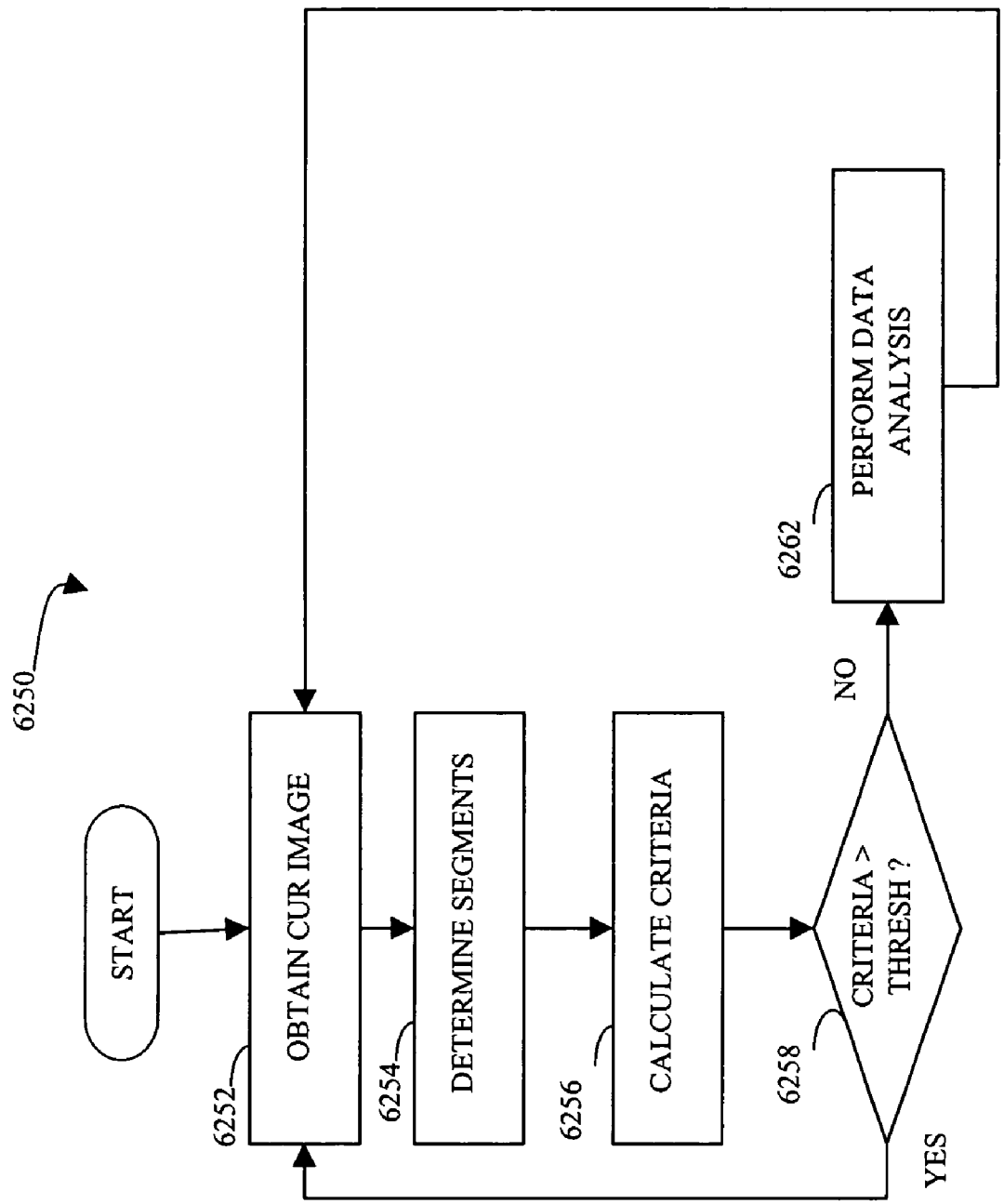
FIG. 103 is a flowchart of steps of another embodiment performed in connection with the system of FIG. 1.

Referring to FIG. 103, a flow chart 6250 illustrates steps performed in connection with an alternative embodiment of the system described herein. Processing begins at a first step

6252 where a current image is obtained. The current image obtained at the step 6252 is like the images 6030, 6050 discussed above in connection with FIGS. 98 and 100.

Following the step 6252 is a step 6254 where the number of segments of the current image are determined. As discussed above, in some embodiments, the edges are first determined prior to determining the number of segments. The edges are like the edges illustrated in the images 6040, 6060 of FIGS. 99 and 101.

Following the step 6254 is a step 6256 where a criteria is calculated to determine if the scene contains feathers (or the like). In an embodiment herein, the criteria equals the rate of change of the number of segments in the current image over time (i.e., over a sequence of images). Other calculations for the criteria calculated at the step 6256 may be used, including use of standard deviation and the gradient intensity as described elsewhere herein. A relatively high value of standard deviation is a further indication of the presence of feathers. In contrast, a low value is indicative of the presence of smoke that may provide a smooth and gray distribution across the scene. The random motion of feathers may yield relatively high values of the gradient intensity and its standard deviation as well as its higher statistics.

Following the step 6256 is a test step 6258 which determines if the criteria determined at the step 6256 is greater than a predetermined threshold. In an embodiment disclosed herein, it is determined at the step 6258 if the rate of change in number of segments determined at the step 6256 is greater than a predetermined threshold. The threshold used at the step 6258 may be set by empirical means and depends, at least in part, upon the type of edge detection and segmentation algorithms used as well as image settings (e.g., lighting, camera resolution, gain setting, etc). If other criteria are used, then different determinations may be made at the step 6258, including any of the appropriate processing described elsewhere herein.

If it is determined at the step 6258 that the criteria exceeds the predetermined threshold, then control passes from the step 6258 back to the step 6252 to obtain new data for processing. Jumping from the step 6258 to the step 6252 represents the current image containing feathers or the like. For example, when the criteria corresponds to the rate of change in number of segments in the current image, a relatively high rate of change (i.e., relatively increasing) may indicate that the current image contains feathers (or the like) and therefore no further processing of the current image is necessary.

If it is determined at the test step 6258 that the criteria is not greater that the predetermined threshold, control passes to a step 6262, where appropriate follow on processing, including many of the techniques described herein, is performed to determine the presence of smoke. For example, the step 6262 and/or the step 6258 may represent passing a signal (e.g., the number of segments) to one or more of the data fusion techniques described herein.

In some embodiments, the total number of segments is used while in other embodiments only certain types of segments are used such as segments of a particular length or greater, segments of a particular length or smaller, closed loop (or near closed loop) segments, segment of a particular curvature or greater, segment of a particular curvature or smaller, etc.

Figure 104:
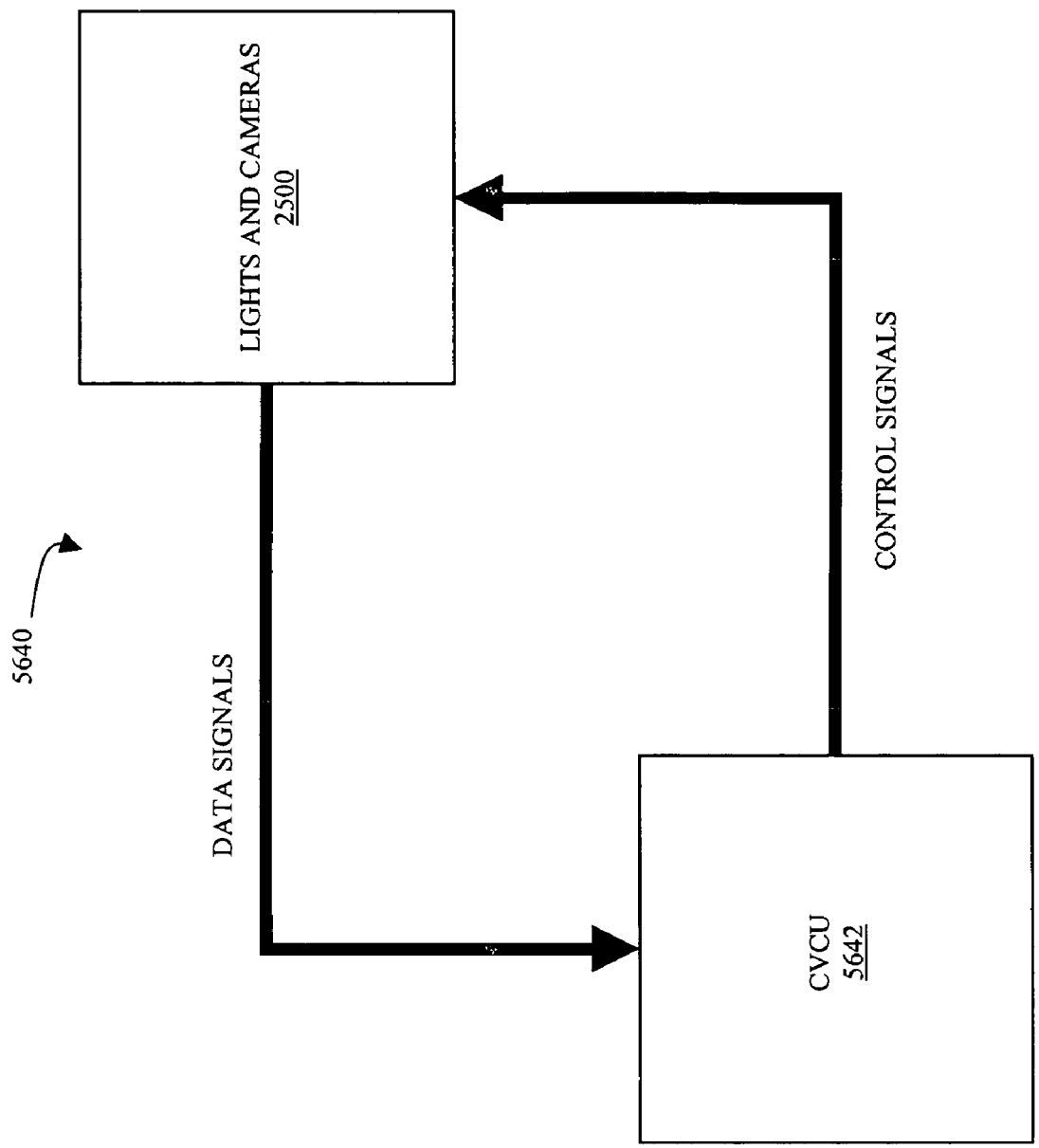
FIG. 104 is a diagram illustrating a system in which a cargo video control unit is coupled to a light and camera arrangement.

Referring to FIG. 104, a diagram 5640 illustrates a system in which a cargo video control unit (CVCU) 5642 is coupled to a light and camera arrangement 2500 like that illustrated in FIG. 36 and described elsewhere herein. The light and camera arrangement 2500 includes the plurality of controllable lights 2502a-2502n, 2508a, 2508b and the plurality of cameras 2504a, 2504b. The CVCU 5642 provides control signals to the lights 2502a-2502n, 2508a, 2508b and the cameras 2504a, 2504b that are used to detect fire, smoke, fog, etc. The cameras 2404a, 2504b provide data signals to the CVCU 5642 which are processed as described elsewhere herein.

As discussed elsewhere herein, the combination of lights and cameras may be used in a variety of ways so that, for example, there may be a first lighting condition (pilot view/near view) where all lights are turned off except the light attached to the camera (e.g., the light 2508b with the camera 2504b or the light 2508a with the camera 2504a), a second lighting condition (overhead view) where all lights are turned off except for the overhead lights 2502a-2502n, a third lighting condition (opposite view/diagonal view/far view) where all lights are turned off except for an opposite light that is turned on so that, for example, the camera 2504b is used in connection with a light opposite thereto, such as the light 2508a, a fourth lighting condition where all lights are turned off (thermal view or dark view) and any other ones of a number of other possible combinations of lights and cameras that provide a variety of lighting conditions.

Optical filters may be used in the CFVS as described elsewhere herein to allow detection of hot spots using CCD cameras operating in the visual and near infra-red (NIR) spectral band. CCD arrays may display enough sensitivity to NIR light to allow detection of hot spots in dark-field view (dark/thermal view). However, CCD arrays may also display much higher sensitivity to visible light, making complete darkness a condition for successful detection of hot spots through CCD cameras. Otherwise, the visible light may dominate the thermal effect making hot spot detection difficult.

Referring to FIG. 36, the lens 2510a for the camera 2504a may include a filter that filters out light in a particular band or set of bands, e.g. visible light. Similarly, the lens 2510b for the camera 2504b also includes a filter that filters out light in a particular band or set of bands, e.g. visible light. Use of appropriate optical filter may allow eliminating visible light and performing hot spot detection as if the scene were completely dark. In a cargo bay environment, lighting may include lights of the fluorescent kind, for example, having wavelengths below approximately 800 nm. Other non-controllable light in the cargo bay may also have wavelengths below approximately 800 nm. Thus, a filter blocking such light and allowing only wavelengths above approximately 800 nm to be passed to the CCD array may simulate dark-field (dark/thermal view) conditions.

It is also possible to detect smoke and other aerosols using a CCD camera with or without an appropriate filter. Detecting aerosols does not necessarily involve hot spot detection. Instead, appropriate illumination units may be used, with light emitted within the filter's pass band. Presence of aerosols within the enclosure of interest may result in that light being obscured and/or scattered, which in turn may be detected by image processing techniques. By appropriately switching the illumination sources, different illumination scenarios may be obtained. This allows detecting various visual effects in images associated with those illumination schemes. The data analysis techniques described elsewhere herein may be used to combine evidence about aerosol presence obtained from those images. This allows faster and arguably more reliable aerosol detection and discrimination. In particular, the presence of smoke may be detected.

Referring to FIG. 36, each of the cameras 2504a, 2504b may be a CCD camera. Each of the lights 2508a, 2508b associated with each of the cameras 2504a, 2504b may emit light in the NIR spectral band. Each of the lenses 2510a,

2510b for each of the cameras 2504a, 2504b may include an optical filter that completely or nearly completely blocks visual light (i.e., light having a wavelength below approximately 800 nm). In an embodiment described herein, it is assumed that external nuisance lighting (i.e. light not controlled by the system described herein) does not have any NIR content, as is the case with, for example, fluorescent lighting used in cargo bays. In such a case, filters that filter out light below approximately 800 nm cause the only light that the CCD arrays receive to be NIR light from the illumination units (e.g., the lights 2508a, 2508b) controlled by the system described herein. These illumination units may be switched on and off appropriately by the CVCU 5642, so that consecutive frames captured by one or both of the cameras 2504a, 2504b (or other cameras) correspond to different lighting conditions. In other embodiments, the lenses/filters 2510a, 2510b may filter out other wavelengths of light.

In one embodiment, a particular illumination scheme may involve each of the cameras 2504a, 2504b being equipped with its own illumination source and each of the additional overhead illumination units 2502a-2502n installed at the ceiling of the cargo bay. In this instance, the following lighting scenarios may be used:

a) Own lighting (pilot view/near view)—Illumination unit collocated with the camera of interest is switched on, while all other illumination sources are switched off.

b) Opposite lighting (far view)—One or more illumination unit on the wall opposing the camera of interest is switched on, while all other illumination sources are switched off.

c) Overhead lighting—Some or all illumination units located on the ceiling are switched on, while all other illumination sources are switched off.

d) No Lighting (thermal/dark view)—No illumination units are switched on.

e) Total lighting—All illumination sources (all camera lights and all overhead lights) are switched on.

In some embodiments, the thermal/dark view is not analyzed unless filters are also used. It should be noted that these and other lighting scenarios are described elsewhere herein. The foregoing illumination schemes are described from the point of view of a single camera. Note that one lighting scenario from the point of view of one camera may be a different lighting scenario from the point of view of another camera. For example, if the light 2508a for the camera 2504a is switched on and all other lights are switched off, this represents own lighting (pilot view/near view) from the point of view of the camera 2504a and represents opposite lighting (far view) from the point of view of the camera 2504b. Note that if more than one opposite (far) or overhead illumination unit is available, then different variations of these lighting scenarios may be used in other embodiments.

As described elsewhere herein, switching of the lights may be performed under the control of the CVCU 5642 or, alternatively, by individual camera units (which may be synchronized), or some combination thereof. Images may be acquired by the cameras under each illumination scheme desired herein. Depending on the conditions in the cargo bay, it may be desirable to acquire several consecutive frames under some or all illumination scenarios. Also, some of the illumination scenarios may be eliminated from the sequence, temporarily or permanently, as needed, for example, in accordance with the embodiment and particular cargo bay conditions.

Figure 105:
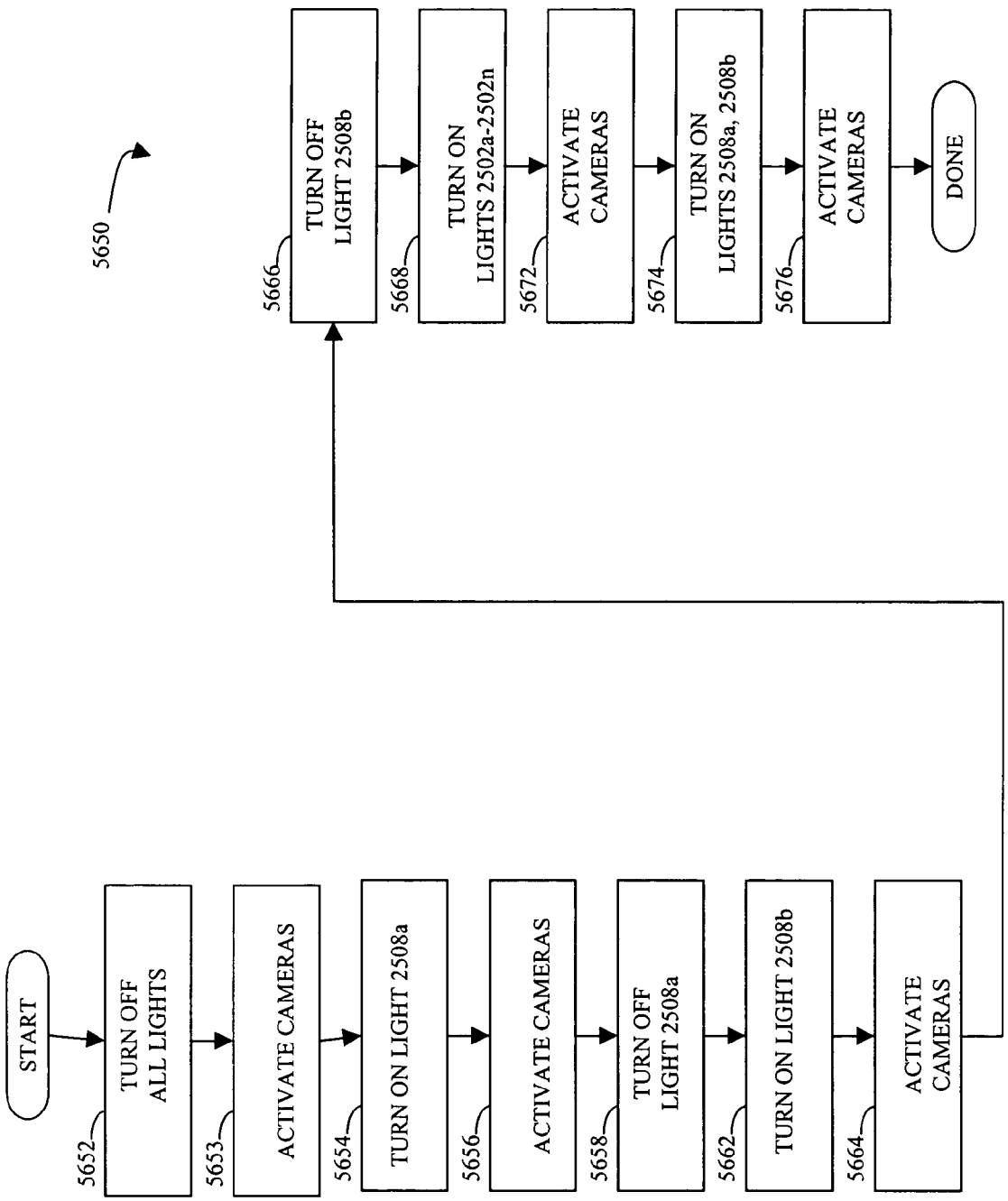
FIG. 105 is a flowchart of steps of one embodiment performed in connection with acquiring data under various lighting scenarios.

Referring to FIG. 105, a flow chart 5650 illustrates steps performed in connection with acquiring data under various lighting scenarios described herein.

Processing begins at a first step 5652 where all of the lights 2502a-2502n, 2508a, 2508b are turned off. Following the step 5652 is a step 5653 where the cameras 2504a, 2504b are activated. In some embodiments, the cameras 2504a, 2504b may be continuously acquiring data, so that the step 5656 (and similar steps) may represent the cameras providing the acquired data to follow on processing. In other embodiments, the cameras 2504a, 2504b only acquire data when it is time to provide the data to follow on processing. In still other embodiments, some cameras may continuously acquire data while other cameras acquire data intermittently. The particular data obtained at the step 5653 represents a dark/thermal view.

Following the step 5653 is a step 5654 where the light 2508a is turned on. Following the step 5654 is a step 5656 where the cameras 2504a, 2504b are activated. Activating the cameras 2504a, 2504b at the step 5656 while the light 2508a is on (from the step 5654) causes the camera 2504a to obtain an own lighting image (pilot view/near view) while the camera 2504b obtains an opposite lighting image (far view). Following the step 5656 is a step 5658 where the light 2508a is turned off. Following the step 5658 is a step 5662 where the light 2508b is turned on. Following the step 5662 is a step 5664 where the cameras 2504a, 2504b are activated. Activating the cameras 2504a, 2504b at the step 5664 while the light 2508b is on (from the step 5662) causes the camera 2504b to obtain an own lighting image (pilot view/near view) while the camera 2504a obtains an opposite lighting image (far view). Following the step 5664 is a step 5666 where the light 2508b is turned off.

Following the step 5666 is a step 5668 where the overhead lights 2502a-2502n are turned on. Following the step 5668 is a step 5672 where the cameras 2504a, 2504b are activated to obtain an overhead view. Following the step 5672 is a step 5674 where the lights 2508a, 2508b are turned on. Following the step 5674 is a step 5676 where the cameras 2504a, 2504b are activated to obtain a total view. The data obtained at the step 5676 represents data when all of the lights are on.

The steps of the flow chart 5650 may be executed in any order. It is possible to eliminate some of the views and/or to use other views. It is also possible to activate the cameras 2504a, 2504b in any order and/or at different times.

Analysis of changes in various intensity characteristics of images collected under these lighting scenarios allows drawing conclusions about presence of fog, smoke or dust. Details of image analysis algorithms that should be used for such detection are described elsewhere herein.

Use of the optical filter makes the fire detection system insensitive to nuisance light sources within the bay as long as their output does not spill into the pass band of the filter. Switching of different light sources allows observing different scattering and absorption effects due to aerosols within the enclosure, and consequently leads to faster detection.

In some instances, it may be difficult to control or predict the presence of ambient light in the cargo bay. That is, there may be a source of light other than the controllable lights 2502a-2502n, 2508a and 2508b that are controlled by the CVCU 5642. Although it may also be possible to filter out some types of ambient light, in other cases it may be difficult to predict the frequency or wavelength of the ambient light. For example, in some instances, the ambient light may be due to fluorescent or incandescent lights present in the cargo bay or may be due to a door of the cargo bay being open, or may be due to any one of a number of sources of light not controllable by the CVCU 5642. It is desirable to be able to compensate for the unpredictable presence of ambient light so that the ambient light does not interfere with whatever lighting conditions are being used in connection with data collection.

Figure 106:
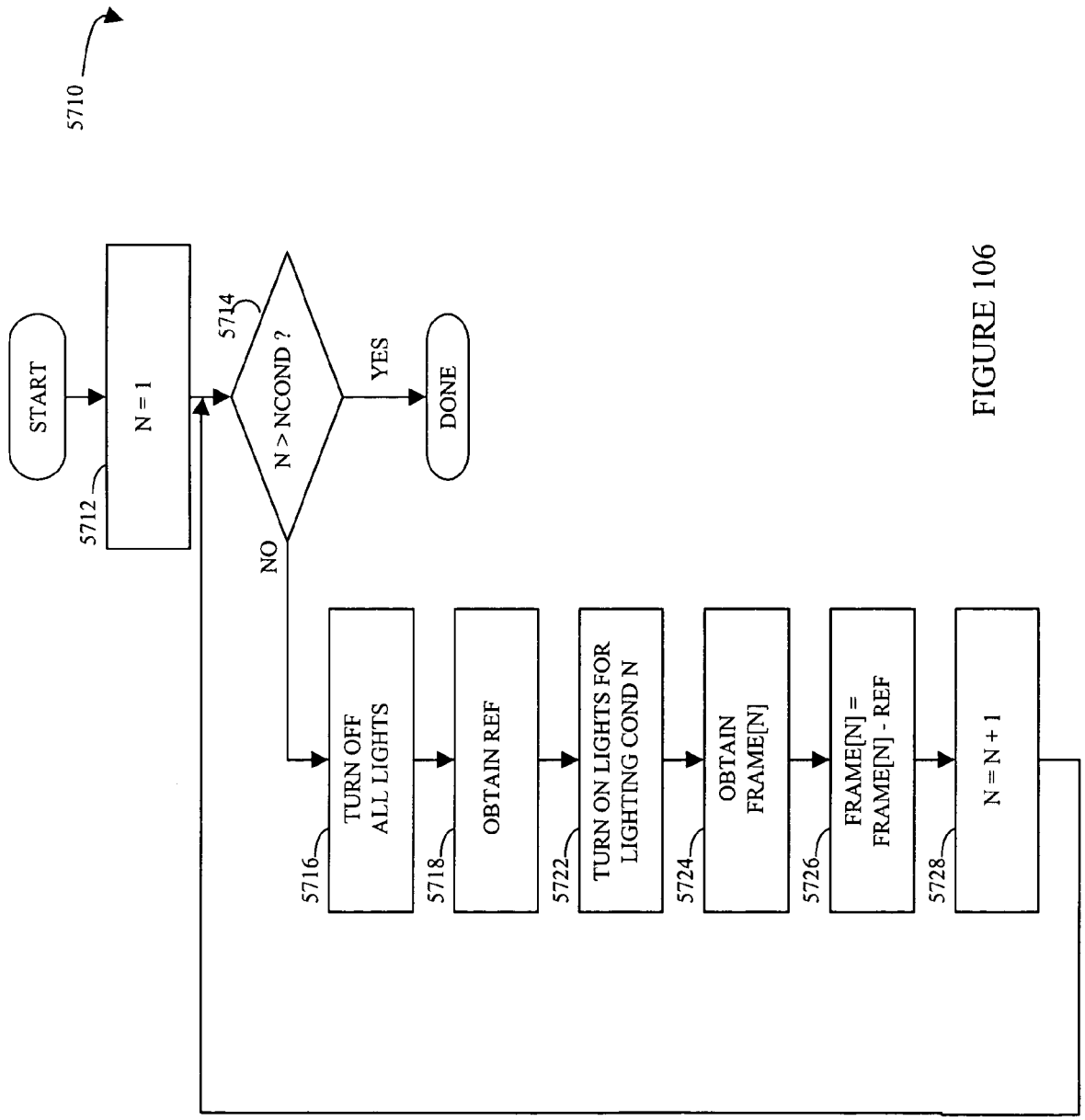
FIG. 106 is a flowchart of steps of one embodiment performed in connection with a system for compensating unpredictable ambient light.

Referring to FIG. 106, a flow chart 5710 illustrates steps performed in connection with a first embodiment of a system for compensating for unpredictable ambient light. Processing begins at a first step 5712 where an index variable, N, is set equal to one. The index variable N is used to iterate through the various lighting conditions. As discussed elsewhere herein, there may be a number of useful lighting conditions (e.g., overhead lighting, far view lighting, near view lighting, etc.) that are used in connection with the system described herein to detect fire, smoke, fog, etc.

Following the step 5712 is a test step 5714 where it is determined if the index variable, N, is greater than the number of lighting conditions, NCOND. If so, then processing is complete. Otherwise, control passes from the test step 5714 to a step 5716 where all controllable lights are turned off. Note that at the step 5716, the lights that are turned off are controlled by the CVCU 5642. As discussed elsewhere herein, there may be other sources of light in the cargo bay (either external or internal) over which the CVCU 5642 has no control. Accordingly, at the step 5716, the lights that are turned off are the lights over which the CVCU 5642 has control.

Following step 5716 is a step 5718 where a reference video frame, REF, is obtained. A reference frame is a video frame that is taken by the relevant one of the cameras 2504a, 2504b that will also be taking the video data frame or frames (described below). The reference frame, REF, is used to compensate for ambient light, as discussed elsewhere herein.

Following step 5718 is a step 5722 where the lights that correspond to lighting condition N are turned on. Thus, for example, if lighting condition N corresponds to having all of the overhead lights 2502a-2502n turned on, then the overhead lights 2502a-2502n are turned on at the step 5722. Following step 5722 is a step 5724 where video frame FRAME[N], corresponding to lighting condition N, is obtained using the appropriate one of the cameras 2504a, 2504b. Note that FRAME[N] could represent a single video frame, a plurality of video frames taken at different times, a series of consecutive video frames, a plurality of different series of video frames, etc. In general, FRAME[N] represents the video information used to provide the processing described herein.

Figure 107:
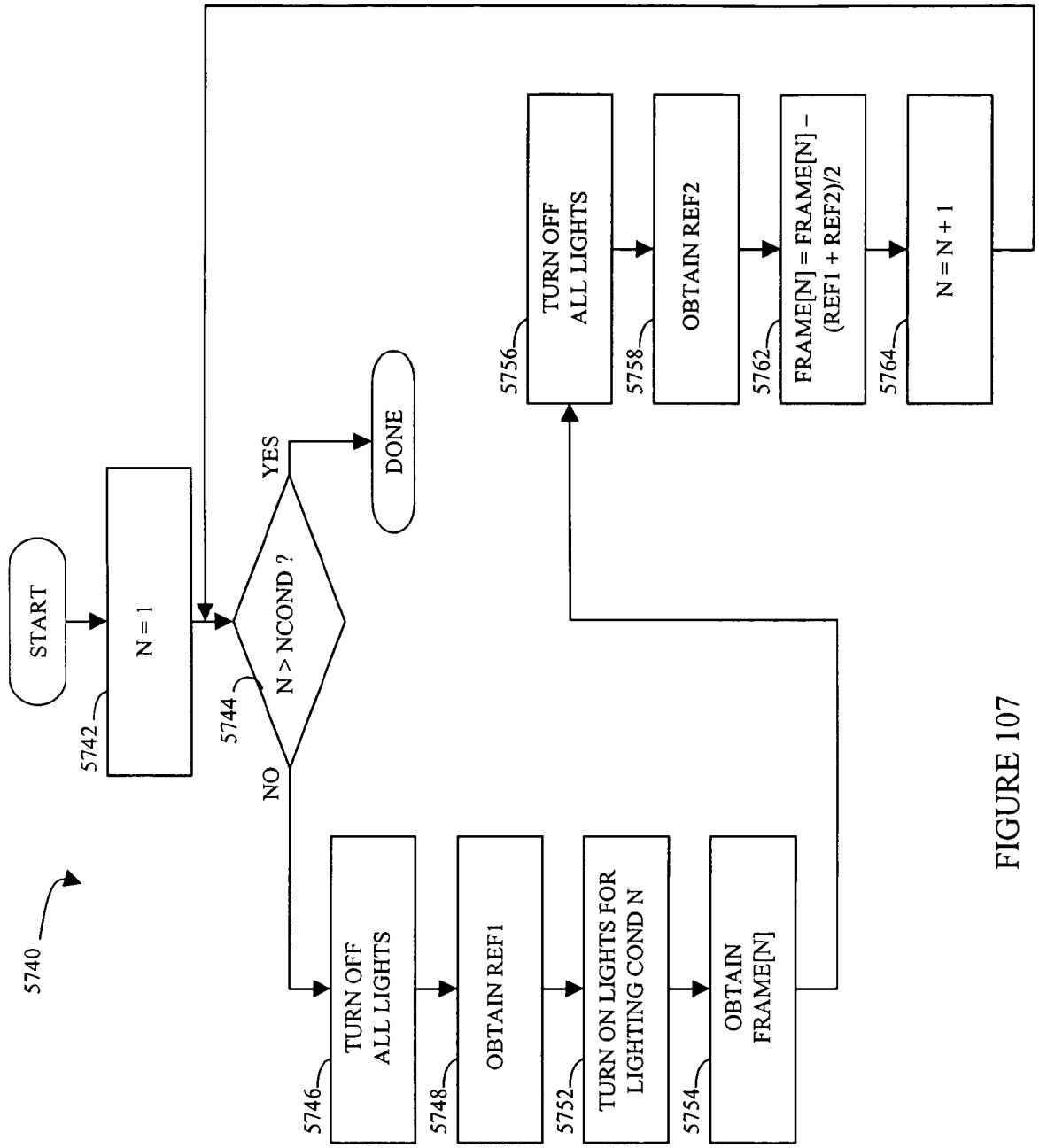
FIG. 107 is a flowchart of steps of an alternative embodiment for compensating for ambient light.

Following the step 5724 is a step 5726 where compensation for ambient light is performed by subtracting REF from FRAME[N]. Thus, following step 5726, FRAME[N] represents the signal attributable to the lights turned on at the step 5722 with the contribution from ambient light removed. Following the step 5726 is a step 5728 where the index variable, N, is incremented. Following the step 5728, control transfers back to the step 5714 to perform the next iteration. Following the step 5728, control transfers back to the step 5714, discussed above Referring to FIG. 107, a flow chart 5740 illustrates an alternative embodiment for compensating for ambient light. Processing begins at a first step 5742 where an index variable, N, is set equal to one. Following the step 5742 is a test step 5744 where it is determined if the index variable, N, is greater than the number of lighting conditions, NCOND, that are being measured. If so, then processing is complete. Otherwise, control transfers from the test step 5744 to a step 5746 where all lights controlled by the CVCU 5642 are turned off in a manner similar to that discussed above in connection with the step 5716.

Following the step 5746 is a step 5748 where a first reference frame, REF1, is obtained similar to obtaining the reference frame at the step 5718, discussed above. Following the step 5748 is a step 5752 where the CVCU 5642 turns on the appropriate lights corresponding to lighting condition N. Following the step 5752 is a step 5754 where a signal corresponding to the frame at lighting condition N, FRAME[N], is obtained in a manner similar to obtaining FRAME[N] at the step 5724, discussed above.

Following the step 5754 is a step 5756 where all of the lights controlled by the CVCU 5642 are turned off. Following the step 5756 is a step 5758 where a second reference frame, REF2, is obtained. The second reference frame obtained at the step 5758 may be different than the first reference frame obtained at the step 5748 due to changing conditions in the cargo bay. Obtaining the two reference frames, one before the frame N is taken and one after the frame N is taken, takes into account the possibility that the ambient light conditions may be changing and/or the conditions in the cargo bay are changing rapidly. In instances where there is a concern that the state of the cargo bay is changing rapidly, REF1 may be obtained immediately before FRAME[N] and REF2 may be obtained immediately after FRAME[N].

Following the step 5758 is a step 5762 where FRAME[N] is compensated by subtracting therefrom the average of the first and second reference frames, (REF1+REF2)/2. Following the step 5762 is a step 5764 where the index variable, N, is incremented. Following the step 5764, control transfers back to the test step 5744, discussed above.

Figure 108:
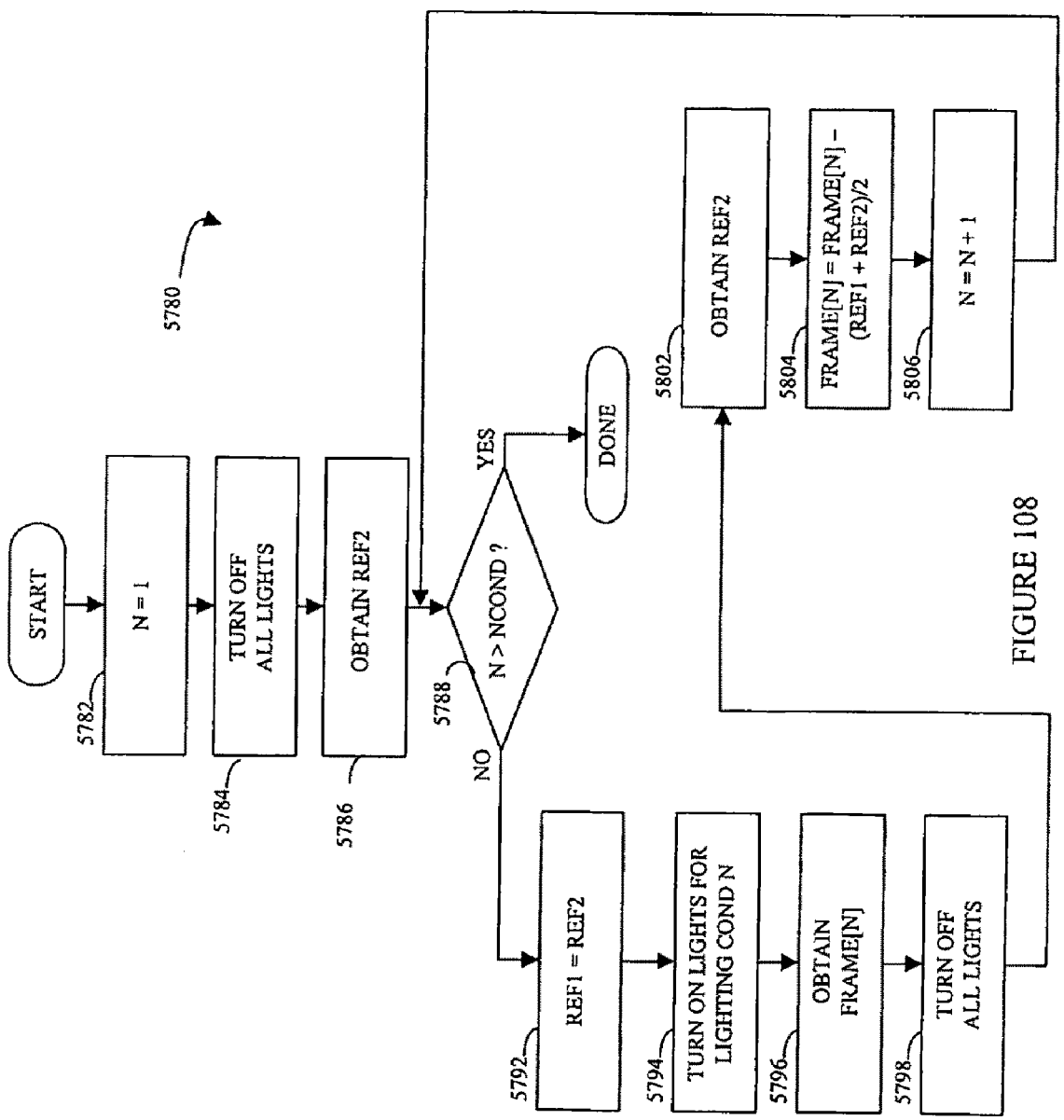
FIG. 108 is a flowchart of steps performed in connection with an alternative embodiment for compensating for ambient light.

Referring to FIG. 108, a flow chart 5780 illustrates steps performed in connection with an alternative embodiment for compensating for ambient light. Processing begins at a first step 5782 where an index variable, N, is set equal to one. Following the step 5782 is a step 5784 where all lights controlled by the CVCU 5642 are turned off. Following the step 5784 is a step 5786 where a value is obtained for a second reference frame, REF2. The reason that the value is obtained for the second reference frame at the step 5786 will become apparent in connection with the discussion that follows.

Following the step 5786 is a test step 5788 where it is determined if the index variable, N, is greater than the number of lighting conditions at which data is being taken. If so, then processing is complete. Otherwise, control transfers from the step 5788 to a step 5792 where a first referenced frame, REF1, is set equal to the second reference frame, REF2. Note that on the first iteration, it is useful to have the value of REF2 already set, which is why it is useful to execute the steps 5784, 5786, discussed above. Following the step 5792 is a step 5794 where the CVCU 5642 turns on the lights appropriate for the lighting condition N at which data is being taken. Following the step 5794 is a step 5796 where FRAME[N] is obtained corresponding to the lighting condition N set at the step 5794. Following the step 5796 is a step 5798 where all of the lights controlled by the CVCU 5642 are turned off. Following the step 5798 is a step 5802 where a new value for the second reference frame, REF2, is obtained. Following the step 5802 is a step 5804 where the value of FRAME[N], obtained at the step 5796, is adjusted to compensate for the two reference frames by subtracting from FRAME[N] the average of the two reference frames, (REF1+REF2)/2. Following the step 5804 is a step 5806 where the index variable, N, is incremented. Following the step 5806, control transfers back to the step 5788, discussed above.

The embodiment illustrated by the flow chart 5780 provides advantages. With the embodiment of the flow chart 5780, only one reference frame is obtained per iteration while FRAME[N] is compensated using the reference frame taken before FRAME[N] is captured (i.e., REF1) and the reference frame taken after FRAME[N] is captured (i.e., REF2) just like in the embodiment of the flow chart of FIG. 107. This is accomplished by, at the step 5792, setting the value of REF1 equal to the value of the second reference frame, REF2, taken at the previous iteration. Thus, for each iteration, the value of REF1 is set equal to REF2, FRAME[N] is obtained, and then a new reference frame REF2 is obtained.

Figure 109:
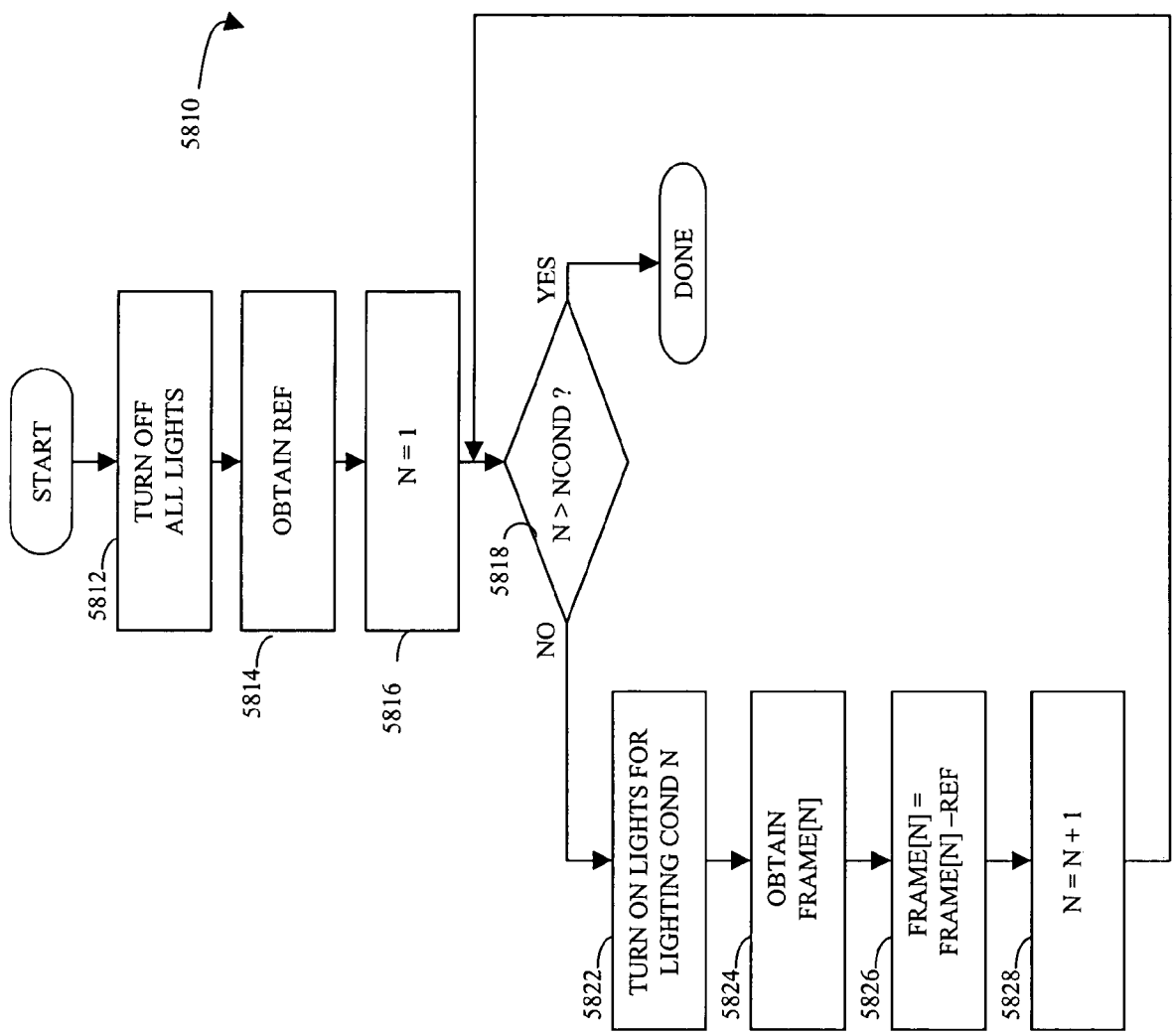
FIG. 109 is flowchart of steps performed in connection with an alternative embodiment for compensating for ambient light.

Referring to FIG. 109, a flow chart 5810 illustrates steps performed in connection with an alternative embodiment for compensating for ambient light. Processing begins at a first step 5812 where all lights controllable by the CVCU 5642 are turned off. Following the step 5812 is a step 5814 where a reference frame, REF, is obtained. Following the step 5814 is a step 5816 where an index variable, N, is set equal to one.

Following the step 5816 is a test step 5818 where it is determined if the index variable, N, is greater than the number of lighting conditions, NCOND, at which measurements are being taken. If so, then processing is complete. Otherwise, control transfers from the test step 5818 to a step 5822 where the lights corresponding to lighting condition N are turned on by the CVCU 5642. Following the step 5822 is a step 5824 where FRAME[N] is obtained. Following the step 5824 is a step 5826 where FRAME[N] is compensated by subtracting therefrom the reference frame, REF, obtained at the step 5814. Following the step 5826 is a step 5828 where the index variable, N, is incremented. Following the step 5828, control transfers back to the test step 5818, discussed above.

The embodiment illustrated by the flow chart 5810 is efficient in that there is only one reference frame that is ever obtained through measurement of all the lighting conditions. This embodiment is useful in instances where it is not expected that the condition of the cargo bay will change too much as the system iterates through the different lighting conditions.

Figure 110:
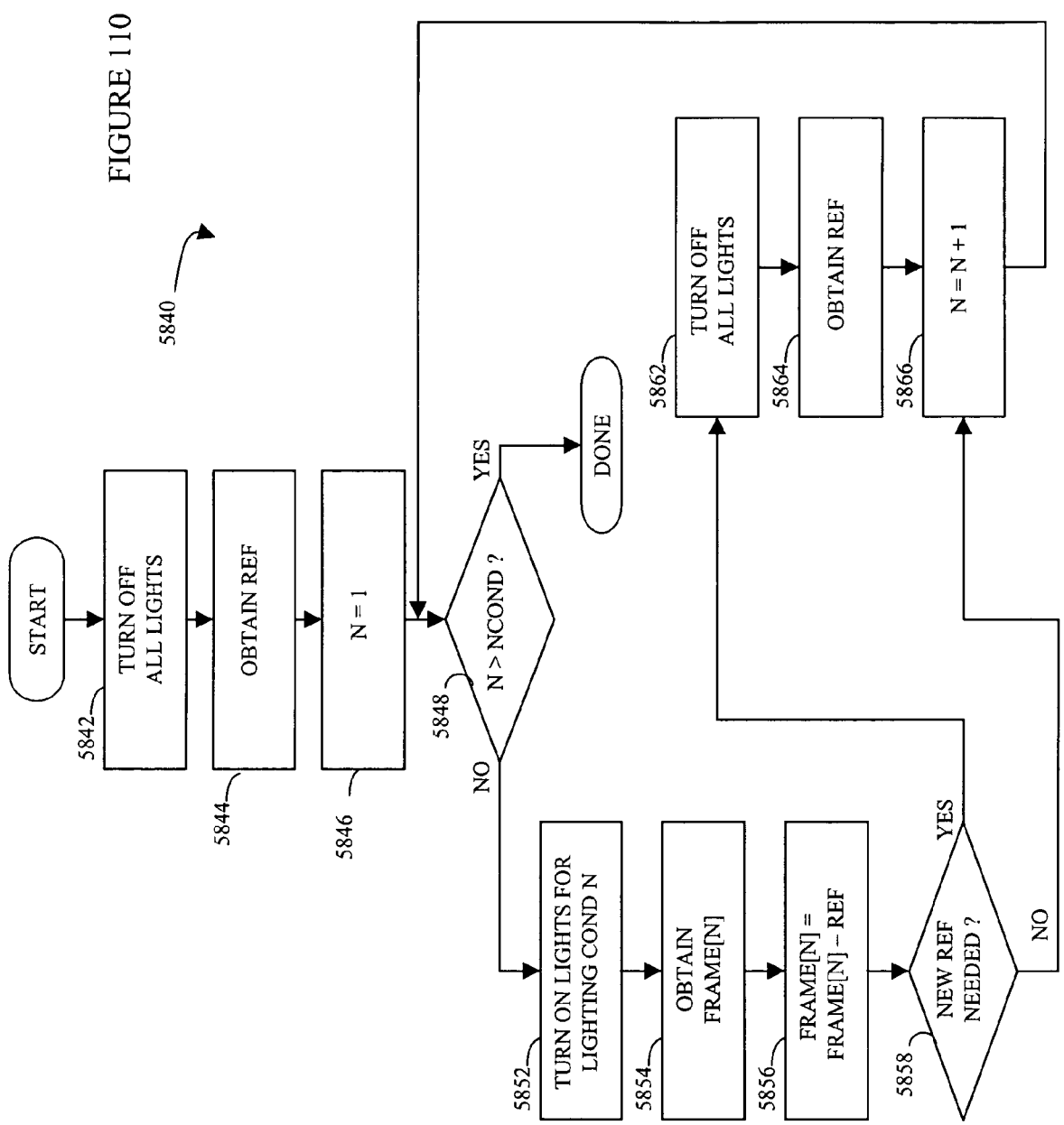
FIG. 110 is a flowchart of steps performed in connection with yet another embodiment for compensating for ambient light.

Referring to FIG. 110, a flow chart 5840 illustrates steps performed in yet another embodiment for compensating for ambient light. Processing begins at a first step 5842 where all lights controllable by the CVCU 5642 are turned off. Following the step 5842 is a step 5844 where a reference frame, REF, is obtained. Following the step 5844 is a step 5846 where an index variable, N, is set equal to one.

Following the step 5846 is a test step 5848 where it is determined if the index variable, N, is greater than the number of lighting conditions, at which measurements are being taken. If so, then processing is complete. Otherwise, control passes from the test step 5848 to a step 5852 where appropriate ones of the lights corresponding to lighting condition N are turned on by the CVCU 5642. Following the step 5852 is a step 5854 where FRAME[N] is obtained. Following the step 5854 is a step 5856 where FRAME[N] is compensated by subtracting therefrom the reference frame, REF. Following the step 5856 is a test step 5858 which determines if a new reference frame is needed. The criteria used at the test step 5858 to determine if a new reference frame is needed may vary and may include simply determining that the value of N modulo some number equals, a predetermined value. Thus, for example, the test at the step 5858 could determine that a new reference frame is needed for every fifth value of N (i.e., N=5, 10, 15, etc.). Of course, other appropriate tests may be used at the step 5858 including, for example, using other metrics to determine if the conditions in the cargo bay have sufficiently changed so that another reference frame is warranted.

If it is determined at the test step 5858 that a new reference frame is needed, control transfers from the step 5858 to a step 5862 where all lights controllable by the CVCU 5642 are turned off. Following the step 5862 is a step 5864 where a new reference frame, REF, is obtained. Following the step 5864 is a step 5866 where the index variable, N, is incremented. Note that the step 5866 is also reached from the test step 5858 if it is determined at the test step 5858 that a new reference frame is not needed. Following the step 5866, control transfers back to the step 5848 to determine if N is greater than the number of lighting conditions, as discussed above.

For all of the embodiments disclosed herein, it is useful if pixel saturation is avoided for both the measurement of the reference frames and the data frames. In addition, it is also useful to have a system where the effect of controlled lighting (i.e., controlled by the CVCU 5642) is strong enough to be distinguishable from the effect of uncontrolled lighting. In some embodiments, this may be accomplished by making appropriate adjustments to the intensity of the controlled lighting so that the intensity of the controlled lighting is a function (at least in part) of the measured relative intensity of the uncontrolled lighting.

An alternative method of avoiding pixel saturation is to adjust camera settings, such as gain and exposure time (or, alternatively, shutter speed), which influence intensity of pixels within an acquired image. A camera may adjust its settings according to received image intensities and an appropriate algorithm. The objective for such an adjustment algorithm is, on one hand, to avoid pixel saturation but, on the other hand, to assure that as many pixels as possible are active (i.e. above background level). In some embodiments, typical automatic gain control functionality provided with many commercially available camera chips is not used. Rather, the camera's software, residing within the DSP, adjusts the camera settings based on recently acquired images. The adjustments may be made in such a way as not to hamper the smoke detection and aerosol differentiation functions of the system.

One possible consequence of such adjustments may be that the non-illuminated reference frames may be collected with different camera settings than the illuminated frames, which are to be analyzed. If this is the case, then the frames cannot be directly subtracted, as the same actual illumination may correspond to different pixel intensities in the frames to be subtracted. This difficulty may be solved by first translating the acquired frames into a common intensity scale. For example, suppose that the non-illuminated reference frame was acquired with a camera gain G1, and the illuminated frame was acquired with camera gain G2. The two frames are then translated into a common intensity scale using appropriate intensity mapping, in order to make them independent form the particular camera gain that was in effect when the frames were acquired. This transformation may be thought of as a correction for variable camera gain settings. Then, both frames may be directly subtracted, as if both were acquired with the same camera settings. Translation of intensity scale may involve increasing the bit-depth of the images. For example, if the images are acquired with eight-bit intensity resolution, then the images corrected for gain settings may require sixteen-bit or even higher intensity resolution, depending on the range of the camera gain settings that may be in effect when acquiring the frames. If such camera setting adjustments and intensity corrections are used, it should be understood that they may be include within the image acquisition steps of the flow charts discussed above.

A benefit of the system described herein is that cameras no longer require optical filters to eliminate visible light. This simplifies lens design and allows for less expensive and lighter cameras; An additional benefit is that illumination sources included in an embodiment no longer need to be constrained to infrared range. Visible LED sources may be used instead. Note that use of infrared lighting may still be required by the airframe manufacturer, for example, to prevent agitation of animal cargo by rapidly switching lights. Another benefit is that cargo bay lighting may be of a fluorescent type as well as other types. With no optical filter present, it is of less consequence if the uncontrolled lighting falls into infrared spectrum. Therefore the system described herein may also be used with, for example, incandescent lighting, daylight entering the cargo bay through an open door, and the like.

Optical filters may be used with the lights and cameras 2500 to allow detection of hot spots using CCD cameras operating in the visual and near infra-red (NIR) spectral band. Inexpensive CCD arrays may display enough sensitivity to NIR light to allow detection of hot spots in dark-field view. However, CCD arrays may also display much higher sensitivity to visible light. Accordingly, it is useful to have complete darkness (relative to the CCD arrays) to detect hot spots through CCD cameras. Otherwise the visible light may dominate the thermal effect making hot spot detection difficult. Use of appropriate optical filters with the CCD arrays allows eliminating visible light and performing hot spot detection as if the scene were completely dark. In a cargo bay environment, lighting may include lights of the fluorescent kind, for example, or other types of light with radiation having wavelengths below 800 nm. Thus, a filter blocking such light may allow only wavelengths above 800 nm to be passed to the CCD array to simulate dark-field conditions.

Based on the foregoing, what will now be described is a way to enable detection of smoke and other aerosols using a CCD camera with an appropriate filter. It differs from the above-described concept in that it may not require subtracting reference images to eliminate effects of nuisance lighting. Instead, an optical filter may eliminate the light originating from the nuisance sources. In addition, the use of filters makes it possible to use non-illuminated images for hot spot detection, as any bright spots may indicate a hot spot rather than an uncontrolled light source. Note that hot spot detection through non-illuminated images requires that all nuisance light sources should have their wavelengths restricted to the band blocked by the filter. For smoke and other aerosol analysis, appropriate illumination units are used, with light emitted within the filter's pass band. Lighting scenarios and combinations used in connection with embodiments may be used in connection with any appropriate embodiments that use filters as well as embodiments that do not use filters.

The lighting scenarios used in connection with the steps of FIGS. 106-110 may correspond to lighting scenarios described elsewhere herein, for example, in connection with FIG. 36. The reference frame(s) that are obtained may correspond to the dark/thermal view. Also, in some embodiments, non-illuminated reference frames are acquired and subtracted when a filter is not used, but subtraction of non-illuminated reference frames may not be necessary in instances where filters are used to eliminate light in a manner that approximates (or is identical to) the way in which it would have been eliminated out by subtracting the non-illuminated reference frames.

Use of the optical filter makes the fire detection system insensitive to nuisance light sources within the bay as long as their output does not spill into the pass band of the filter. It also makes the processing less computationally expensive, by removing the steps of compensating for nuisance lighting by means of subtracting the reference images, provided that such nuisance lighting does not contain NIR components and is thus blocked by the filter. Switching of different light sources allows observing different scattering and absorption effects due to aerosols within the enclosure, and consequently leads to faster detection.

It should be noted that the techniques described herein may be used in connection other applications. The techniques used herein with video-based or image-based features may be used, without limitation, as a monitoring tool, such as in connection with monitoring cargo loading, unloading, and general monitoring of the cargo bay or other area under observation for detection of events other than for fire/non-fire.

While the invention has been disclosed in connection with various embodiments, modifications thereon will be readily apparent to those skilled in the art. Accordingly, the spirit and scope of the invention is set forth in the following claims.

What is claimed is:

1. A method for detecting fog comprising:
using one or more processors to determine at least one visual characteristic of image data for a portion of an image including at least one of: a change in overall image intensity for said portion, a change in image contrast for said portion, and a change in image sharpness for said portion; and
using one or more processors to determine, using said at least one visual characteristic, whether said change associated with said at least one visual characteristic is approximately uniform with respect to said portion.

2. The method of claim 1, wherein an amount of said change is within a predetermined threshold.

3. The method of claim 1, further comprising:
determining that at least one of the following conditions is present for said portion: an increase in overall image intensity, a decrease in image sharpness, and a decrease in image contrast; and
determining a positive indicator for fog presence if it is determined that said at least one of the following conditions is present, and it is determined using said at least one visual characteristic that said change associated with said at least one visual characteristic is approximately uniform with respect to the portion.

4. The method of claim 3, further comprising:
detecting that said change occurs rapidly within a predetermined time period.

5. The method of claim 4, wherein said time period is a few seconds.

6. The method of claim 4, further comprising:
detecting that fog droplets form throughout a predetermined area at a same point in time.

7. The method of claim 4, wherein an initial value is associated with said at least one visual characteristic prior to fog formation and a second value is associated with said at least one visual characteristic during fog formation, and the method further comprising:
detecting that a value associated with said at least visual characteristic returns from said second value toward said initial value indicating fog dispersal.

8. The method of claim 7, wherein said value returns to said initial value from said second value in approximately linear time.

9. The method of claim 7, wherein said value returning to said initial value from said second value is approximately uniform across said portion of the image.

10. The method of claim 1, further comprising:
extracting at least one feature of said image data.

11. The method of claim 10, wherein said at least one feature includes an average image intensity of said portion of said image indicating image brightness, the average intensity m of said portion X of an image at a time "t" being represented as:

$$m(t) = \frac{1}{N} \sum_{j=1}^{N} Xj(t)$$

where N represents the total number of pixels in the portion X of the image at a time "t".

12. The method of claim 11, further comprising:
    determining an average image intensity for a plurality of portions for each of a plurality of images over a period of time to detect a trend in image brightness; and
    determining, using said average image intensity for each of said plurality of portions for each of said plurality of images, if overall brightness of a region defined by said plurality of portions increases over a predetermined time period above a predetermined threshold.

13. The method of claim 11, wherein said at least one feature includes a standard deviation of the image intensity of said portion represented as:

$$s(t) = \sqrt{\frac{1}{N} \sum_{j=1}^{N} (Xj(t) - m(t))^2}.$$

14. The method of claim 13, wherein large values of s(t) indicate high variability of intensity and are related to high contrast, low values of s(t) indicate lower contrast, and the method further comprising:
    detecting creation of fog when there is a rapid decrease of s(t) within a predetermined threshold; and
    detection fog dispersal when there is an increase in s(t).

15. The method of claim 13, wherein said at least one feature includes a correlation based on a likelihood ratio distribution represented as:

$$d_1(t) = 1 - \min_{j=all\ pixels}\left(LR_j, \frac{1}{LR_j}\right) \text{ where}$$

$$LR_j = \frac{\left[\frac{(s(t))^2 + (s(t-\delta))^2}{2} + \frac{(X_j(t) - m(t-\delta))^2}{2}\right]^2}{(s(t))^2 + (s(t-\delta))^2}.$$

16. The method of claim 11, wherein said at least one feature includes a mean absolute difference from the mean represented as:

$$d(t) = \frac{1}{N} \sum_{j=1}^{N} |Xj(t) - m(t)|.$$

17. The method of claim 16, wherein creation of fog is associated with a rapid drop of d(t) above a predetermined threshold and wherein an increase in d(t) is associated with fog dispersal.

18. The method of claim 11, wherein said at least one feature includes a correlation measurement based on the t-Student distribution represented as:

$$d_a(t, \delta) = \frac{\sum_{j=1}^{N} (Xj(t) - m(t-\delta))}{\sqrt{\sum_{j=1}^{N} (Xj(t) - m(t-\delta))^2}}$$

in which t and t−δ represent points in time and X(t) and X(t−δ) are portions of images taken, respectively, at these two points in time.

19. The method of claim 18, wherein said correlation measurement is used in tracking a statistical evolution of a portion of a video stream as compared to a portion of the reference image at time t−δ, and wherein values of said correlation measurement larger than a predetermined threshold indicate fog.

20. The method of claim 10, wherein said at least one feature includes intensity of a change image with respect to said portion X of said image, D(t,δ)=X(t)−X(t−δ), which is a difference between time instances t and t−δ of said portion, represented as:

$$m_D(t, \delta) = \frac{1}{N} \sum_{j=1}^{N} Dj(t, \delta)$$

where N represents a total number of pixels being analyzed of said portion X.

21. The method of claim 20, further comprising:
    determining creation of fog when there are one or more positive values of $m_D(t,\delta)$; and
    determining dispersion of fog when there are one or more negative values of $m_D(t,\delta)$.

22. The method of claim 20, wherein the time interval δ between two compared frames is fixed.

23. The method of claim 20, wherein the time interval δ is adjusted in accordance with at least one system condition or parameter.

24. The method of claim 20, wherein a reference frame of the portion, X(t−δ), represents an initial view of a portion of a cargo bay X(0) such that δ is a current time t since the start of a flight from a time of the initial view and wherein the difference image with respect to the portion, D(t,δ), represents a cumulative change of view of the portion since beginning of the flight.

25. The method of claim 20, wherein a portion of reference image X(t−δ) is reset periodically to accommodate changes of background.

26. The method of claim 20, wherein a portion of a reference frame X(t−δ) is set to a frame immediately preceding a current frame such that δ=1, and wherein the difference image with respect to said portion D(t,δ) represents the instantaneous rate of change of a view of said portion.

27. The method of claim 20, wherein said at least one feature includes characterizing image sharpness using an intensity gradient, and wherein said intensity gradient is determined using a portion of a change image.

28. The method of claim 20, wherein said at least one feature includes a dynamic range of intensity change including a standard deviation $s_d(t,\delta)$ of intensity change over some predefined time interval, δ, defined as:

$$s_d(t, \delta) = \sqrt{\frac{1}{N} \sum_{j=all\ pixels} (D_j(t, \delta) - m_d(t, \delta))^2}$$

and wherein a value of the standard deviation $s_d(t,\delta)$ is close to zero within some predetermined threshold if there is fog.

29. The method of claim 20, wherein said at least one feature includes a mean absolute deviation of a portion from the mean value of a portion of the change image represented as:

$$d_d(t) = \frac{1}{N} \sum_{j=all\ pixels} |D_j(t, \delta) - m_d(t, \delta)|$$

and wherein a value of the mean absolute deviation is close to zero within some predetermined threshold if there is fog.

30. The method of claim 20, wherein said at least one feature includes a spatial moment of a portion of the change image, and wherein coordinates of a center of mass a portion of the change image $D(t,\delta)$ are represented as:

$$i_c(t,\delta) = \frac{\sum_{i,j=all\ pixels} iD_{i,j}(t,\delta)}{\sum_{i,j=all\ pixels} D_{i,j}(t,\delta)}\ j_c(t,\delta) = \frac{\sum_{i,j=all\ pixels} jD_{i,j}(t,\delta)}{\sum_{i,j=all\ pixels} D_{i,j}(t,\delta)}$$

and wherein, if the image change for a portion is uniform across the portion of the image, the coordinates are close to the geometric center of the portion of the image indicating presence of fog.

31. The method of claim 30, wherein said at least one feature includes higher order moments of a portion of a change image represented as:

$$M_{2,0}(t,\delta) = \sum_{i,j=all\ pixels} (i - i_c(t,\delta))^2 D_{i,j}(t,\delta)$$

$$M_{0,2}(t,\delta) = \sum_{i,j=all\ pixels} (j - j_c(t,\delta))^2 D_{i,j}(t,\delta).$$

32. The method of claim 31, wherein said at least one feature includes a moment of inertia of a portion of the change image represented as:

$$M_i(t,\delta) = \sum_{i,j=all\ pixels} (i - i_c(t,\delta))^2 + (j - j_c(t,\delta))^2 D_{i,j}(t,\delta).$$

33. The method of claim 20, wherein said at least one feature includes moments defined using average absolute values of pixels represented as:

$$M_{1,0}^a(t,\delta) = \sum_{i,j=all\ pixels} |i - i_c(t,\delta)| D_{i,j}(t,\delta)$$

$$M_{0,1}^a(t,\delta) = \sum_{i,j=all\ pixels} |j - j_c(t,\delta)| D_{i,j}(t,\delta)$$

$$M_i^a(t,\delta) = \sum_{i,j=all\ pixels} (|i - i_c(t,\delta)| + |j - j_c(t,\delta)|) D_{i,j}(t,\delta)$$

and wherein, if a portion of the change image is uniform, values for these moments are larger than a predetermined threshold indicating a presence of fog.

34. The method of claim 10, wherein said at least one feature includes an absolute value of the average intensity change represented as:

$$d_a(t,\delta) = \left| \frac{1}{N} \sum_{j=1}^{N} (Xj(t) - Xj(t-\delta)) \right|$$

in which t and t−δ represent points in time and X(t) and X(t−δ) are portions of images taken, respectively, at these two points in time.

35. The method of claim 10, wherein said at least one feature includes an intensity range r(t) at a time t represented as:

$$r(t) = \chi_{max}(t) - \chi_{min}(t)$$

where a maximum (Xmax) and a minimum (Xmin) intensity of a portion X of an image at a time t are used to provide an indication of reduced image contrast for the portion X and are represented as:

$$\chi_{max}(t) = \max_{j=all\ pixels} X_j(t),\ \chi_{min}(t) = \min_{j=all\ pixels} X_j(t).$$

36. The method of claim 28, wherein creation of fog is indicated by a rapid drop of r(t), and an increase in r(t) indicates fog dispersal, and wherein, r(t) decreasing below a threshold amount indicates that fog is present.

37. The method of claim 10, wherein said at least one feature includes characterizing image sharpness of a portion X of an image using an intensity gradient.

38. The method of claim 37, wherein x and y gradient components G at pixel i,j of a portion X of an image at a time t are defined as a left difference represented as:

$$G_{i,j}^x(t) = X_{i,j}(t) - X_{i-1,j}(t)\ G_{i,j}^y(t) = X_{i,j+1}(t) - X_{i-j,1}(t).$$

39. The method of claim 37, wherein x and y gradient components G at pixel i,j of a portion X of an image at a time t are defined as a right difference represented as:

$$G_{i,j}^x(t) = X_{i+1,j}(t)\ G_{i,j+1}^y - X_{i,j}(t).$$

40. The method of claim 37, wherein x and y gradient components G at pixel i,j are defined as a double-sided difference represented as:

$$G_{i,j}^x(t) = \frac{X_{i+1,j}(t) - X_{i-1,j}(t)}{2}\ G_{i,j}^y(t) = \frac{X_{i,j+1}(t) - X_{i,j-1}(t)}{2}.$$

41. The method according to one of claims 38, 39 and 40, wherein said at least one feature includes a mean absolute gradient value represented as:

$$g_a^x(t) = \frac{1}{N} \sum_{i,j=all\ pixles} |G_{i,j}^x(t)|,\ g_a^y(t) = \frac{1}{N} \sum_{i,j=all\ pixles} |G_{i,j}^y(t)|$$

such that creation of fog is signified by a rapid drop in at least one of: $g_\alpha^x(t)$ and $g_\alpha^y(t)$.

42. The method of claim 41, wherein said at least one feature includes an overall average gradient characteristic represented as:

$$g_\alpha(t) = g_\alpha^x(t) + g_\alpha^y(t).$$

43. The Method according to one of claims 38, 39, and 40, wherein said at least one feature includes an average gradient norm, wherein a gradient norm G at pixel i,j is represented as:

$$G_{i,j}n(t) = \sqrt{G_{i,j}^x(t)^2 + G_{i,j}^y(t)^2}$$

for all "N" pixels within a portion of an image, and the average gradient norm is represented as:

$$g_n(t) = \frac{1}{N} \sum_{i,j=all\ pixels} G_{i,j}^n(t).$$

44. The method of claim 43, wherein creation of fog is related to a rapid drop in $g_n(t)$ below a predetermined threshold value, and an increase in $g_n(t)$ indicates fog dispersal.

45. The method of claim 44, wherein said at least one feature includes maximum and minimum values of x and y components of a gradient norm G represented as:

$$g_{max}(t) \max_{i,j=all\ pixels} G_{i,j}^n(t), g_{min}(t) = \min_{i,j=all\ pixels} G_{i,j}^n(t)$$

$$g_{max}^x(t) \max_{i,j=all\ pixels} |G_{i,j}^x(t)|, g_{min}^x(t) = \min_{i,j=all\ pixels} |G_{i,j}^n(t)|$$

$$g_{max}^y(t) \max_{i,j=all\ pixels} |G_{i,j}^y(t)|, g_{min}^y(t) = \min_{i,j=all\ pixels} |G_{i,j}^y(t)|.$$

46. The method of claim 37, wherein said intensity gradient defines a gradient in terms of differences between pixel locations with time as a constant.

47. The method of claim 37, wherein said intensity gradient defines a gradient in terms of pixel values between portions of images taken at different points in time.

48. The method of claim 37, wherein a large value of said intensity gradient indicates sharp edges within a portion of an image.

49. The method of claim 1, further comprising:
determining that at least one of the following conditions is present for said portion of said image: an increase in overall image intensity, a decrease in image sharpness, and a decrease in image contrast;
determining an intermediate positive indicator for fog presence if it is determined that said at least one of the following conditions is present, and it is determined using said at least one visual characteristic that said change associated with said at least one visual characteristic is approximately uniform with respect to the portion of the image; and
determining a final positive indicator for fog presence if said intermediate positive indicator indicates that there is fog which is confirmed by at least one other feature.

50. The method of claim 49, wherein said at least one other feature is a non-image feature.

51. The method of claim 50, wherein said at least one other feature includes at least one of temperature, humidity and pressure.

52. The method of claim 49, wherein a plurality of intermediate positive indicators are used in determining said final positive indicator.

53. The method of claim 49, further comprising:
distinguishing fog from one of a plurality of other conditions, wherein said plurality of other conditions includes smoke and an aerosol dispersion.

54. The method of claim 1, wherein said portion is an entire image.

55. The method of claim 1, wherein said portion includes a plurality of regions of said image.

56. The method of claim 55, wherein each of said plurality of regions is a predefined shape in accordance with lighting and camera view.

57. The method of claim 1, wherein said at least one visual characteristic is a frequency-based feature.

58. The method of claim 57, wherein said frequency-based feature estimates motion of an element of said portion.

59. The method of claim 57, wherein said frequency-based feature is used to monitor a an area within a camera view for at least one other condition unrelated to fire.

60. The method of claim 59, wherein a cargo bay area is monitored during cargo loading using said frequency-based feature.

61. The method of claim 1, further comprising:
receiving an image from a CCD camera.

62. The method of claim 61, wherein said CCD camera has an operational wavelength sensitivity between approximately 770 and 1200 nanometers blocking visible light.

63. The method of claim 59, wherein said CCD camera is a conventional CCD camera with an operational wavelength sensitivity between approximately 400 and 1200 nanometers.

64. The method of claim 63, wherein said CCD camera is used when it is determined that a view area is completely obscured except for a predetermined space within which said CCD camera is included.

65. The method of claim 63, wherein said operational wavelength sensitivity of said CCD camera excludes a portion of the range between approximately 400 and 1200 nanometers.

66. The method of claim 65, wherein said at least one excluded portion has a range corresponding to one of: a light source and a device that emits within said at least one excluded portion to filter out wavelengths within said at least one excluded portion.

67. The method of claim 61, wherein said CCD camera has an operational wavelength sensitivity approximating that of visible light.

68. The method of claim 1, further comprising:
receiving an image from a camera with an associated light source wherein said camera is mounted opposite said associated light source within a viewing area.

69. The method of claim 68, wherein said viewing area is an aircraft cargo bay, and said camera and said associated light source are mounted within a predetermined distance from a ceiling of said aircraft cargo bay.

70. The method of claim 69, wherein said camera and said associated light source are positioned at a same vertical and horizontal location on walls of said cargo bay area.

71. A computer program, stored on a computer-readable storage medium, that detects fog, comprising executable code that:
determines at least one visual characteristic of image data for a portion of an image including at least one of: a change in overall image intensity for said portion, a change in image contrast for said portion, and a change in image sharpness for said portion; and
determines, using said at least one visual characteristic, whether said change associated with said at least one visual characteristic is approximately uniform with respect to said portion.

72. The computer program of claim 71, wherein an amount of said change is within a predetermined threshold.

73. The computer program of claim 71, further comprising executable code that:
determines at least one of the following conditions is present for said portion: an increase in overall image intensity, a decrease in image sharpness, and a decrease in image contrast; and
determines a positive indicator for fog presence if it is determined that said at least one of the following conditions is present, and it is determined using said at least one visual characteristic that said change associated with said at least one visual characteristic is approximately uniform with respect to the portion.

74. The computer program of claim 73, further comprising:
executable code that detects that said change occurs rapidly within a predetermined time period.

75. The computer program of claim 74, wherein said time period is a few seconds.

76. The computer program of claim 74, further comprising:
executable code that detects that fog droplets form throughout a predetermined area at a same point in time.

77. The computer program of claim 74, wherein an initial value is associated with said at least one visual characteristic prior to fog formation and a second value is associated with said at least one visual characteristic during fog formation, and the computer program product further comprising:
executable code that detects that a value associated with said at least visual characteristic returns from said second value toward said initial value indicating fog dispersal.

78. The computer program of claim 77, wherein said value returns to said initial value from said second value in approximately linear time.

79. The computer program product of claim 77, wherein said value returning to said initial value from said second value is approximately uniform across said portion of the image.

80. The computer program of claim 71, further comprising:
executable code that extracts at least one feature of said image data.

81. The computer program of claim 80, wherein said at least one feature includes an average image intensity of said portion of said image indicating image brightness, the average intensity m of said portion X of an image at a time "t" being represented as:

$$m(t) = \frac{1}{N}\sum_{j=1}^{N} Xj(t)$$

where N represents the total number of pixels in the portion X of the image at a time "t".

82. The computer program of claim 81, further comprising executable code that:
determines an average image intensity for a plurality of portions for each of a plurality of images over a period of time to detect a trend in image brightness; and
determines, using said average image intensity for each of said plurality of portions for each of said plurality of images, if overall brightness of a region defined by said plurality of portions increases over a predetermined time period above a predetermined threshold.

83. The computer program of claim 81, wherein said at least one feature includes a standard deviation of the image intensity of said portion represented as:

$$s(t) = \sqrt{\frac{1}{N}\sum_{j=1}^{N}(Xj(t) - m(t))^2}.$$

84. The computer program of claim 83, wherein large values of s(t) indicate high variability of intensity and are related to high contrast, low values of s(t) indicate lower contrast, and the computer program product further comprising executable code that:
detects creation of fog when there is a rapid decrease of s(t) within a predetermined threshold; and
detects fog dispersal when there is an increase in s(t).

85. The computer program of claim 83, wherein said at least one feature includes a correlation based on a likelihood ratio distribution represented as:

$$d_1(t) = 1 - \min_{j=all\ pixels}\left(LR_j, \frac{1}{LR_j}\right) \text{ where}$$

$$LR_j = \frac{\left[\frac{(s(t))^2 + (s(t-\delta))^2}{2} + \frac{(X_j(t) - m(t-\delta))^2}{2}\right]^2}{(s(t))^2 + (s(t-\delta))^2}.$$

86. The computer program of claim 81, wherein said at least one feature includes a mean absolute difference from the mean represented as:

$$d(t) = \frac{1}{N}\sum_{j=1}^{N}|Xj(t) - m(t)|.$$

87. The computer program of claim 86, wherein creation of fog is associated with a rapid drop of d(t) above a predetermined threshold and wherein an increase in d(t) is associated with fog dispersal.

88. The computer program of claim 81, wherein said at least one feature includes a correlation measurement based on the t-Student distribution represented as:

$$d_s(t, \delta) = \frac{\sum_{j=1}^{N}(Xj(t) - m(t-\delta))}{\sqrt{\sum_{j=1}^{N}(Xj(t) - m(t-\delta))^2}}$$

in which t and t−δ represent points in time and X(t) and X(t−δ) are portions of images taken, respectively, at these two points in time.

89. The computer program of claim 88, wherein said correlation measurement is used in tracking a statistical evolution of a portion of a video stream as compared to a portion of the reference image at time t−δ, and wherein values of said correlation measurement larger than a predetermined threshold indicate fog.

90. The computer program of claim 80, wherein said at least one feature includes intensity of a change image with respect to said portion X of said image, D(t,δ)=X(t)−X(t−δ), which is a difference between time instances t and t−δ of said portion, represented as:

$$m_D(t, \delta) = \frac{1}{N}\sum_{j=1}^{N} Dj(t, \delta)$$

where N represents a total number of pixels being analyzed of said portion X.

91. The computer program product of claim 90, further comprising executable code that:
   determines creation of fog when there are one or more positive values of $m_D(t,\delta)$; and
   determines dispersion of fog when there are one or more negative values of $m_D(t,\delta)$.

92. The computer program of claim 90, wherein the time interval $\delta$ between two compared frames is fixed.

93. The computer program of claim 90, wherein the time interval $\delta$ is adjusted in accordance with at least one system condition or parameter.

94. The computer program of claim 90, wherein a reference frame of the portion, $X(t-\delta)$, represents an initial view of a portion of a cargo bay $X(0)$ such that $\delta$ is a current time t since the start of a flight from a time of the initial view and wherein the difference image with respect to the portion, $D(t,\delta)$, represents a cumulative change of view of the portion since beginning of the flight.

95. The computer program of claim 90, wherein a portion of reference image $X(t-\delta)$ is reset periodically to accommodate changes of background.

96. The computer program of claim 90, wherein a portion of a reference frame $X(t-\delta)$ is set to a frame immediately preceding a current frame such that $\delta=1$, and wherein the difference image with respect to said portion $D(t,\delta)$ represents the instantaneous rate of change of a view of said portion.

97. The computer program of claim 90, wherein said at least one feature includes characterizing image sharpness using an intensity gradient, and wherein said intensity gradient is determined using a portion of a change image.

98. The computer program of claim 90, wherein said at least one feature includes a dynamic range of intensity change including a standard deviation $s_d(t,\delta)$ of intensity change over some predefined time interval, $\delta$, defined as:

$$s_d(t,\delta) = \sqrt{\frac{1}{N}\sum_{j=all\,pixels}(D_j(t,\delta) - m_d(t,\delta))^2}$$

and wherein a value of the standard deviation $s_d(t,\delta)$ is close to zero within some predetermined threshold if there is fog.

99. The computer program of claim 90, wherein said at least one feature includes a mean absolute deviation of a portion from the mean value of a portion of the change image represented as:

$$d_d(t) = \frac{1}{N}\sum_{j=all\,pixels}|D_j(t,\delta) - m_d(t,\delta)|$$

and wherein a value of the mean absolute deviation is close to zero within some predetermined threshold if there is fog.

100. The computer program of claim 90, wherein said at least one feature includes a spatial moment of a portion of the change image, and wherein coordinates of a center of mass a portion of the change image $D(t,\delta)$ are represented as:

$$i_c(t,\delta) = \frac{\sum_{i,j=all\,pixels} iD_{i,j}(t,\delta)}{\sum_{i,j=all\,pixels} D_{i,j}(t,\delta)} \quad j_c(t,\delta) = \frac{\sum_{i,j=all\,pixels} jD_{i,j}(t,\delta)}{\sum_{i,j=all\,pixels} D_{i,j}(t,\delta)}$$

and wherein, if the image change for a portion is uniform across the portion of the image, the coordinates are close to the geometric center of the portion of the image indicating presence of fog.

101. The computer program of claim 100, wherein said at least one feature includes higher order moments of a portion of a change image represented as:

$$M_{2,0}(t,\delta) = \sum_{i,j=all\,pixels}(i - i_c(t,\delta))^2 D_{i,j}(t,\delta)$$

$$M_{0,2}(t,\delta) = \sum_{i,j=all\,pixels}(j - j_c(t,\delta))^2 D_{i,j}(t,\delta).$$

102. The computer program of claim 101, wherein said at least one feature includes a moment of inertia of a portion of the change image represented as:

$$M_i(t,\delta) = \sum_{i,j=all\,pixels}((i - i_c(t,\delta))^2 (j - j_c(t,\delta))^2) D_{i,j}(t,\delta).$$

103. The computer program of claim 90, wherein said at least one feature includes moments defined using average absolute values of pixels represented as:

$$M^a_{1,0}(t,\delta) = \sum_{i,j=all\,pixels}|i - i_c(t,\delta)|D_{i,j}(t,\delta)$$

$$M^a_{0,1}(t,\delta) = \sum_{i,j=all\,pixels}|j - j_c(t,\delta)|D_{i,j}(t,\delta)$$

$$M^a_i(t,\delta) = \sum_{i,j=all\,pixels}(|i - i_c(t,\delta)| + |j - j_c(t,\delta)|)D_{i,j}(t,\delta)$$

and wherein, if a portion of the change image is uniform, values for these moments are larger than a predetermined threshold indicating a presence of fog.

104. The computer program of claim 80, wherein said at least one feature includes an absolute value of the average intensity change represented as:

$$d_a(t,\delta) = \left|\frac{1}{N}\sum_{j=1}^{N}(Xj(t) - Xj(t-\delta))\right|$$

in which t and t−δ represent points in time and X(t) and X(t−δ) are portions of images taken, respectively, at these two points in time.

105. The computer program of claim 80, wherein said at least one feature includes an intensity range r(t) at a time t represented as:

$$r(t) = \chi_{max}(t) - \chi_{min}(t)$$

where a maximum (Xmax) and a minimum (Xmin) intensity of a portion X of an image at a time t are used to provide an indication of reduced image contrast for the portion X and are represented as:

$$\chi_{max}(t) = \max_{j=all\,pixels} X_j(t), \; \chi_{min}(t) = \min_{j=all\,pixels} X_j(t).$$

106. The computer program of claim 105, wherein creation of fog is indicated by a rapid drop of r(t), and an increase in r(t) indicates fog dispersal, and wherein, r(t) decreasing below a threshold amount indicates that fog is present.

107. The computer program of claim 80, wherein said at least one feature includes characterizing image sharpness of a portion X of an image using an intensity gradient.

108. The computer program of claim 107, wherein x and y gradient components G at pixel i,j of a portion X of an image at a time t are defined as a left difference represented as:

$G_{i,j}^x(t) = X_{i,j}(t) - X_{i-1,j}(t)$  $G_{i,j}^y(t) = X_{i,j}(t) - X_{i-j,1}(t)$.

109. The computer program of claim 107, wherein x and y gradient components G at pixel i,j of a portion X of an image at a time t are defined as a right difference represented as:

$G_{i,j}^x(t) = X_{i+1,j}(t) - X_{i,j}(t)$  $G_{i,j}^y(t) = X_{i,j+1}(t) - X_{i,j}(t)$.

110. The computer program of claim 107, wherein x and y gradient components G at pixel i,j are defined as a double-sided difference represented as:

$$G_{i,j}^x(t) = \frac{X_{i+1,j}(t) - X_{i-1,j}(t)}{2} \quad G_{i,j}^y(t) = \frac{X_{i,j+1}(t) - X_{i,j-1}(t)}{2}.$$

111. The computer program product according to one of claims 108, 109, and 110, wherein said at least one feature includes a mean absolute gradient value represented as:

$$g_a^x(t) = \frac{1}{N} \sum_{i,j=all\ pixels} |G_{i,j}^x(t)|, \quad g_a^y(t) = \frac{1}{N} \sum_{i,j=all\ pixels} |G_{i,j}^y(t)|$$

such that creation of fog is signified by a rapid drop in at least one of: $g_a^x(t)$ and $g_a^y(t)$.

112. The computer program of claim 111, wherein said at least one feature includes an overall average gradient characteristic represented as:

$g_o(t) = g_a^x(t) + g_a^y(t)$.

113. The computer program according to one of claims 108, 109 and 110, wherein said at least one feature includes an average gradient norm, wherein a gradient norm G at pixel i,j is represented as:

$G_{i,j}^n(t) = \sqrt{G_{i,j}^x(t)^2 + G_{i,j}^y(t)^2}$ for all "N" pixels within a portion of an image, and the average gradient norm is represented as:

$$g_n(t) = \frac{1}{N} \sum_{i,j=all\ pixels} G_{i,j}^n(t).$$

114. The computer program of claim 113, wherein creation of fog is related to a rapid drop in $g_n(t)$ below a predetermined threshold value, and an increase in $g_n(t)$ indicates fog dispersal.

115. The computer program of claim 114, wherein said at least one feature includes maximum and minimum values of x and y components of a gradient norm G represented as:

$$g_{max}(t) = \max_{i,j=all\ pixels} G_{i,j}^n(t), \quad g_{min}(t) = \max_{i,j=all\ pixels} G_{i,j}^n(t)$$

-continued $$g_{max}^x(t) = \max_{i,j=all\ pixels} |G_{i,j}^x(t)|, \quad g_{min}^x(t) = \max_{i,j=all\ pixels} |G_{i,j}^n(t)|$$

$$g_{max}^y(t) = \max_{i,j=all\ pixels} |G_{i,j}^y(t)|, \quad g_{min}^y(t) = \max_{i,j=all\ pixels} |G_{i,j}^y(t)|.$$

116. The computer program of claim 107, wherein said intensity gradient defines a gradient in terms of differences between pixel locations with time as a constant.

117. The computer program of claim 107, wherein said intensity gradient defines a gradient in terms of pixel values between portions of images taken at different points in time.

118. The computer program of claim 107, wherein a large value of said intensity gradient indicates sharp edges within a portion of an image.

119. The computer program of claim 71, further comprising executable code that:
  determines that at least one of the following conditions is present for said portion of said image: an increase in overall image intensity, a decrease in image sharpness, and a decrease in image contrast;
  determines an intermediate positive indicator for fog presence if it is determined that said at least one of the following conditions is present, and it is determined using said at least one visual characteristic that said change associated with said at least one visual characteristic is approximately uniform with respect to the portion of the image; and
  determines a final positive indicator for fog presence if said intermediate positive indicator indicates that there is fog which is confirmed by at least one other feature.

120. The computer program of claim 119, wherein said at least one other feature is a non-image feature.

121. The computer program of claim 120, wherein said at least one other feature includes at least one of temperature, humidity and pressure.

122. The computer program of claim 119, wherein a plurality of intermediate positive indicators are used in determining said final positive indicator.

123. The computer program of claim 119, further comprising executable code that:
  distinguishes fog from one of a plurality of other conditions, wherein said plurality of other conditions includes smoke and an aerosol dispersion.

124. The computer program of claim 71, wherein said portion is an entire image.

125. The computer program of claim 71, wherein said portion includes a plurality of regions of said image.

126. The computer program of claim 125, wherein each of said plurality of regions is a predefined shape in accordance with lighting and camera view.

127. The computer program of claim 71, wherein said at least one visual characteristic is a frequency-based feature.

128. The computer program of claim 127, wherein said frequency-based feature estimates motion of an element of said portion.

129. The computer program of claim 71, further comprising:
  executable code that receives an image from a CCD camera.

130. The computer program of claim 129, wherein said CCD camera has an operational wavelength sensitivity between approximately 770 and 1200 nanometers blocking visible light.

131. The computer program of claim 129, wherein said CCD camera is a conventional CCD camera with an operational wavelength sensitivity between approximately 400 and 1200 nanometers.

132. The computer program of claim 131, wherein said CCD camera is used when it is determined that a view area is completely obscured except for a predetermined space within which said CCD camera is included.

133. The computer program of claim 131, wherein said operational wavelength sensitivity of said CCD camera excludes a portion of the range between approximately 400 and 1200 nanometers.

134. The computer program of claim 133, wherein said at least one excluded portion has a range corresponding to one of: a light source and a device that emits within said at least one excluded portion to filter out wavelengths within said at least one excluded portion.

135. The computer program of claim 129, wherein said CCD camera has an operational wavelength sensitivity approximating that of visible light.

136. The computer program of claim 71, further comprising:
executable code that receives an image from a camera with an associated light source wherein said camera is mounted opposite said associated light source within a viewing area.

137. The computer program of claim 136, wherein said viewing area is an aircraft cargo bay, and said camera and said associated light source are mounted within a predetermined distance from a ceiling of said aircraft cargo bay.

138. The computer program of claim 137, wherein said camera and said associated light source are positioned at a same vertical and horizontal location on walls of said cargo bay area.

* * * * *

UNITED STATES PATENT AND TRADEMARK OFFICE
CERTIFICATE OF CORRECTION

PATENT NO. : 7,505,604 B2
APPLICATION NO. : 10/702070
DATED : March 17, 2009
INVENTOR(S) : Radoslaw Zakrzewski et al.

It is certified that error appears in the above-identified patent and that said Letters Patent is hereby corrected as shown below:

Claim 15 should read as follows:

Column 181, line 35, "$(s(t))^2 + (s(t-\delta))^2$" should read --$(s(t))^2(s(t-\delta))^2$--;

Claim 18 should read as follows:

Column 181, line 58, "$d_a(t,\delta)$" should read --$d_s(t,\delta)$--;

Claim 36 should read as follows:

Column 184, line 17, "method of claim 28" should read --method of claim 35--;

Claim 38 should read as follows:

Column 184, line 28, "$G_{i,j}^x(t) = X_{i,j}(t) - X_{i-1,j}(t) \quad G_{i,j}^y(t) = X_{i,j+1}(t) - X_{i-j,1}(t)$"

should read -- $G_{i,j}^x(t) = X_{i,j}(t) - X_{i-1,j}(t) \quad G_{i,j}^y(t) = X_{i,j}(t) - X_{i-j,1}(t)$ --;

Claim 39 should read as follows:

Column 184, line 34, "$G_{i,j}^x(t) = X_{i+1,j}(t) \quad G_{i,j+1}(t) - X_{i,j}(t)$" should read -- $G_{i,j}^x(t) = X_{i+1,j}(t) - X_{i,j}(t) \quad G_{i,j}^y(t) = X_{i,j+1}(t) - X_{i,j}(t)$ --;

Signed and Sealed this
Nineteenth Day of April, 2011

David J. Kappos
*Director of the United States Patent and Trademark Office*

CERTIFICATE OF CORRECTION (continued)
U.S. Pat. No. 7,505,604 B2

Claim 43 should read as follows:

Column 184, line 67, " $G_{i,j}n(t) = \sqrt{G_{i,j}^x(t)^2 + G_{i,j}^y(t)^2}$ " should read -- $G_{i,j}^n(t) = \sqrt{G_{i,j}^x(t)^2 + G_{i,j}^y(t)^2}$ --;

Claim 63, Column 186, line 16, "method of claim 59" should read --method of claim 61--;

Claim 79 should read as follows:

Column 187, line 26, "program product of claim 77" should read --program of claim 77--; and Claim 111 should read as follows:

Column 191, line 26, "program product according to one" should read --program according to one--.